US011042265B2

(12) United States Patent
Walkin et al.

(10) Patent No.: US 11,042,265 B2

(45) Date of Patent: Jun. 22, 2021

(54) SYSTEMS, METHODS, AND USER INTERFACES FOR INTERACTING WITH MULTIPLE APPLICATION WINDOWS

(71) Applicant: Apple Inc., Cupertino, CA (US)

(72) Inventors: Brandon M. Walkin, San Francisco, CA (US); Shubham Kedia, Santa Clara, CA (US); Chanaka G. Karunamuni, San Jose, CA (US); Patrick L. Coffman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/581,665

(22) Filed: Sep. 24, 2019

(65) Prior Publication Data

US 2020/0326839 A1 Oct. 15, 2020

Related U.S. Application Data

(60) Provisional application No. 62/844,102, filed on May 6, 2019, provisional application No. 62/834,367, filed on Apr. 15, 2019.

(51) Int. Cl.

*G06F 3/048* (2013.01)
*G06F 3/0489* (2013.01)

(Continued)

(52) U.S. Cl.

CPC .......... *G06F 3/0482* (2013.01); *G06F 3/0486* (2013.01); *G06F 3/04845* (2013.01);

(Continued)

(58) Field of Classification Search

CPC ... G06F 3/04883; G06F 3/0488; G06F 3/0482

See application file for complete search history.

(56) References Cited

U.S. PATENT DOCUMENTS 8,065,627 B2 11/2011 Atkins
8,866,748 B2 * 10/2014 Sirpal .................. G06F 3/0482 345/169

(Continued)

FOREIGN PATENT DOCUMENTS

| | | | |
|---|---|---|---|
| AU | 2016100652 | A4 | 6/2016 |
| EP | 1 491 990 | A2 | 12/2004 |
| WO | WO 2017/052849 | A1 | 3/2017 |

OTHER PUBLICATIONS

Office Action, dated Oct. 21, 2019, received in Danish Patent Application No. 201970529, which corresponds with U.S. Appl. No. 16/581,674, 9 pages.

(Continued)

*Primary Examiner* — Jordany Nunez

(74) *Attorney, Agent, or Firm* — Morgan, Lewis & Bockius LLP

(57) ABSTRACT

Systems and methods for multitasking using touch-sensitive devices, including: displaying, by a display generation component, a first user interface of a first application; receiving a first input corresponding a request for displaying a second application with the first application in a concurrent-display configuration; displaying a second user interface of the second application and the first user interface of the first application in accordance with the concurrent-display configuration; receiving a second input; in accordance with a determination that the second input meets first criteria, replacing display of the second application with display of a third application to display the third application and the first application in accordance with the respective concurrent-display configuration; and in accordance with a determination that the second input meets second criteria that are distinct from the first criteria: maintaining display of the first (Continued)

application; and ceasing display of the second application without displaying the third application.

69 Claims, 242 Drawing Sheets

(51) Int. Cl.

| | |
|---|---|
| ***G06F 3/0485*** | (2013.01) |
| ***G06F 3/0482*** | (2013.01) |
| ***G06F 3/0488*** | (2013.01) |
| ***G06F 3/0486*** | (2013.01) |
| ***G06F 3/0484*** | (2013.01) |
| *G06F 3/0481* | (2013.01) |
| *G06F 9/00* | (2006.01) |
| *G06F 3/00* | (2006.01) |

(52) U.S. Cl.

CPC ............ *G06F 3/04883* (2013.01); *G06F 3/00* (2013.01); *G06F 3/048* (2013.01); *G06F 3/0481* (2013.01); *G06F 3/04886* (2013.01); *G06F 9/00* (2013.01)

(56) References Cited

U.S. PATENT DOCUMENTS

| | | | | |
|---|---|---|---|---|
| 10,387,025 | B2 * | 8/2019 | Hunt | G06F 9/451 |
| 10,866,694 | B2 * | 12/2020 | Kim | G06F 3/0482 |
| 2003/0020671 | A1 * | 1/2003 | Santoro | G06F 3/0481 345/1.3 |
| 2008/0235609 | A1 * | 9/2008 | Carraher | G06F 3/0486 715/769 |
| 2013/0086505 | A1 * | 4/2013 | de Paz | G06F 3/04817 715/773 |
| 2013/0321340 | A1 * | 12/2013 | Seo | H04M 1/0214 345/174 |
| 2014/0232671 | A1 | 8/2014 | Chaudhri | |
| 2014/0298272 | A1 * | 10/2014 | Doan | G06F 3/04883 715/863 |
| 2015/0046871 | A1 | 2/2015 | Lewis | |
| 2015/0324095 | A1 | 11/2015 | Brown et al. | |
| 2015/0363066 | A1 | 12/2015 | Lemay et al. | |
| 2015/0365306 | A1 | 12/2015 | Chaudhri et al. | |
| 2016/0062552 | A1 | 3/2016 | Jeong et al. | |
| 2016/0224213 | A1 * | 8/2016 | Chen | G06F 3/04842 |
| 2016/0357357 | A1 | 12/2016 | Lemay et al. | |
| 2016/0357358 | A1 | 12/2016 | Forster et al. | |
| 2017/0357437 | A1 | 12/2017 | Peterson et al. | |
| 2020/0326820 | A1 | 10/2020 | Walkin et al. | |

OTHER PUBLICATIONS

Dellinger et al., "Systems and Methods for Interacting with Multiple Applications that are Simultaneously Displayed on an Electronic Device with Touch-Sensitive Display", filed May 15, 2017, 203 page.

Lemay et al., "Systems and Methods for Efficiciently Navigating Between Applications with Linked Content on an Electronic Device with a Touch-Sensitive Display", filed Jun. 5, 2015, 163 pages.

YouTube, "Expose for Windows—Switcher", https://www.youtube.com/watch?v=XQWLy7DVDUA, Sep. 27, 2009, 3 pages.

YouTube, "How to Enable Freeform Window Mode on Android Nougat without Rooting Freeform Multi Window Mode", https://www.youtube.com/watch?v=MRHyH9anr4c, Jan. 14, 2017, 3 pages.

YouTube, "How to: Group Mission Control Windows Together in OS X", https://www.youtube.com/watch?v=cuiWiDgHyWw, May 10, 2016, 2 pages.

YouTube, "Switcher—A Windows Software Review", https://www.youtube.com/watch?v=9mYq-iZBWyE, Jul. 7, 2010, 2 pages.

YouTube, "Task Switcher in Windows 10—YouTube", https://www.youtube.com/watch?v=HIVPgghvKVs, Mar. 2, 2016, 2 pages.

Walkin et al., "Devices, Metheds, and Graphical User Interfaces for Navigating Between User Interfaces, Displaying a Dock, and Displaying System User Interface Elements", filed Oct. 29, 2018, 553 pages.

Office Action, dated Nov. 7, 2019, received in Danish Patent Application No. 2019-70528, which corresonds with U.S. Appl. No. 16/581,674, 8 pages.

Office Action, dated Feb. 13, 2020, received in U.S. Appl. No. 16/581,674, 22 pages.

Office Action, dated Mar. 3, 2020, received in Danish Patent Application No. 201970529, which corresponds with U.S. Appl. No. 16/581,674, 3 pages.

Purewal, "How to Use Multiple Desktops in Windows 10", https://www.cnet.com/how-to/how-to-use-multiple-desktops-in-windows-10, Jul. 4, 2015, 5 pages.

YouTube, "Inside IOS 11: How to Use Split-View on an iPad", https://www.youtube.com/watch?v=pqFYf bCbNpc, Jul. 25, 2017, 4 pages.

Notice of Allowance, dated Aug. 18, 2020, received in Danish Patent Application No. 2019-70528, which corresponds with U.S. Appl. No. 16/581,674, 2 pages.

Patent, dated Nov. 9, 2020, received in Danish Patent Application No. 2019-70528, which corresponds with U.S. Appl. No. 16/581,674, 5 pages.

Final Office Action, dated Jun. 4, 2020, received in U.S. Appl. No. 16/581,674, 20 pages.

Notice of Allowance, dated Aug. 14, 2020, received in Danish Patent Application No. 201970529, which corresponds with U.S. Appl. No. 16/581,674, 2 pages.

Patent, dated Nov. 9, 2020, received in Danish Patent Application No. 201970529, which corresponds with U.S. Appl. No. 16/581,674, 5 pages.

Invitation to Pay Additional Fees, dated Jul. 24, 2020, received in International Patent Application No. PCT/US2020/025800, which corresponds with U.S. Appl. No. 16/581,665, 12 pages.

International Search Report and Written Opinion, dated Sep. 15, 2020, received in International Patent Application No. PCT/US2020/025800, which corresponds with U.S. Appl. No. 16/581,665, 18 pages.

* cited by examiner

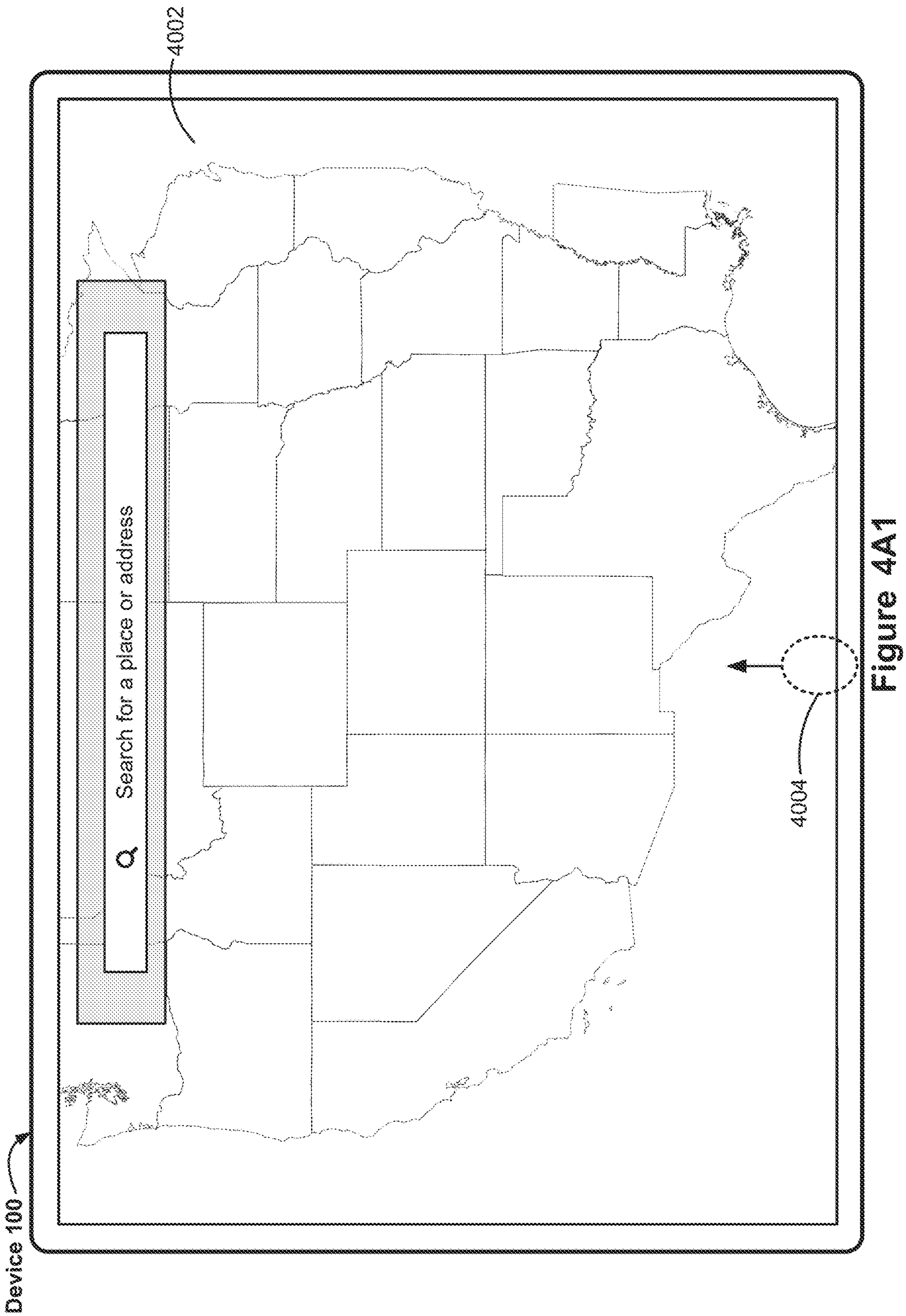
Figure 4A1

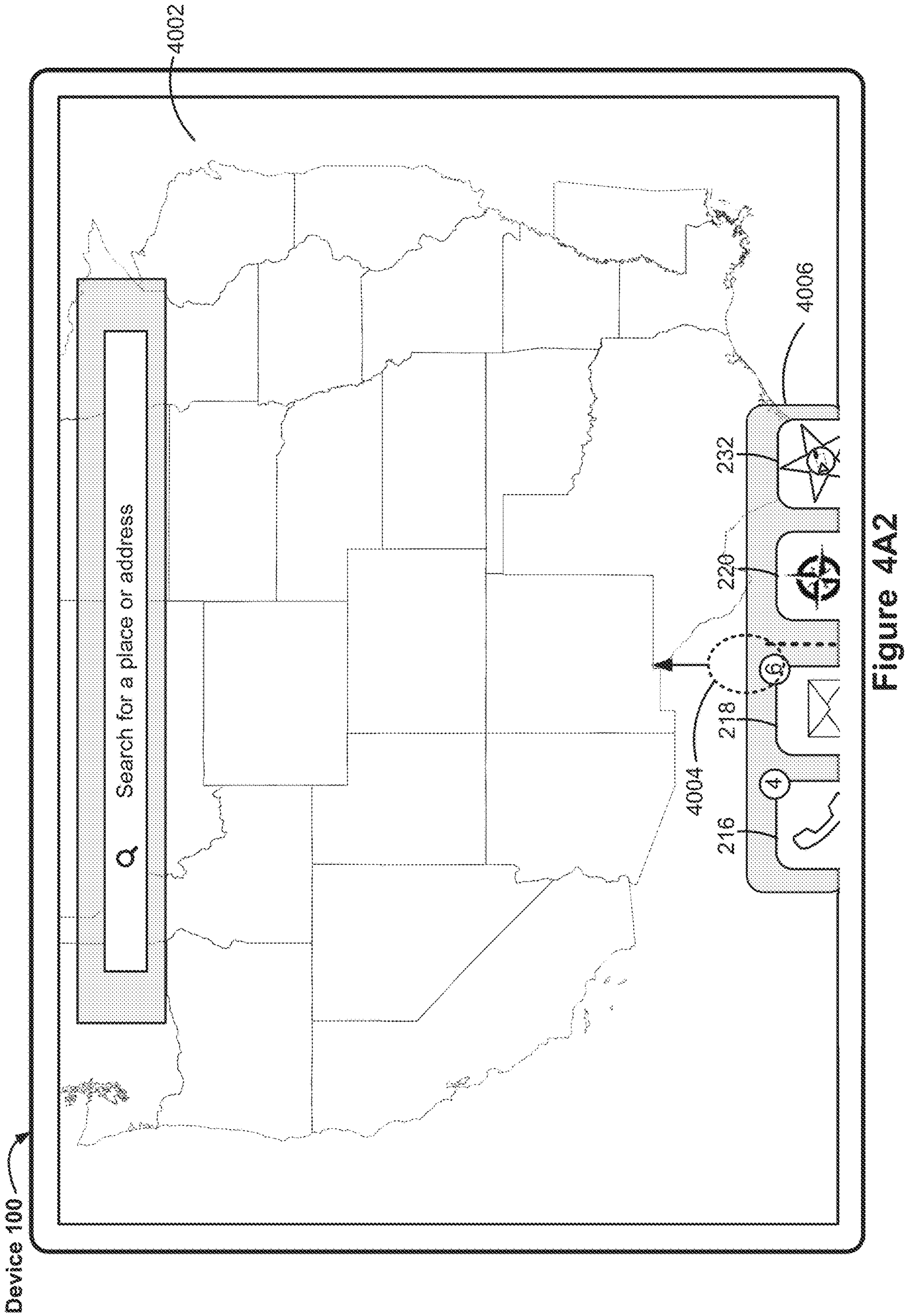
Figure 4A2

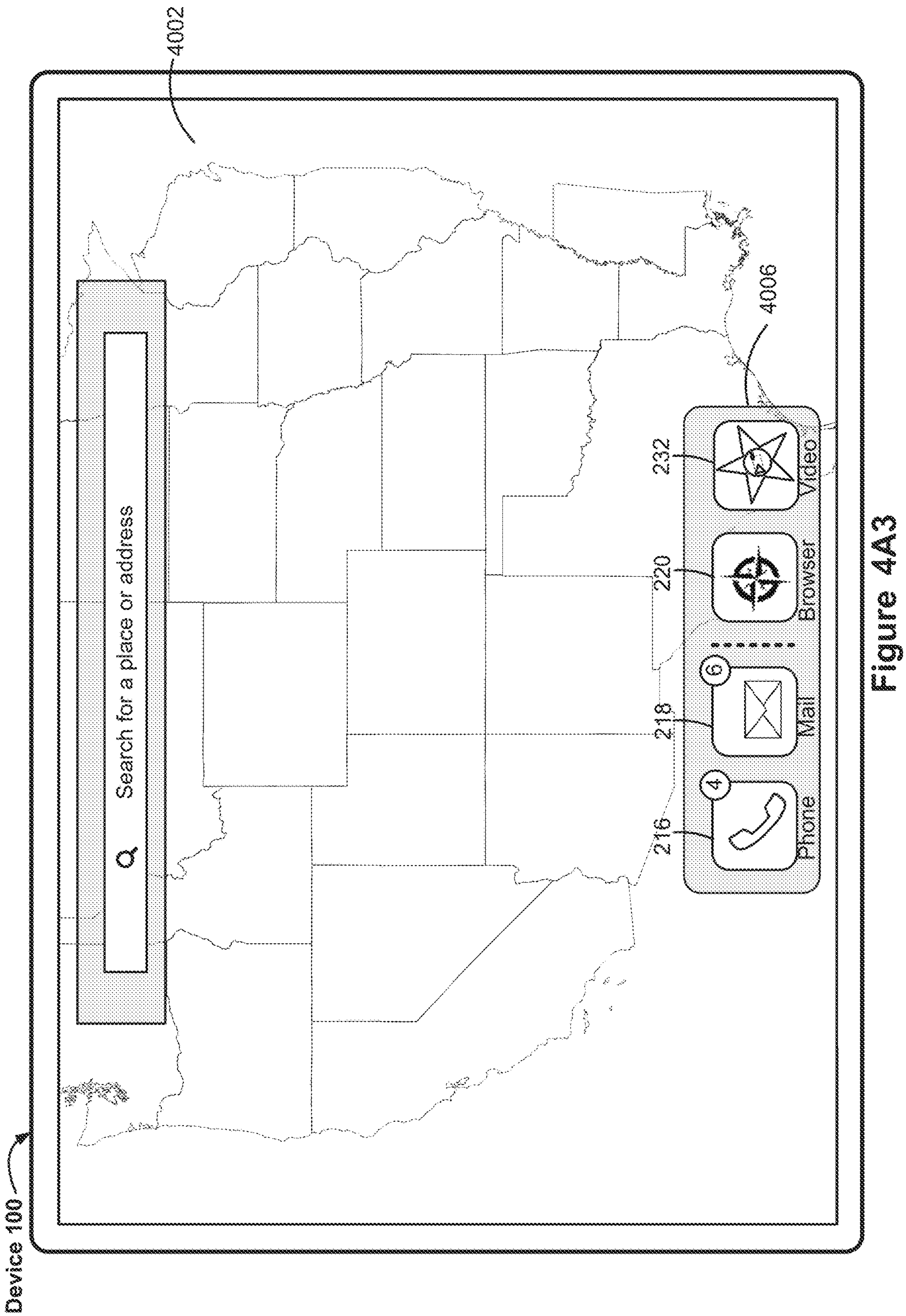
Figure 4A3

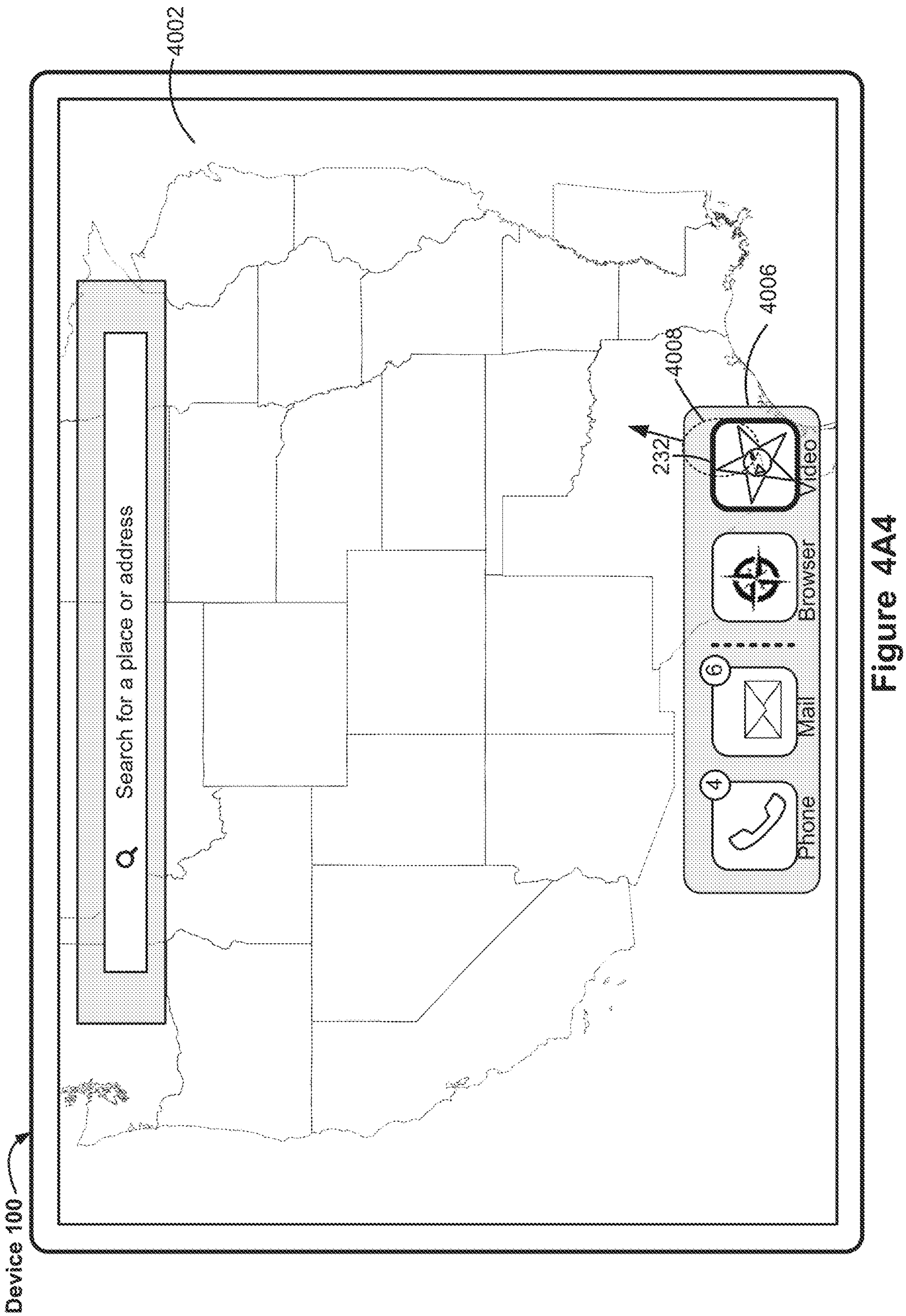
Figure 4A4

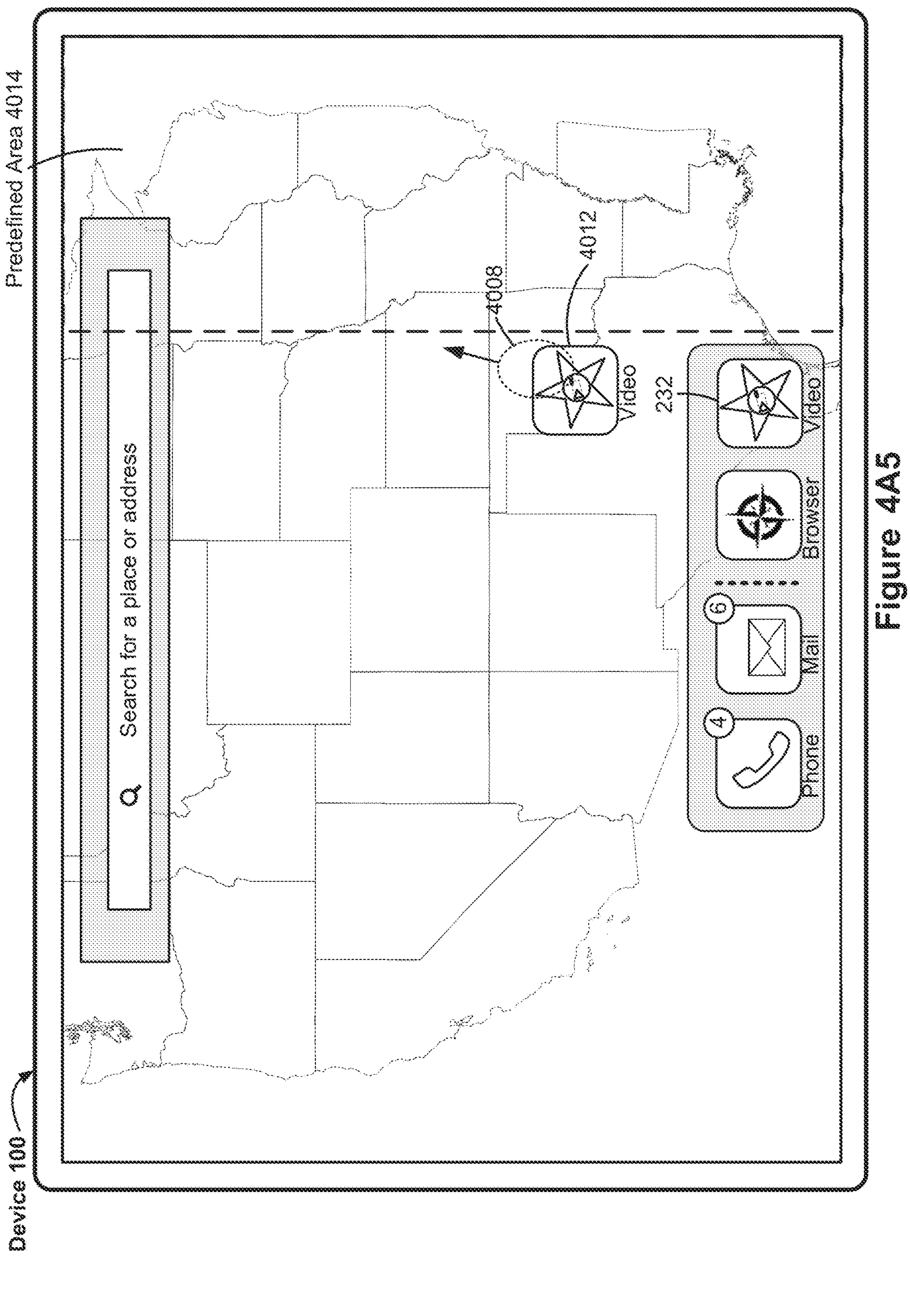
Figure 4A5

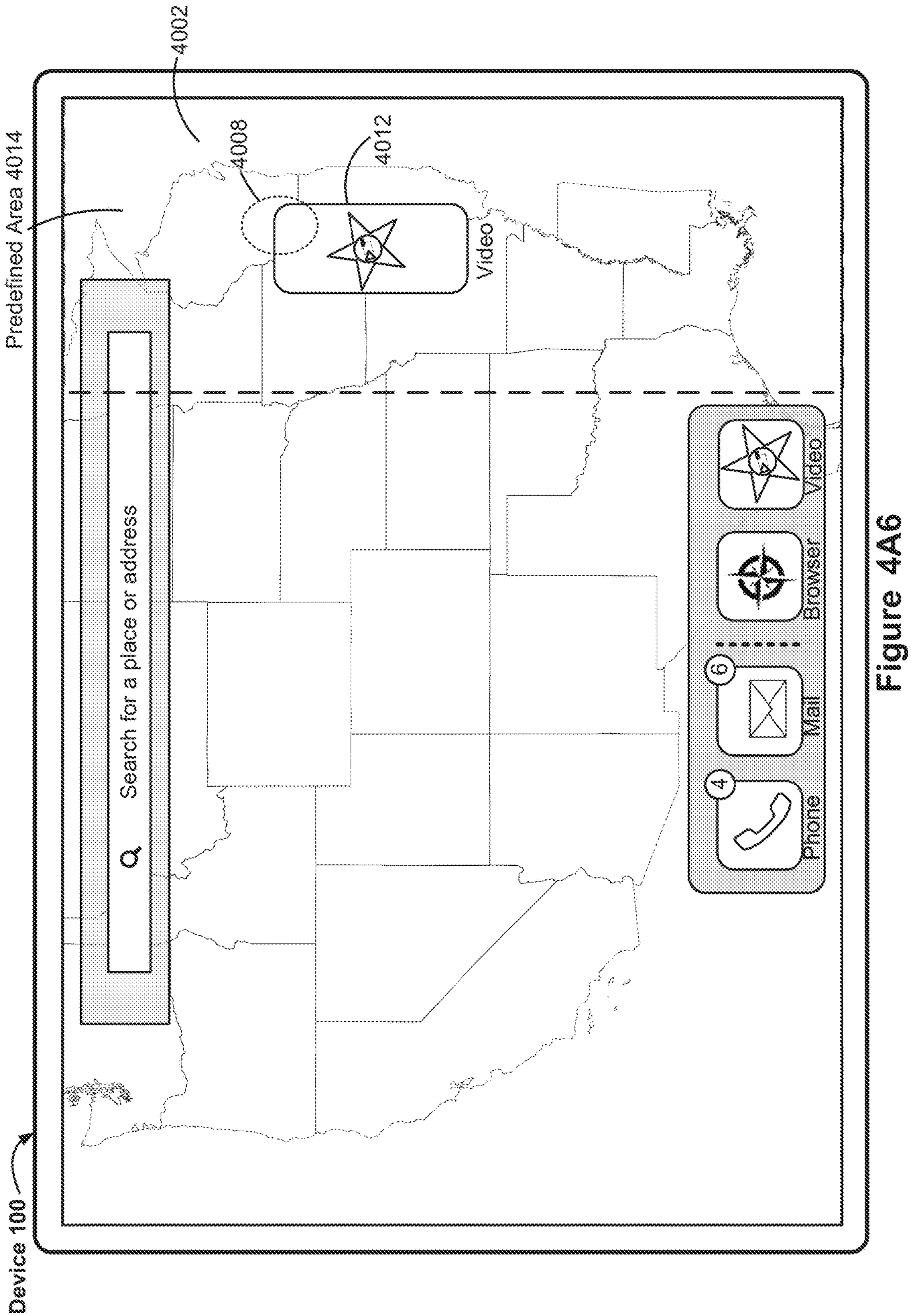
Figure 4A6

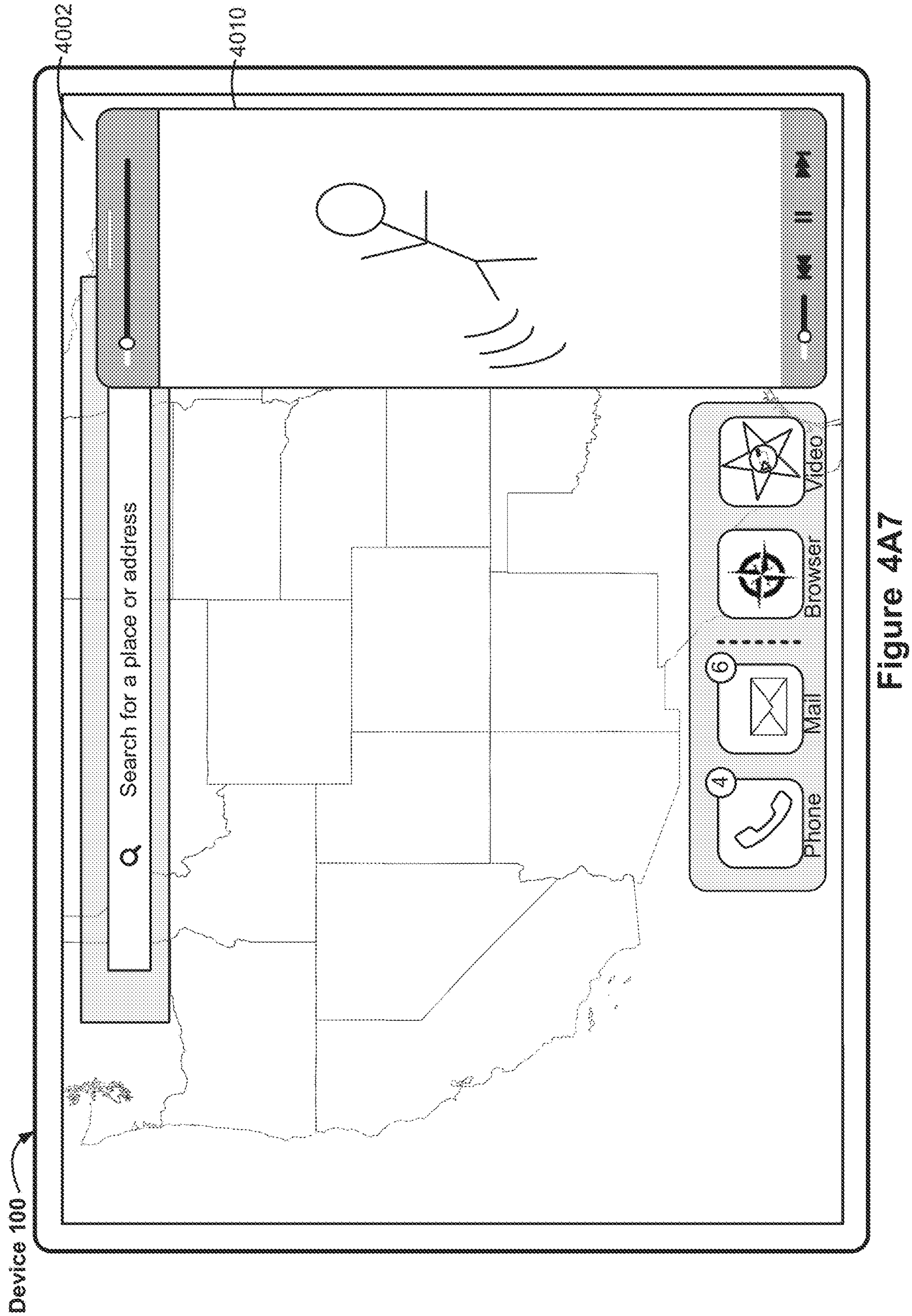
Figure 4A7

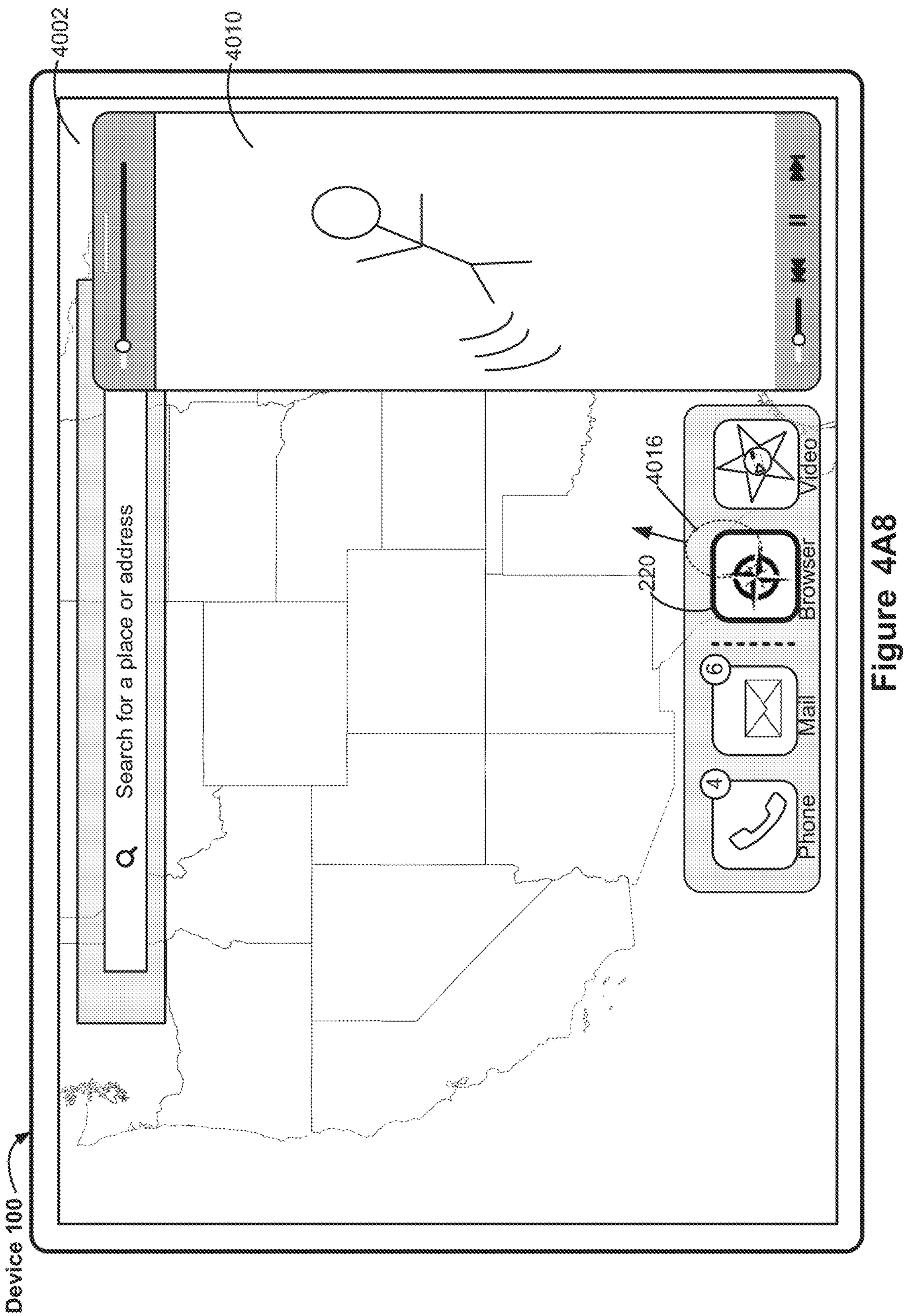
Figure 4A8

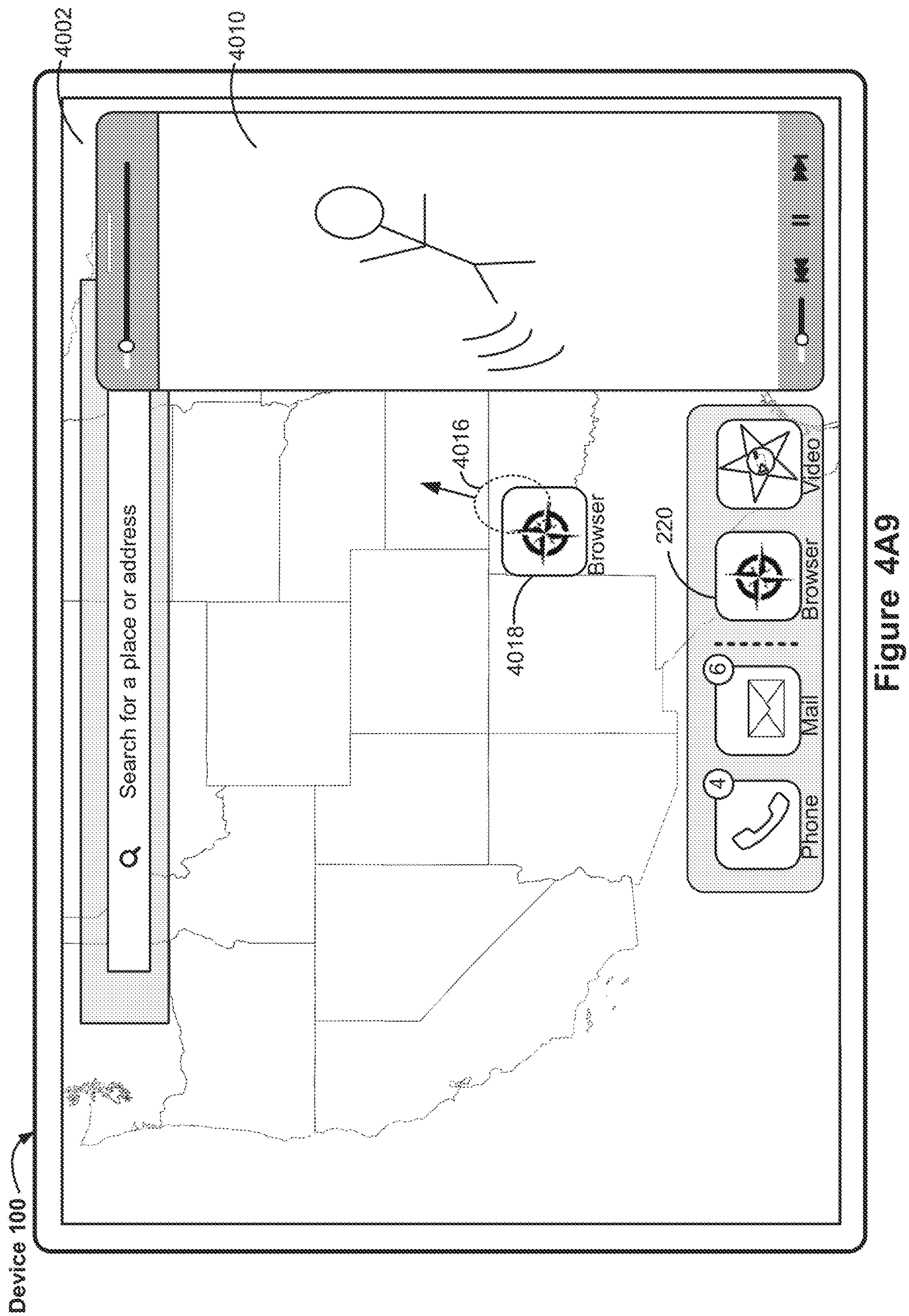
Figure 4A9

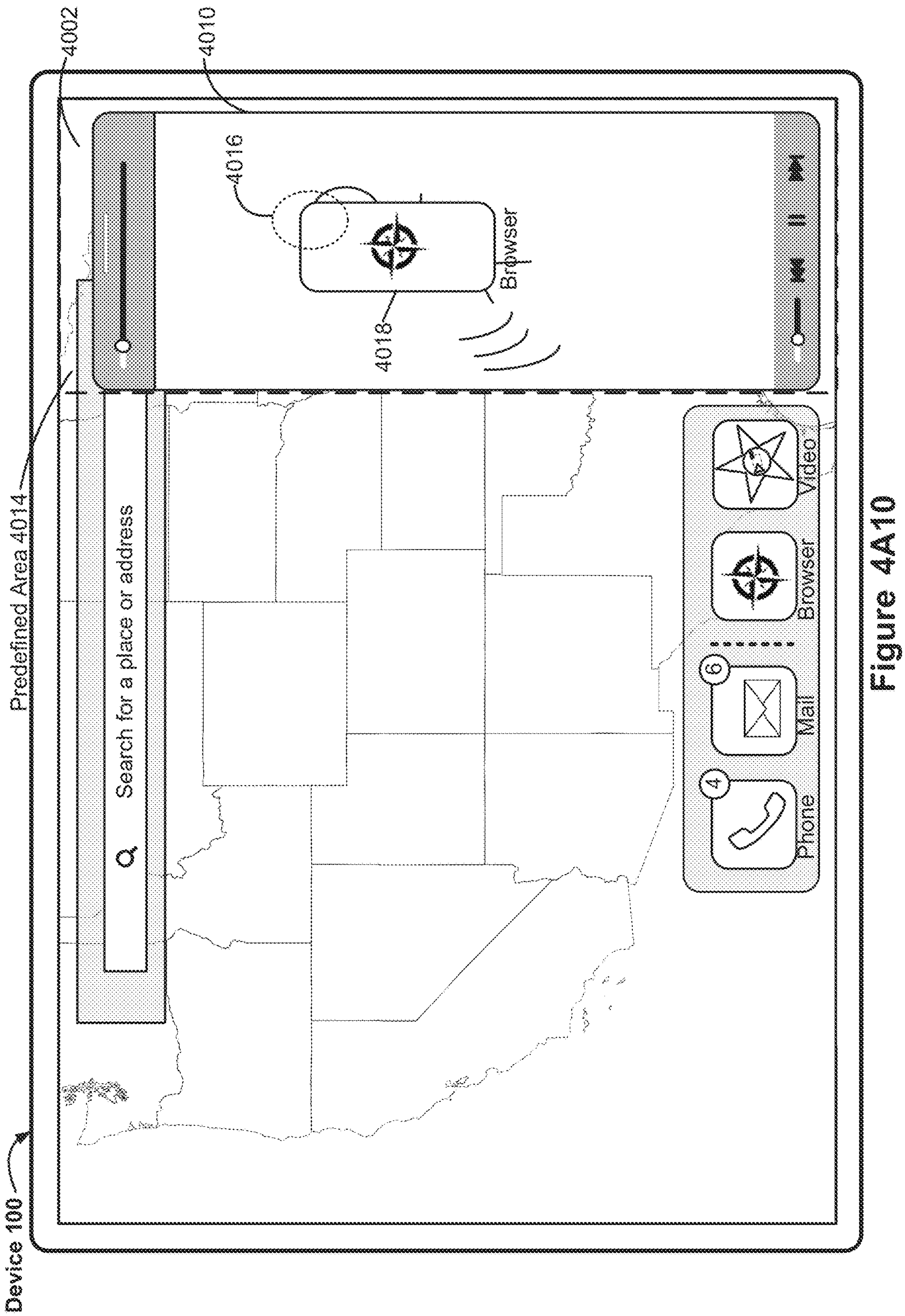
Figure 4A10

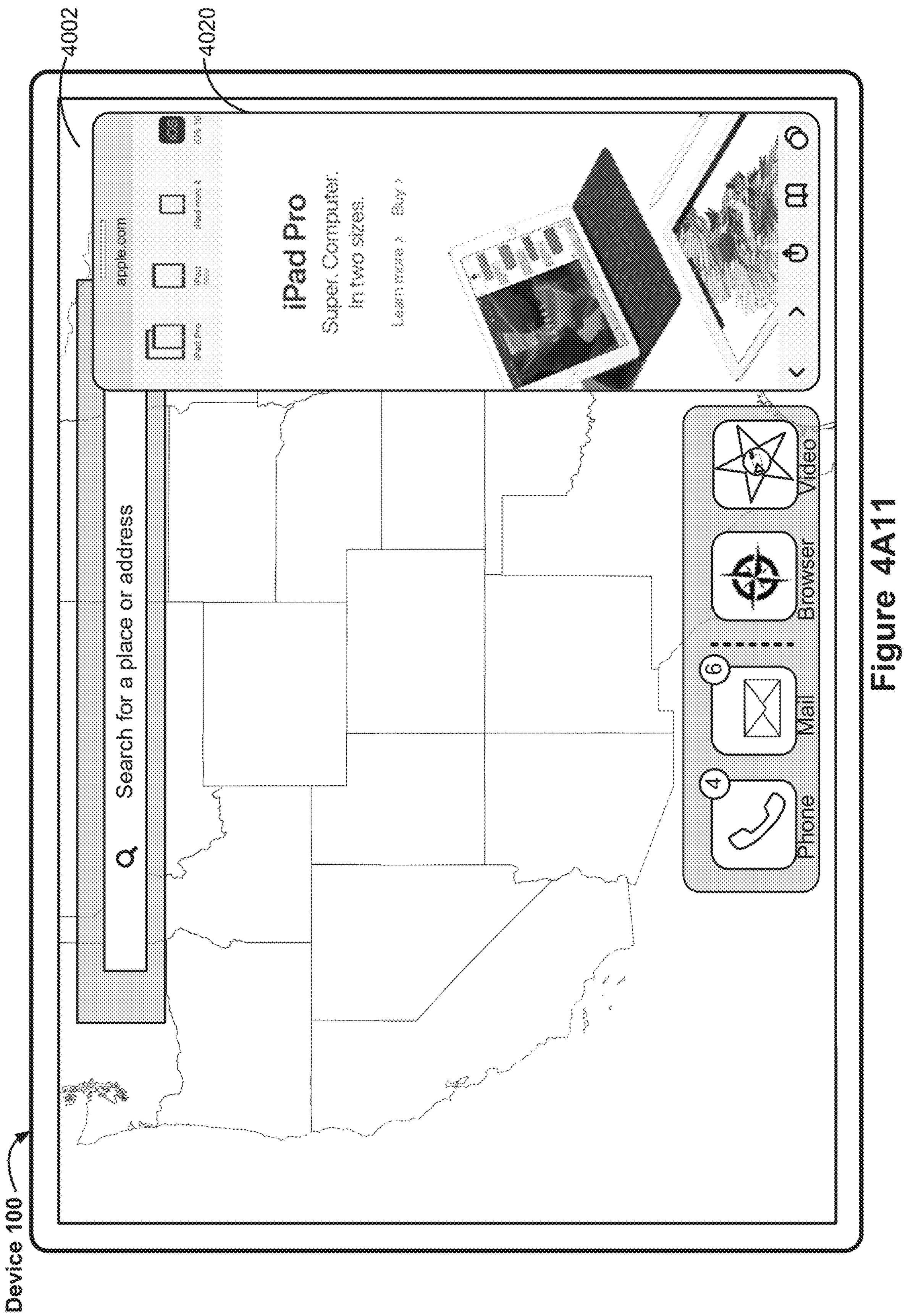
Figure 4A11

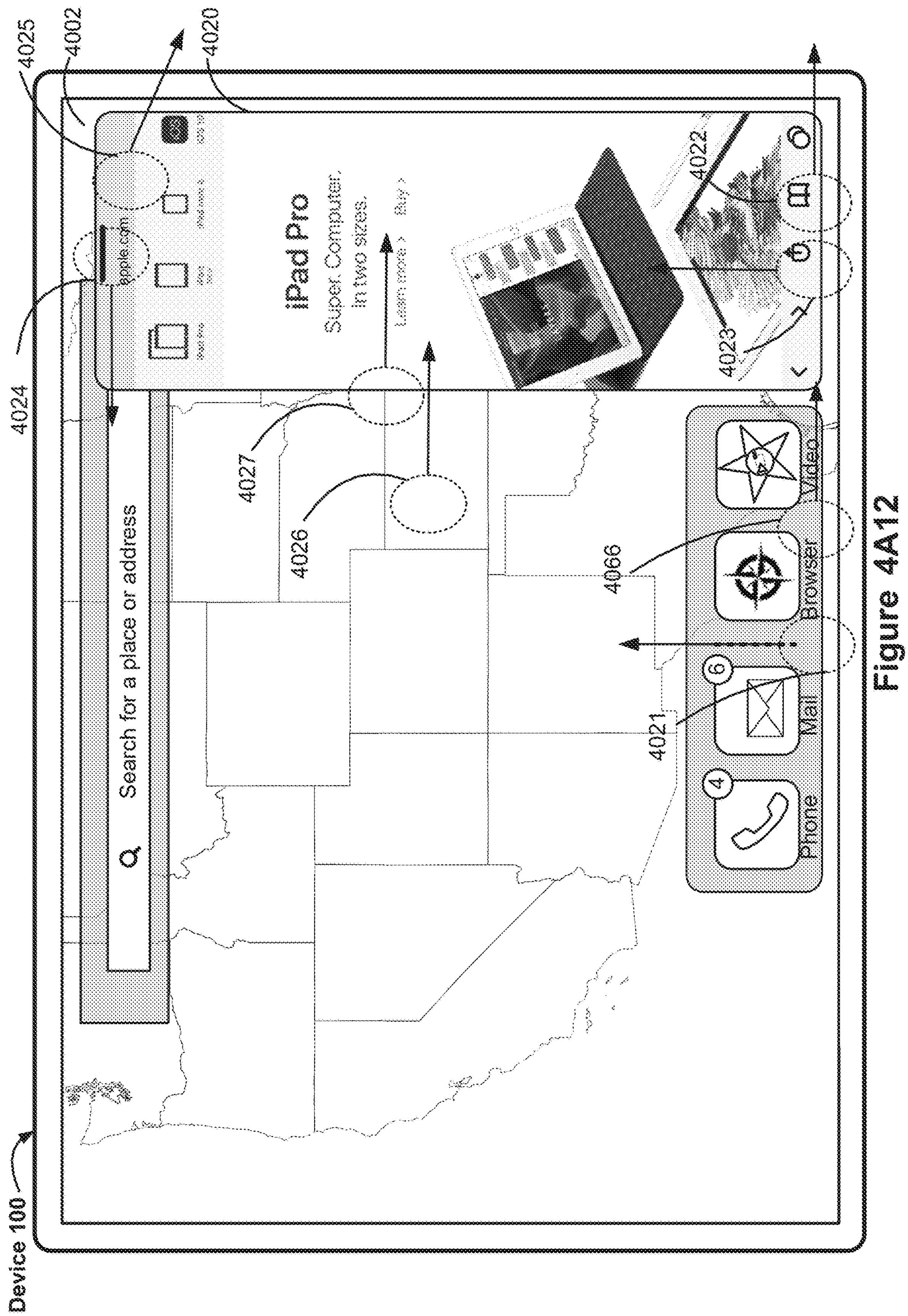
Figure 4A12

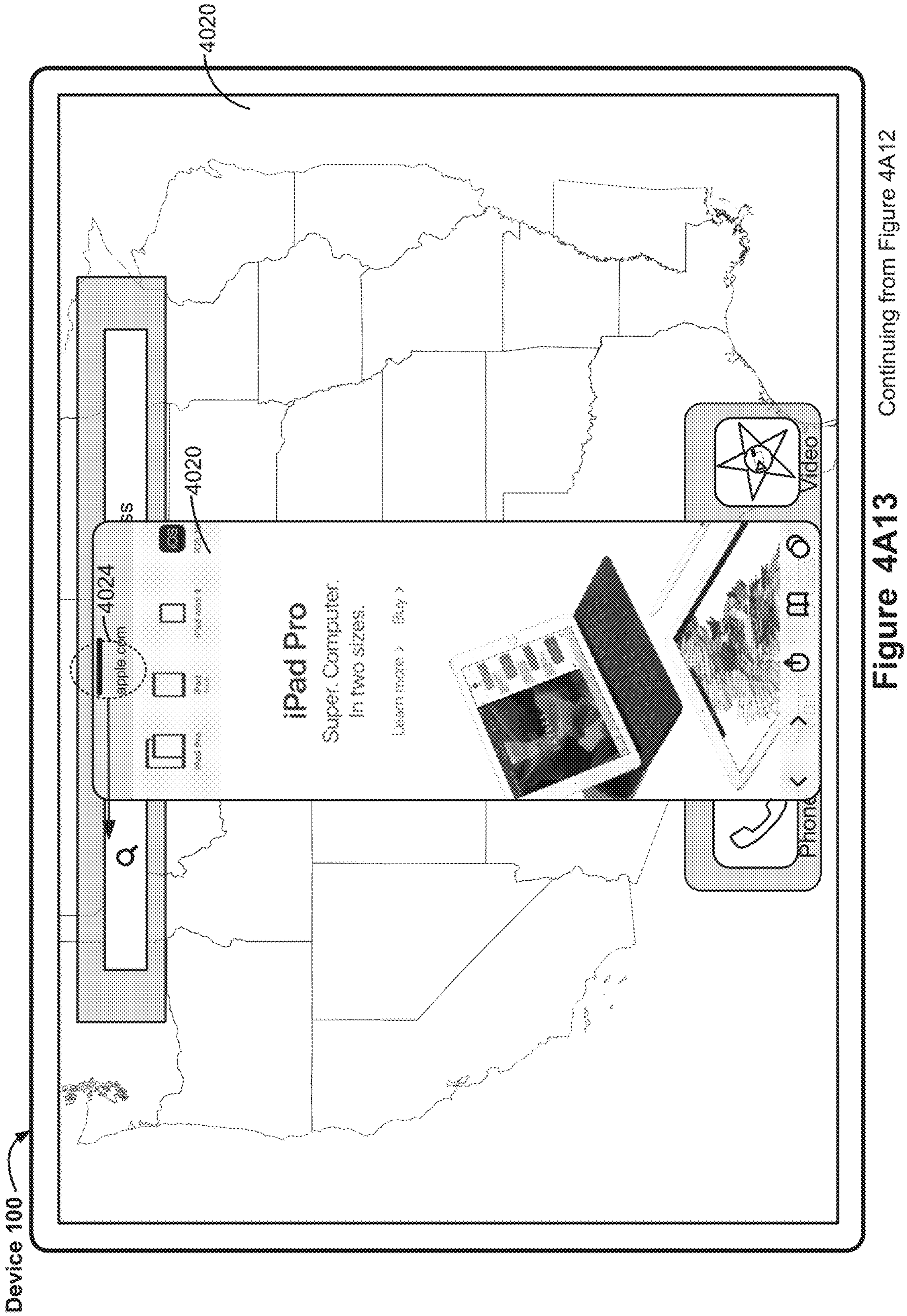
Figure 4A13
Continuing from Figure 4A12

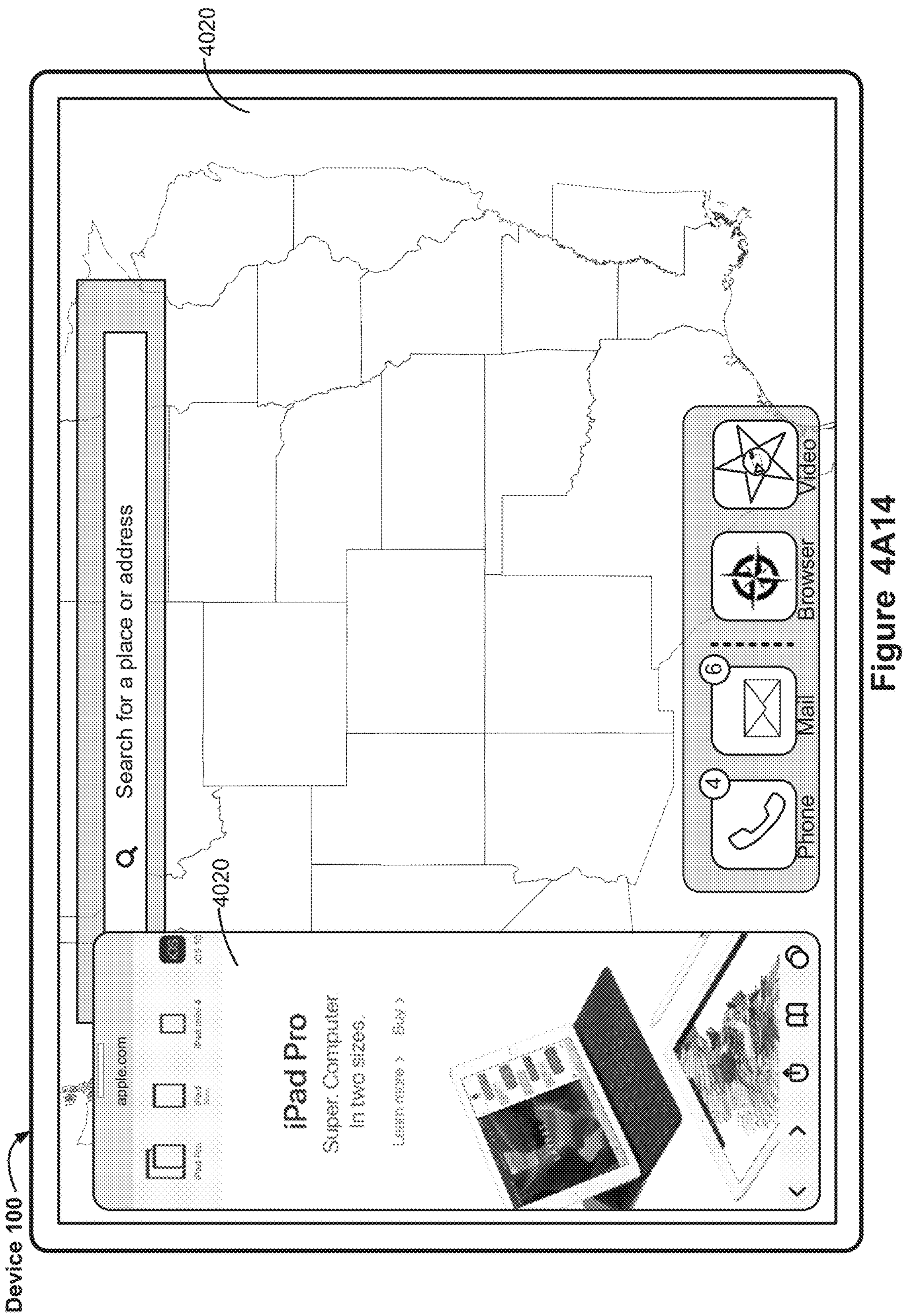
Figure 4A14

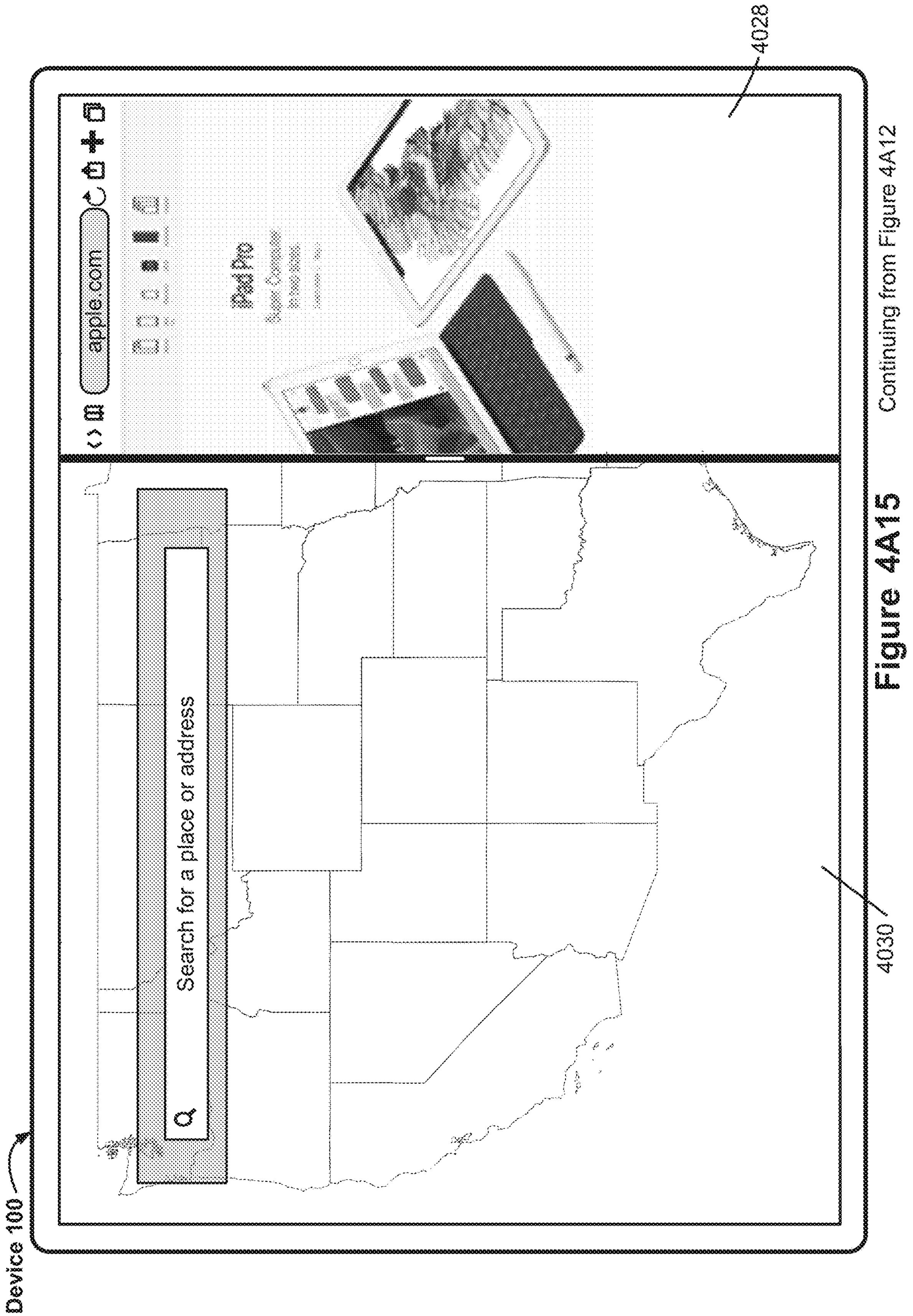
Figure 4A15

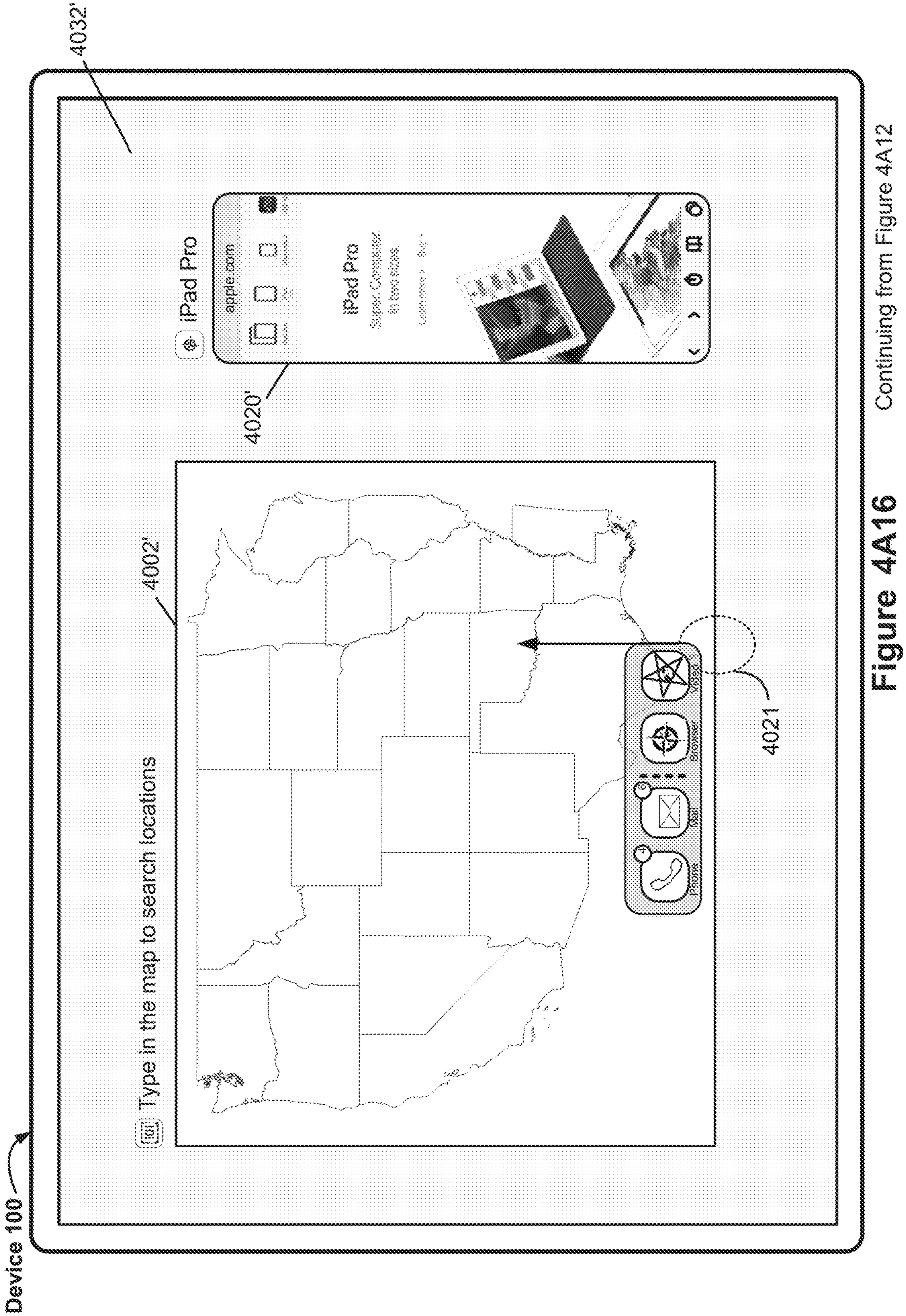
Continuing from Figure 4A12
Figure 4A16

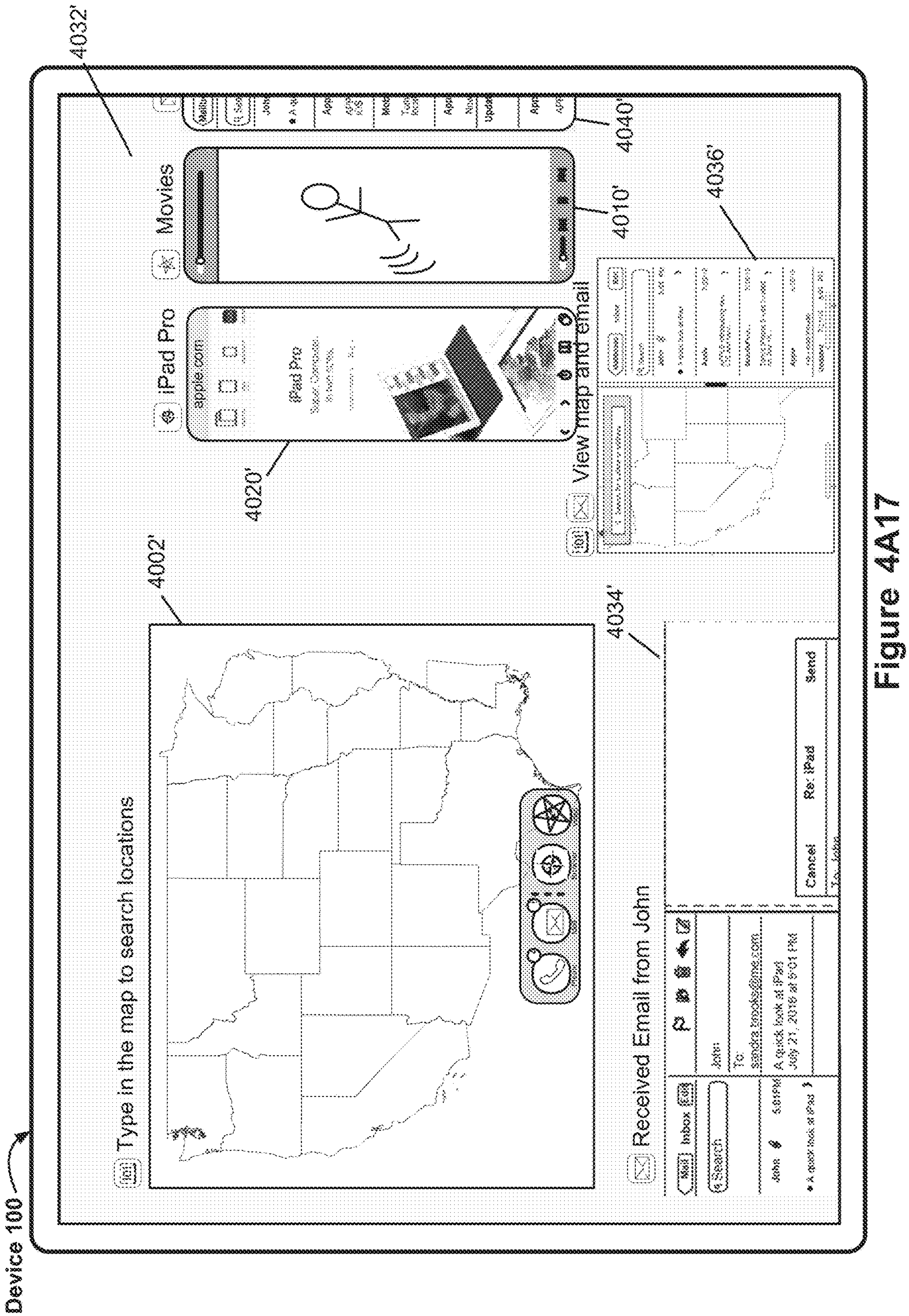
Figure 4A17

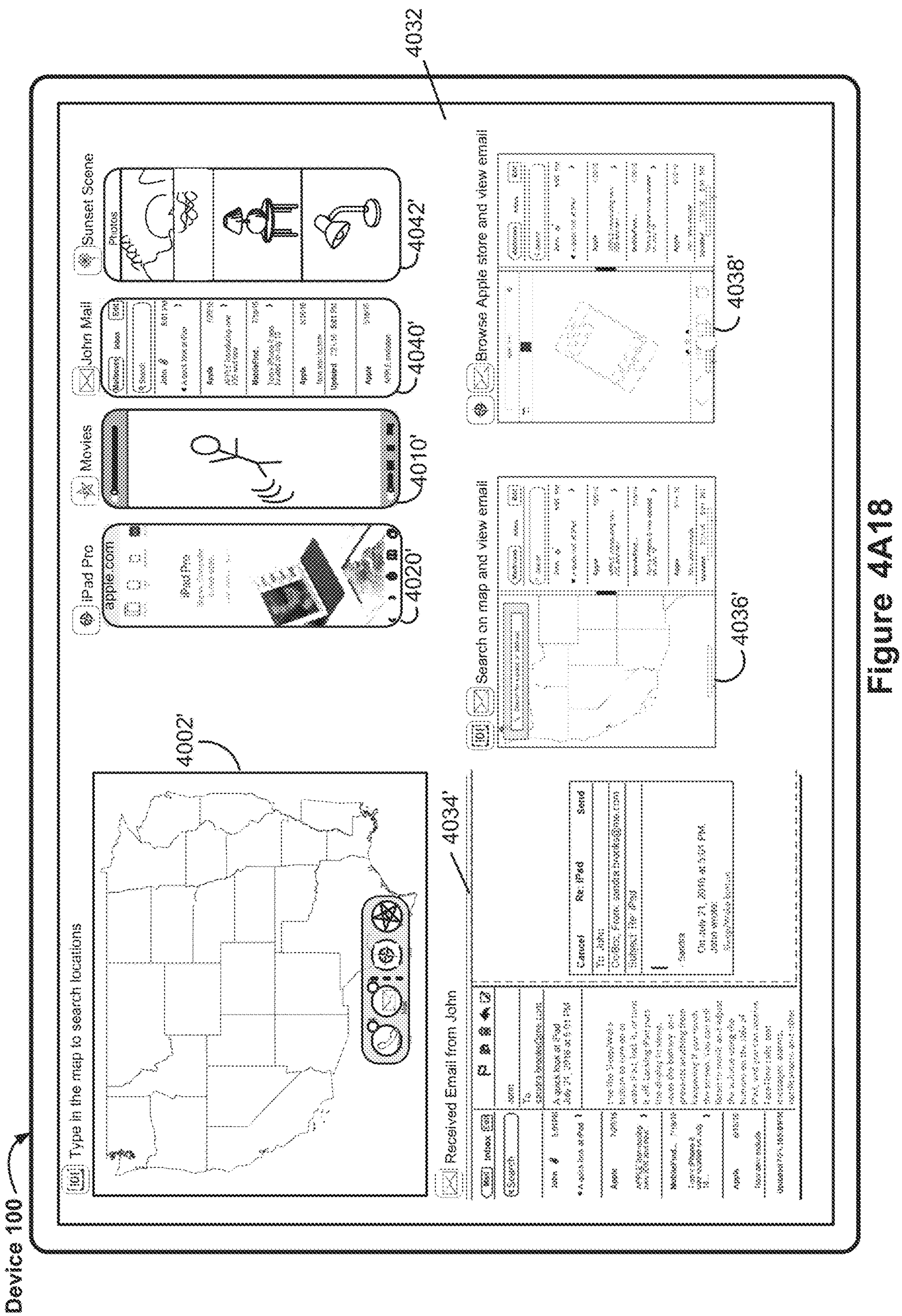
Figure 4A18

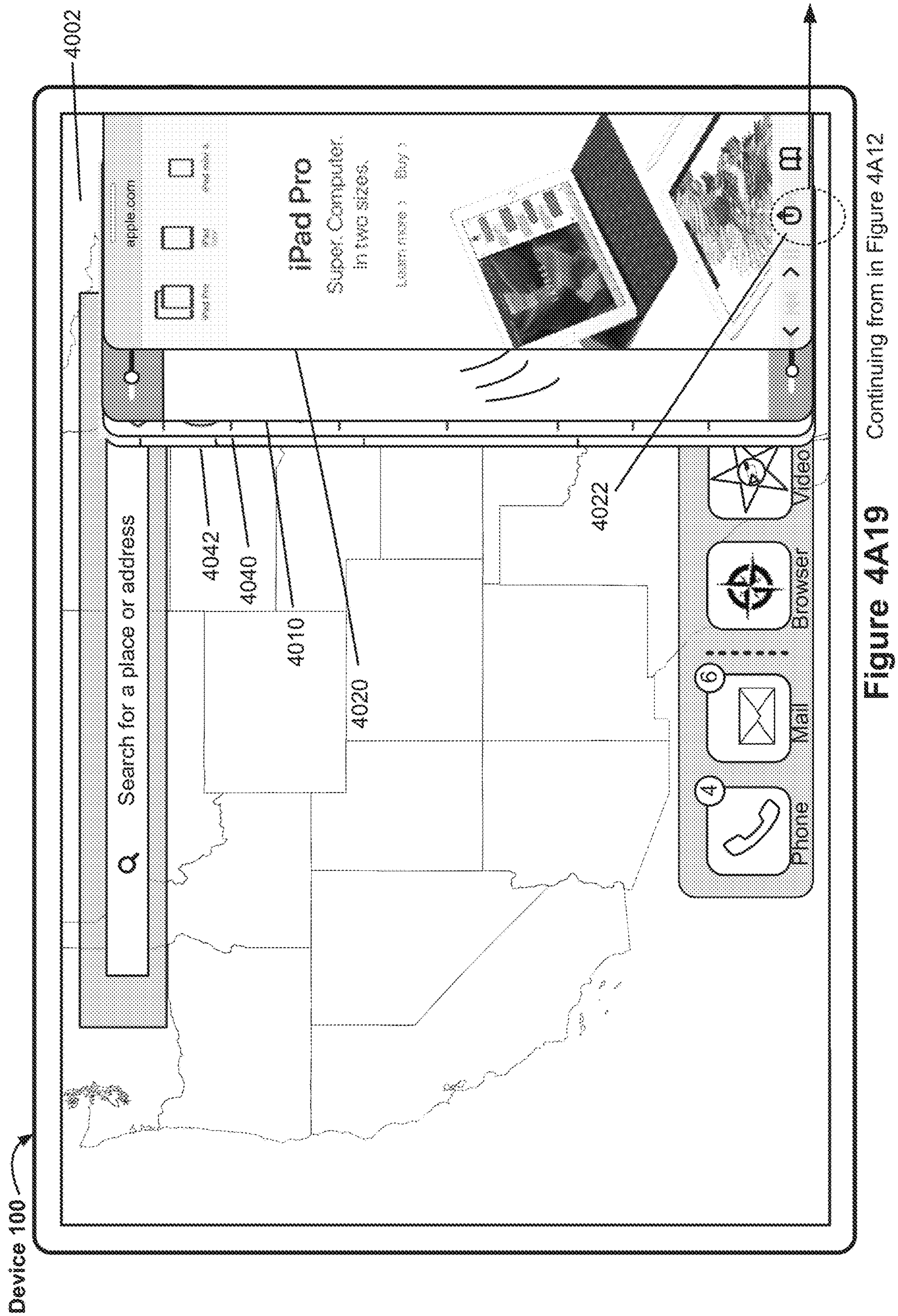
Continuing from in Figure 4A12
Figure 4A19

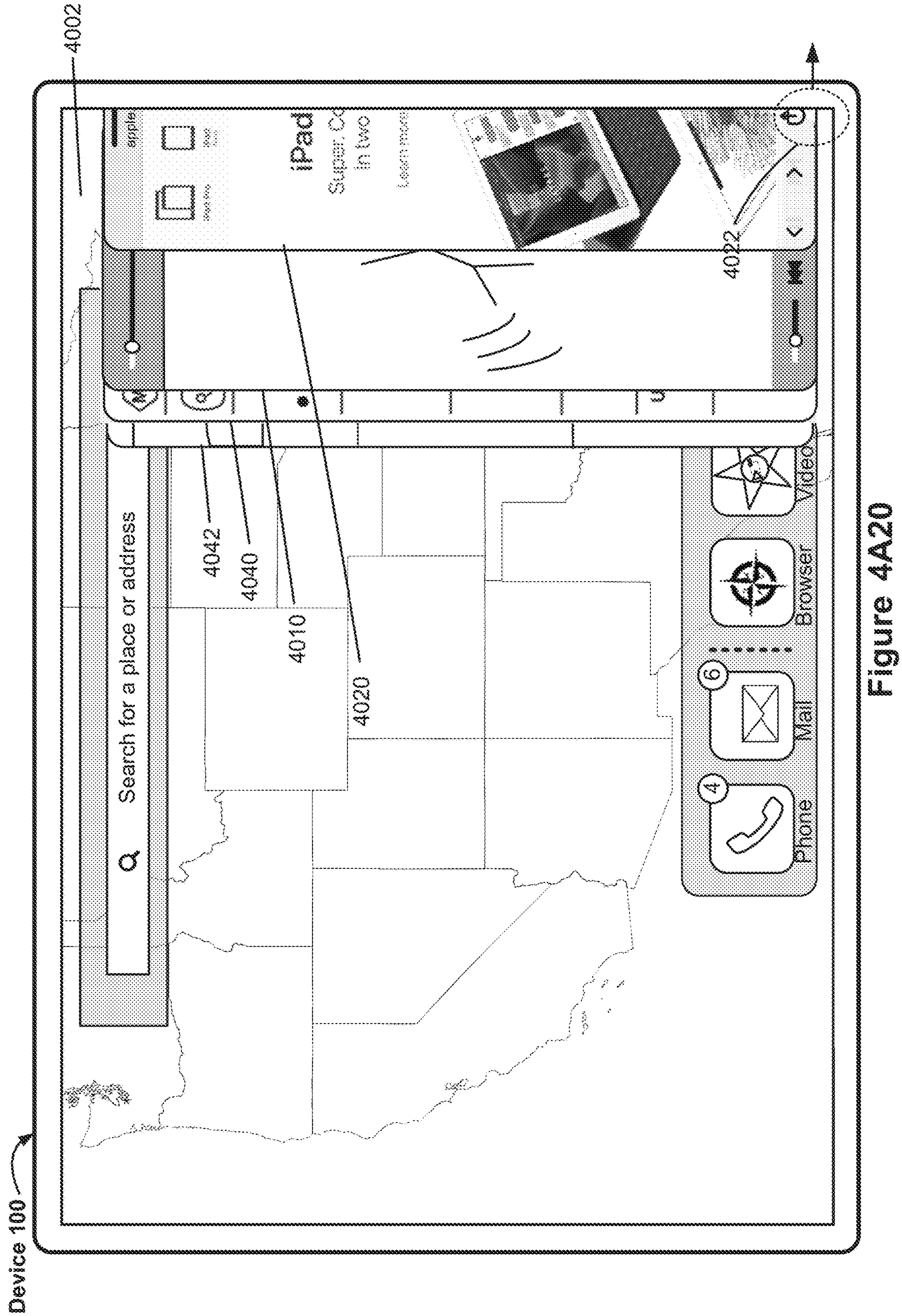
Figure 4A20

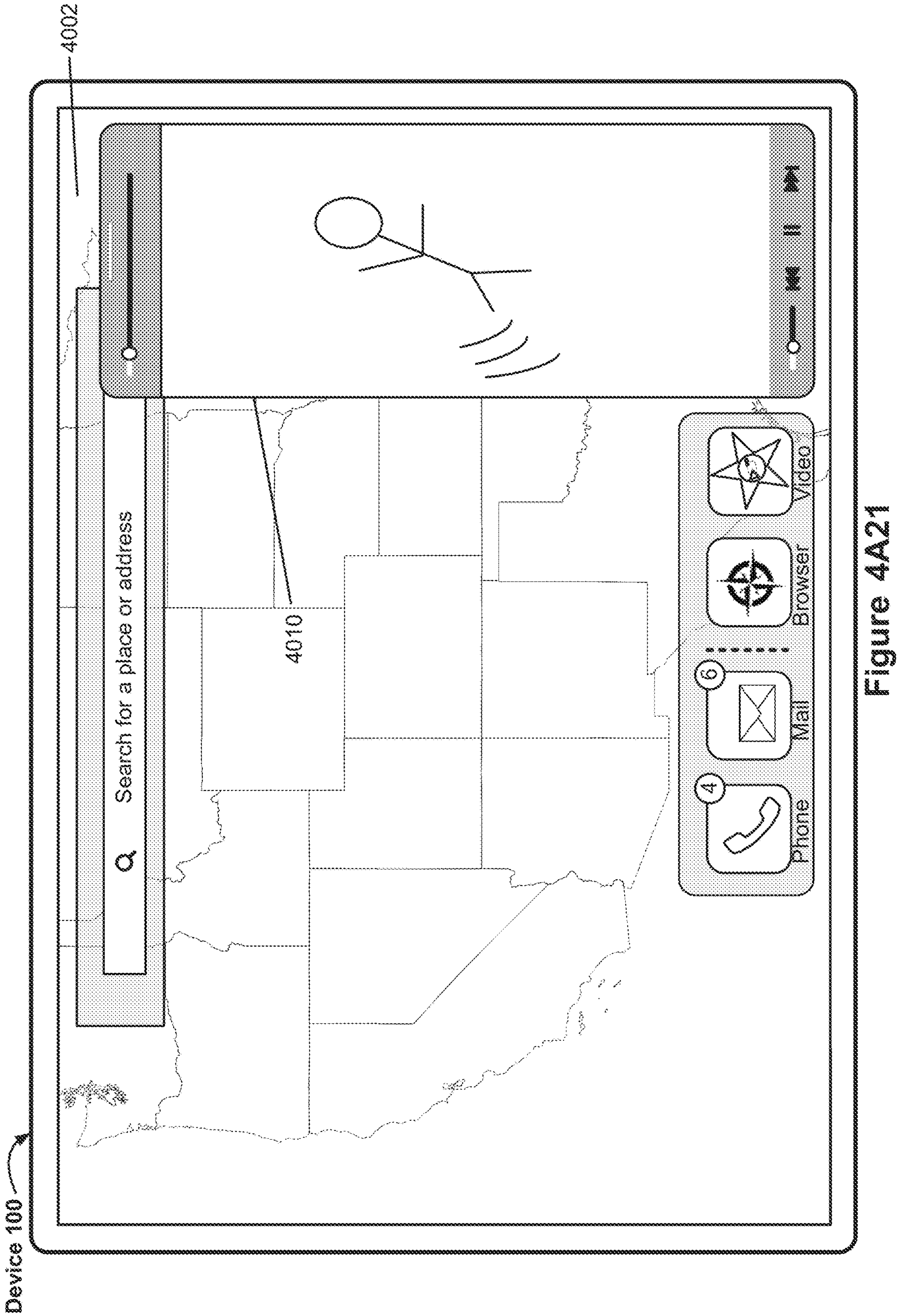
Figure 4A21

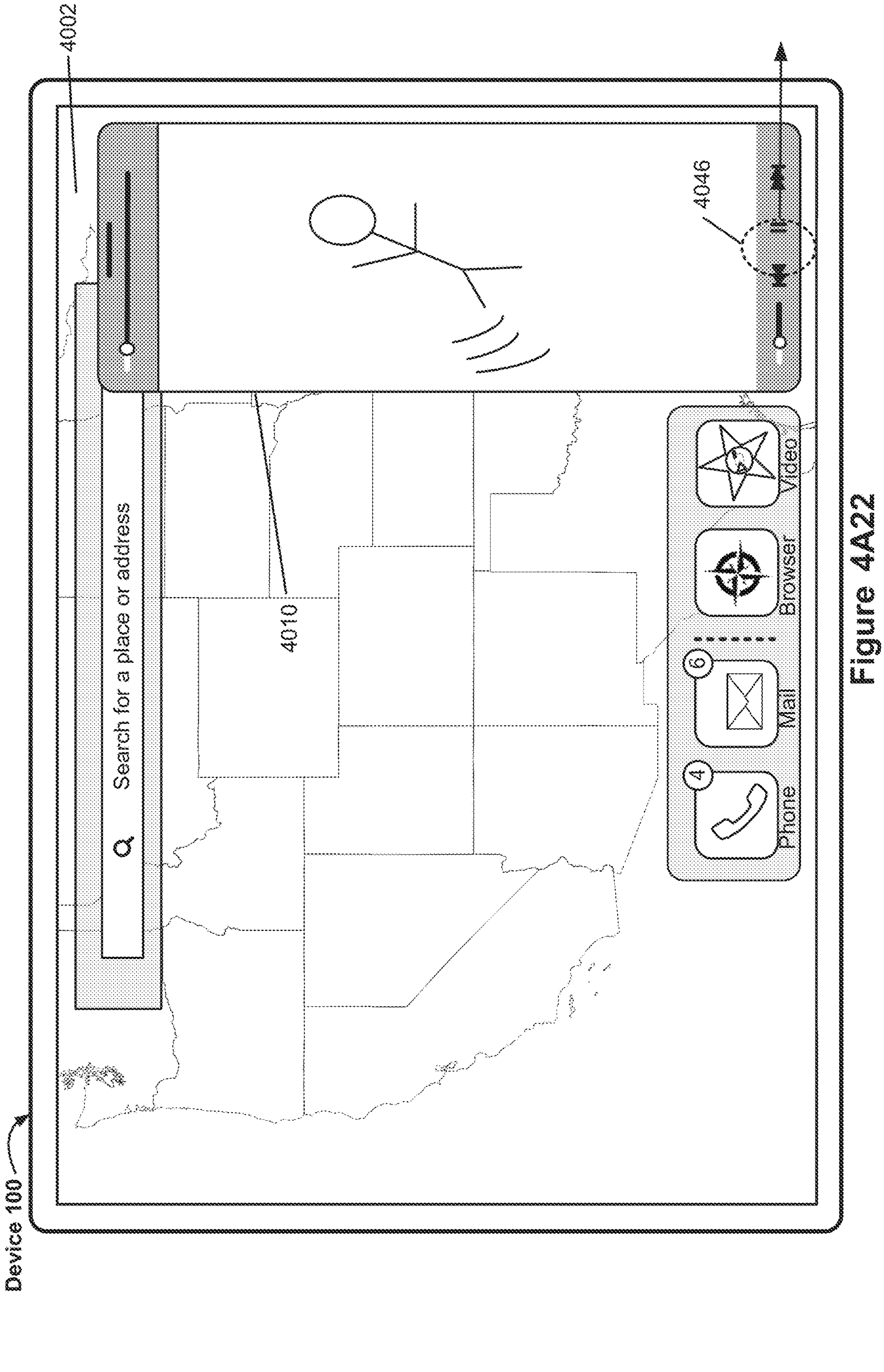
Figure 4A22

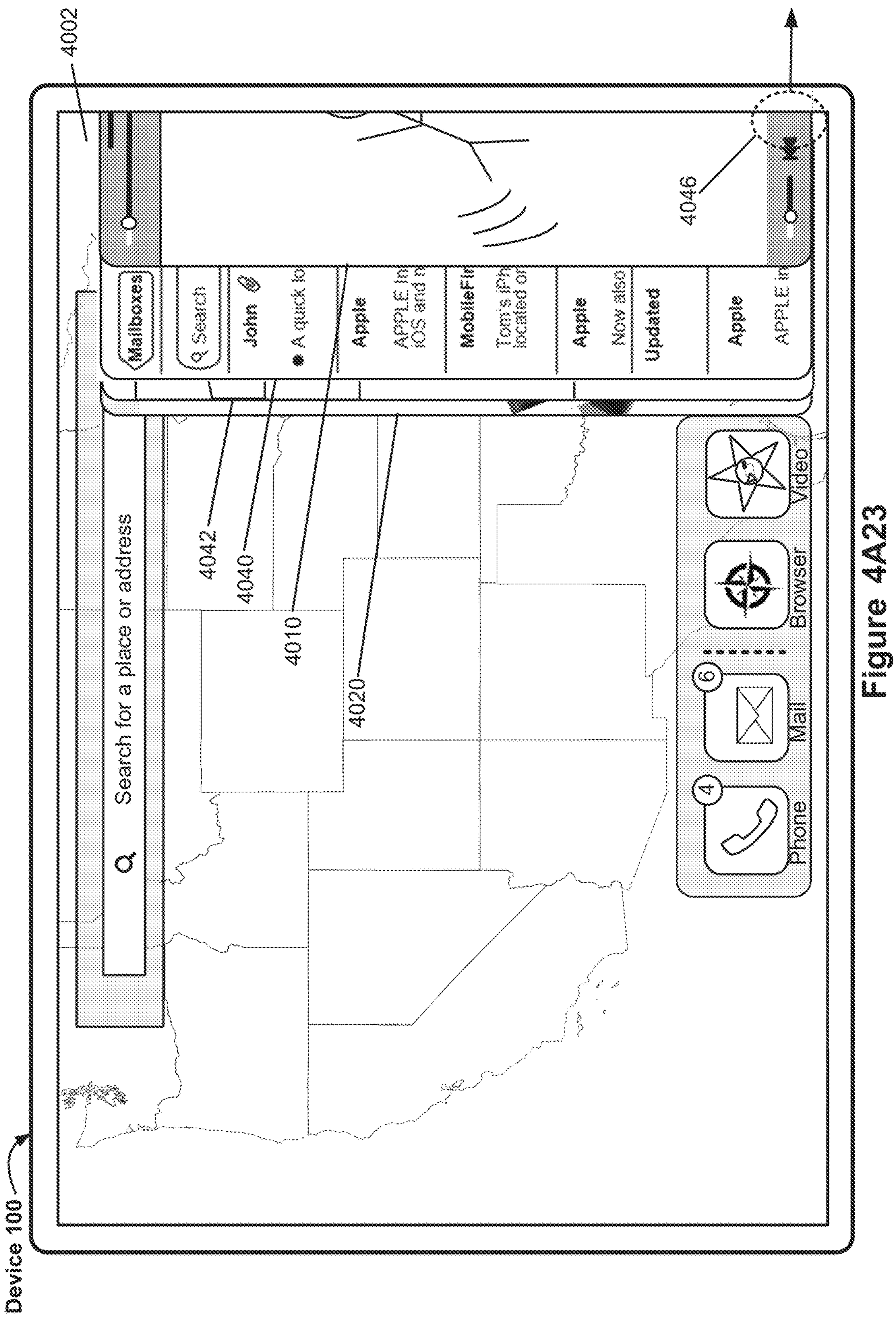
Figure 4A23

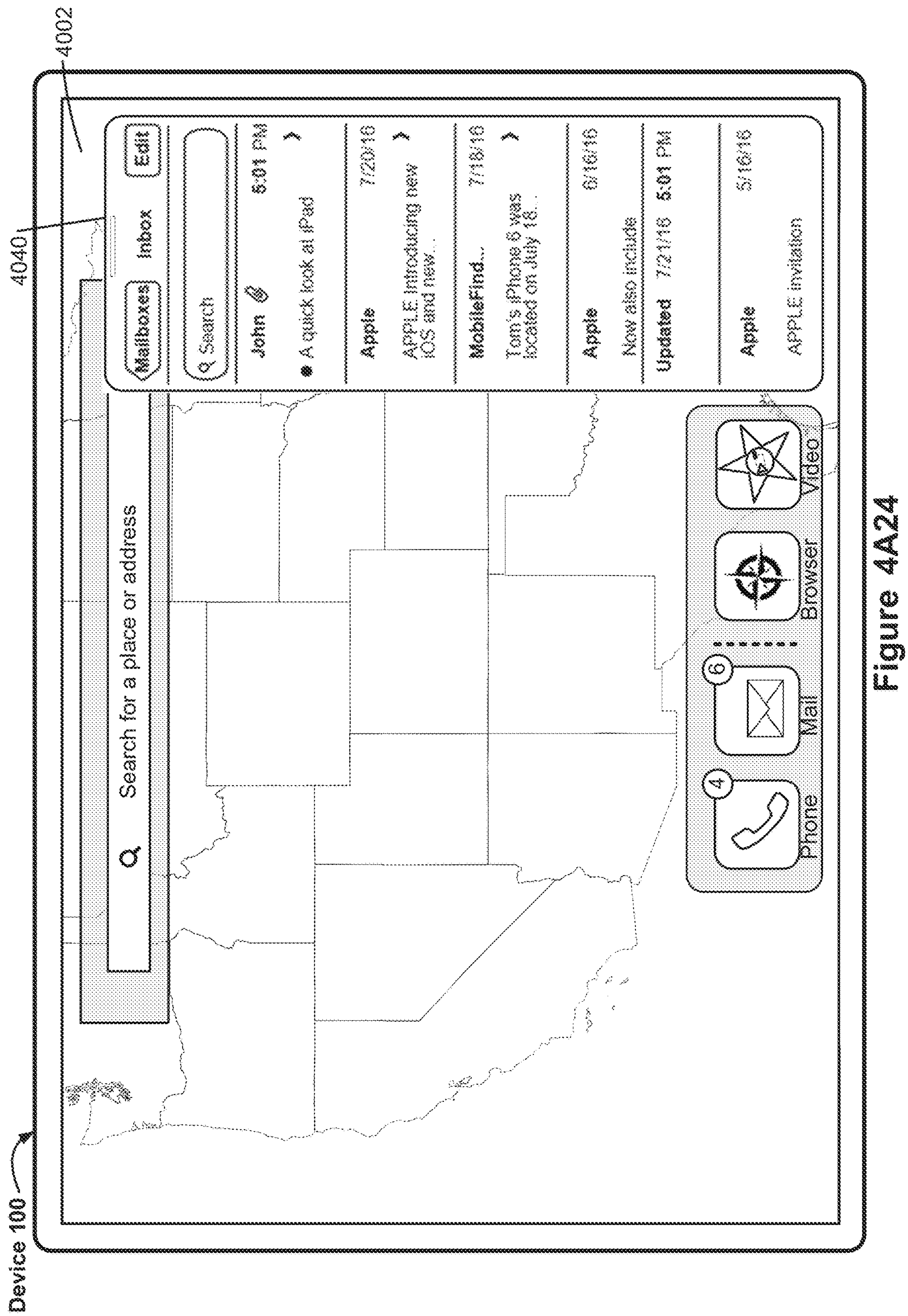
Figure 4A24

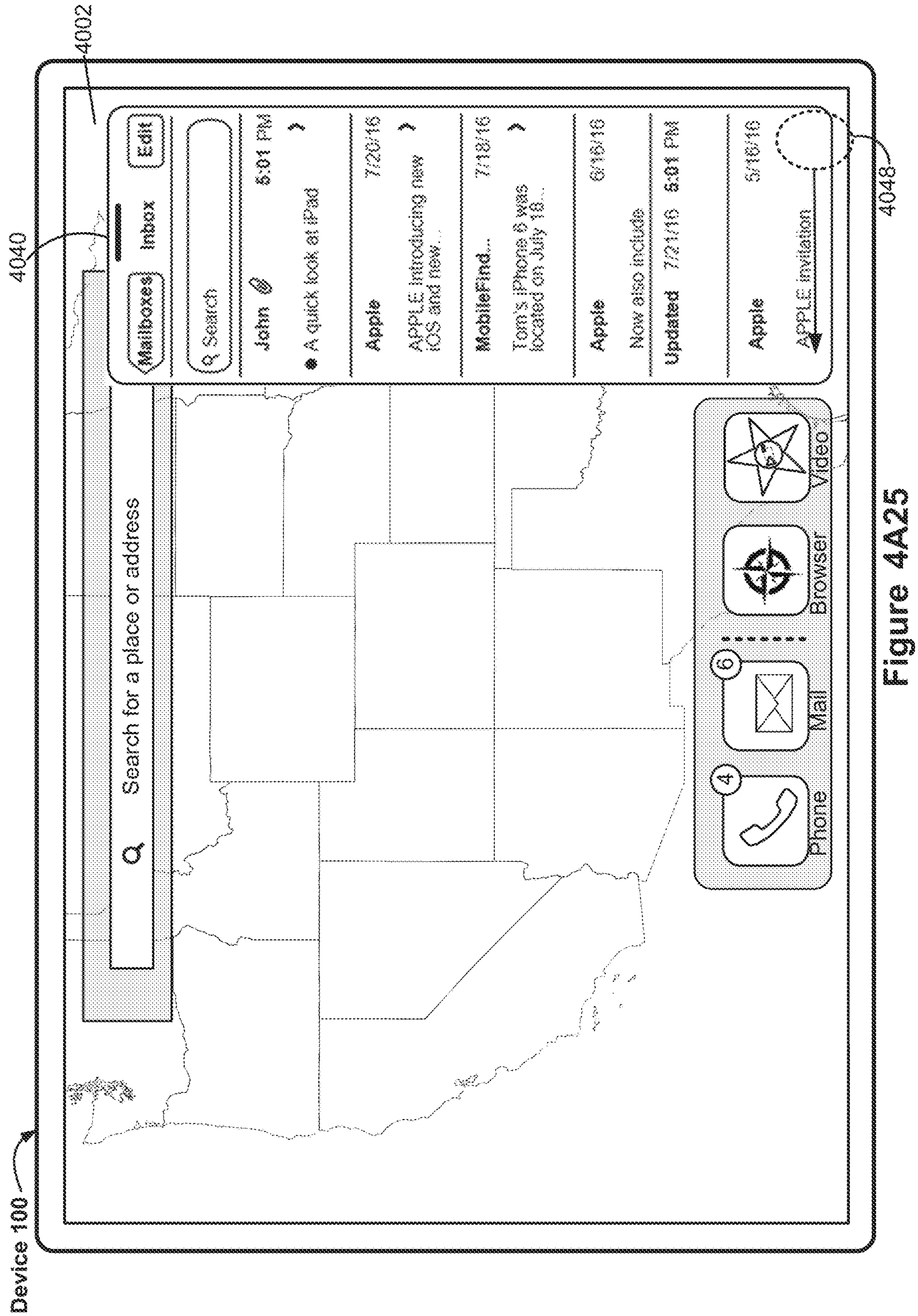
Figure 4A25

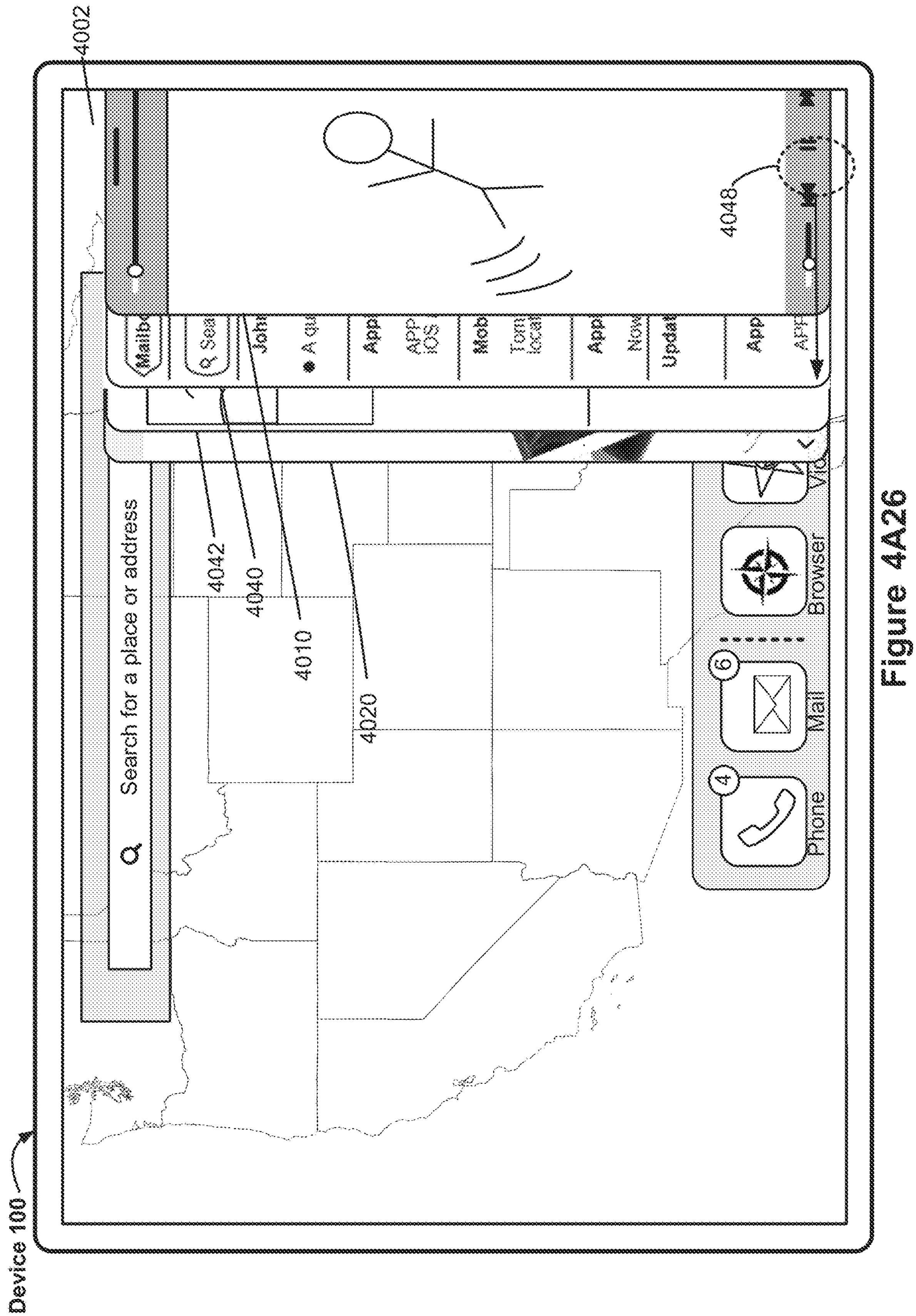
Figure 4A26

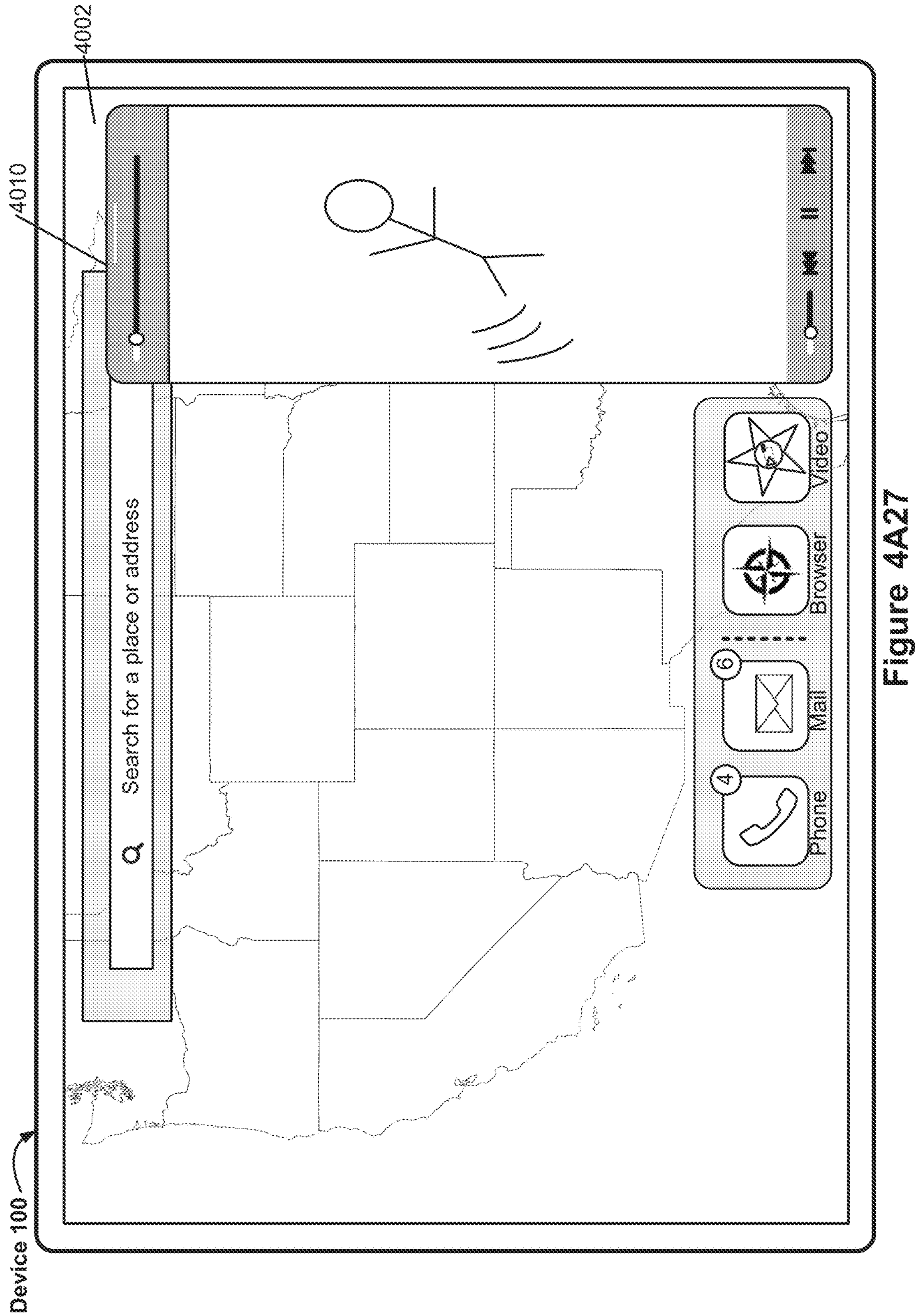
Figure 4A27

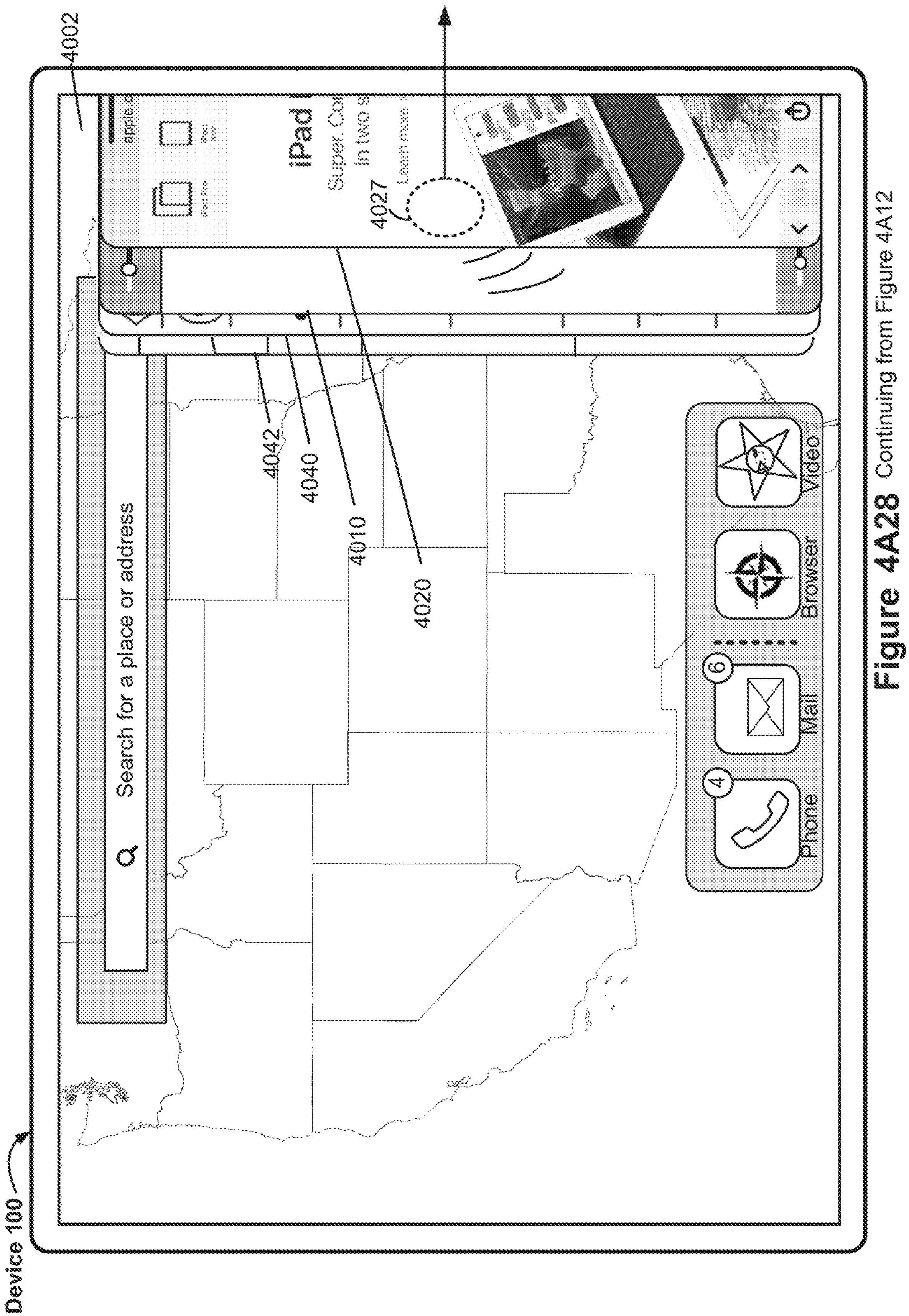
Figure 4A28 Continuing from Figure 4A12

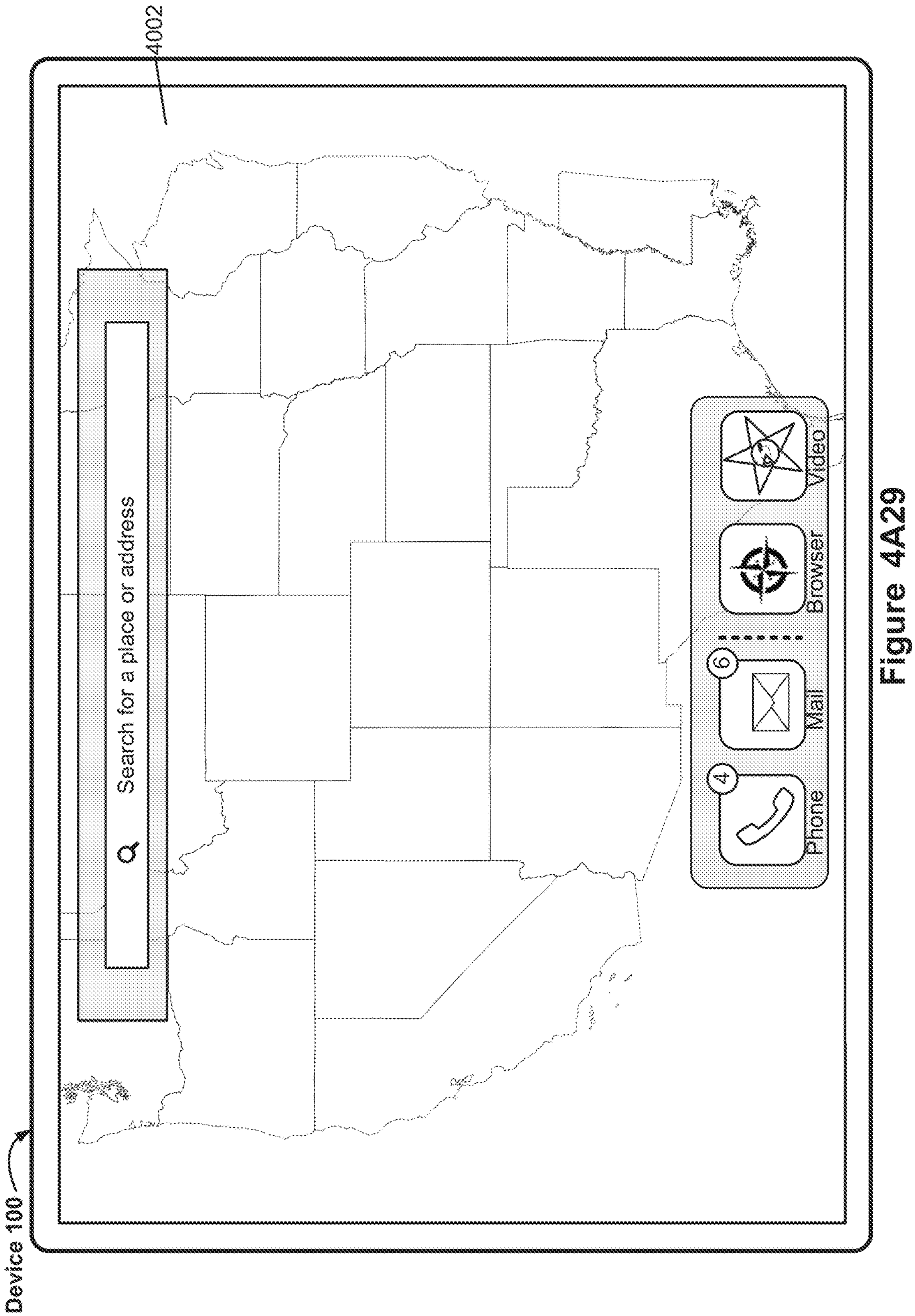
Figure 4A29

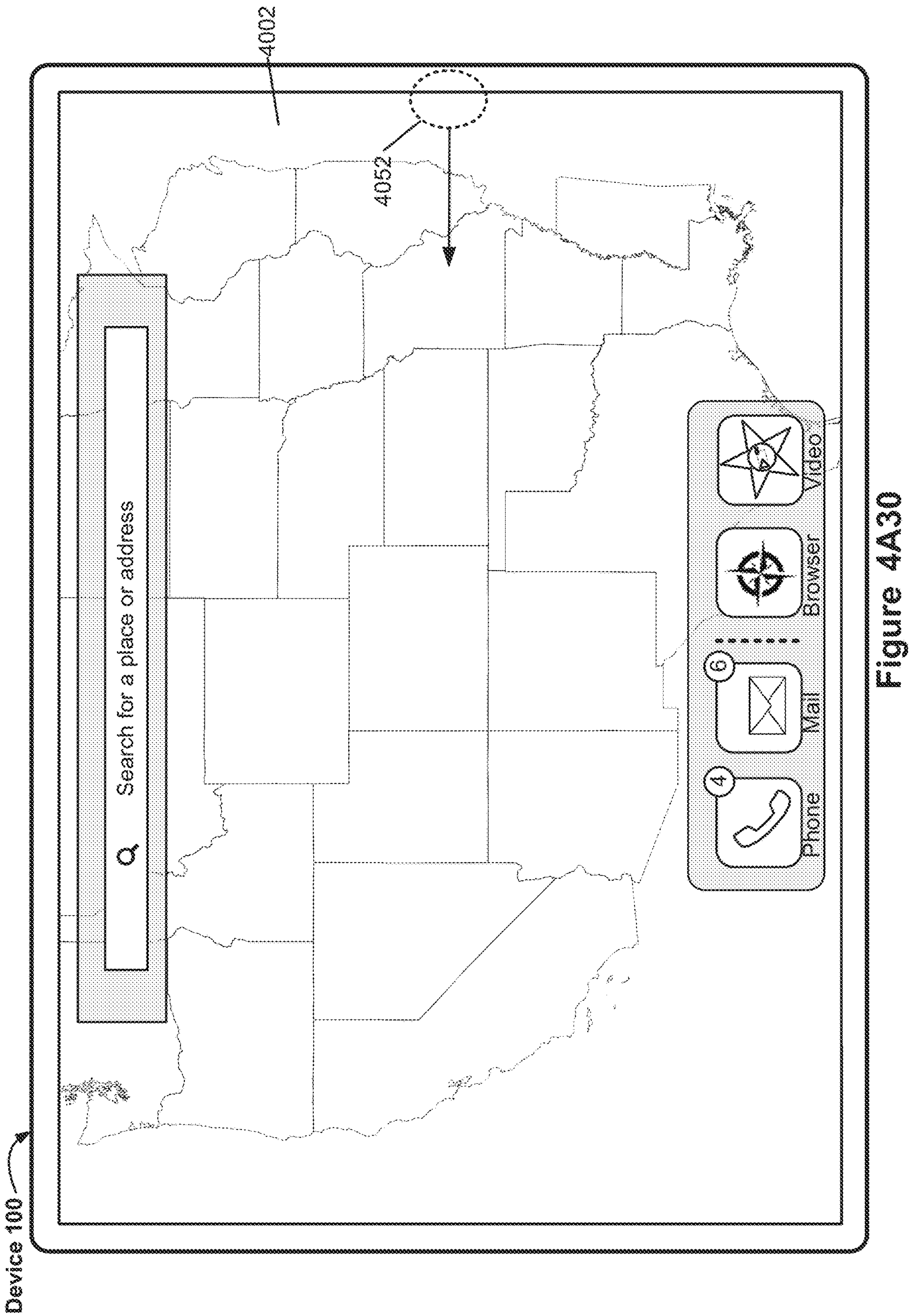
Figure 4A30

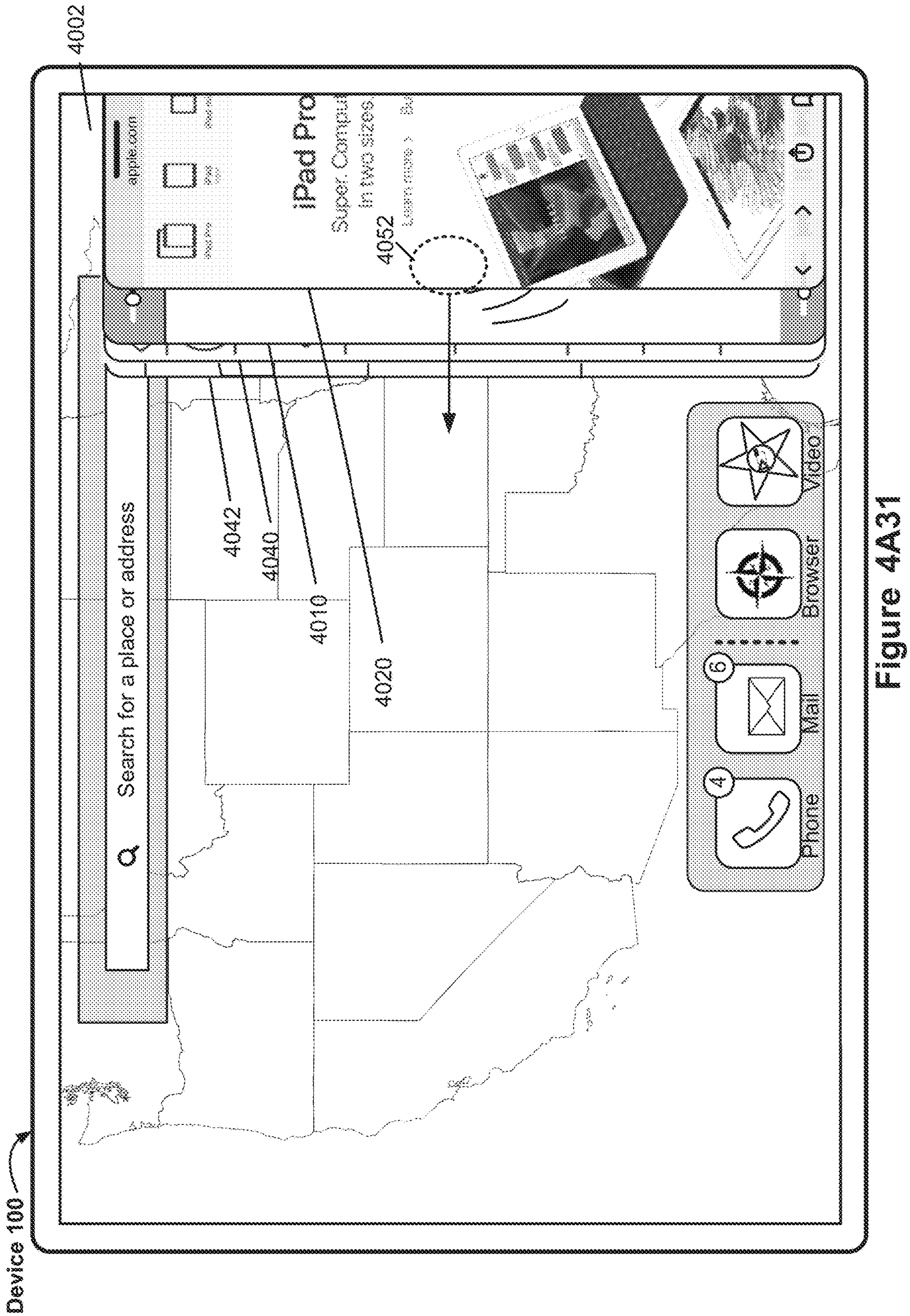
Figure 4A31

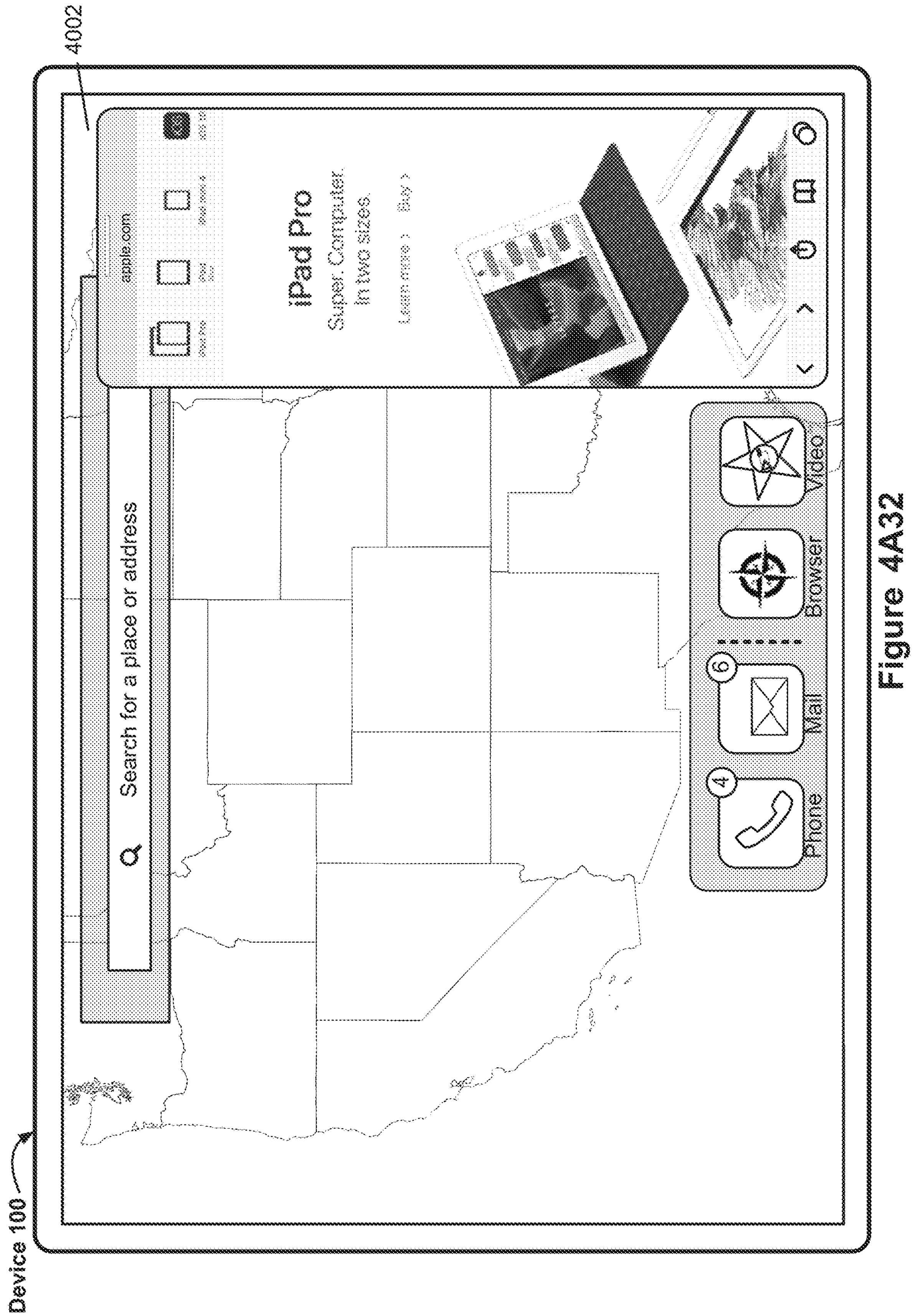
Figure 4A32

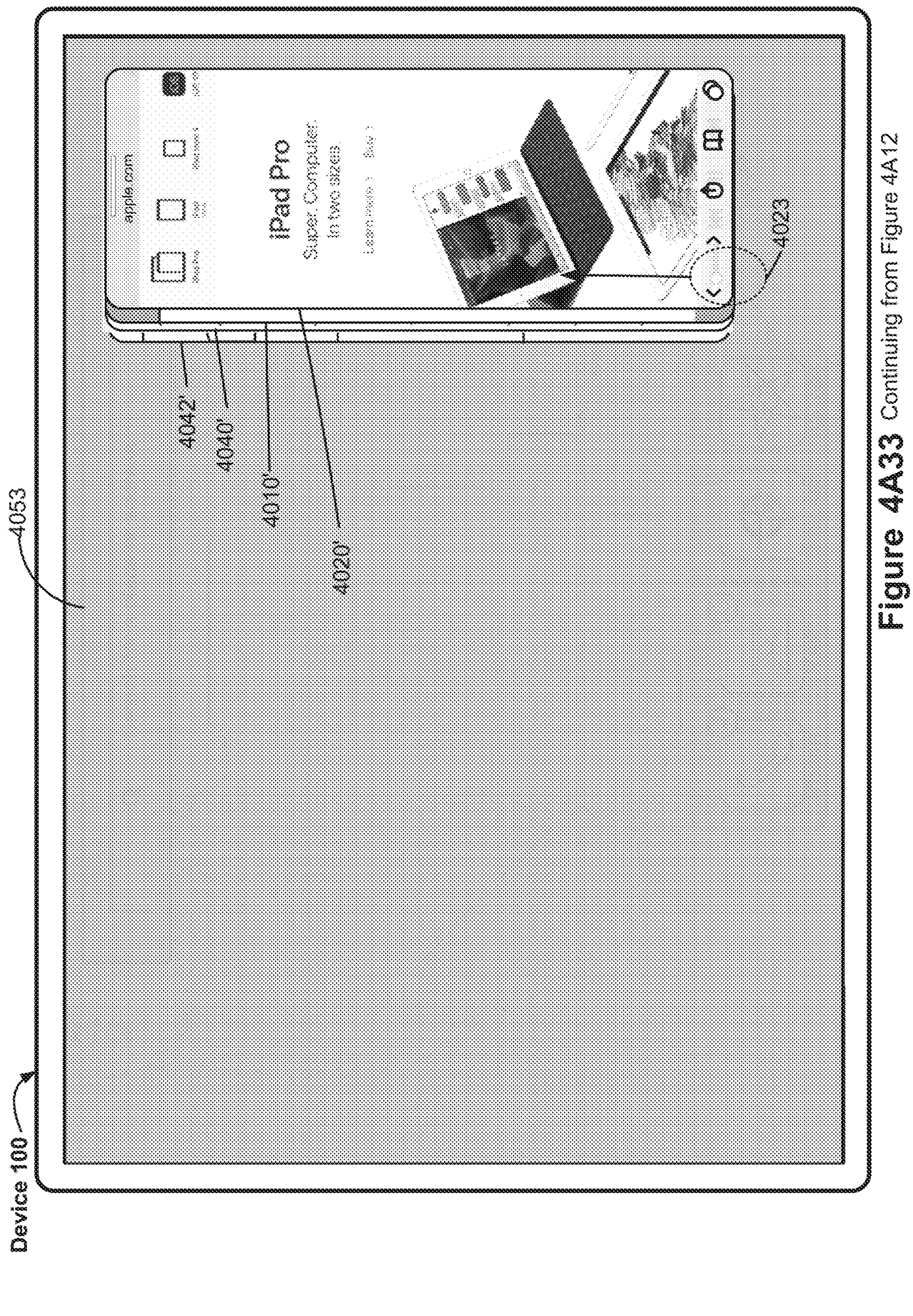
Figure 4A33 Continuing from Figure 4A12

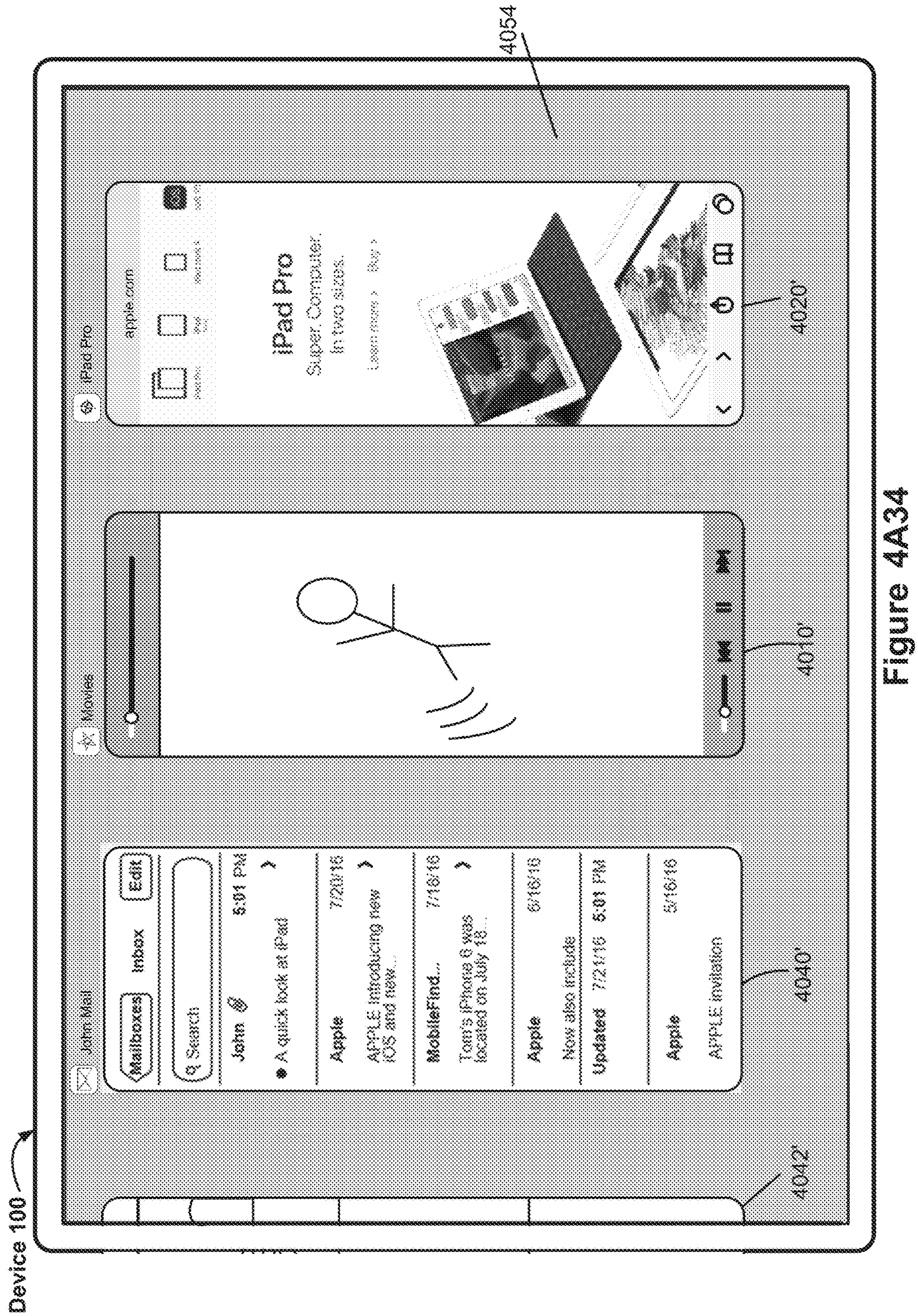
Figure 4A34

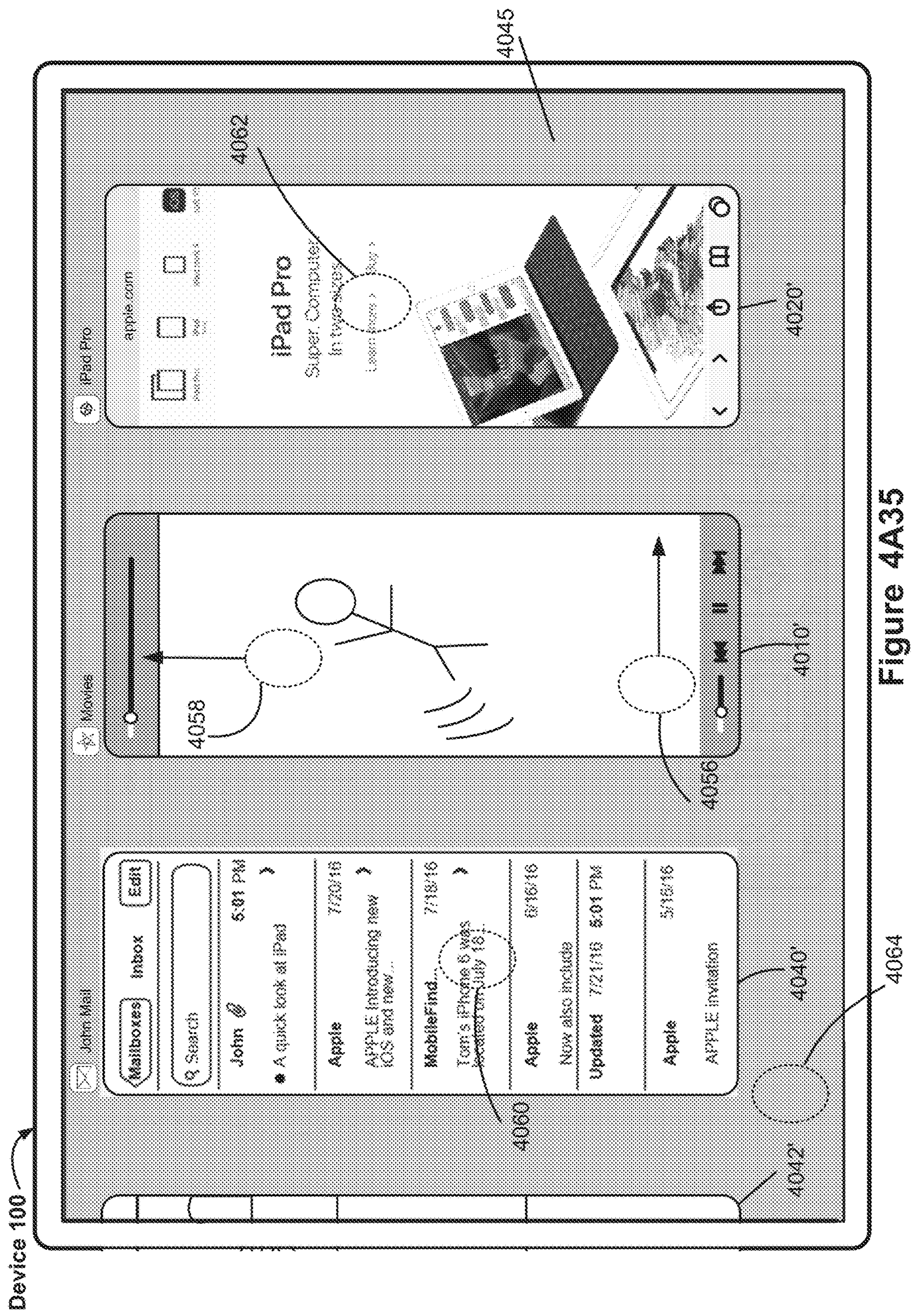
Figure 4A35

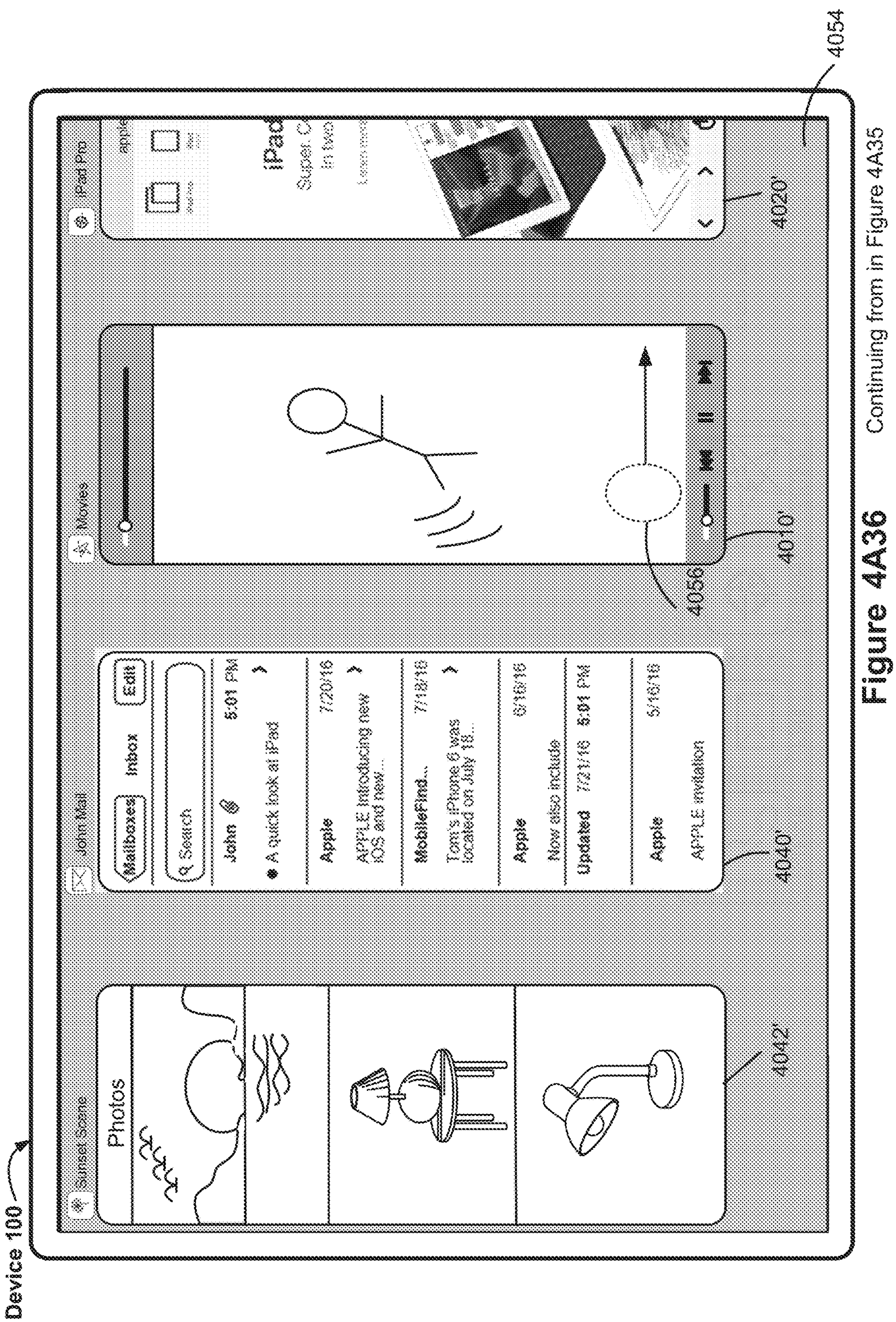
Continuing from in Figure 4A35
Figure 4A36

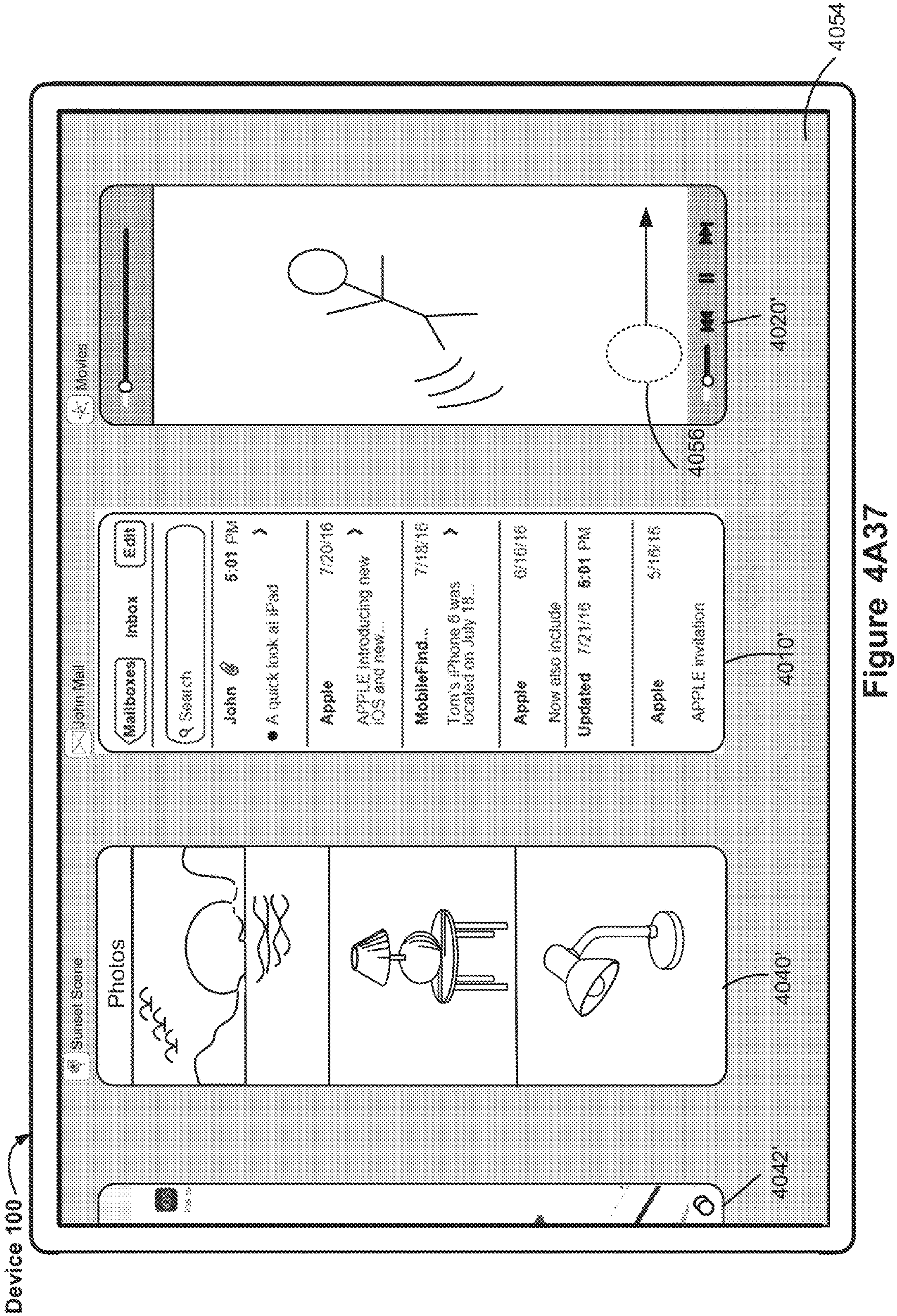
Figure 4A37

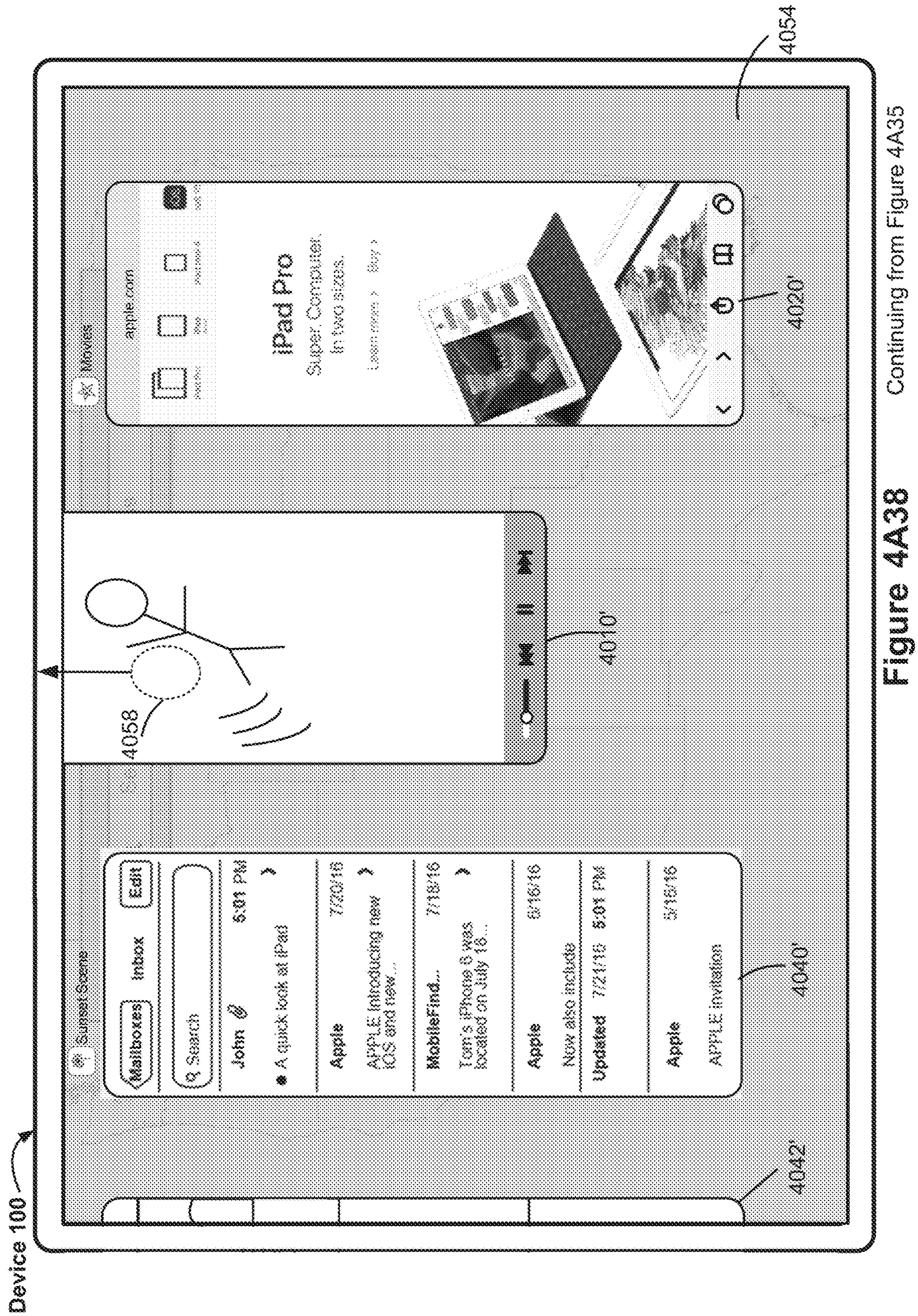
Figure 4A38
Continuing from Figure 4A35

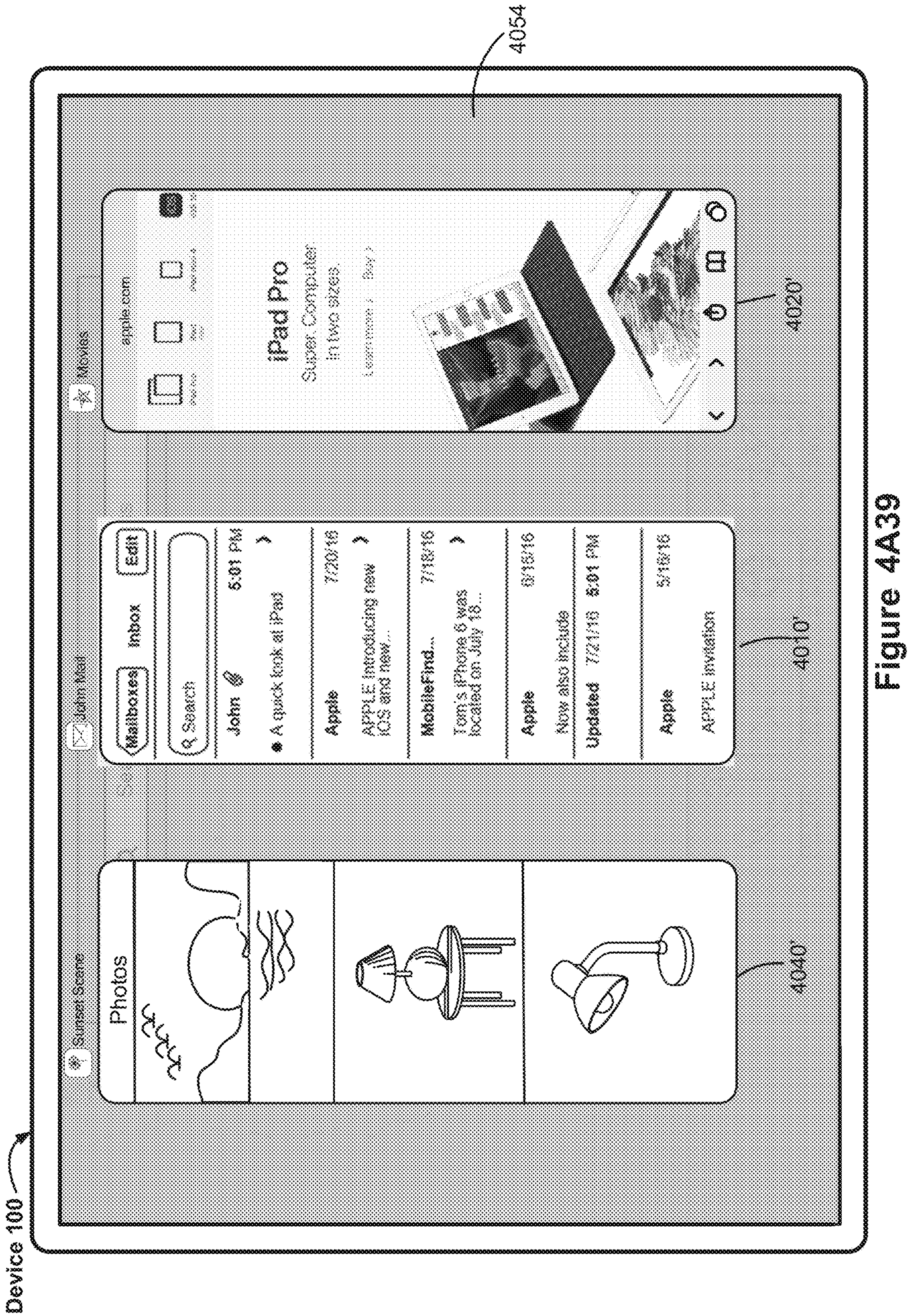
Figure 4A39

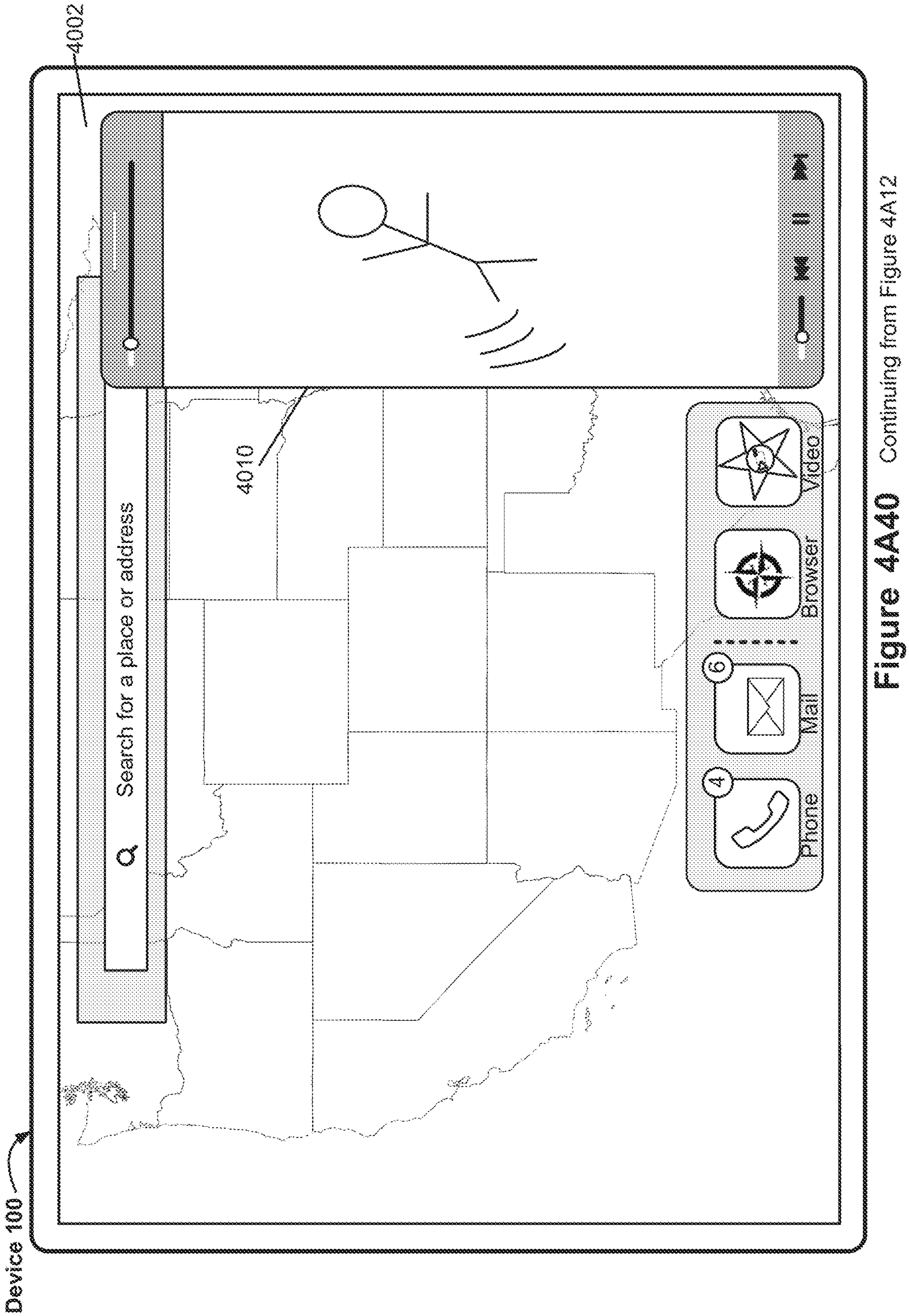
Figure 4A40
Continuing from Figure 4A12

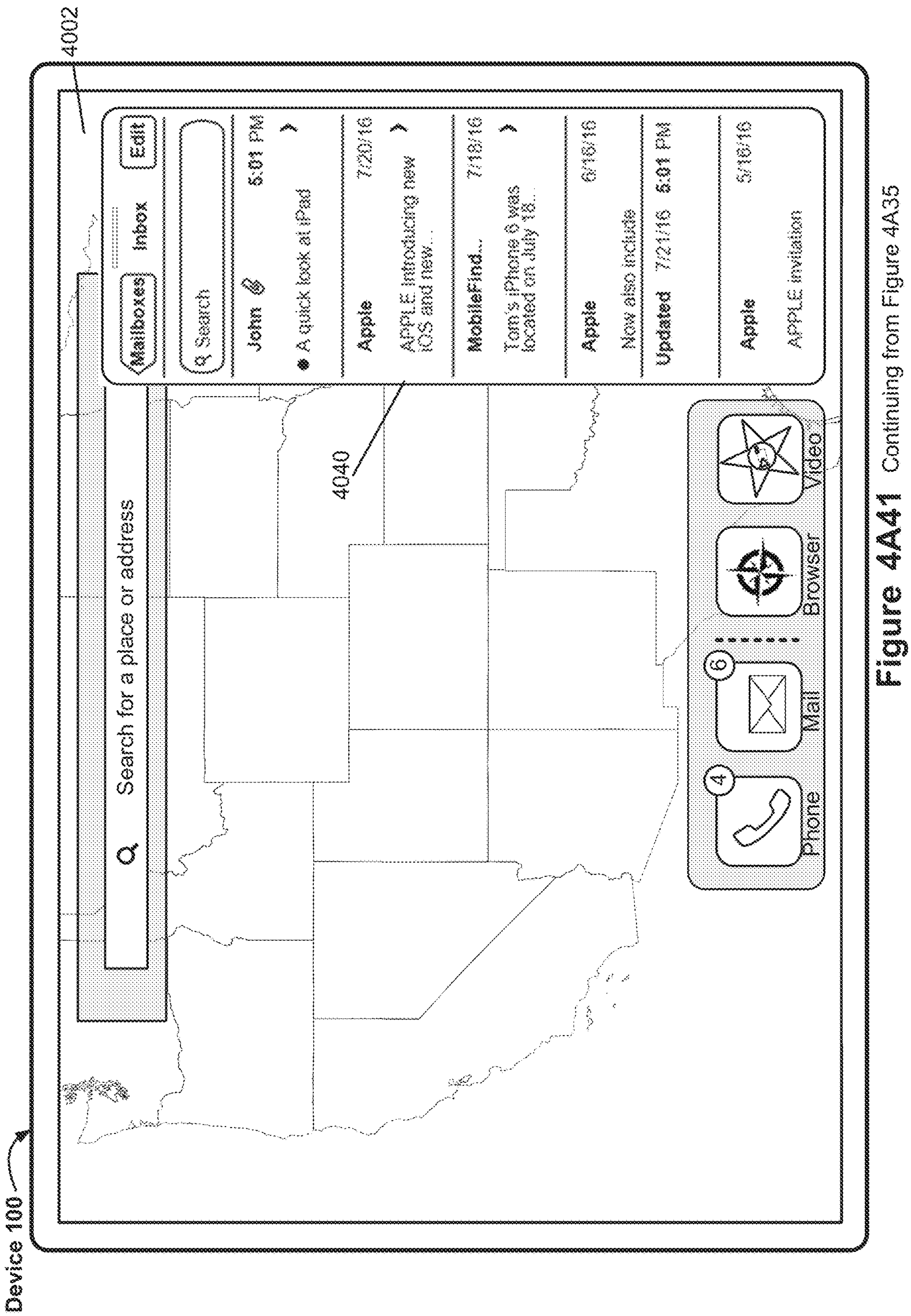
Figure 4A41 Continuing from Figure 4A35

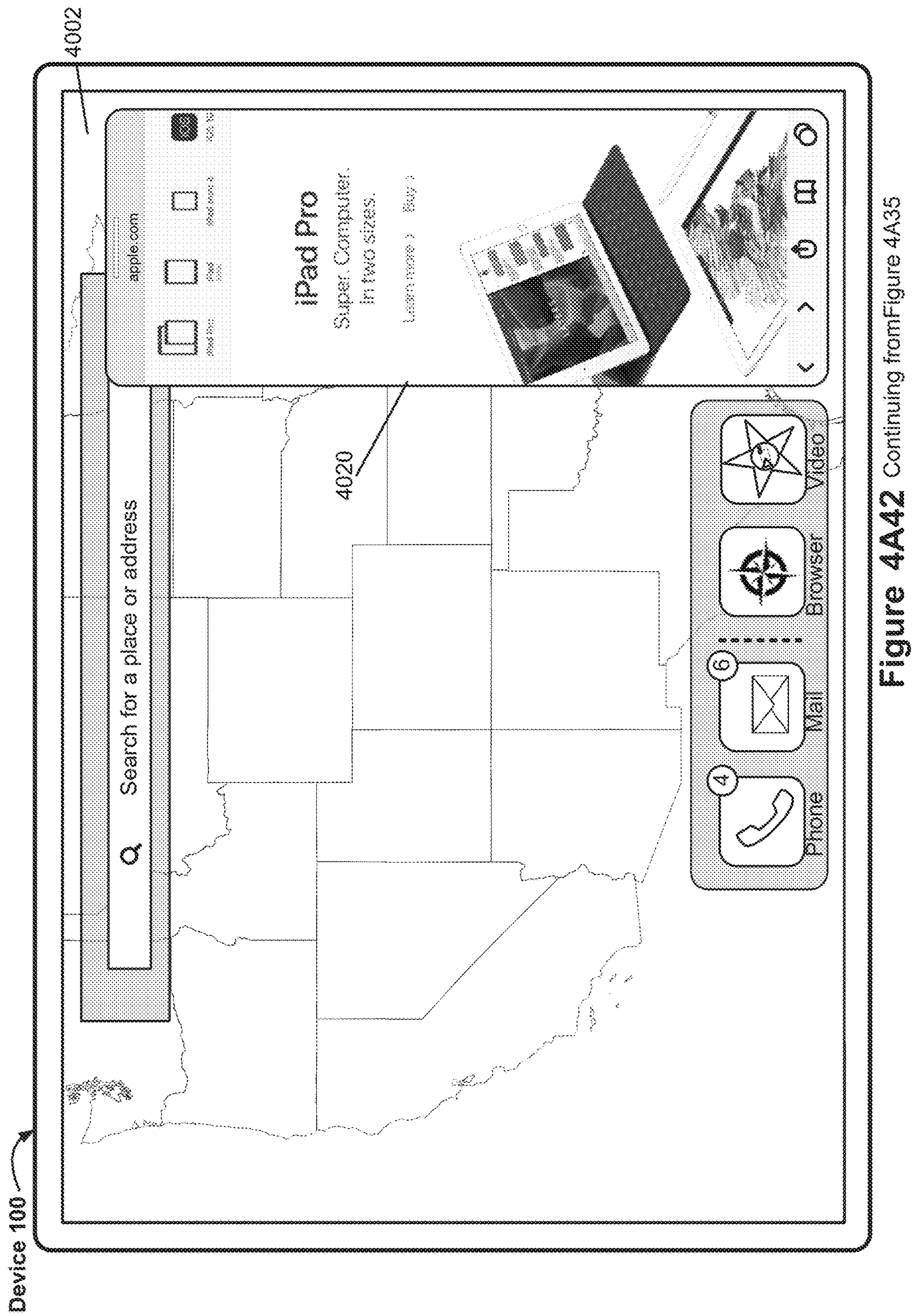
Figure 4A42 Continuing fromFigure 4A35

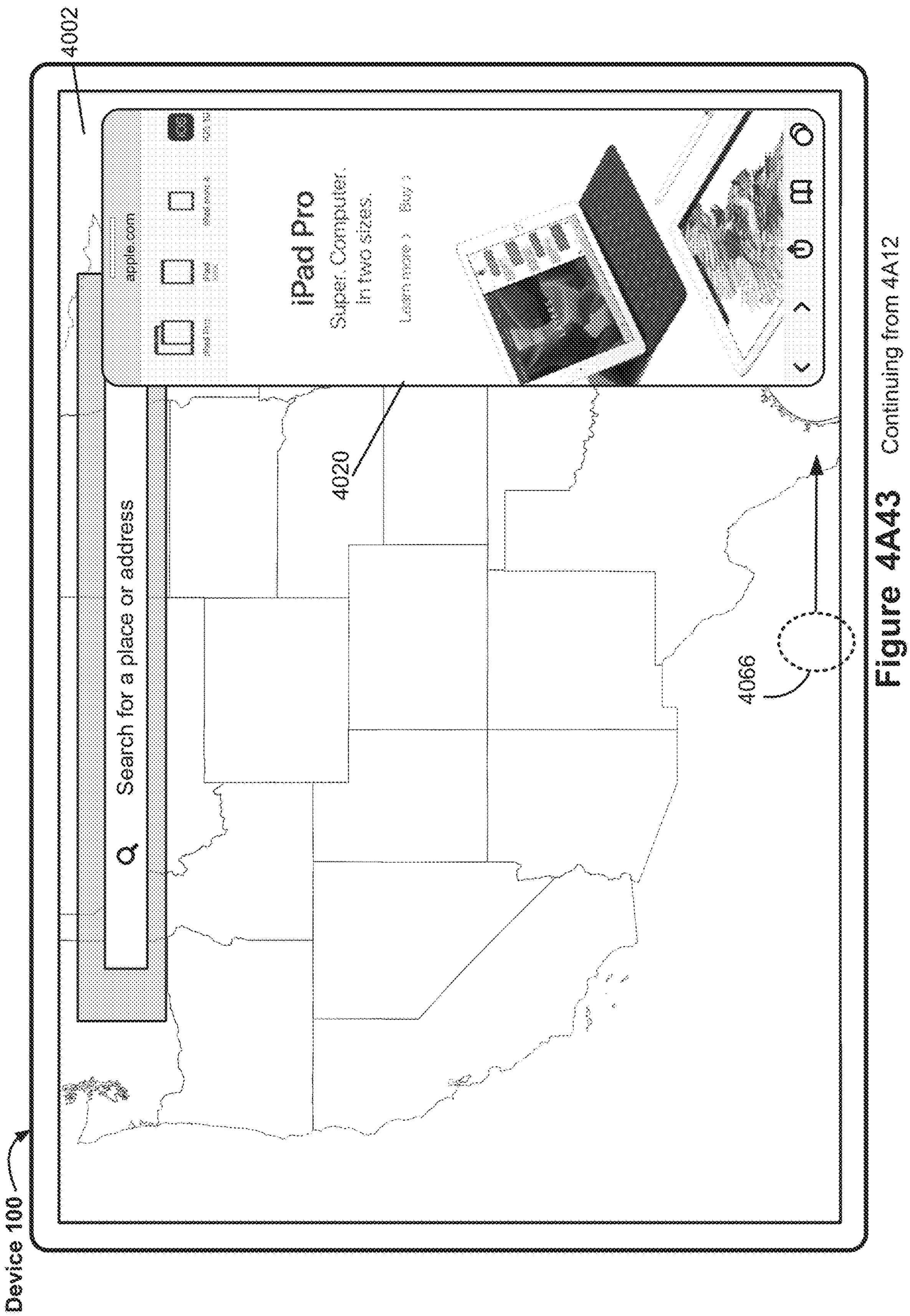
Figure 4A43 Continuing from 4A12

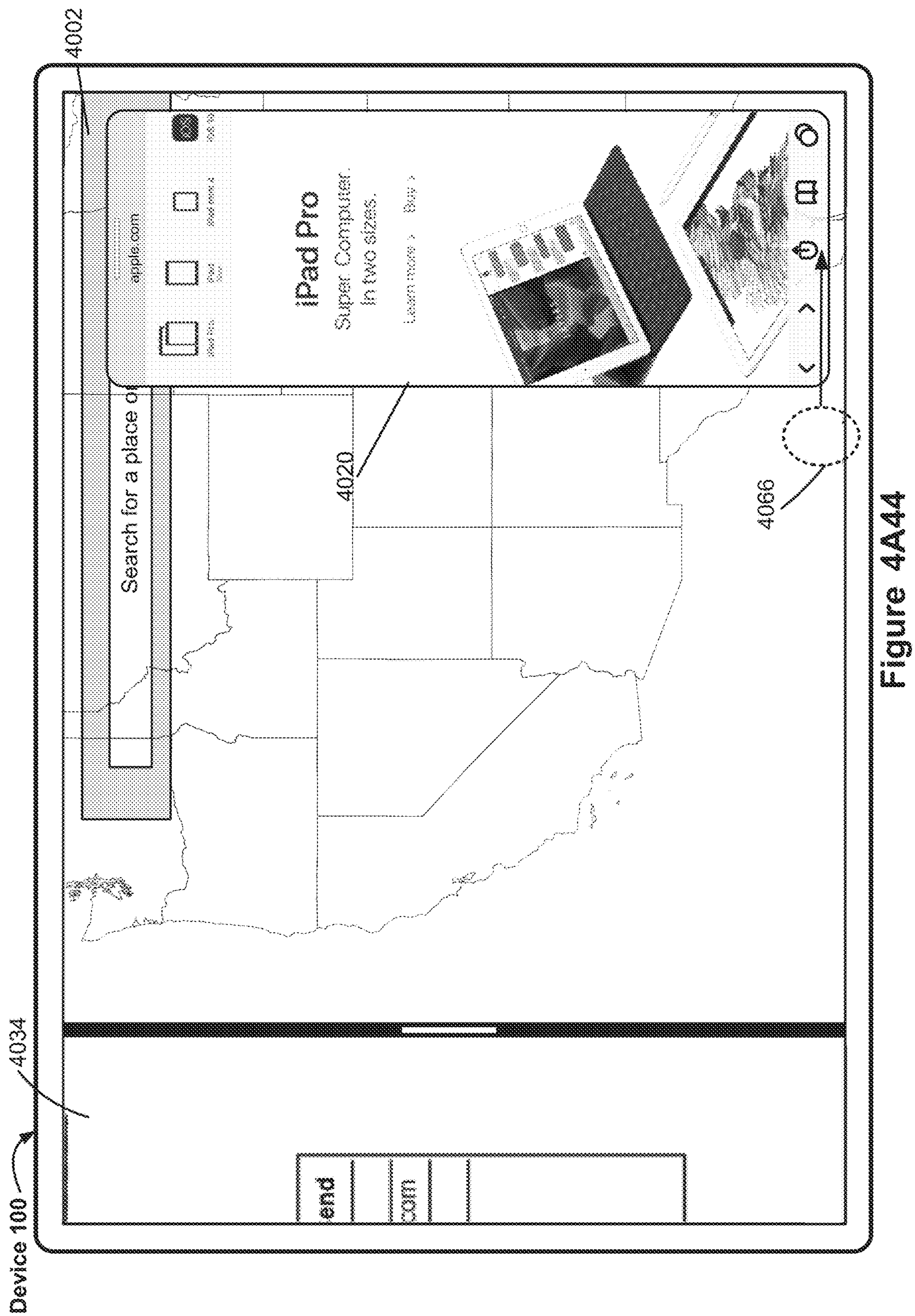
Figure 4A44

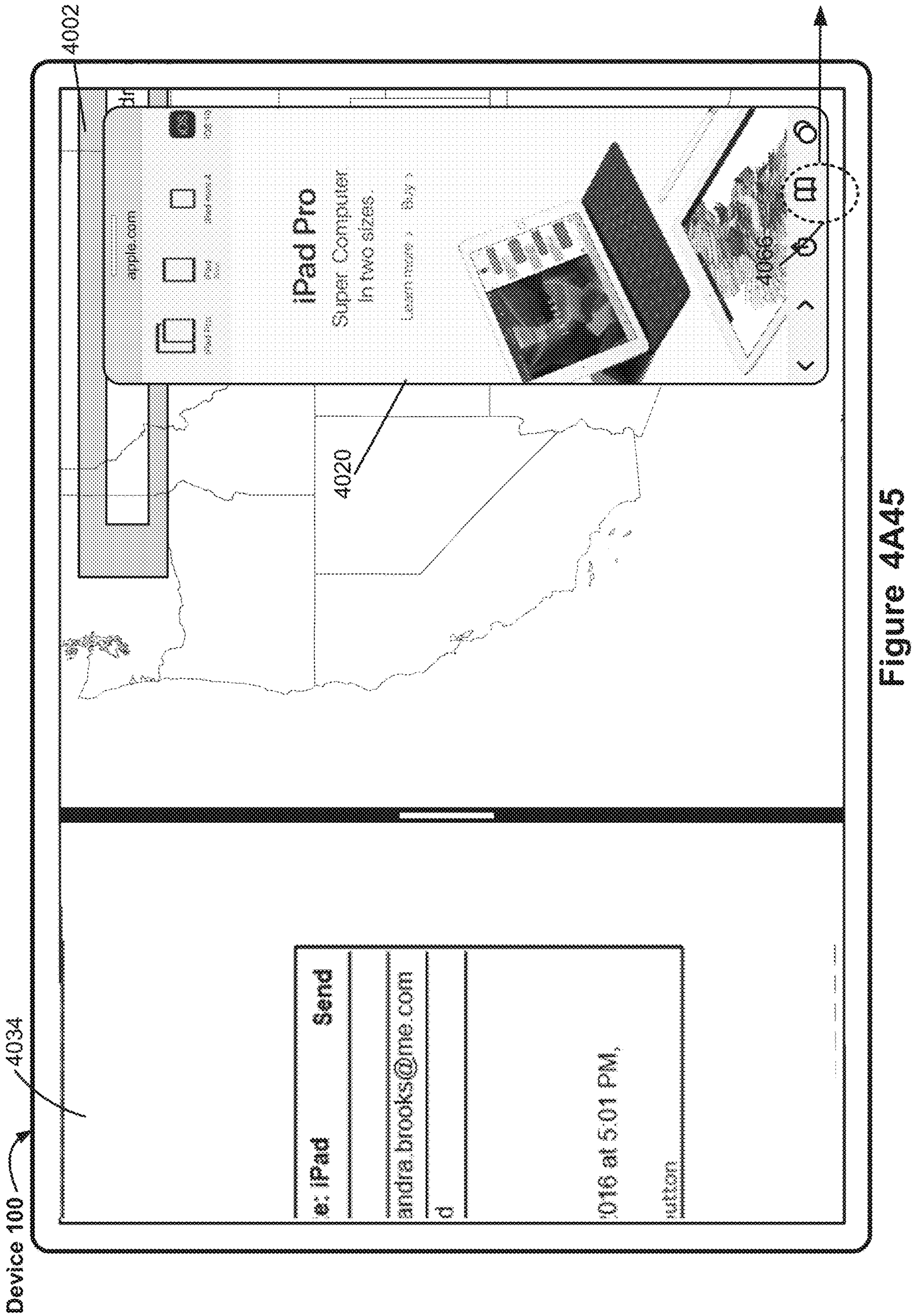
Figure 4A45

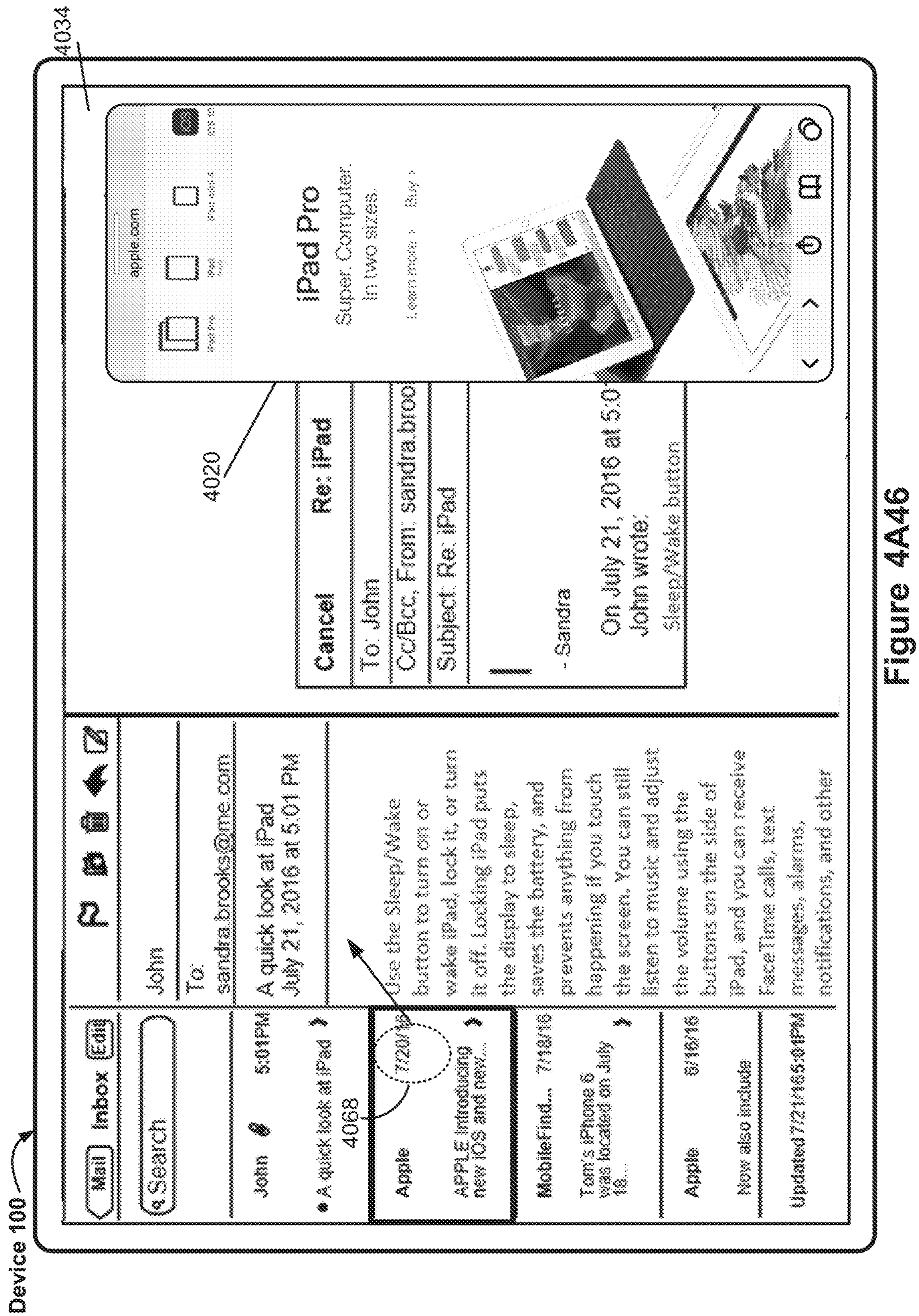
Figure 4A46

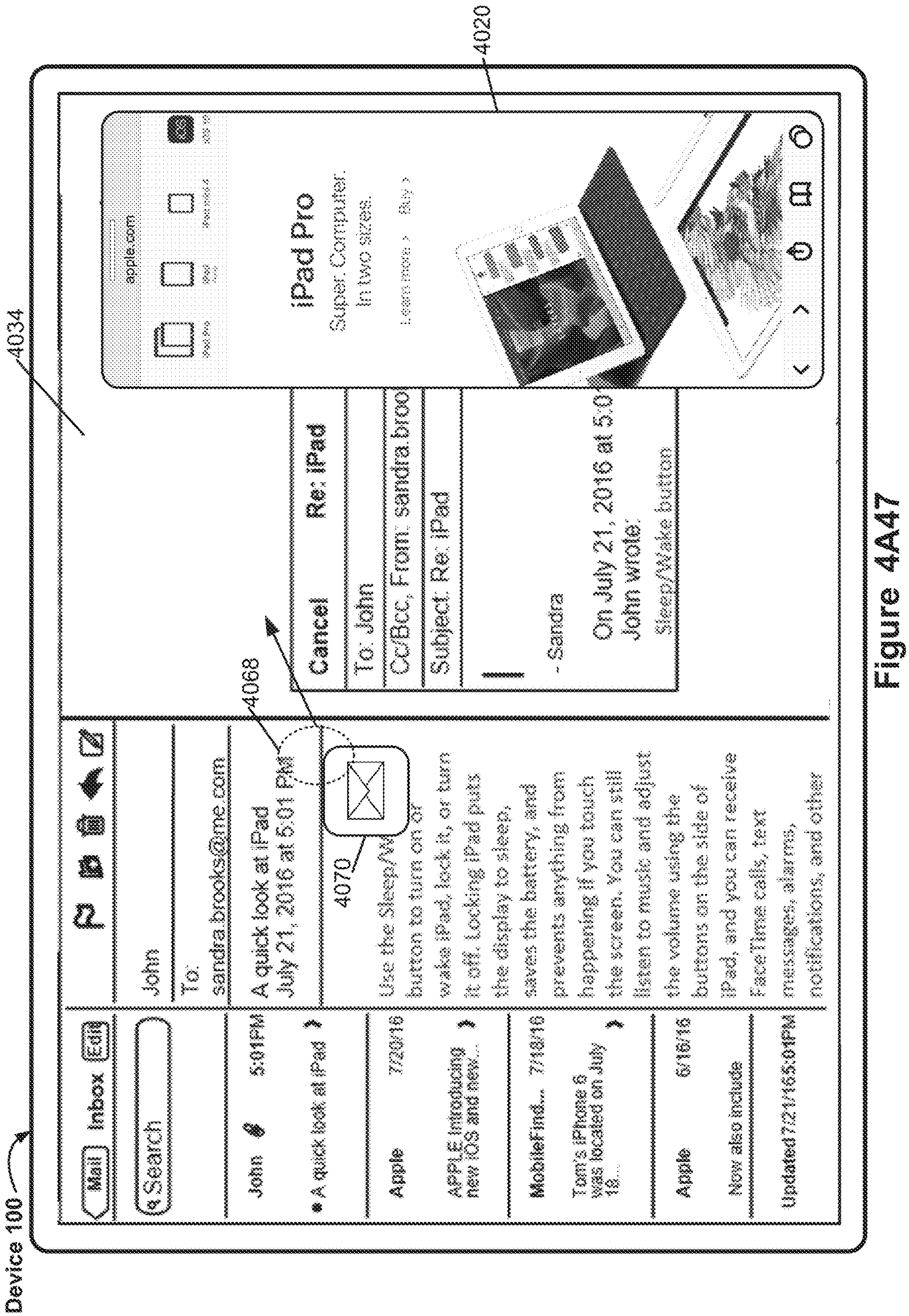
Figure 4A47

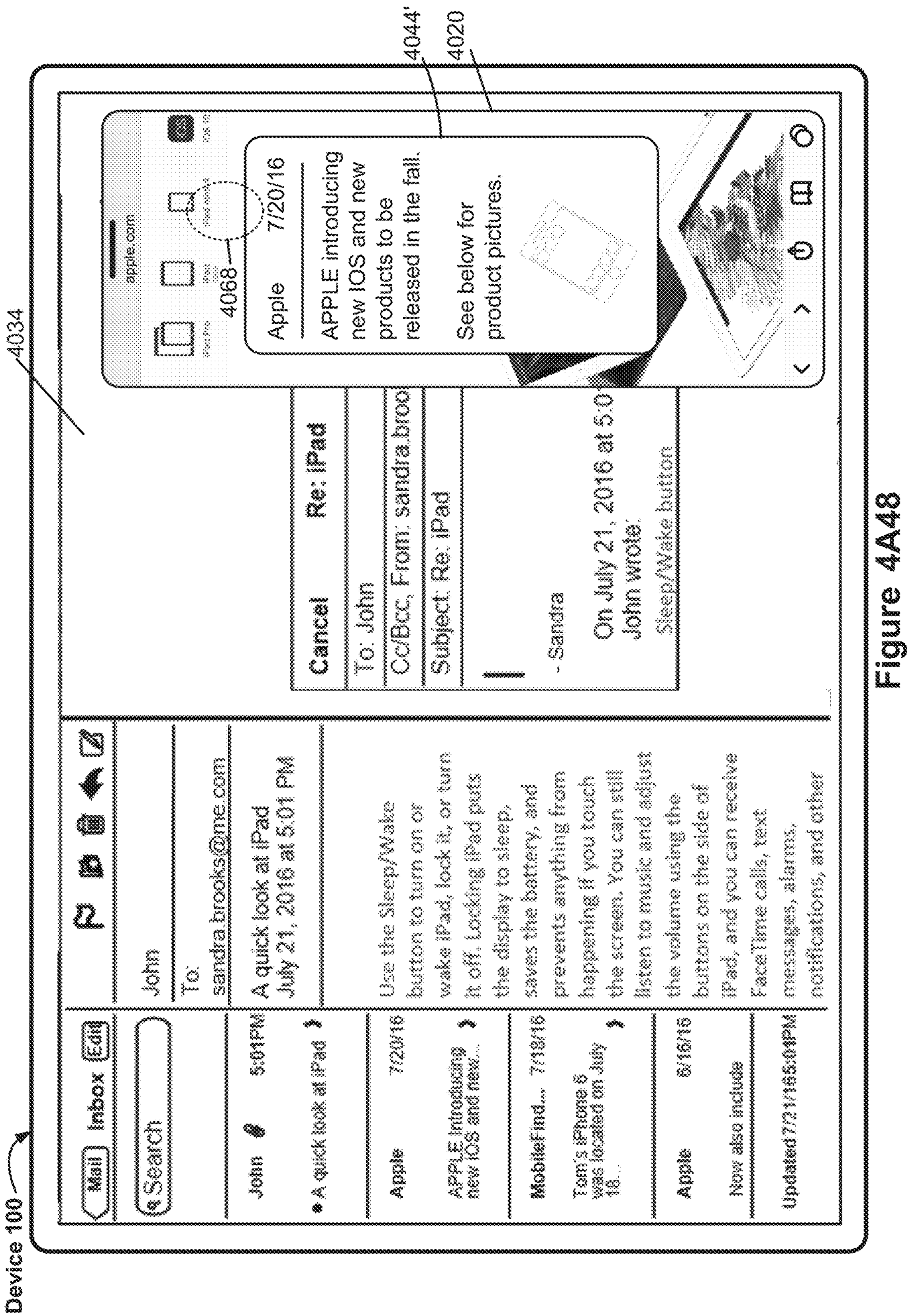
Figure 4A48

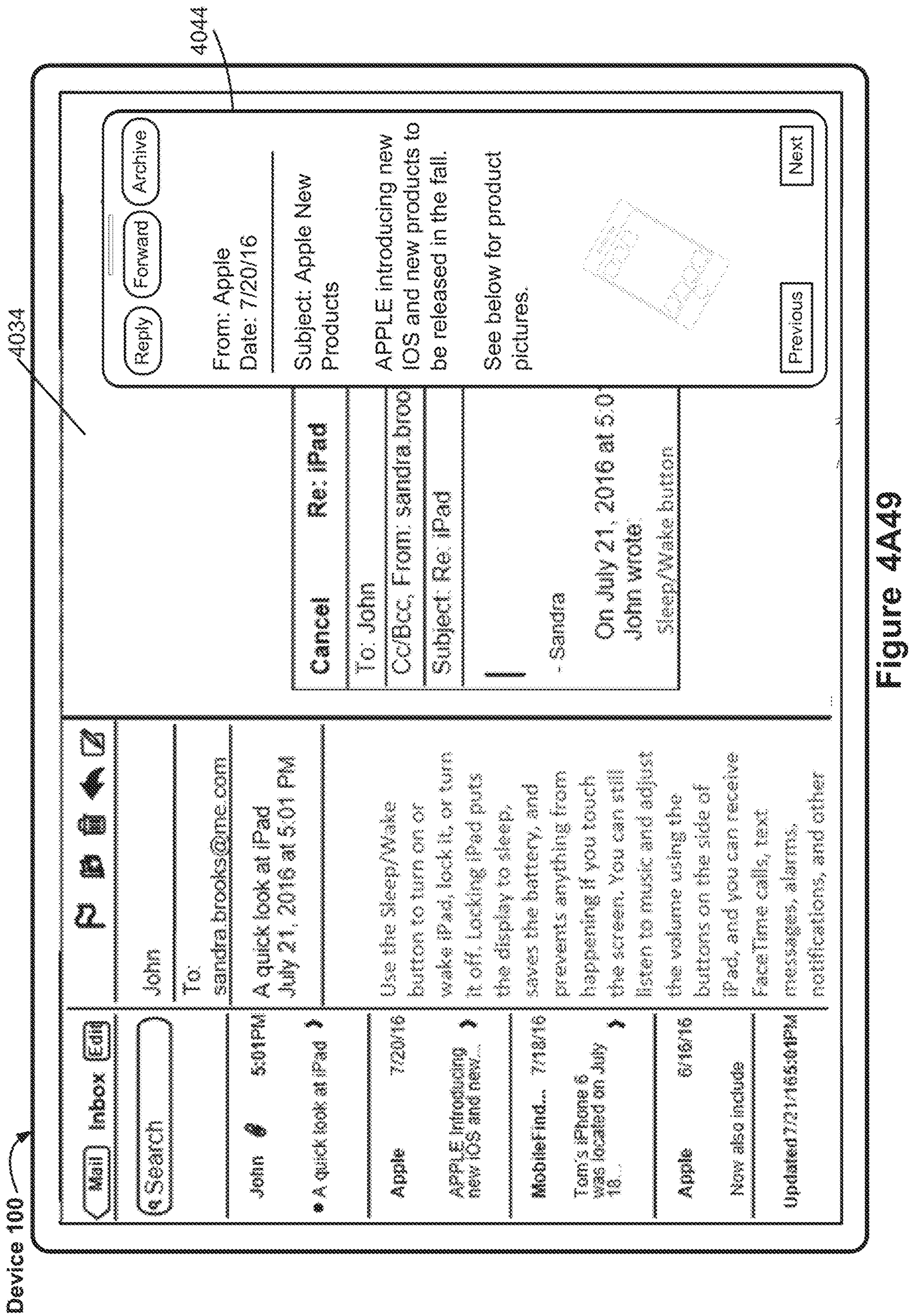
Figure 4A49

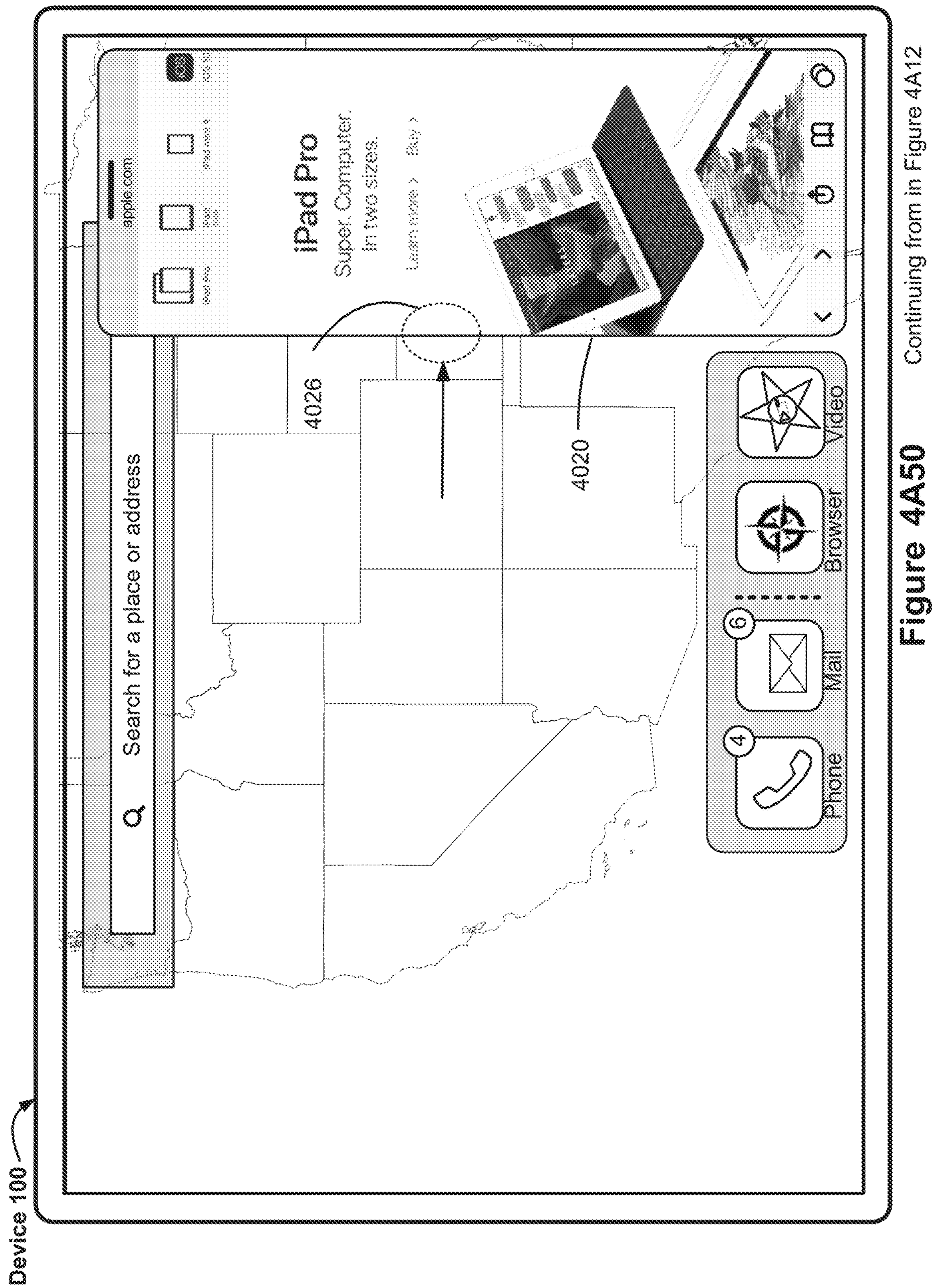
Continuing from in Figure 4A12
Figure 4A50

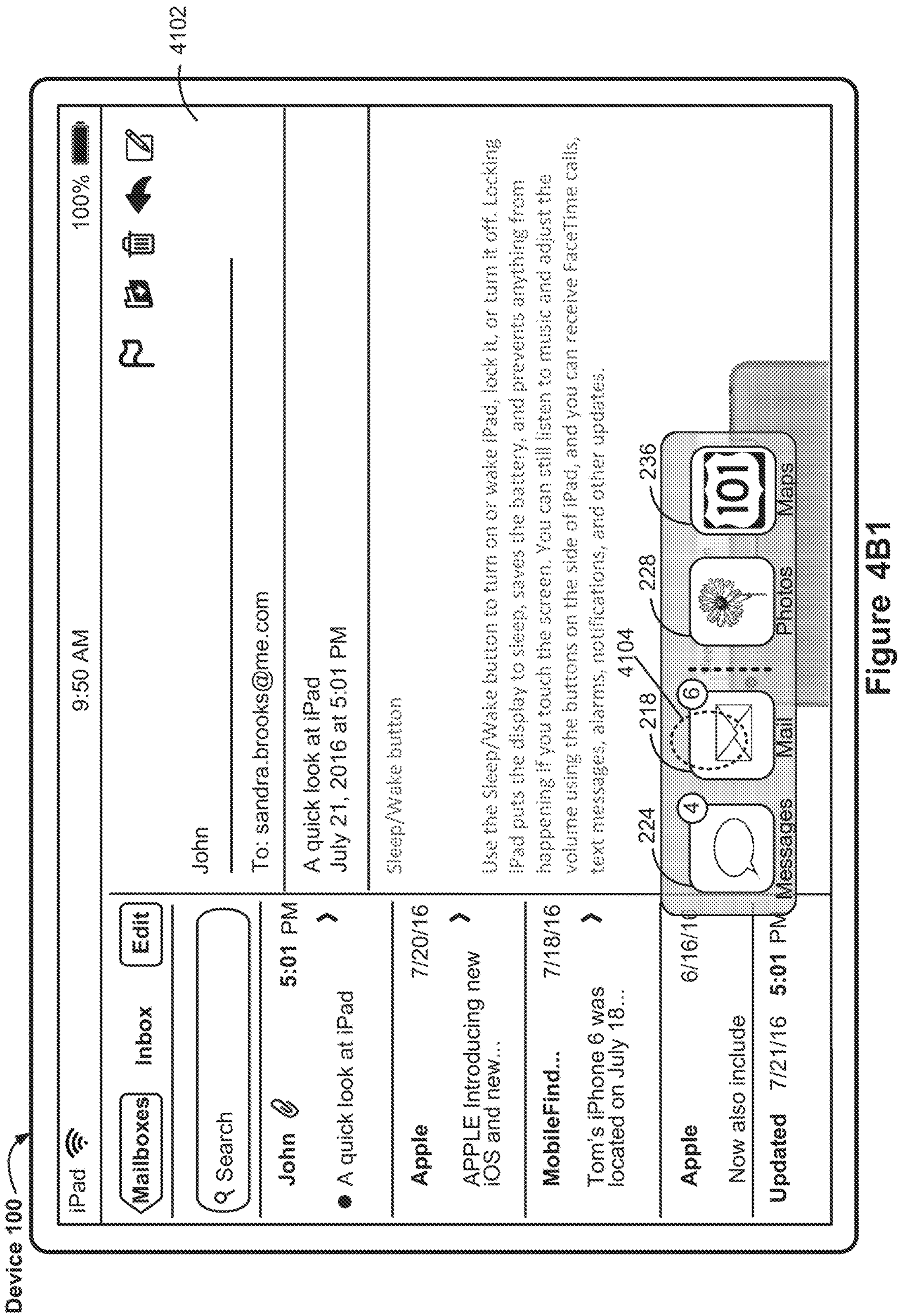
Figure 4B1

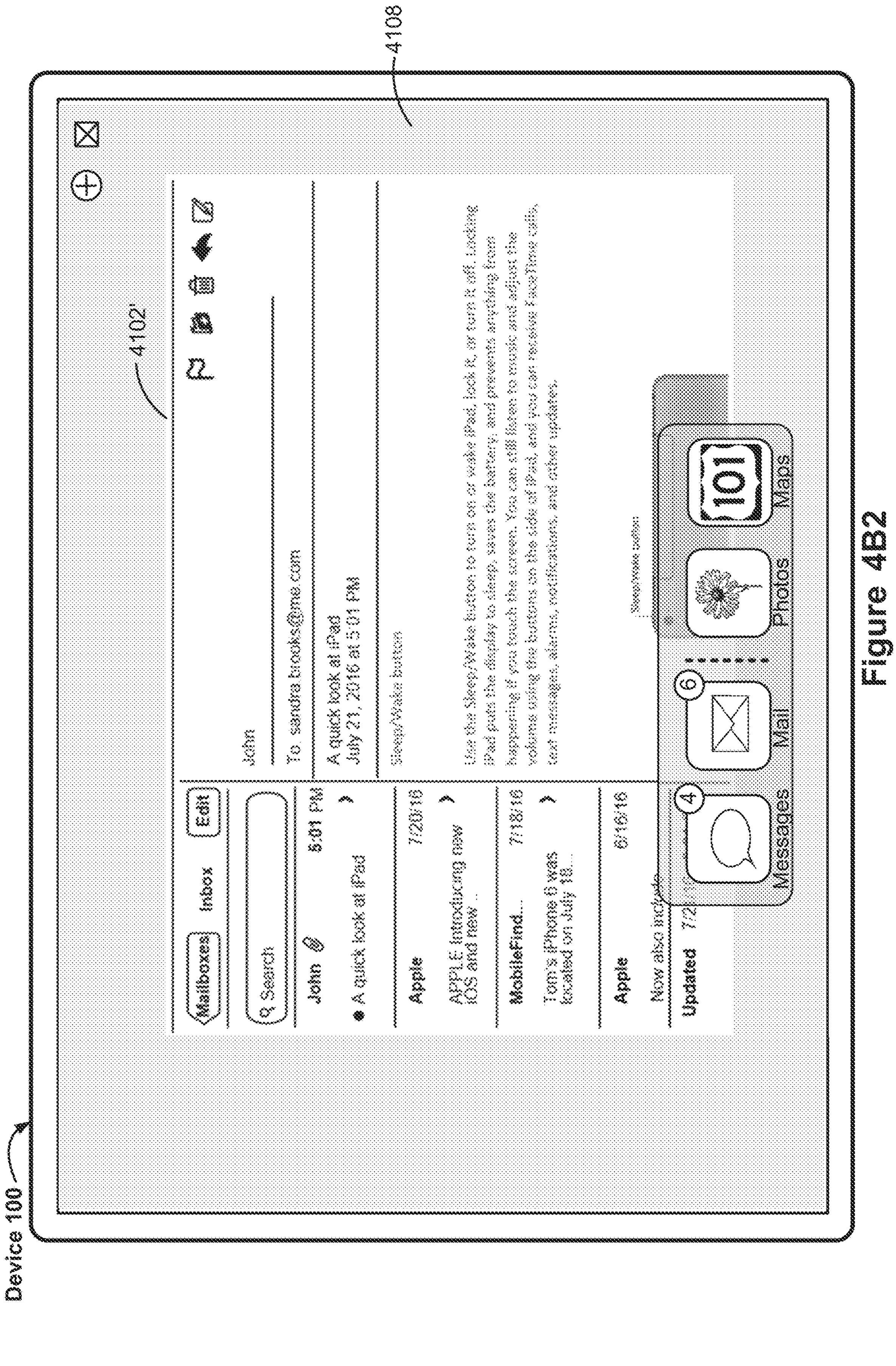
Figure 4B2

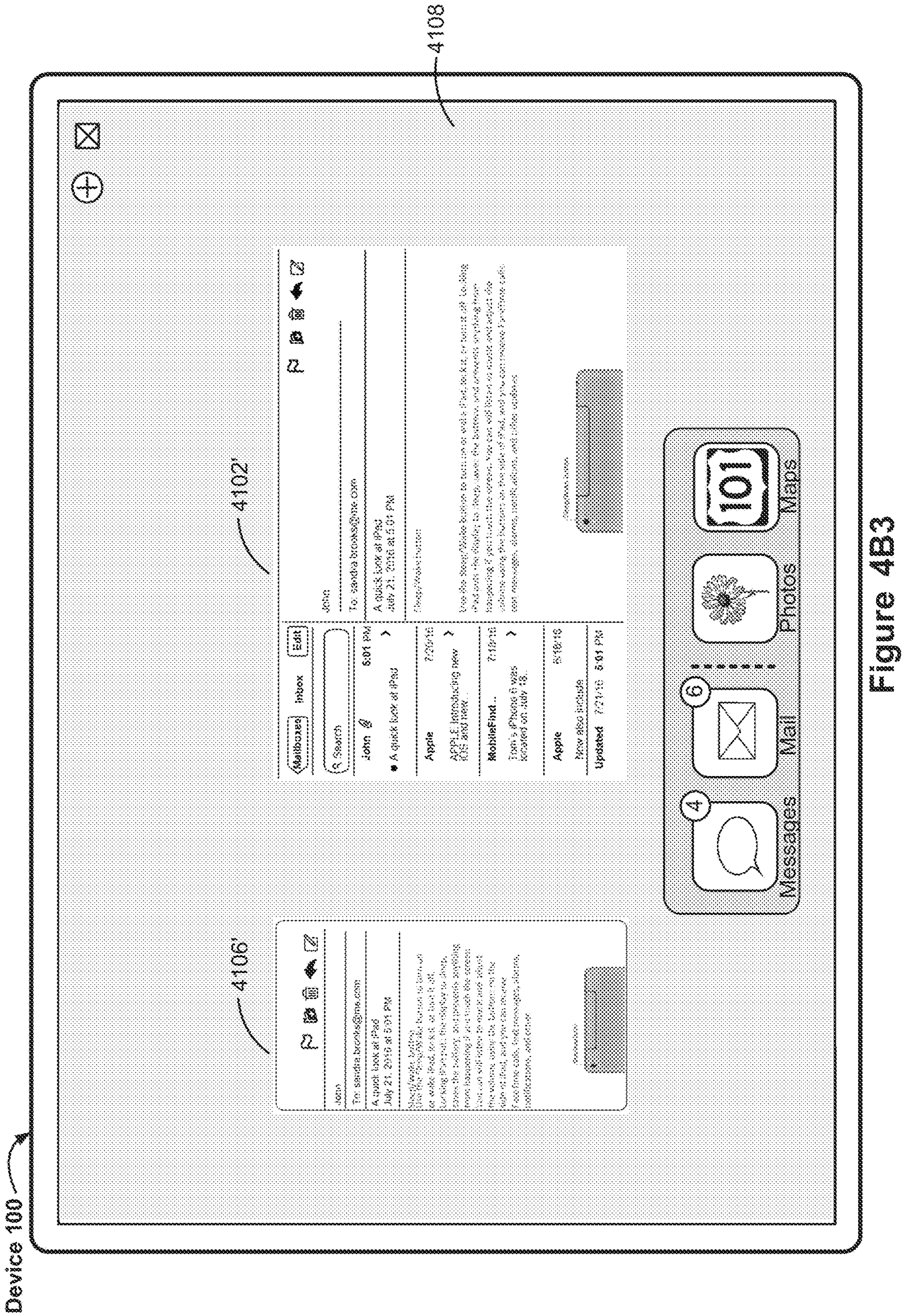
Figure 4B3

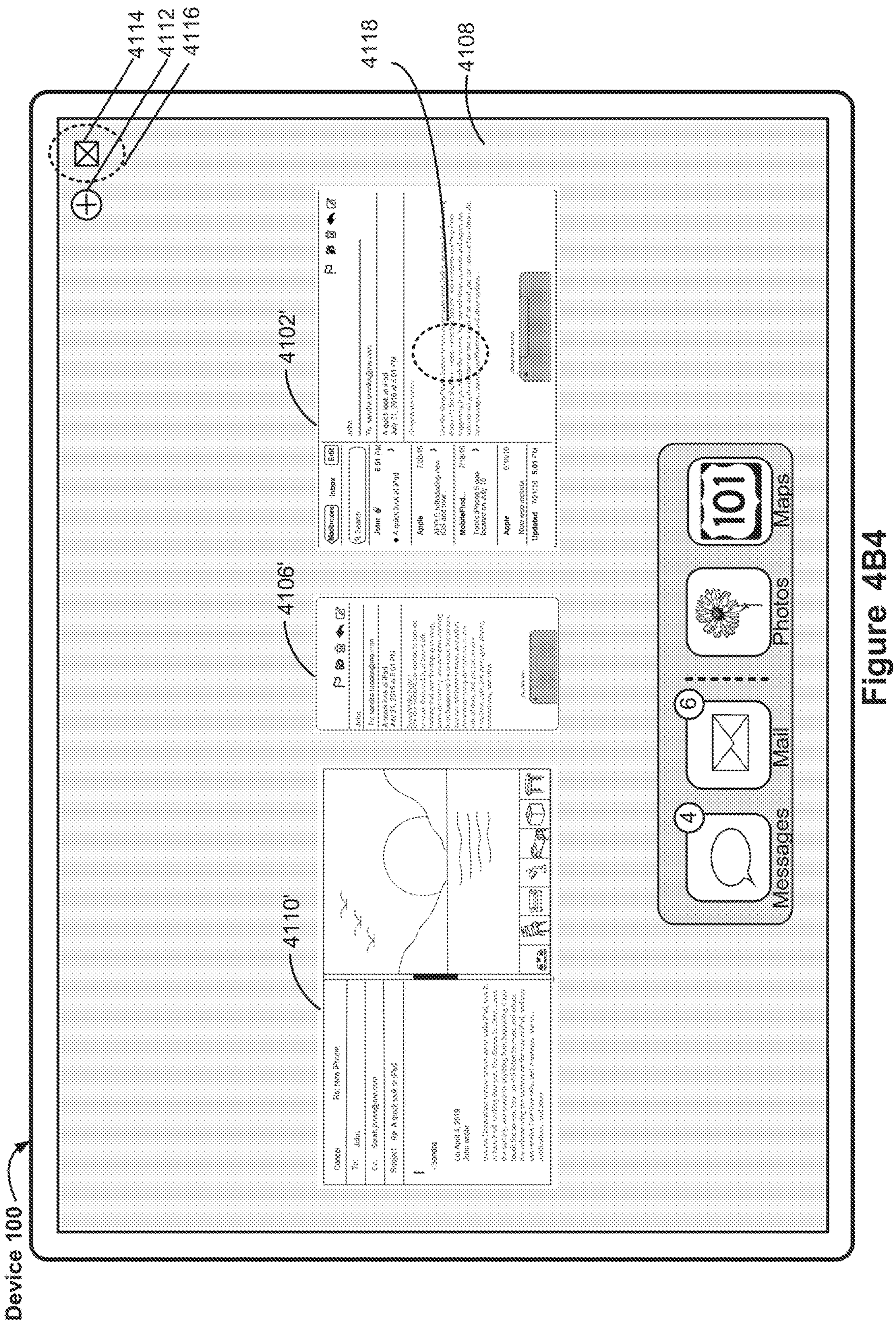
Figure 4B4

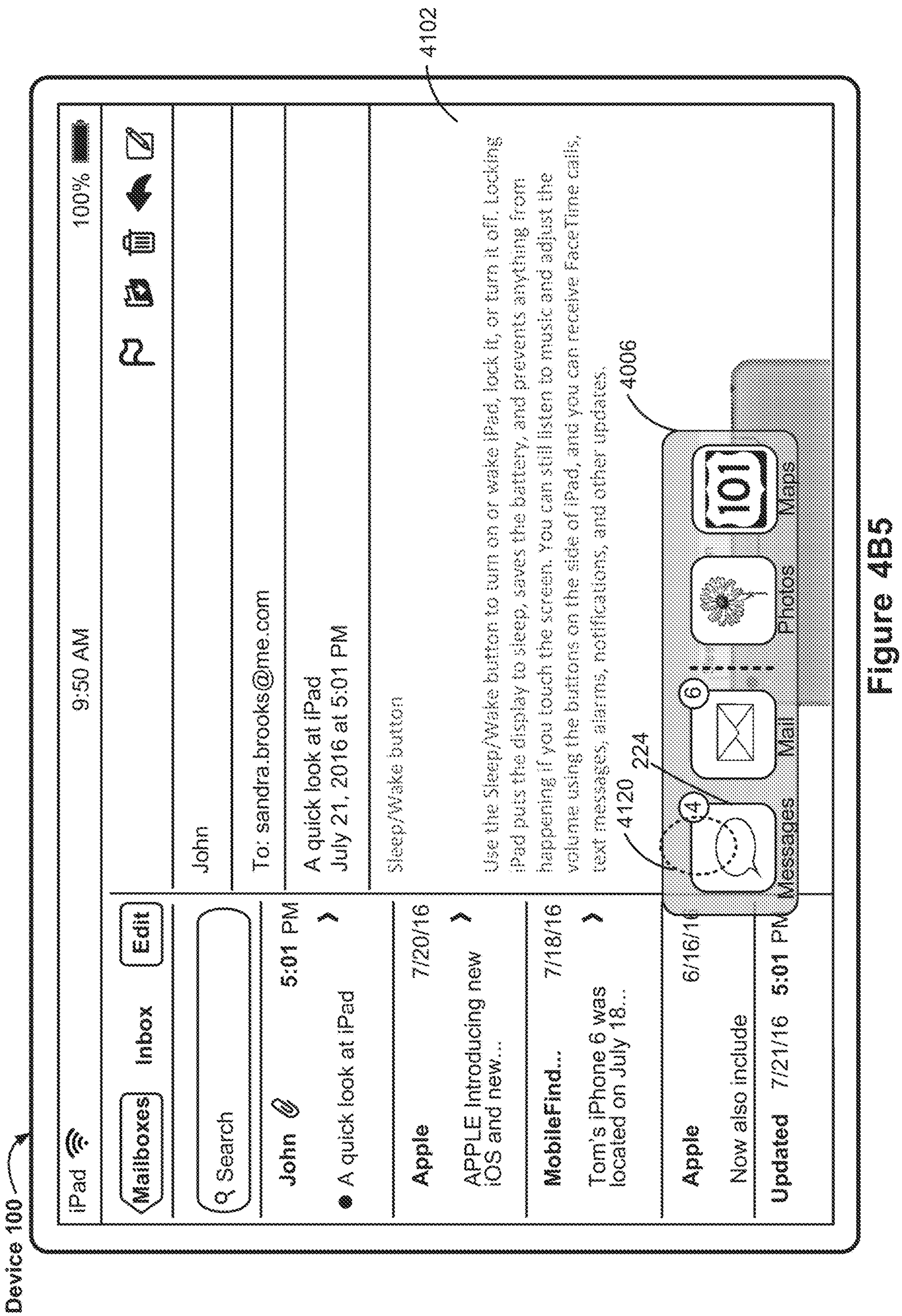
Figure 4B5

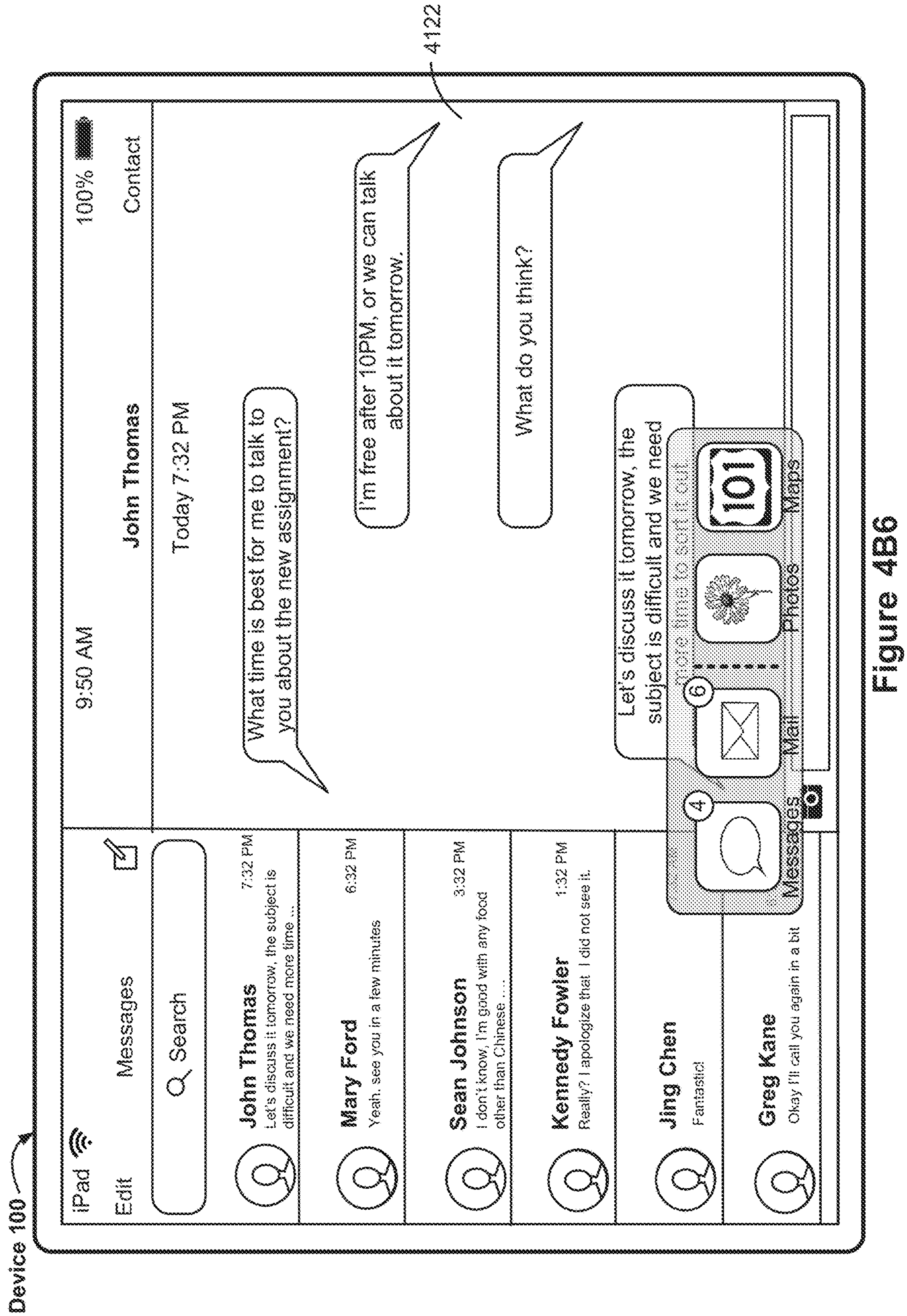
Figure 4B6

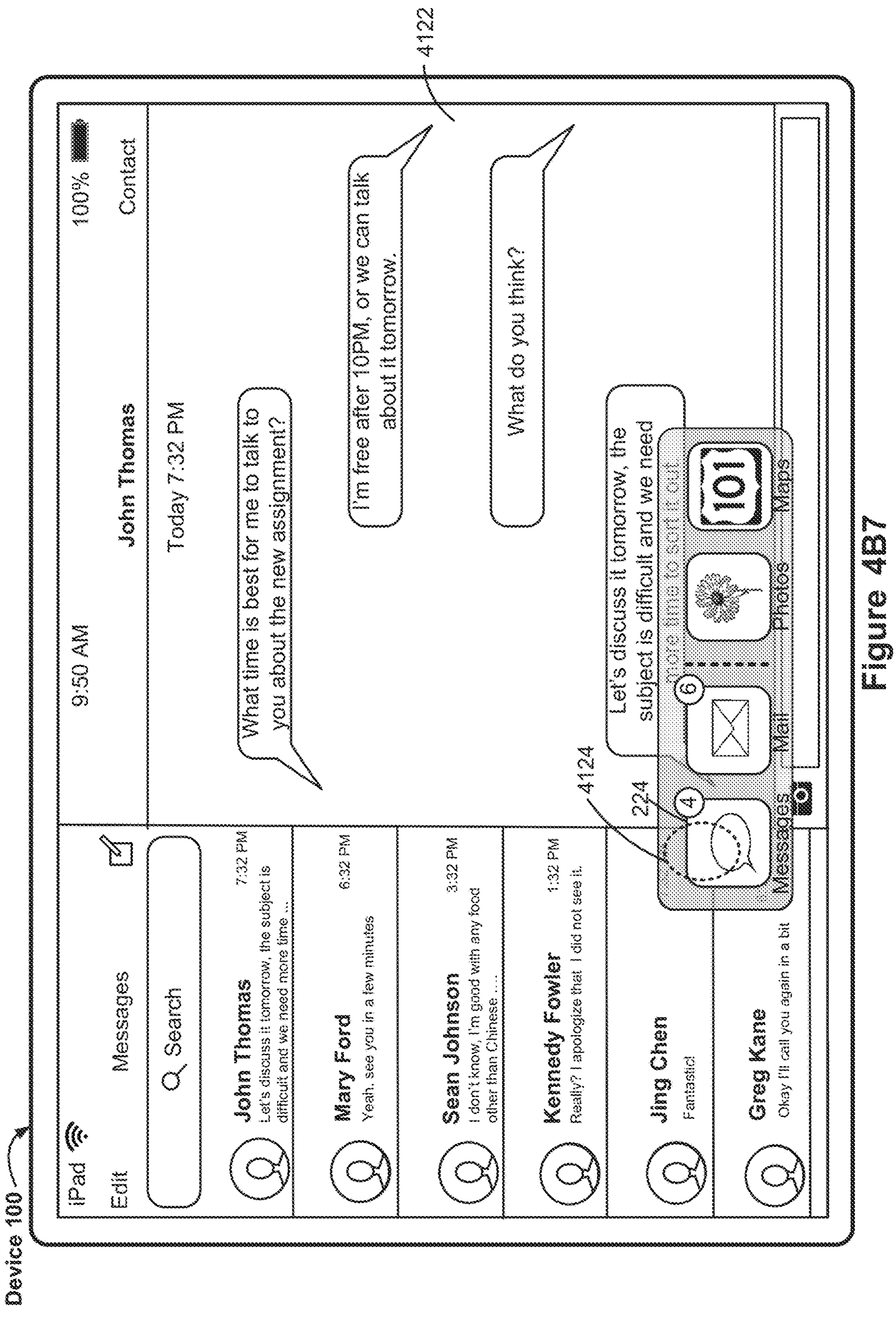
Figure 4B7

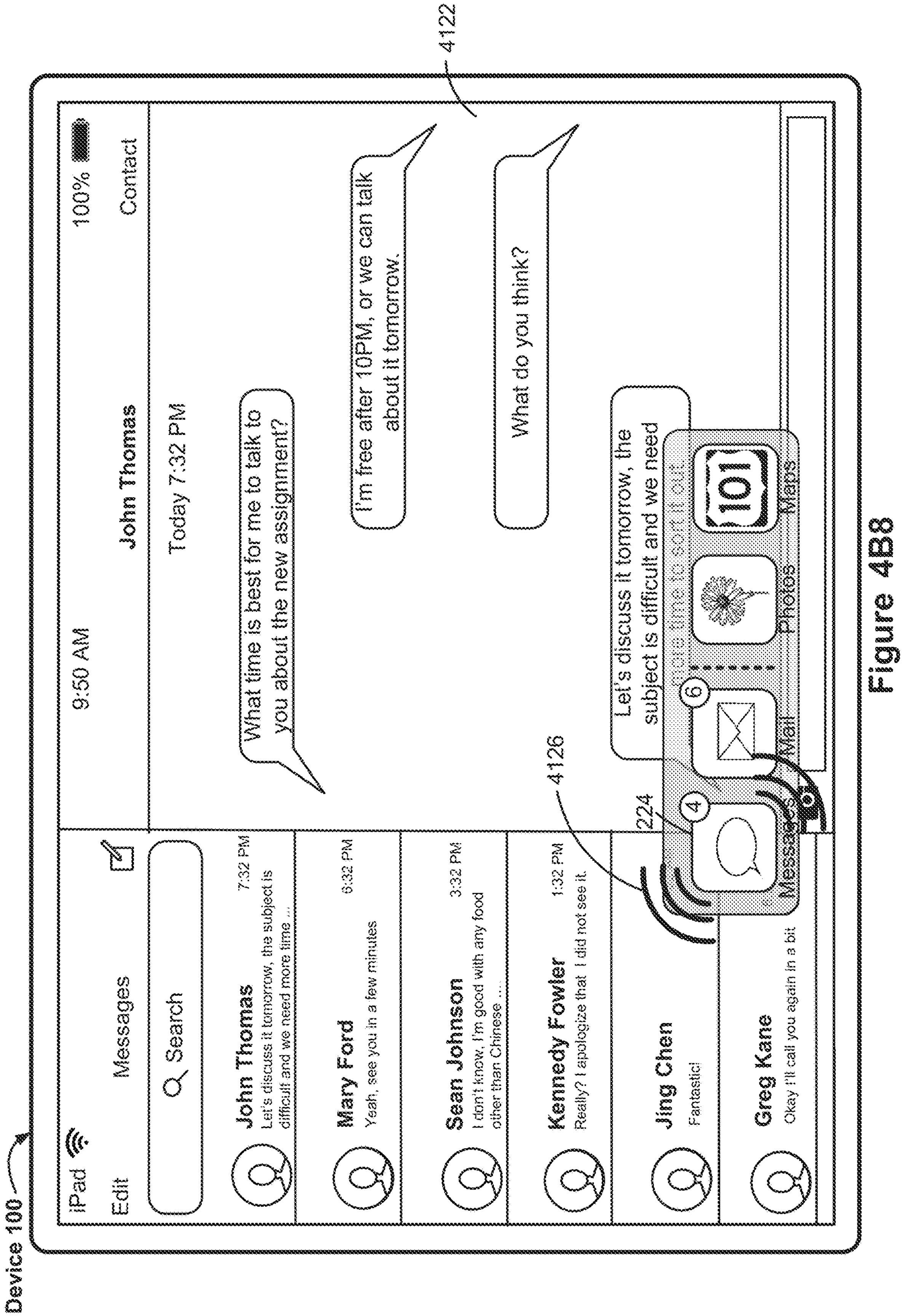
Figure 4B8

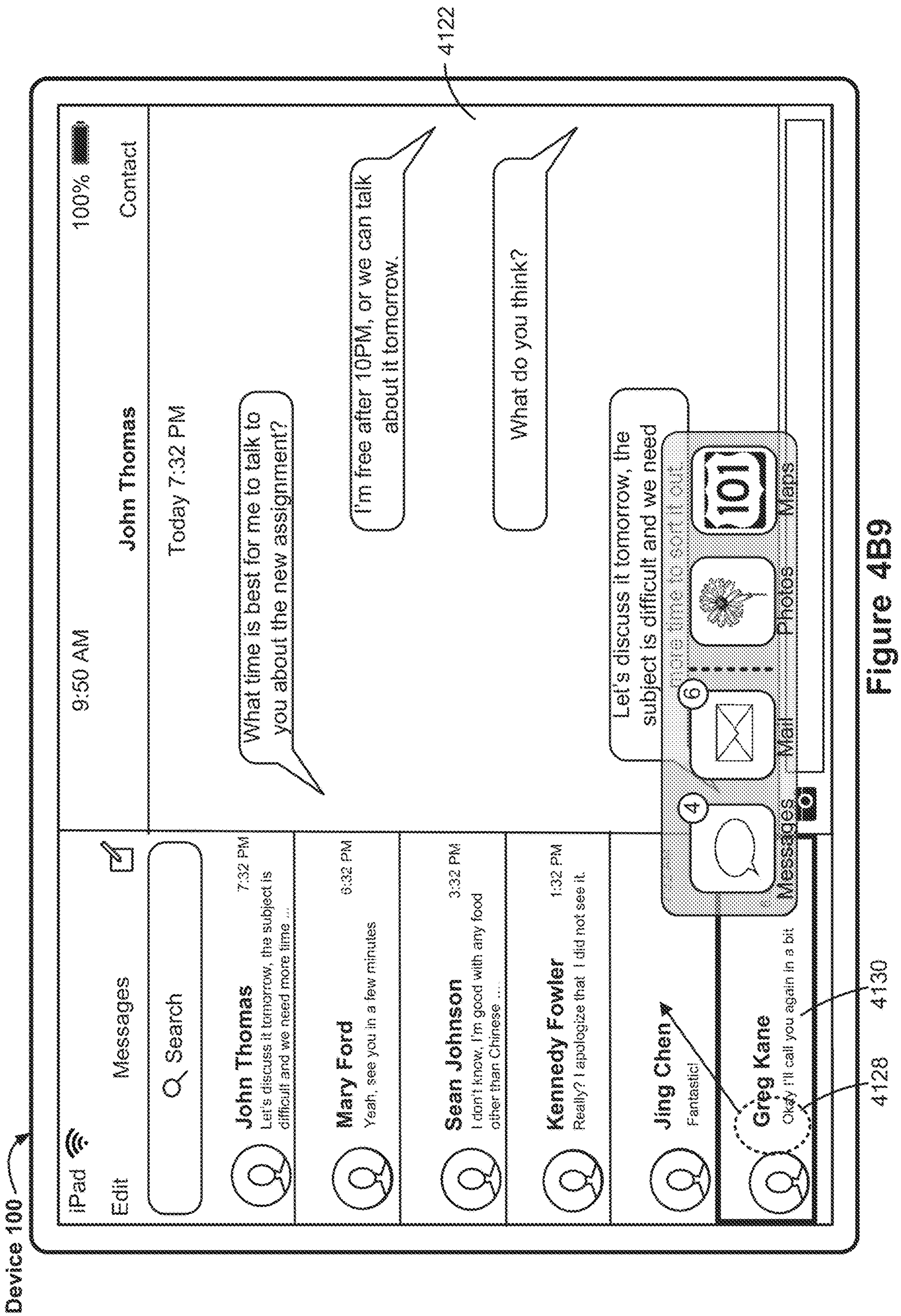
Figure 4B9

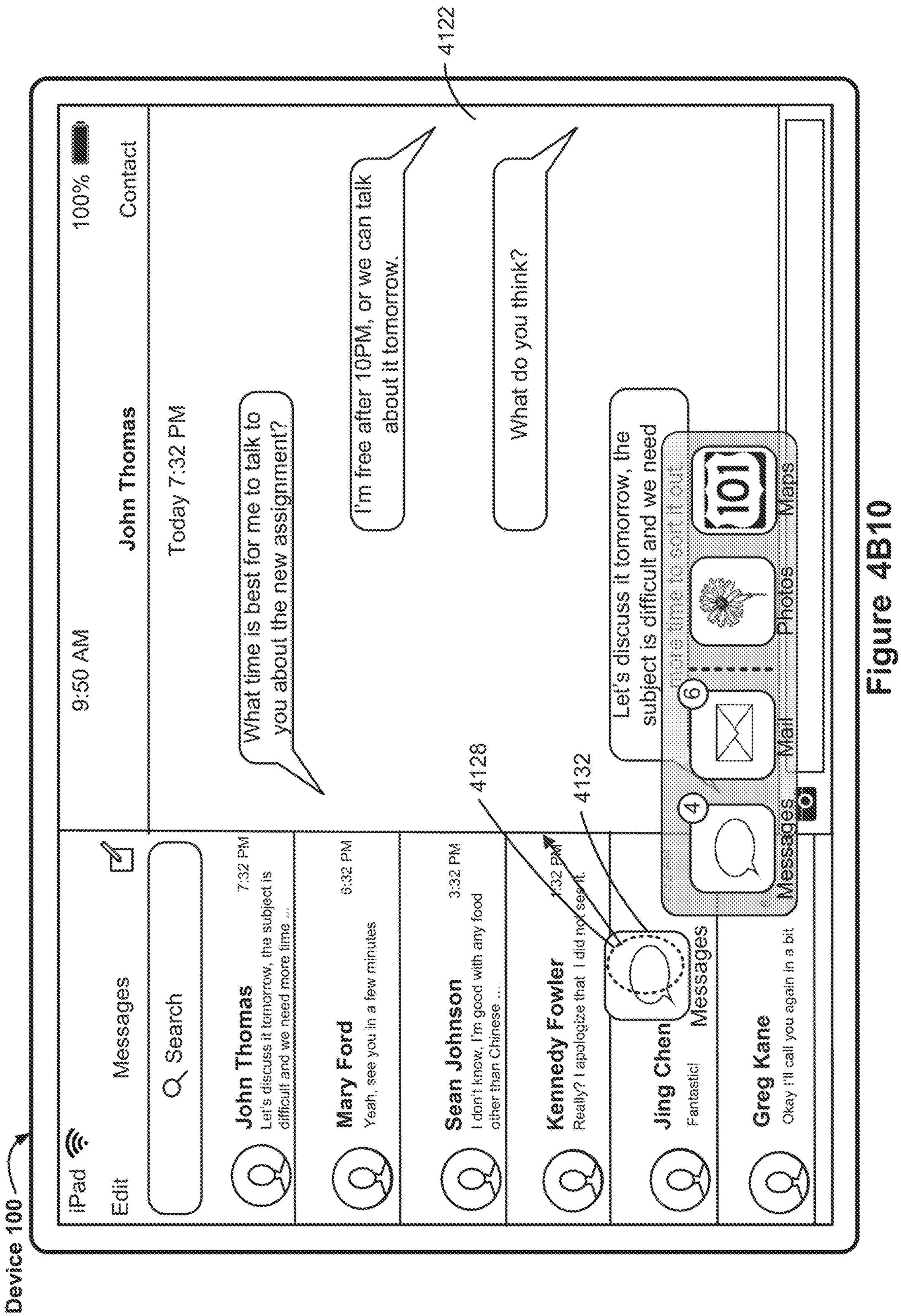
Figure 4B10

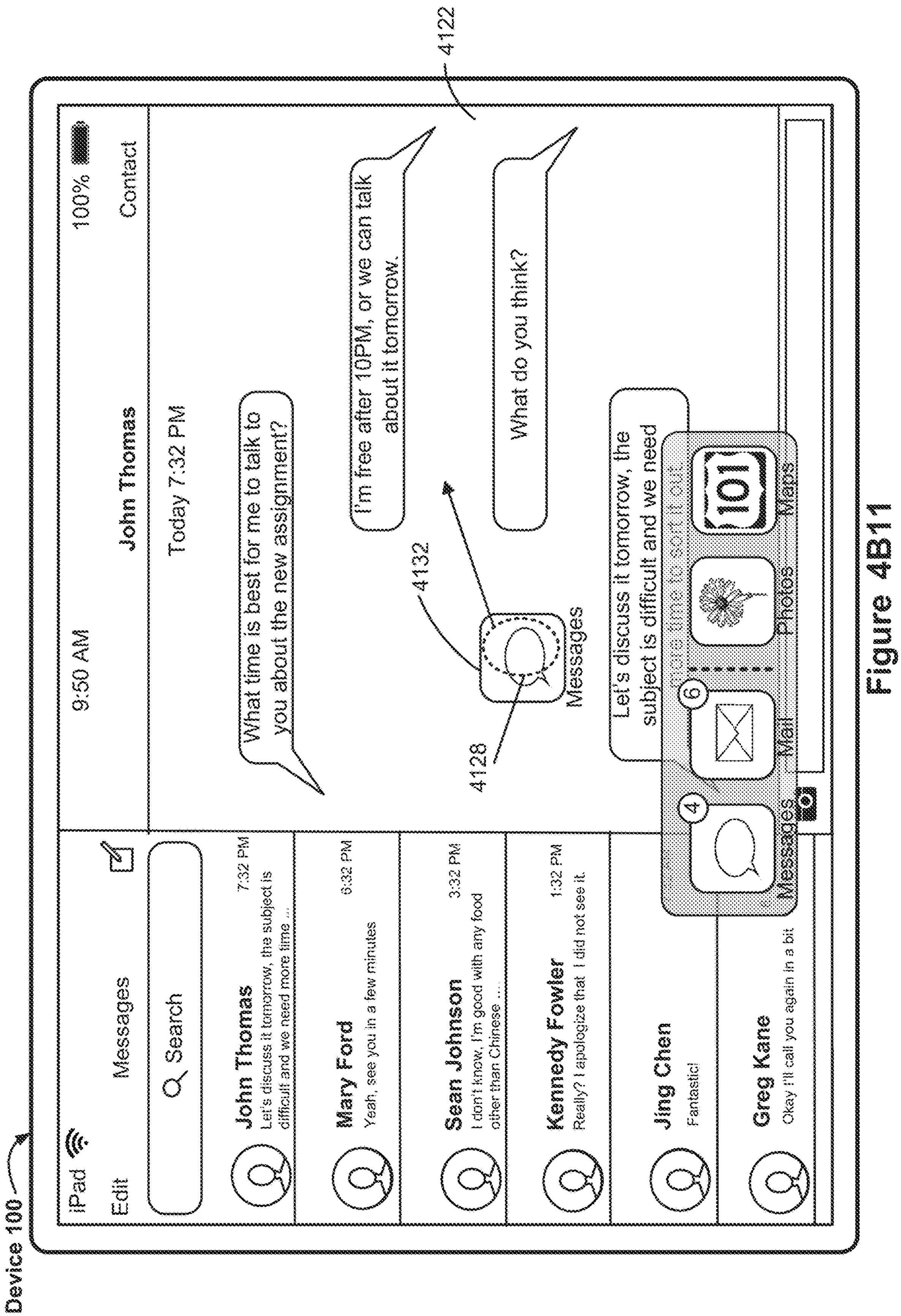
Figure 4B11

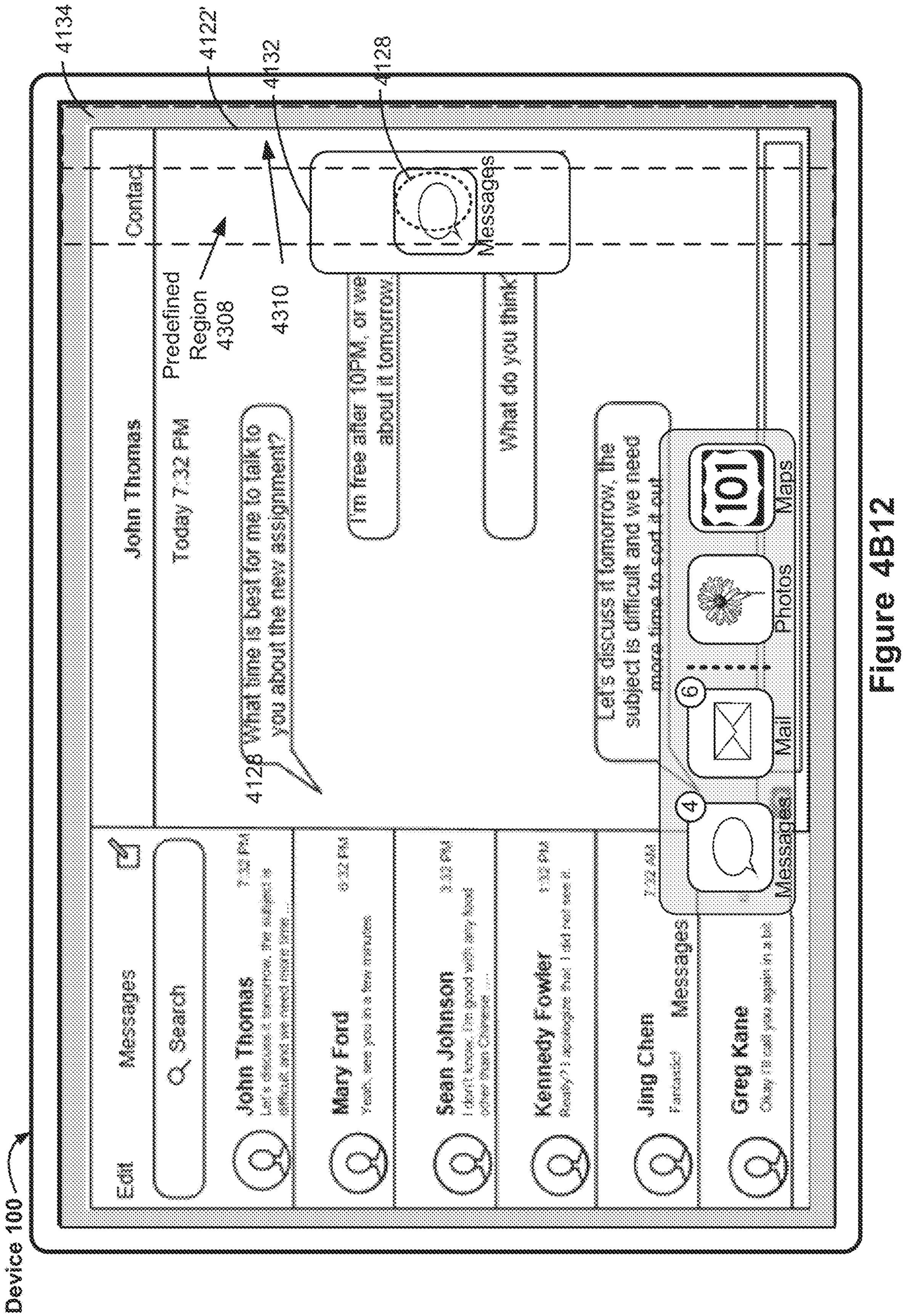
Figure 4B12

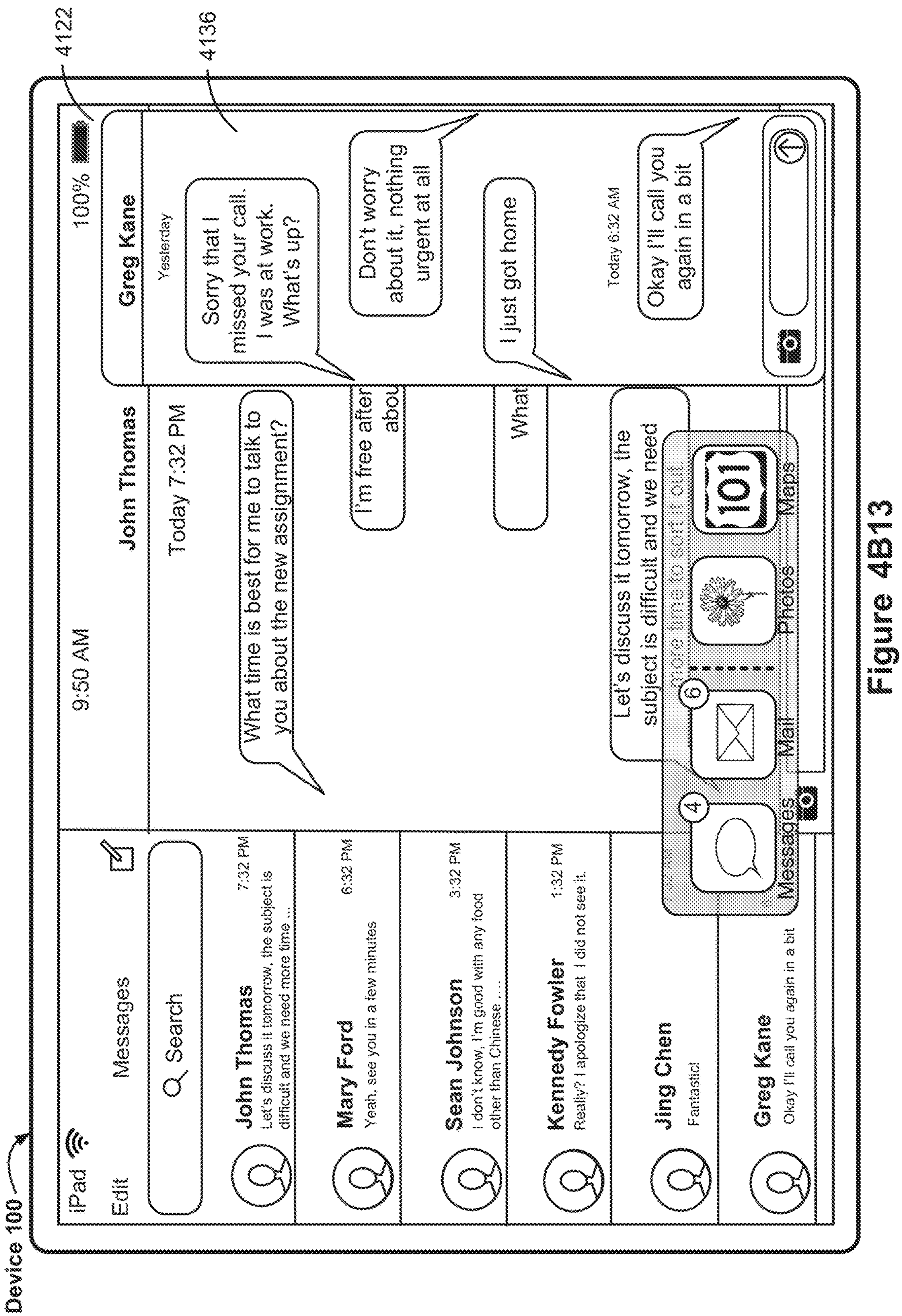
Figure 4B13

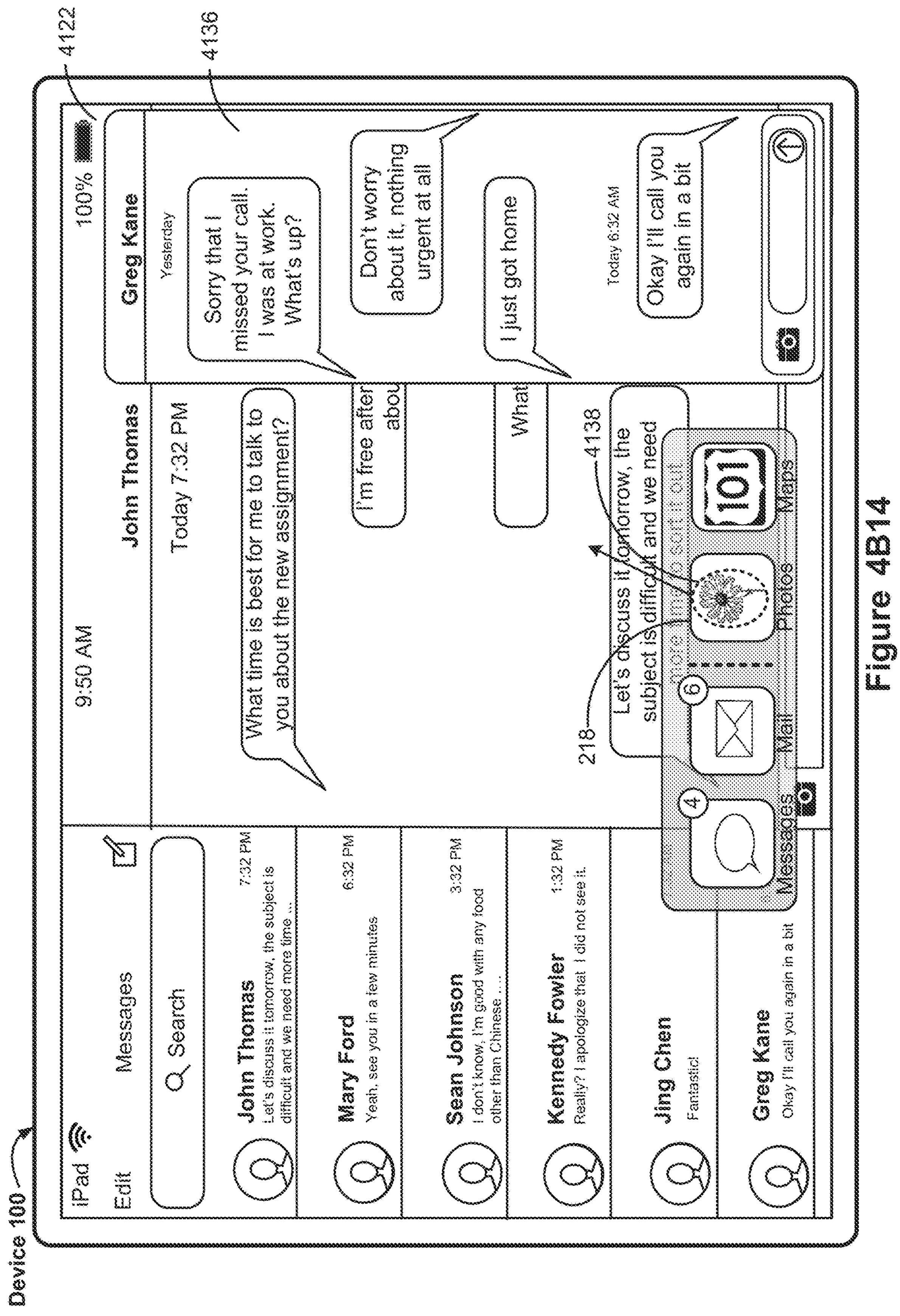
Figure 4B14

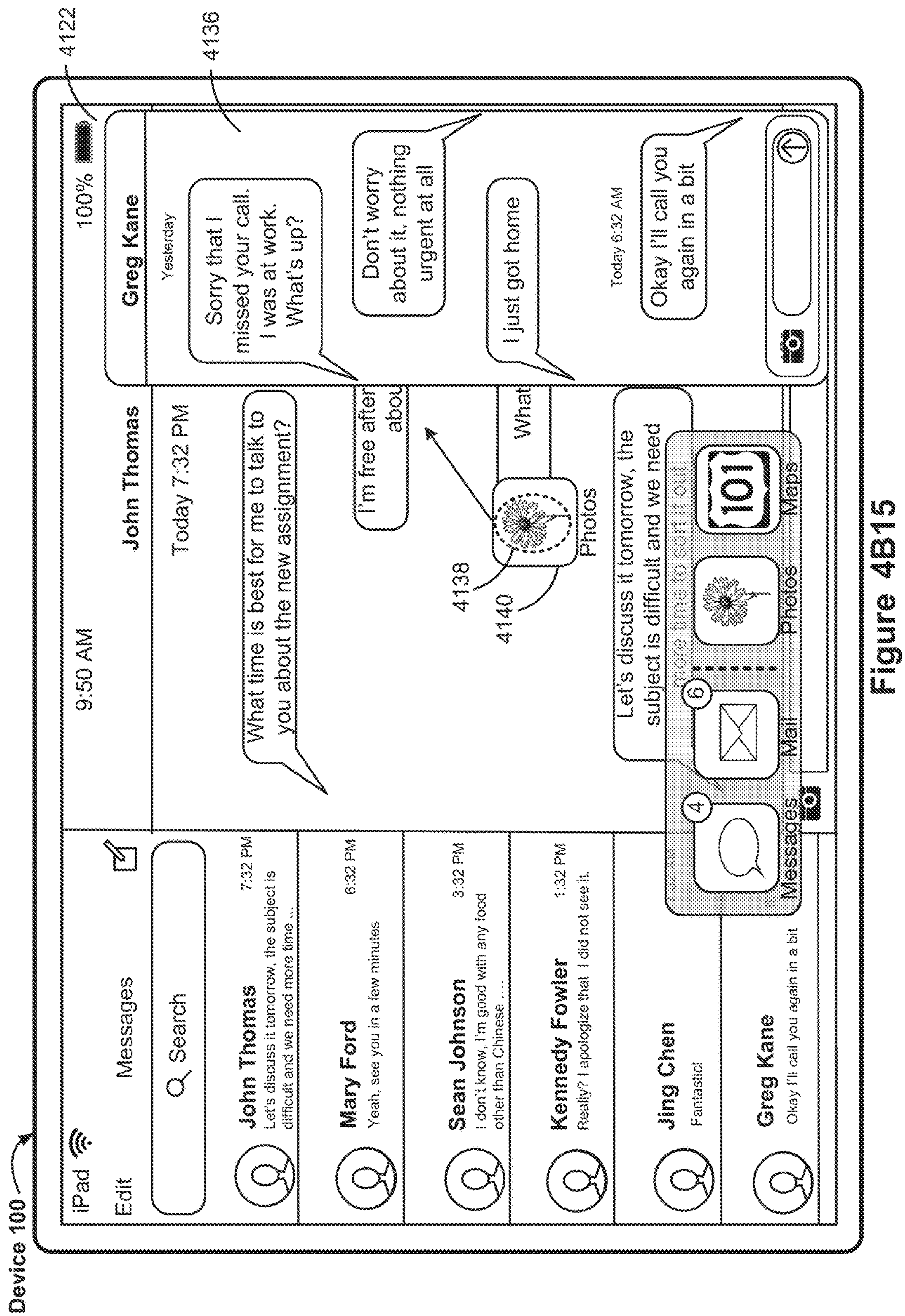
Figure 4B15

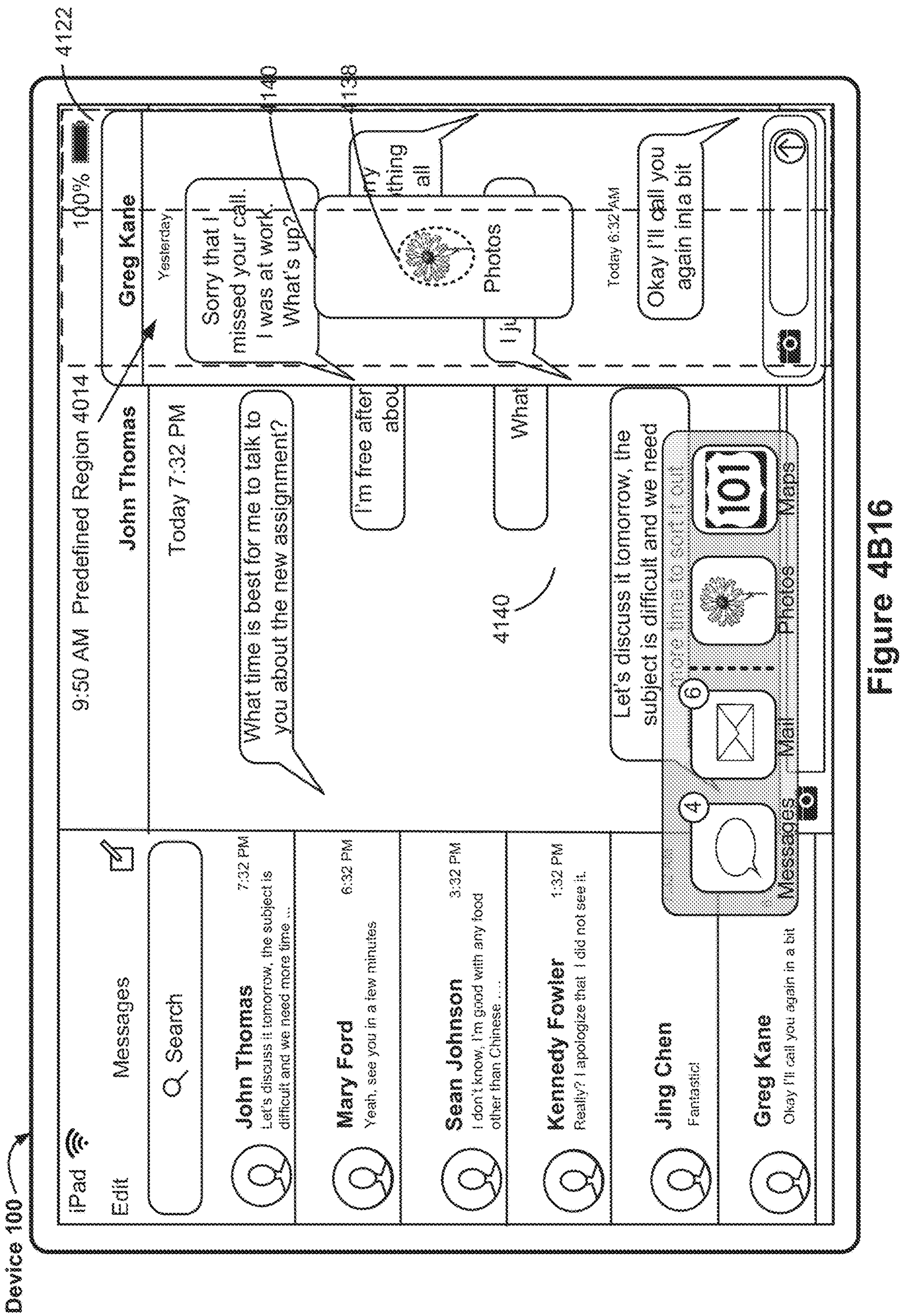
Figure 4B16

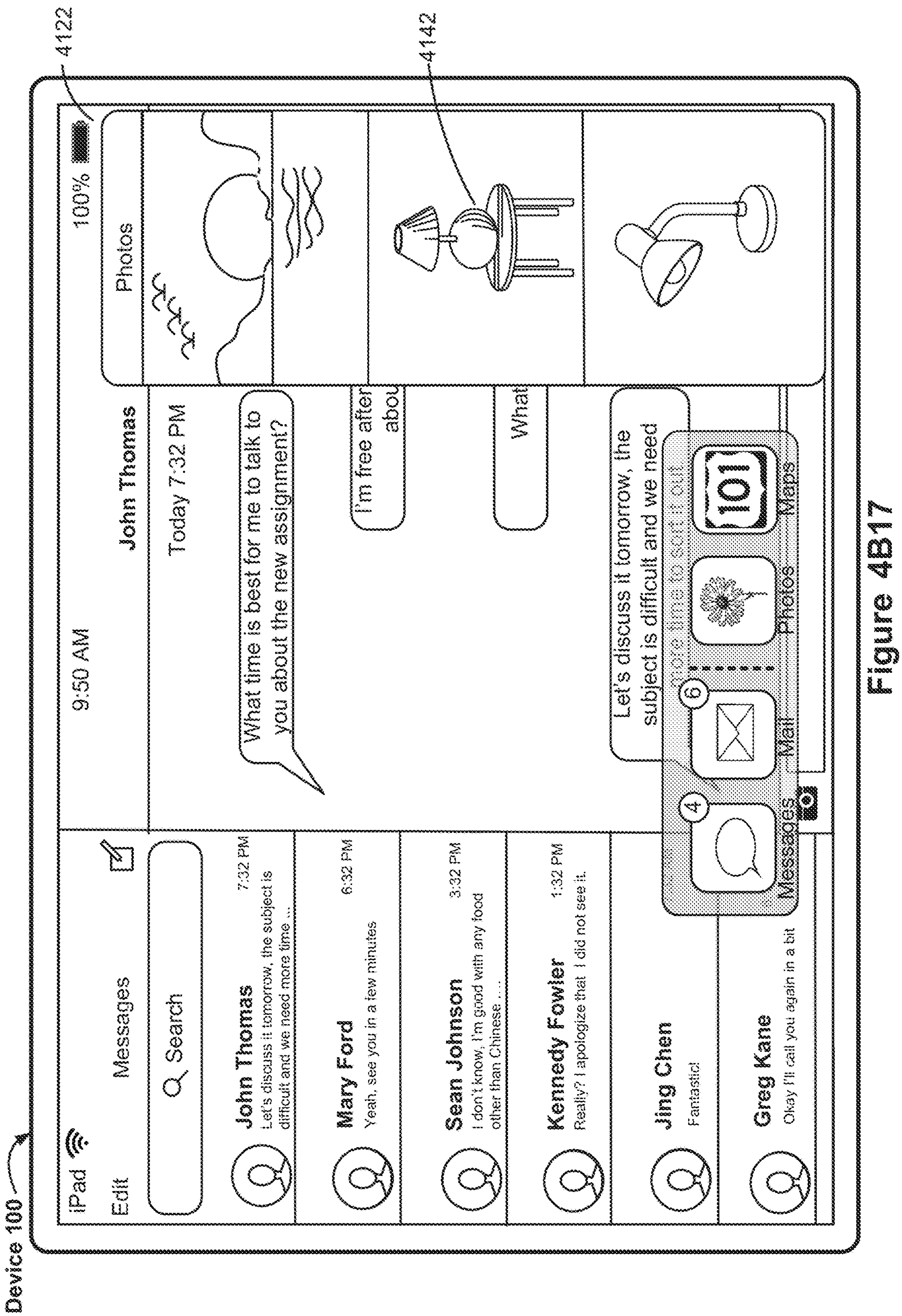
Figure 4B17

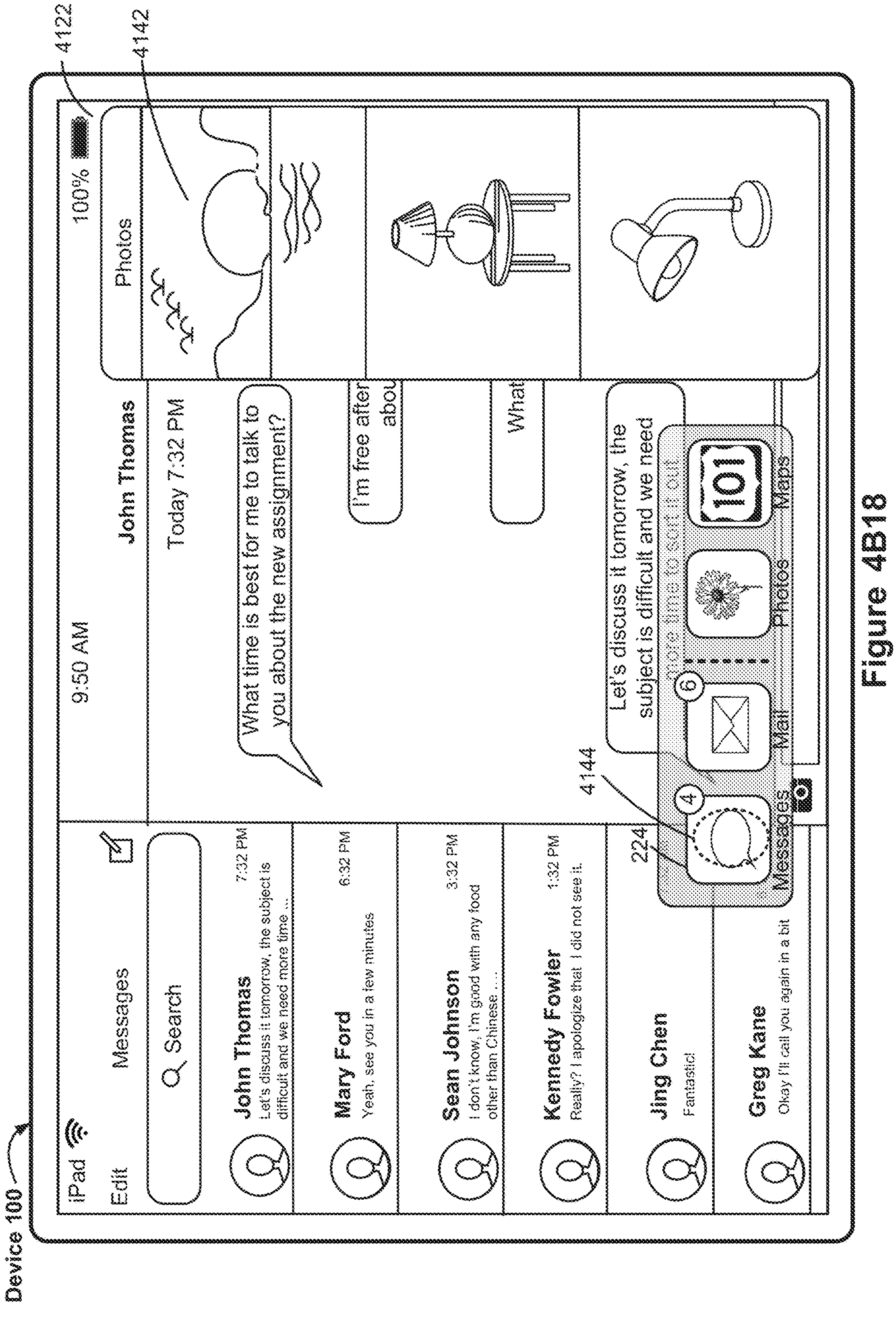
Figure 4B18

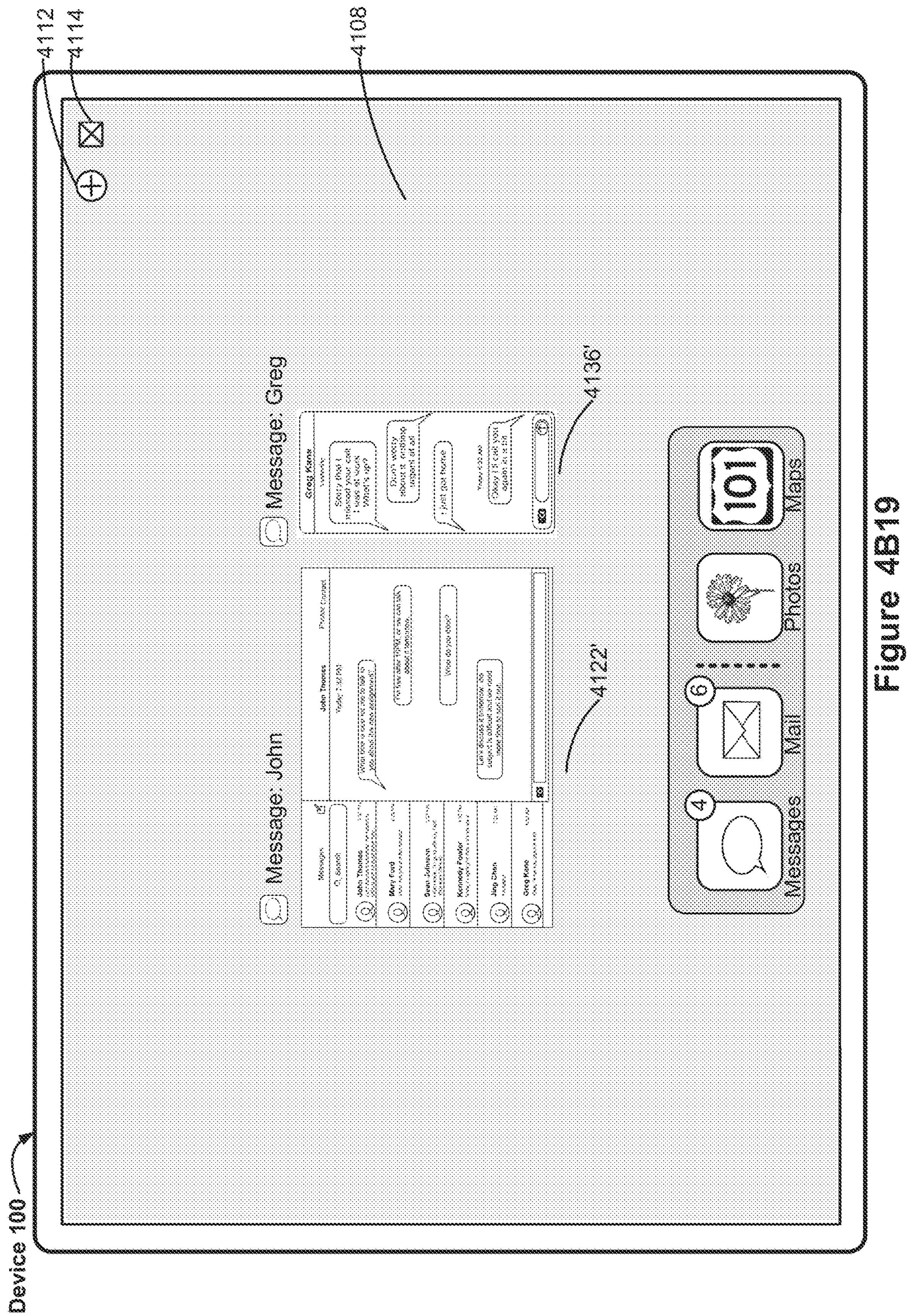
Figure 4B19

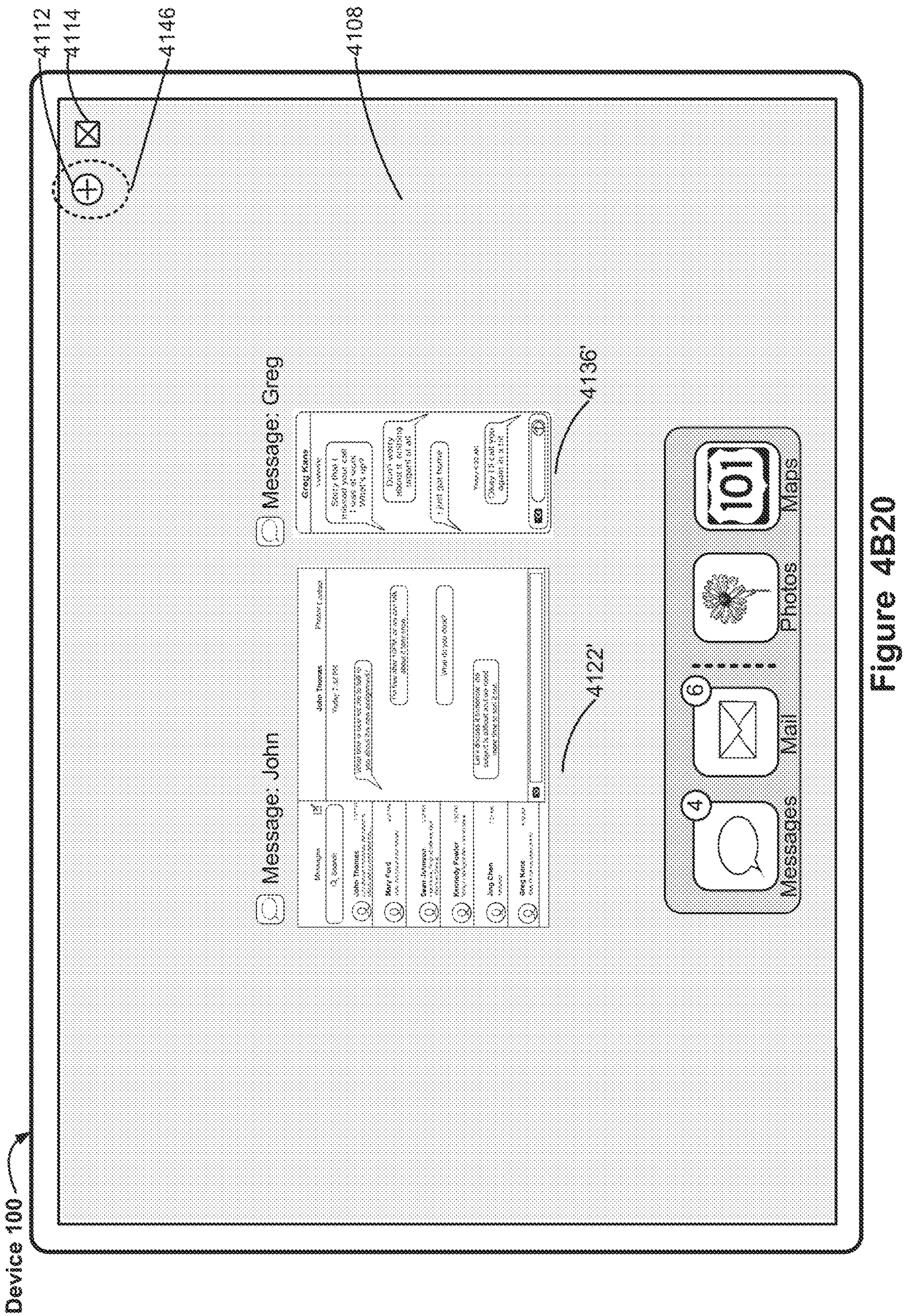
Figure 4B20

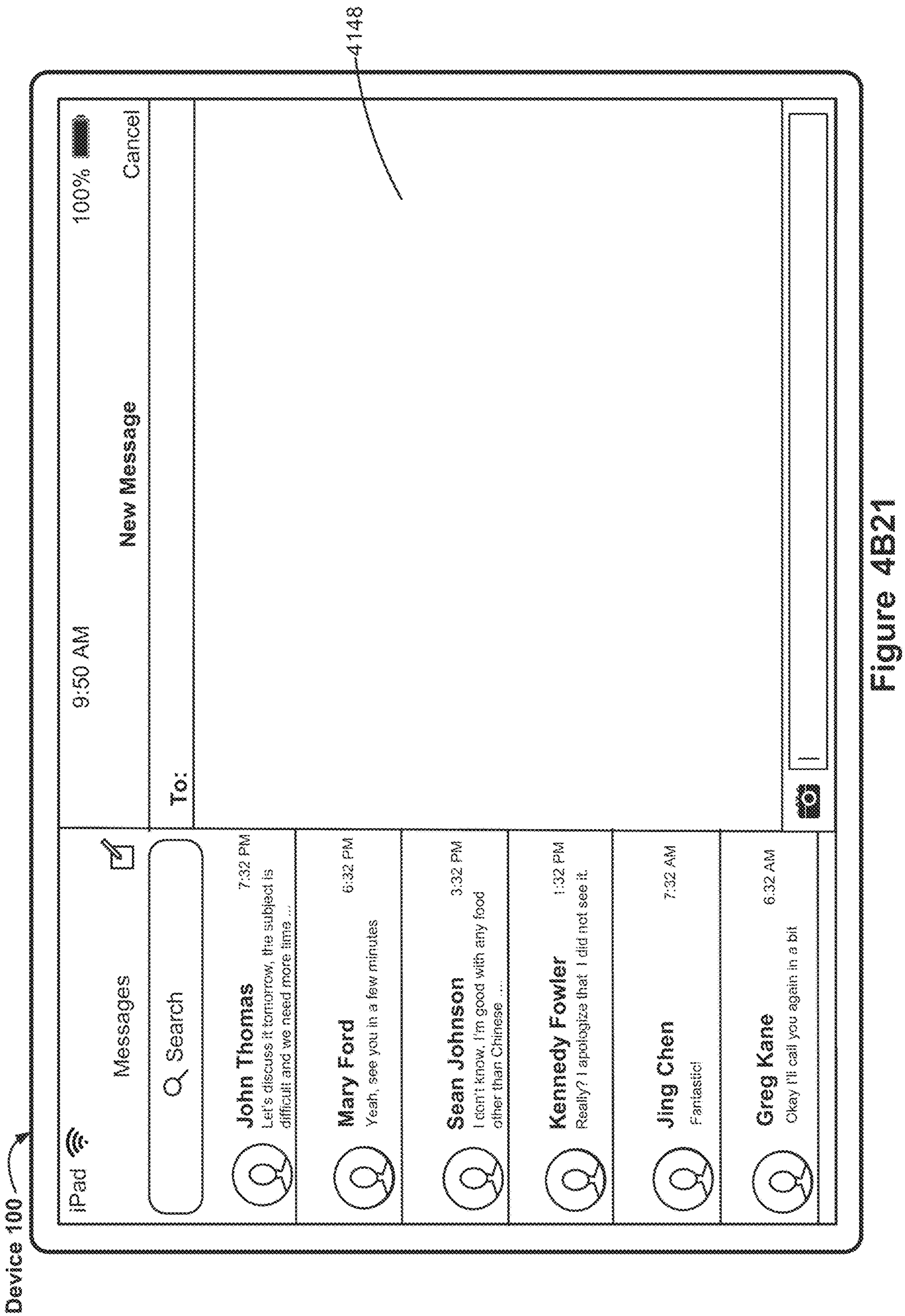
Figure 4B21

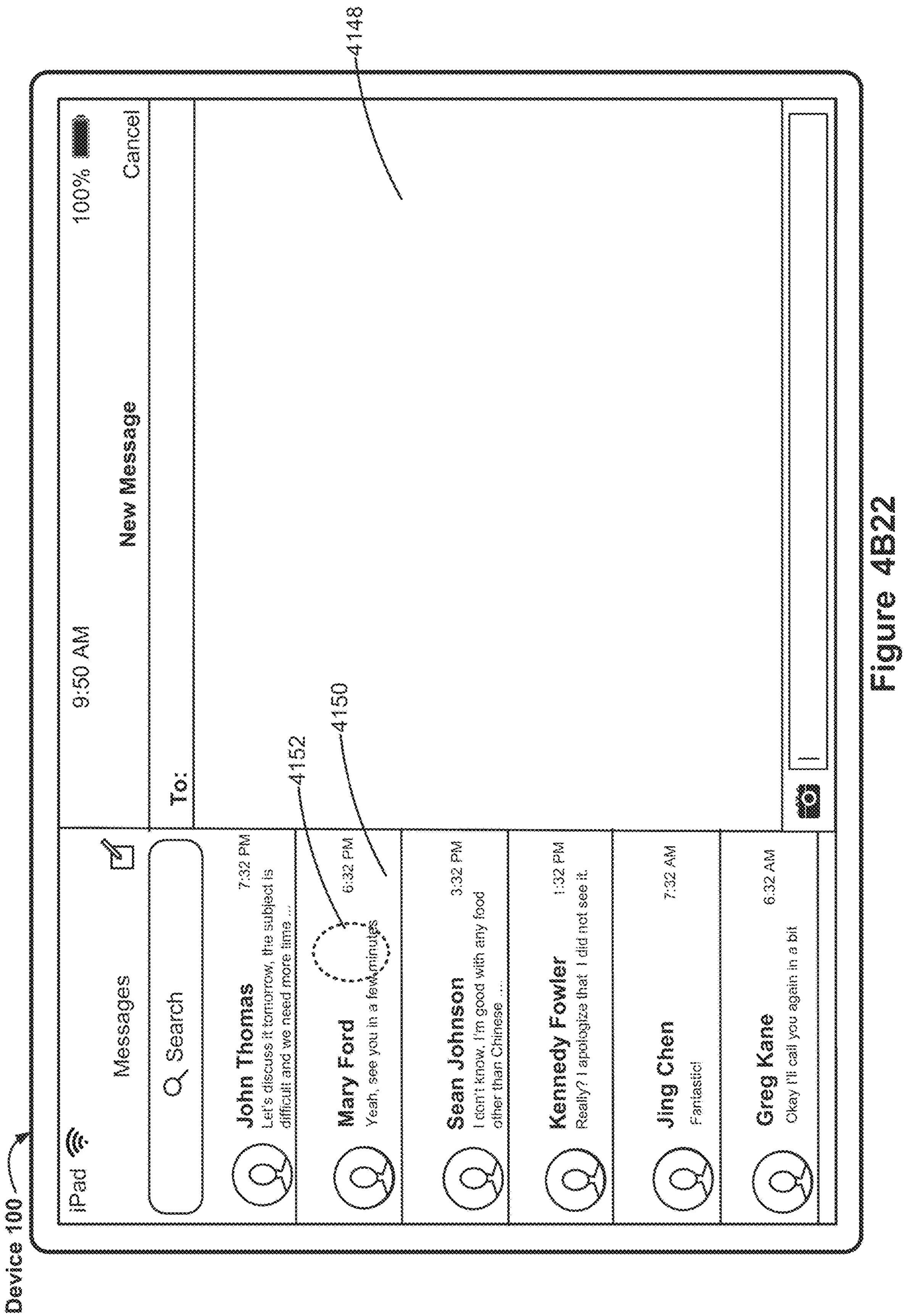
Figure 4B22

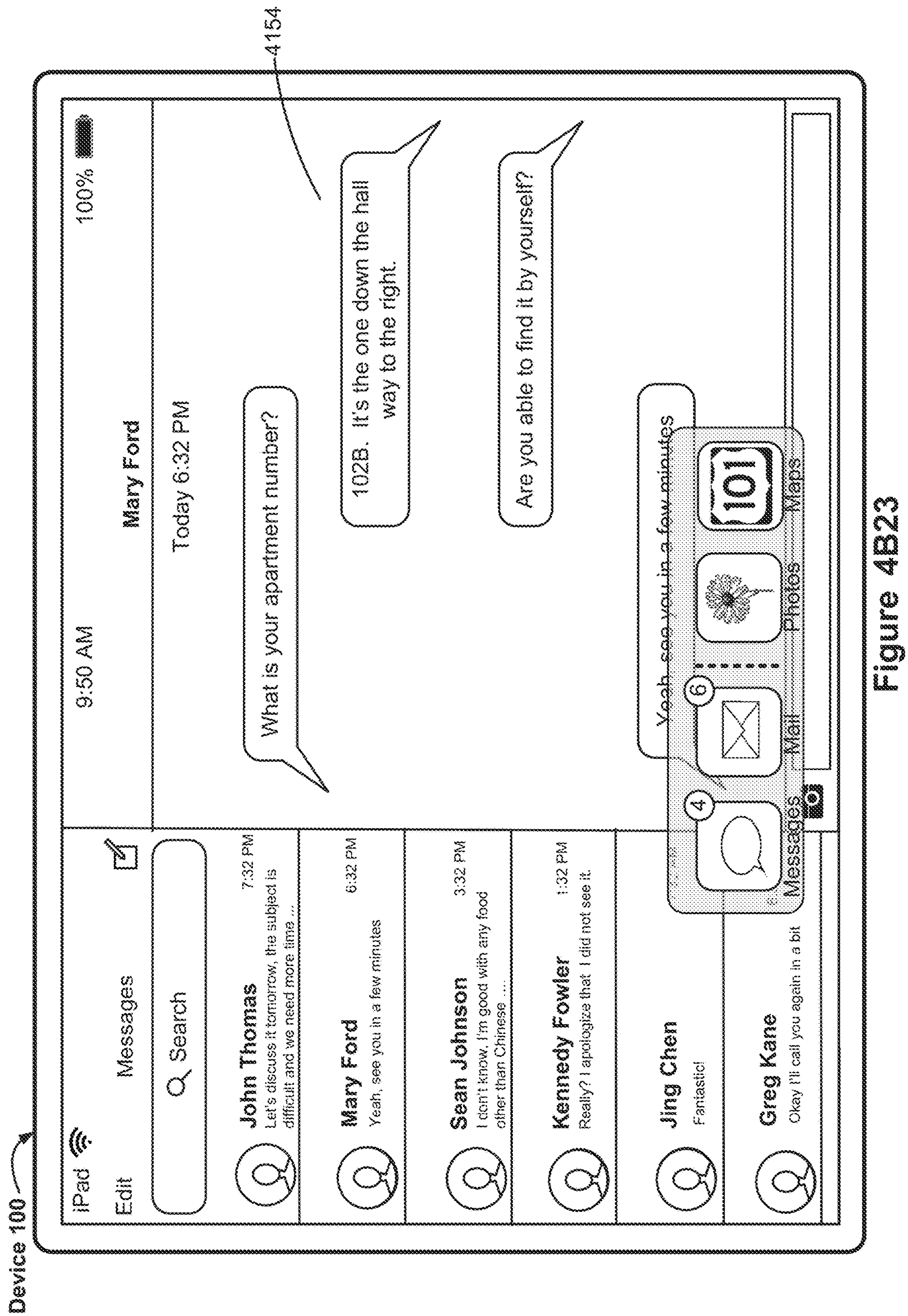
Figure 4B23

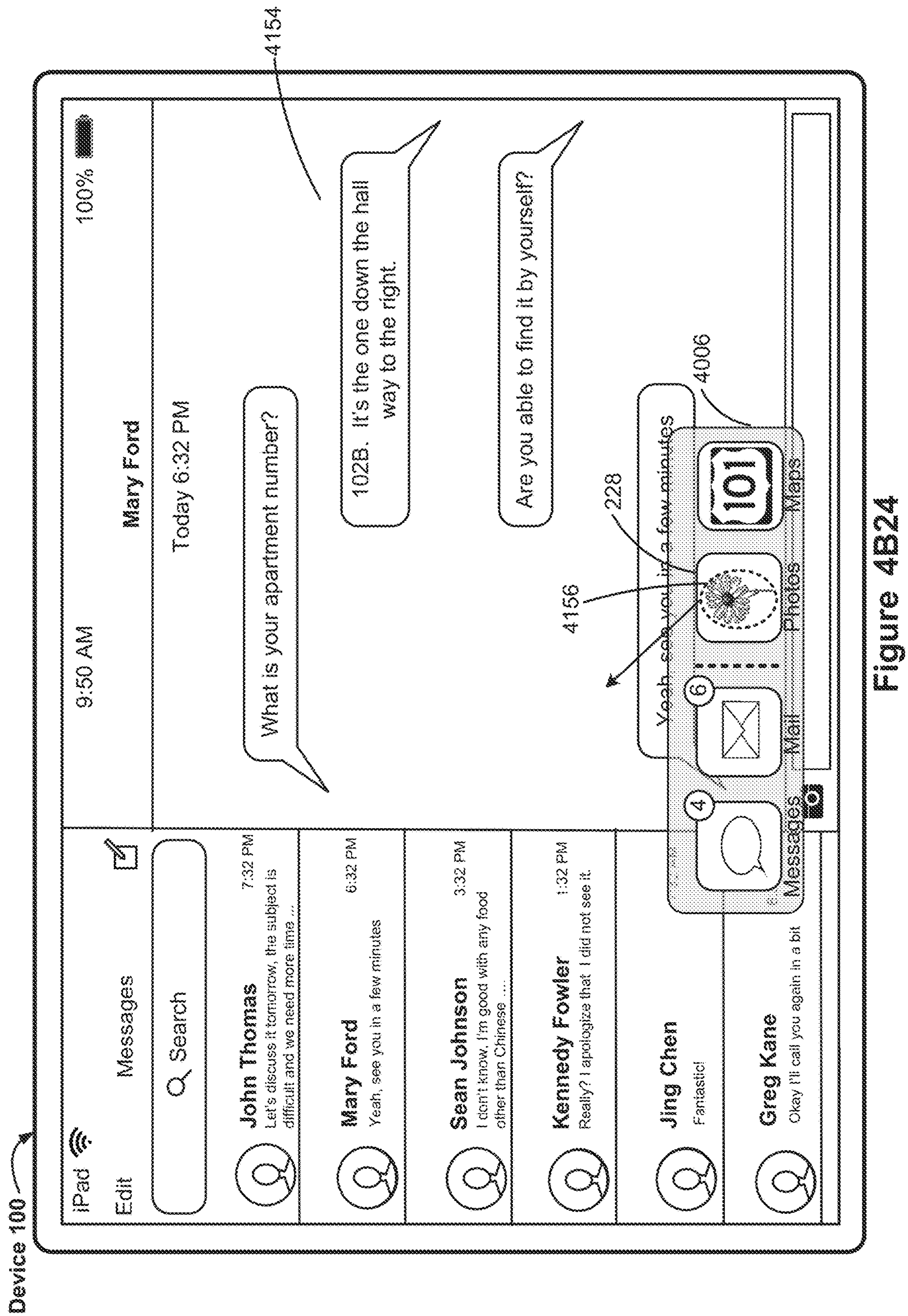
Figure 4B24

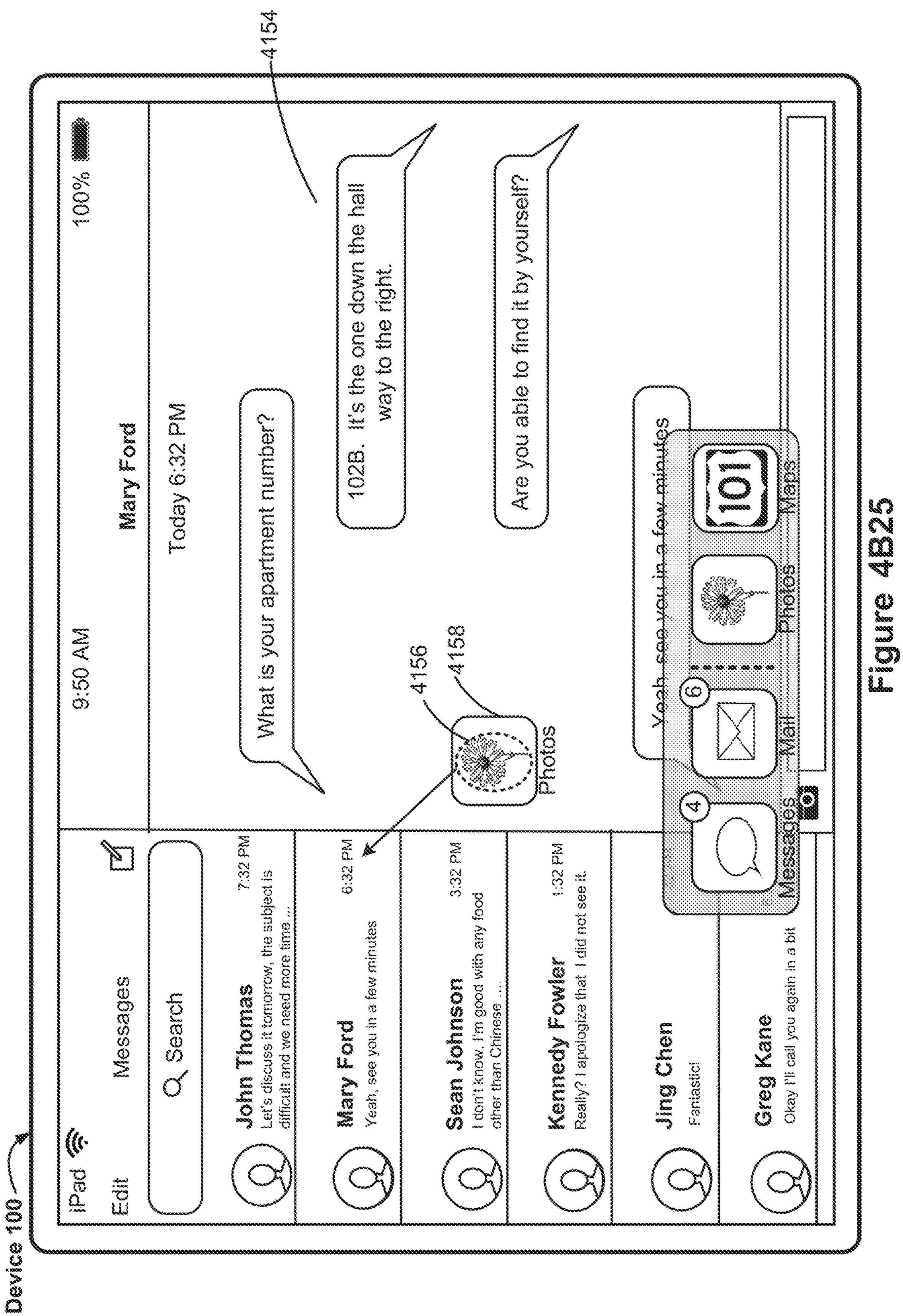
Figure 4B25

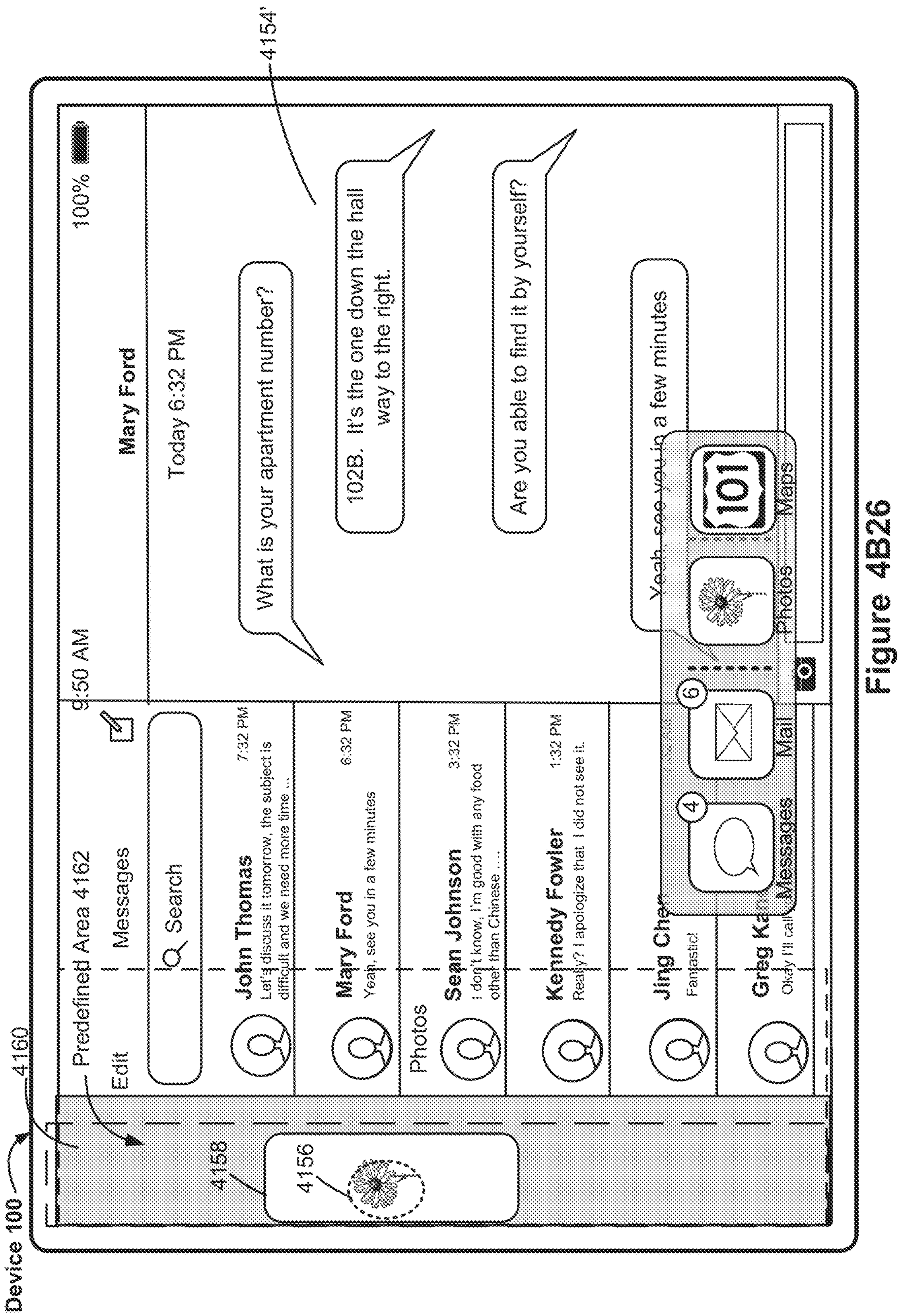
Figure 4B26

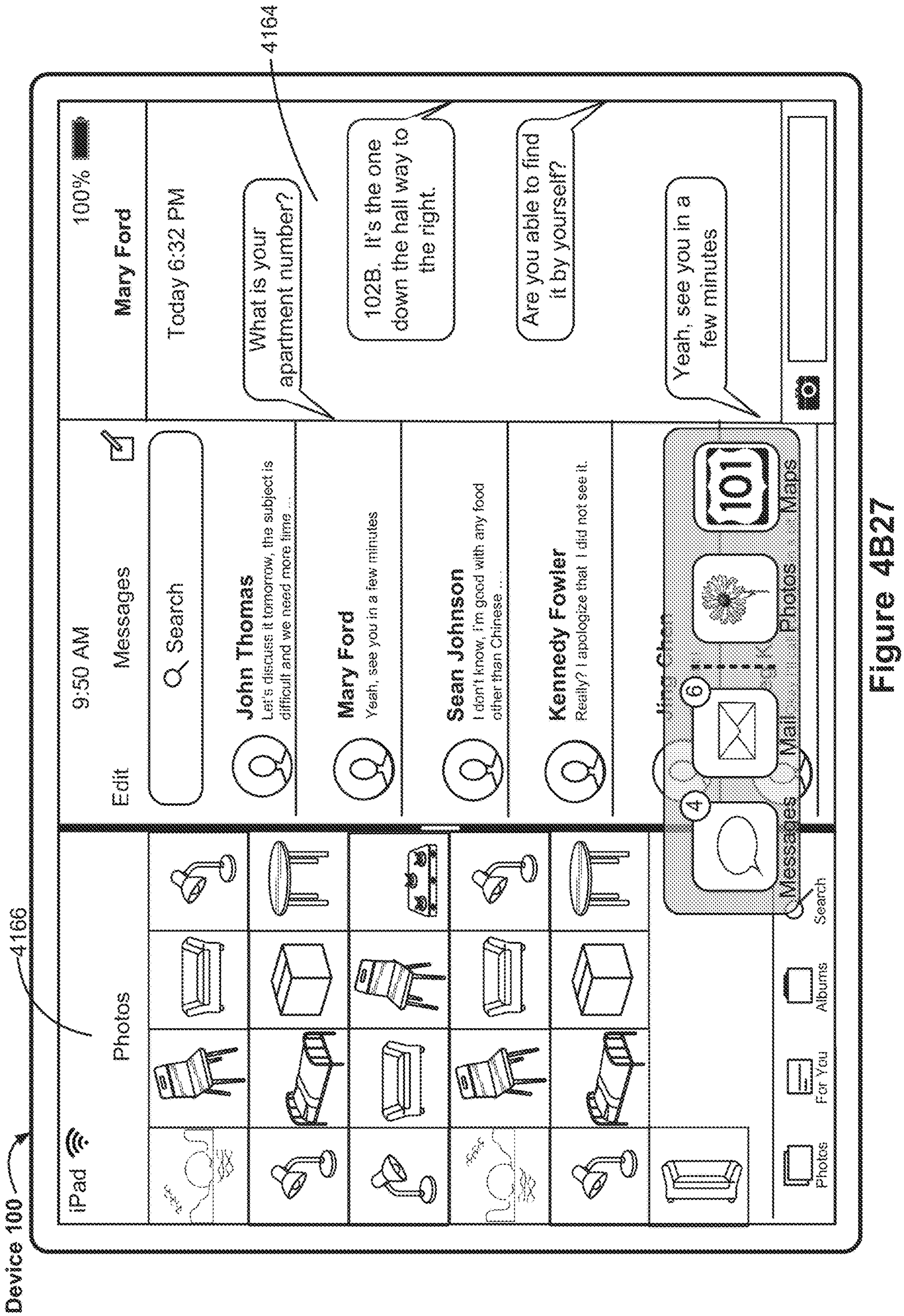
Figure 4B27

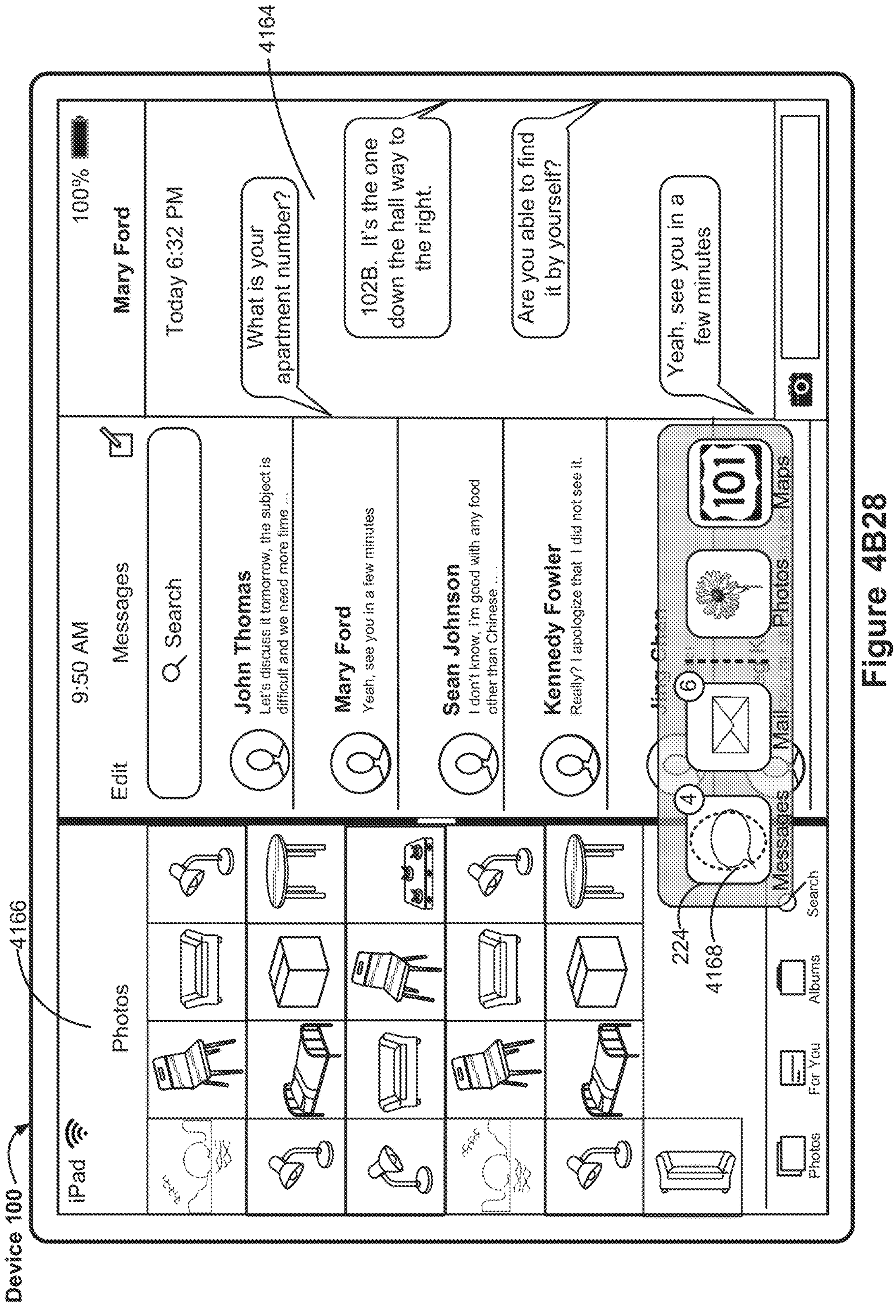
Figure 4B28

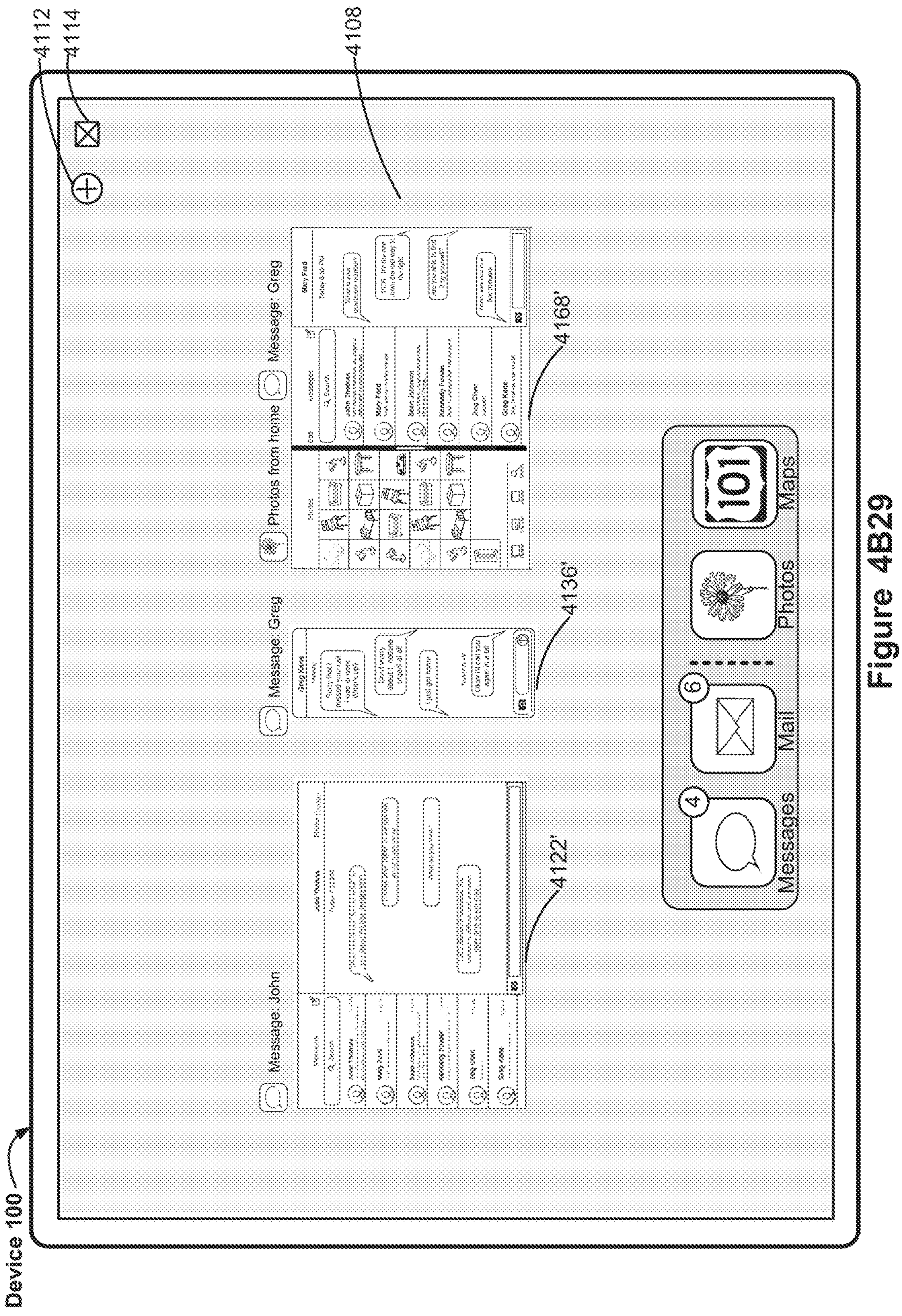
Figure 4B29

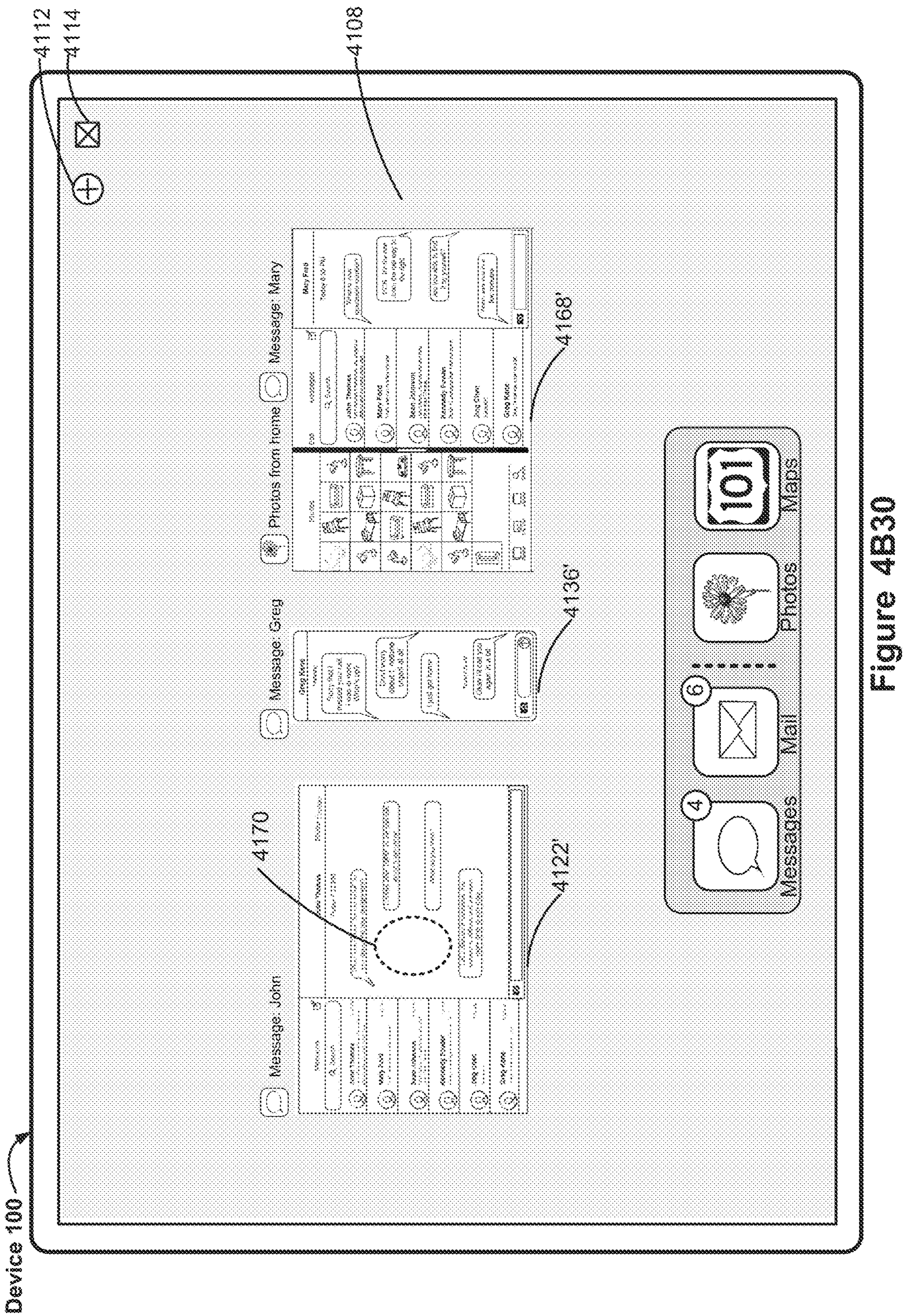
Figure 4B30

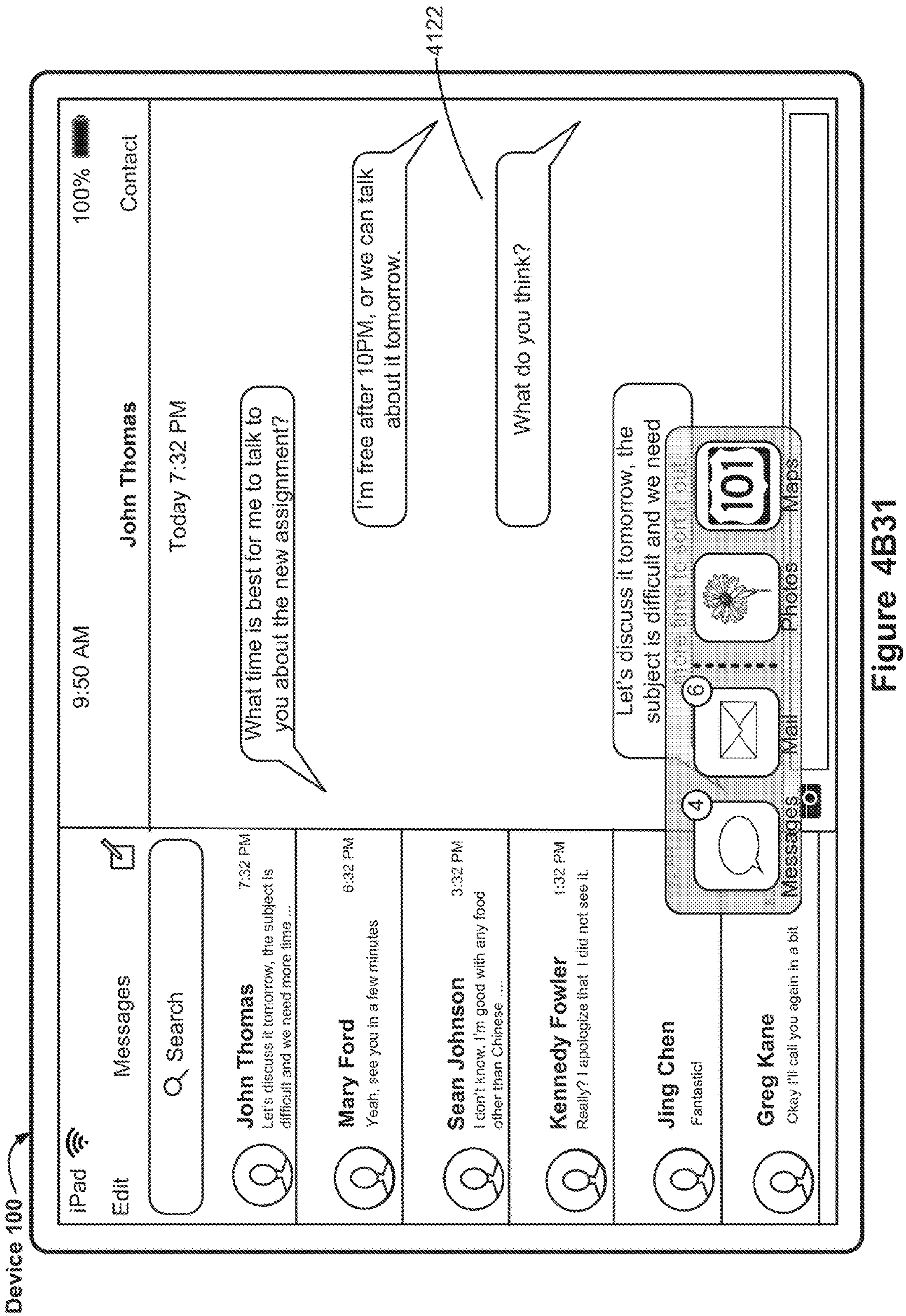
Figure 4B31

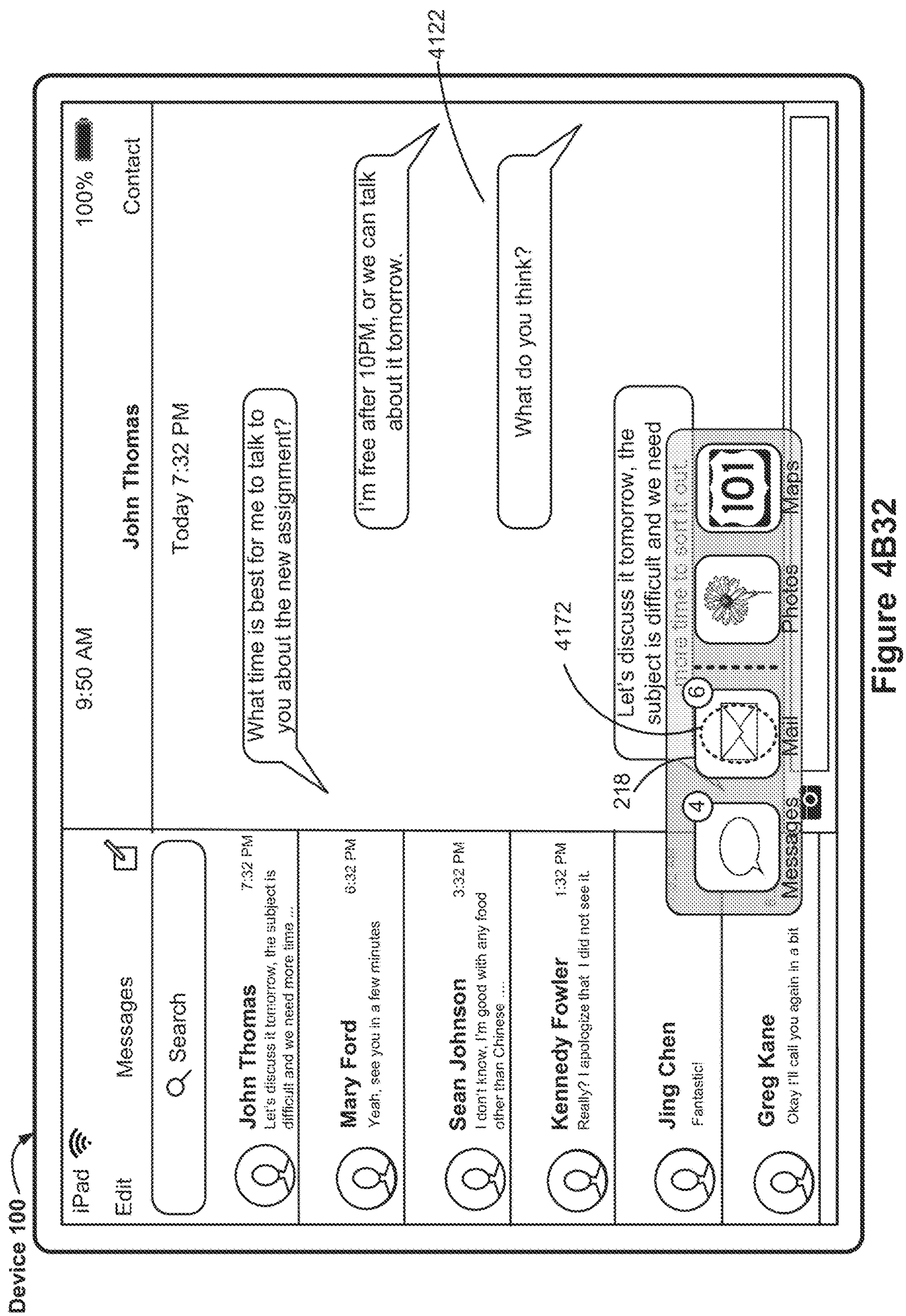
Figure 4B32

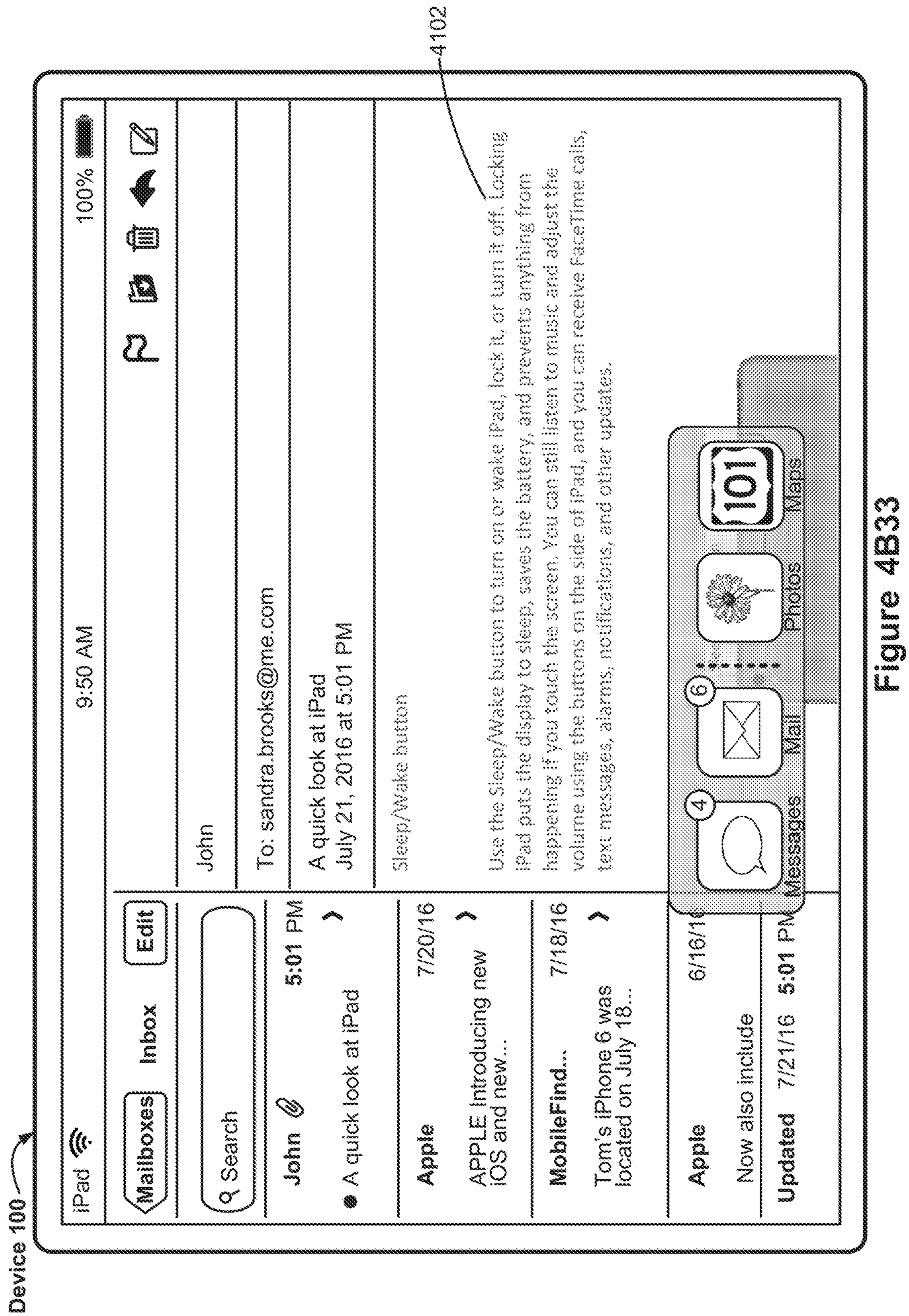
Figure 4B33

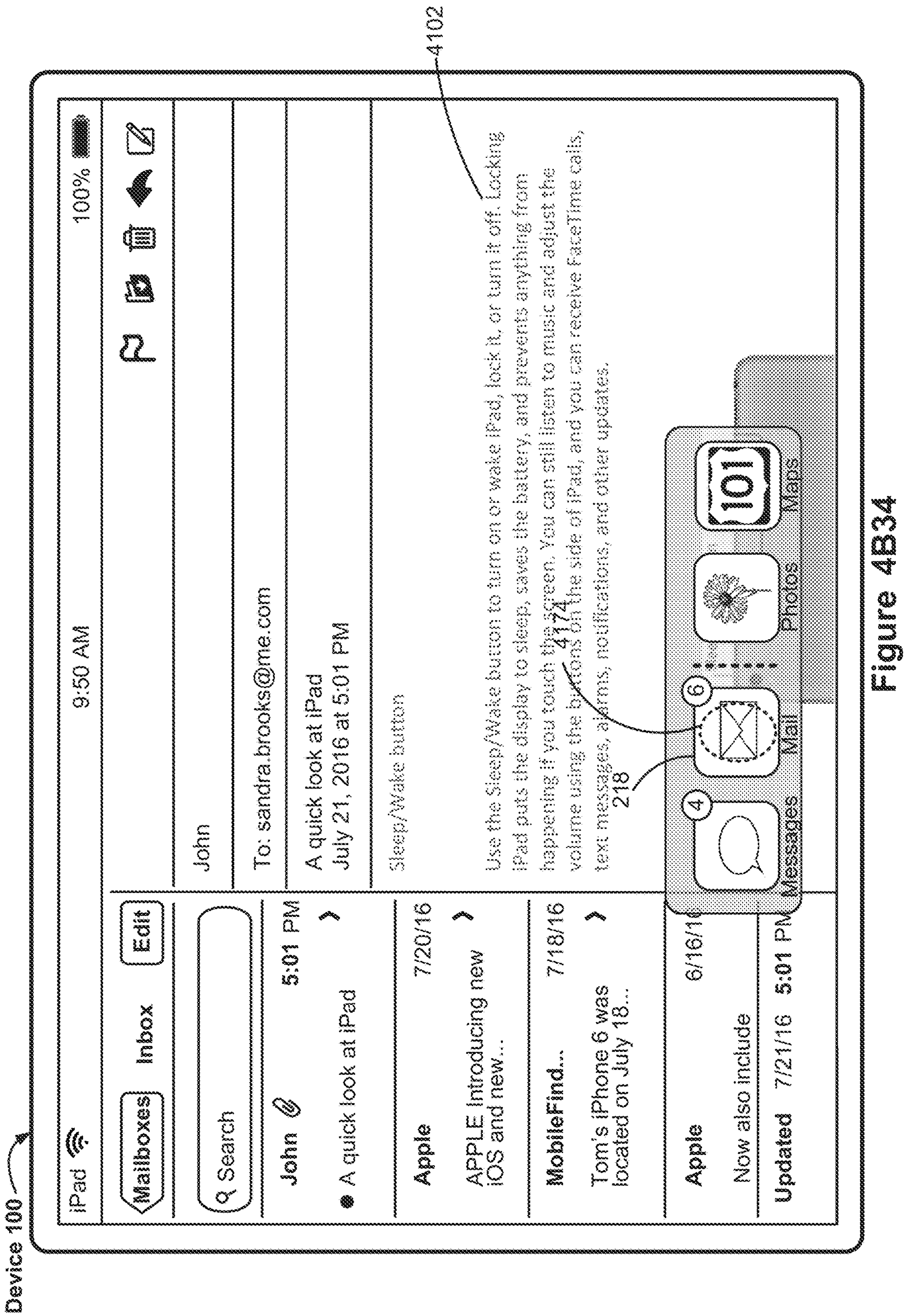
Figure 4B34

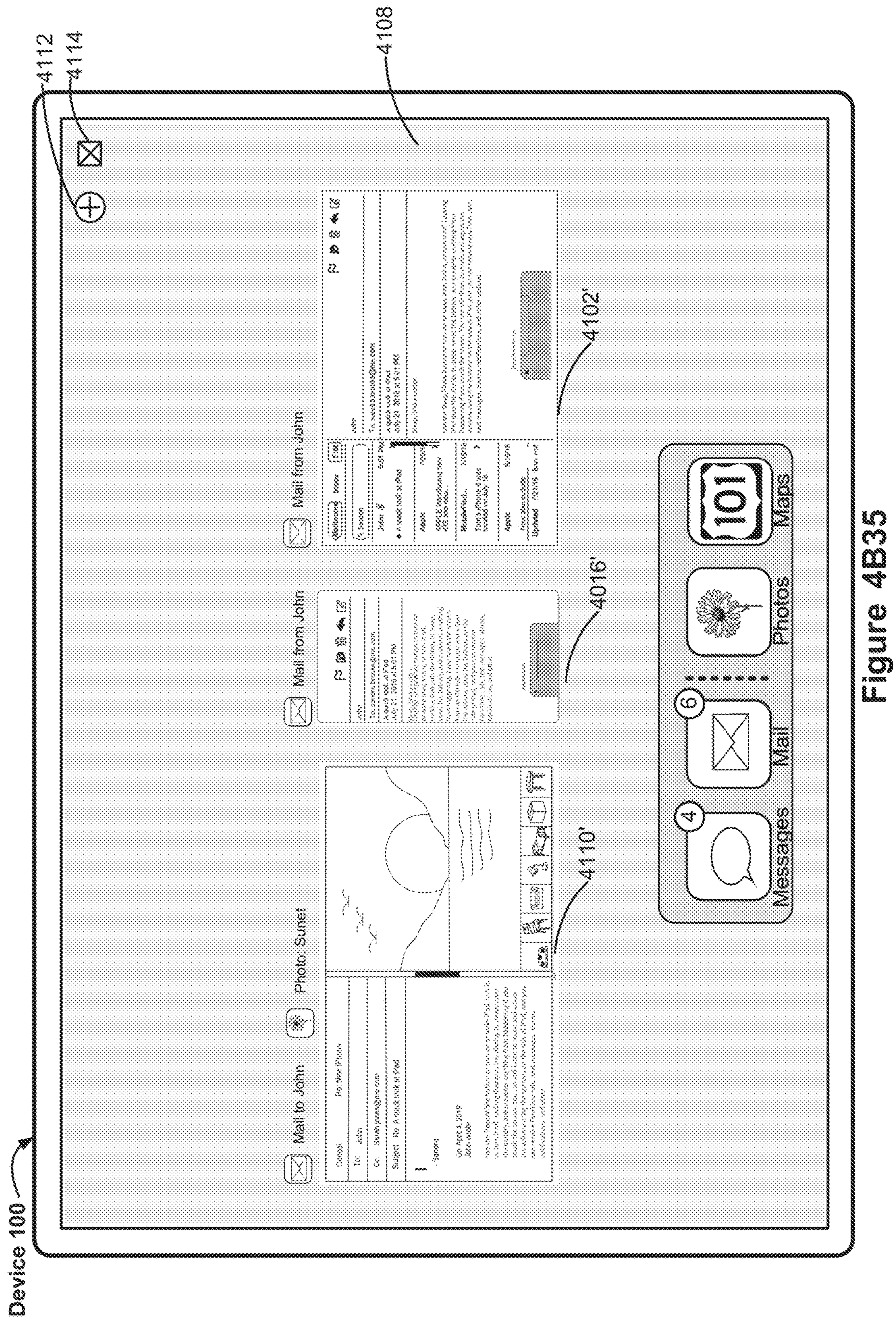
Figure 4B35

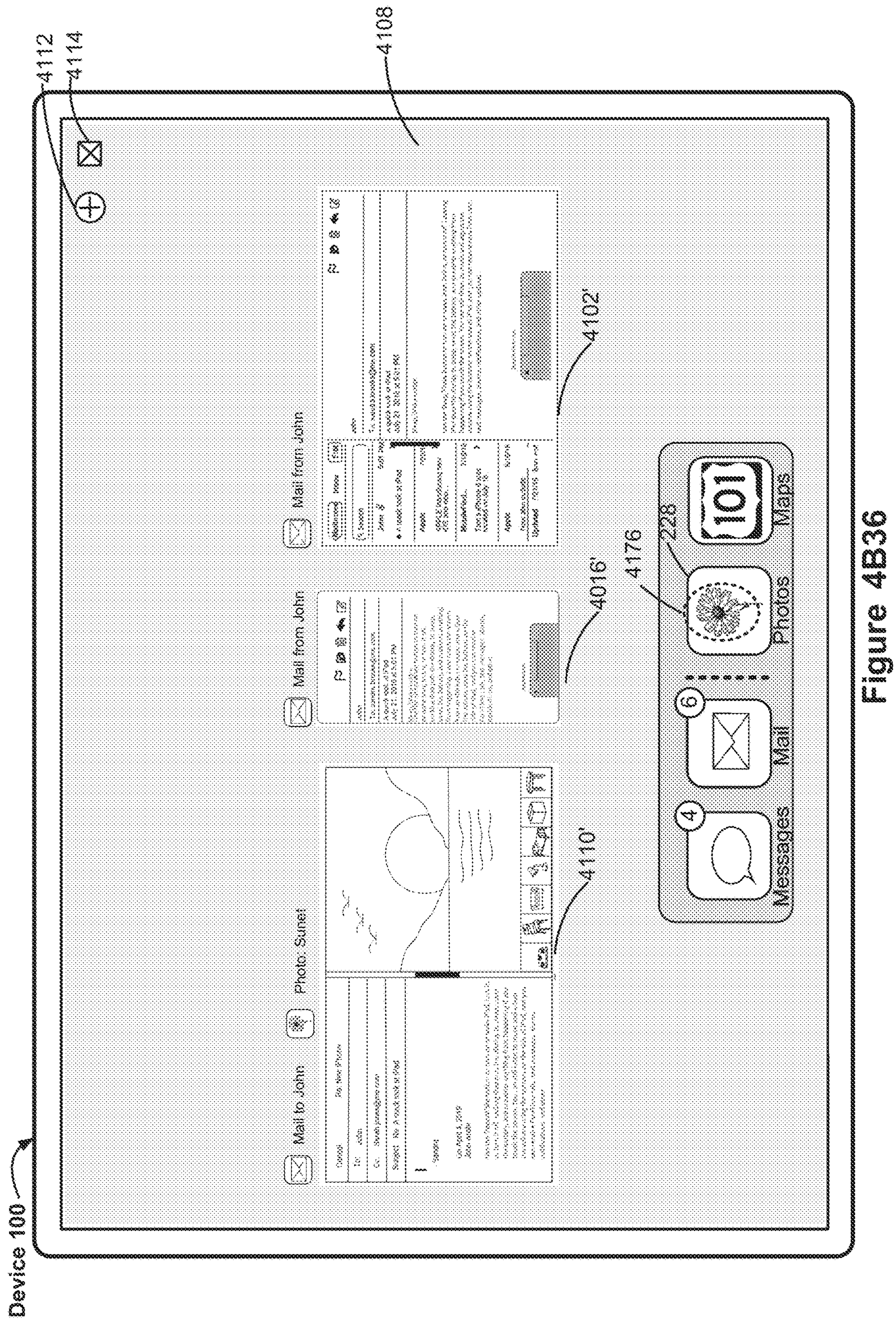
Figure 4B36

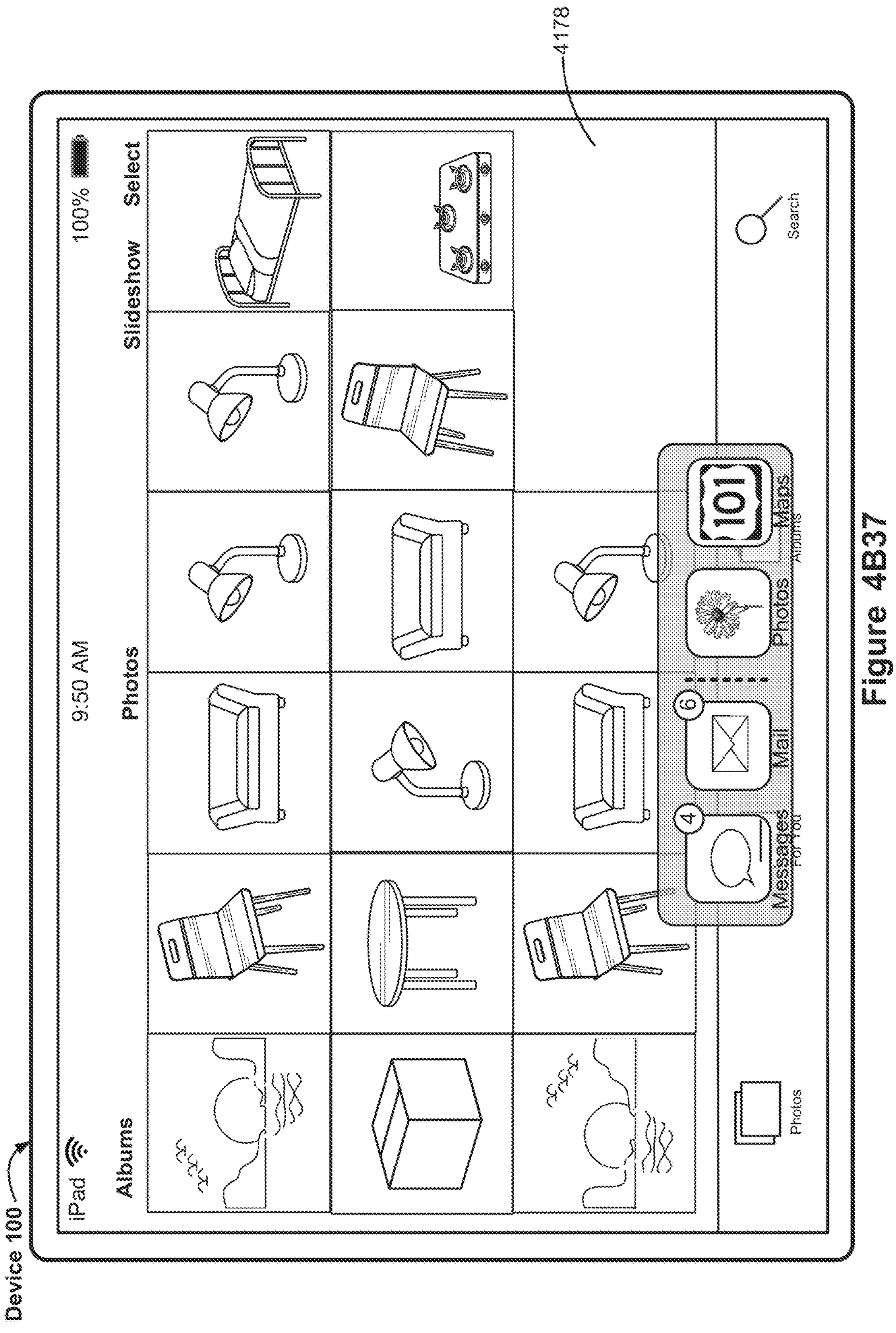
Figure 4B37

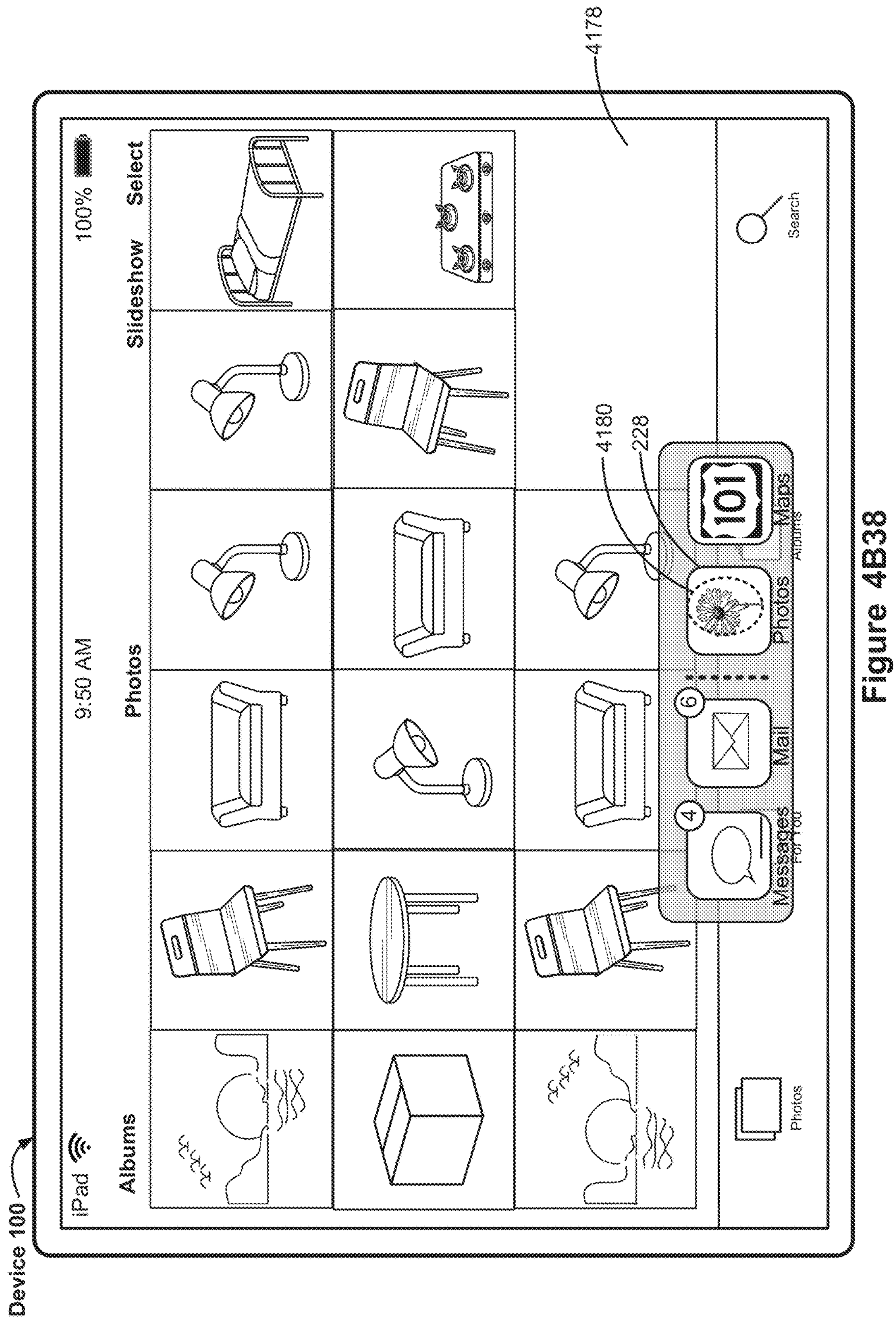
Figure 4B38

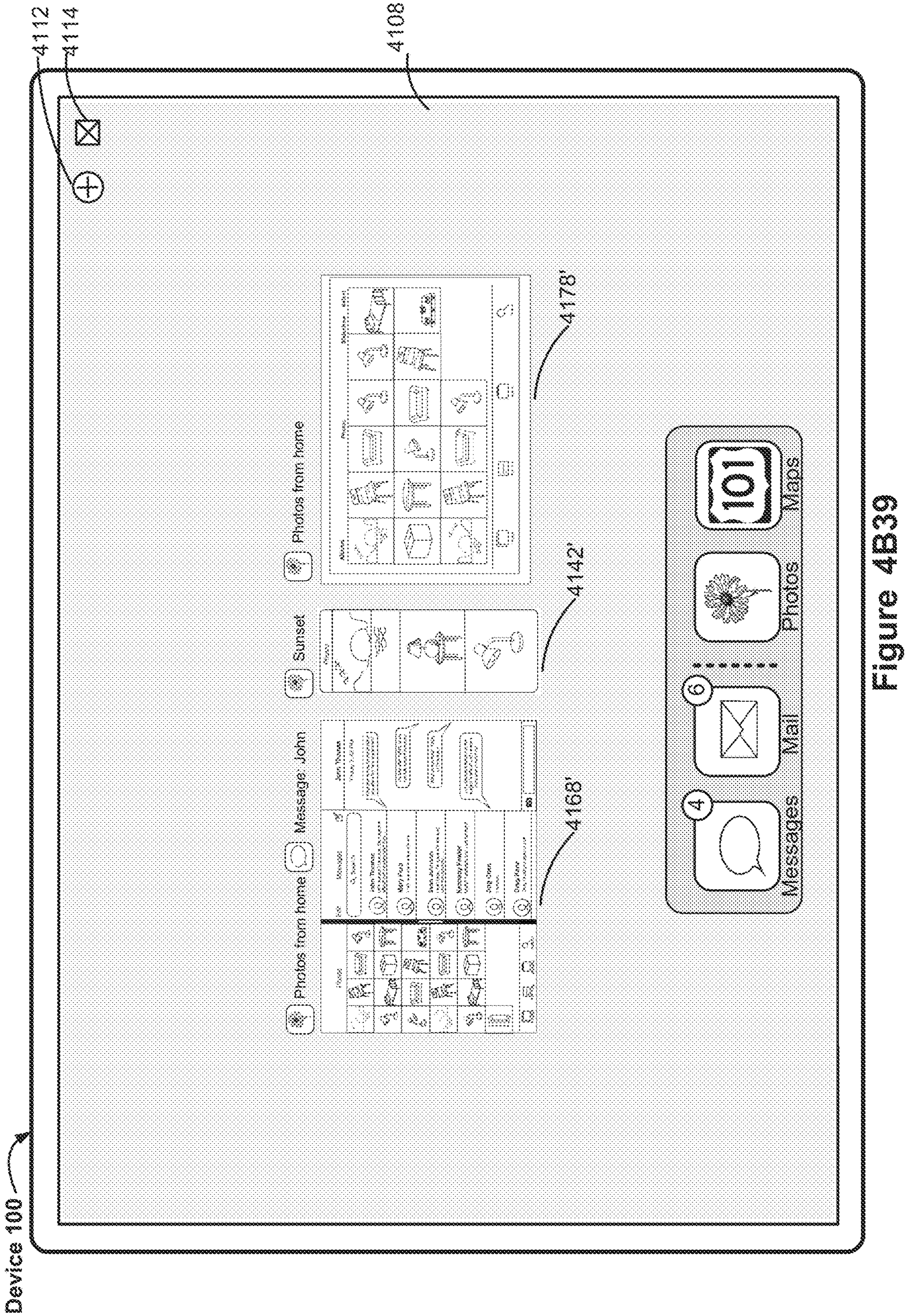
Figure 4B39

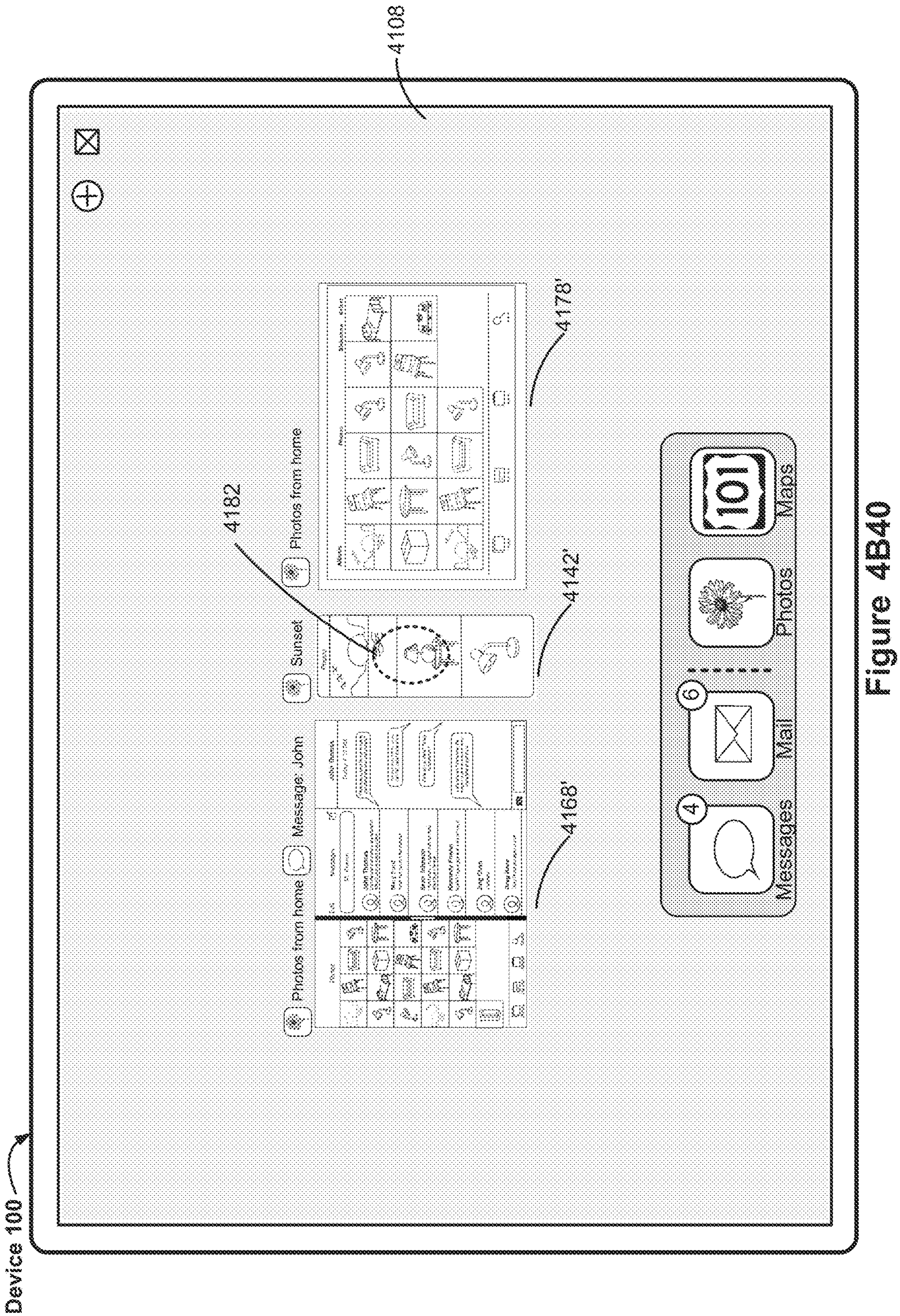
Figure 4B40

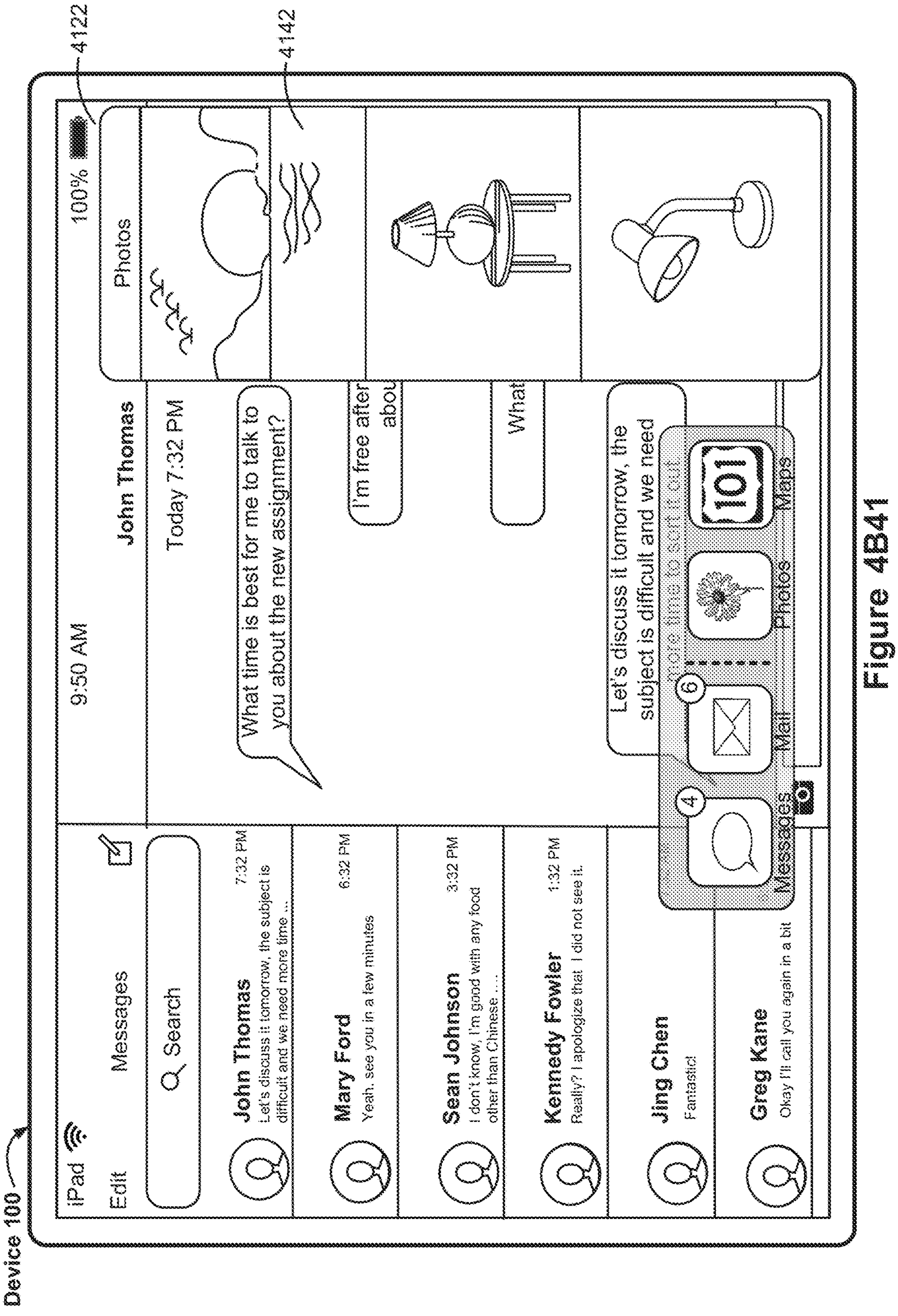
Figure 4B41

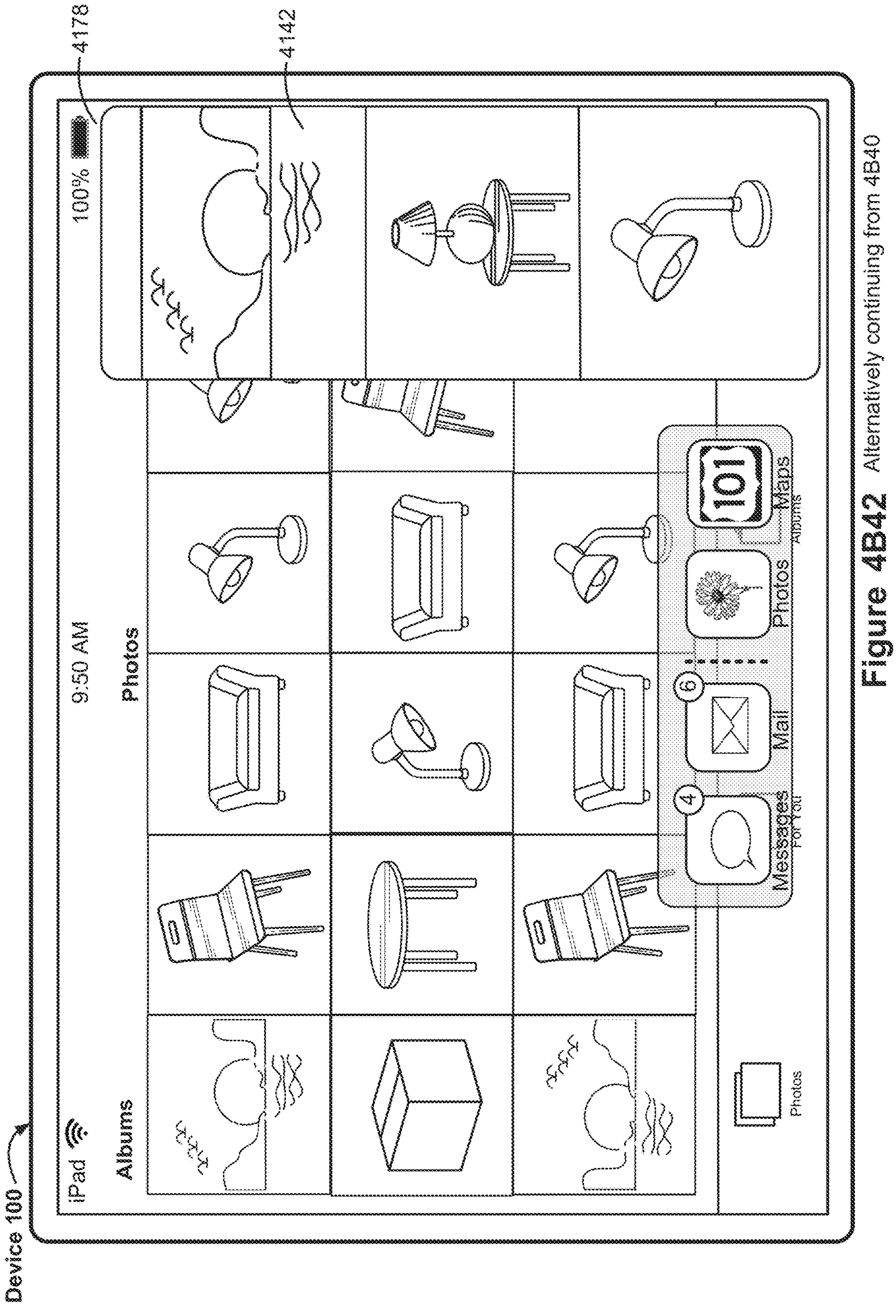
Figure 4B42 Alternatively continuing from 4B40

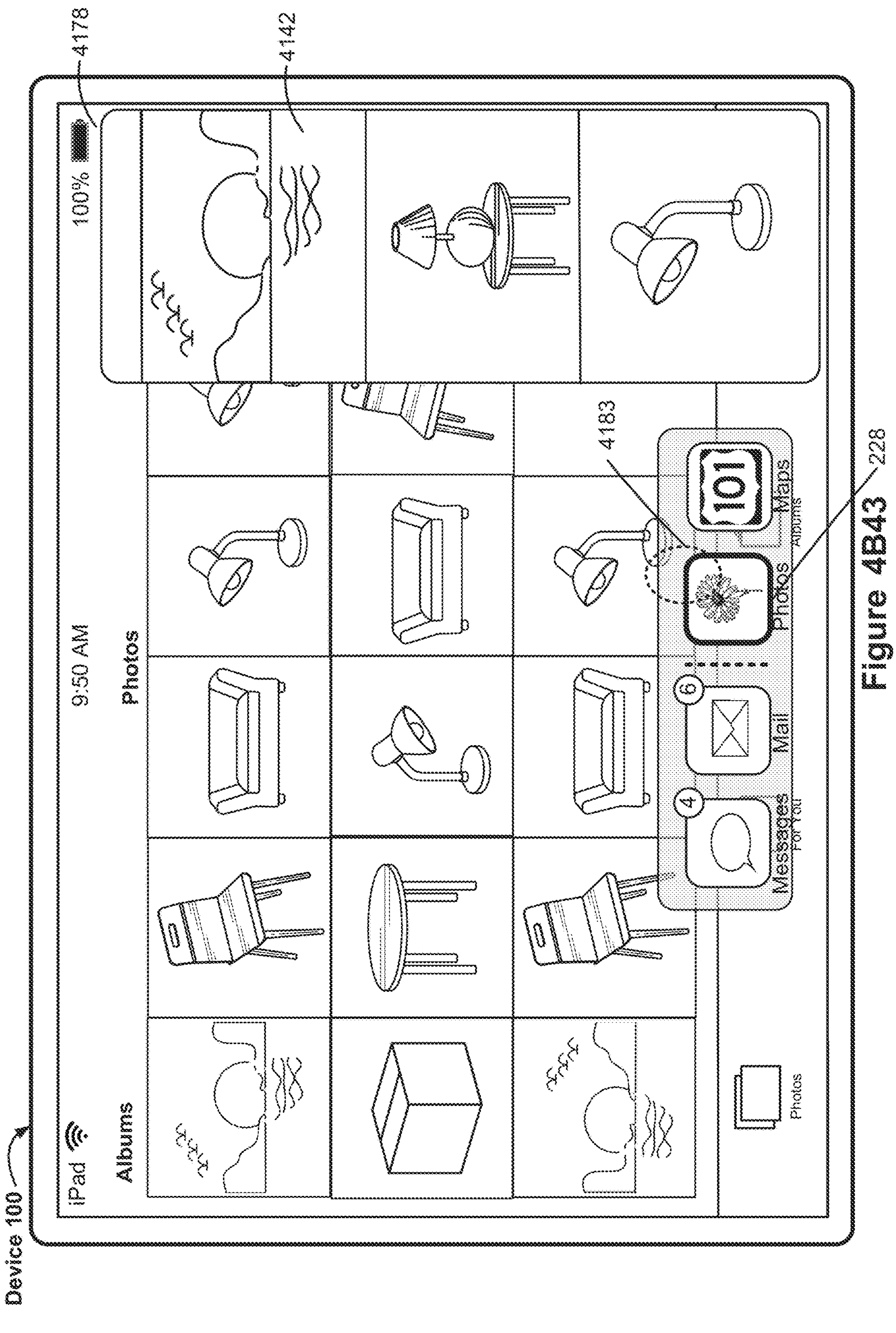
Figure 4B43

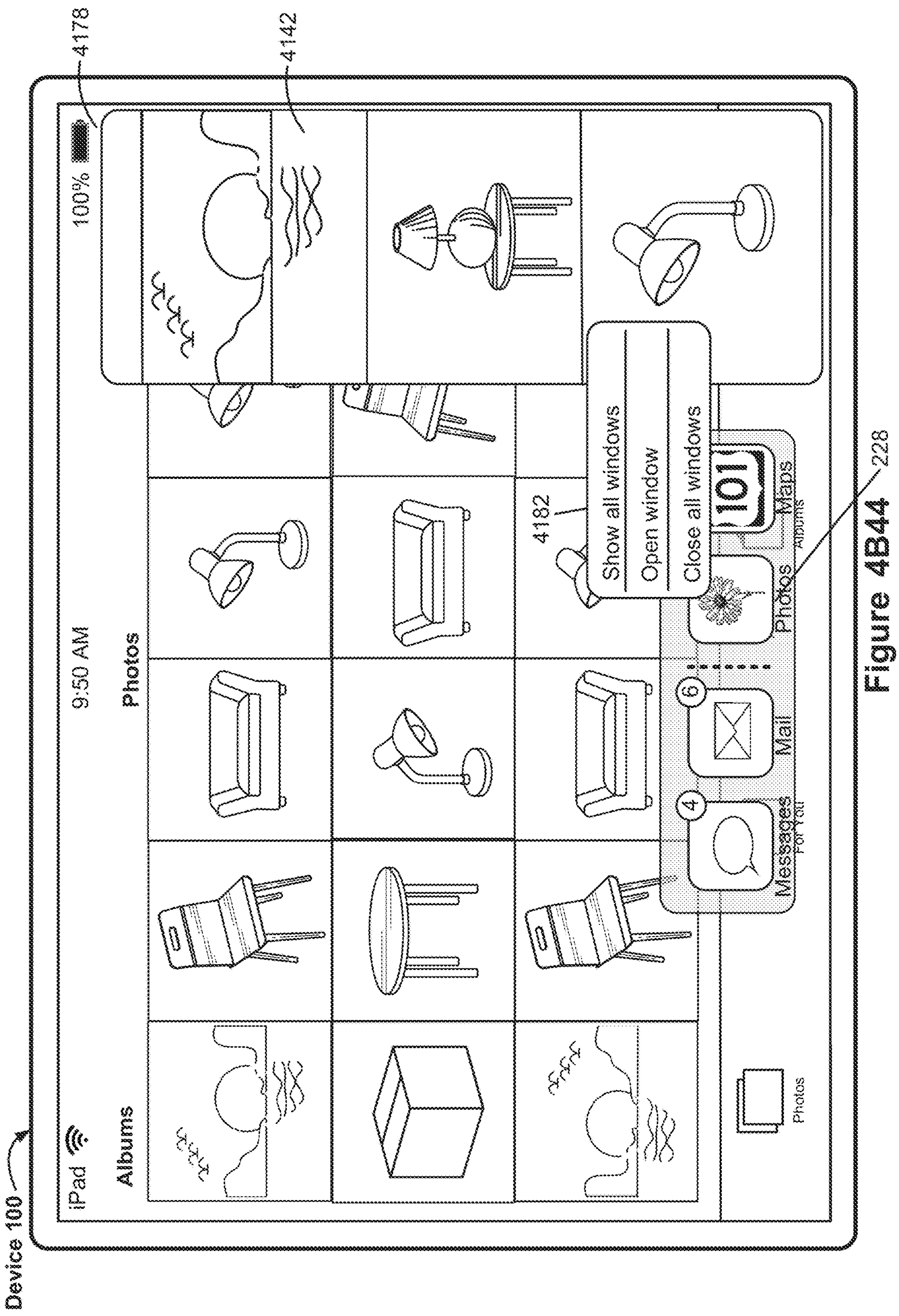
Figure 4B44

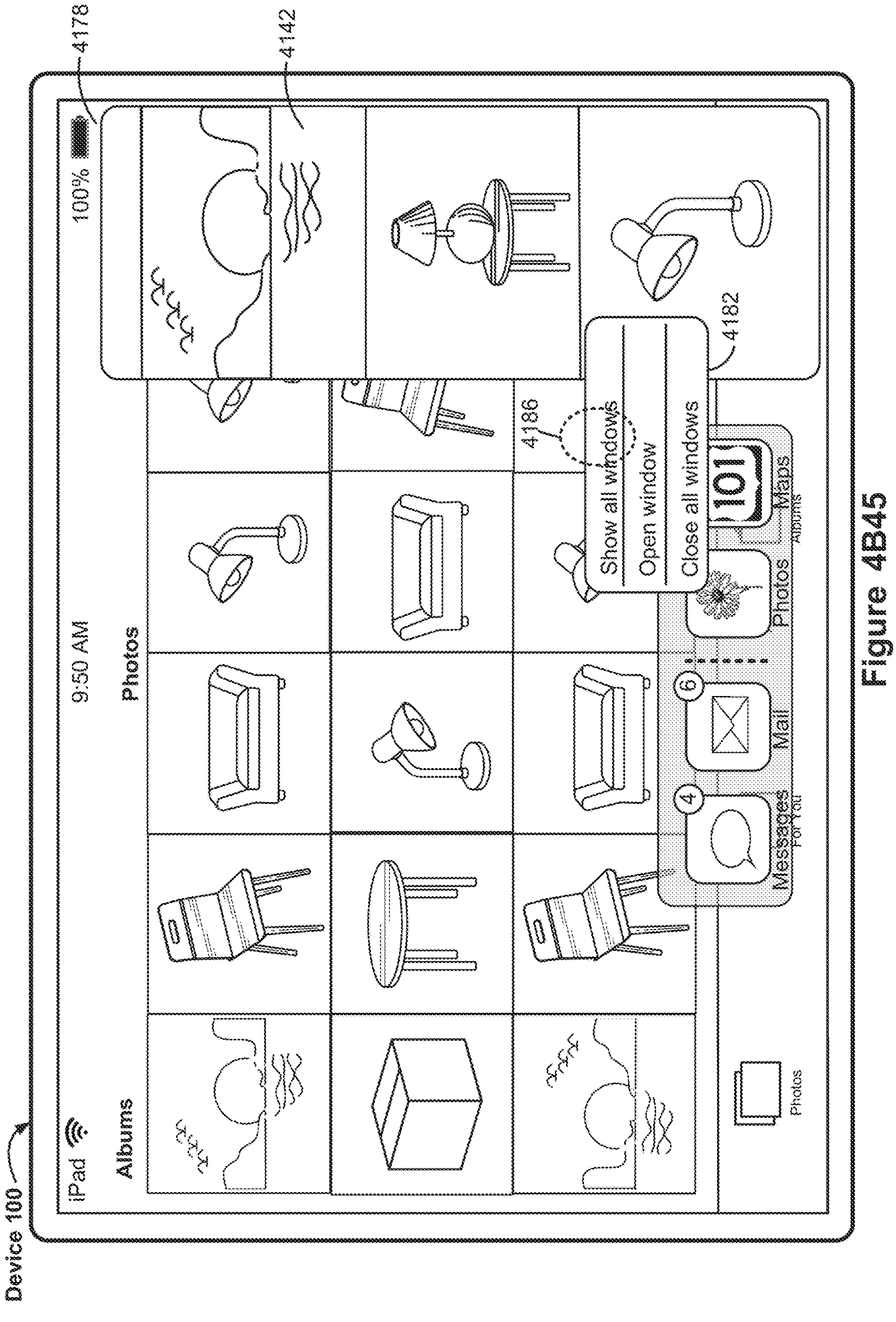
Figure 4B45

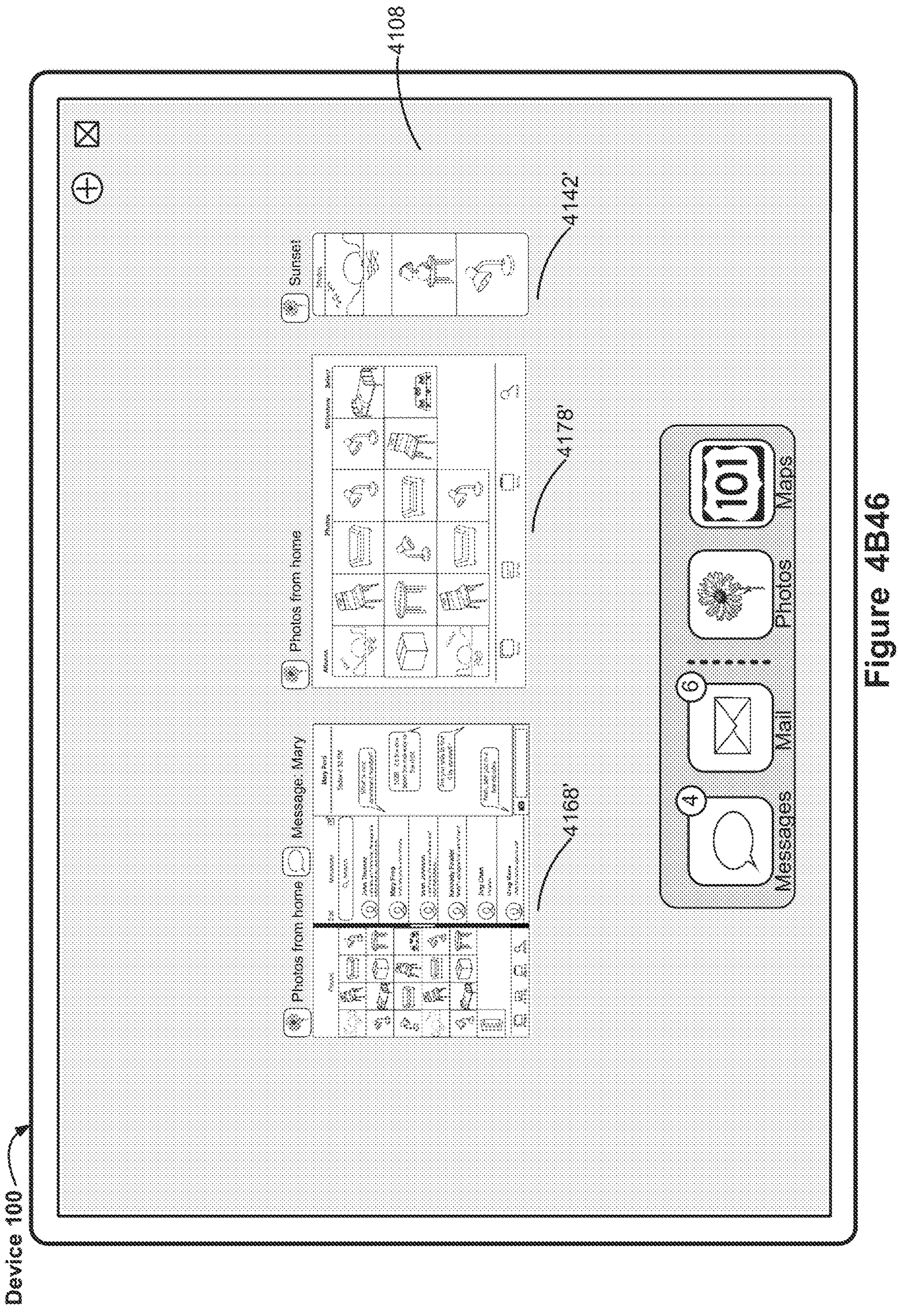
Figure 4B46

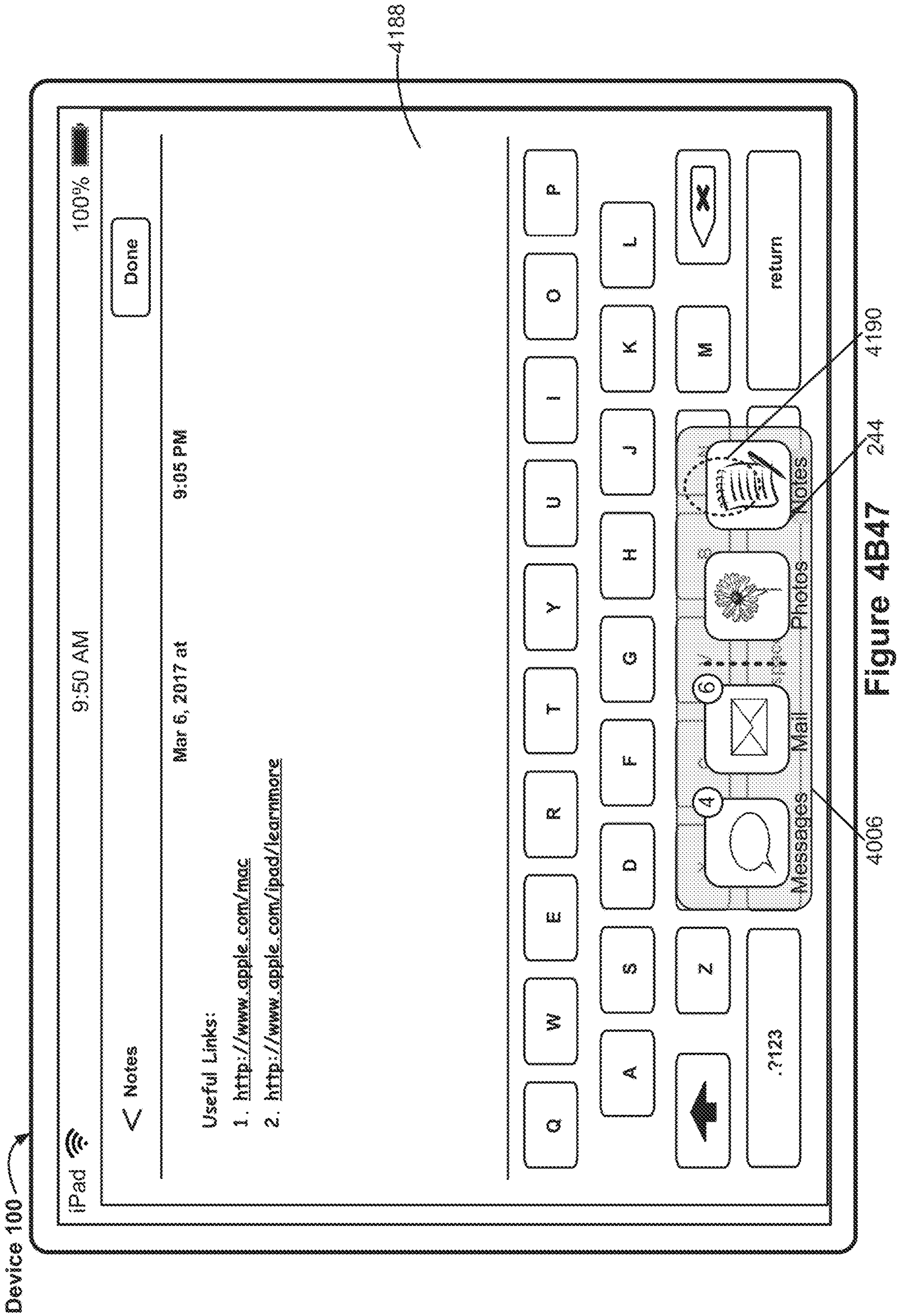
Figure 4B47

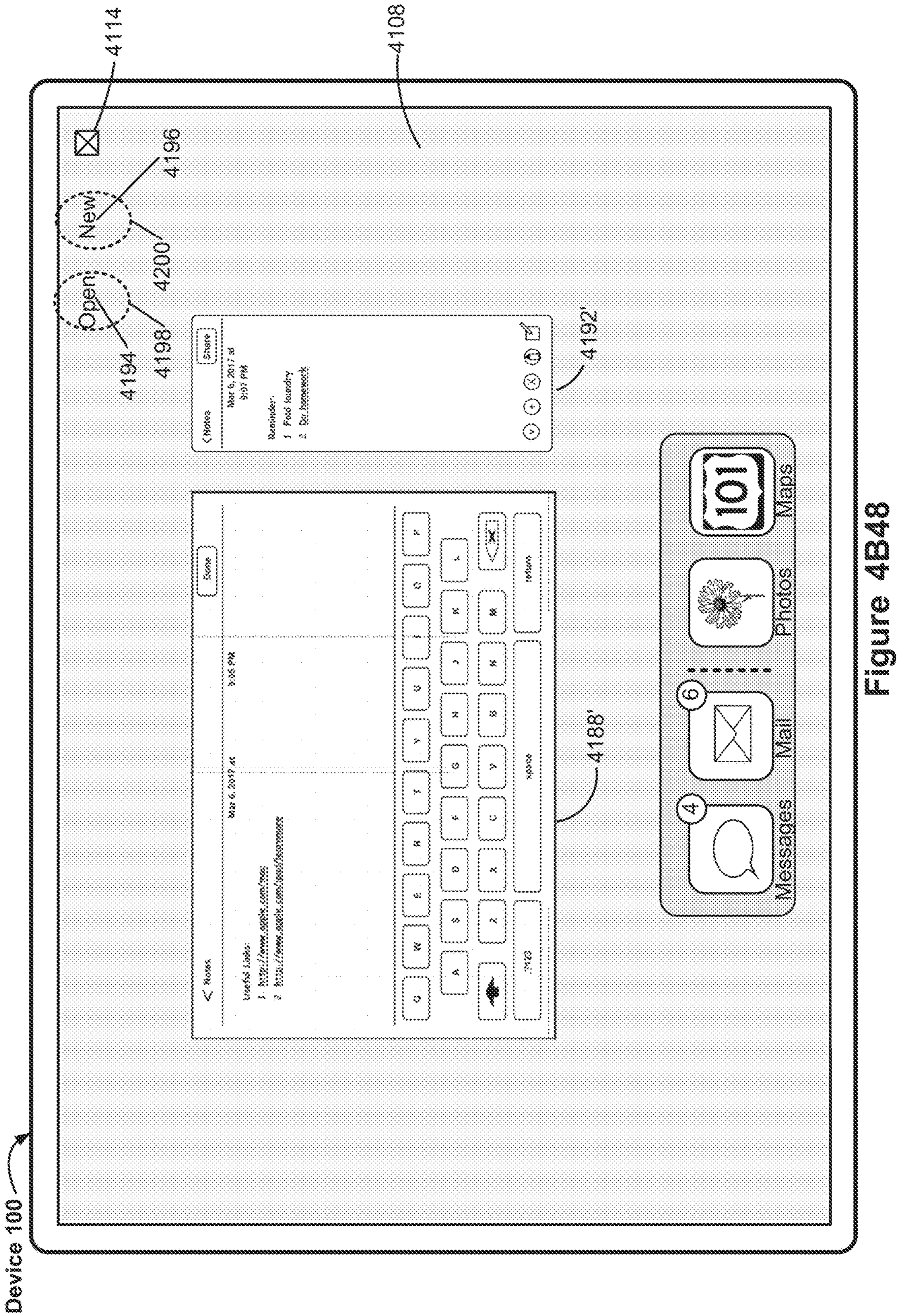
Figure 4B48

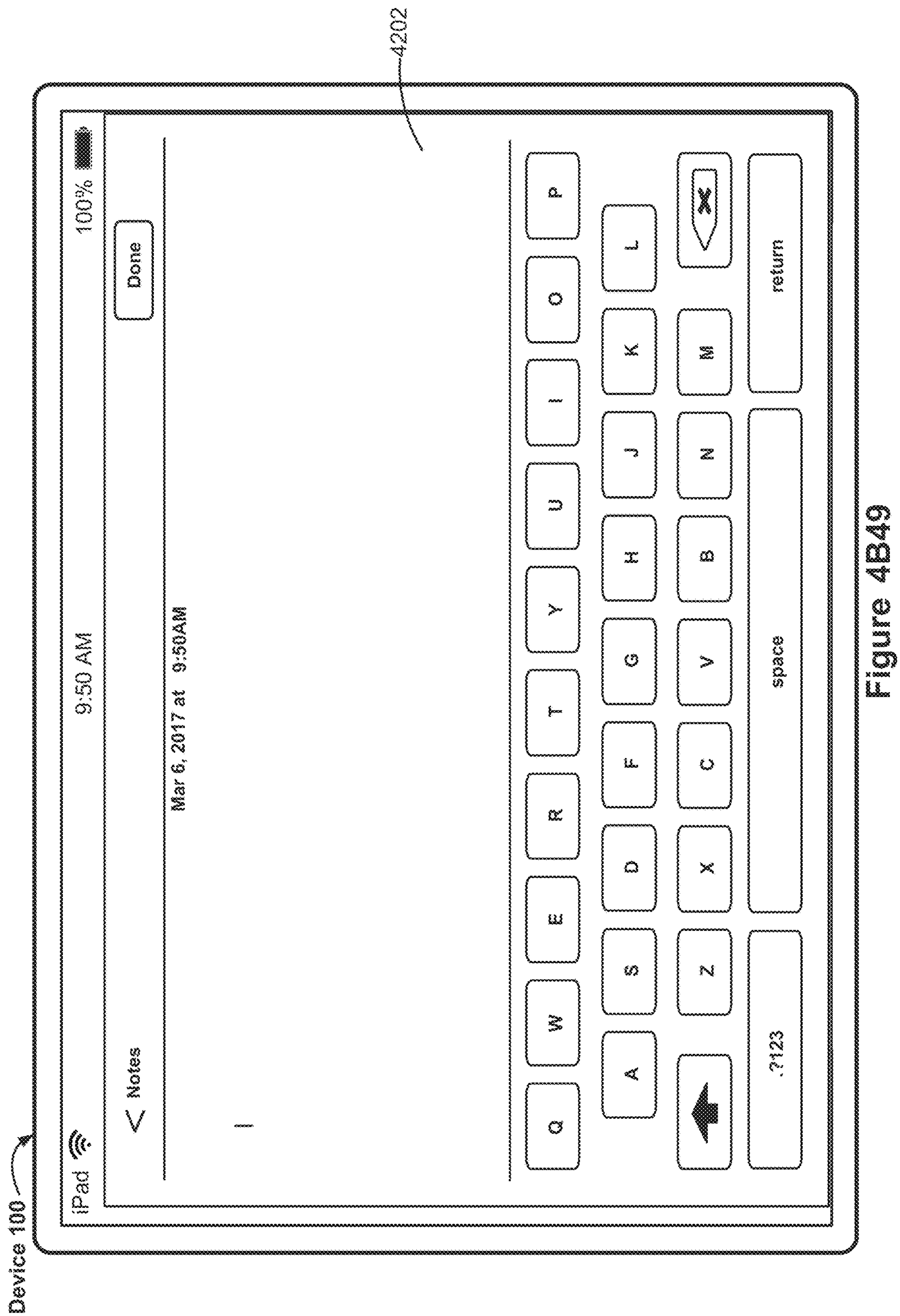
Figure 4B49

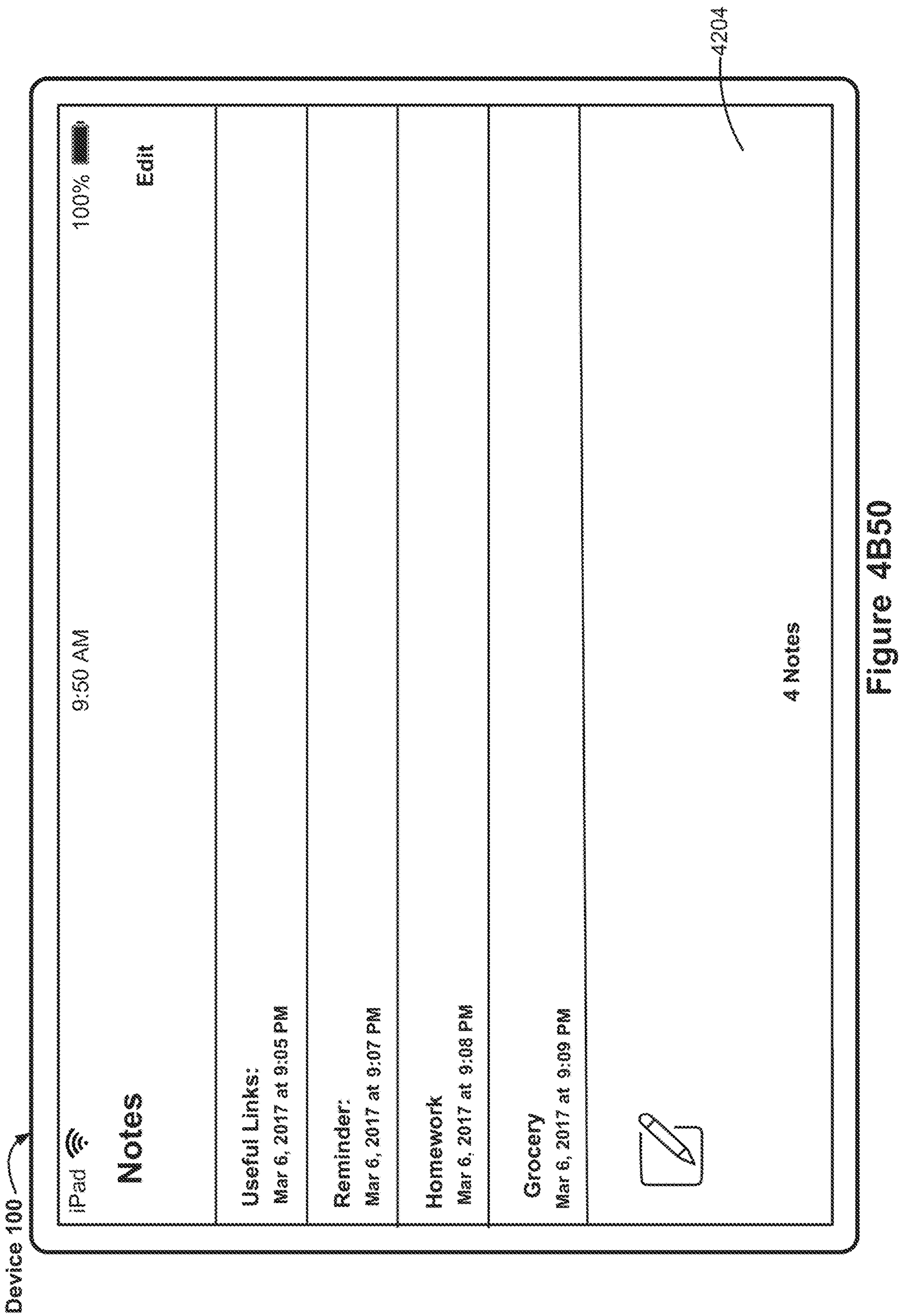
Figure 4B50

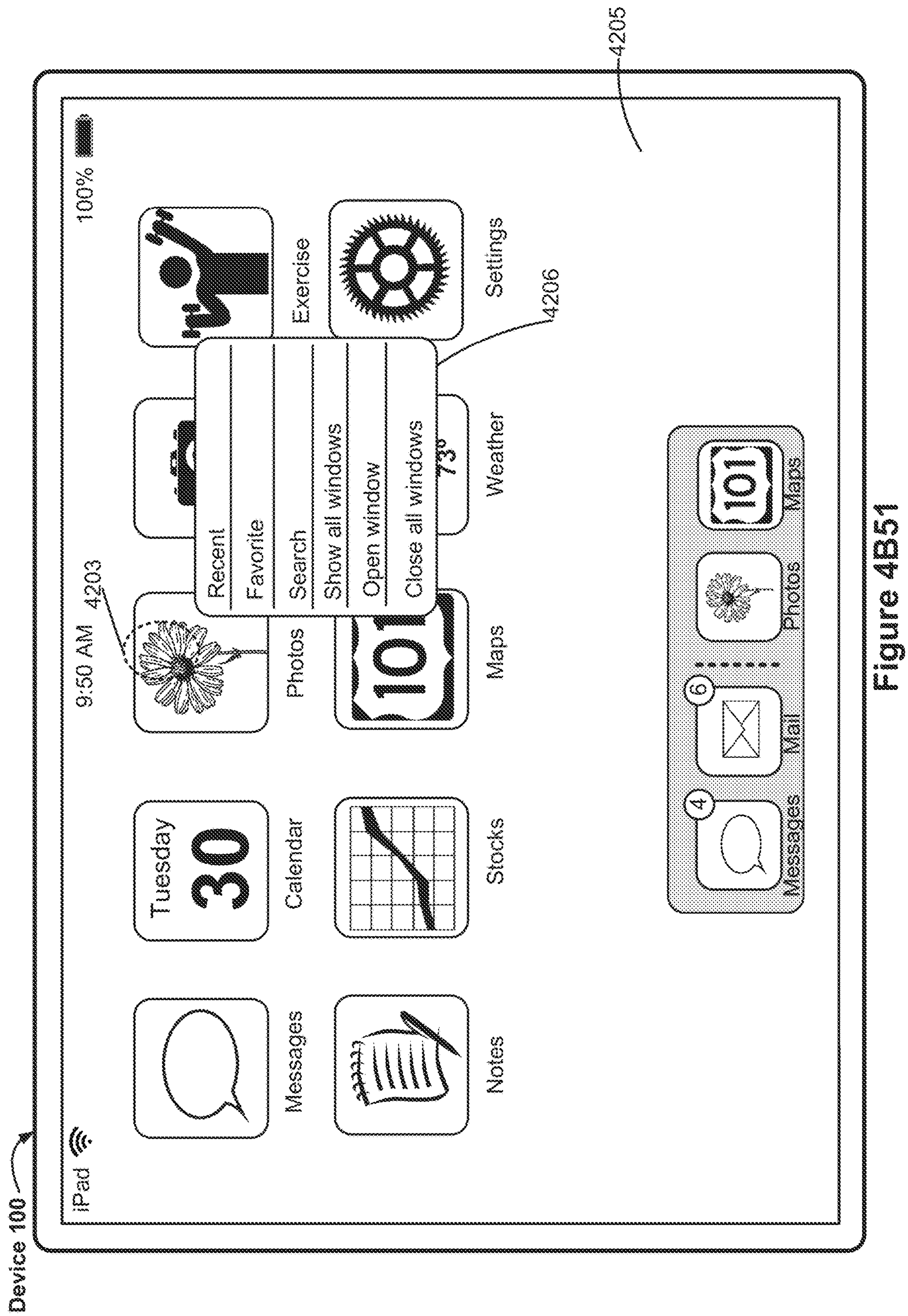
Figure 4B51

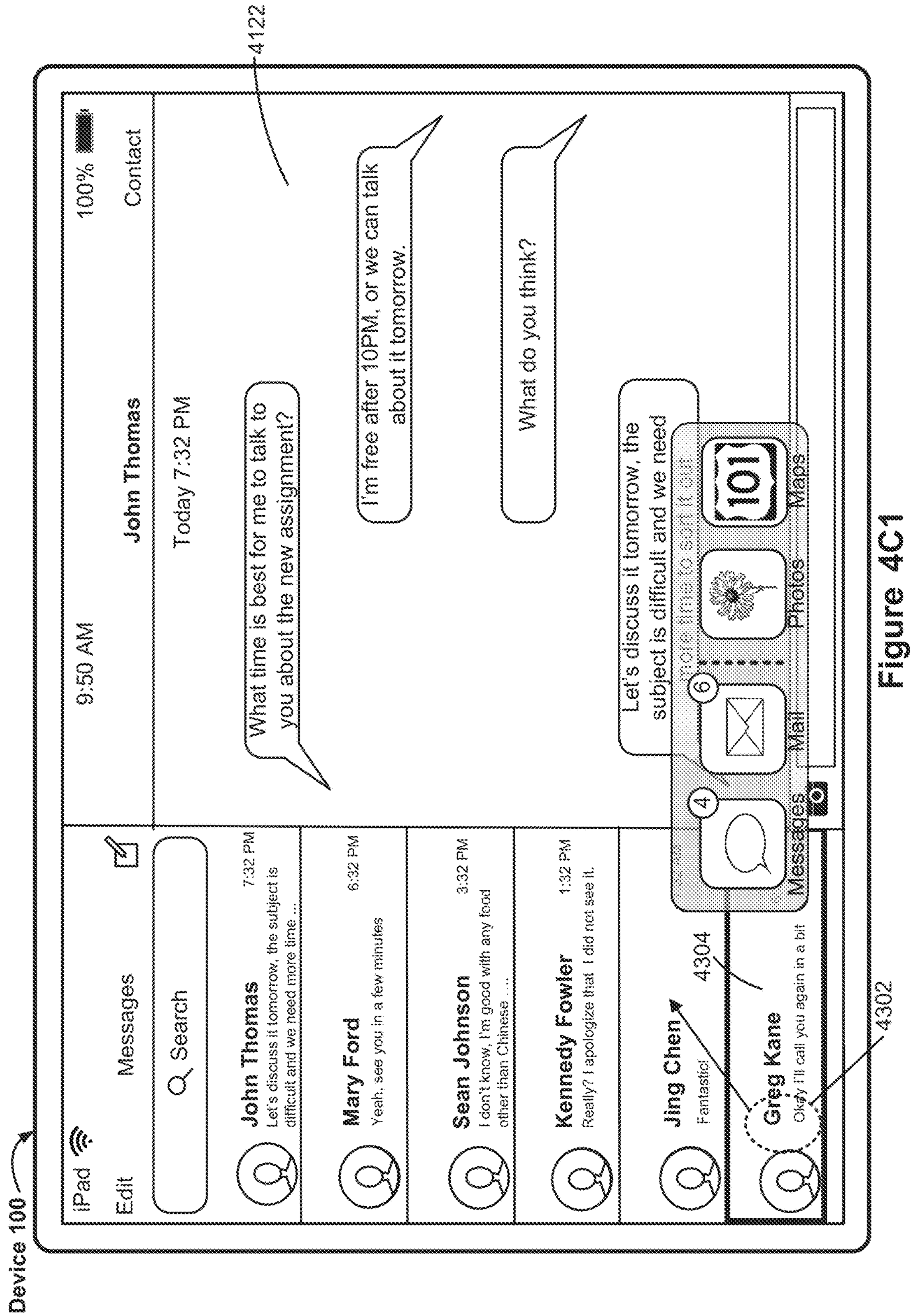
Figure 4C1

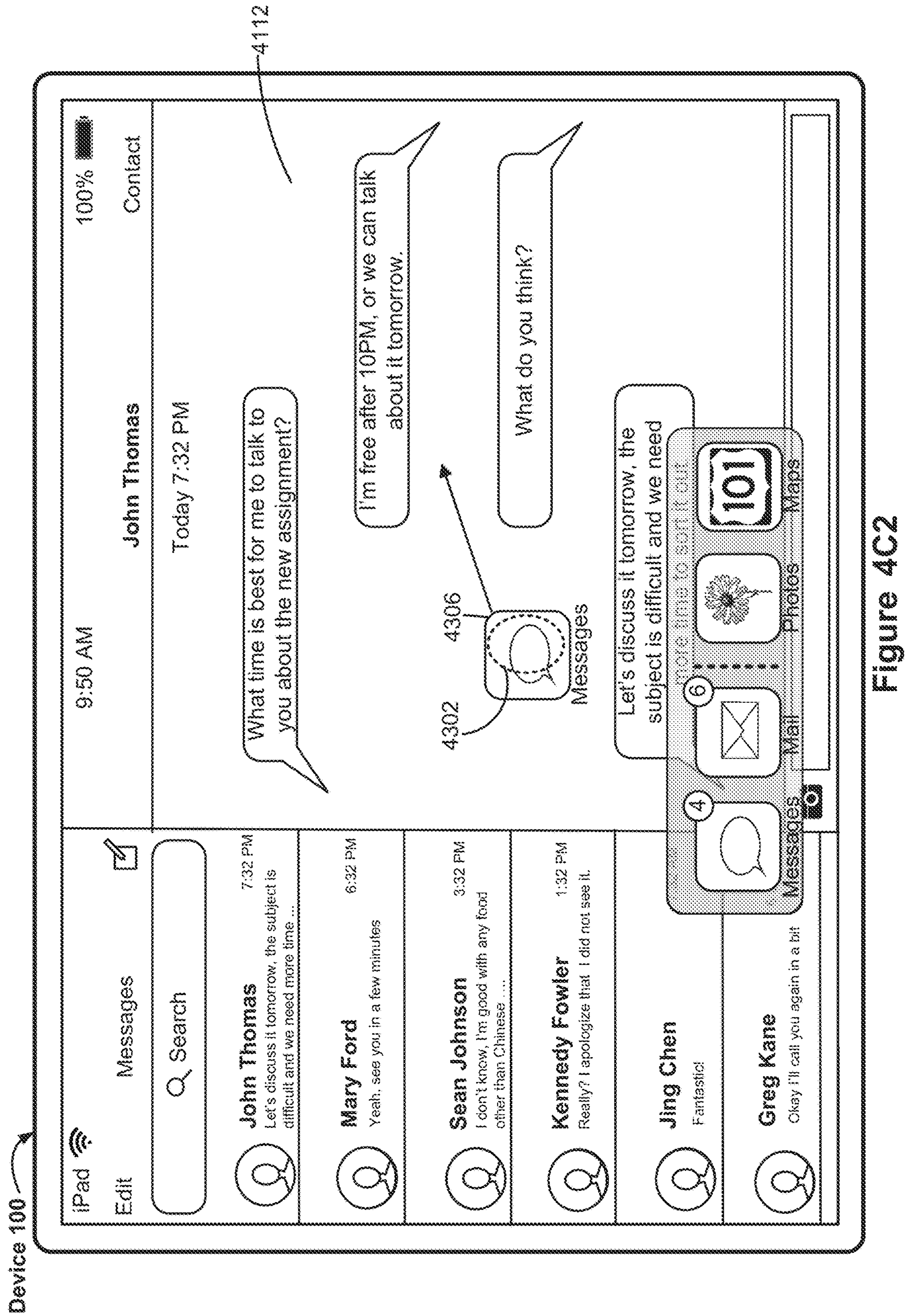
Figure 4C2

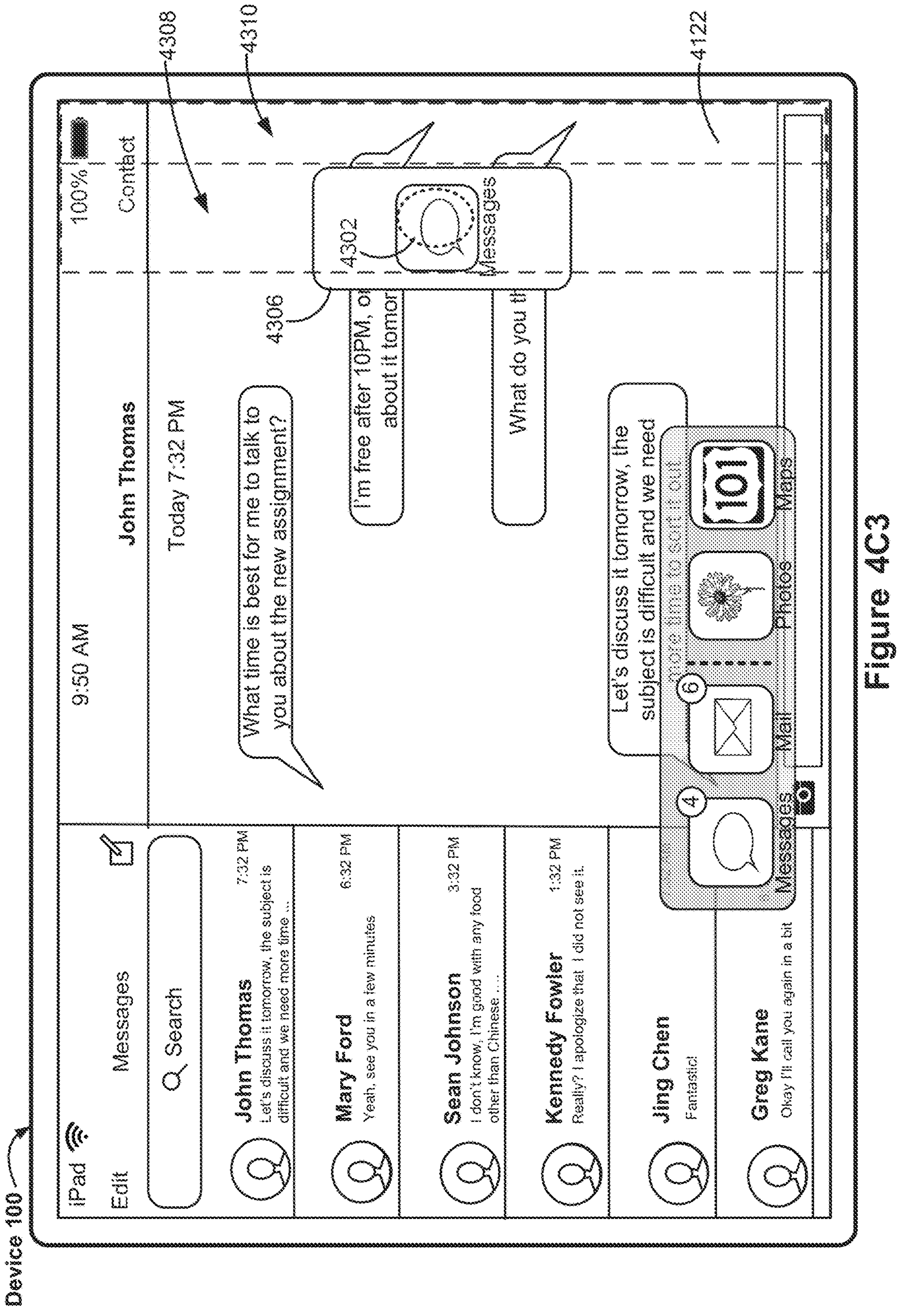
Figure 4C3

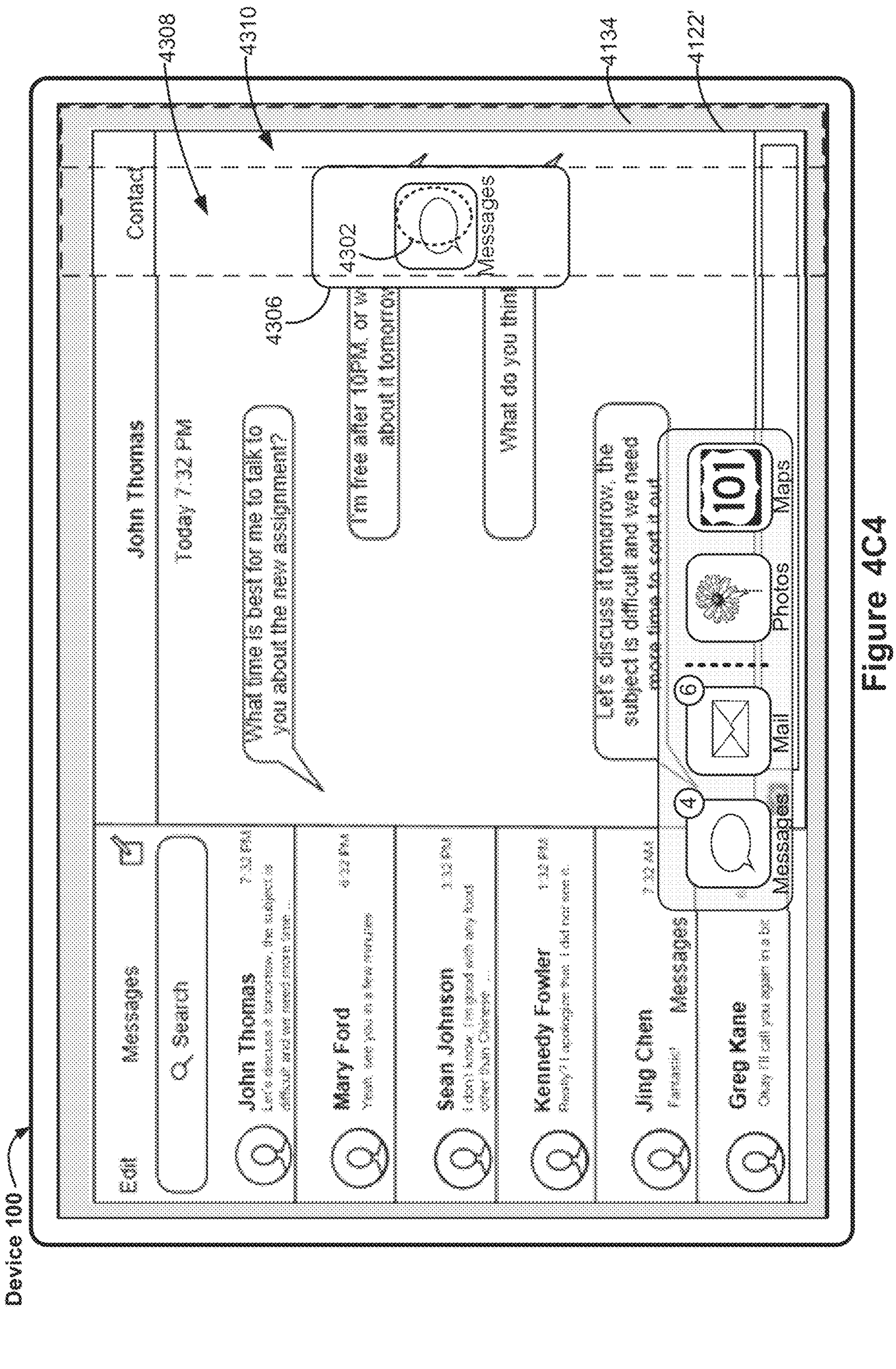
Figure 4C4

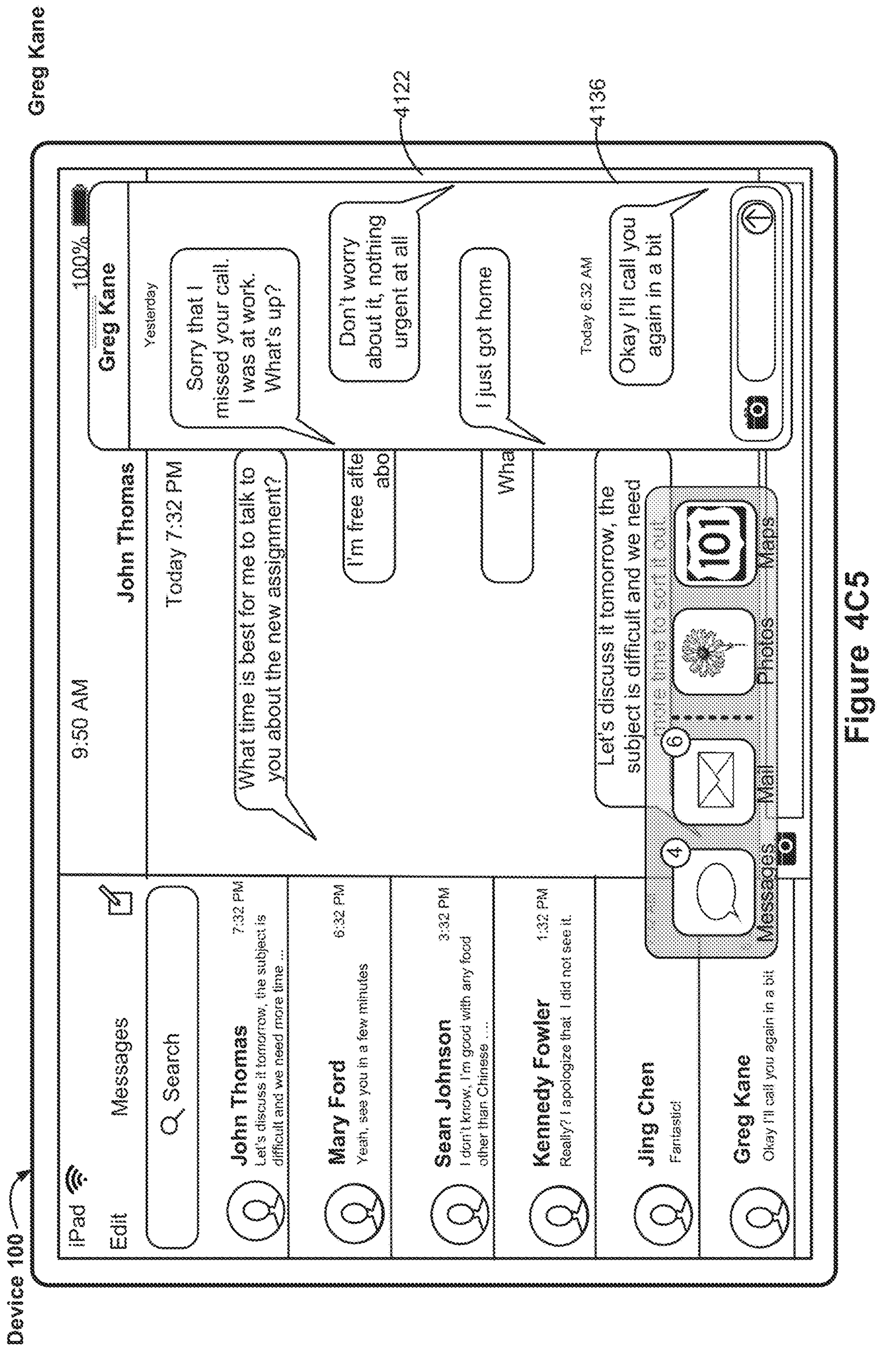
Figure 4C5

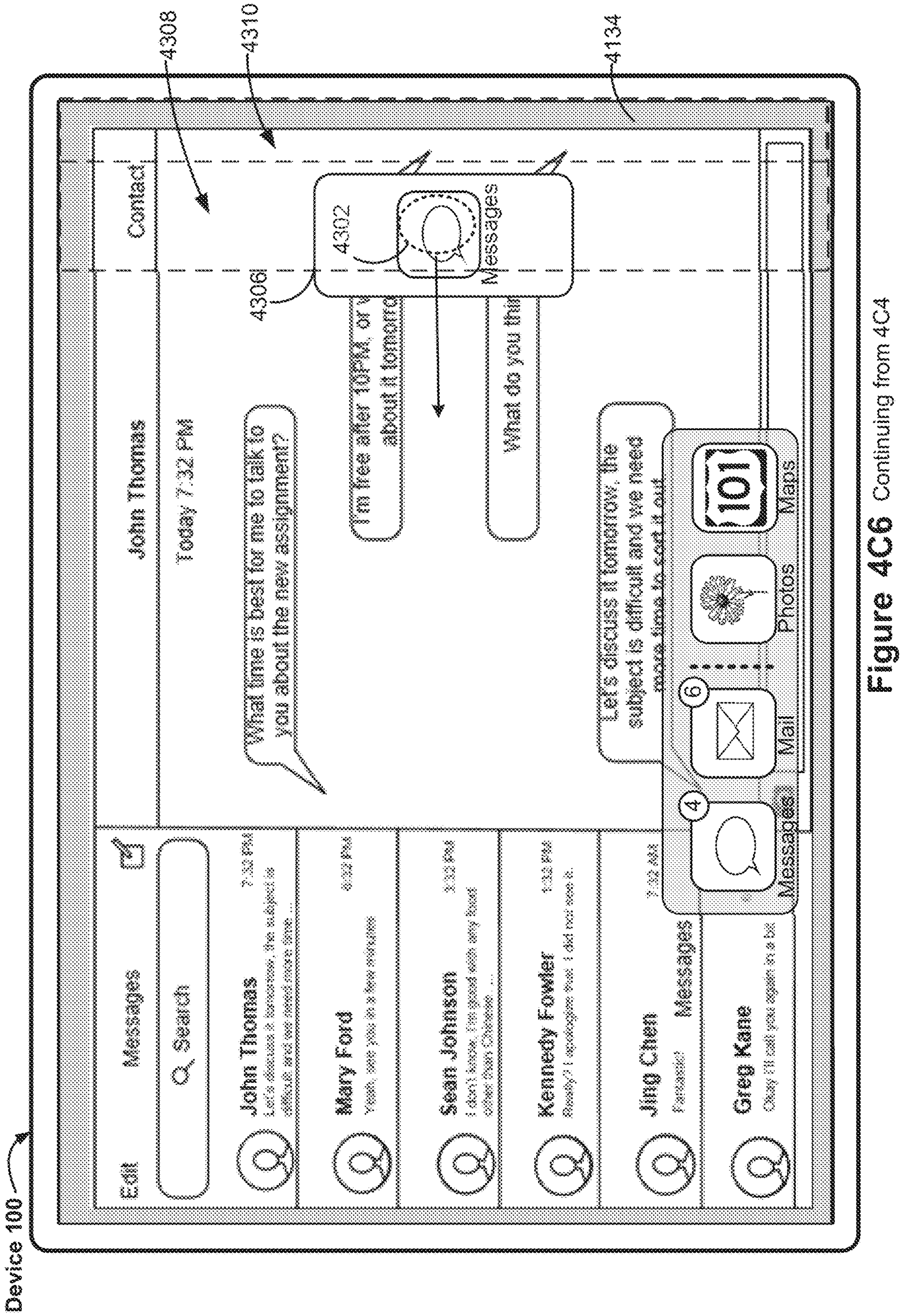
Figure 4C6 Continuing from 4C4

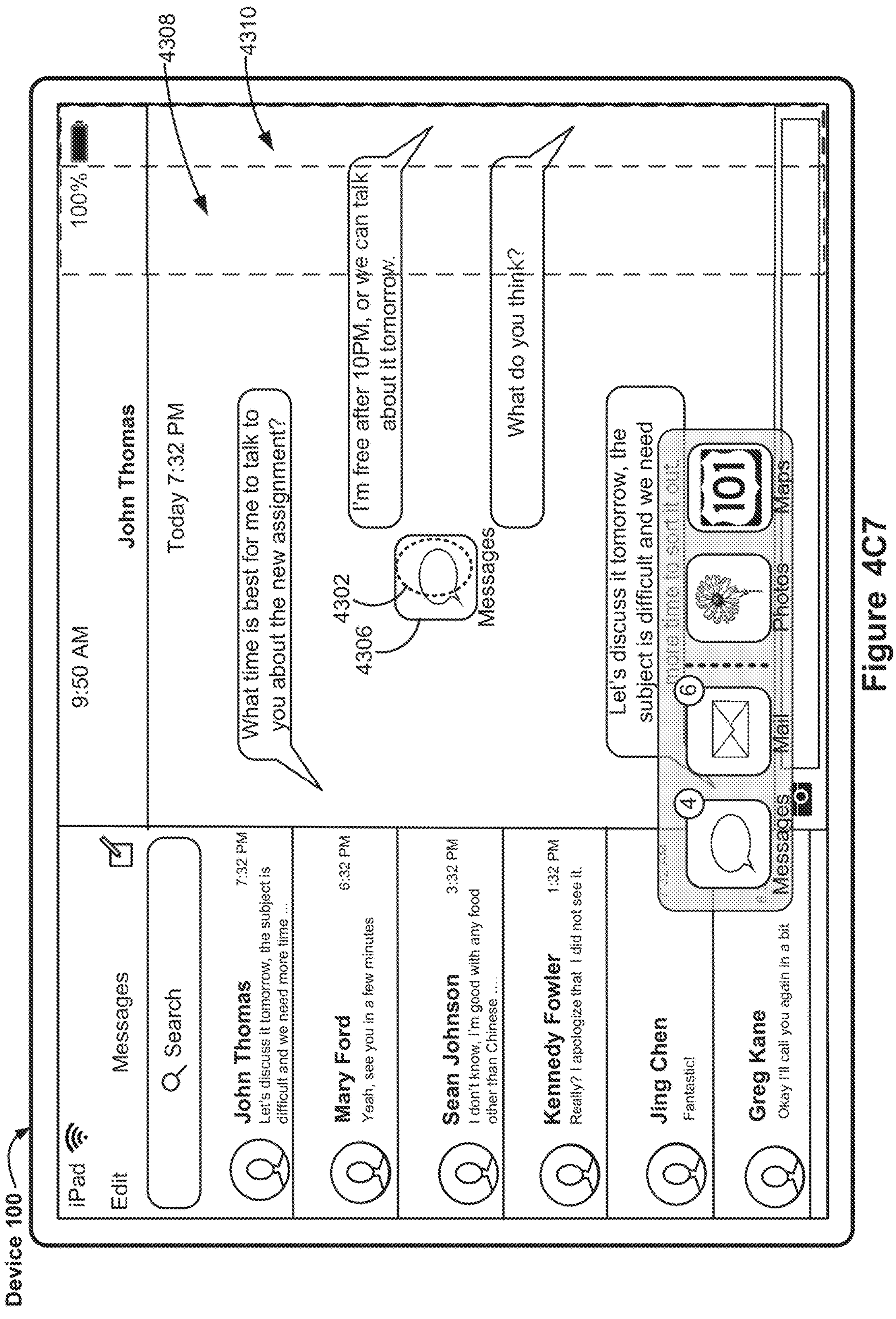
Figure 4C7

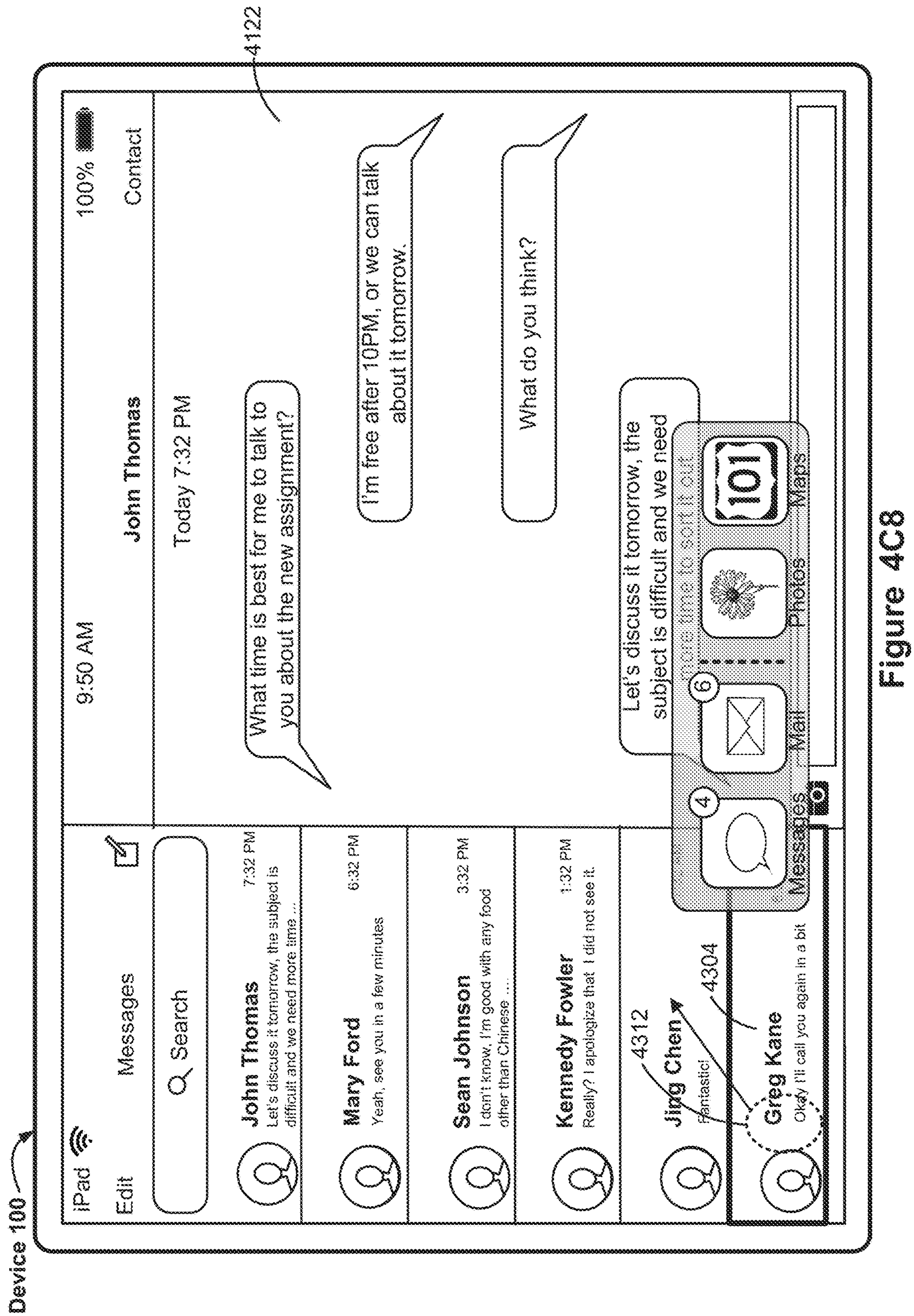
Figure 4C8

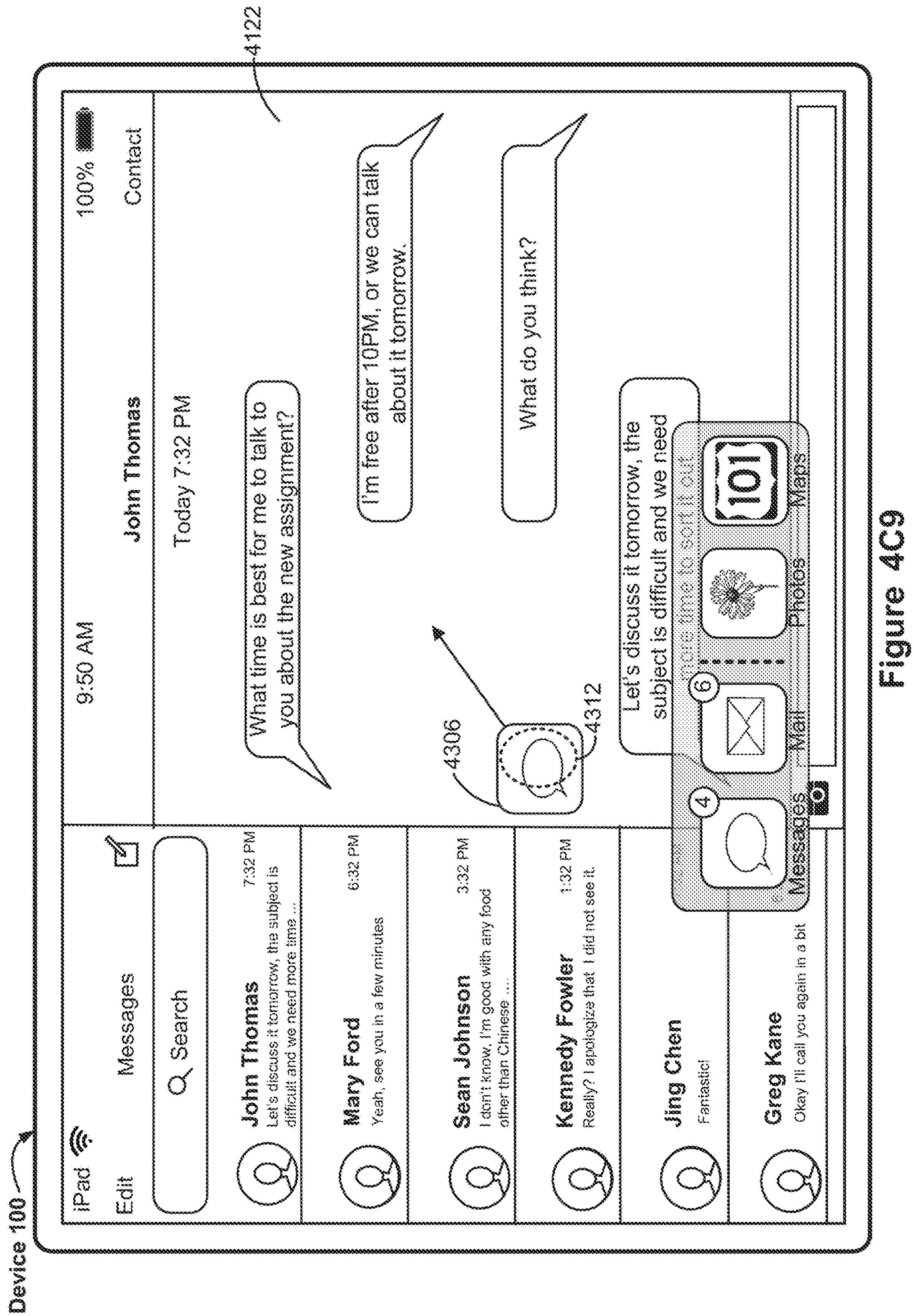
Figure 4C9

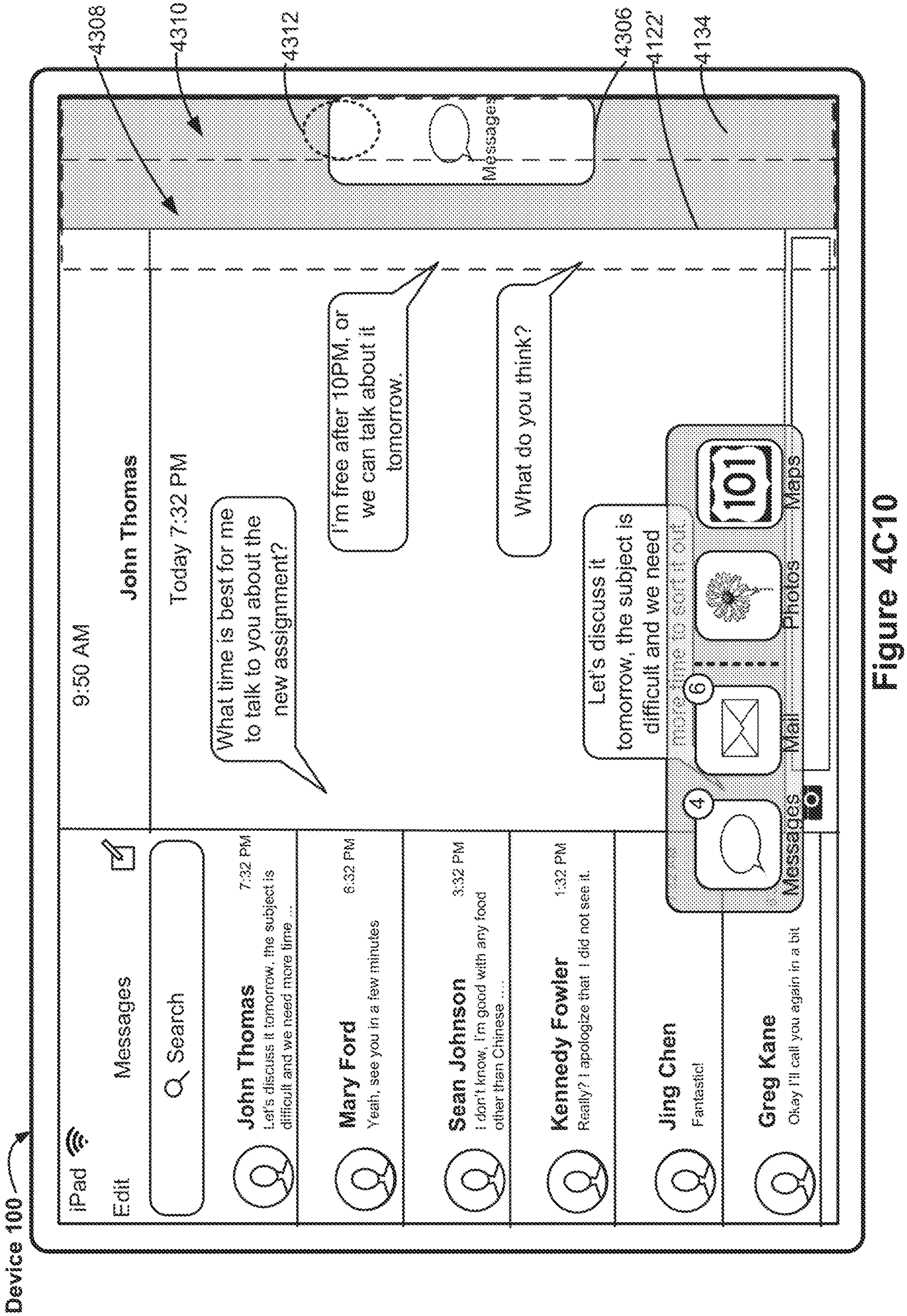
Figure 4C10

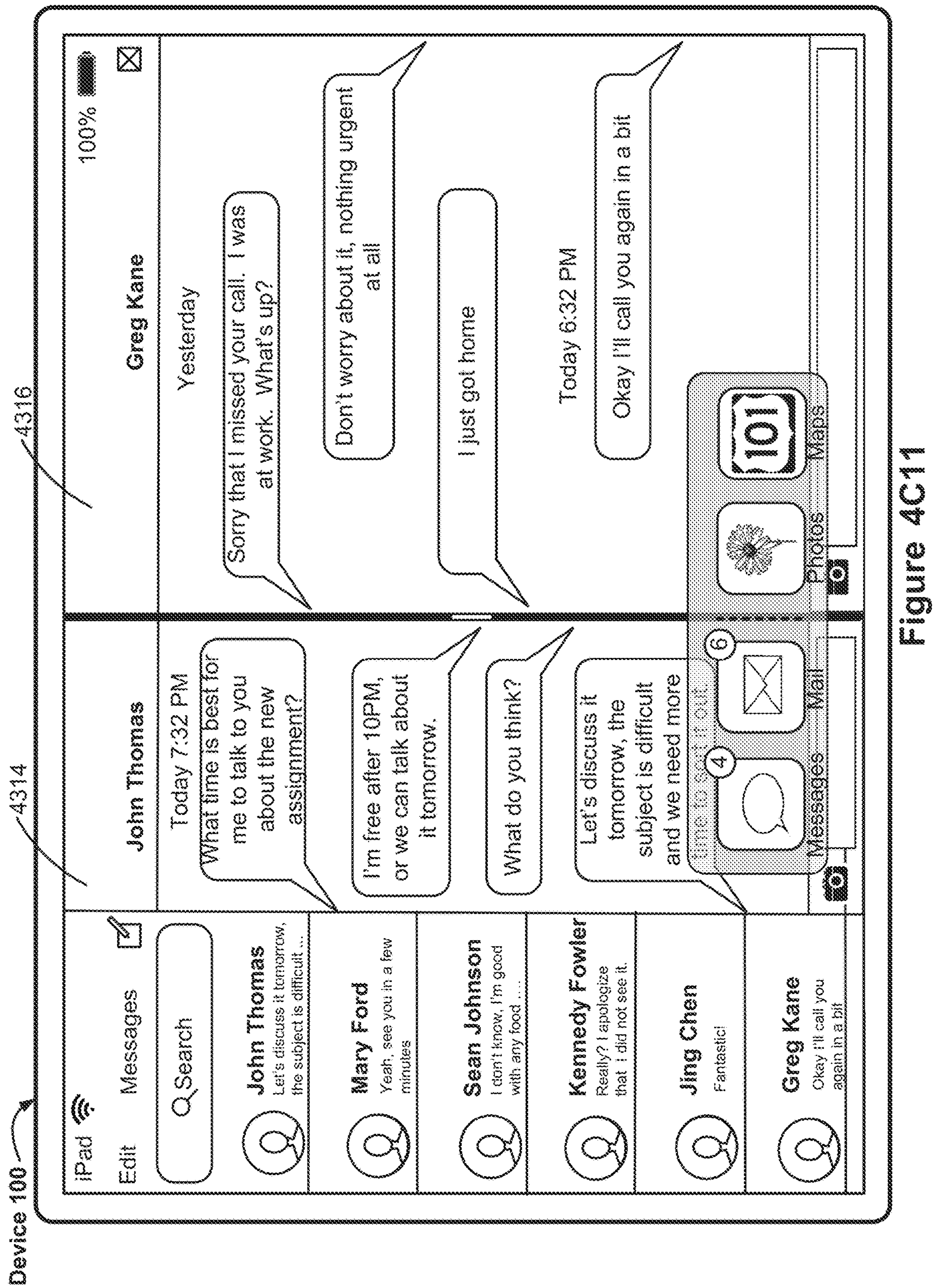
Figure 4C11

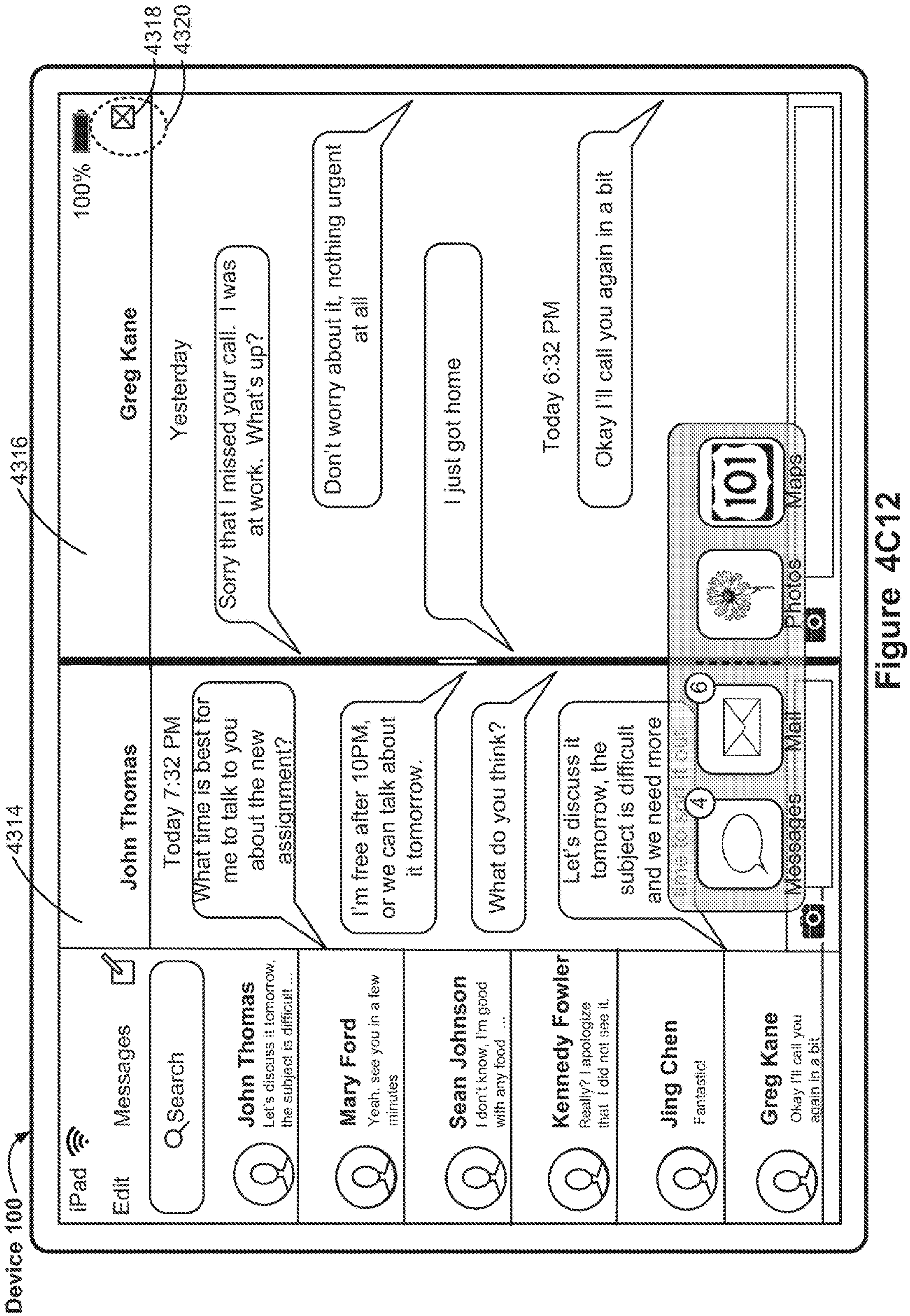
Figure 4C12

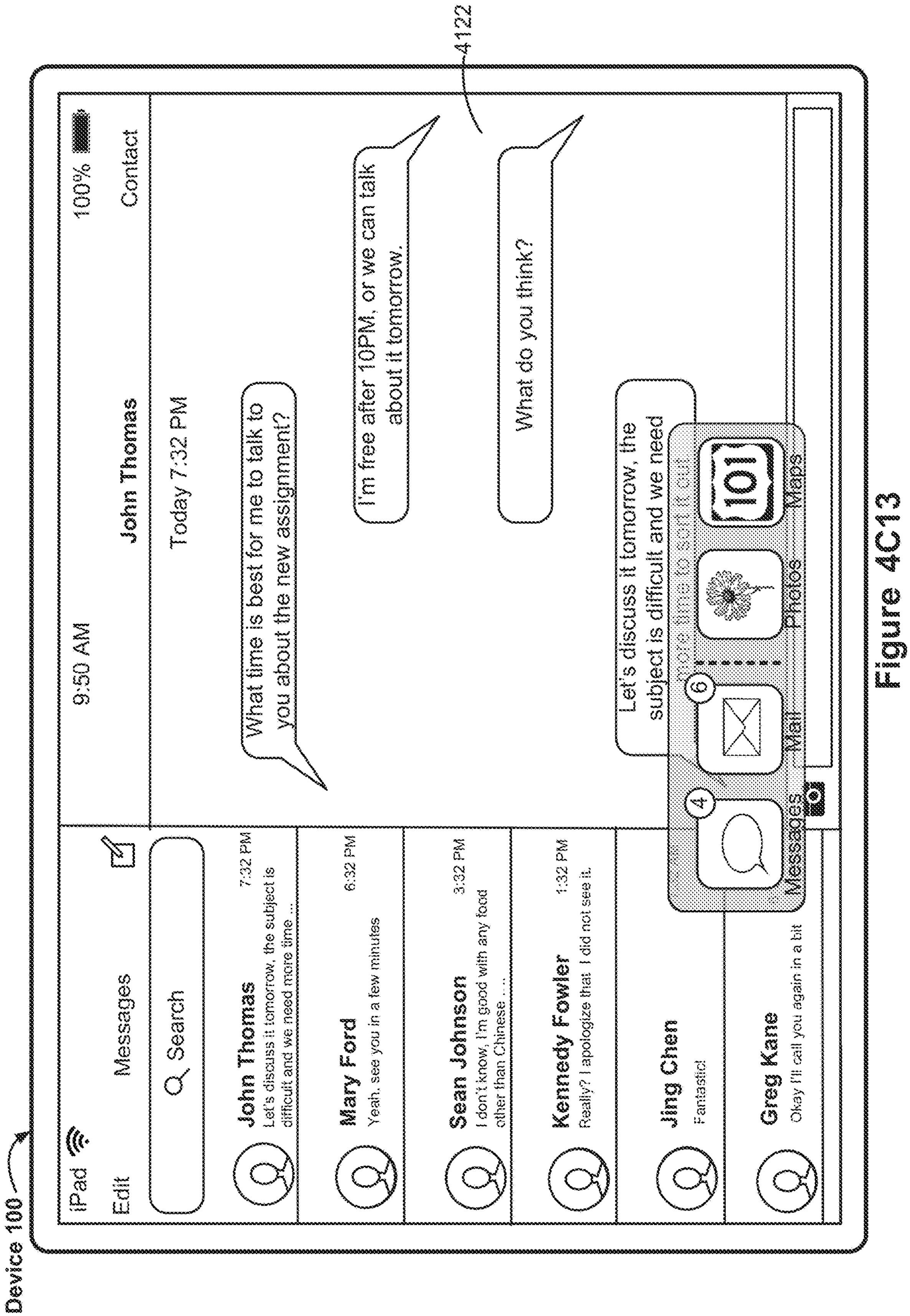
Figure 4C13

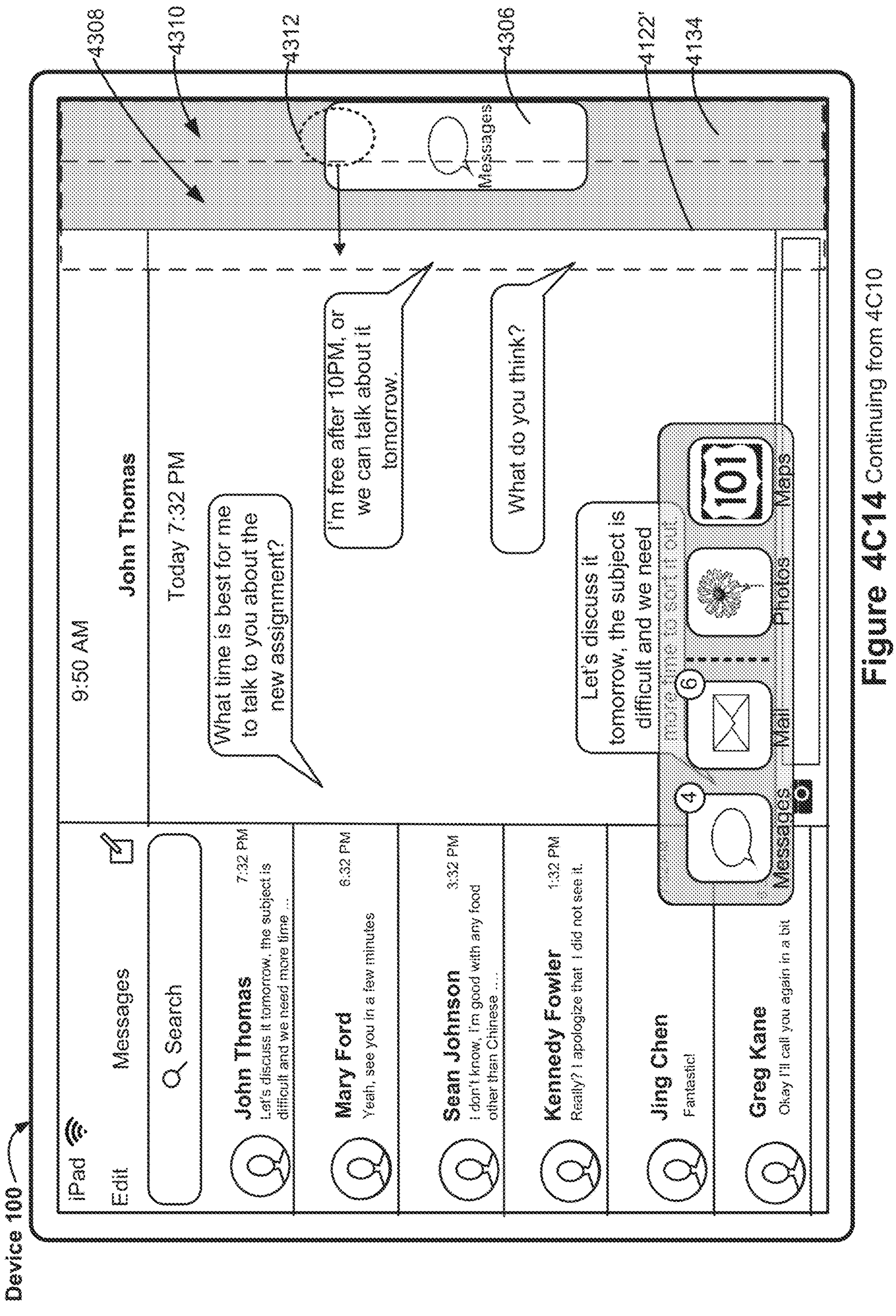
Figure 4C14 Continuing from 4C10

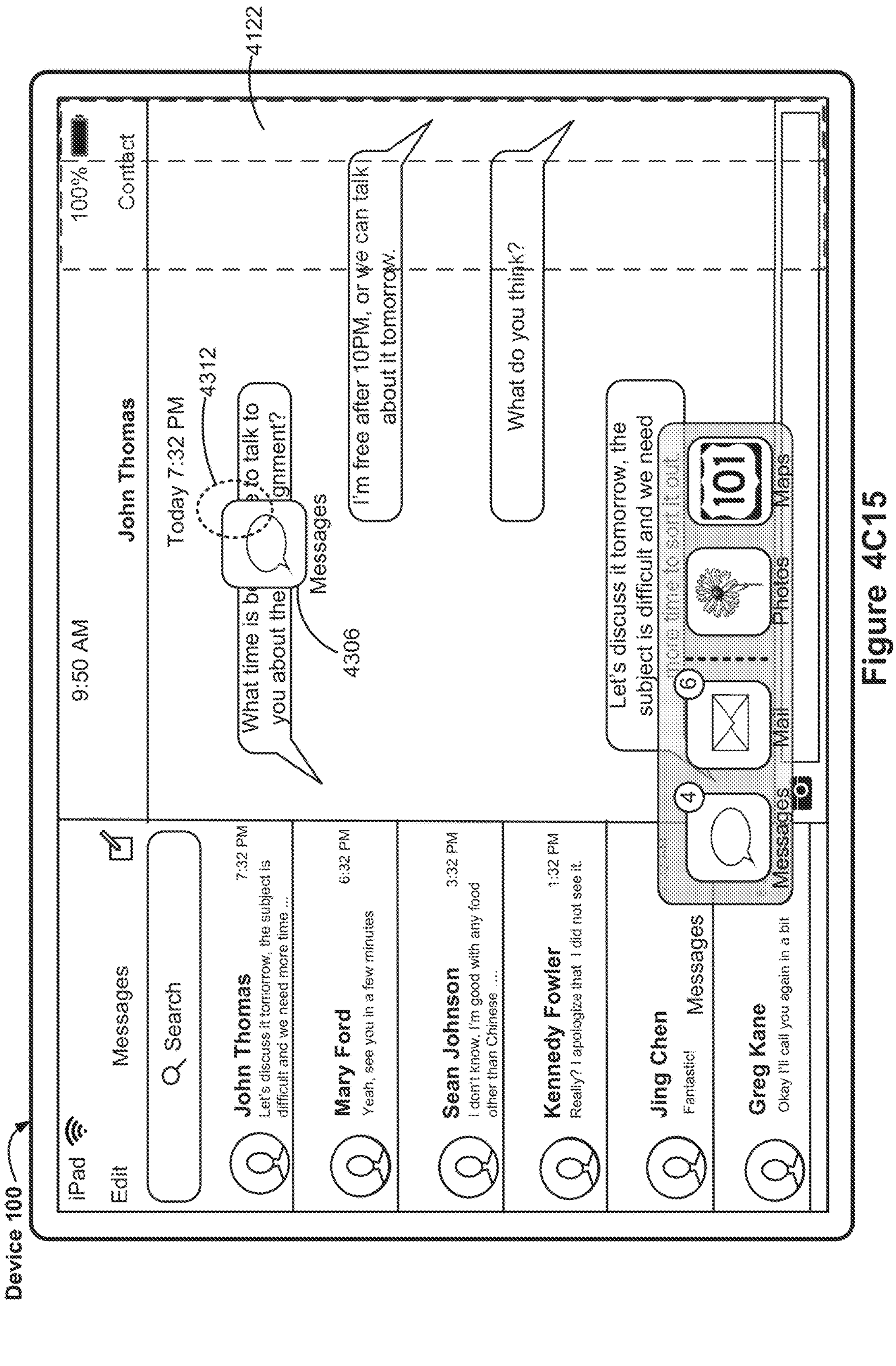
Figure 4C15

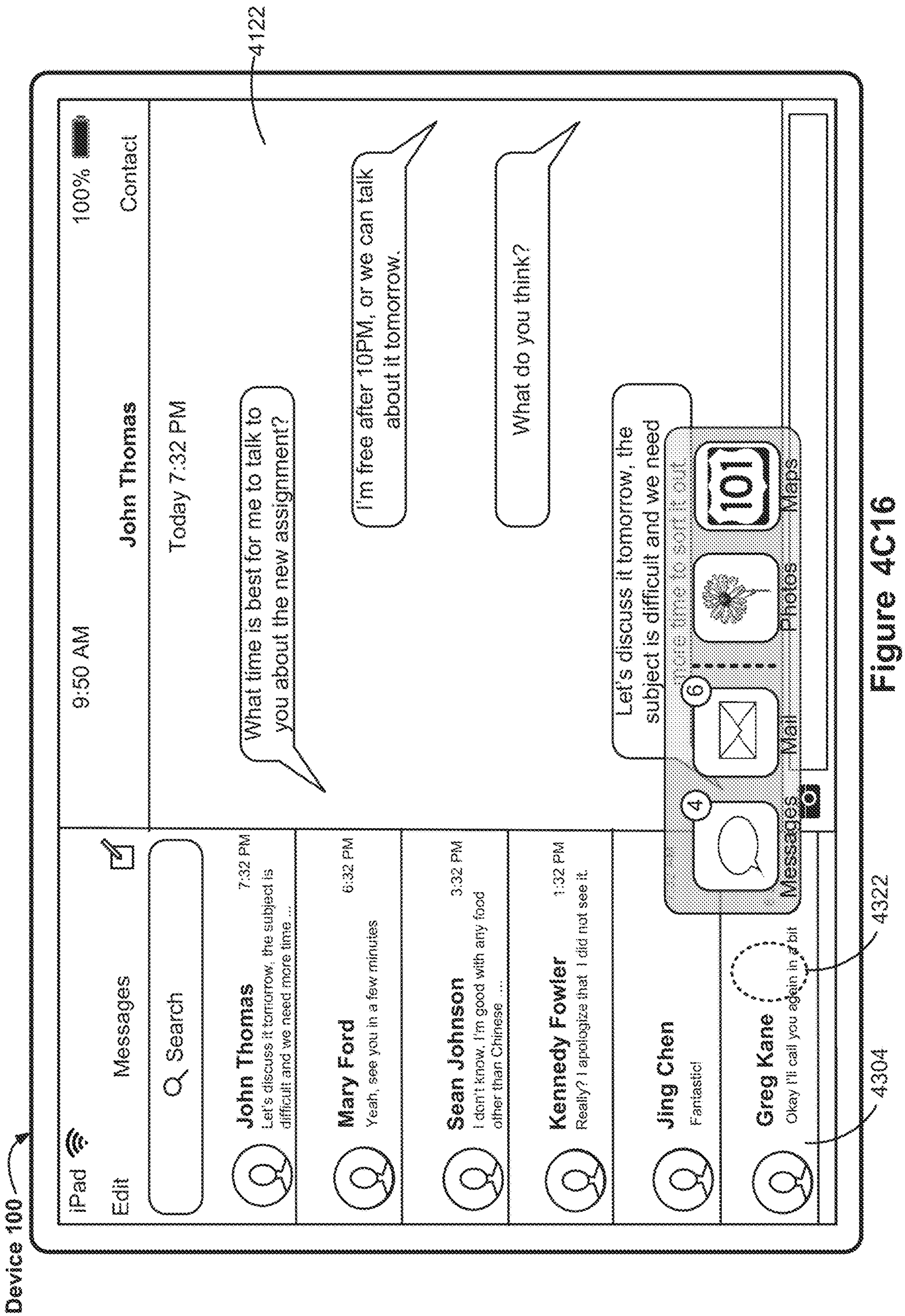
Figure 4C16

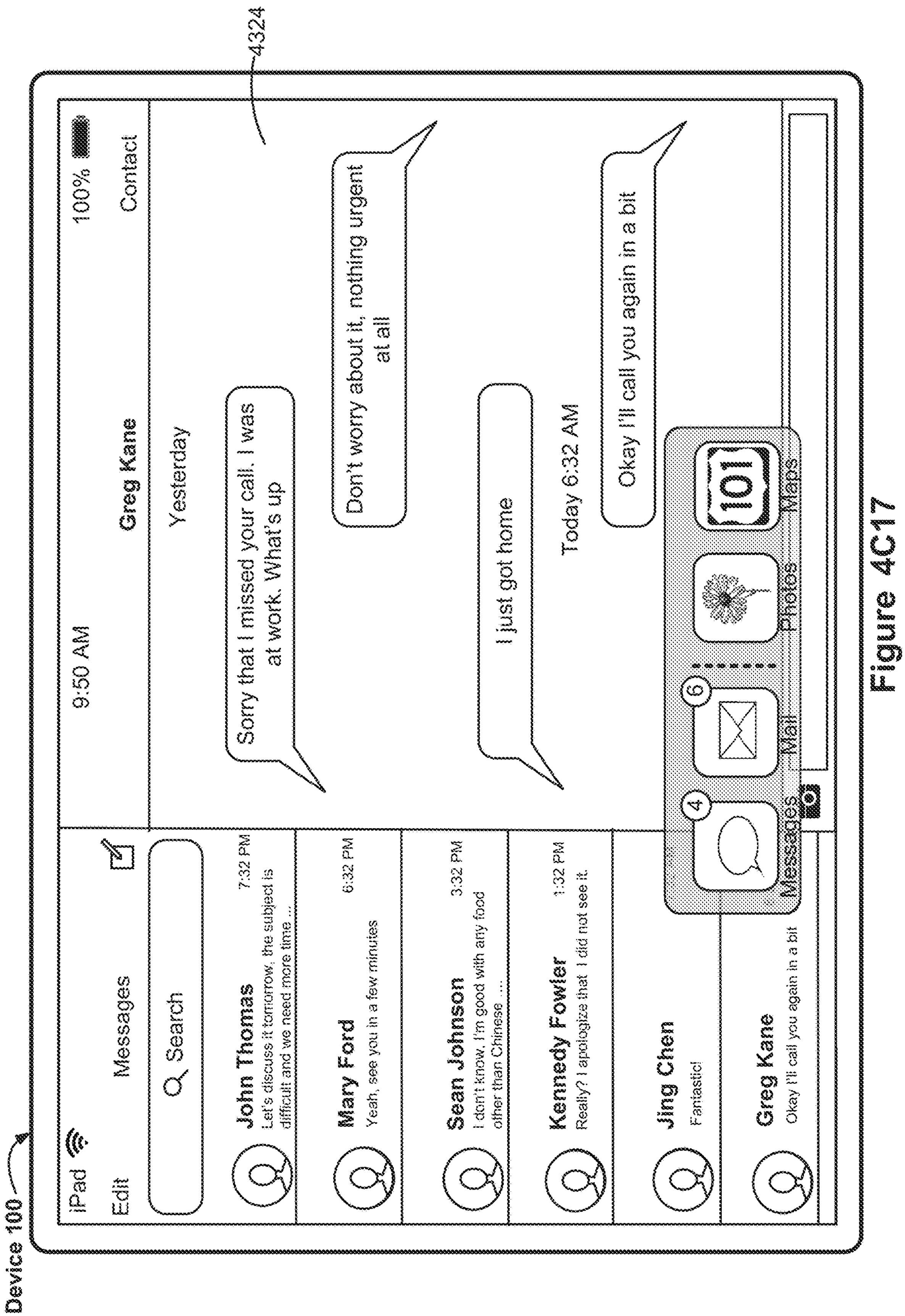
Figure 4C17

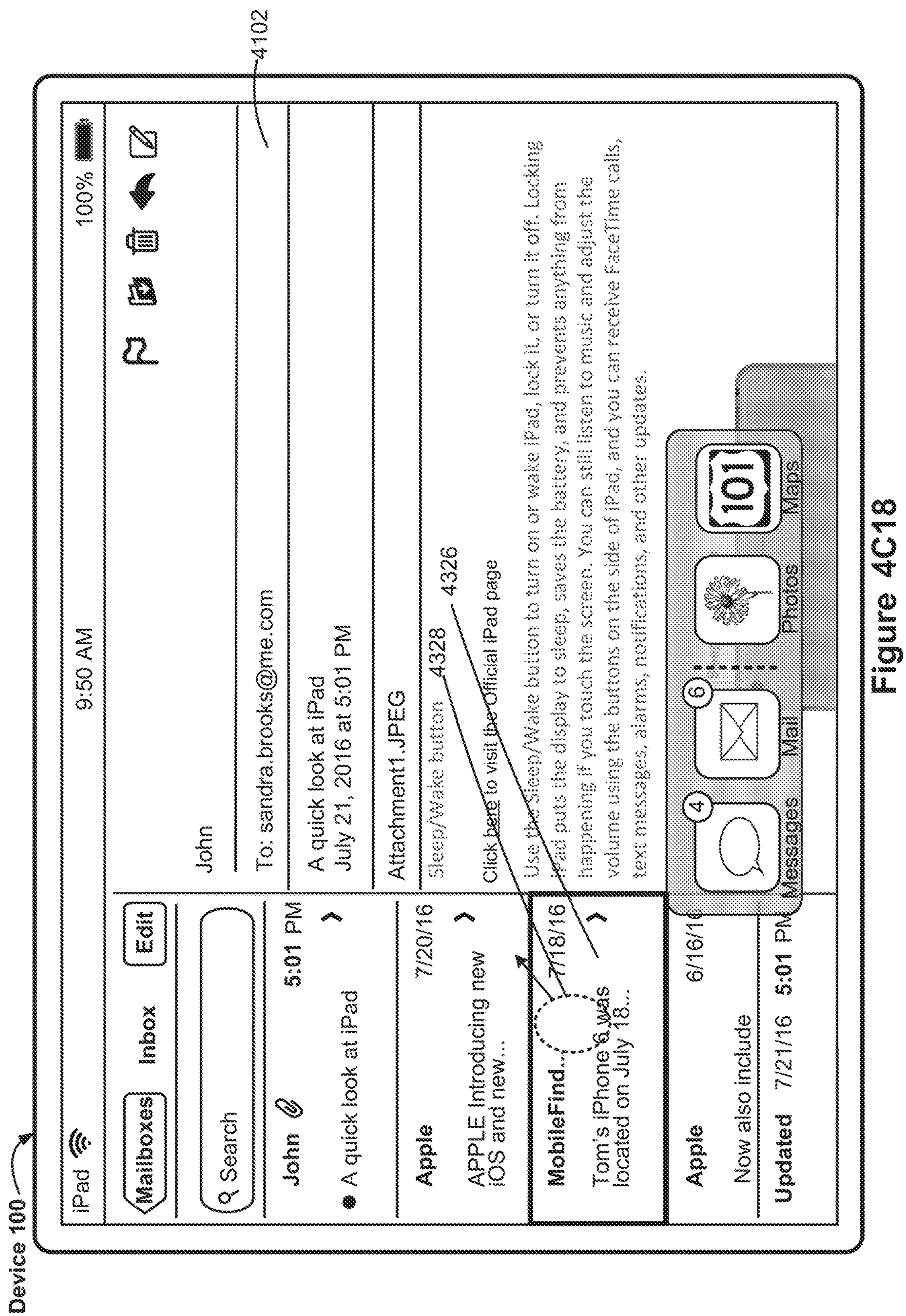
Figure 4C18

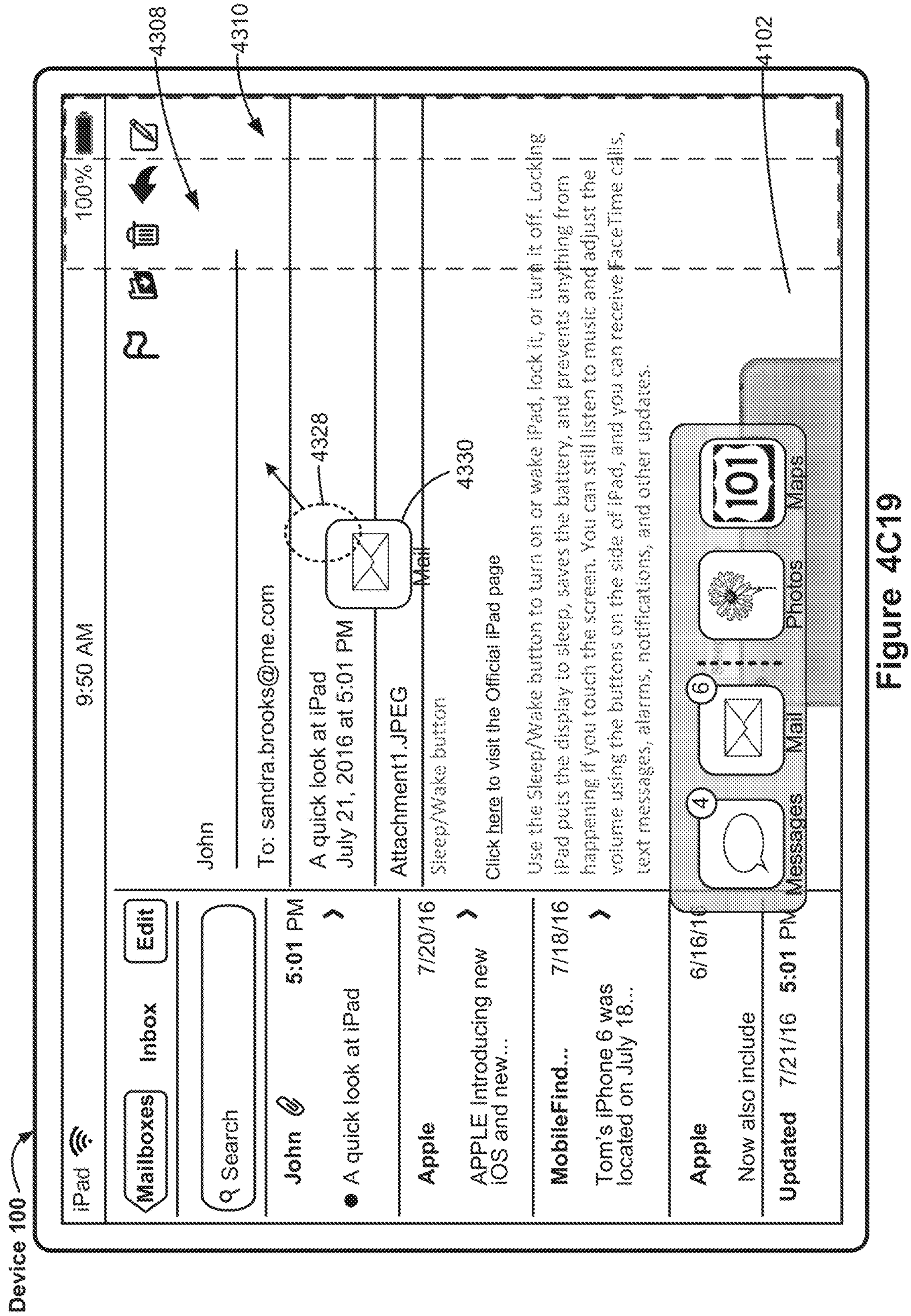
Figure 4C19

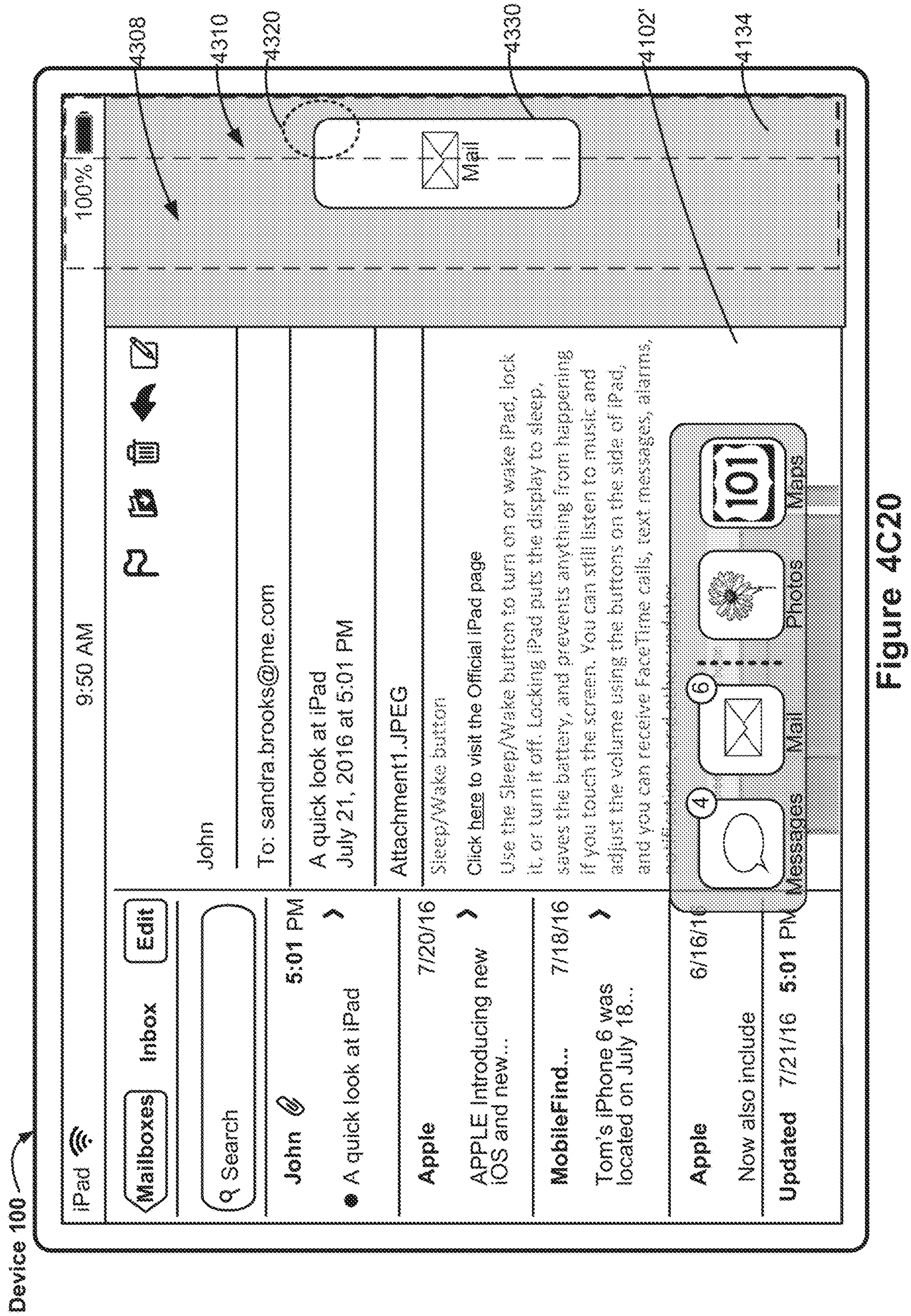
Figure 4C20

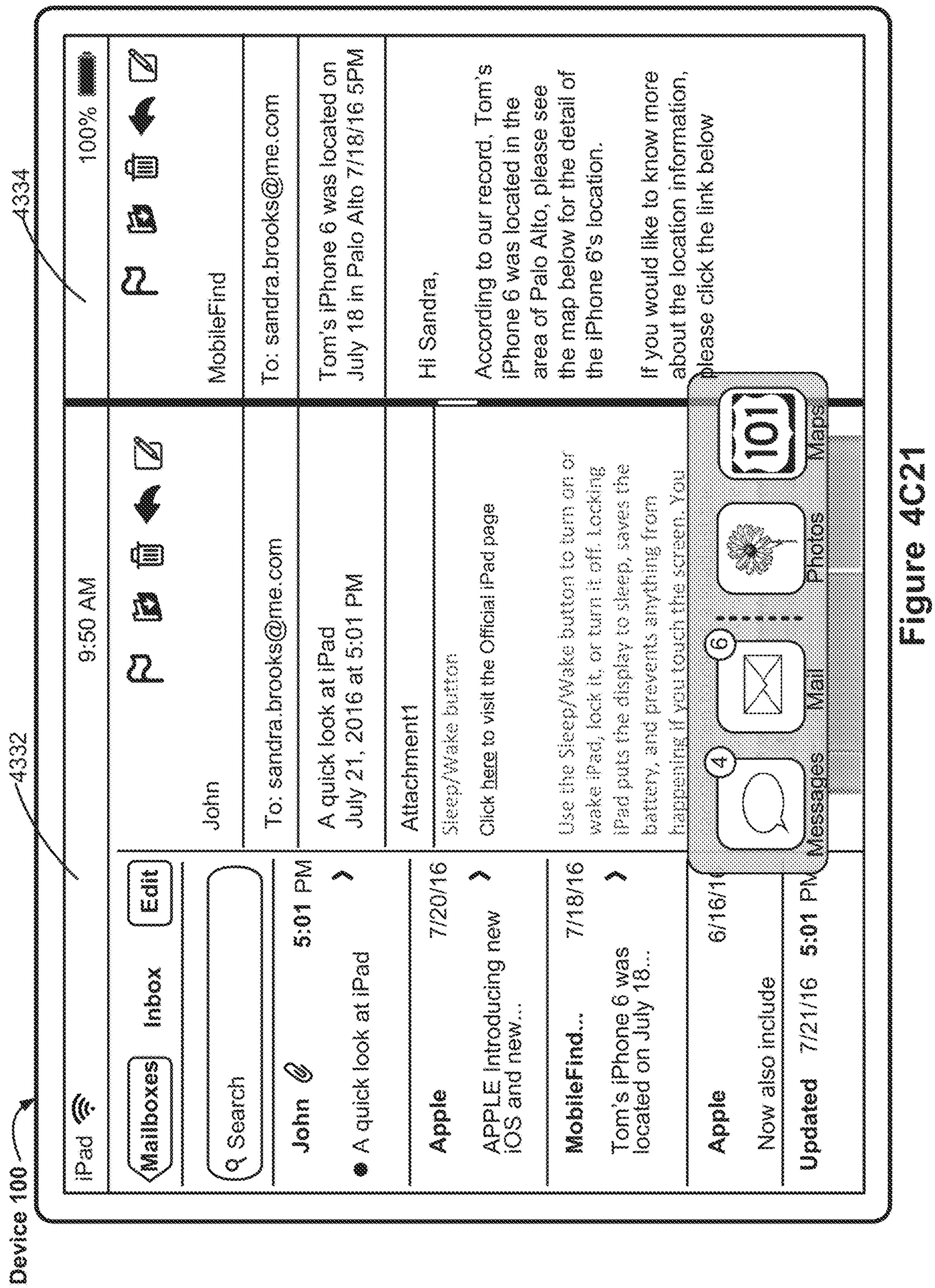
Figure 4C21

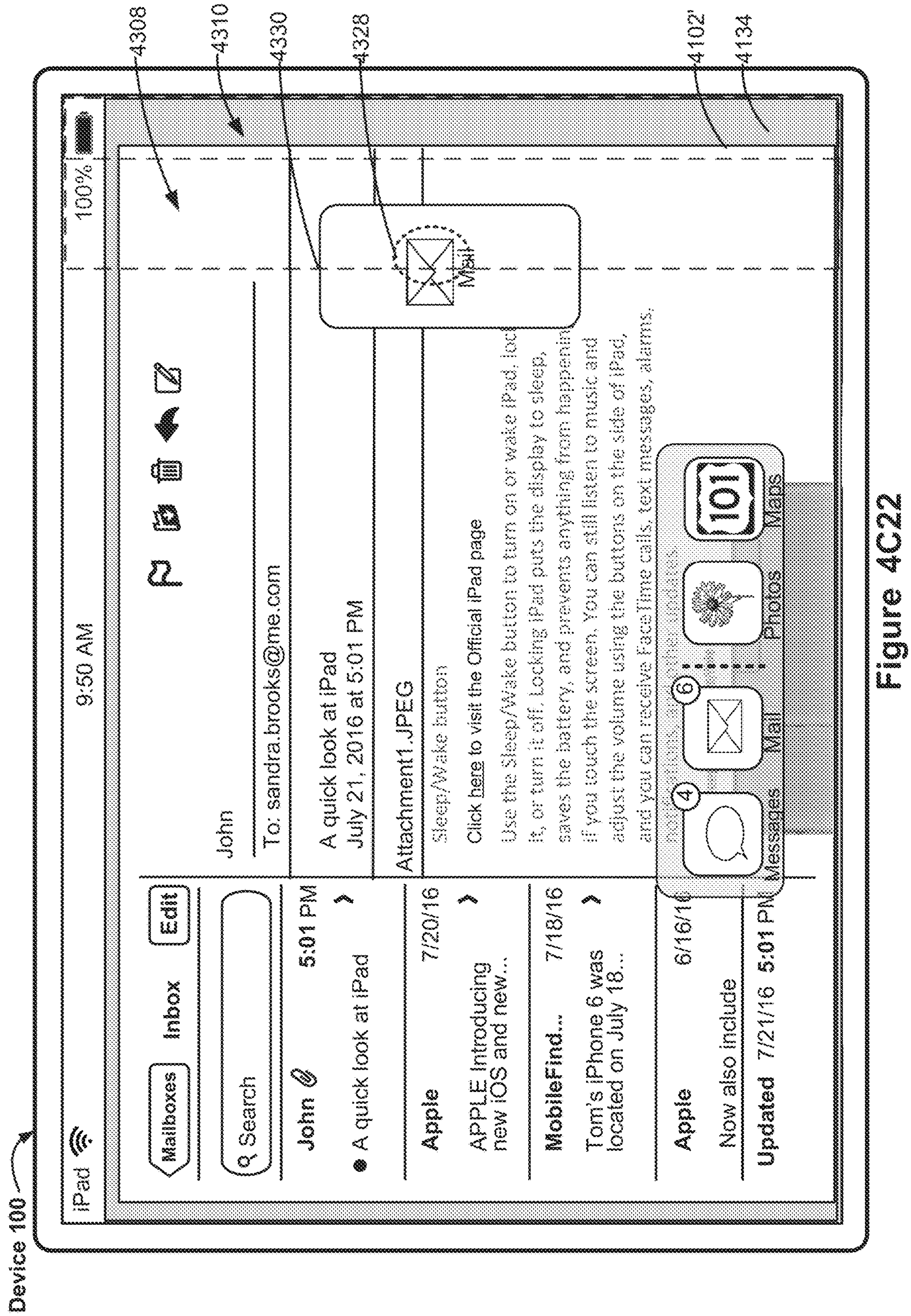
Figure 4C22

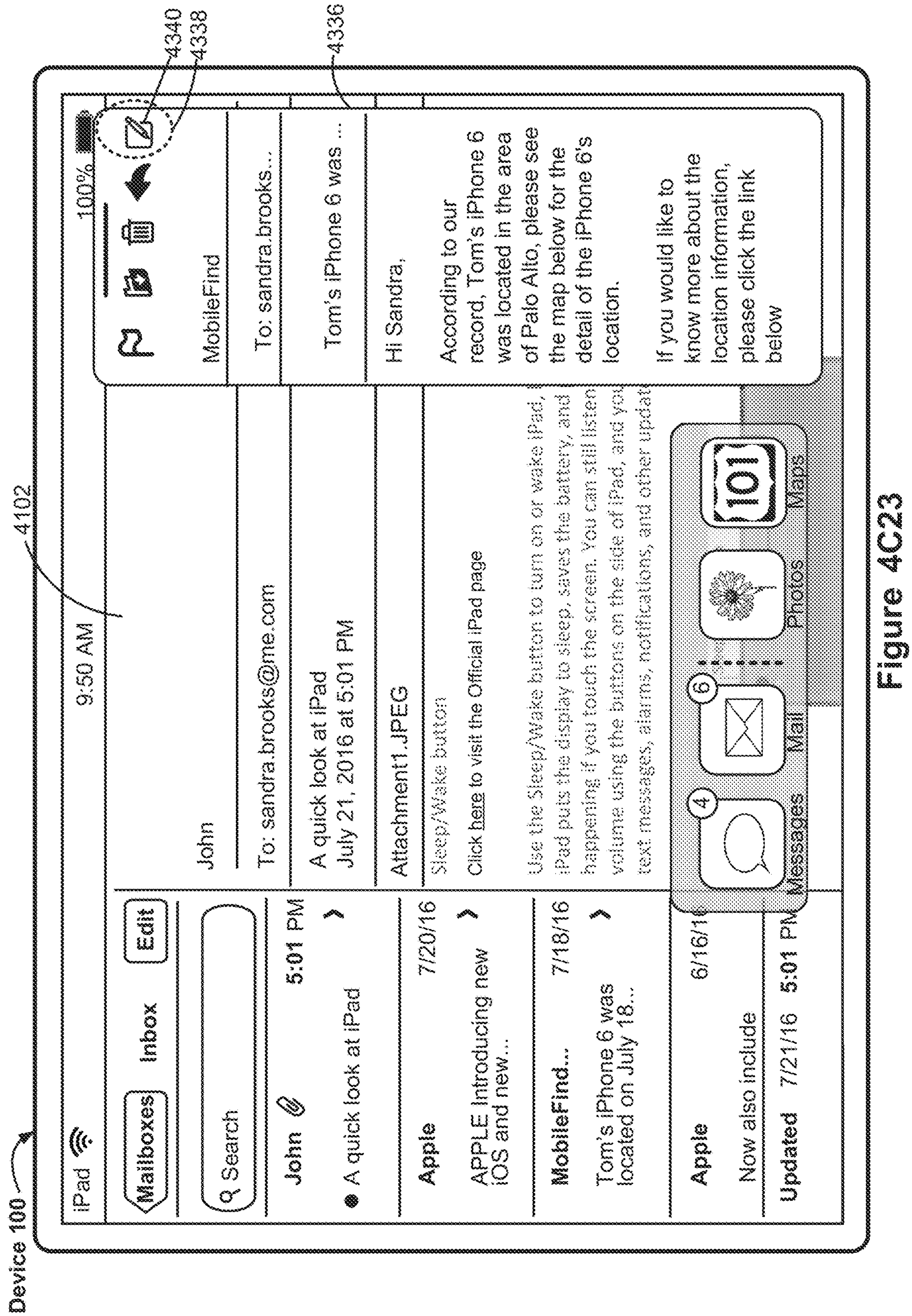
Figure 4C23

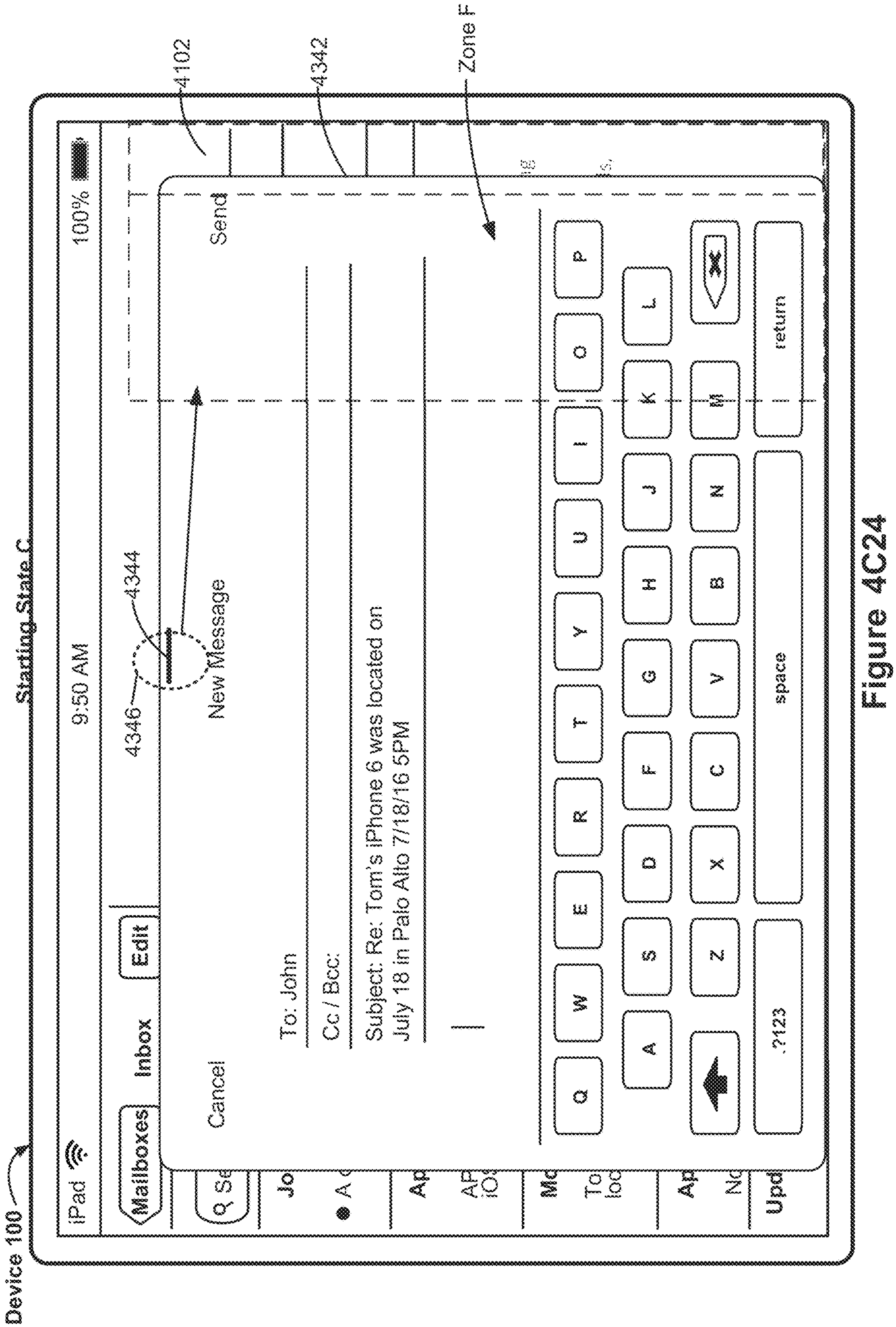
Figure 4C24

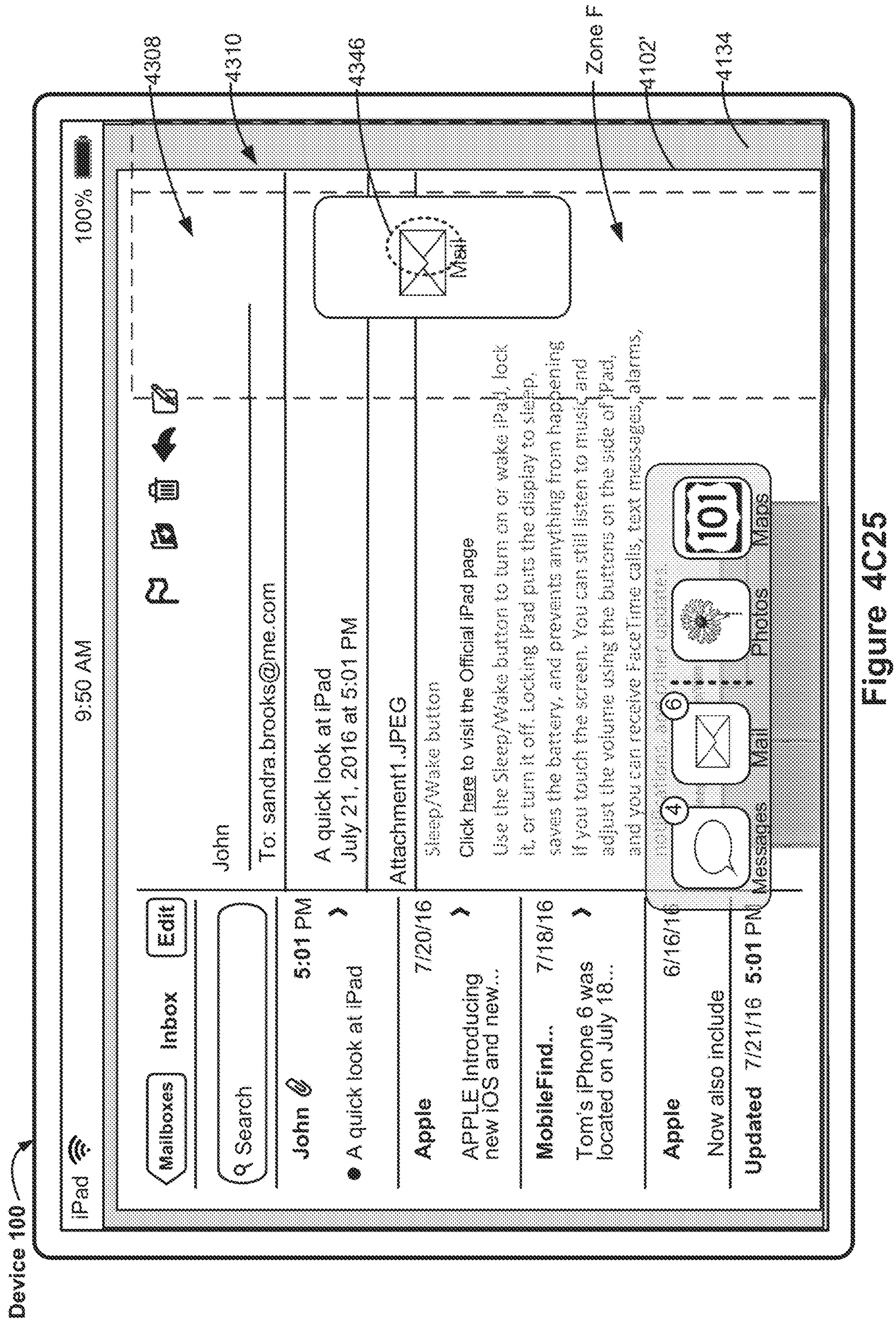
Figure 4C25

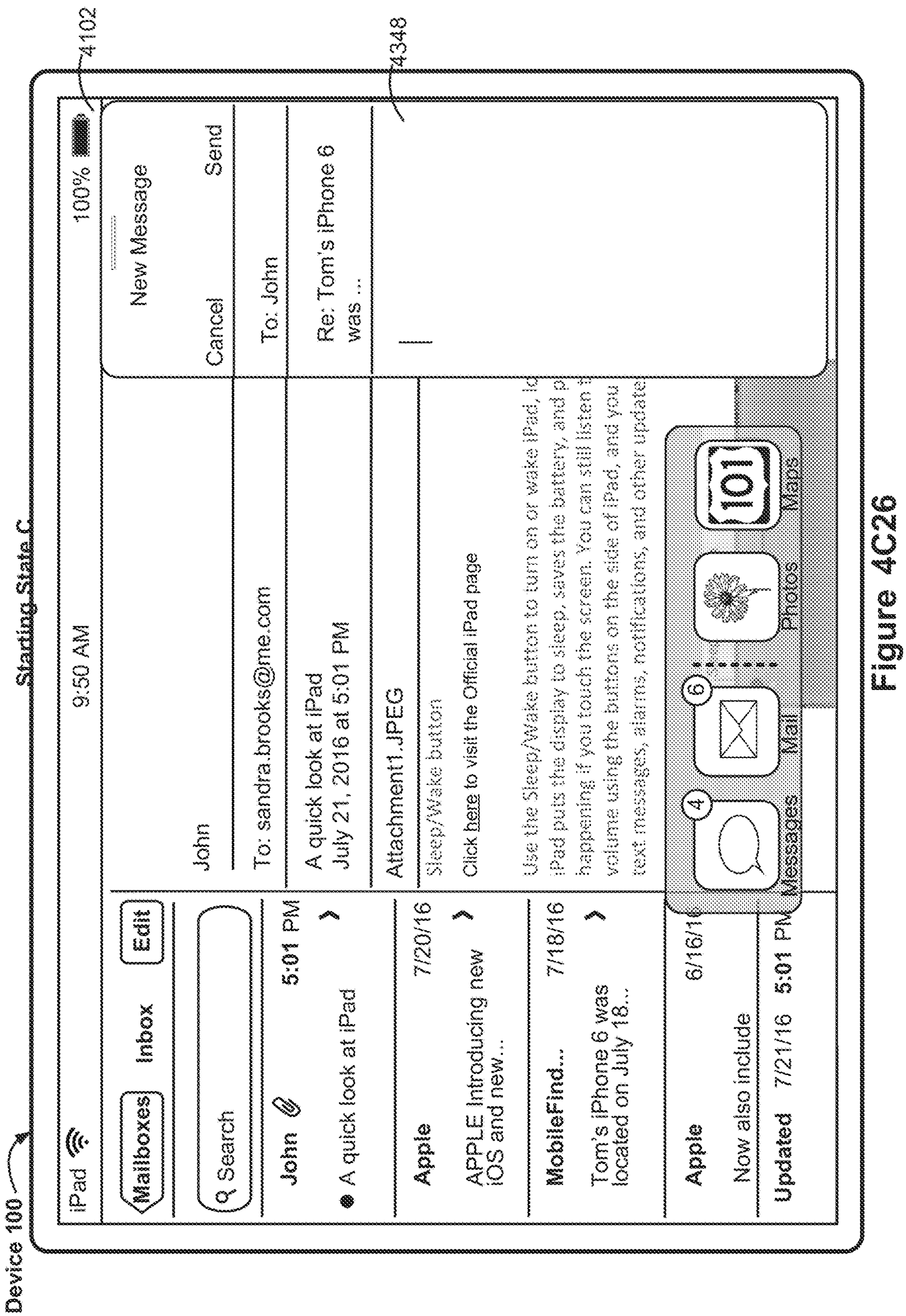
Figure 4C26

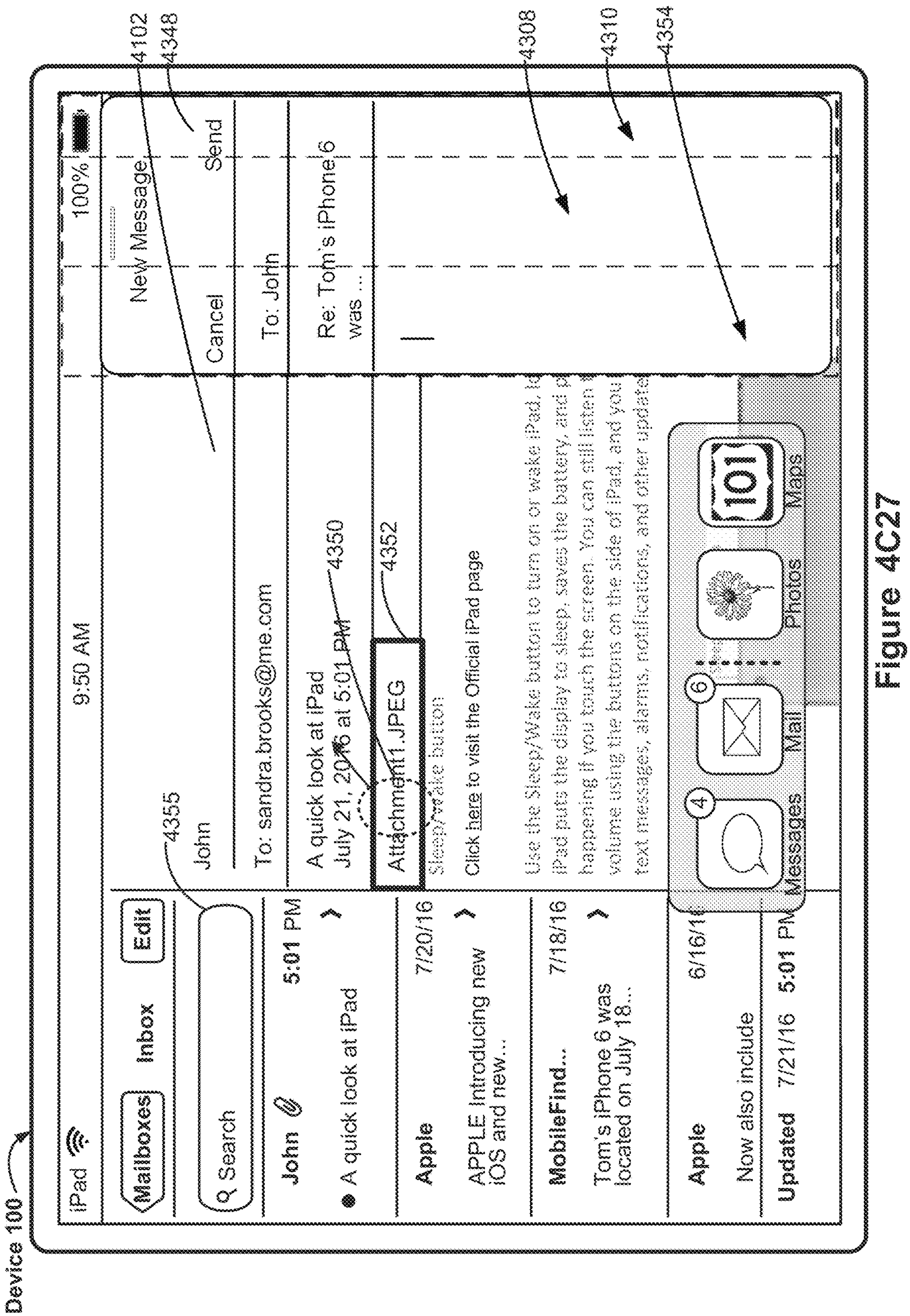
Figure 4C27

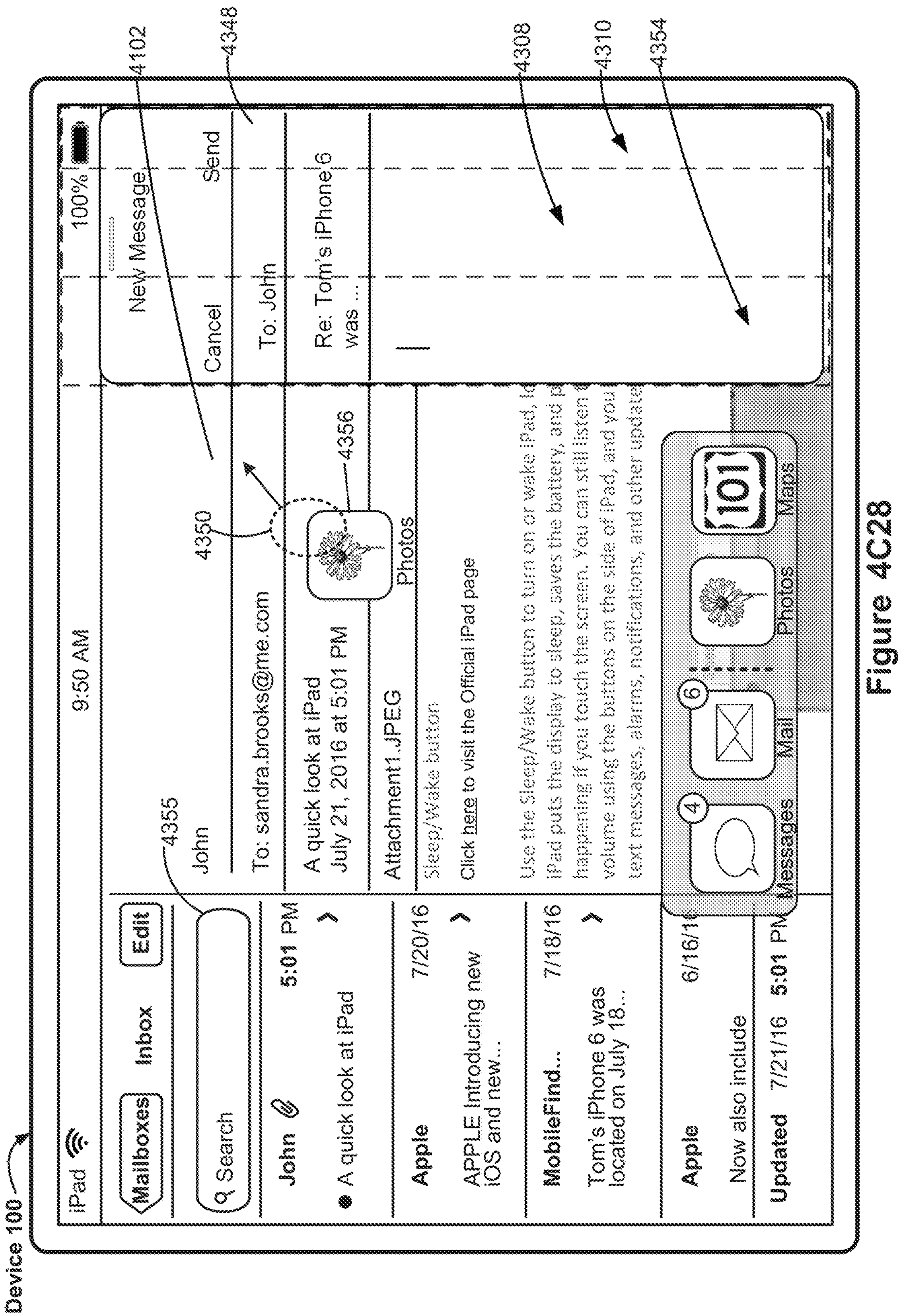
Figure 4C28

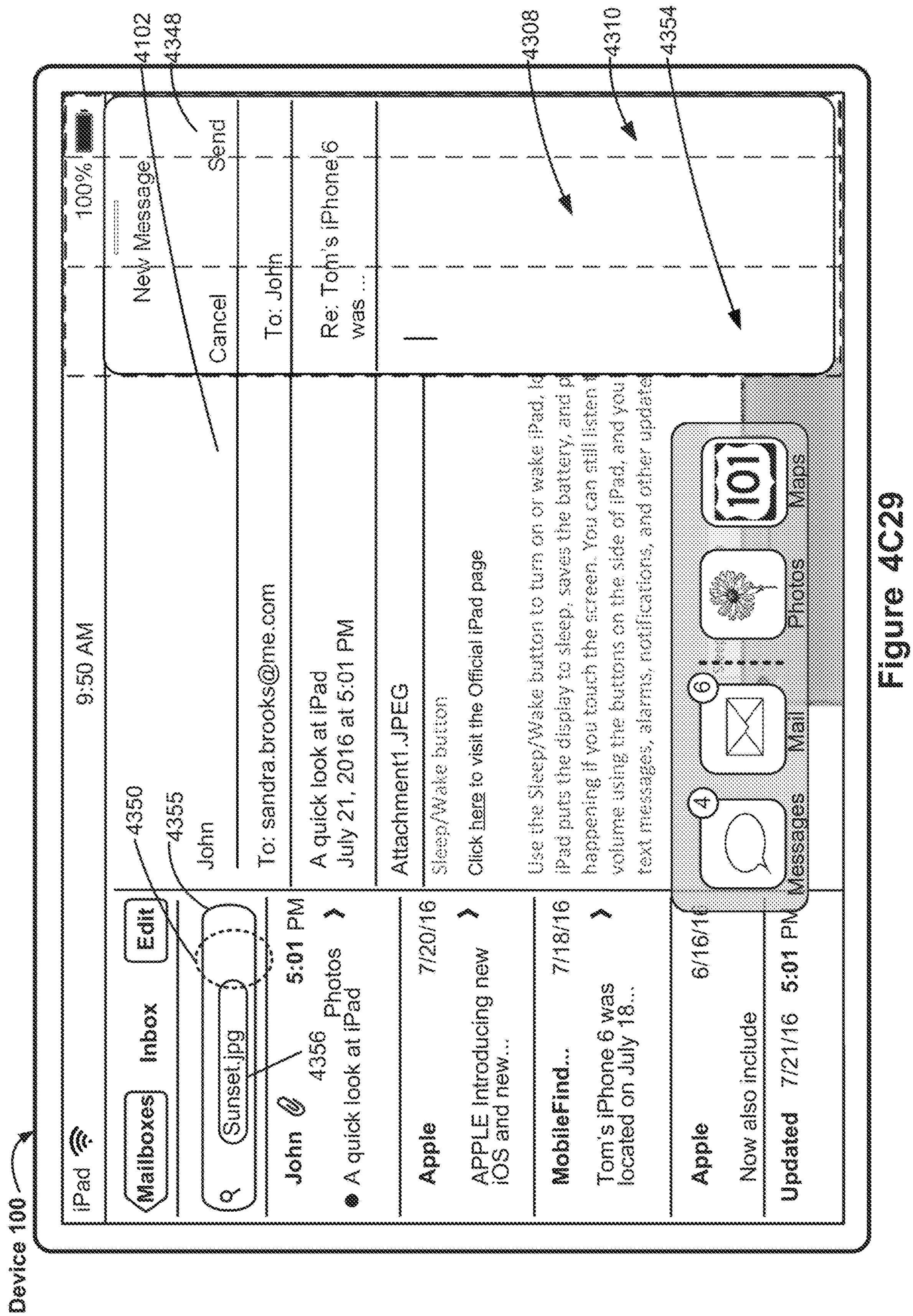
Figure 4C29

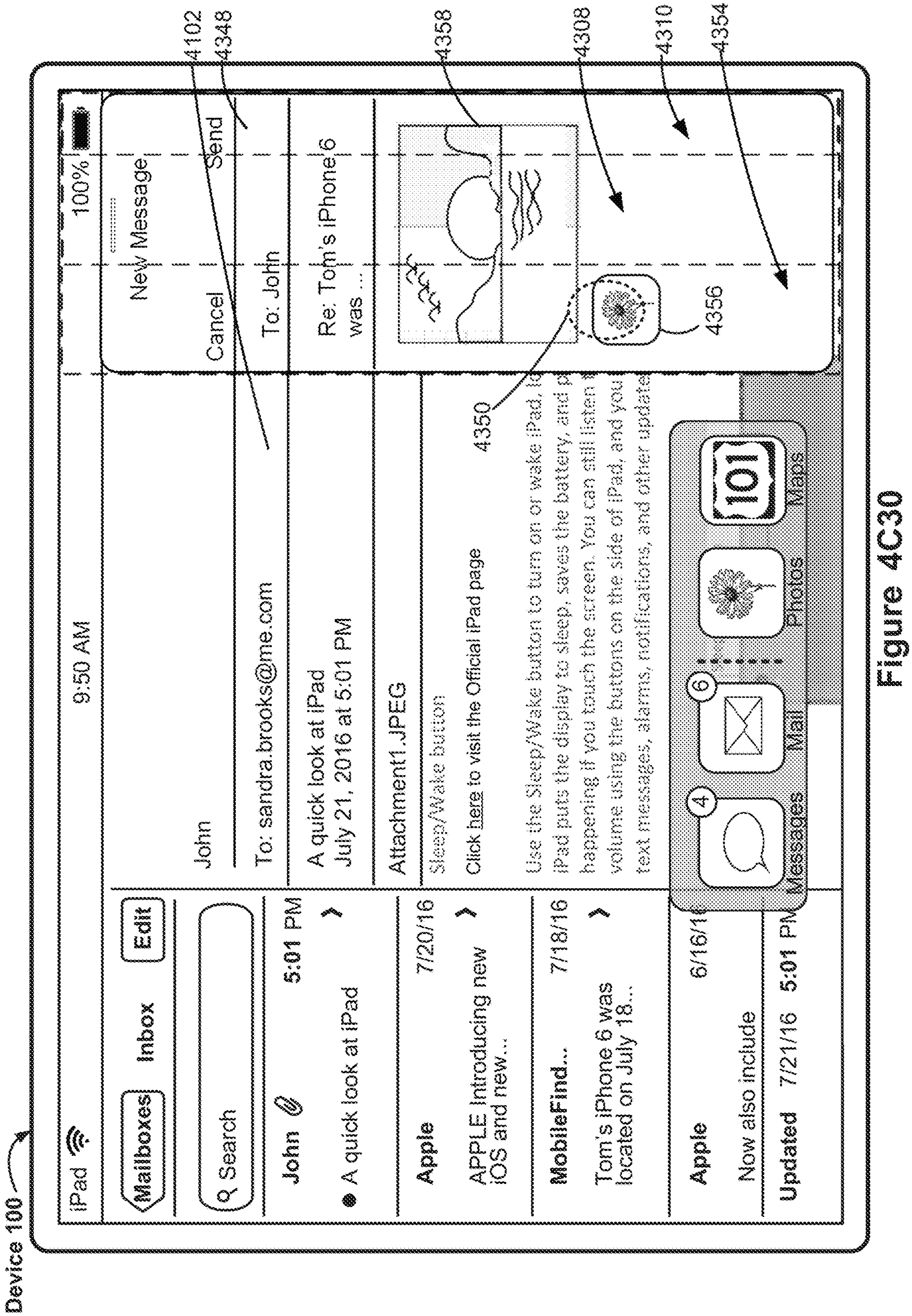
Figure 4C30

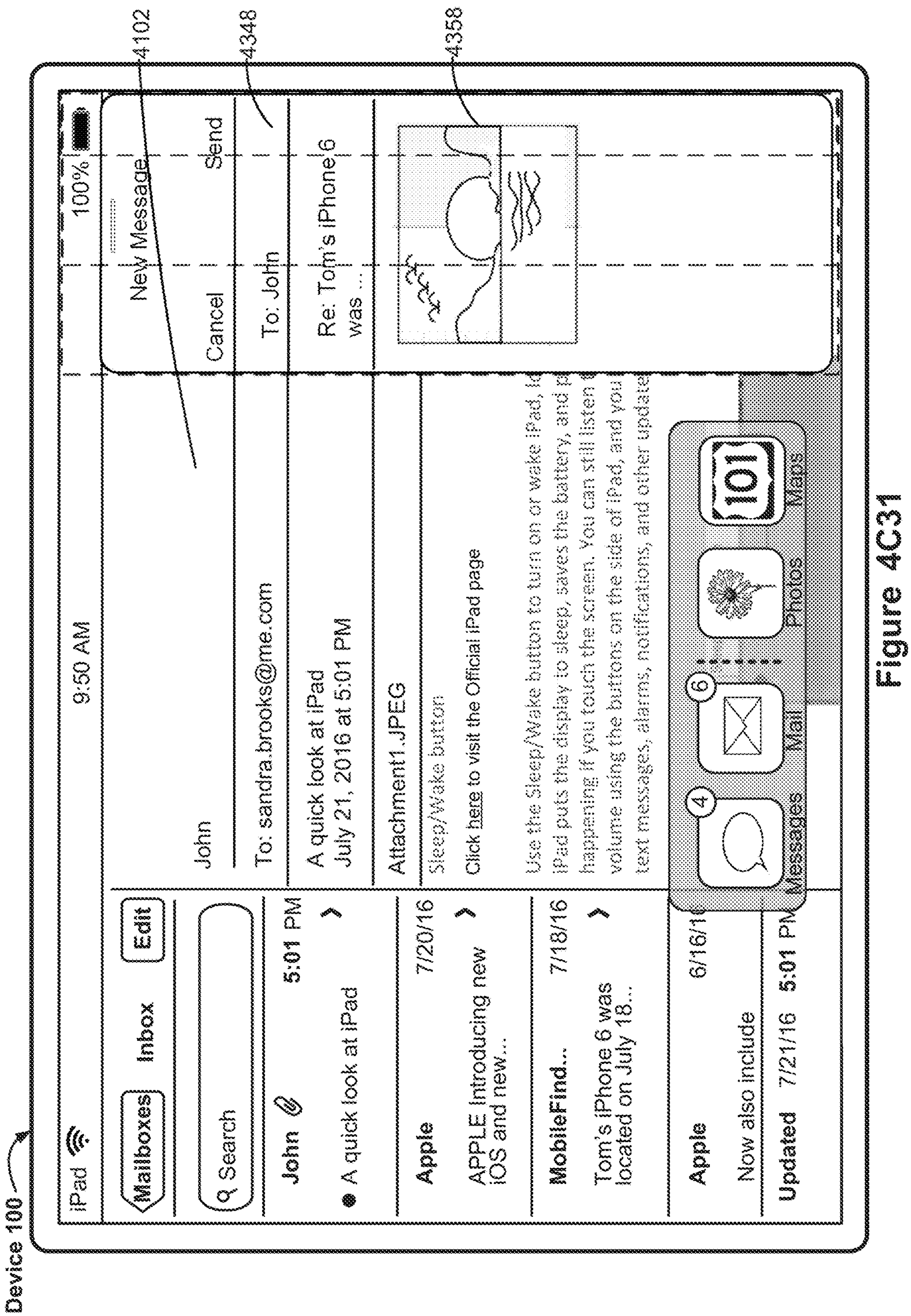
Figure 4C31

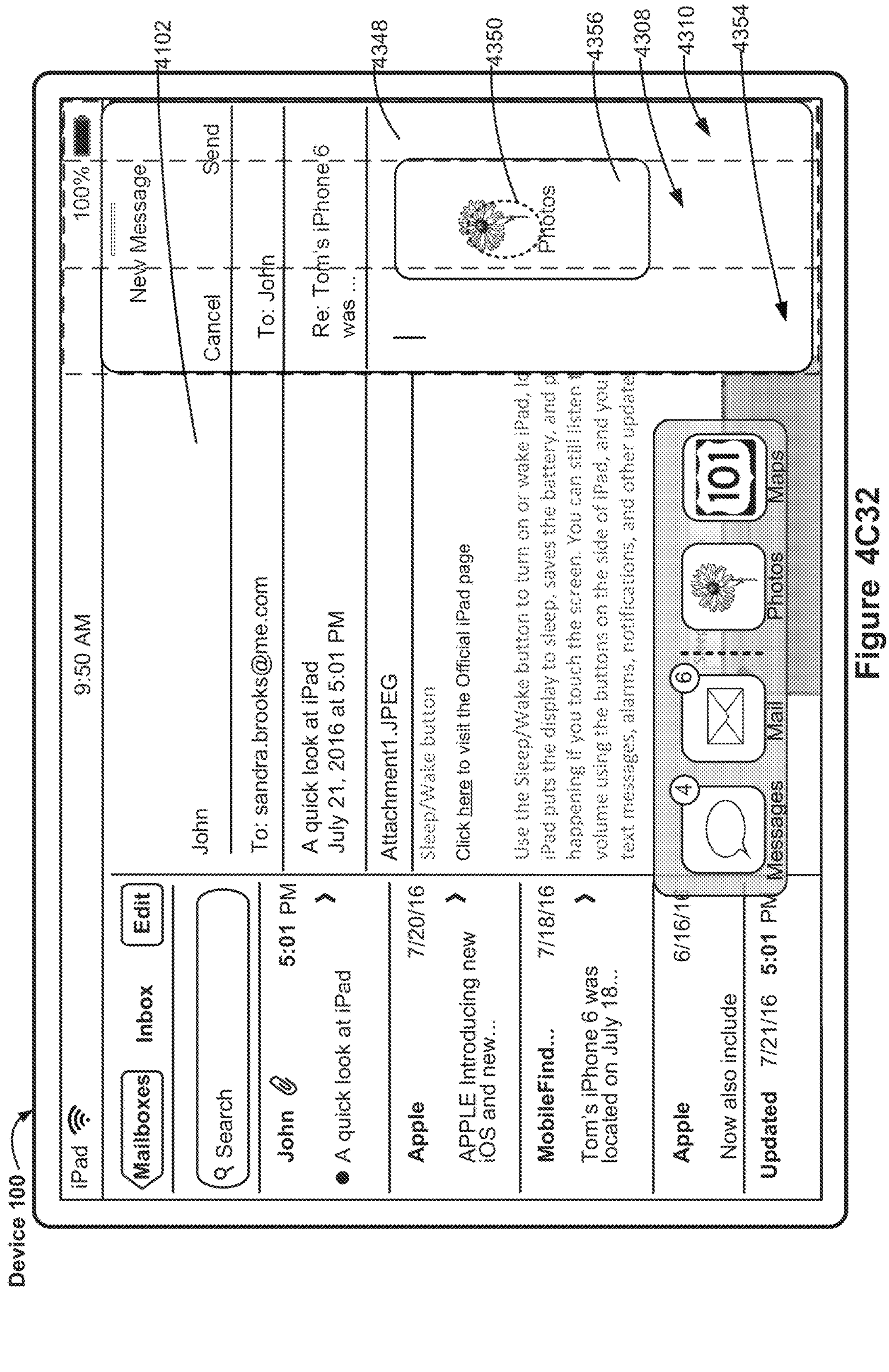
Figure 4C32

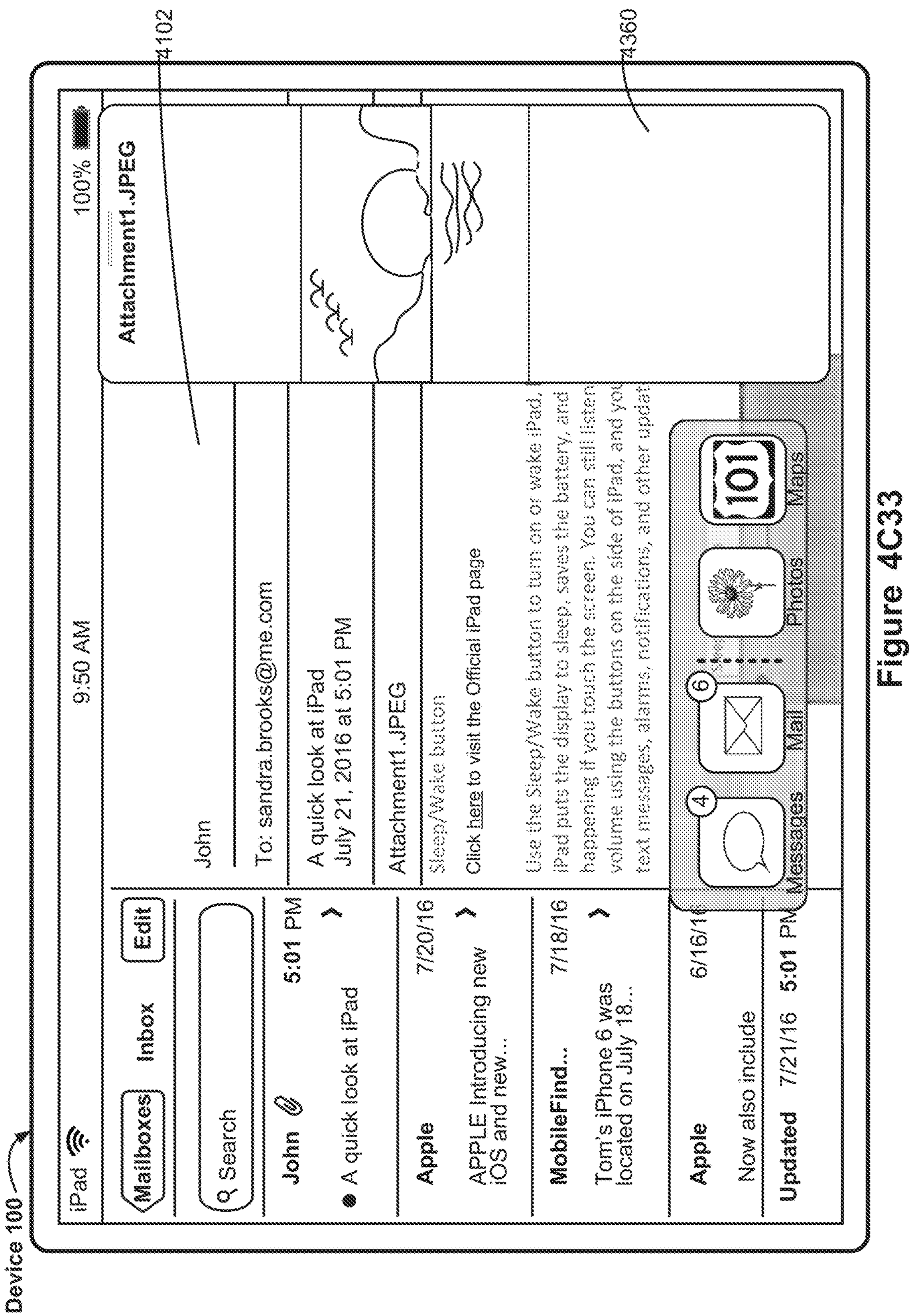
Figure 4C33

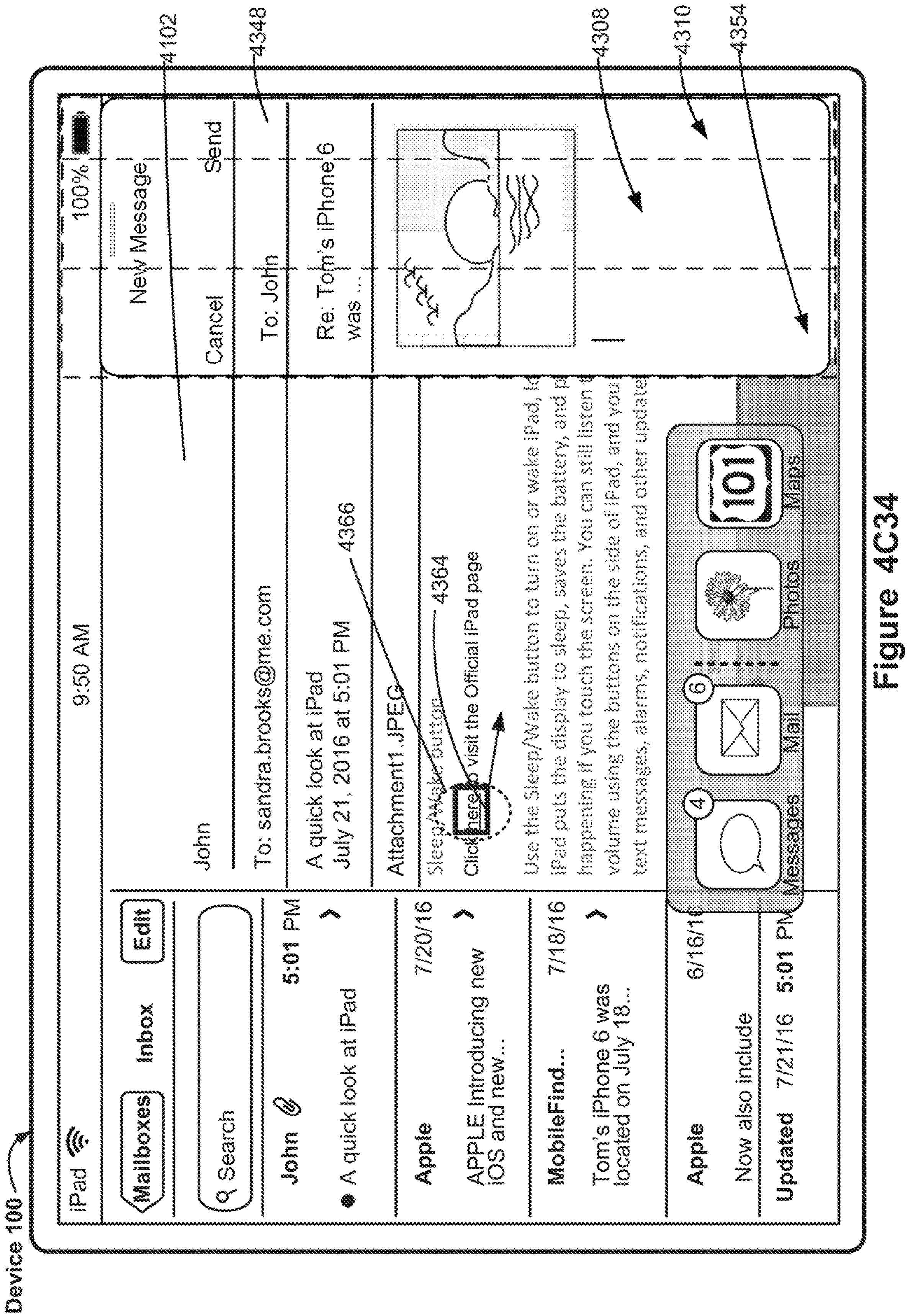
Figure 4C34

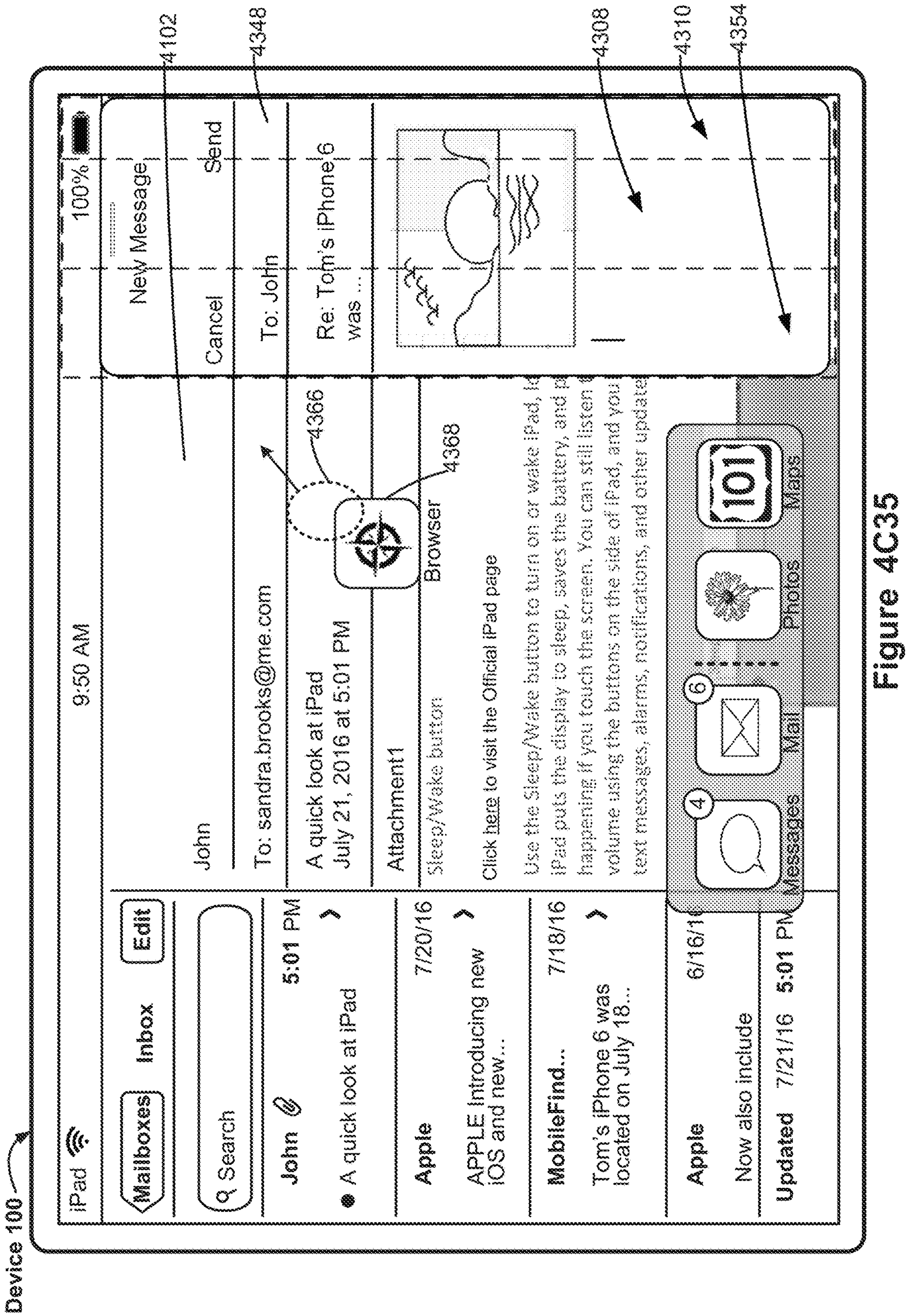
Figure 4C35

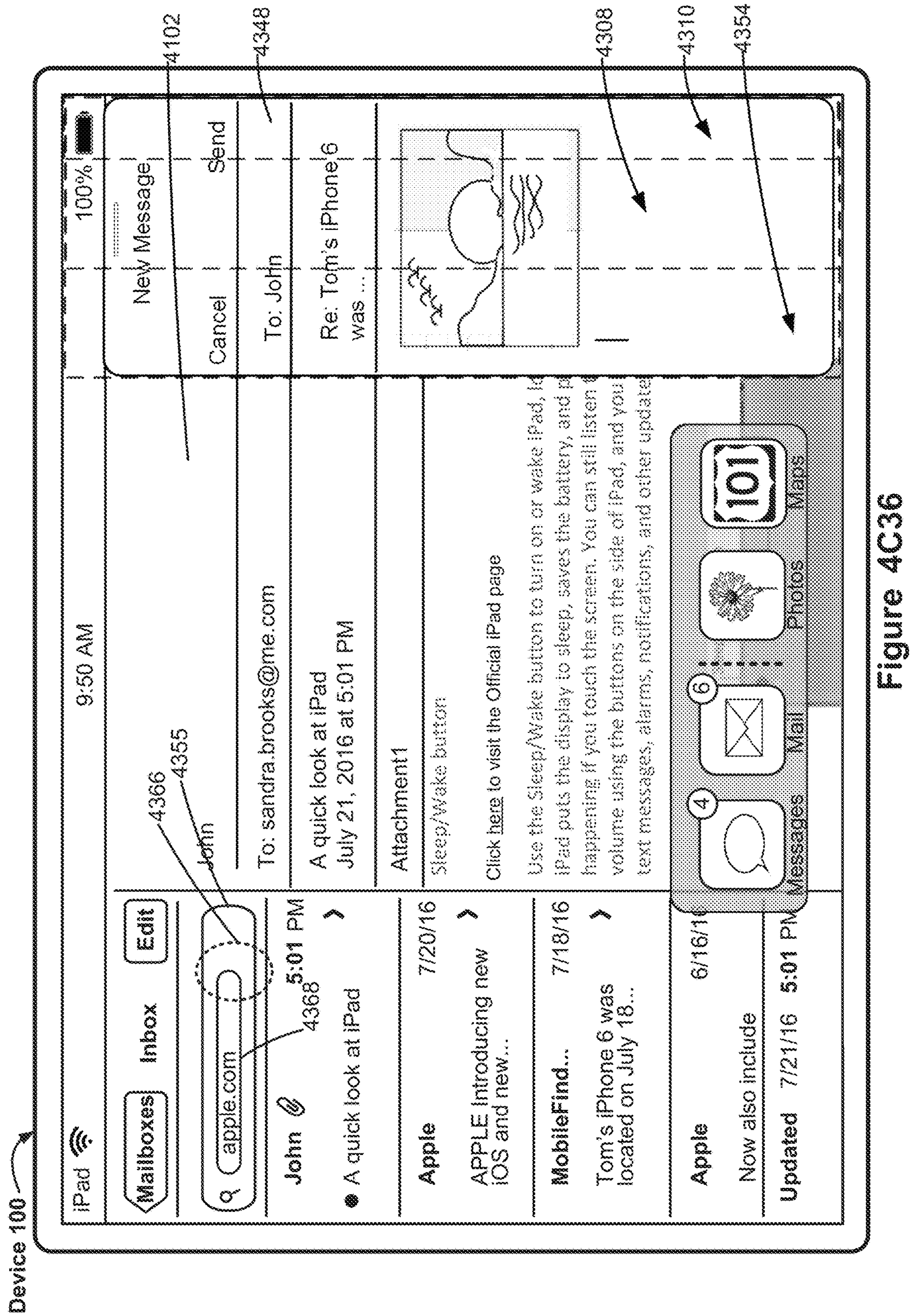
Figure 4C36

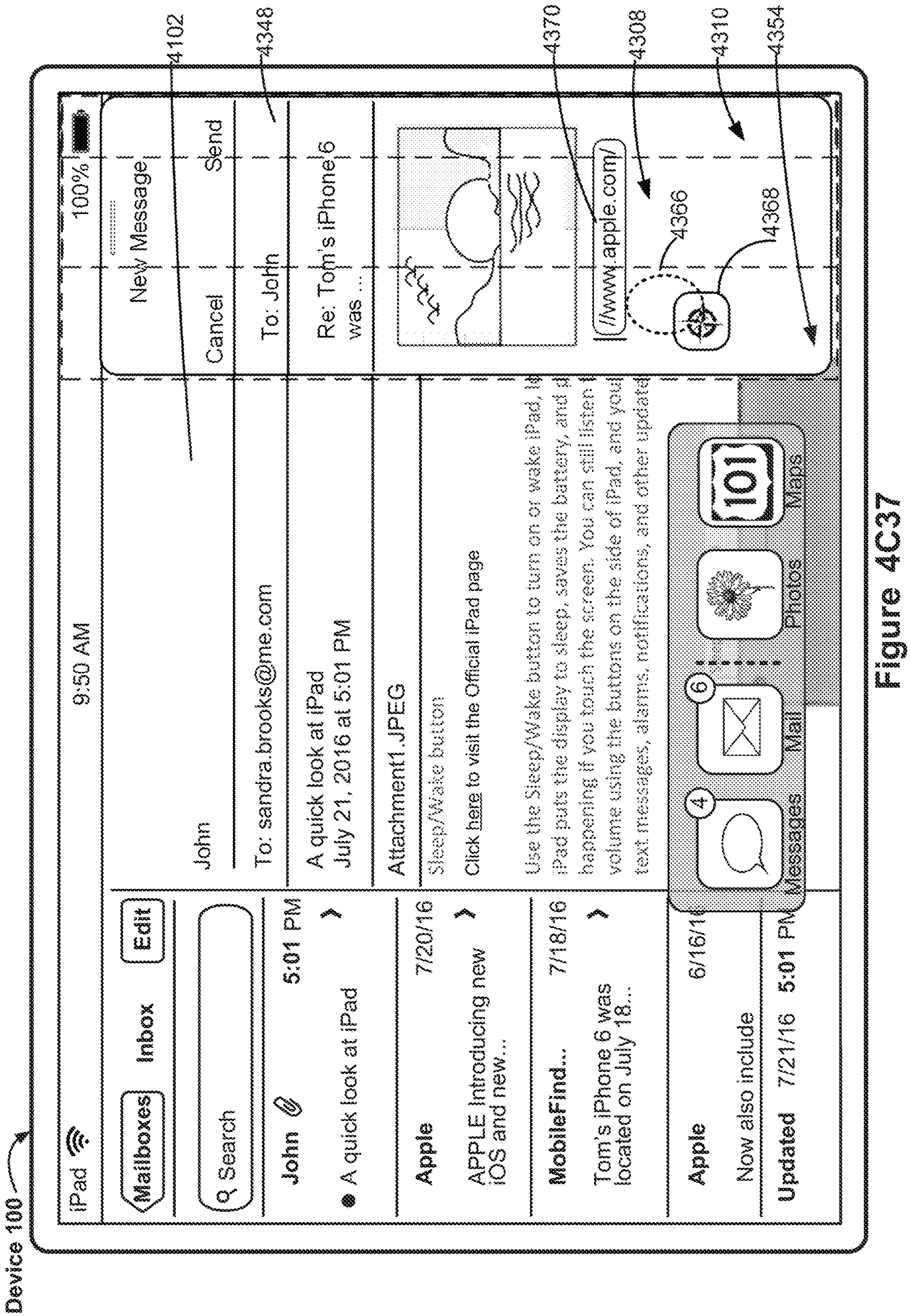
Figure 4C37

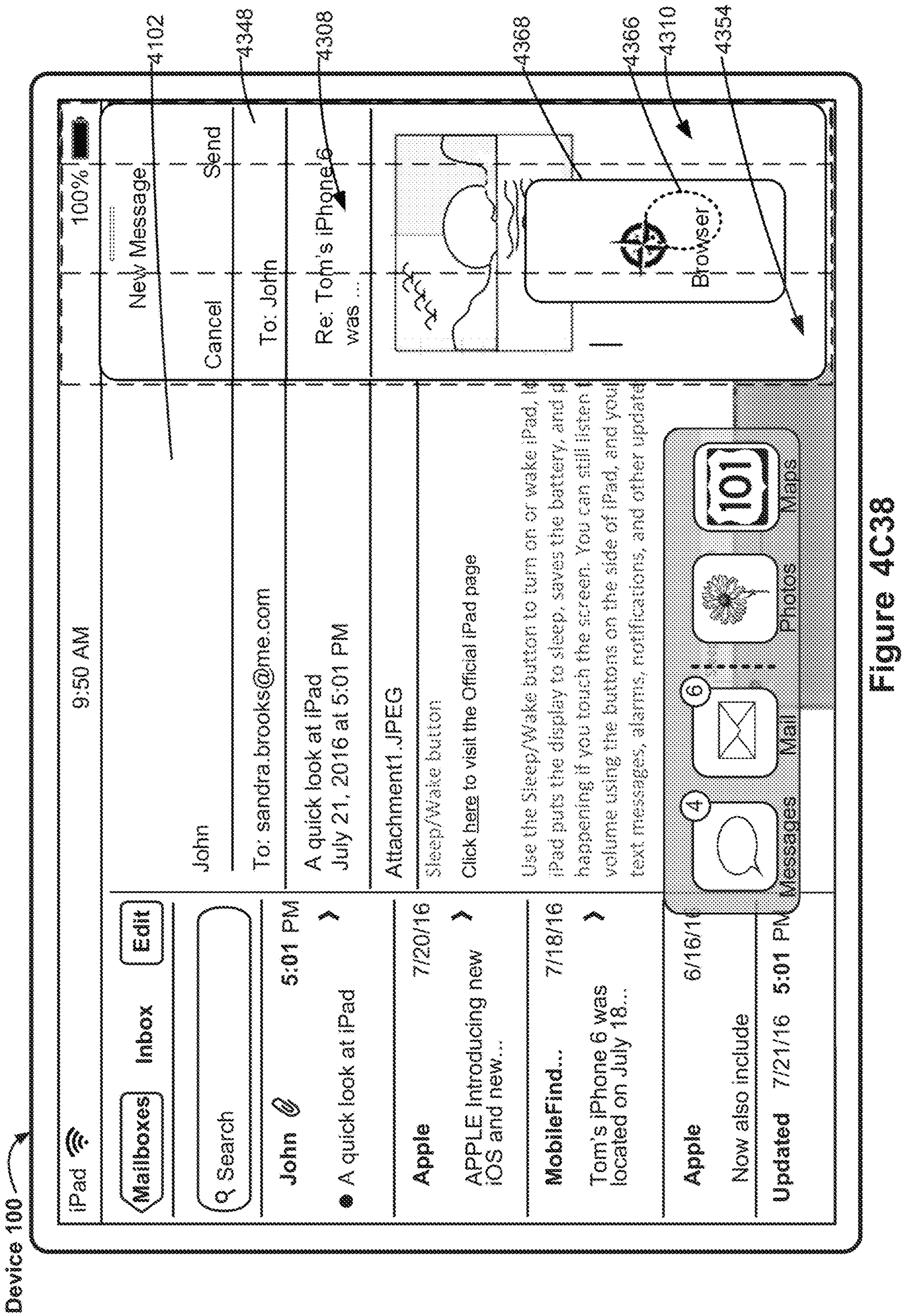
Figure 4C38

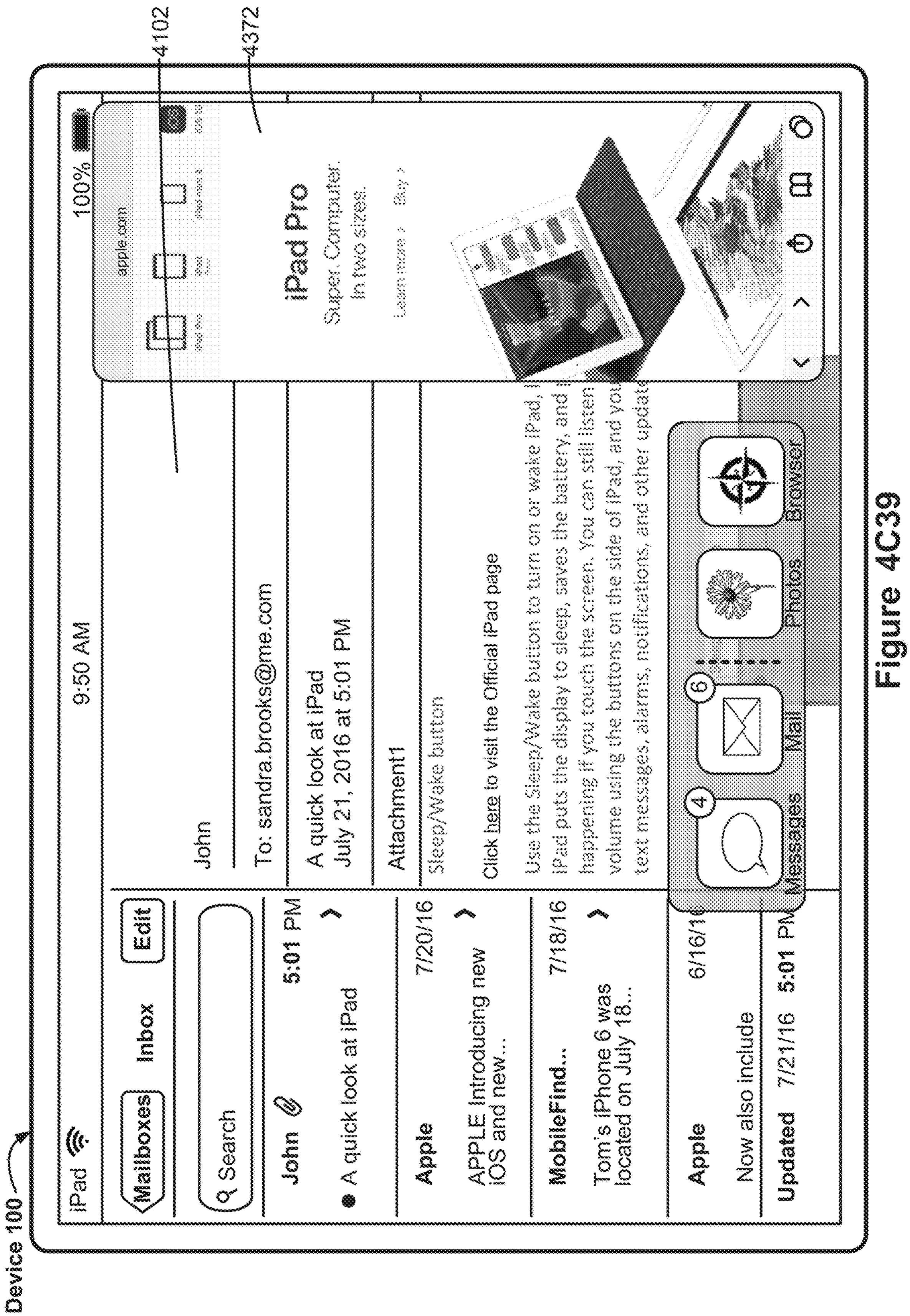
Figure 4C39

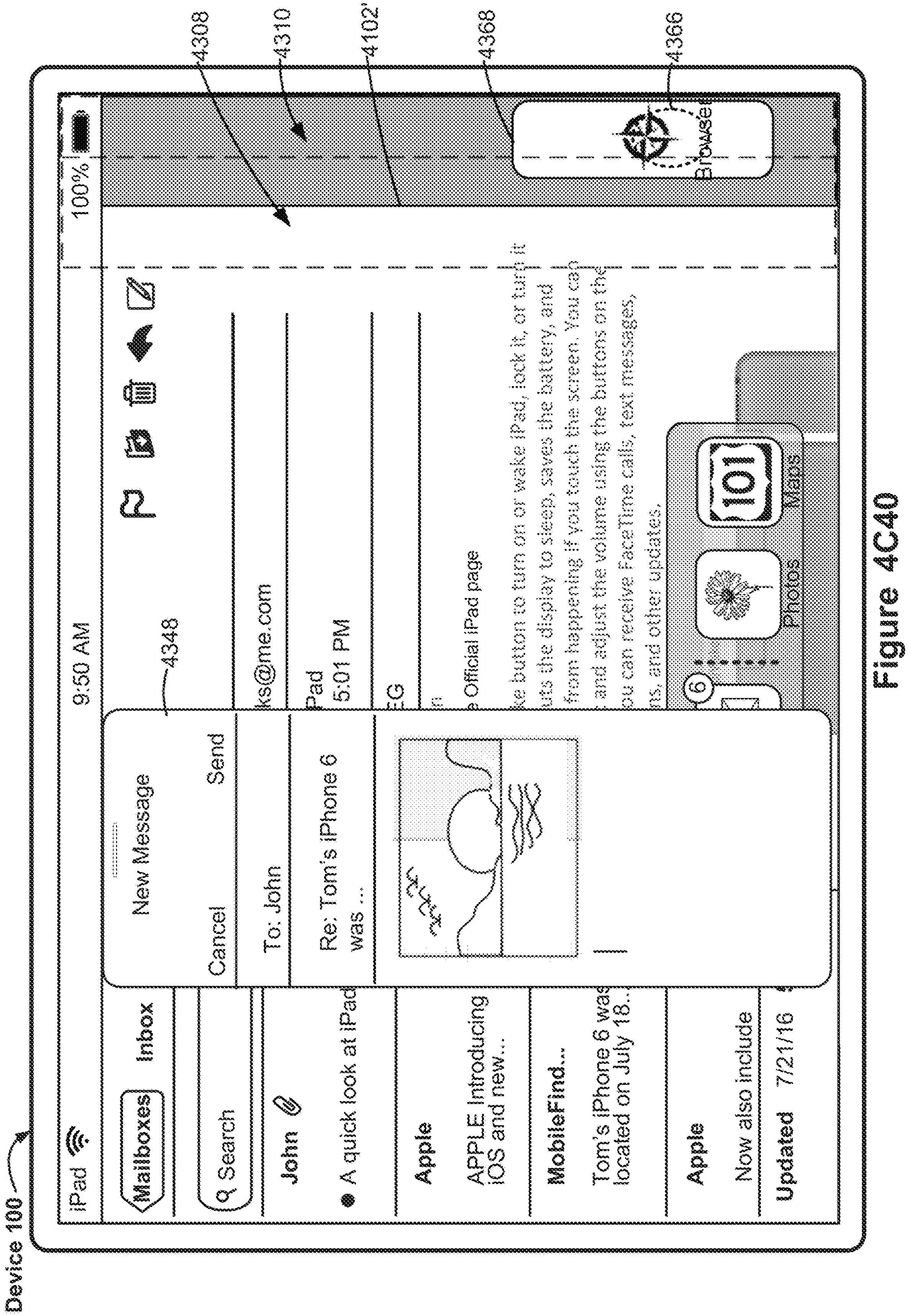
Figure 4C40

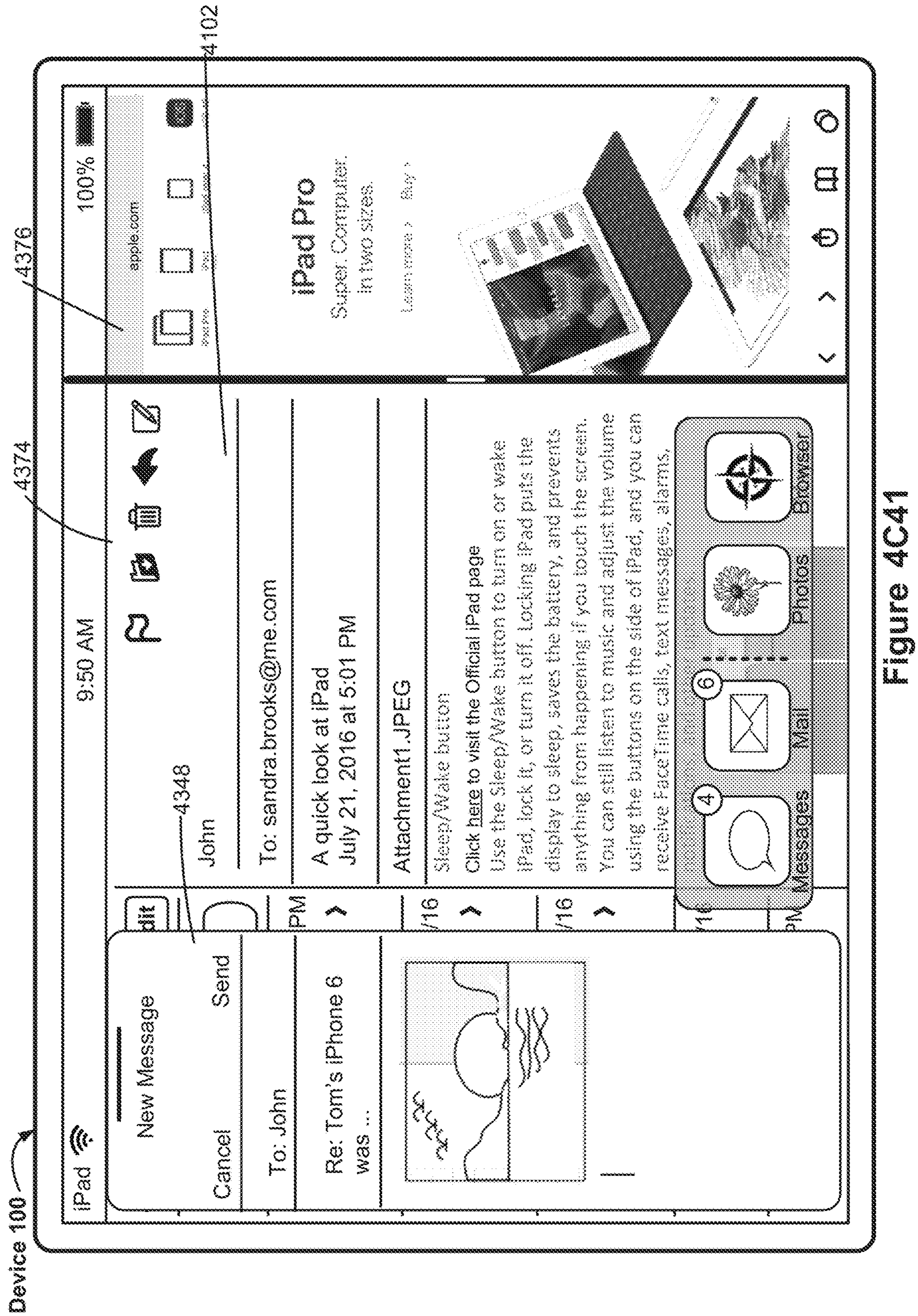
Figure 4C41

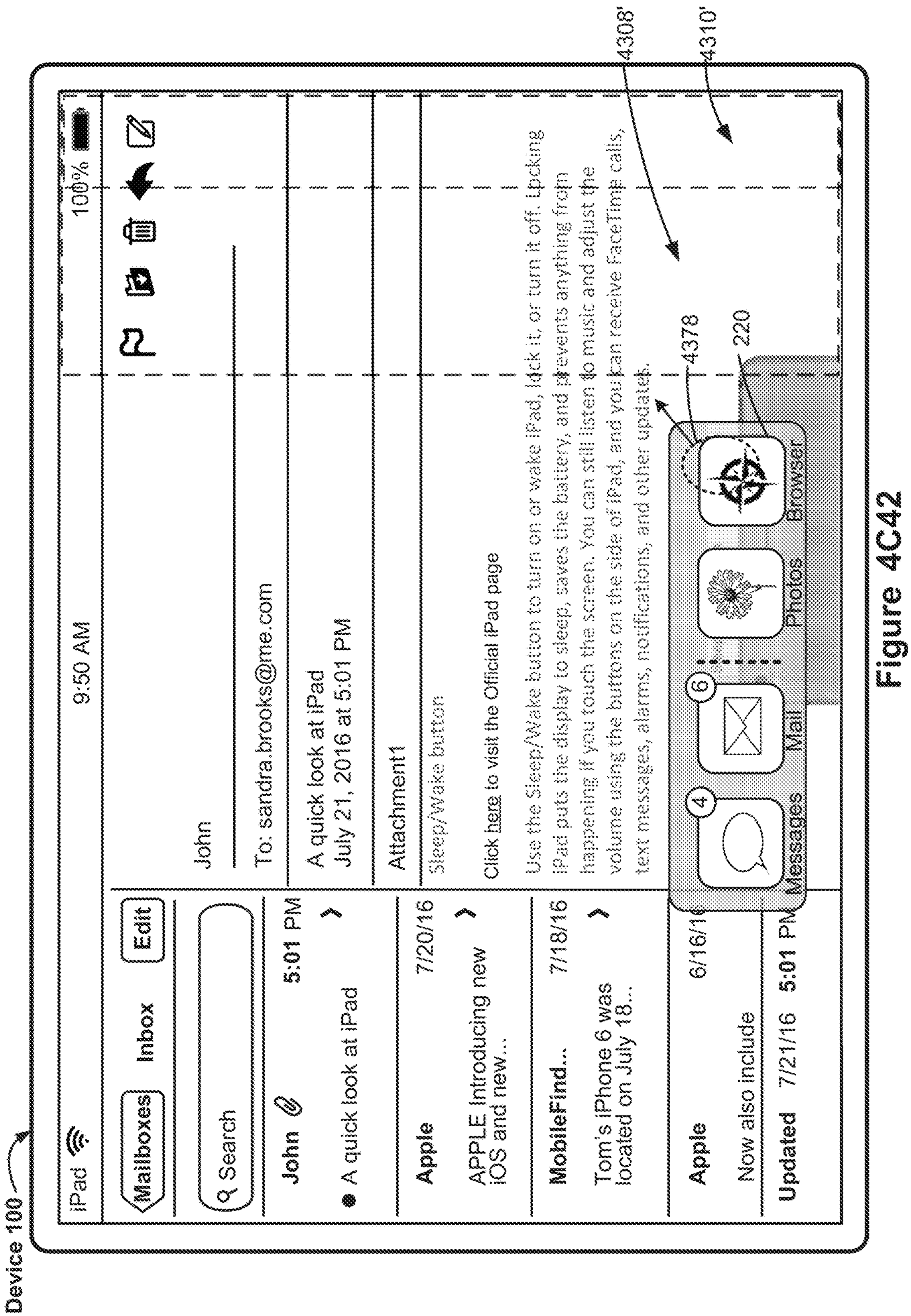
Figure 4C42

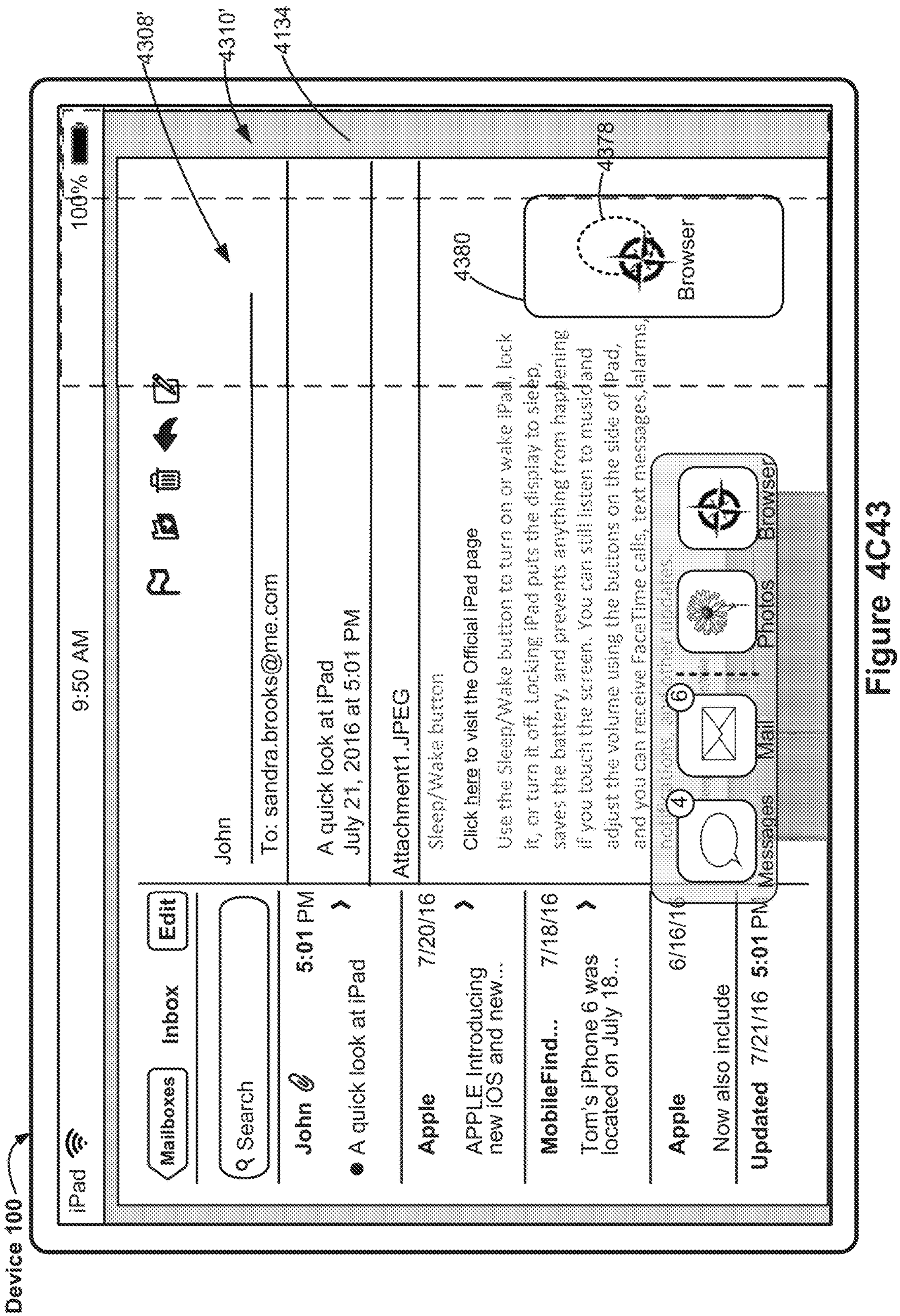
Figure 4C43

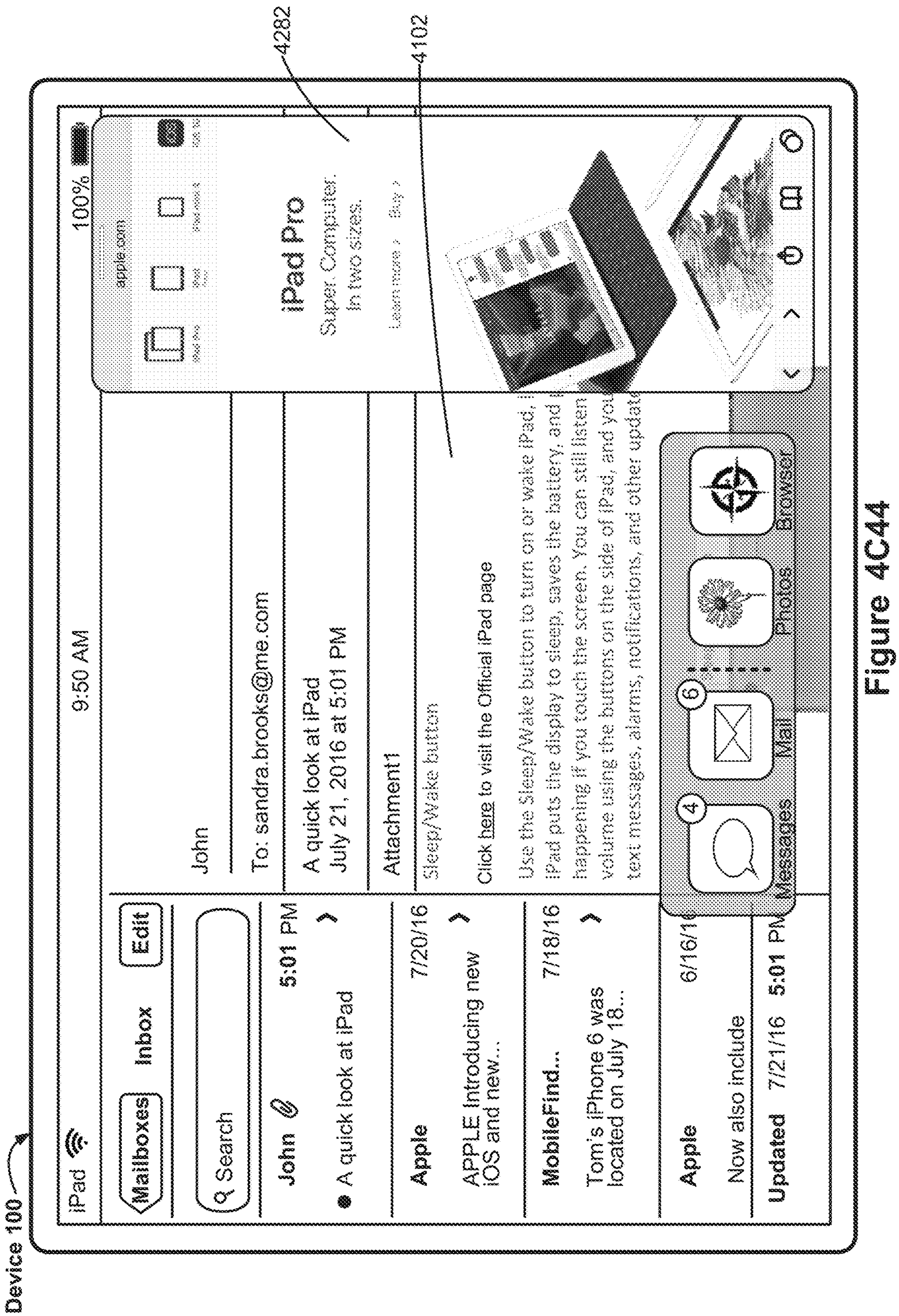
Figure 4C44

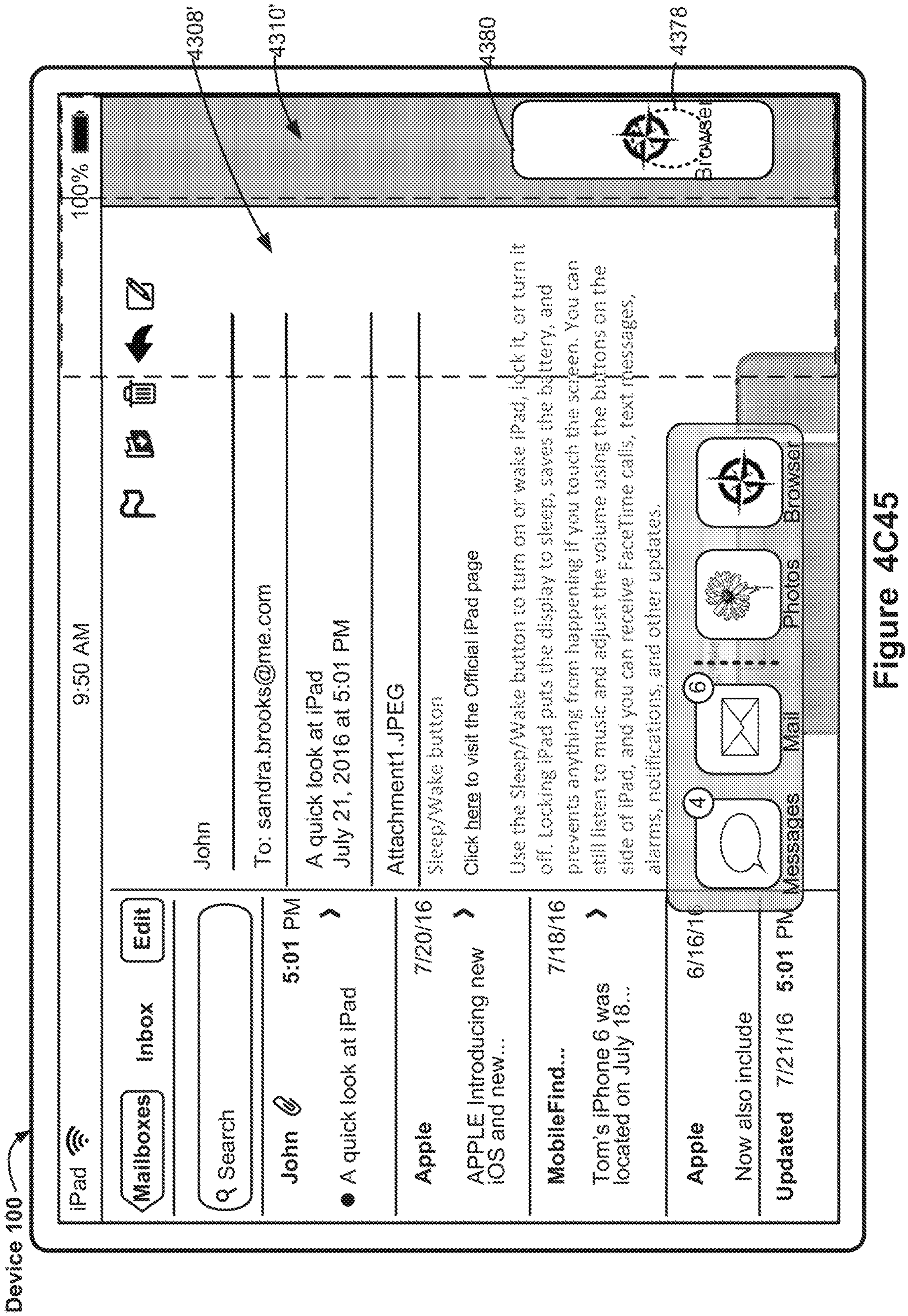
Figure 4C45

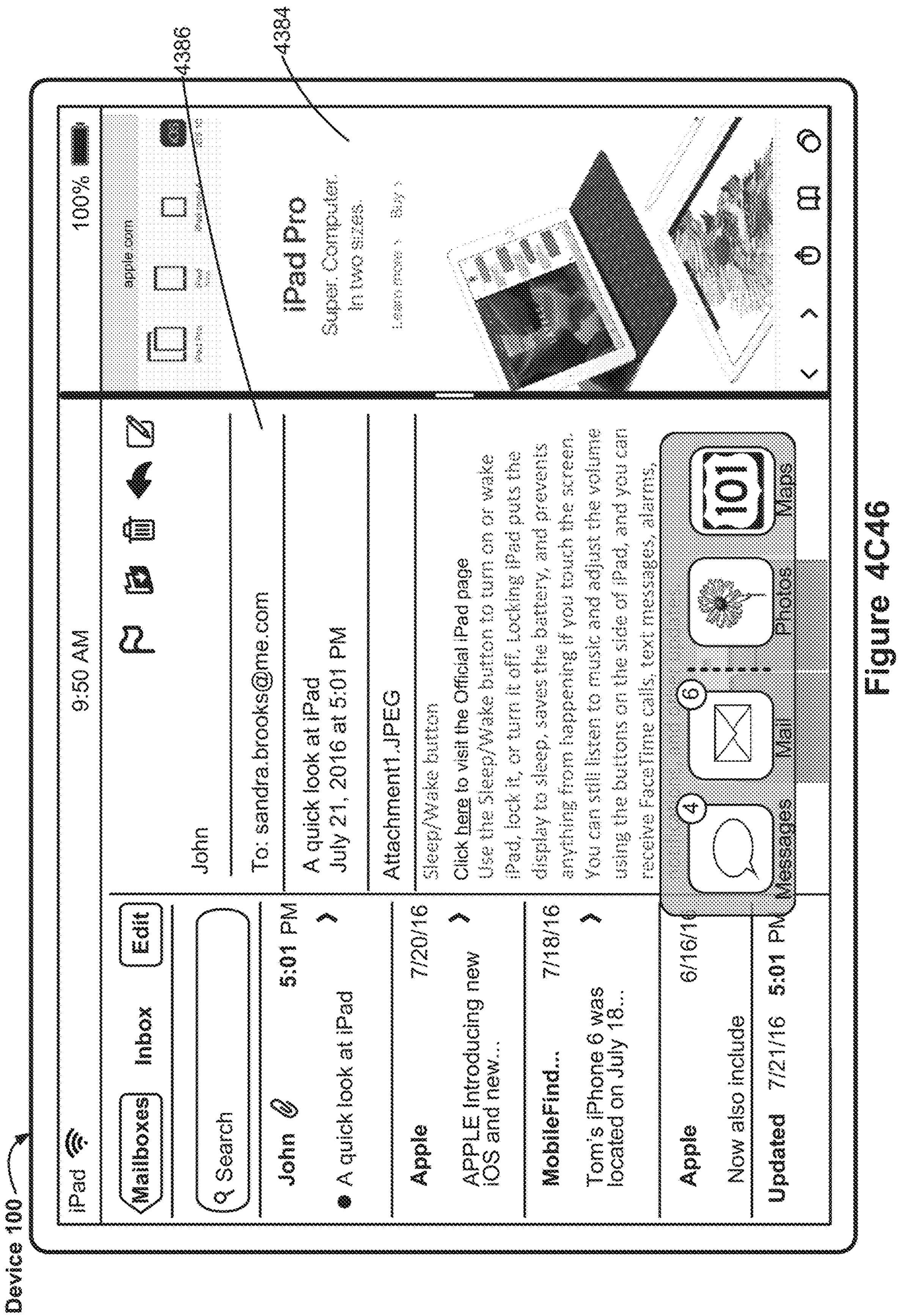
Figure 4C46

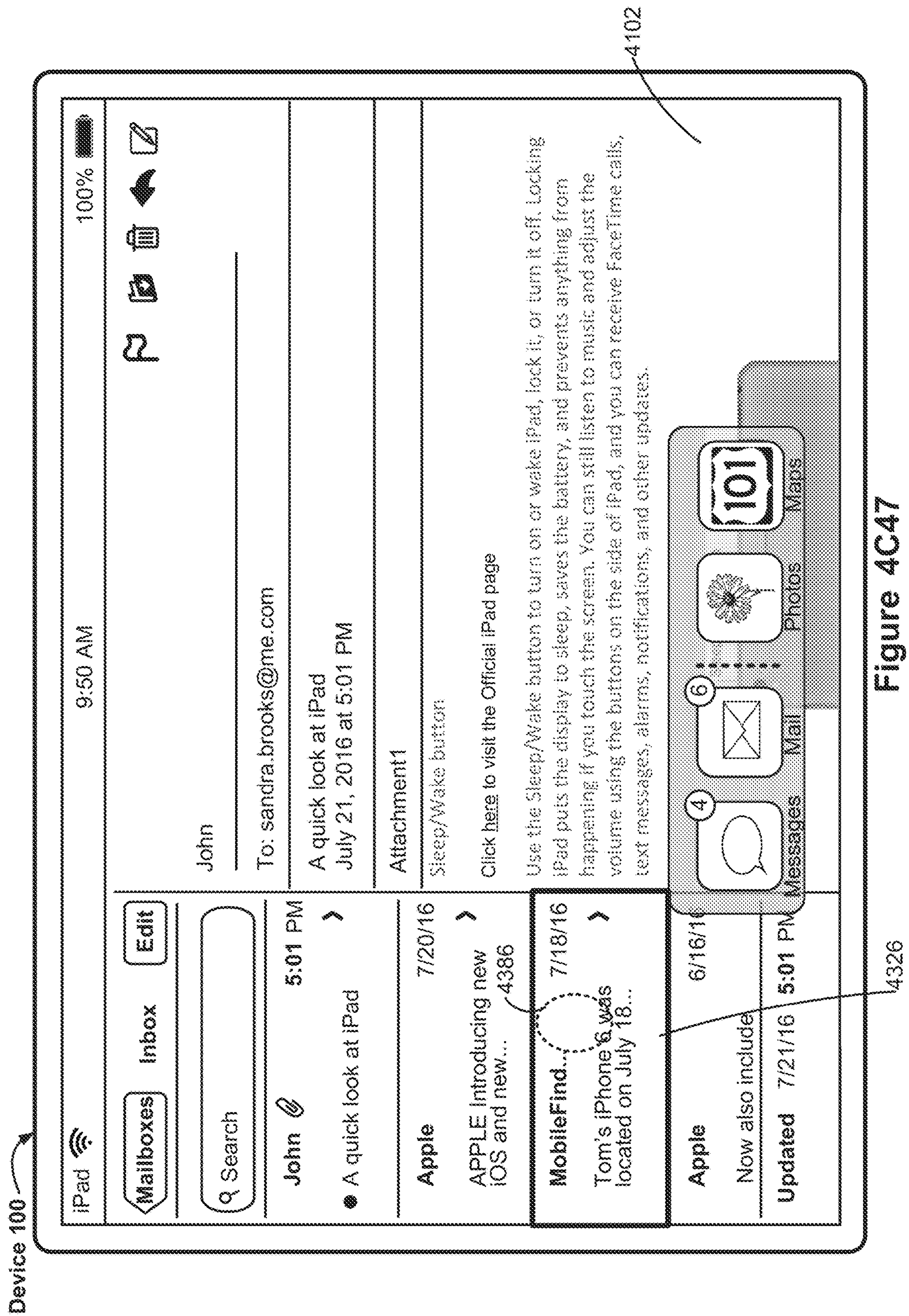
Figure 4C47

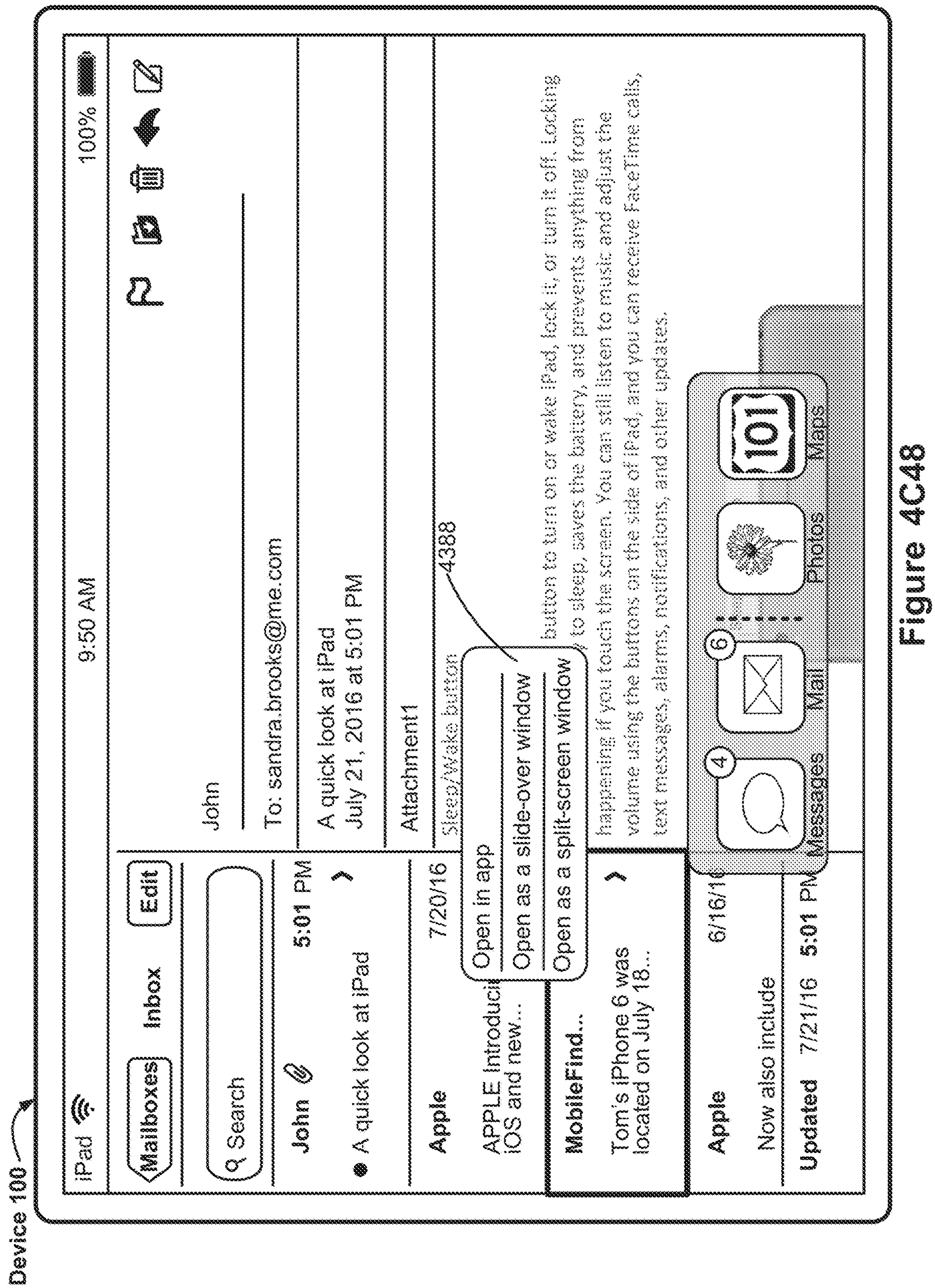
Figure 4C48

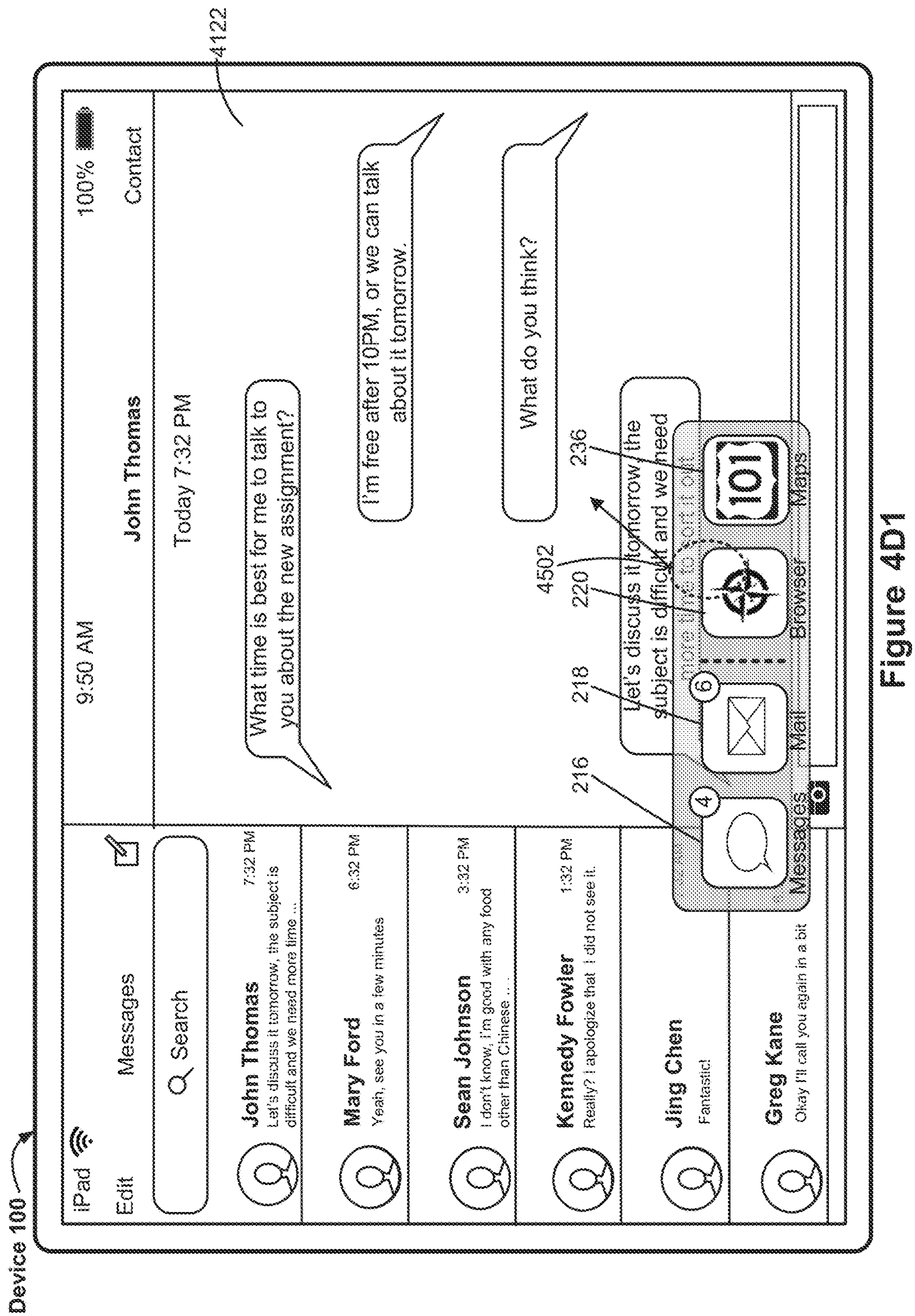
Figure 4D1

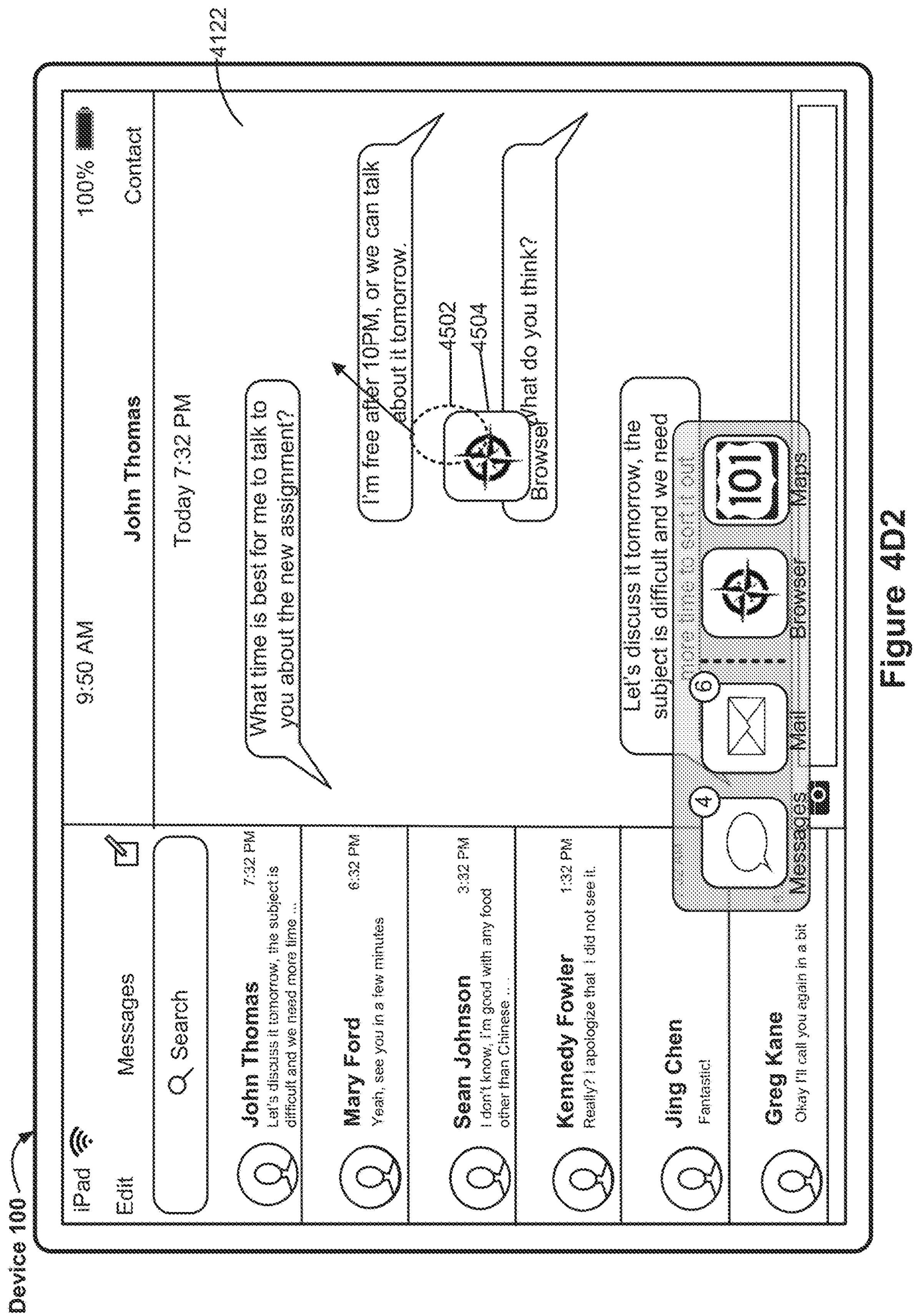
Figure 4D2

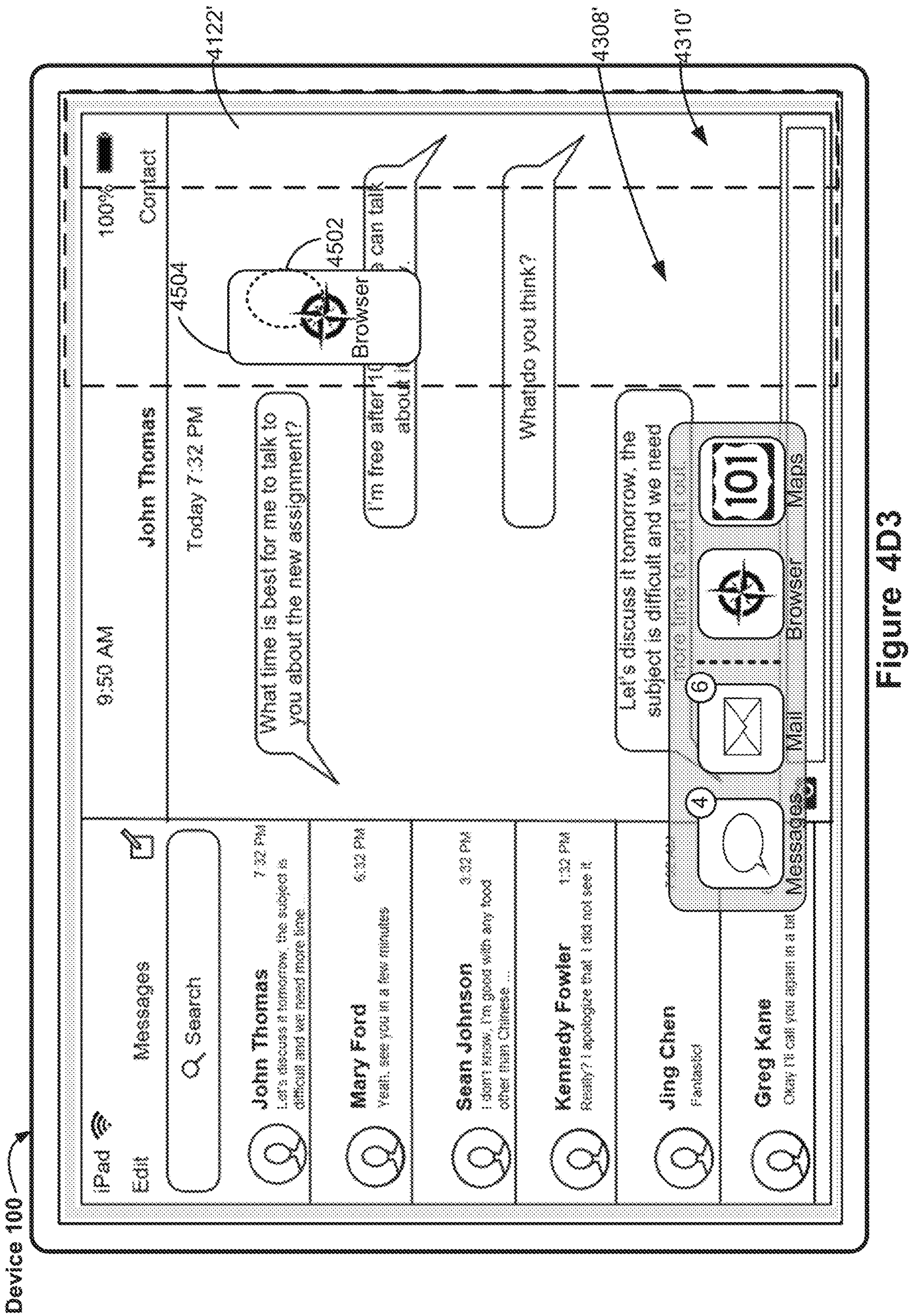
Figure 4D3

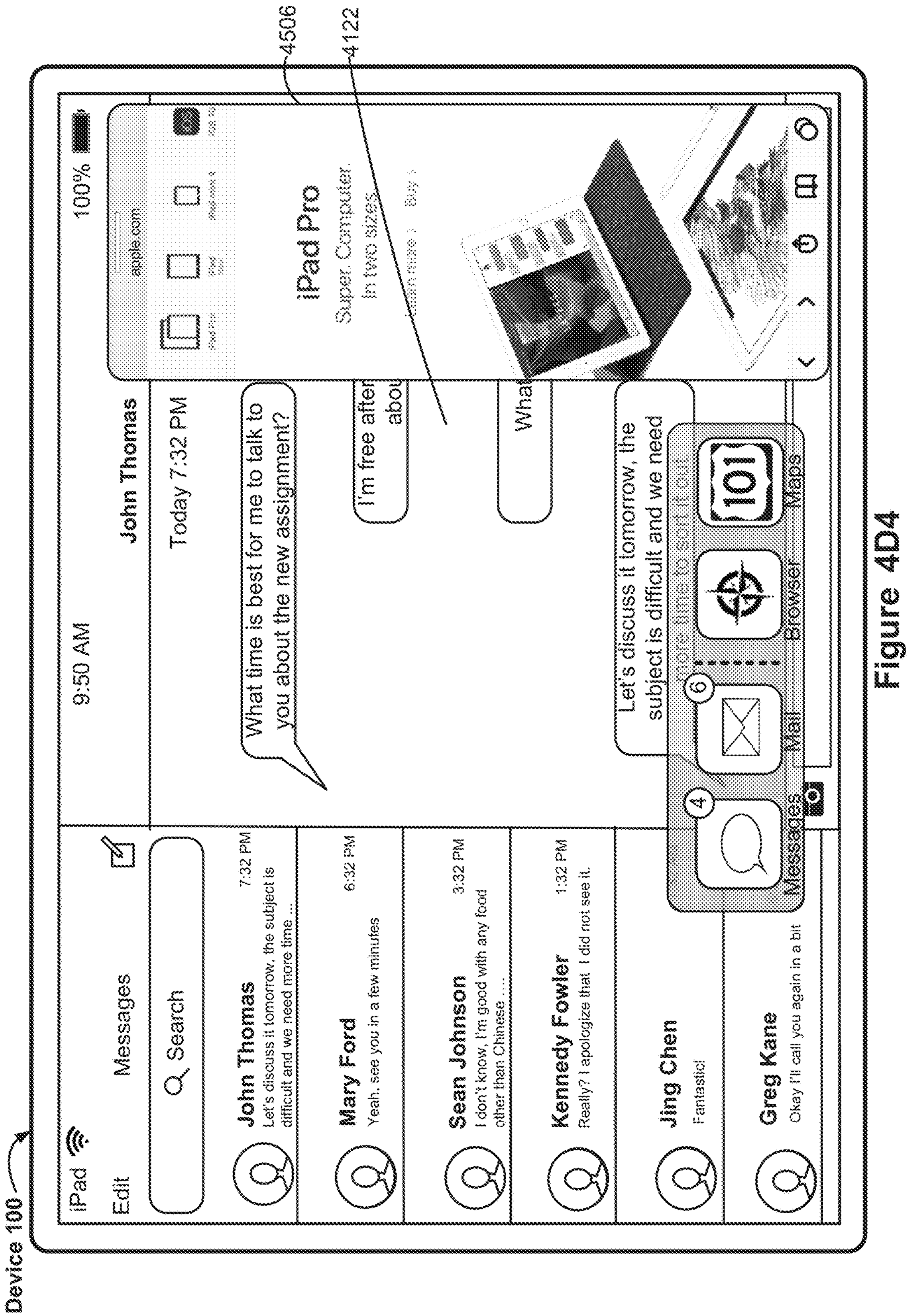
Figure 4D4

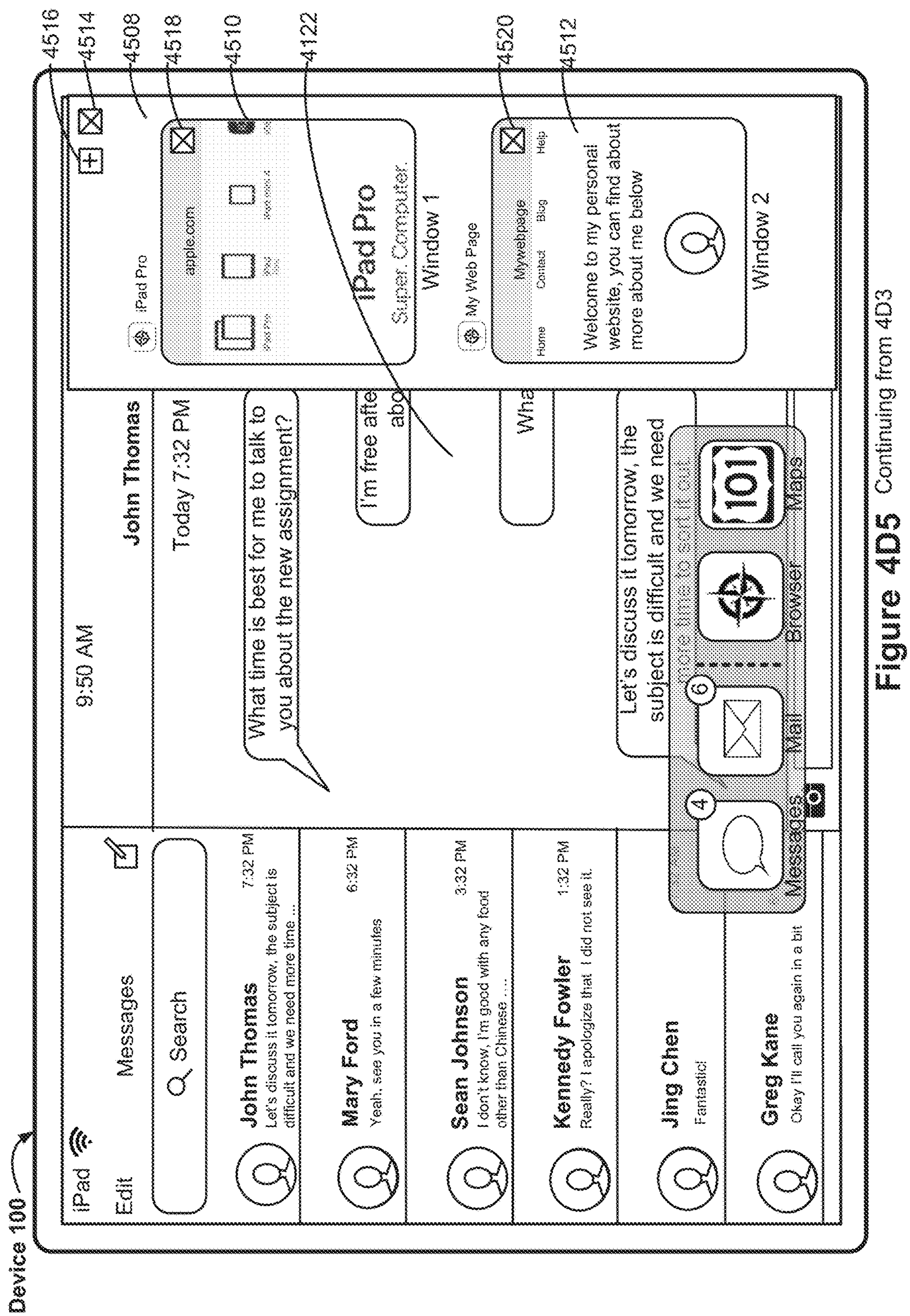
Figure 4D5 Continuing from 4D3

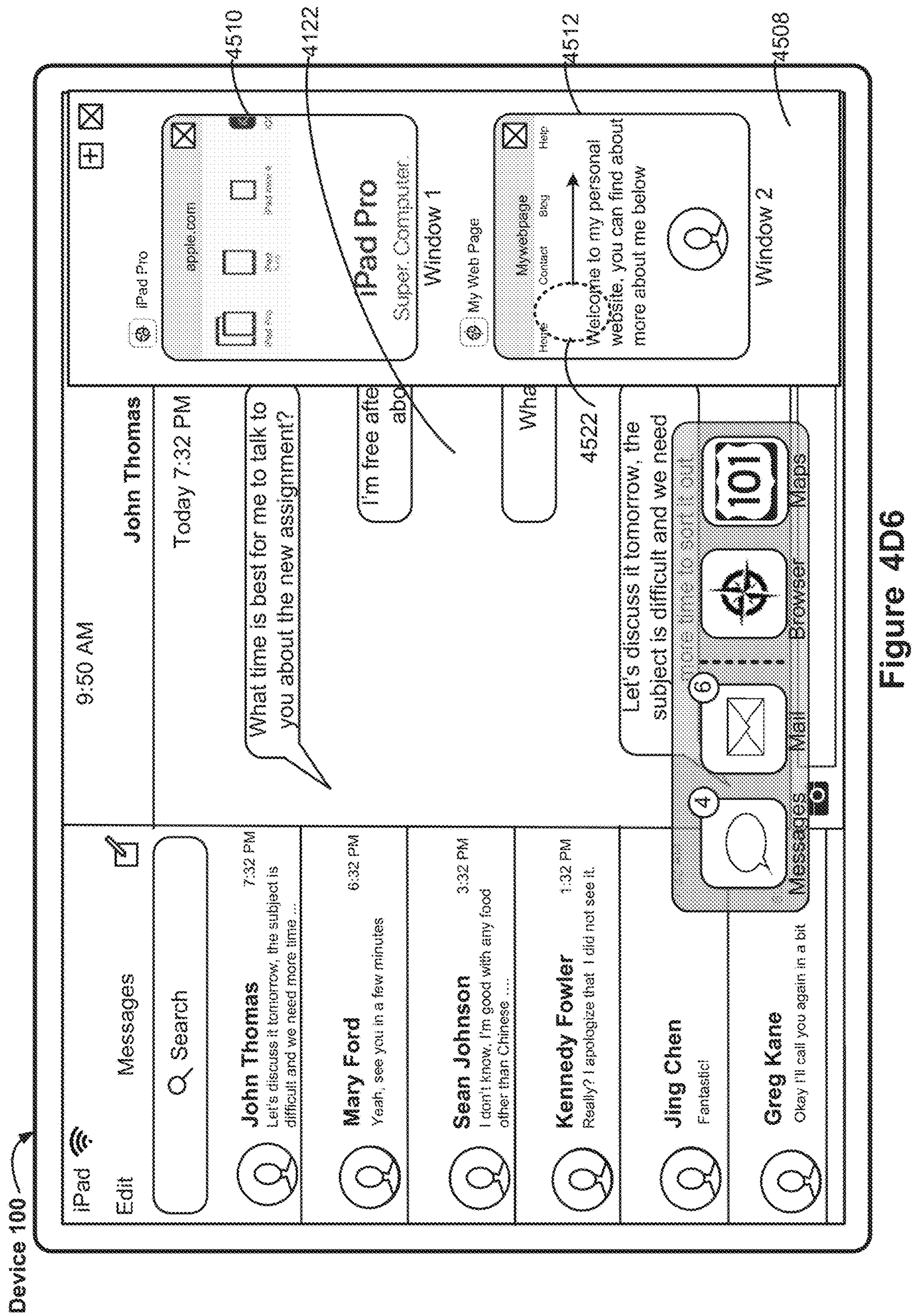
Figure 4D6

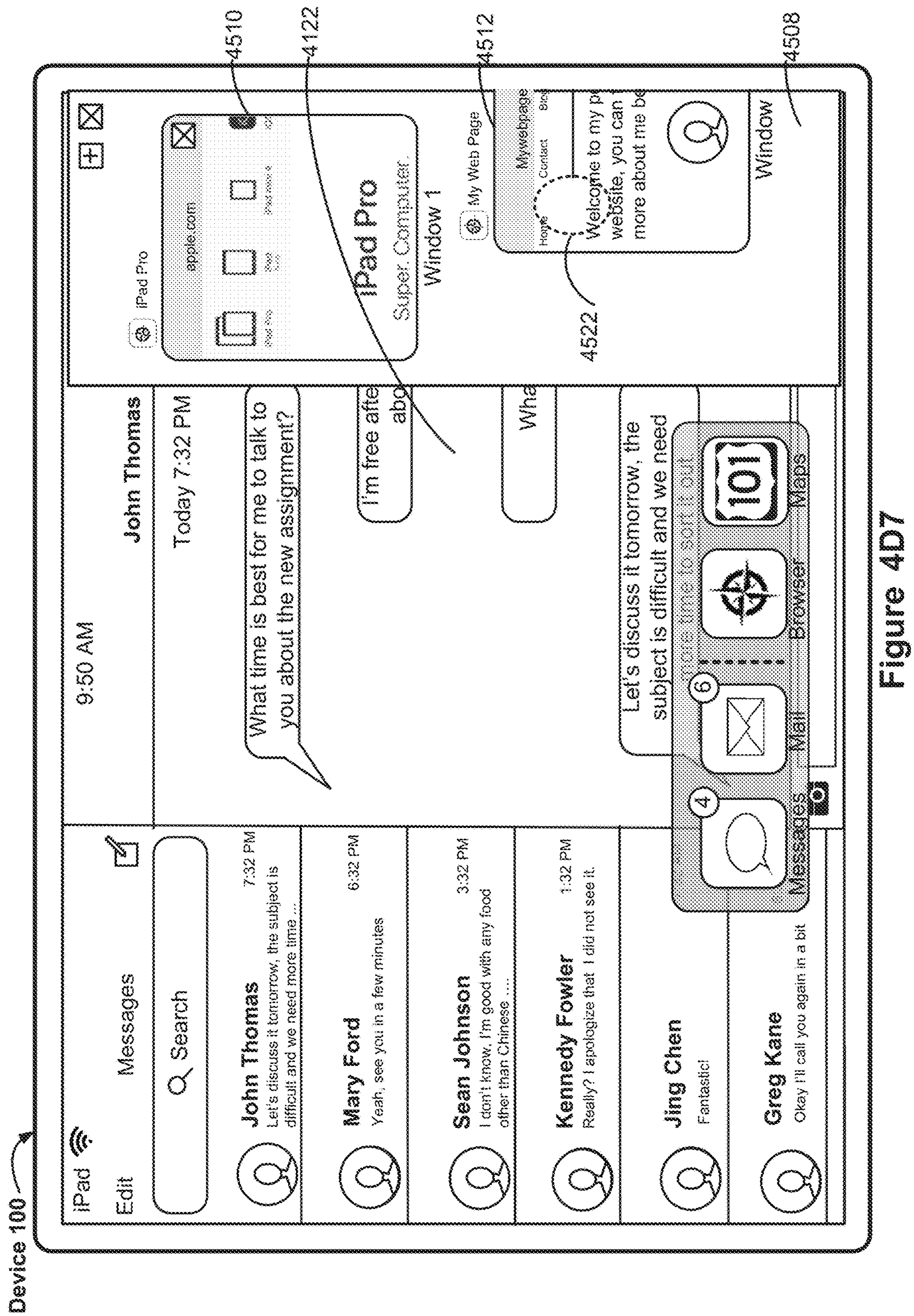
Figure 4D7

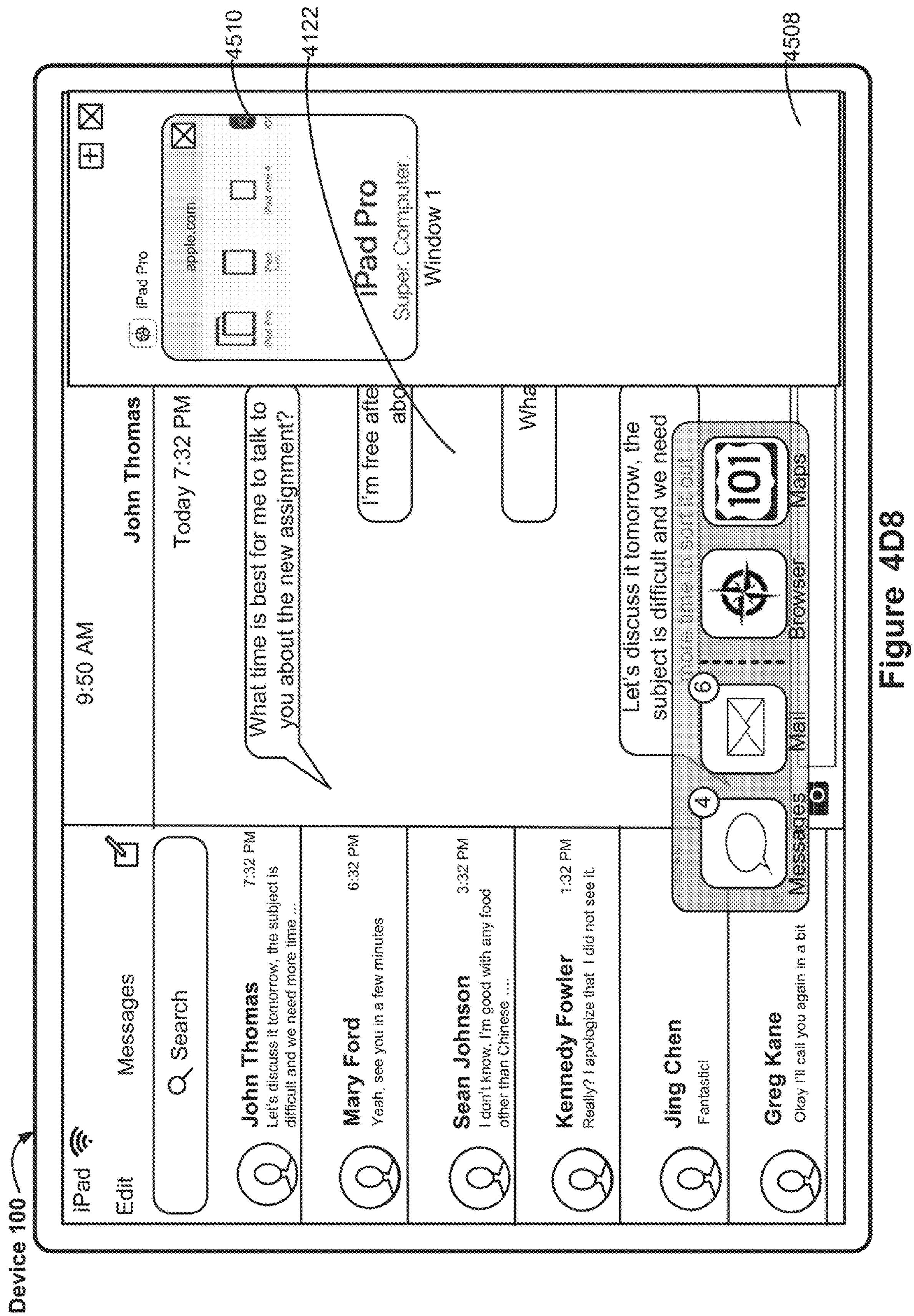
Figure 4D8

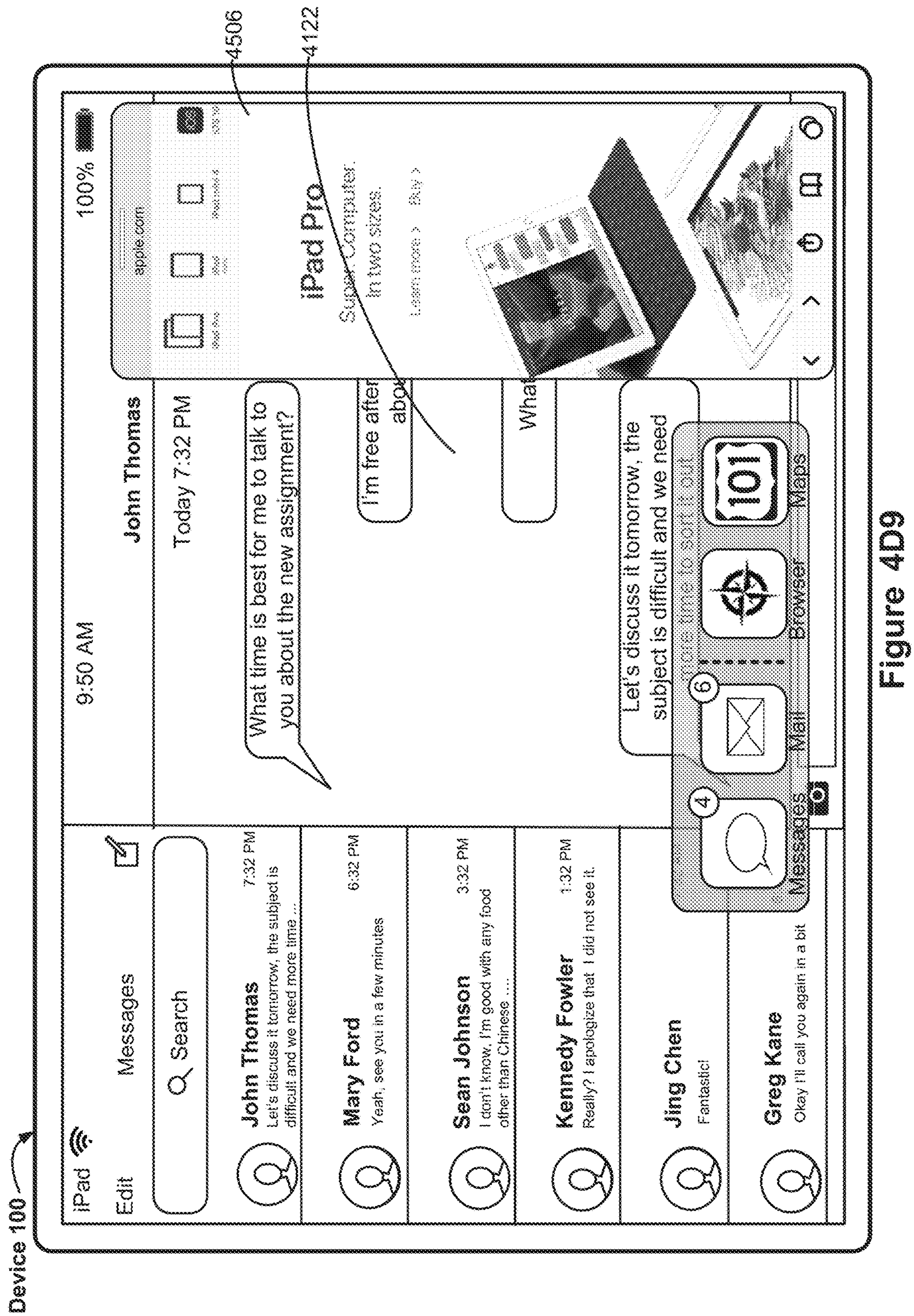
Figure 4D9

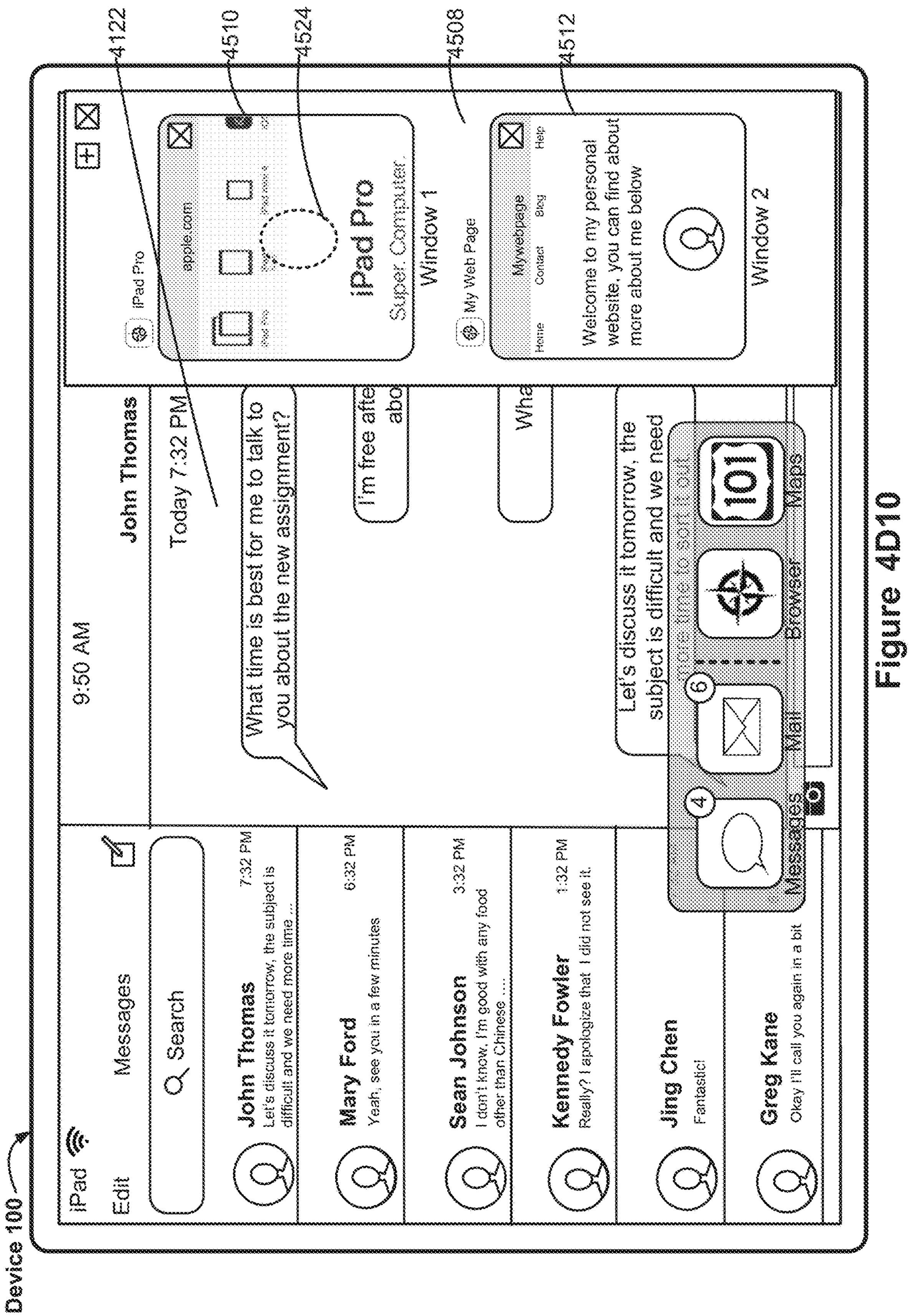
Figure 4D10

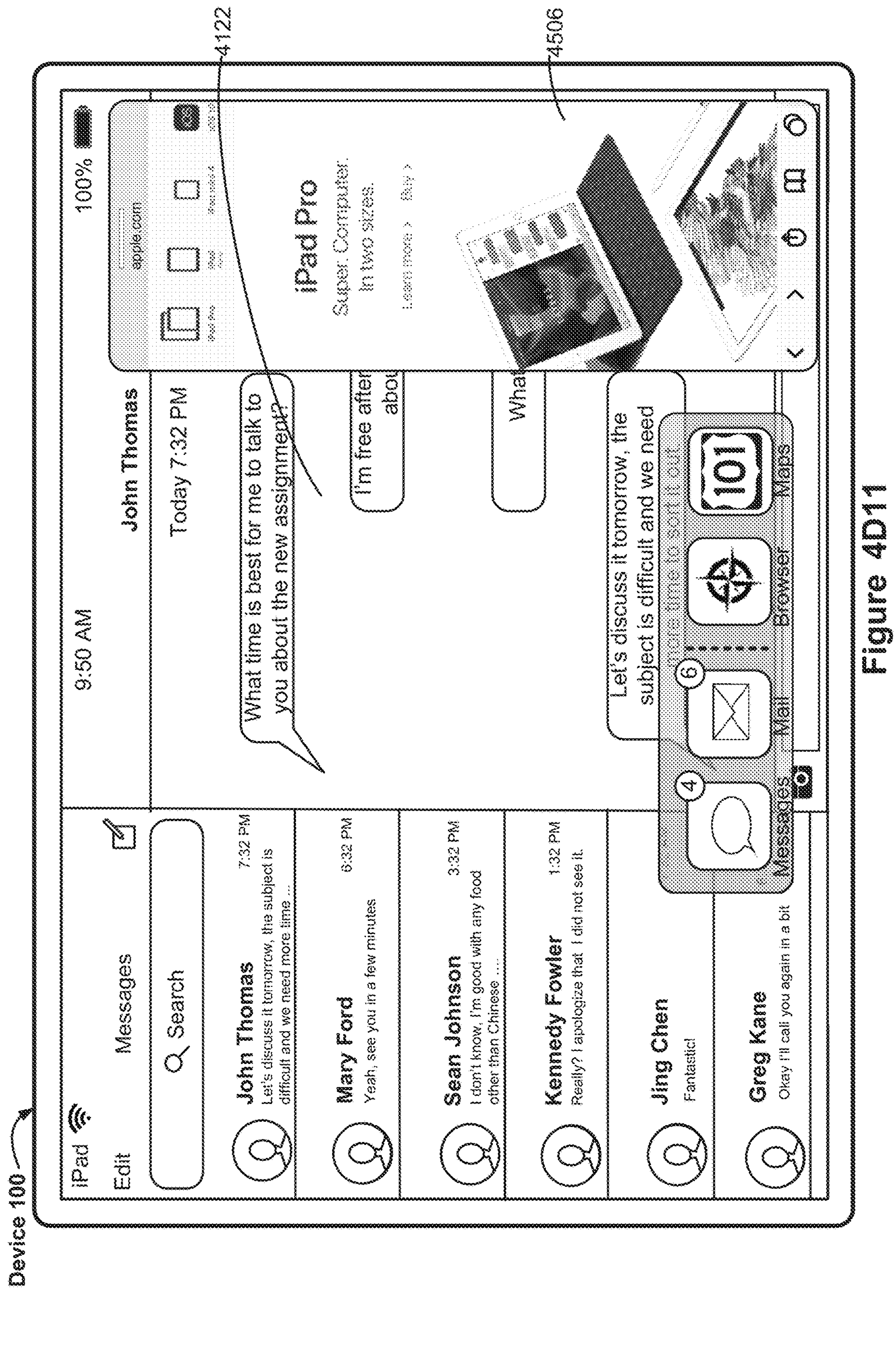
Figure 4D11

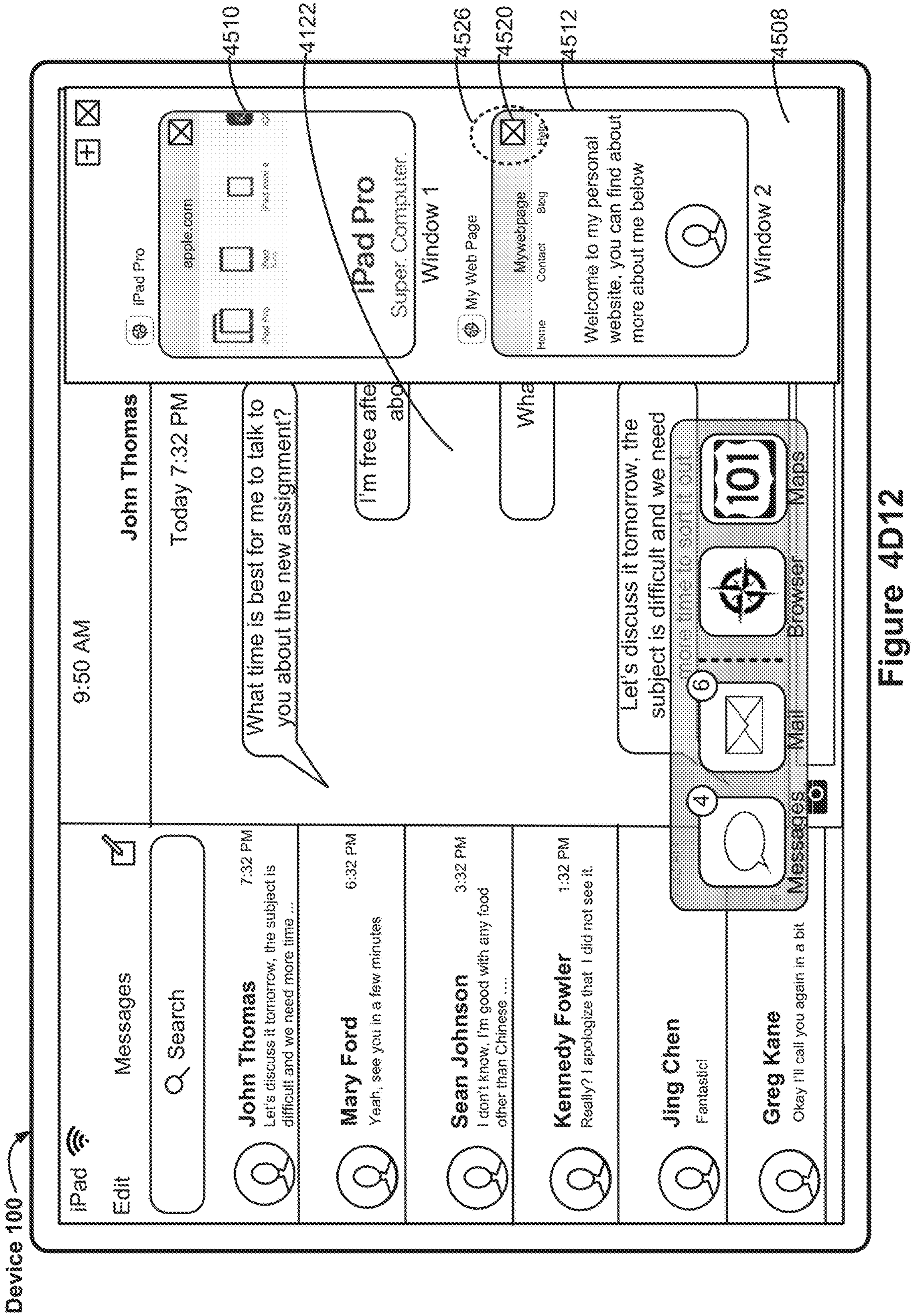
Figure 4D12

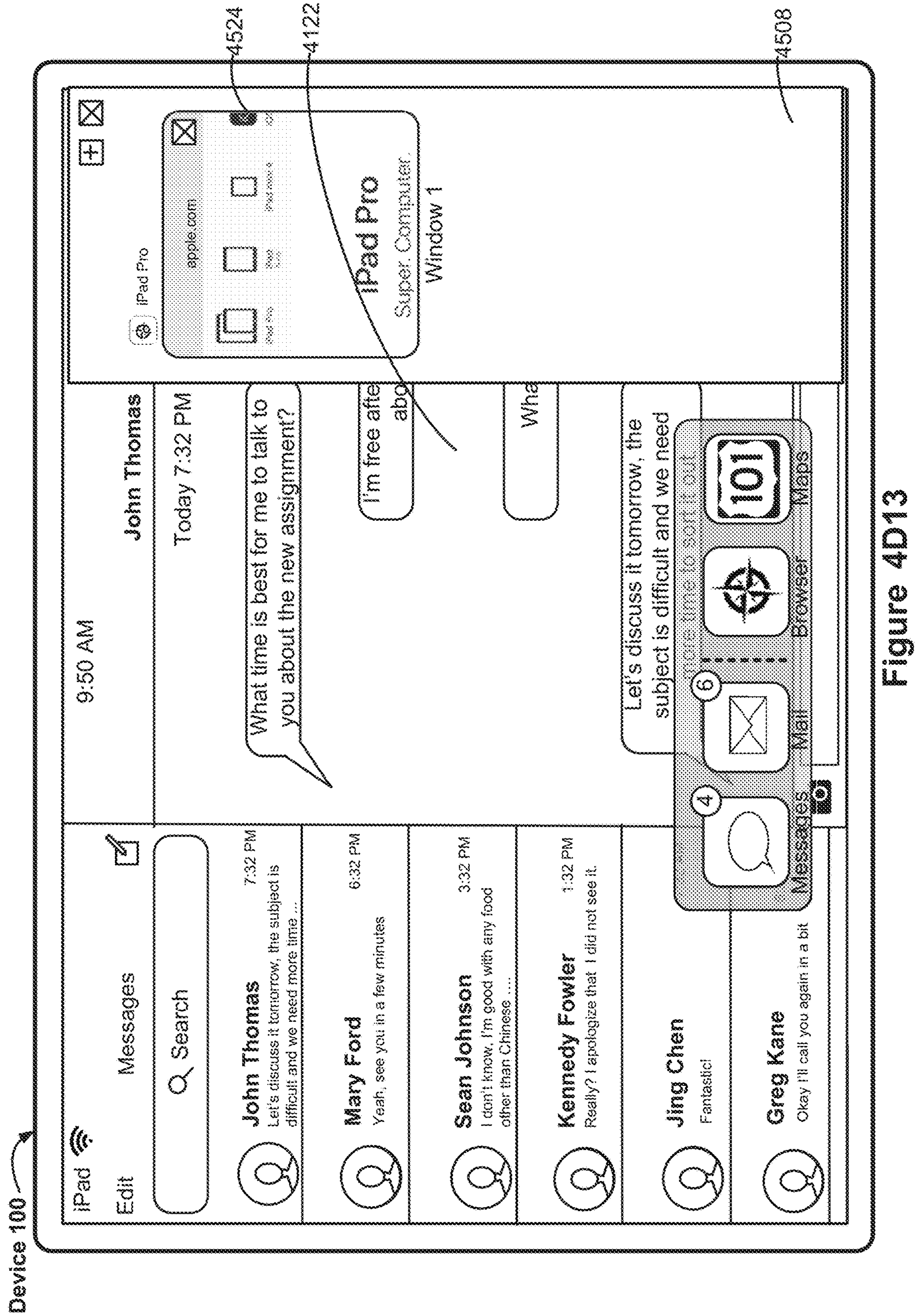
Figure 4D13

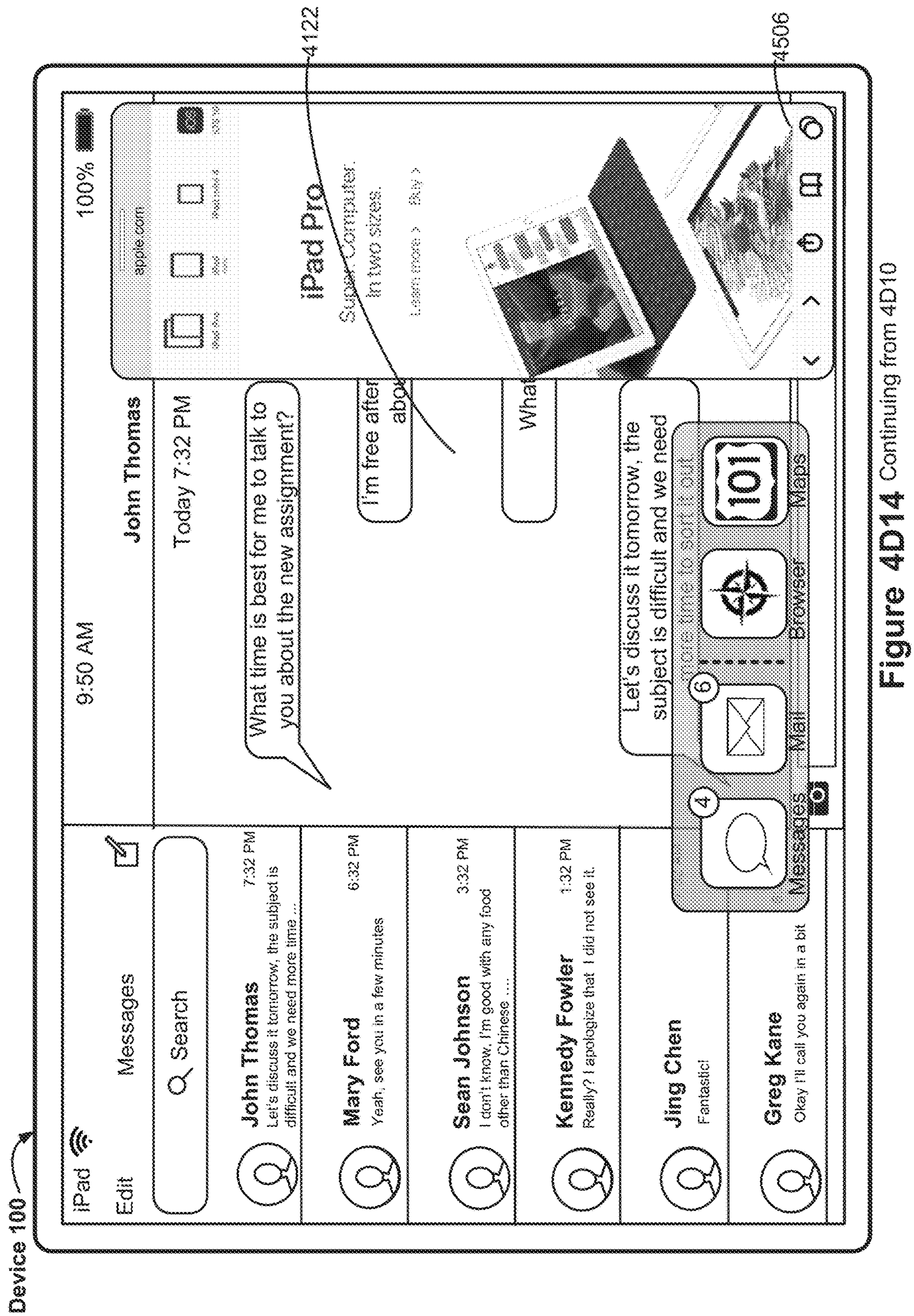
Figure 4D14 Continuing from 4D10

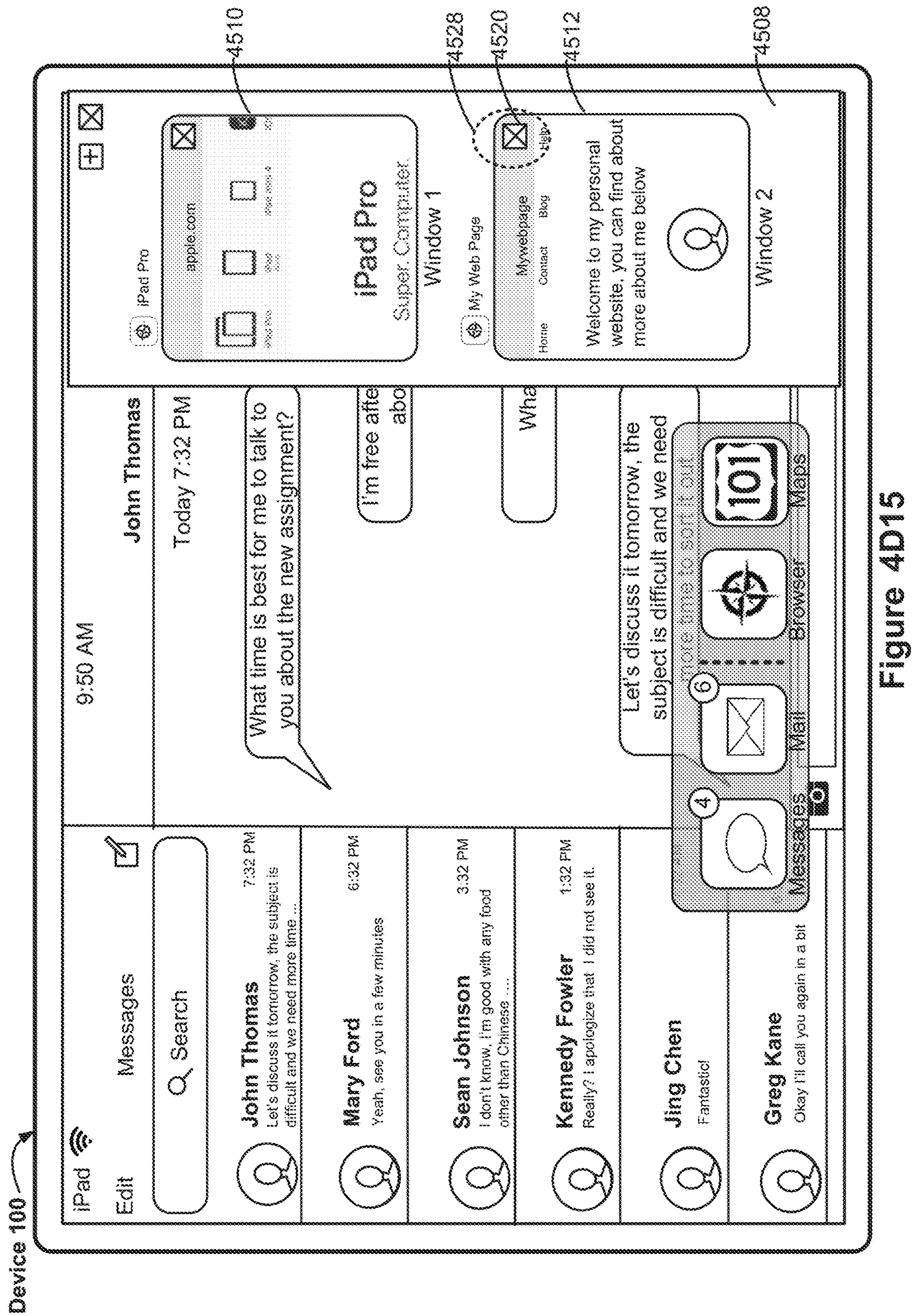
Figure 4D15

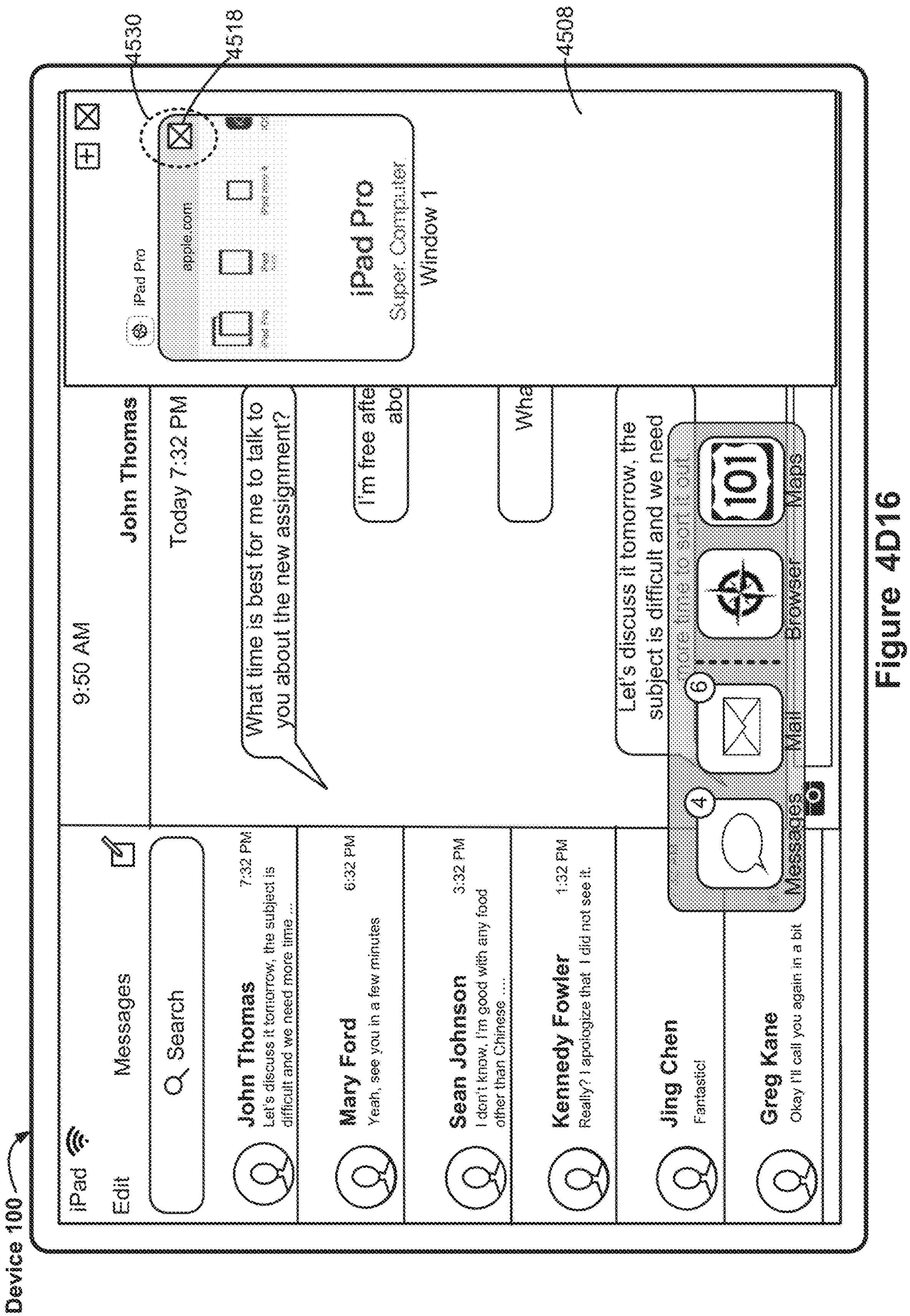
Figure 4D16

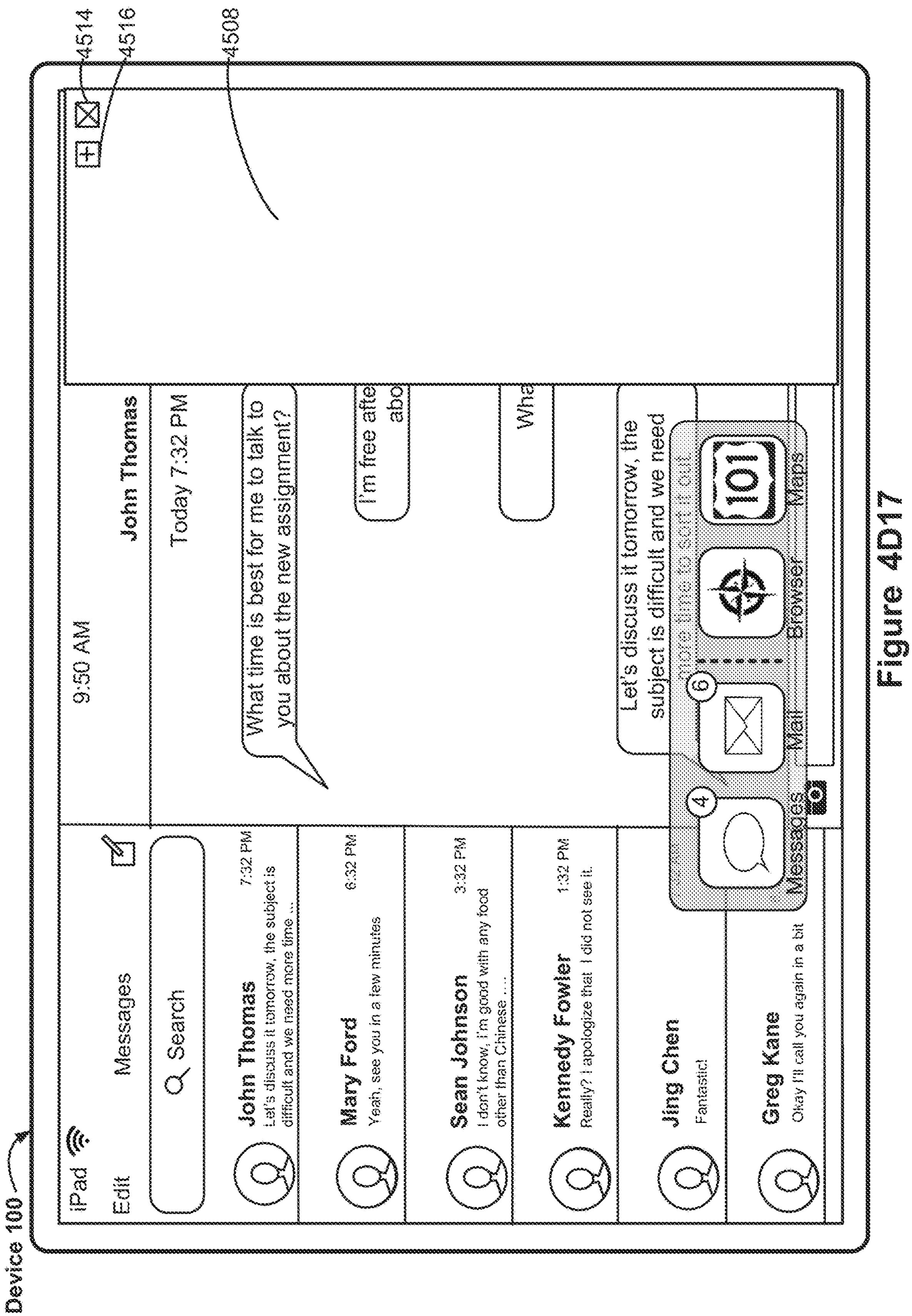
Figure 4D17

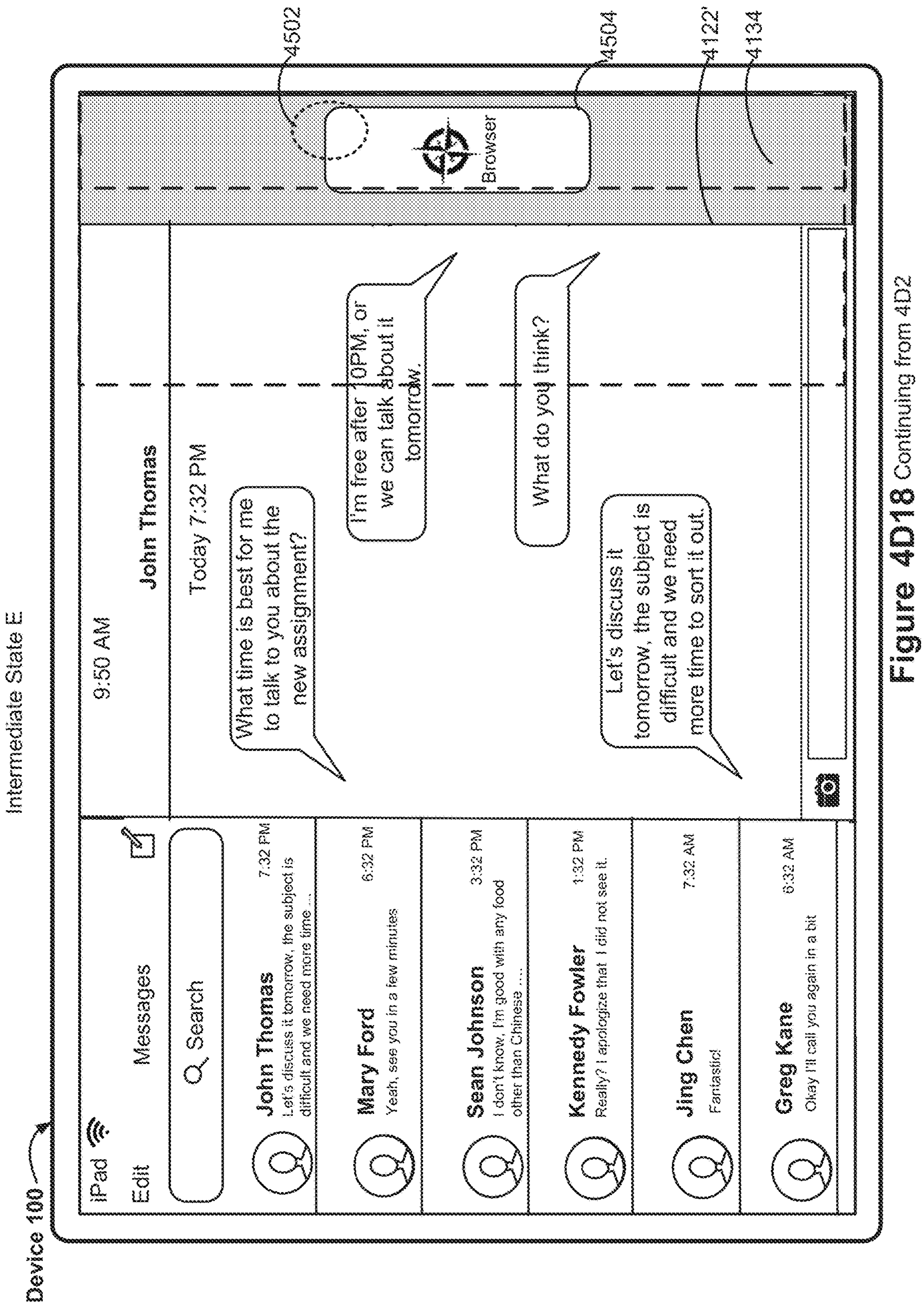
Figure 4D18 Continuing from 4D2

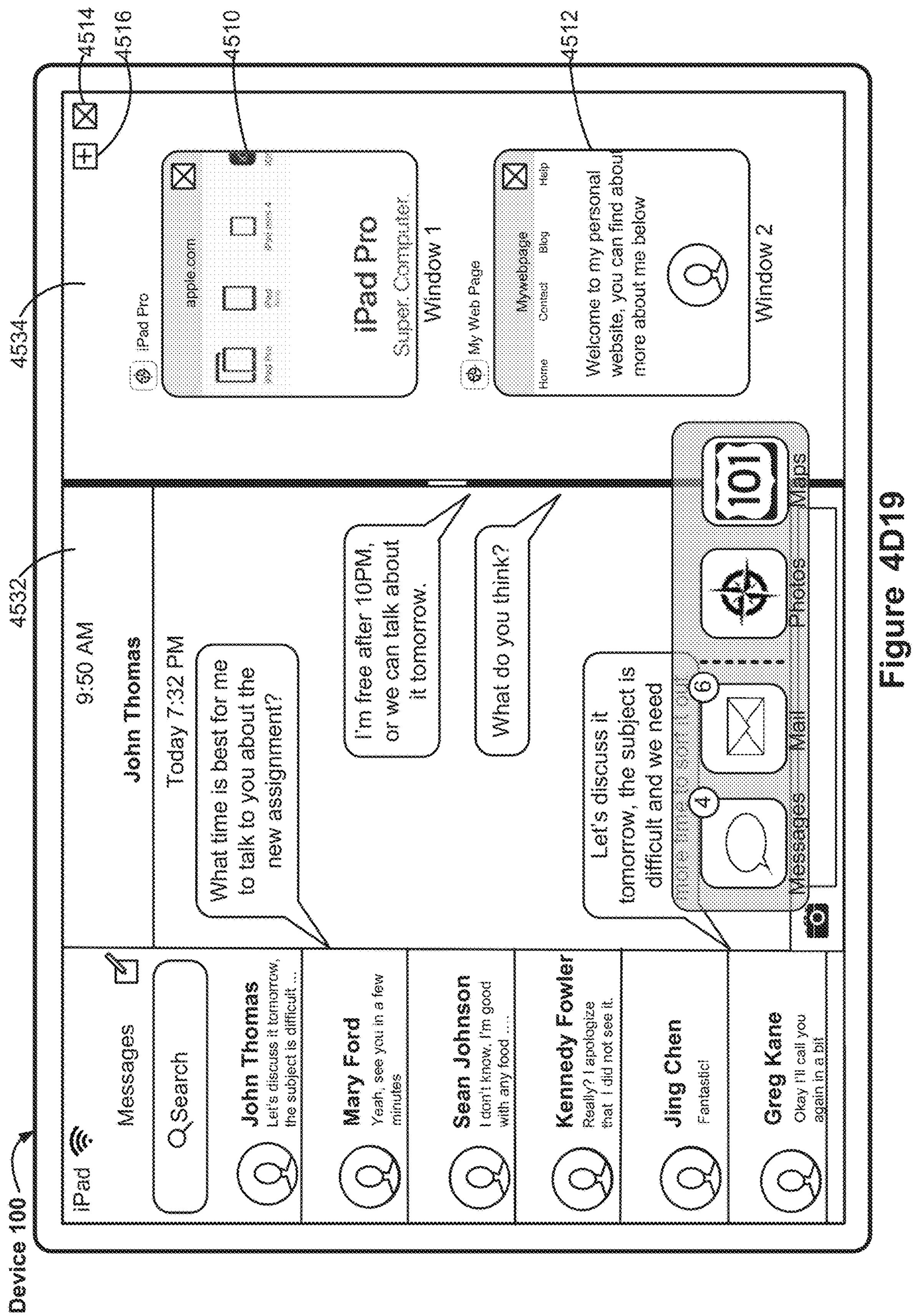
Figure 4D19

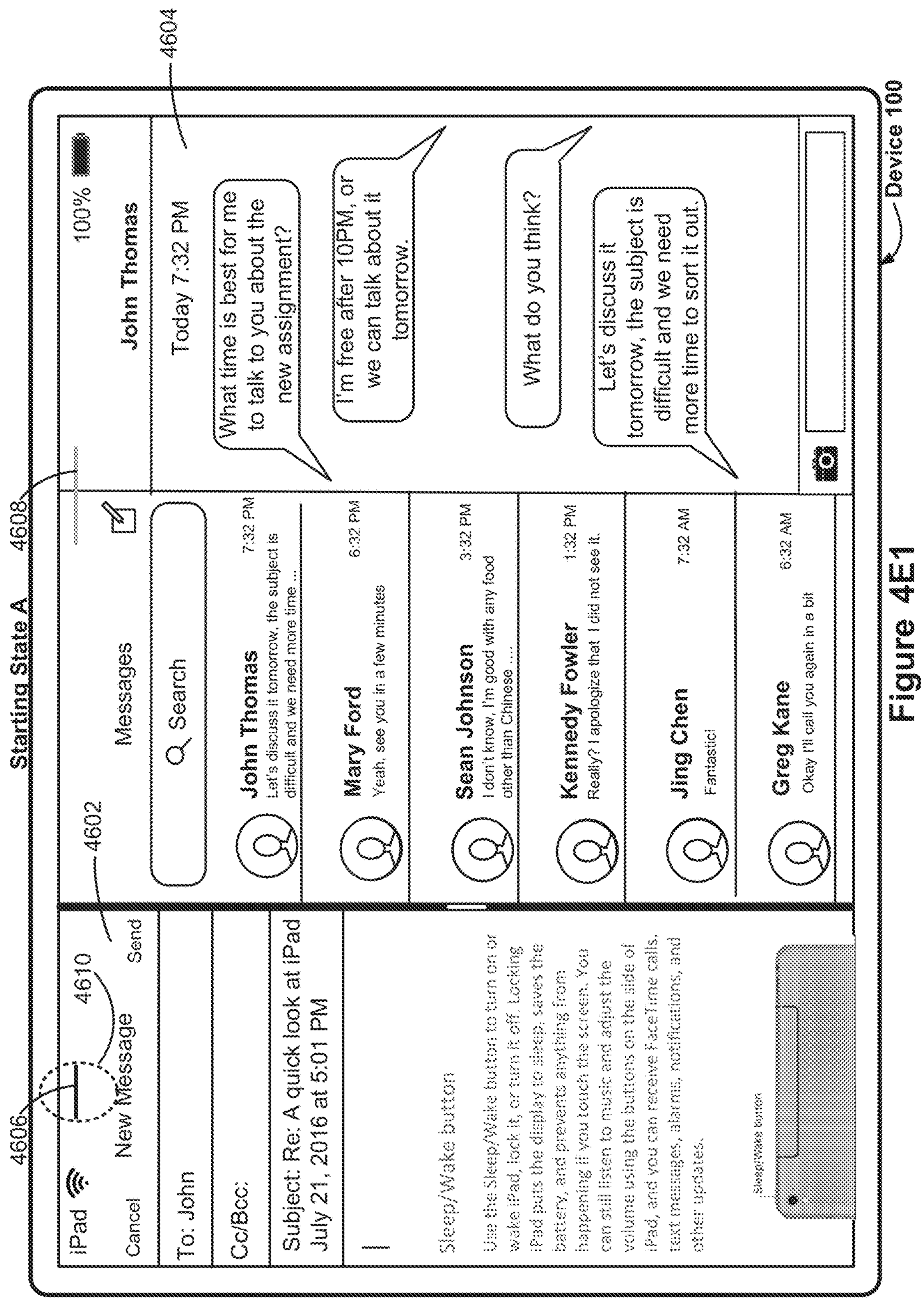
Figure 4E1

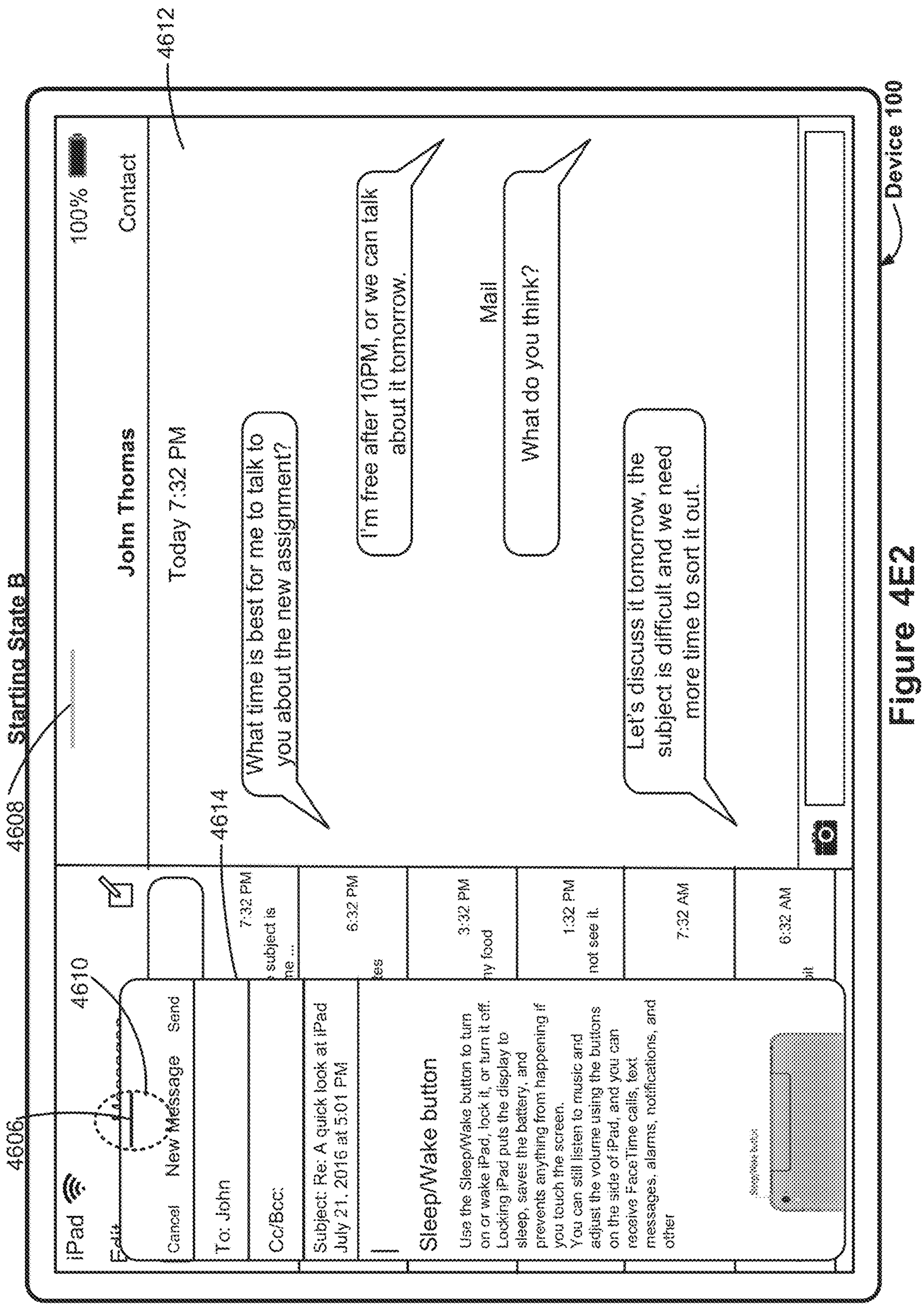
Figure 4E2

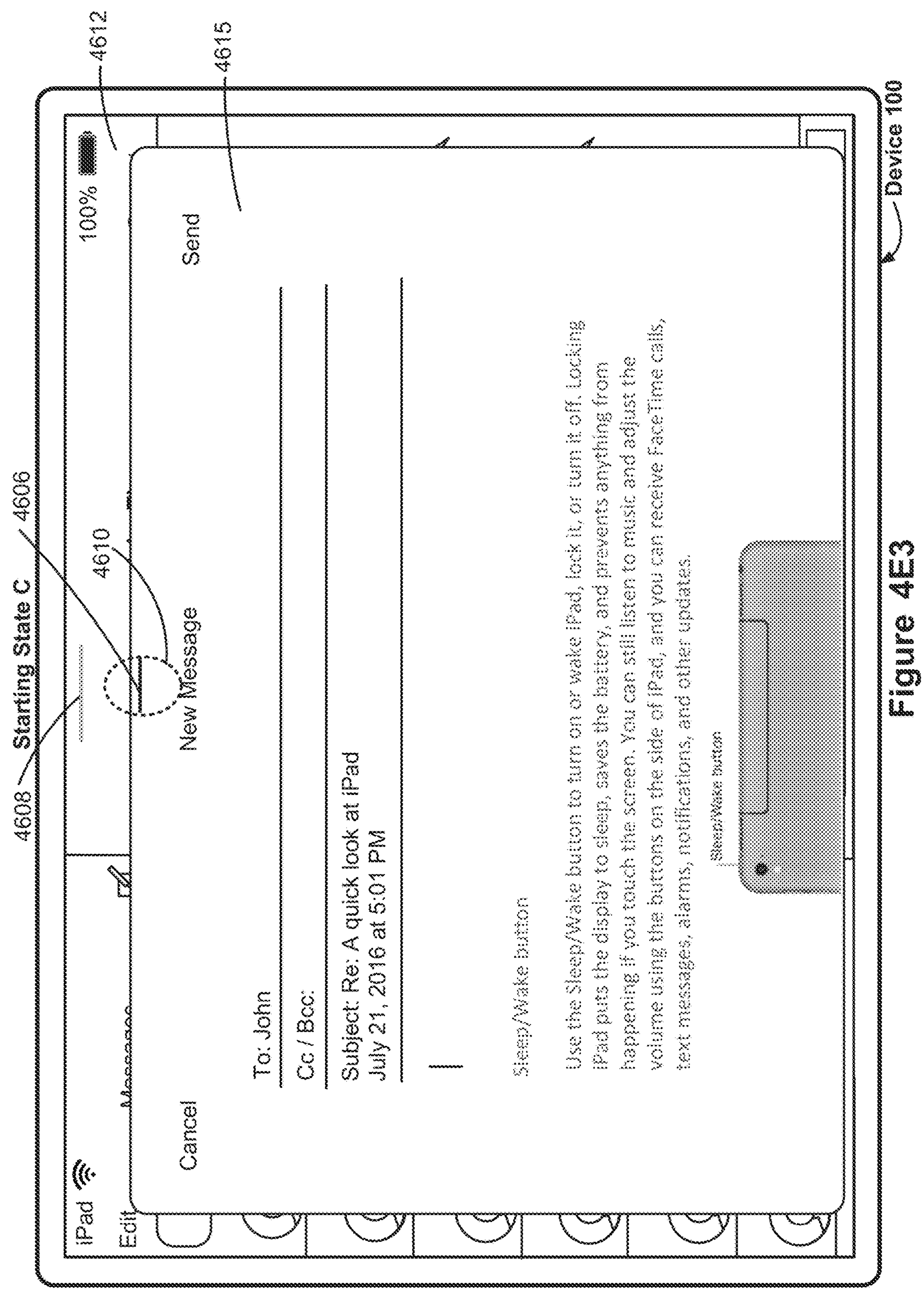
Figure 4E3

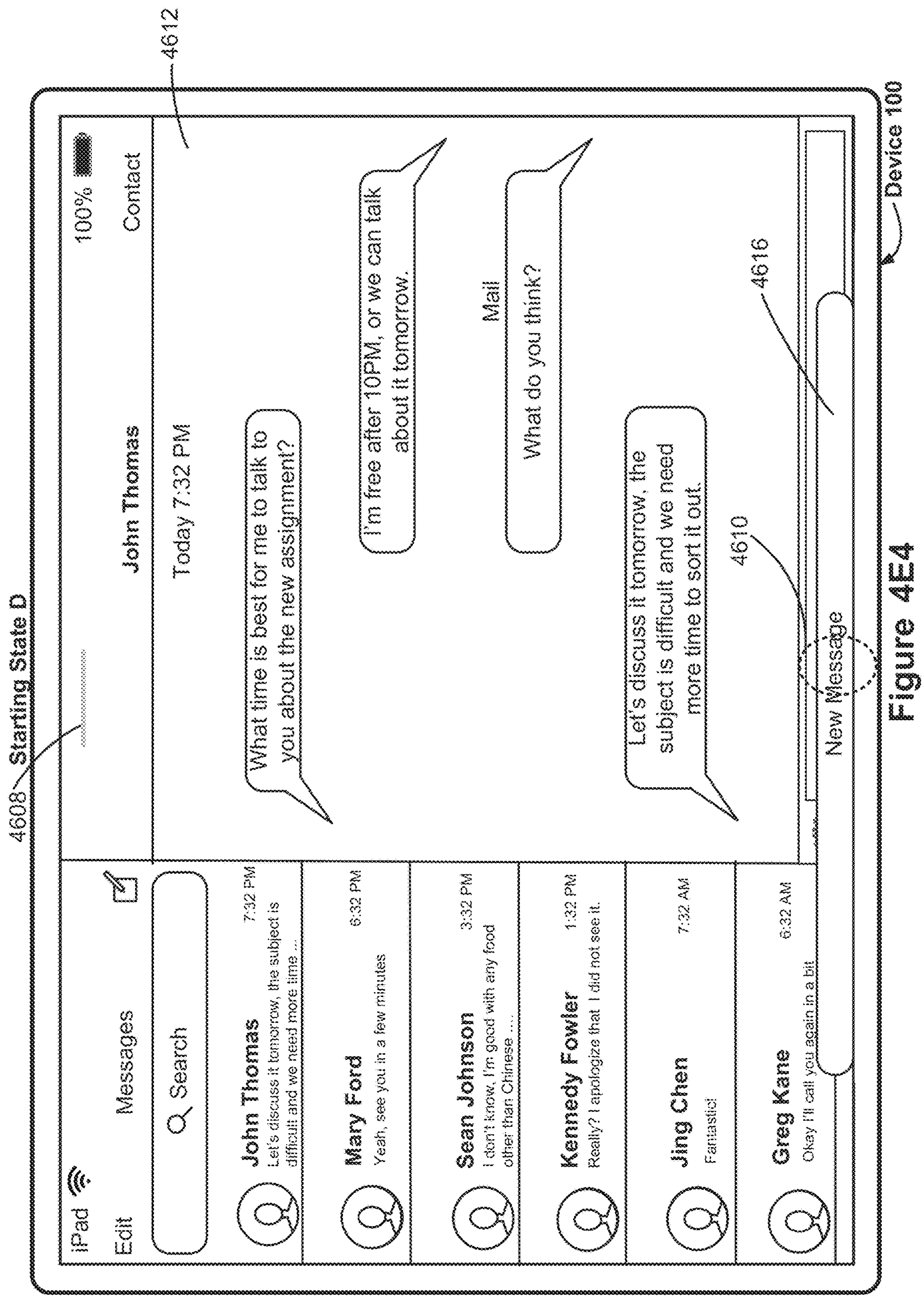
Figure 4E4

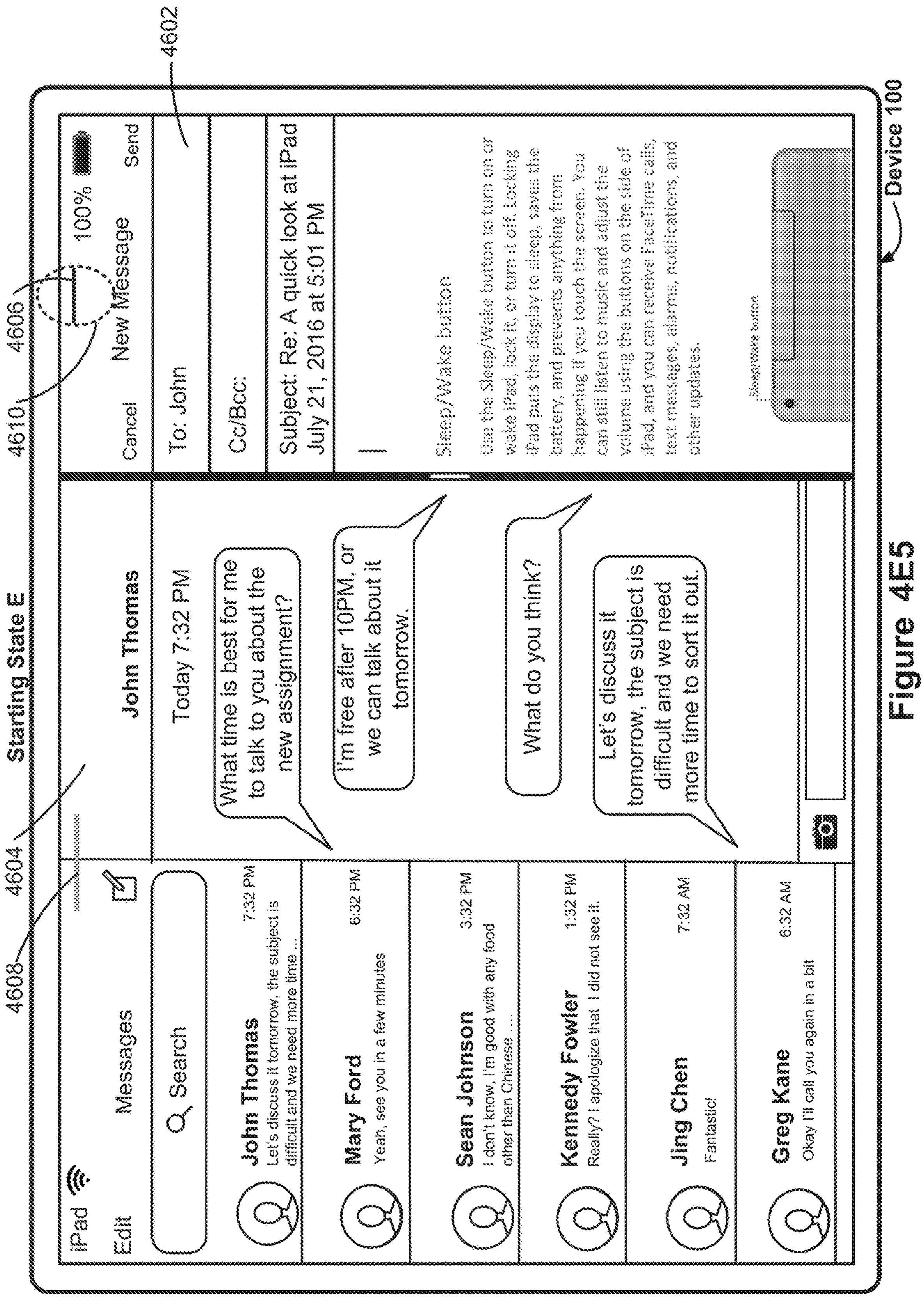
Figure 4E5

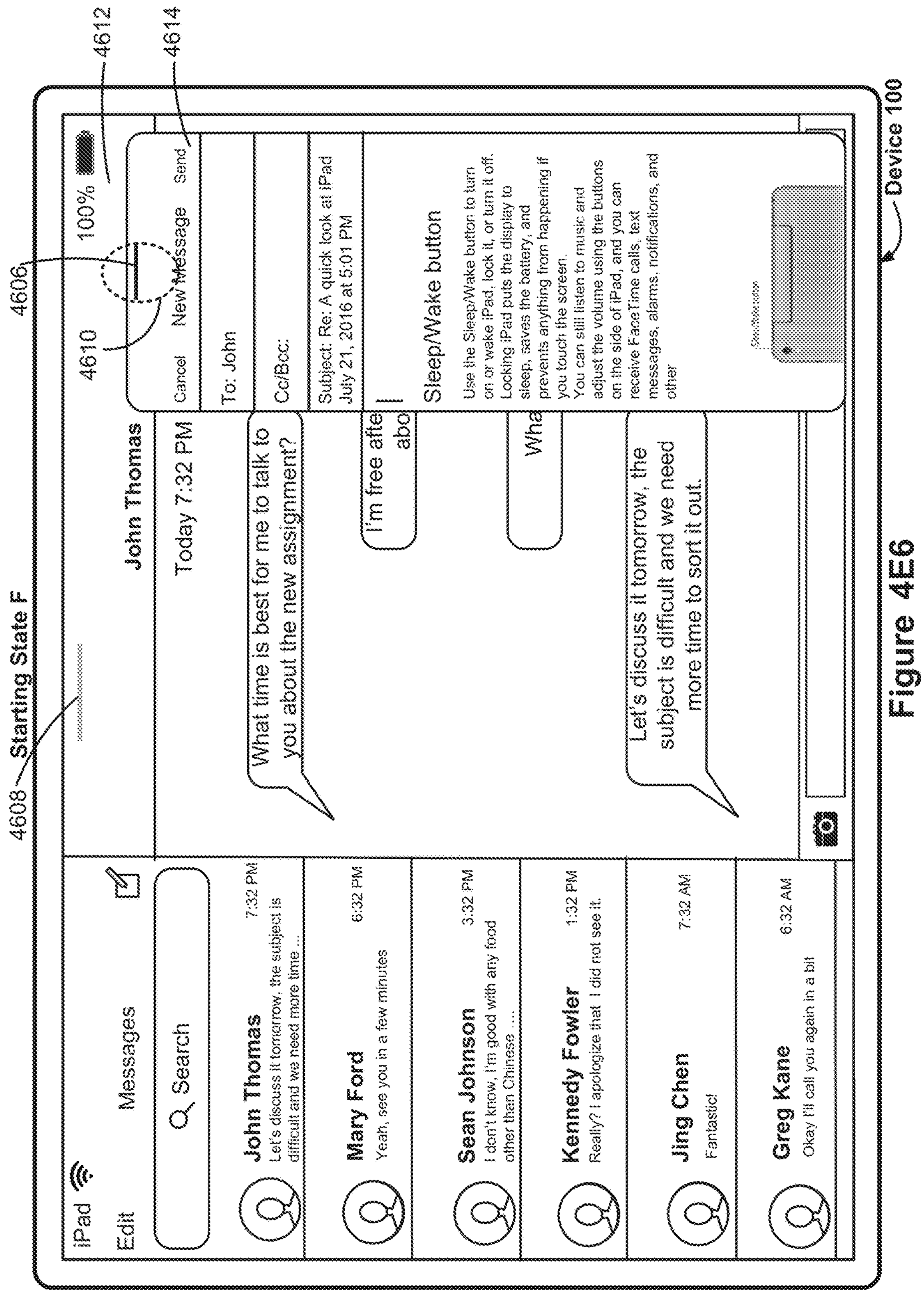
Figure 4E6

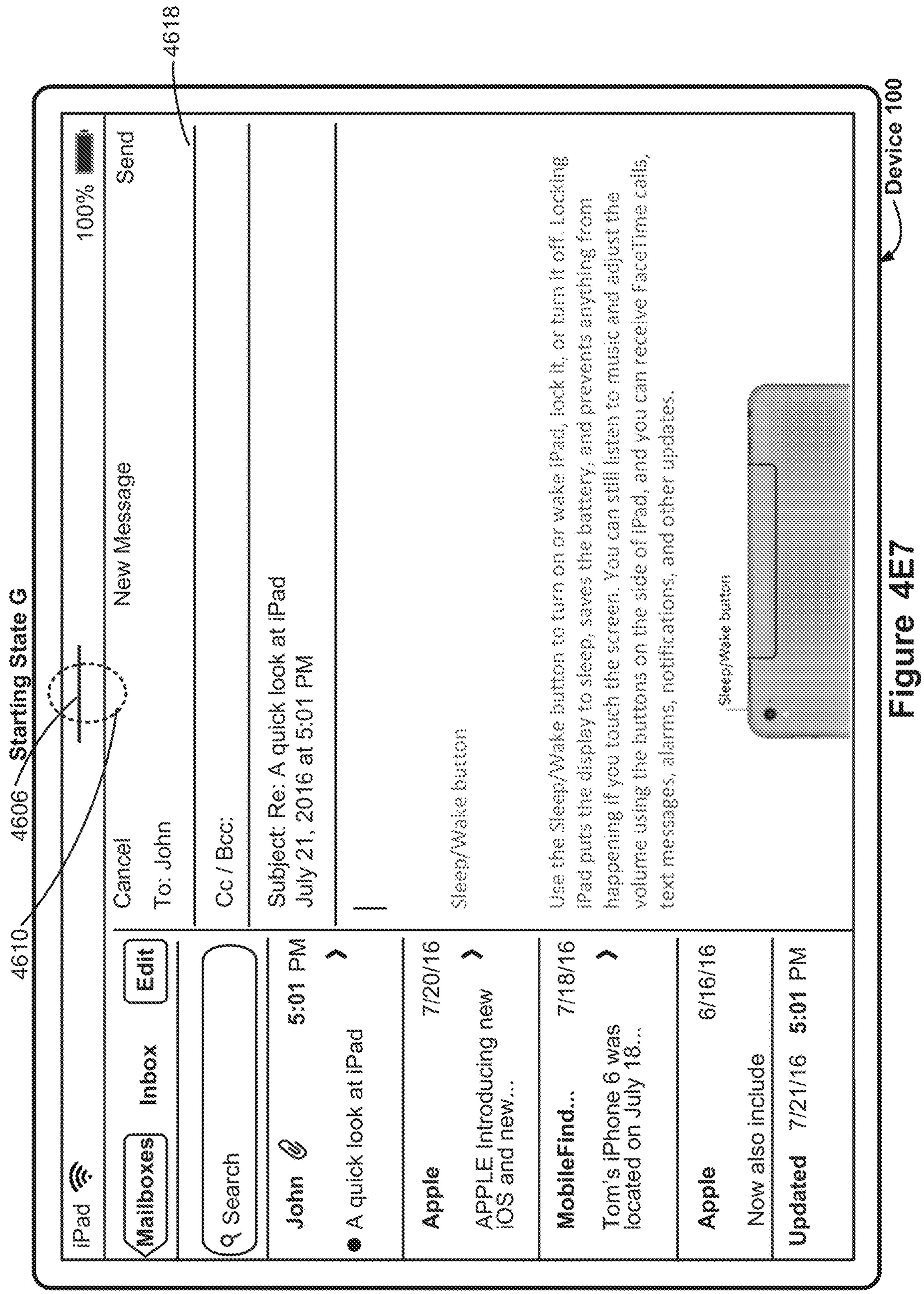
Figure 4E7

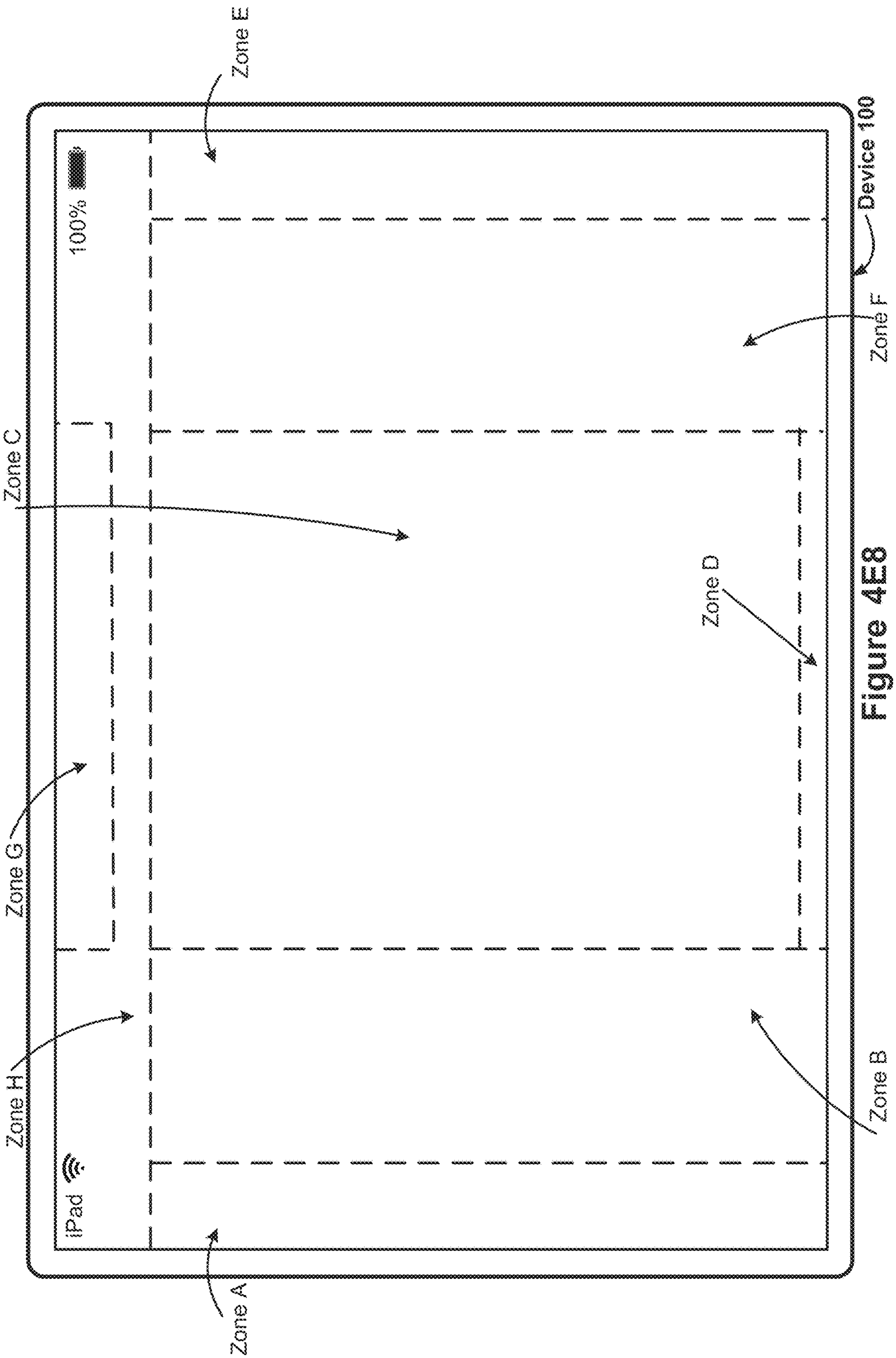
Figure 4E8

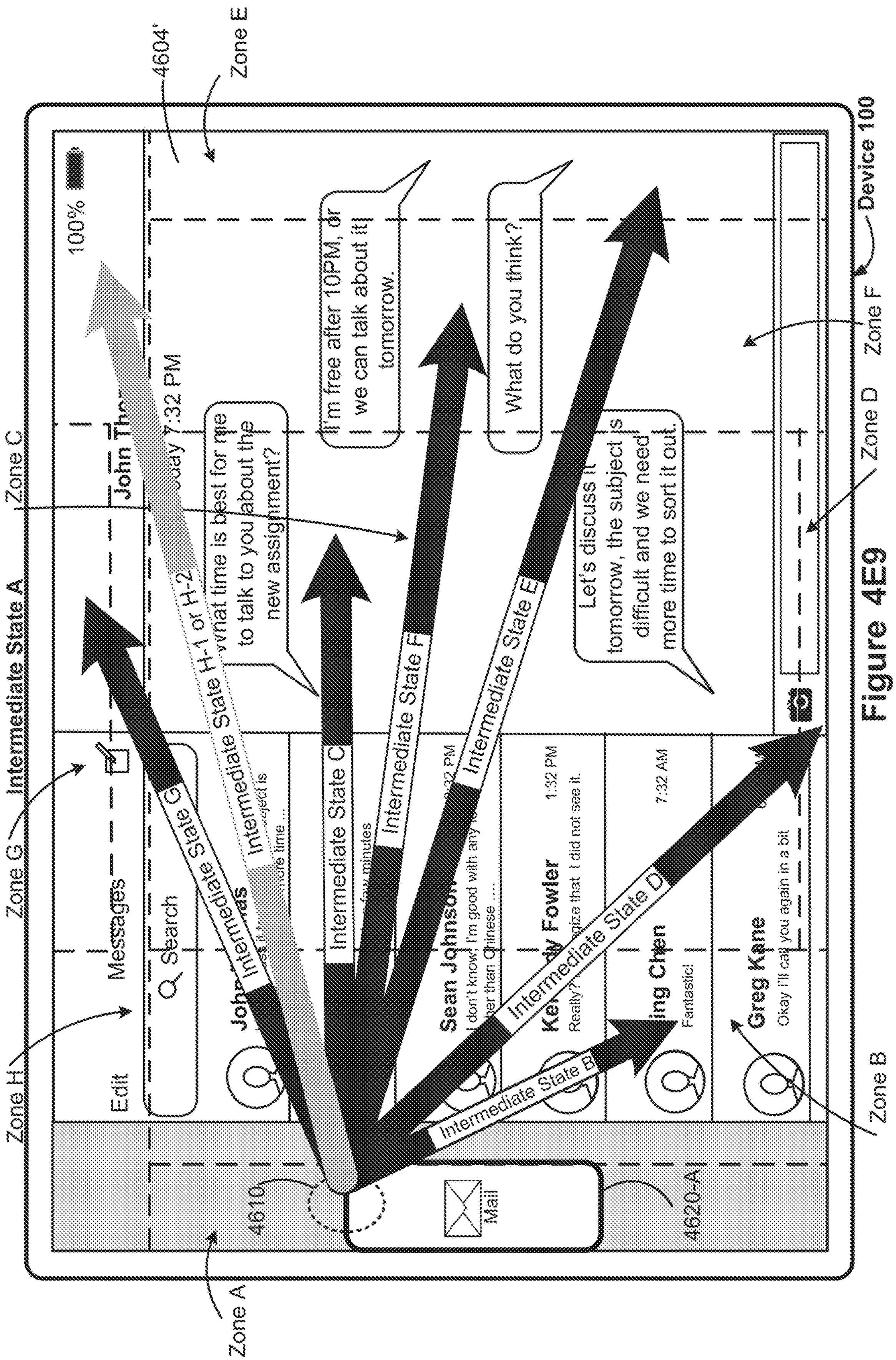
Figure 4E9

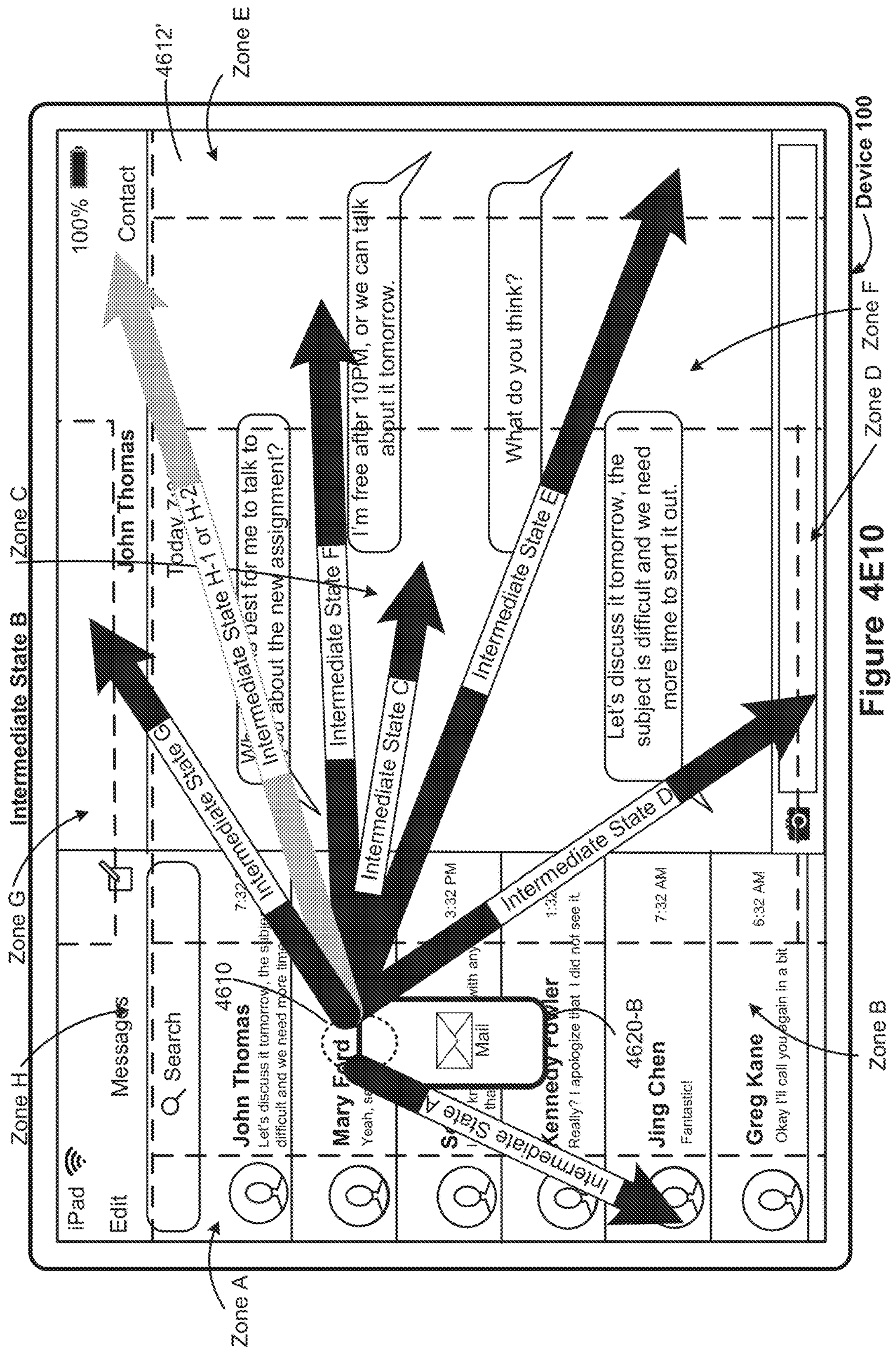
Figure 4E10

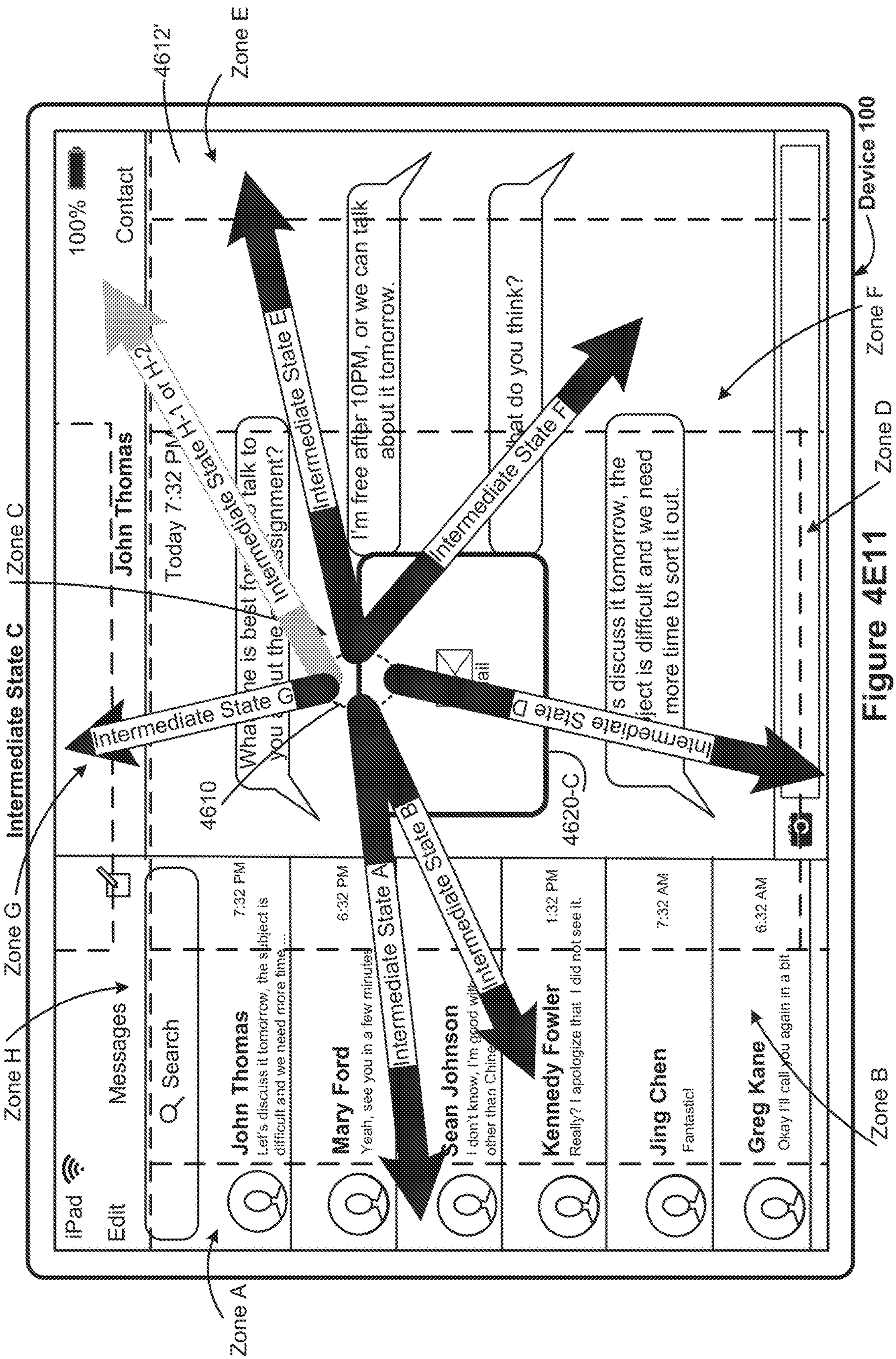
Figure 4E11

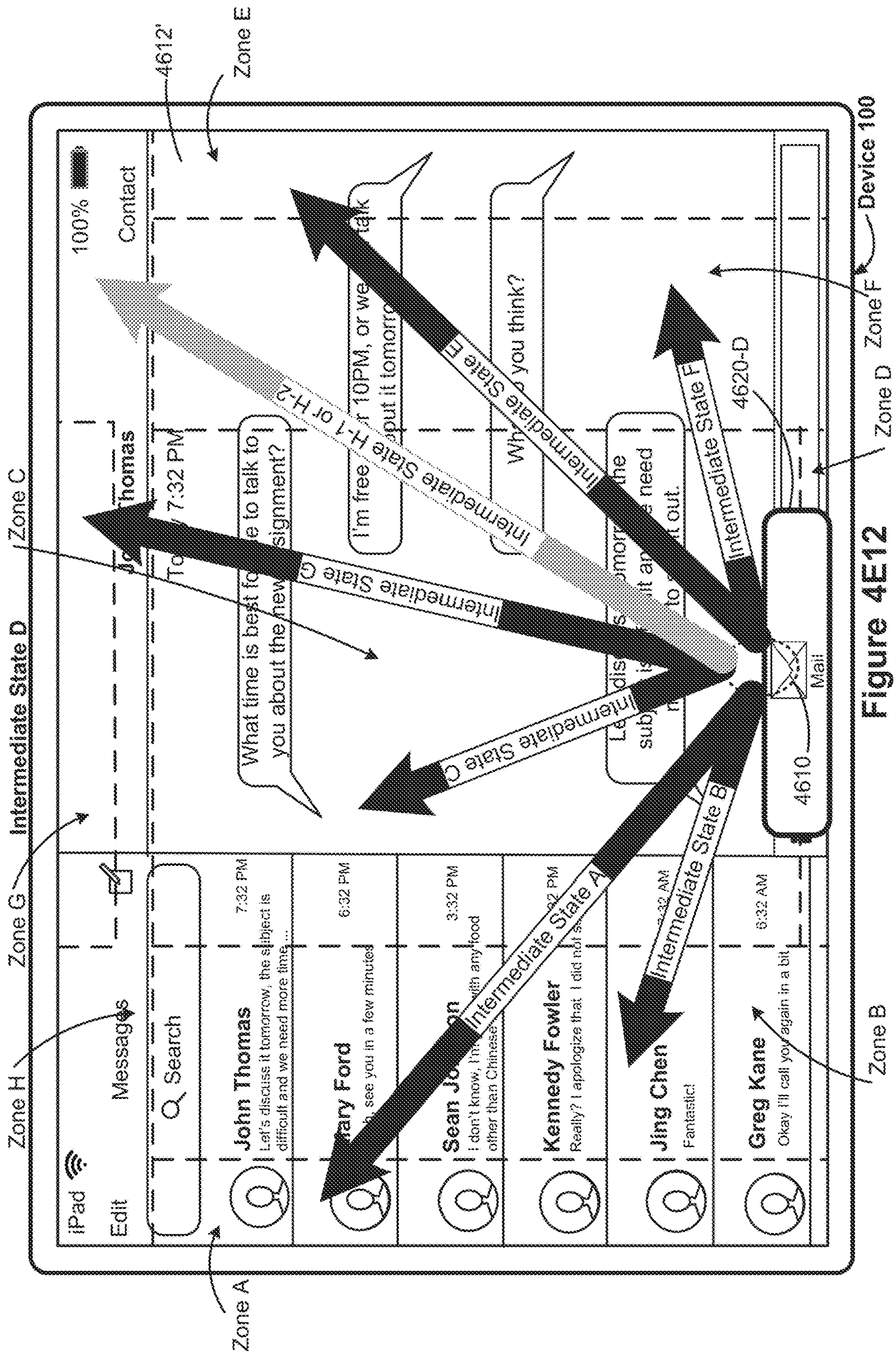
Figure 4E12

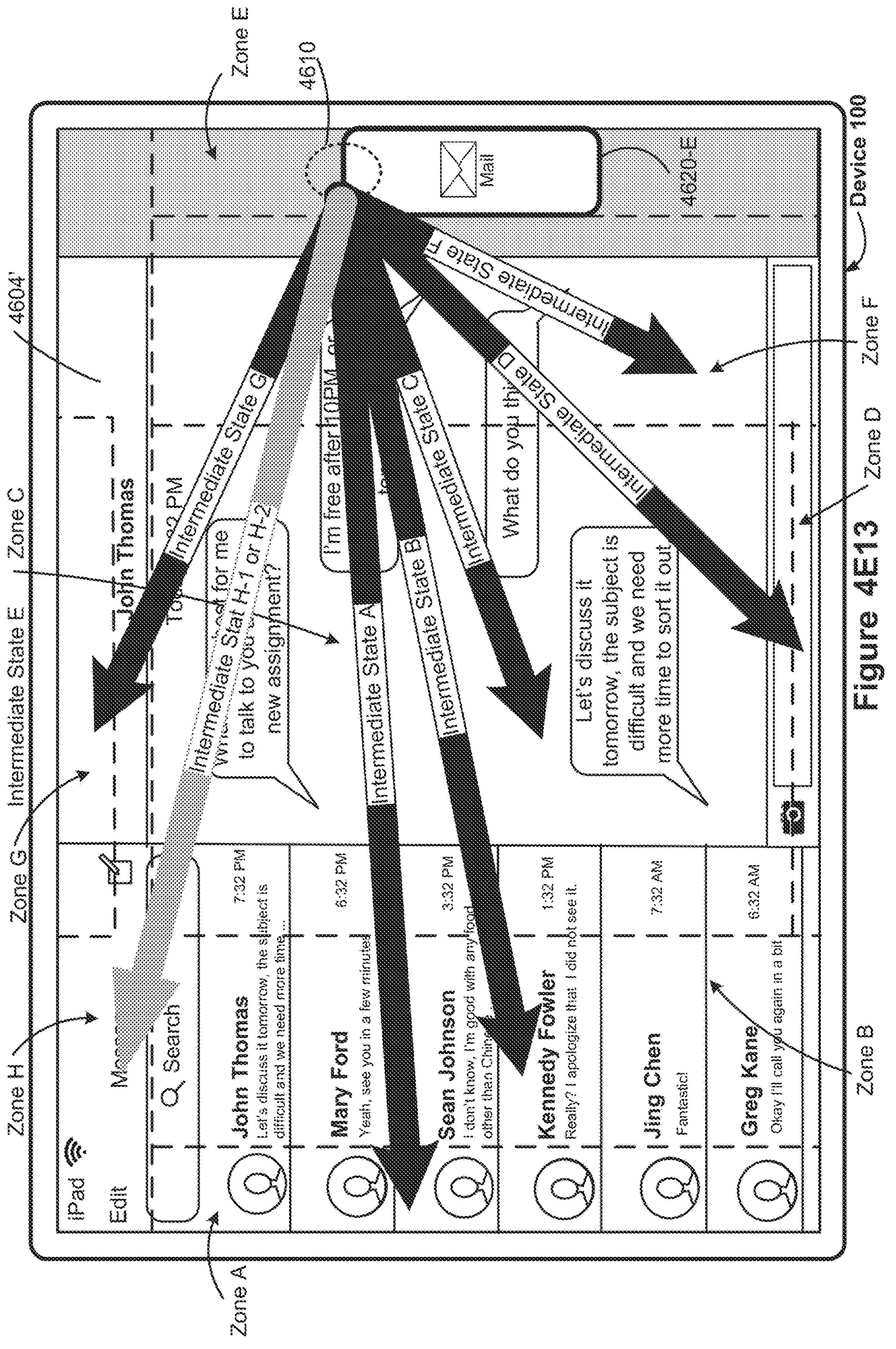
Figure 4E13

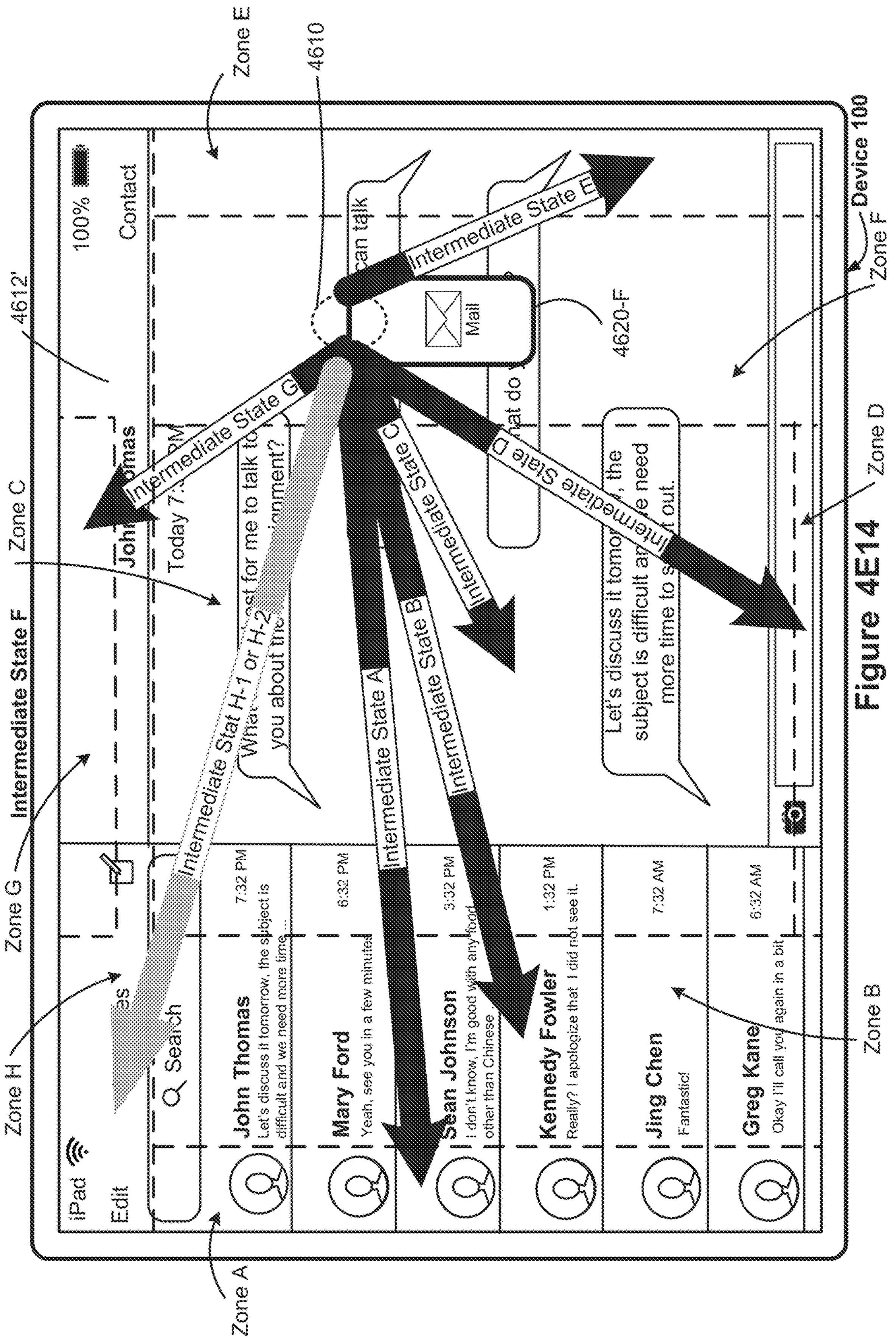
Figure 4E14

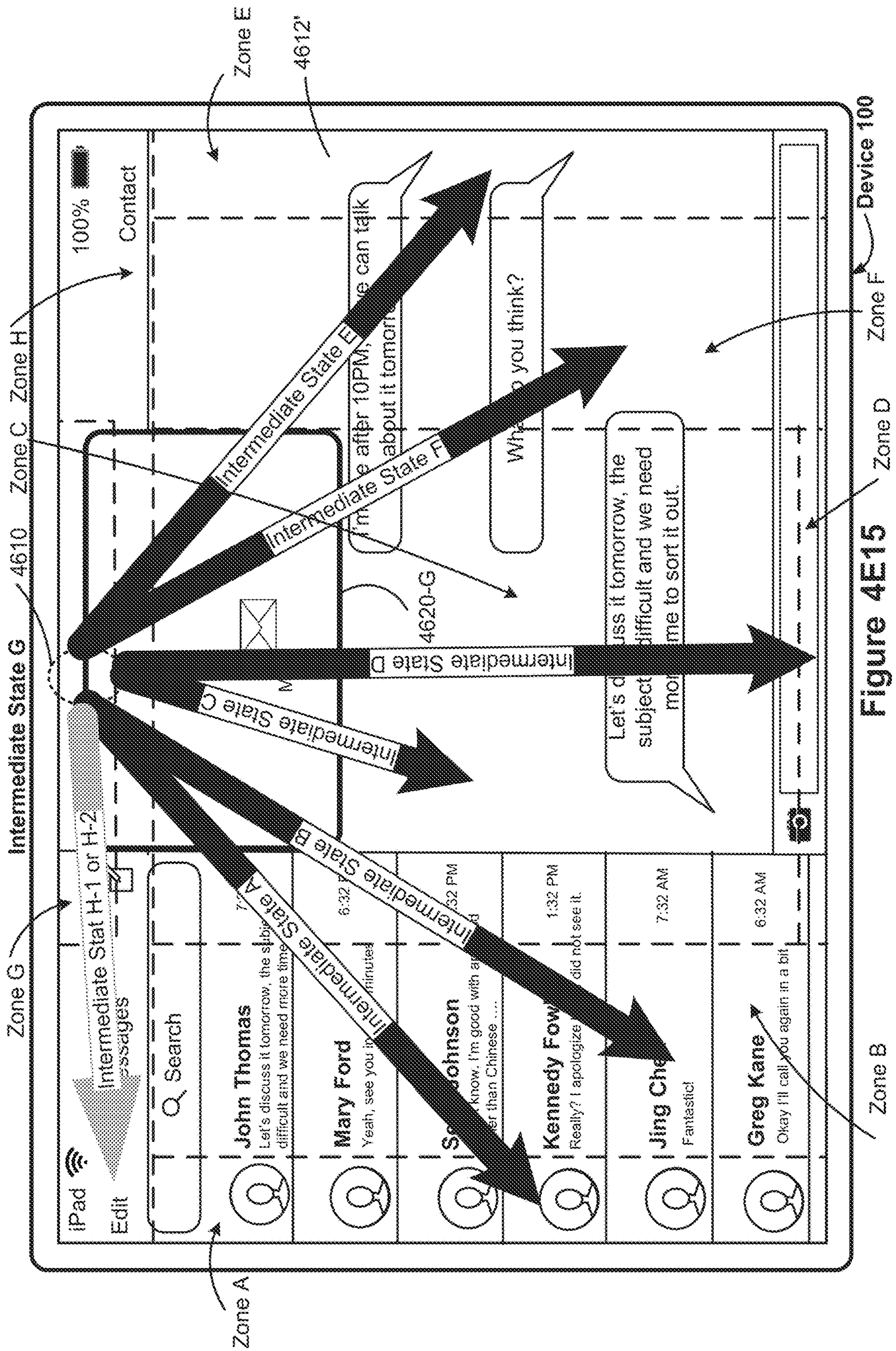
Figure 4E15

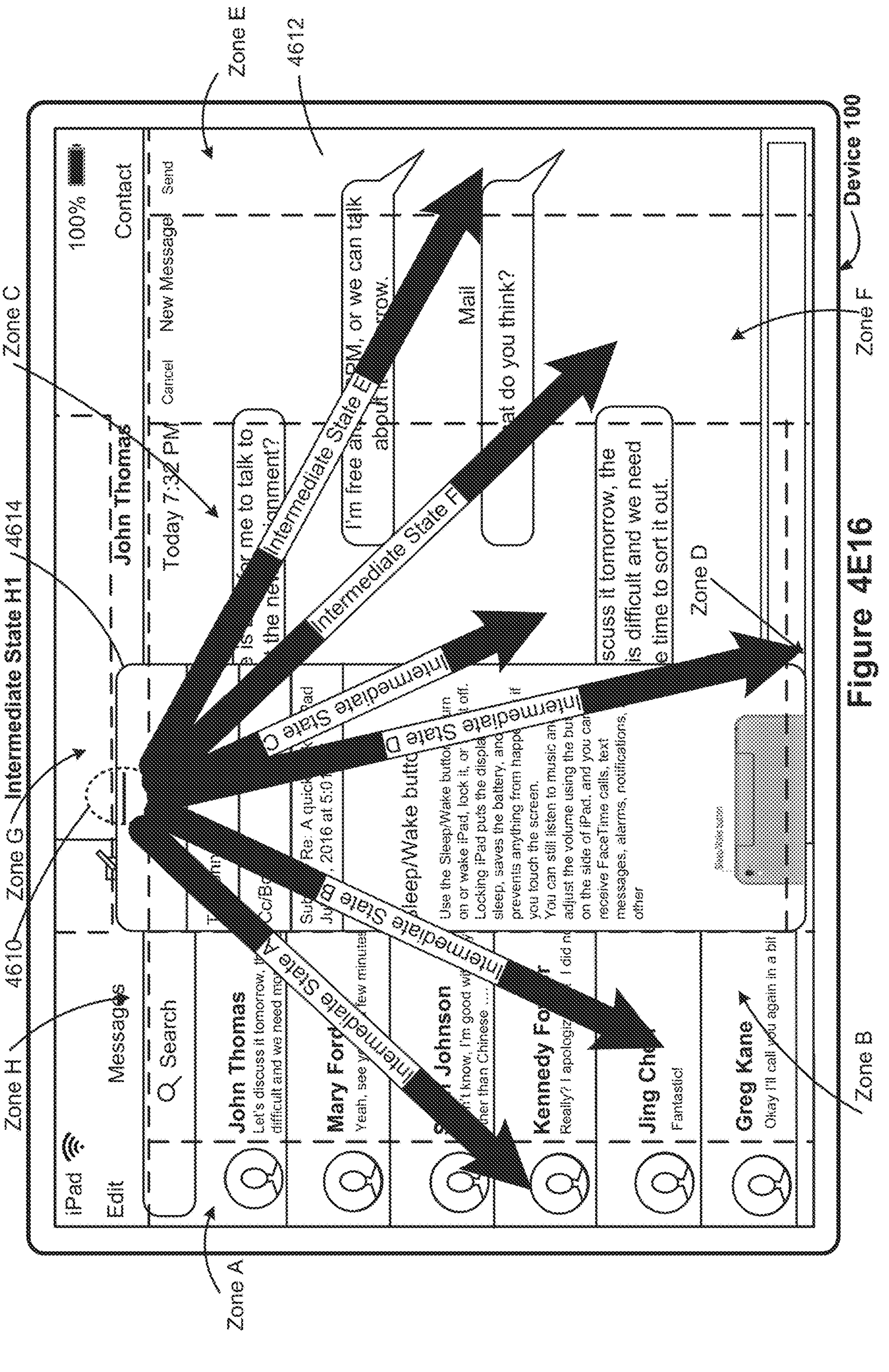
Figure 4E16

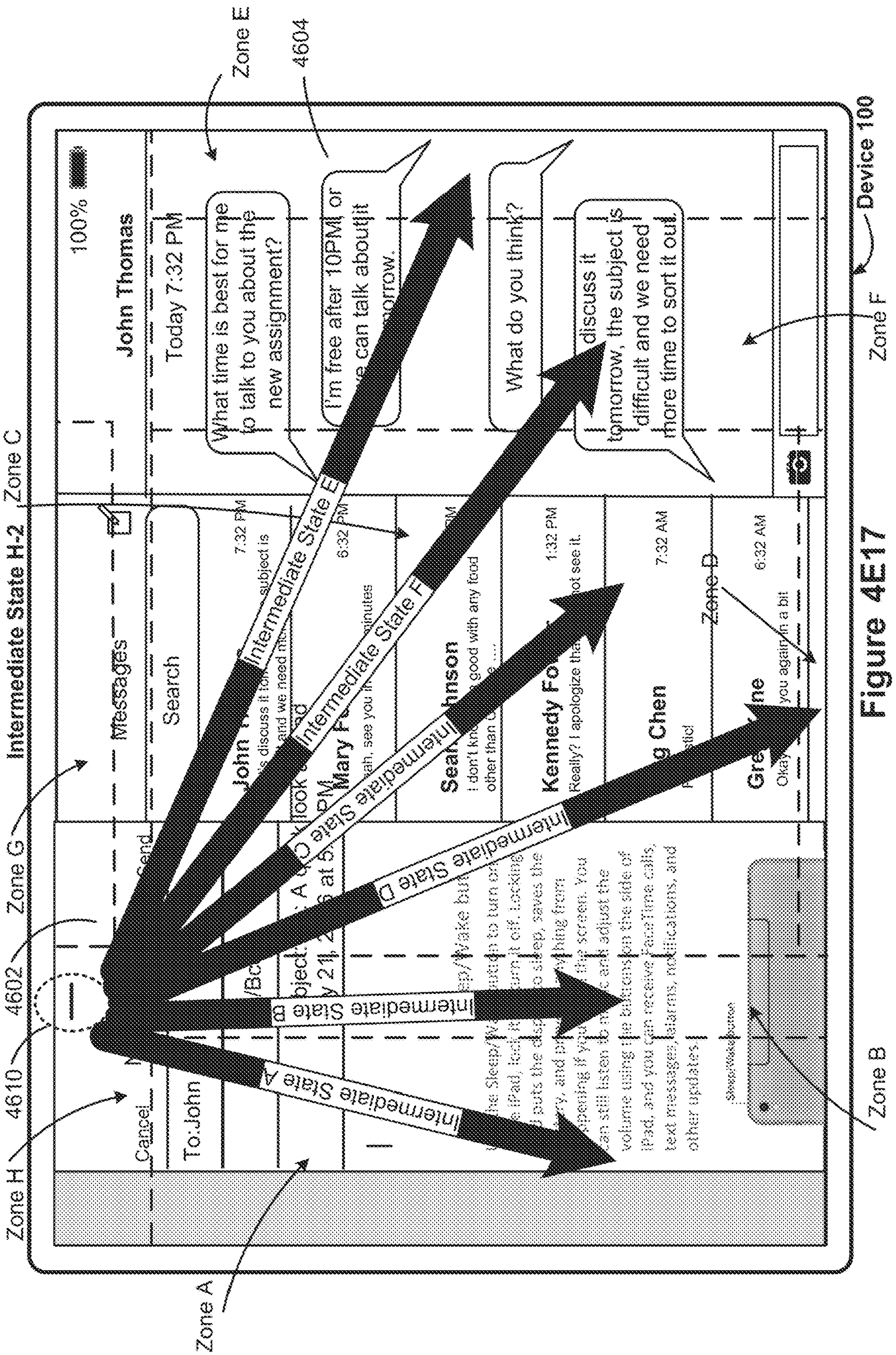
Figure 4E17

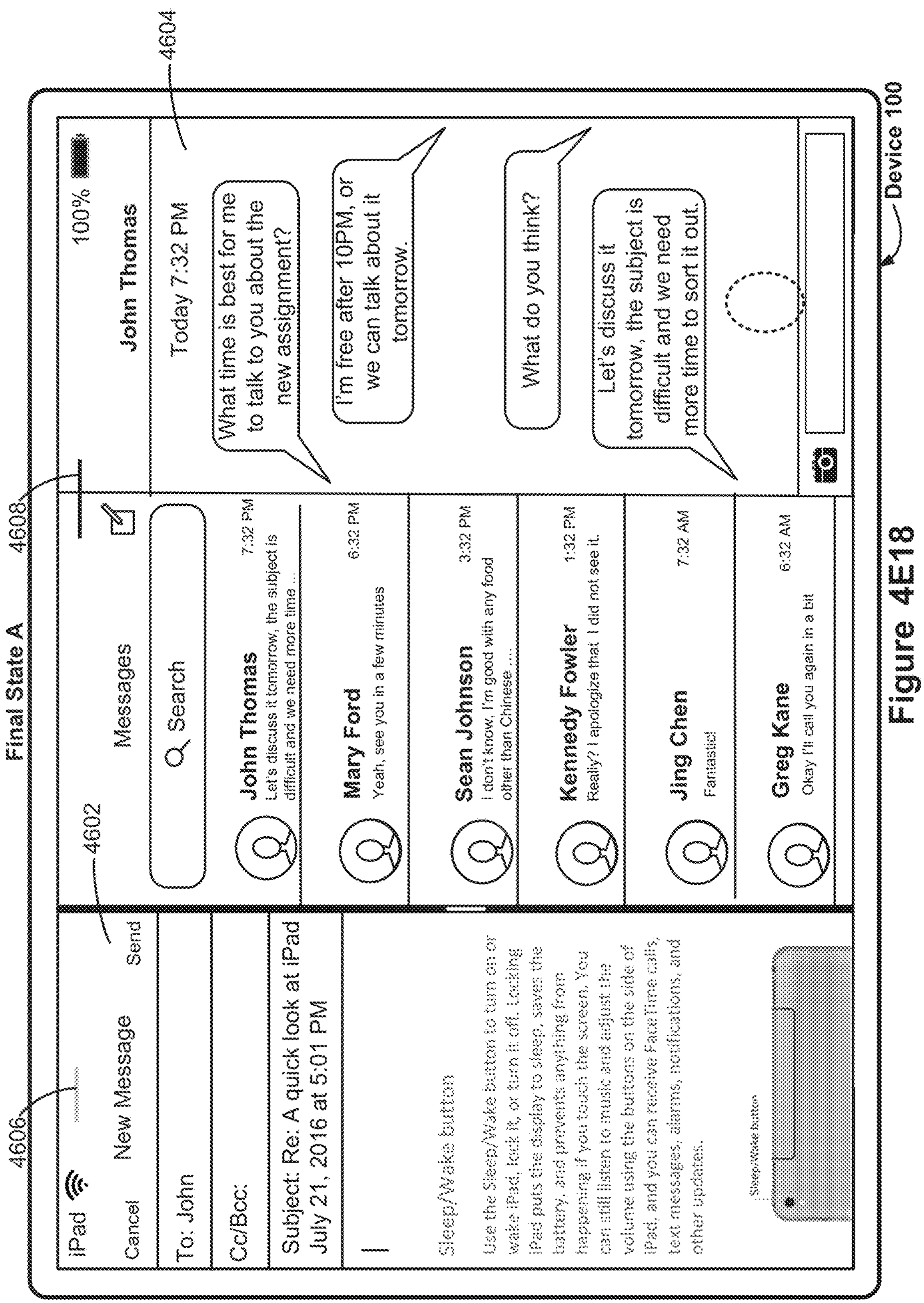
Figure 4E18

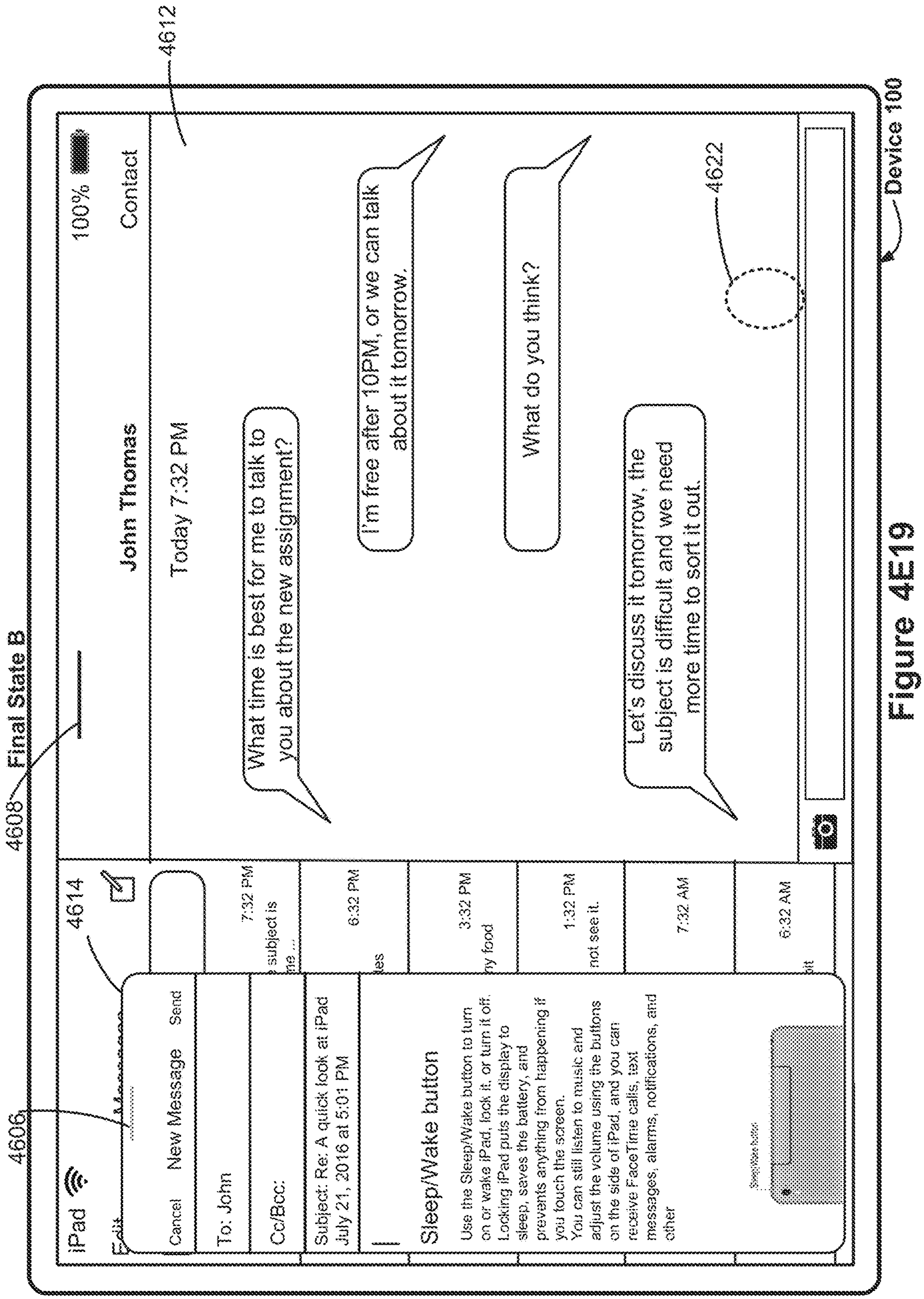
Figure 4E19

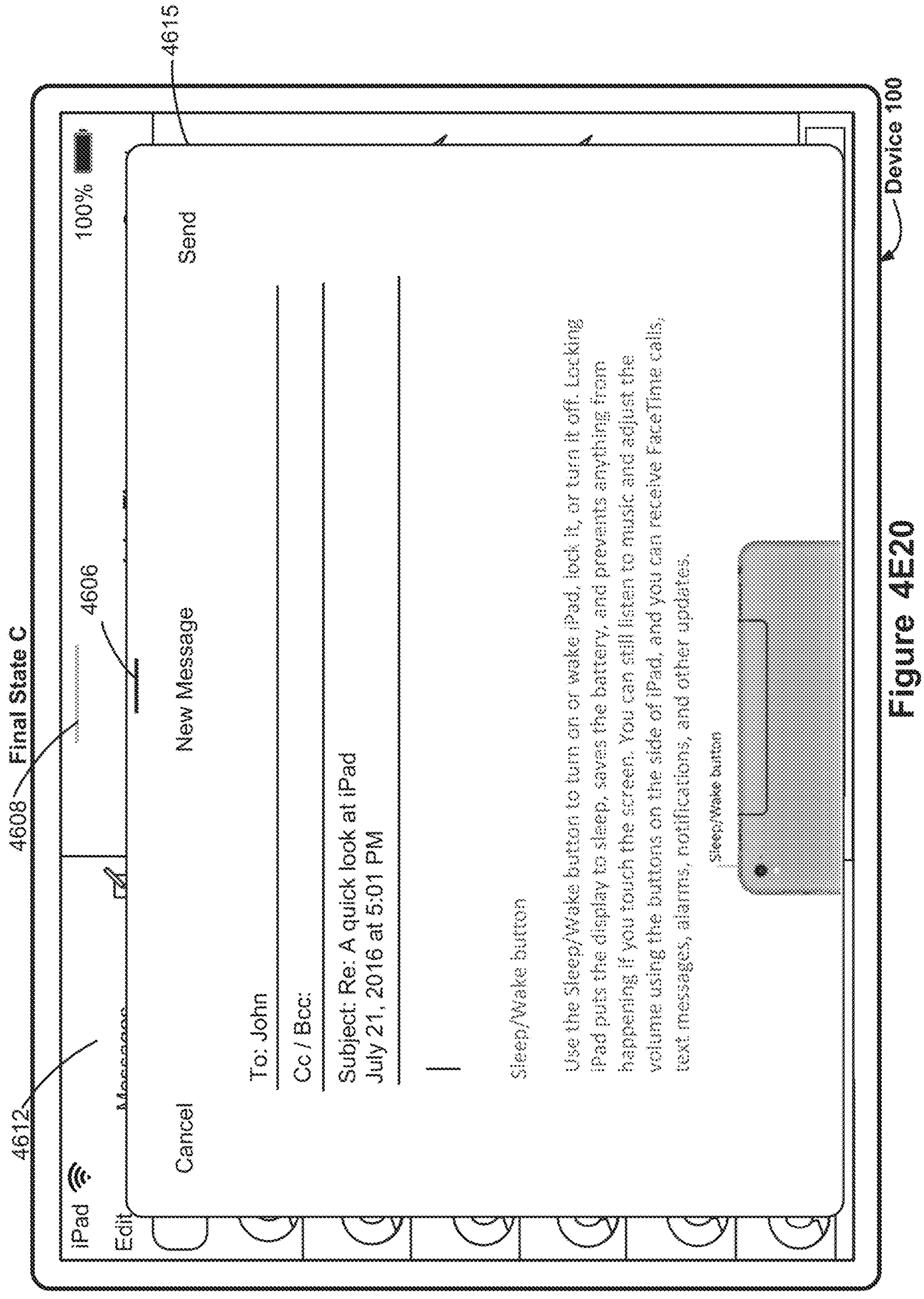
Figure 4E20

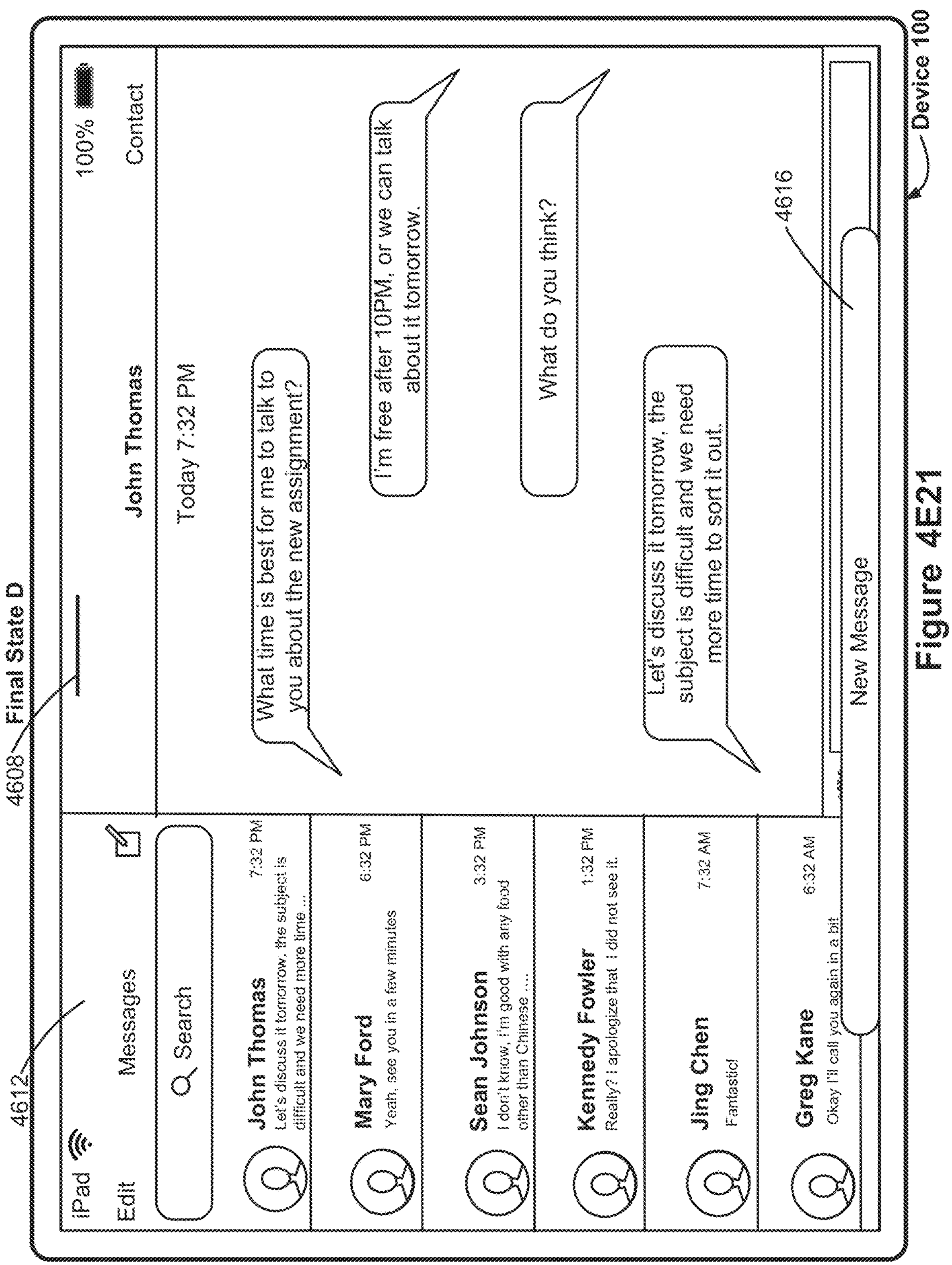
Figure 4E21

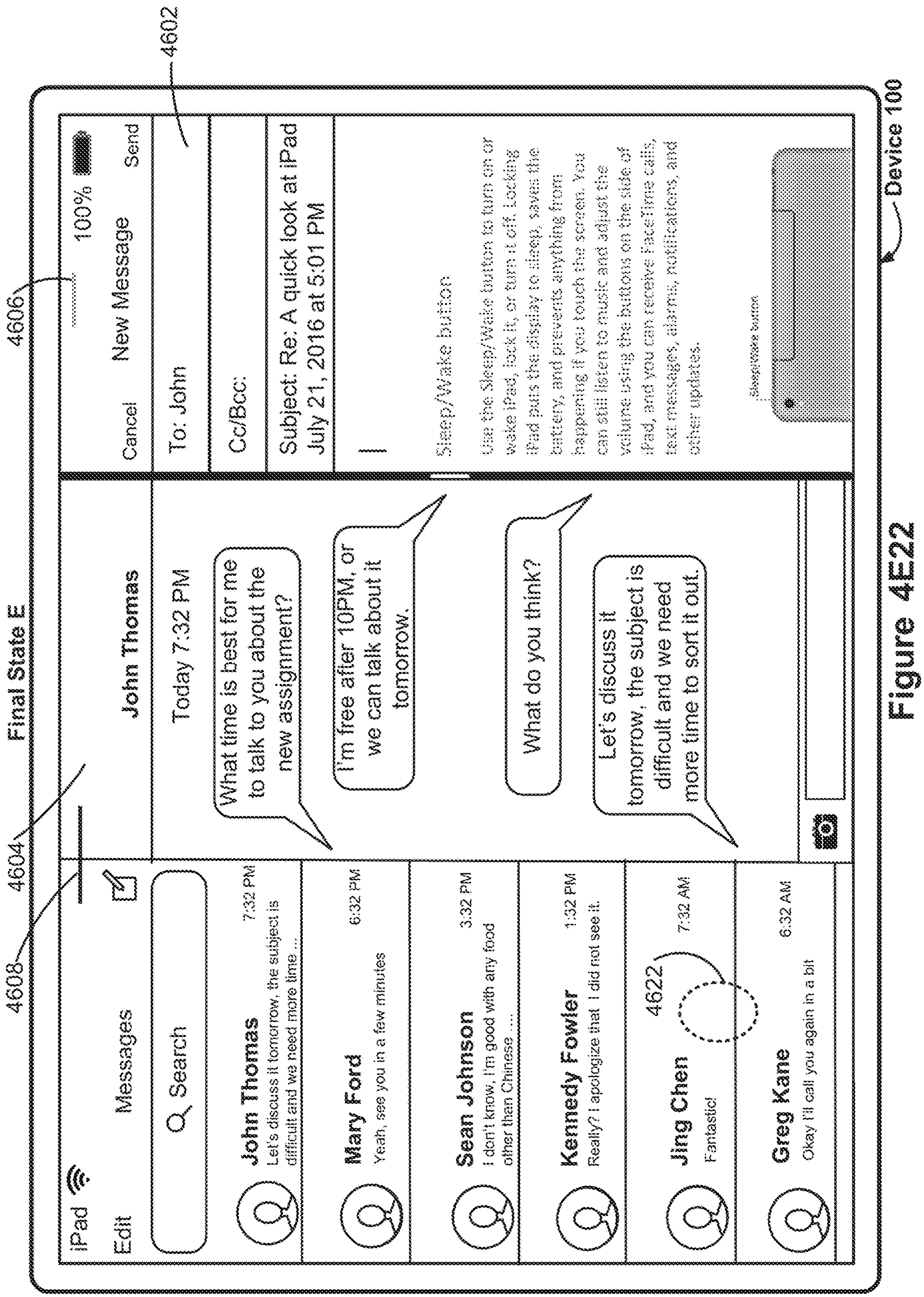
Figure 4E22

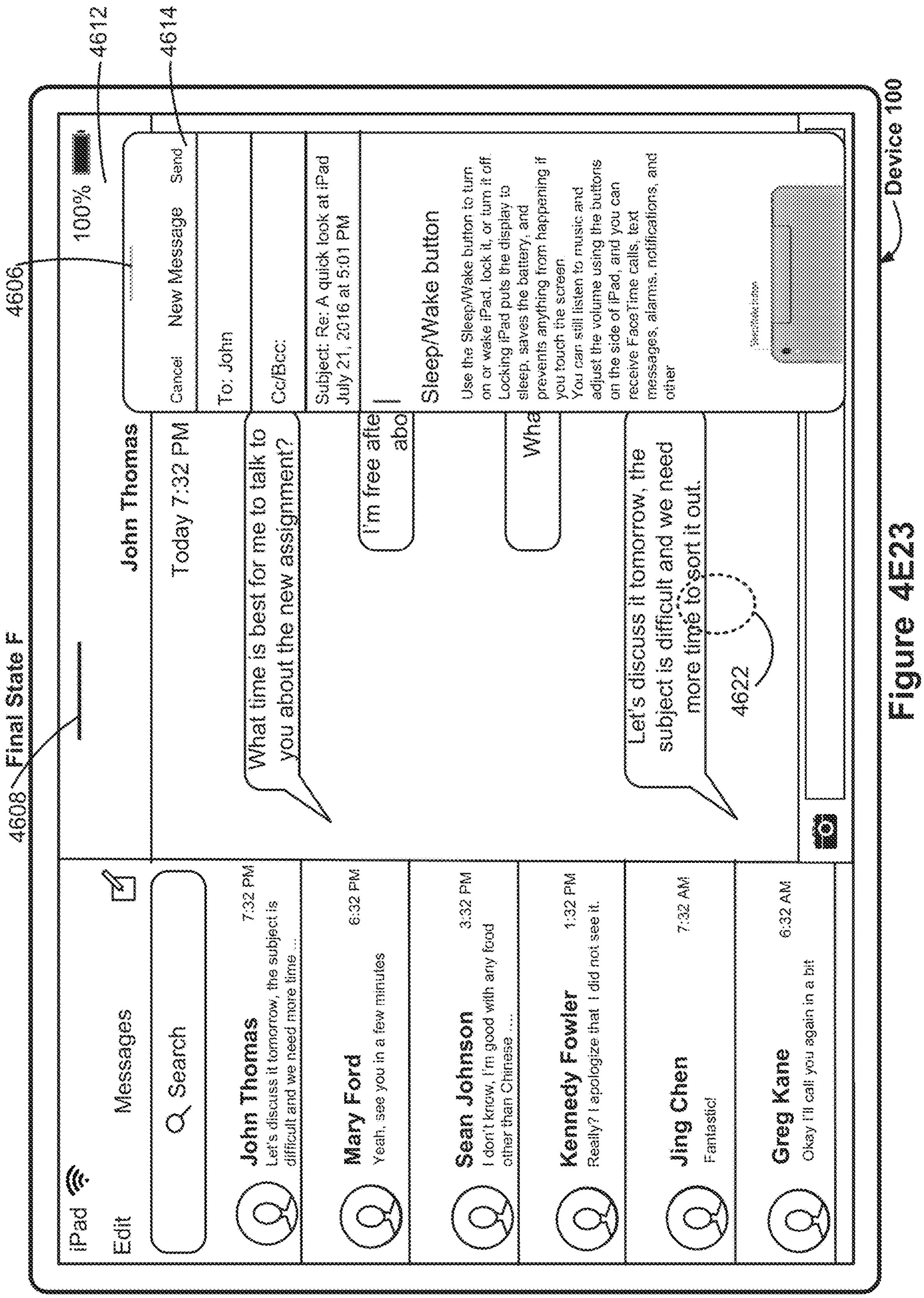
Figure 4E23

Final State G
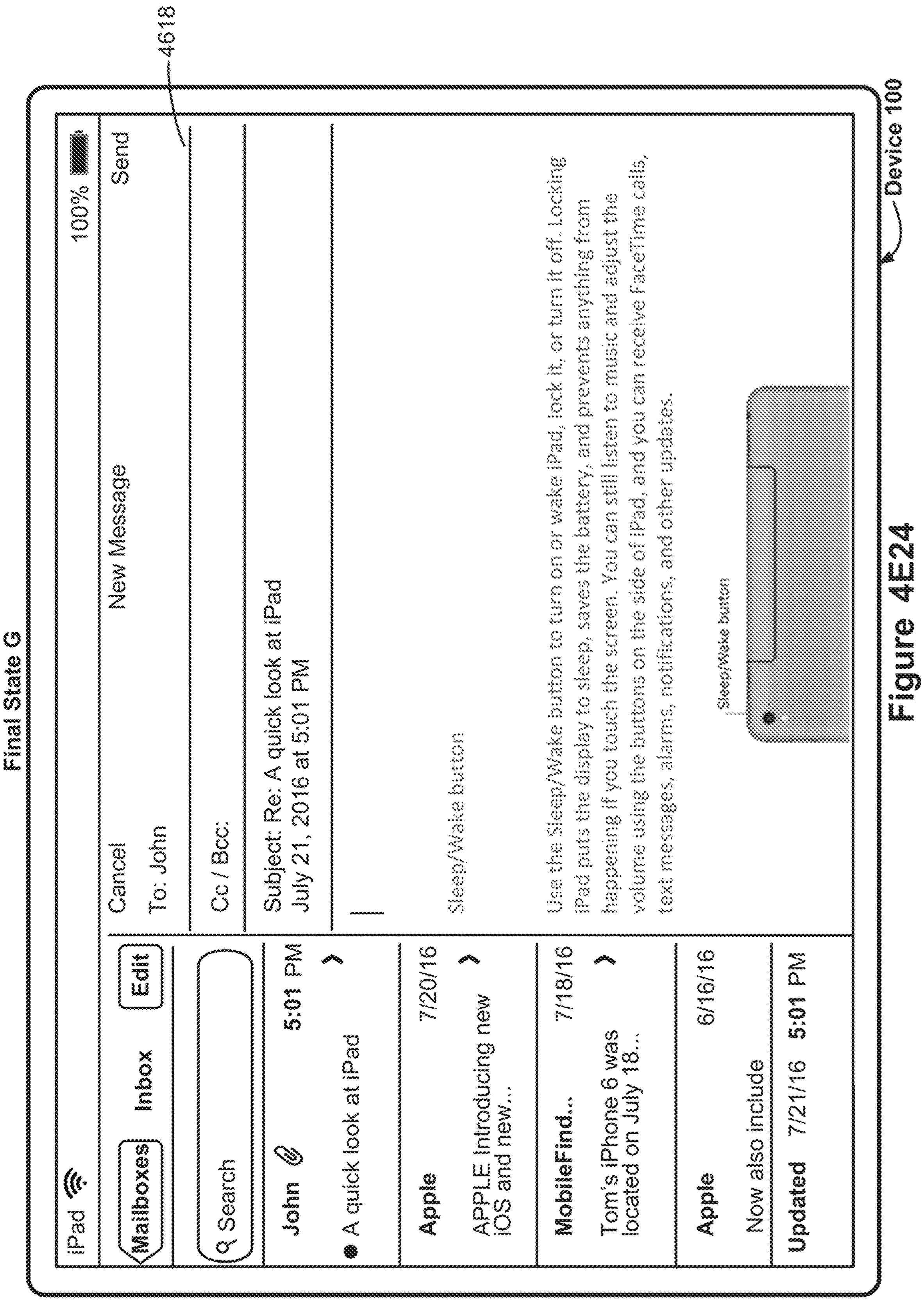
Figure 4E24

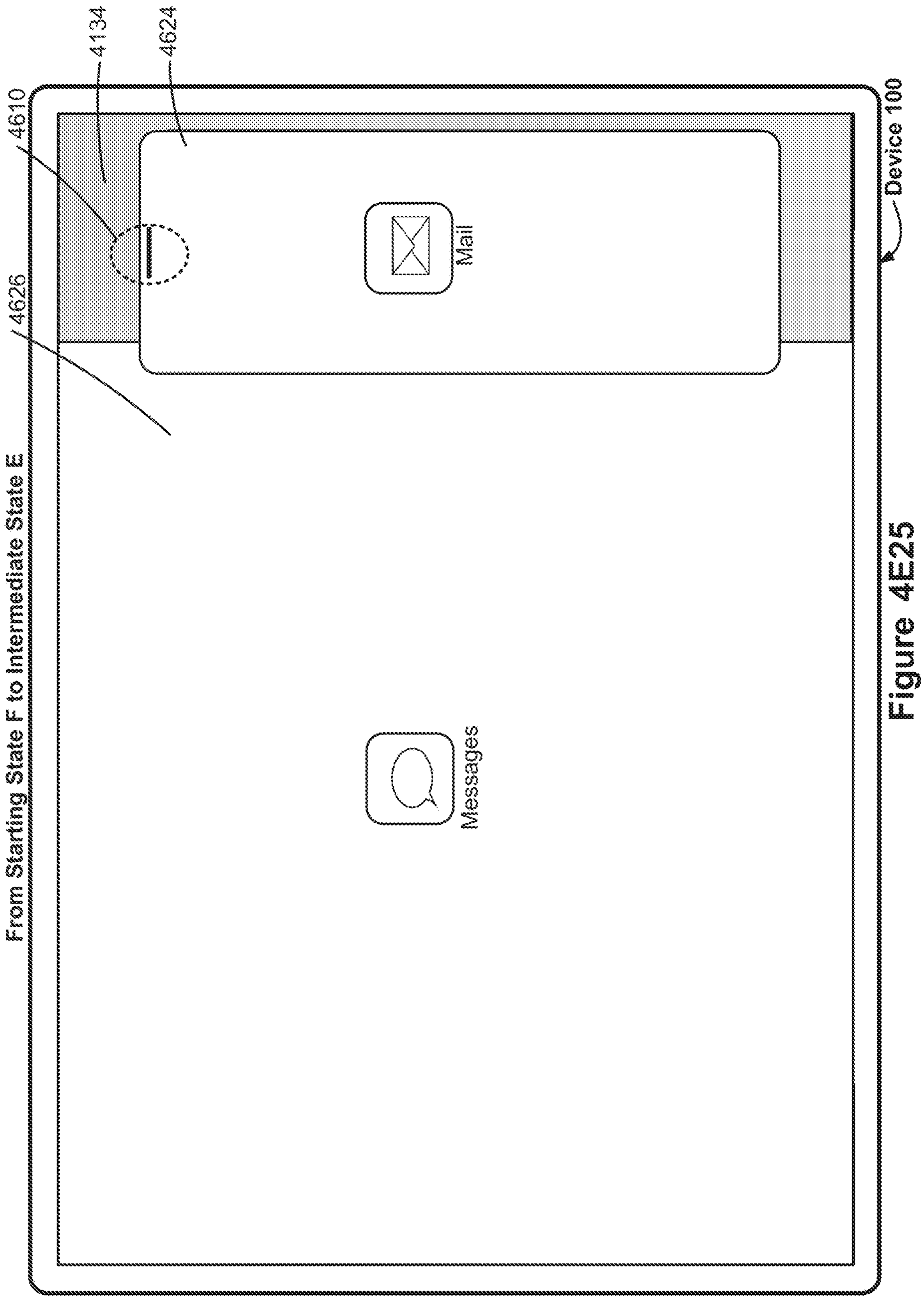
Figure 4E25

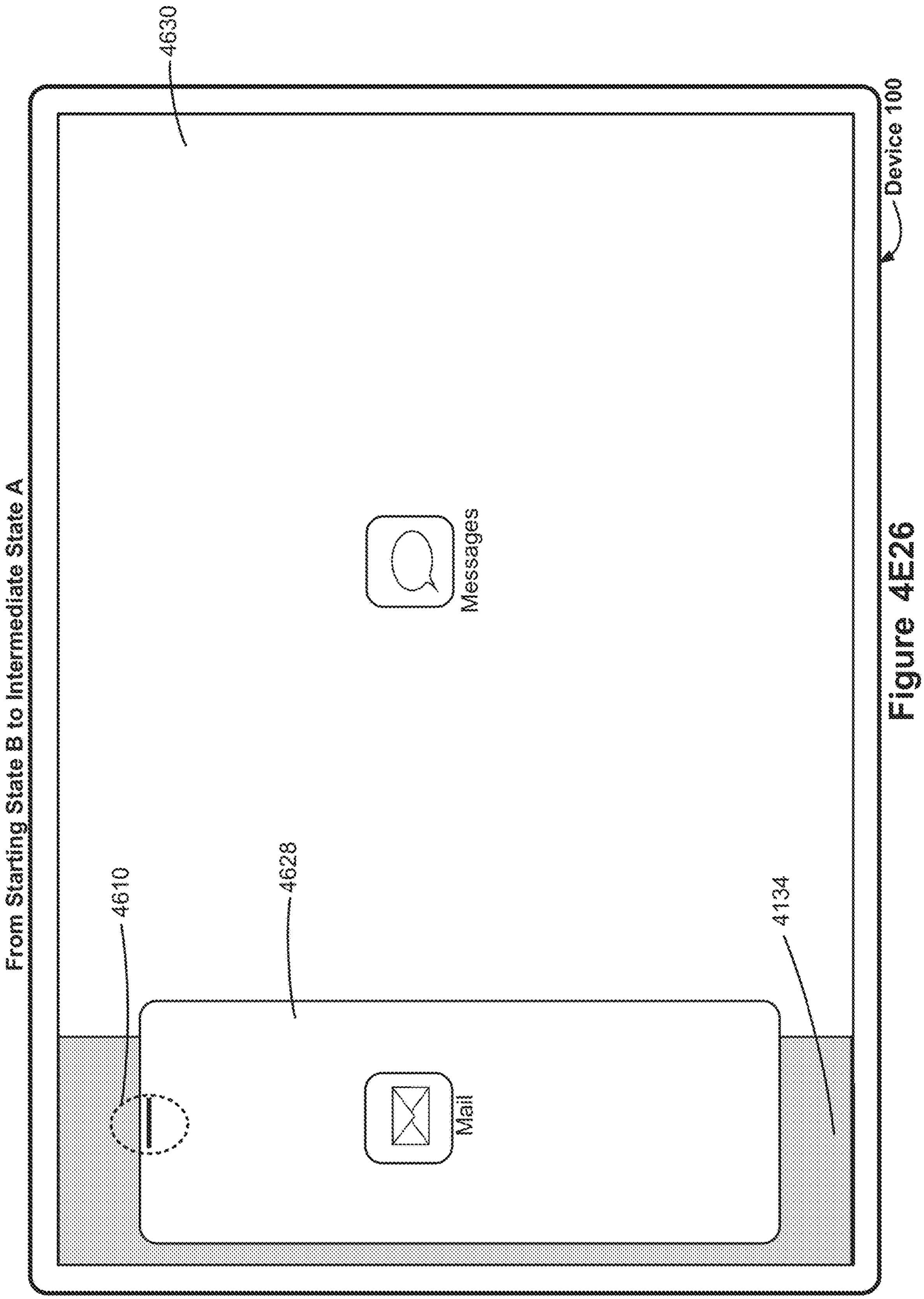
Figure 4E26

From Starting State E to Intermediate State F
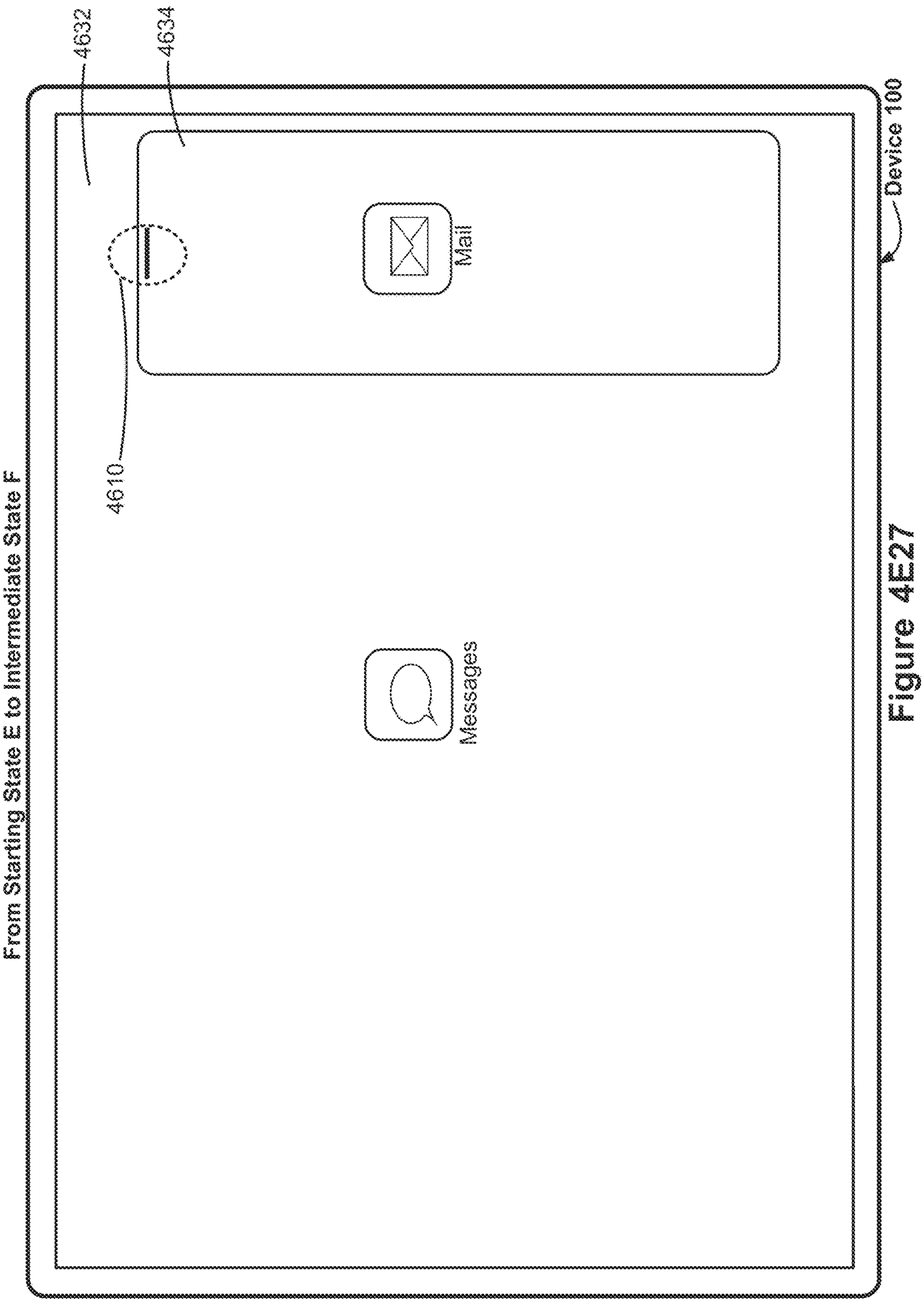
Figure 4E27

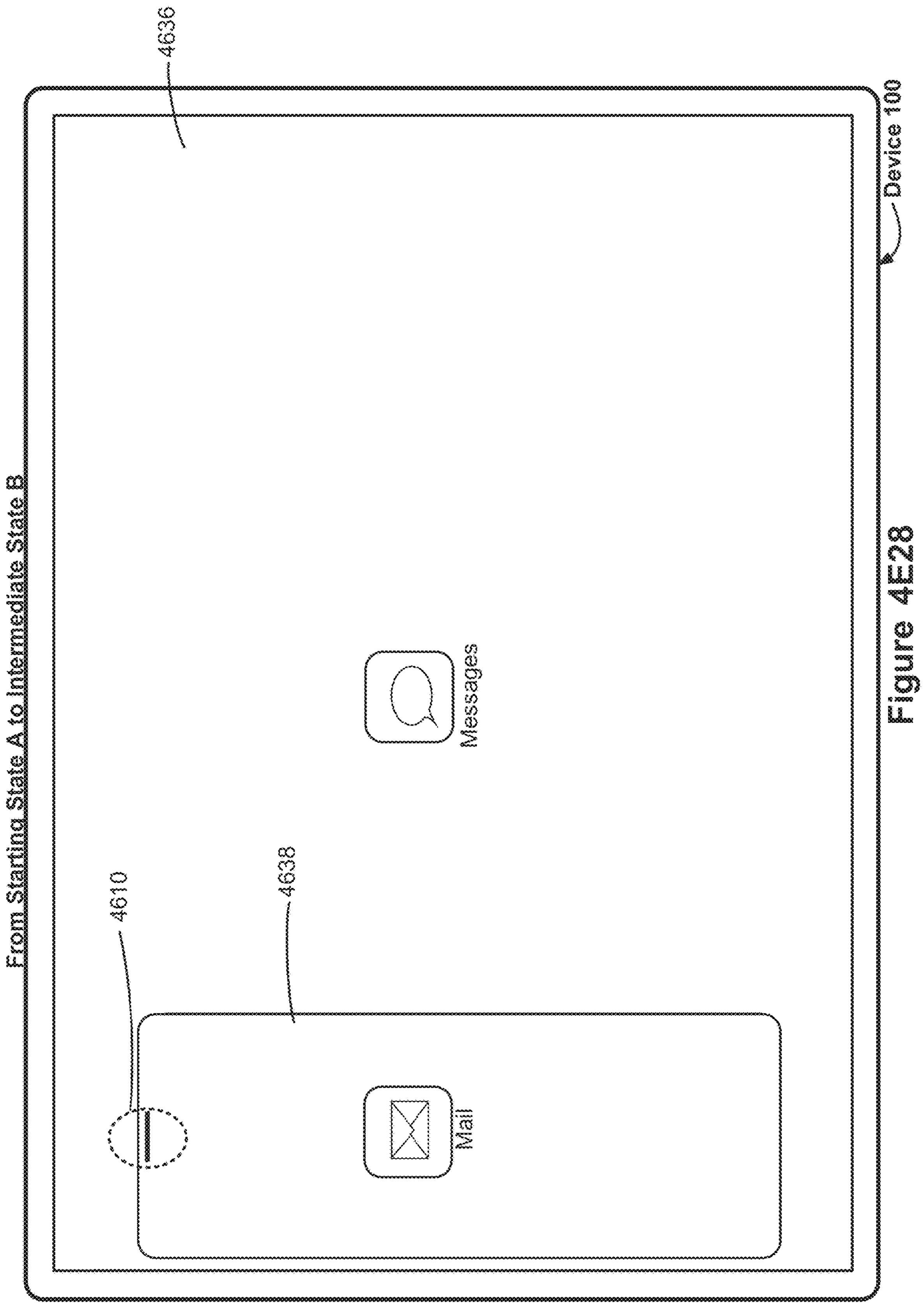
Figure 4E28

5000

Figure 5B:
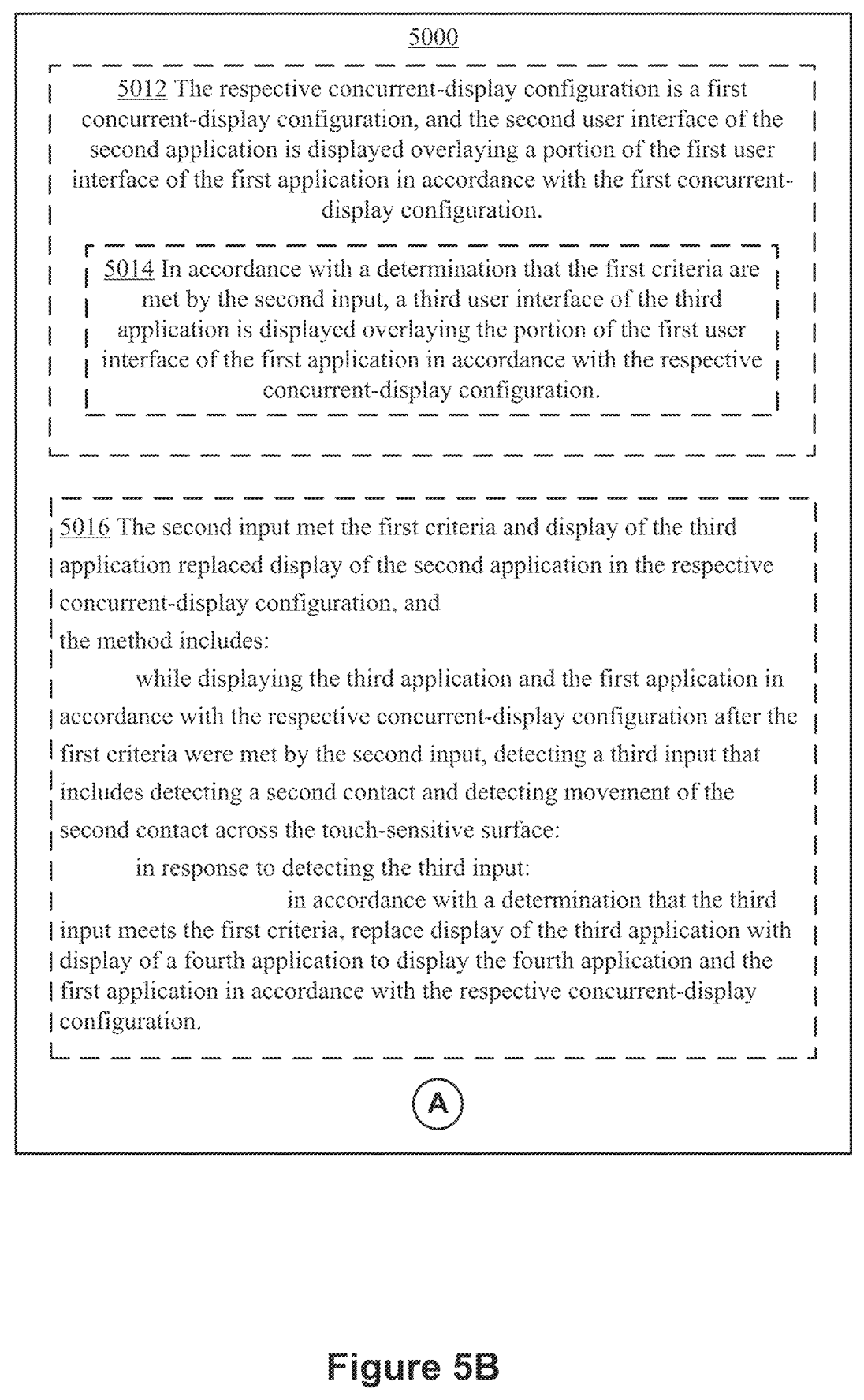

5000

5012 The respective concurrent-display configuration is a first concurrent-display configuration, and the second user interface of the second application is displayed overlaying a portion of the first user interface of the first application in accordance with the first concurrent-display configuration.

5014 In accordance with a determination that the first criteria are met by the second input, a third user interface of the third application is displayed overlaying the portion of the first user interface of the first application in accordance with the respective concurrent-display configuration.

5016 The second input met the first criteria and display of the third application replaced display of the second application in the respective concurrent-display configuration, and
the method includes:

while displaying the third application and the first application in accordance with the respective concurrent-display configuration after the first criteria were met by the second input, detecting a third input that includes detecting a second contact and detecting movement of the second contact across the touch-sensitive surface:

in response to detecting the third input:

in accordance with a determination that the third input meets the first criteria, replace display of the third application with display of a fourth application to display the fourth application and the first application in accordance with the respective concurrent-display configuration.

Figure 5C:
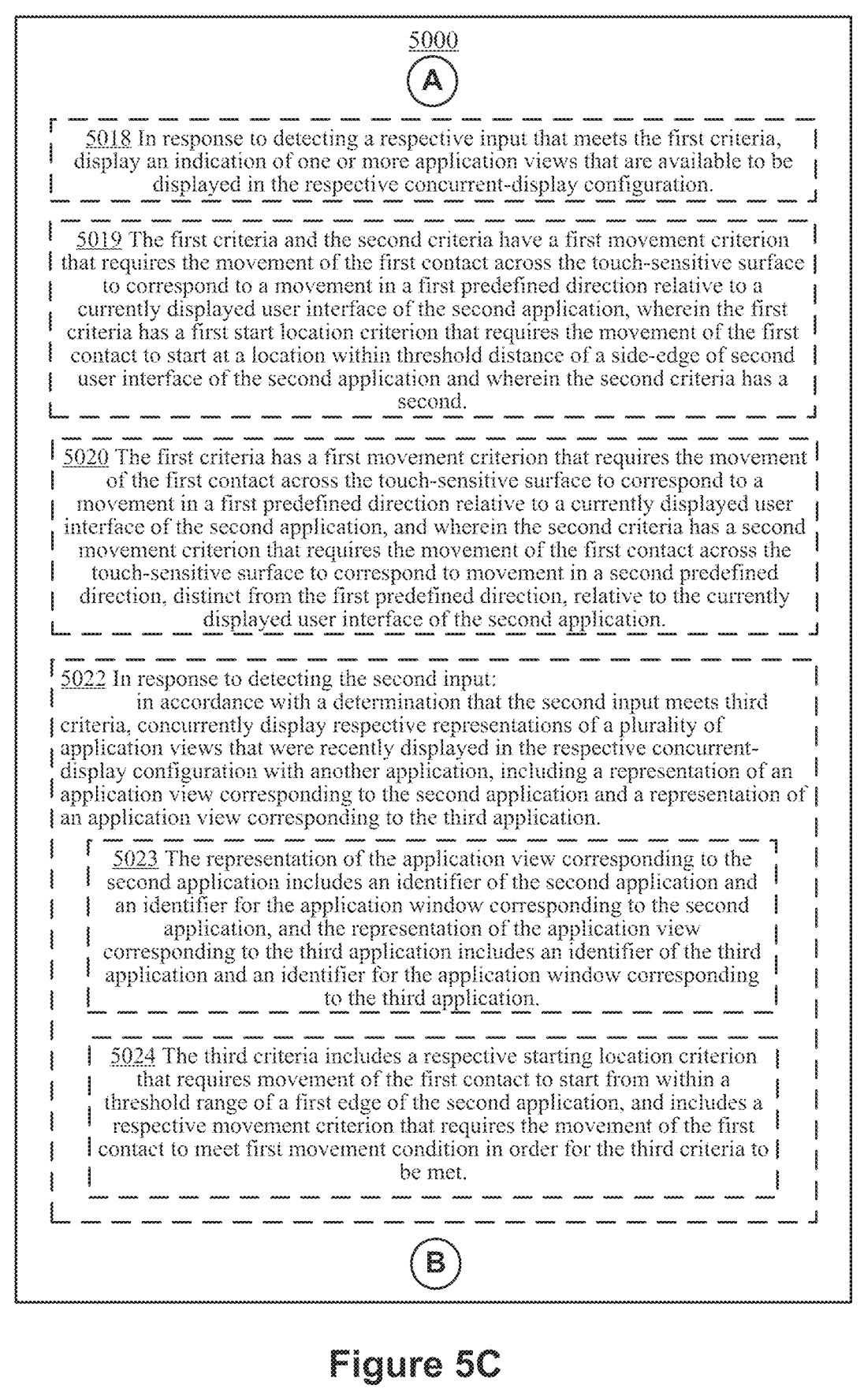

5018 In response to detecting a respective input that meets the first criteria, display an indication of one or more application views that are available to be displayed in the respective concurrent-display configuration.

5019 The first criteria and the second criteria have a first movement criterion that requires the movement of the first contact across the touch-sensitive surface to correspond to a movement in a first predefined direction relative to a currently displayed user interface of the second application, wherein the first criteria has a first start location criterion that requires the movement of the first contact to start at a location within threshold distance of a side-edge of second user interface of the second application and wherein the second criteria has a second.

5020 The first criteria has a first movement criterion that requires the movement of the first contact across the touch-sensitive surface to correspond to a movement in a first predefined direction relative to a currently displayed user interface of the second application, and wherein the second criteria has a second movement criterion that requires the movement of the first contact across the touch-sensitive surface to correspond to movement in a second predefined direction, distinct from the first predefined direction, relative to the currently displayed user interface of the second application.

5022 In response to detecting the second input:
in accordance with a determination that the second input meets third criteria, concurrently display respective representations of a plurality of application views that were recently displayed in the respective concurrent-display configuration with another application, including a representation of an application view corresponding to the second application and a representation of an application view corresponding to the third application.

5023 The representation of the application view corresponding to the second application includes an identifier of the second application and an identifier for the application window corresponding to the second application, and the representation of the application view corresponding to the third application includes an identifier of the third application and an identifier for the application window corresponding to the third application.

5024 The third criteria includes a respective starting location criterion that requires movement of the first contact to start from within a threshold range of a first edge of the second application, and includes a respective movement criterion that requires the movement of the first contact to meet first movement condition in order for the third criteria to be met.

Figure 5D:
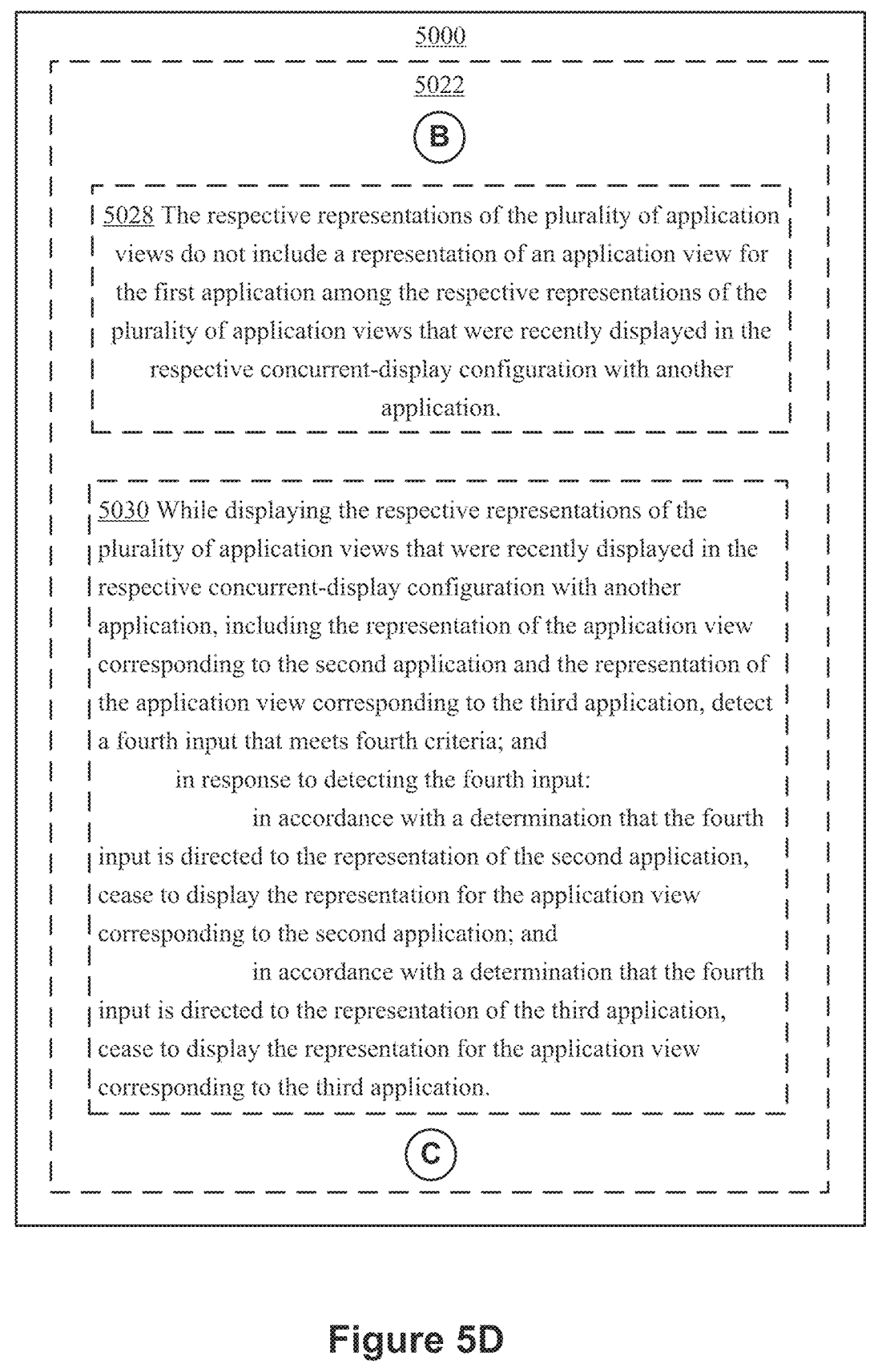

5028 The respective representations of the plurality of application views do not include a representation of an application view for the first application among the respective representations of the plurality of application views that were recently displayed in the respective concurrent-display configuration with another application.

5030 While displaying the respective representations of the plurality of application views that were recently displayed in the respective concurrent-display configuration with another application, including the representation of the application view corresponding to the second application and the representation of the application view corresponding to the third application, detect a fourth input that meets fourth criteria; and in response to detecting the fourth input:

in accordance with a determination that the fourth input is directed to the representation of the second application, cease to display the representation for the application view corresponding to the second application; and in accordance with a determination that the fourth input is directed to the representation of the third application, cease to display the representation for the application view corresponding to the third application.

Figure 5E:
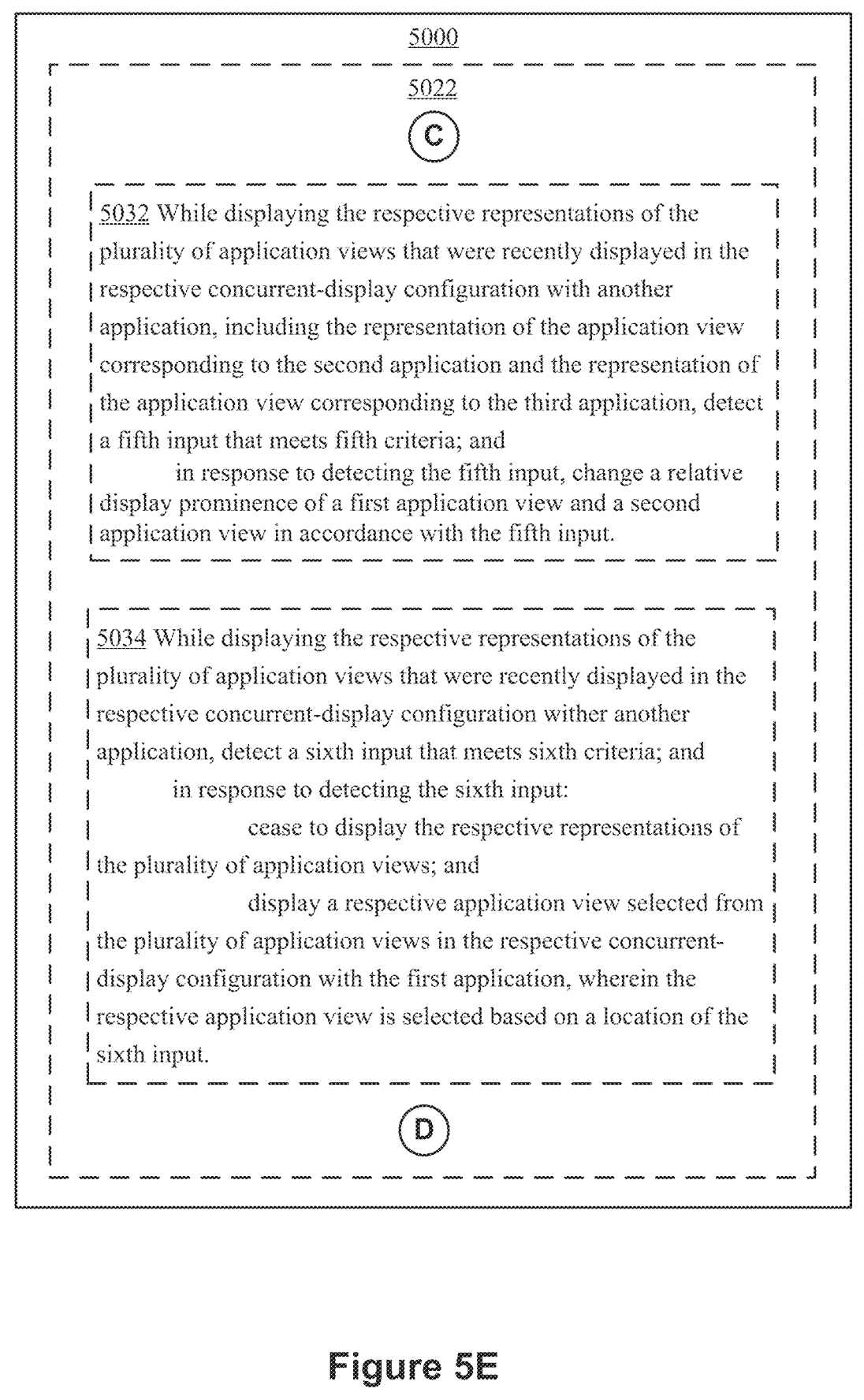

5032 While displaying the respective representations of the plurality of application views that were recently displayed in the respective concurrent-display configuration with another application, including the representation of the application view corresponding to the second application and the representation of the application view corresponding to the third application, detect a fifth input that meets fifth criteria; and in response to detecting the fifth input, change a relative display prominence of a first application view and a second application view in accordance with the fifth input.

5034 While displaying the respective representations of the plurality of application views that were recently displayed in the respective concurrent-display configuration wither another application, detect a sixth input that meets sixth criteria; and in response to detecting the sixth input:

cease to display the respective representations of the plurality of application views; and display a respective application view selected from the plurality of application views in the respective concurrent-display configuration with the first application, wherein the respective application view is selected based on a location of the sixth input.

Figure 5F:
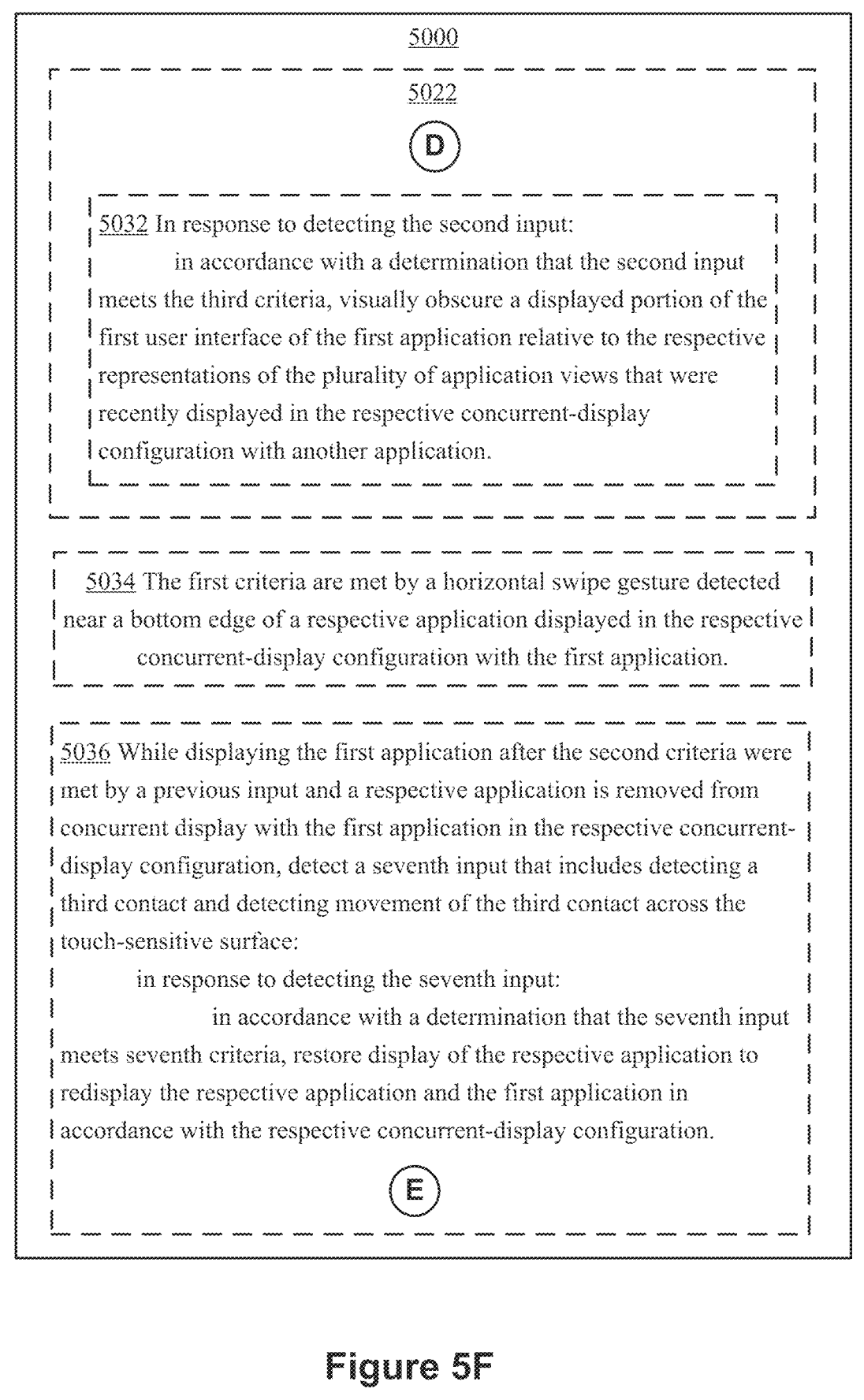

5032 In response to detecting the second input:

in accordance with a determination that the second input meets the third criteria, visually obscure a displayed portion of the first user interface of the first application relative to the respective representations of the plurality of application views that were recently displayed in the respective concurrent-display configuration with another application.

5034 The first criteria are met by a horizontal swipe gesture detected near a bottom edge of a respective application displayed in the respective concurrent-display configuration with the first application.

5036 While displaying the first application after the second criteria were met by a previous input and a respective application is removed from concurrent display with the first application in the respective concurrent-display configuration, detect a seventh input that includes detecting a third contact and detecting movement of the third contact across the touch-sensitive surface:

in response to detecting the seventh input:

in accordance with a determination that the seventh input meets seventh criteria, restore display of the respective application to redisplay the respective application and the first application in accordance with the respective concurrent-display configuration.

Figure 5G:
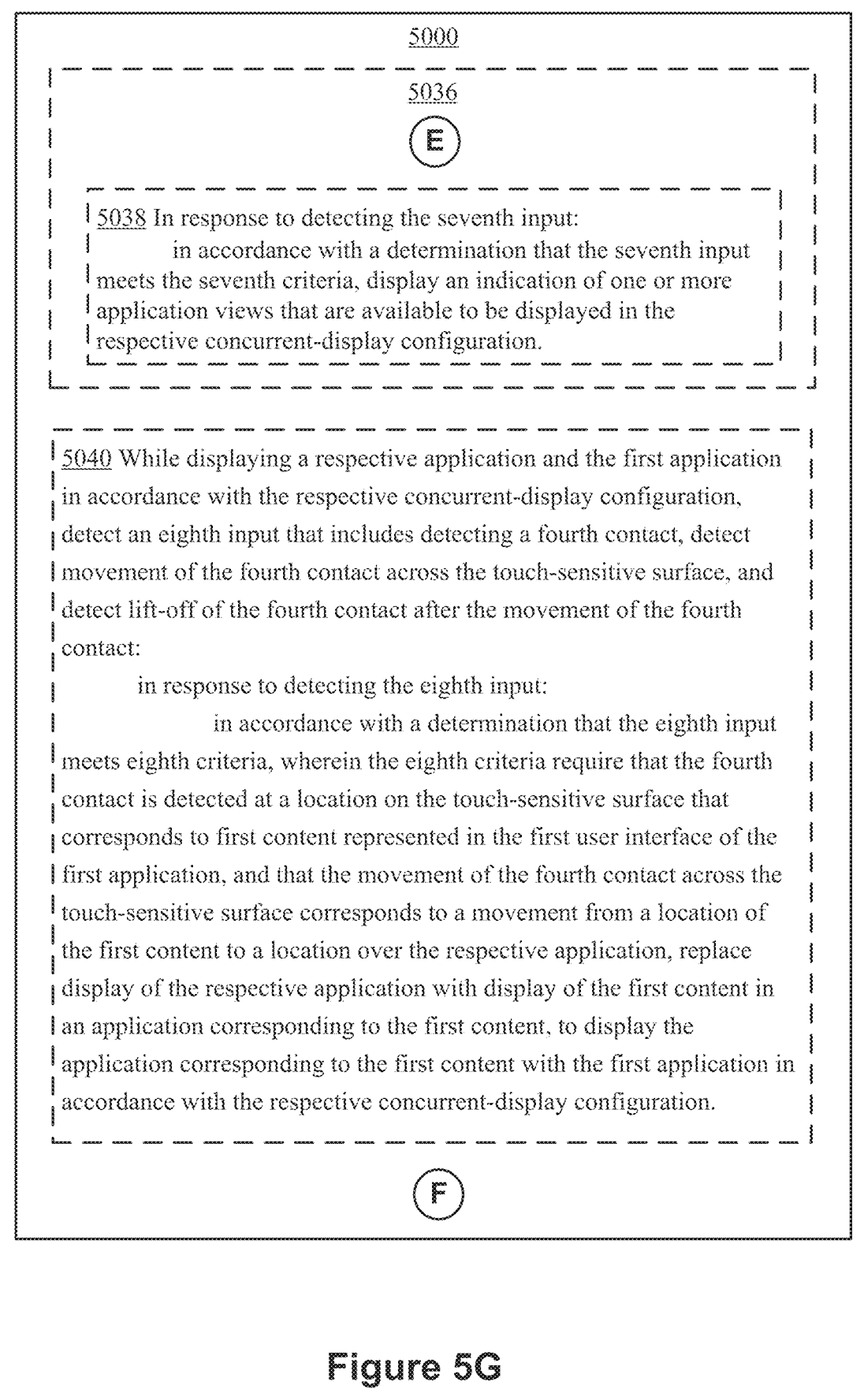

5038 In response to detecting the seventh input:

in accordance with a determination that the seventh input meets the seventh criteria, display an indication of one or more application views that are available to be displayed in the respective concurrent-display configuration.

5040 While displaying a respective application and the first application in accordance with the respective concurrent-display configuration, detect an eighth input that includes detecting a fourth contact, detect movement of the fourth contact across the touch-sensitive surface, and detect lift-off of the fourth contact after the movement of the fourth contact:

in response to detecting the eighth input:

in accordance with a determination that the eighth input meets eighth criteria, wherein the eighth criteria require that the fourth contact is detected at a location on the touch-sensitive surface that corresponds to first content represented in the first user interface of the first application, and that the movement of the fourth contact across the touch-sensitive surface corresponds to a movement from a location of the first content to a location over the respective application, replace display of the respective application with display of the first content in an application corresponding to the first content, to display the application corresponding to the first content with the first application in accordance with the respective concurrent-display configuration.

Figure 5H:
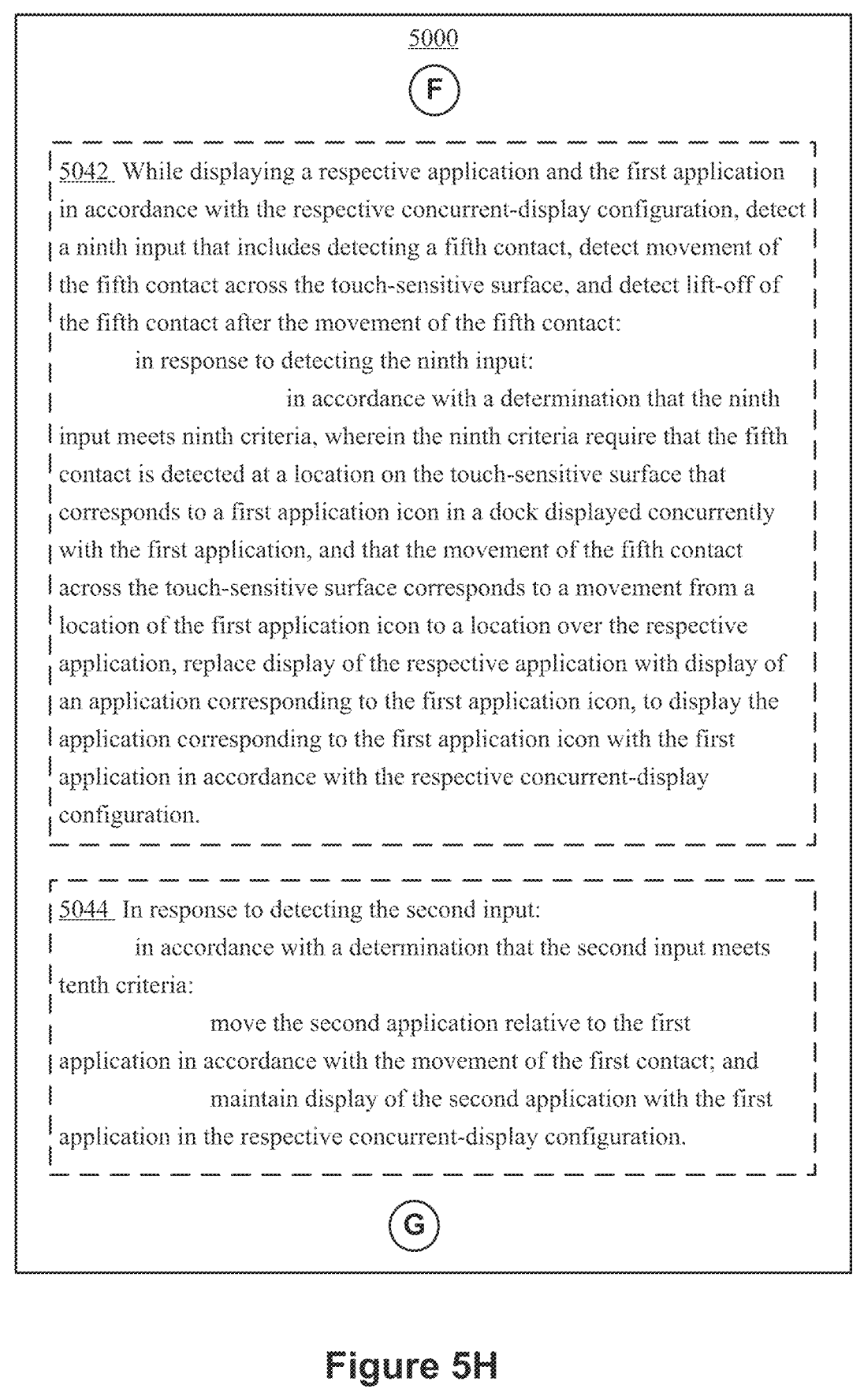

5042 While displaying a respective application and the first application in accordance with the respective concurrent-display configuration, detect a ninth input that includes detecting a fifth contact, detect movement of the fifth contact across the touch-sensitive surface, and detect lift-off of the fifth contact after the movement of the fifth contact:

in response to detecting the ninth input:

in accordance with a determination that the ninth input meets ninth criteria, wherein the ninth criteria require that the fifth contact is detected at a location on the touch-sensitive surface that corresponds to a first application icon in a dock displayed concurrently with the first application, and that the movement of the fifth contact across the touch-sensitive surface corresponds to a movement from a location of the first application icon to a location over the respective application, replace display of the respective application with display of an application corresponding to the first application icon, to display the application corresponding to the first application icon with the first application in accordance with the respective concurrent-display configuration.

5044 In response to detecting the second input:

in accordance with a determination that the second input meets tenth criteria:

move the second application relative to the first application in accordance with the movement of the first contact; and maintain display of the second application with the first application in the respective concurrent-display configuration.

Figure 5I:
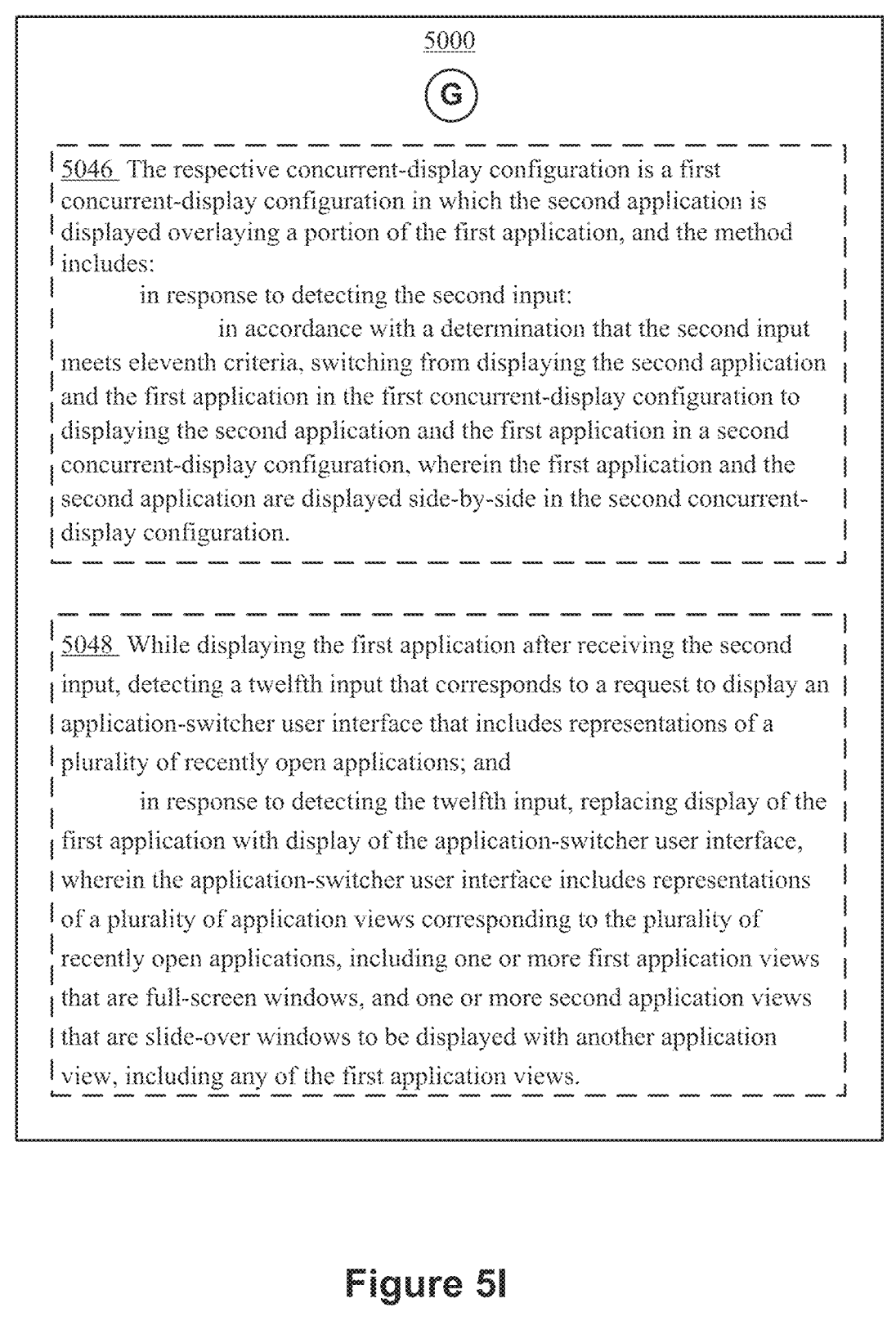

5046 The respective concurrent-display configuration is a first concurrent-display configuration in which the second application is displayed overlaying a portion of the first application, and the method includes:

in response to detecting the second input:

in accordance with a determination that the second input meets eleventh criteria, switching from displaying the second application and the first application in the first concurrent-display configuration to displaying the second application and the first application in a second concurrent-display configuration, wherein the first application and the second application are displayed side-by-side in the second concurrent-display configuration.

5048 While displaying the first application after receiving the second input, detecting a twelfth input that corresponds to a request to display an application-switcher user interface that includes representations of a plurality of recently open applications; and in response to detecting the twelfth input, replacing display of the first application with display of the application-switcher user interface, wherein the application-switcher user interface includes representations of a plurality of application views corresponding to the plurality of recently open applications, including one or more first application views that are full-screen windows, and one or more second application views that are slide-over windows to be displayed with another application view, including any of the first application views.

Figure 6A:
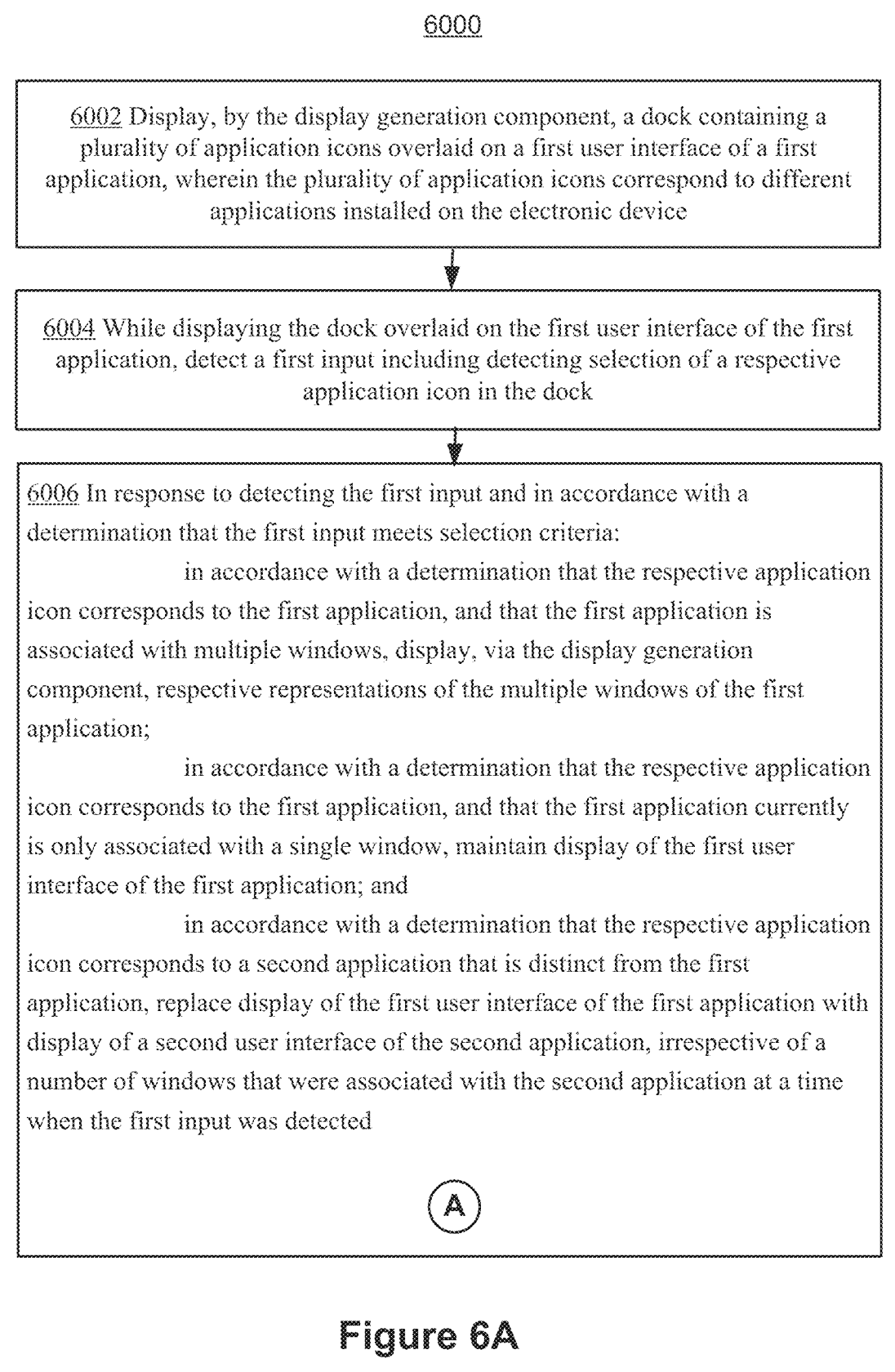

6002 Display, by the display generation component, a dock containing a plurality of application icons overlaid on a first user interface of a first application, wherein the plurality of application icons correspond to different applications installed on the electronic device 6004 While displaying the dock overlaid on the first user interface of the first application, detect a first input including detecting selection of a respective application icon in the dock 6006 In response to detecting the first input and in accordance with a determination that the first input meets selection criteria:

in accordance with a determination that the respective application icon corresponds to the first application, and that the first application is associated with multiple windows, display, via the display generation component, respective representations of the multiple windows of the first application;

in accordance with a determination that the respective application icon corresponds to the first application, and that the first application currently is only associated with a single window, maintain display of the first user interface of the first application; and in accordance with a determination that the respective application icon corresponds to a second application that is distinct from the first application, replace display of the first user interface of the first application with display of a second user interface of the second application, irrespective of a number of windows that were associated with the second application at a time when the first input was detected

Figure 6B:
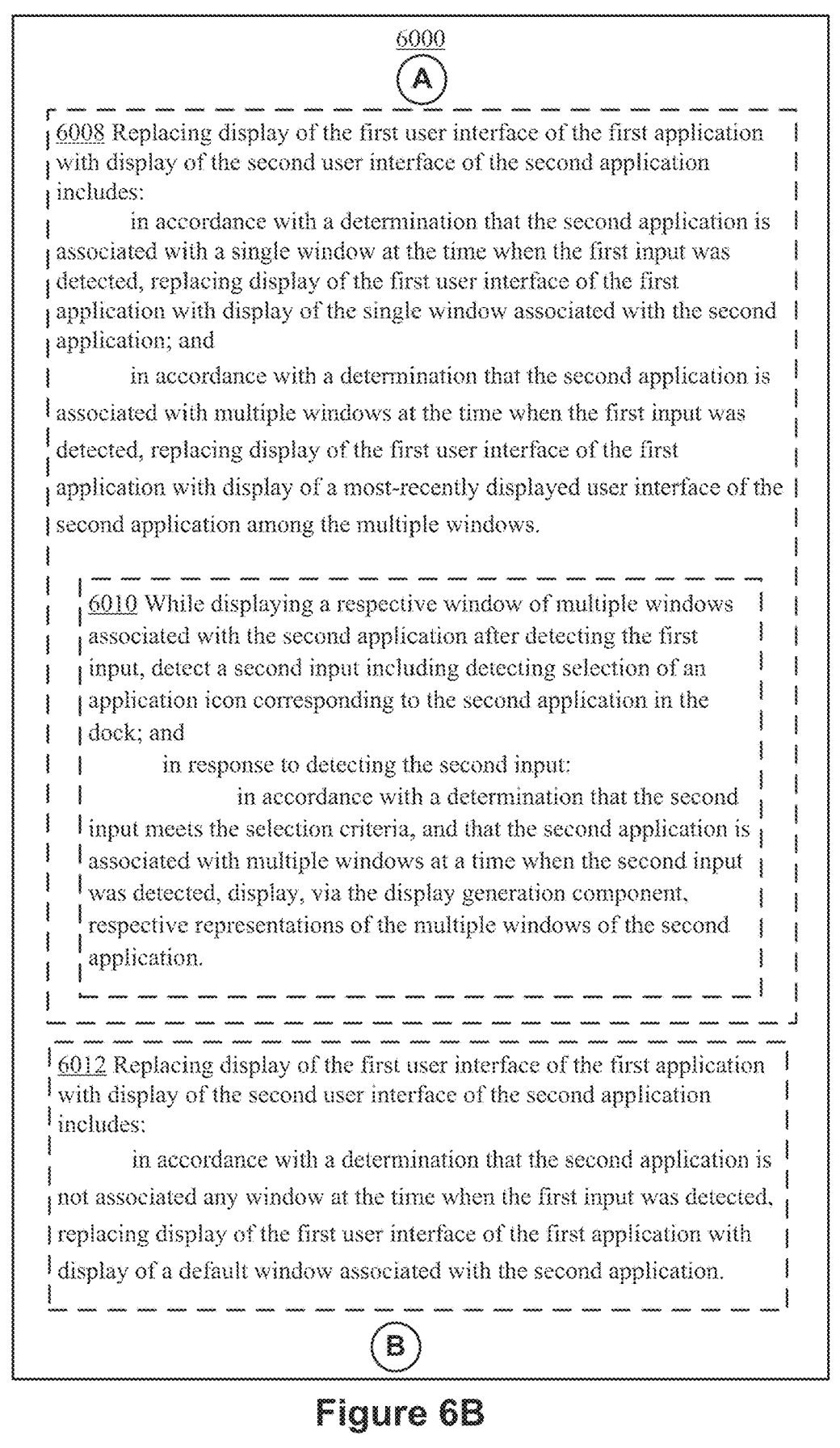

6008 Replacing display of the first user interface of the first application with display of the second user interface of the second application includes:

in accordance with a determination that the second application is associated with a single window at the time when the first input was detected, replacing display of the first user interface of the first application with display of the single window associated with the second application; and in accordance with a determination that the second application is associated with multiple windows at the time when the first input was detected, replacing display of the first user interface of the first application with display of a most-recently displayed user interface of the second application among the multiple windows.

6010 While displaying a respective window of multiple windows associated with the second application after detecting the first input, detect a second input including detecting selection of an application icon corresponding to the second application in the dock; and in response to detecting the second input:

in accordance with a determination that the second input meets the selection criteria, and that the second application is associated with multiple windows at a time when the second input was detected, display, via the display generation component, respective representations of the multiple windows of the second application.

6012 Replacing display of the first user interface of the first application with display of the second user interface of the second application includes:

in accordance with a determination that the second application is not associated any window at the time when the first input was detected, replacing display of the first user interface of the first application with display of a default window associated with the second application.

Figure 6C:
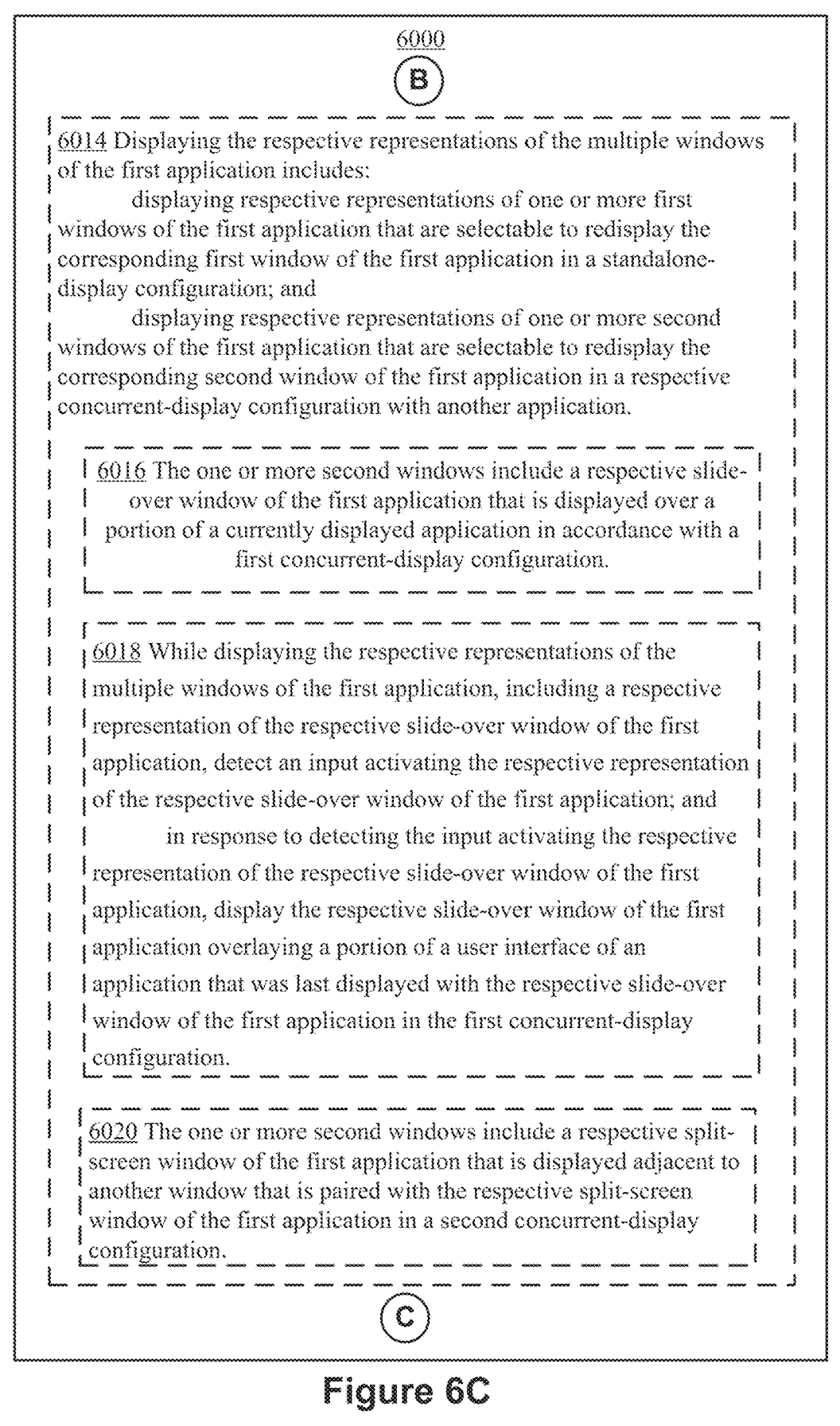

6014 Displaying the respective representations of the multiple windows of the first application includes:

displaying respective representations of one or more first windows of the first application that are selectable to redisplay the corresponding first window of the first application in a standalone-display configuration; and displaying respective representations of one or more second windows of the first application that are selectable to redisplay the corresponding second window of the first application in a respective concurrent-display configuration with another application.

6016 The one or more second windows include a respective slide-over window of the first application that is displayed over a portion of a currently displayed application in accordance with a first concurrent-display configuration.

6018 While displaying the respective representations of the multiple windows of the first application, including a respective representation of the respective slide-over window of the first application, detect an input activating the respective representation of the respective slide-over window of the first application; and in response to detecting the input activating the respective representation of the respective slide-over window of the first application, display the respective slide-over window of the first application overlaying a portion of a user interface of an application that was last displayed with the respective slide-over window of the first application in the first concurrent-display configuration.

6020 The one or more second windows include a respective split-screen window of the first application that is displayed adjacent to another window that is paired with the respective split-screen window of the first application in a second concurrent-display configuration.

Figure 6D:
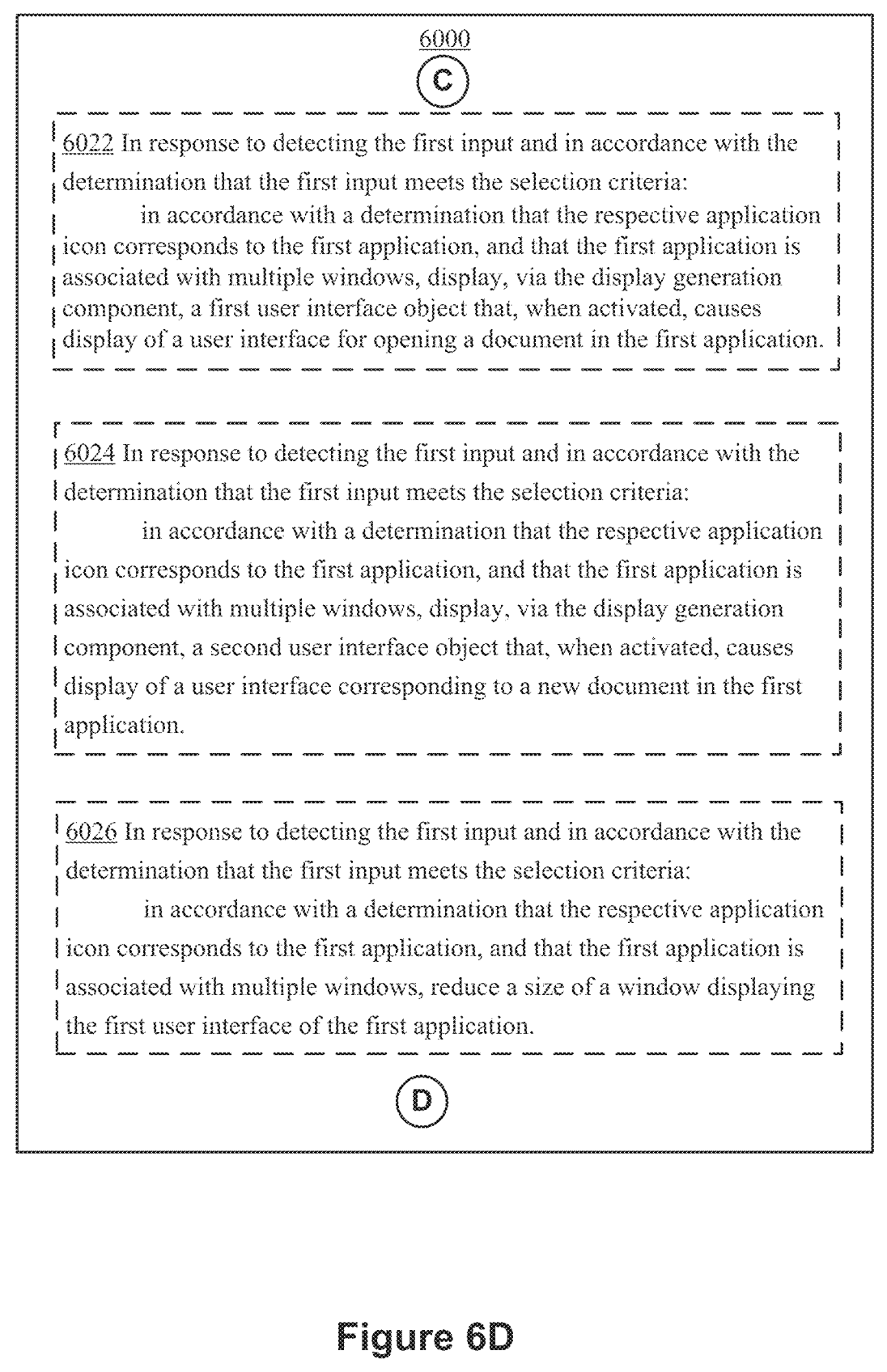

6022 In response to detecting the first input and in accordance with the determination that the first input meets the selection criteria:

in accordance with a determination that the respective application icon corresponds to the first application, and that the first application is associated with multiple windows, display, via the display generation component, a first user interface object that, when activated, causes display of a user interface for opening a document in the first application.

6024 In response to detecting the first input and in accordance with the determination that the first input meets the selection criteria:

in accordance with a determination that the respective application icon corresponds to the first application, and that the first application is associated with multiple windows, display, via the display generation component, a second user interface object that, when activated, causes display of a user interface corresponding to a new document in the first application.

6026 In response to detecting the first input and in accordance with the determination that the first input meets the selection criteria:

in accordance with a determination that the respective application icon corresponds to the first application, and that the first application is associated with multiple windows, reduce a size of a window displaying the first user interface of the first application.

Figure 6E:
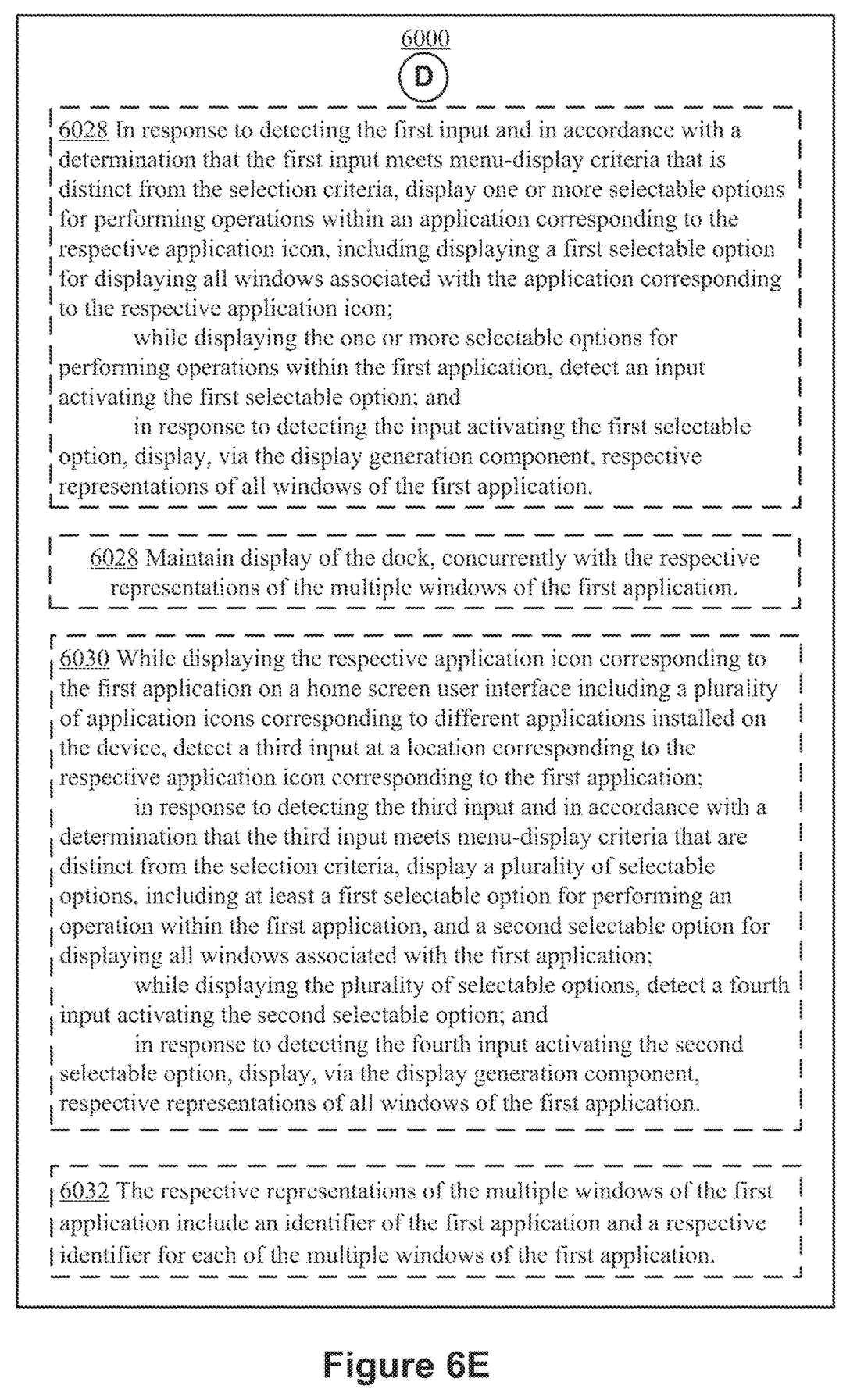

6028 In response to detecting the first input and in accordance with a determination that the first input meets menu-display criteria that is distinct from the selection criteria, display one or more selectable options for performing operations within an application corresponding to the respective application icon, including displaying a first selectable option for displaying all windows associated with the application corresponding to the respective application icon;

while displaying the one or more selectable options for performing operations within the first application, detect an input activating the first selectable option; and in response to detecting the input activating the first selectable option, display, via the display generation component, respective representations of all windows of the first application.

6028 Maintain display of the dock, concurrently with the respective representations of the multiple windows of the first application.

6030 While displaying the respective application icon corresponding to the first application on a home screen user interface including a plurality of application icons corresponding to different applications installed on the device, detect a third input at a location corresponding to the respective application icon corresponding to the first application;

in response to detecting the third input and in accordance with a determination that the third input meets menu-display criteria that are distinct from the selection criteria, display a plurality of selectable options, including at least a first selectable option for performing an operation within the first application, and a second selectable option for displaying all windows associated with the first application;

while displaying the plurality of selectable options, detect a fourth input activating the second selectable option; and in response to detecting the fourth input activating the second selectable option, display, via the display generation component, respective representations of all windows of the first application.

6032 The respective representations of the multiple windows of the first application include an identifier of the first application and a respective identifier for each of the multiple windows of the first application.

Figure 7B:
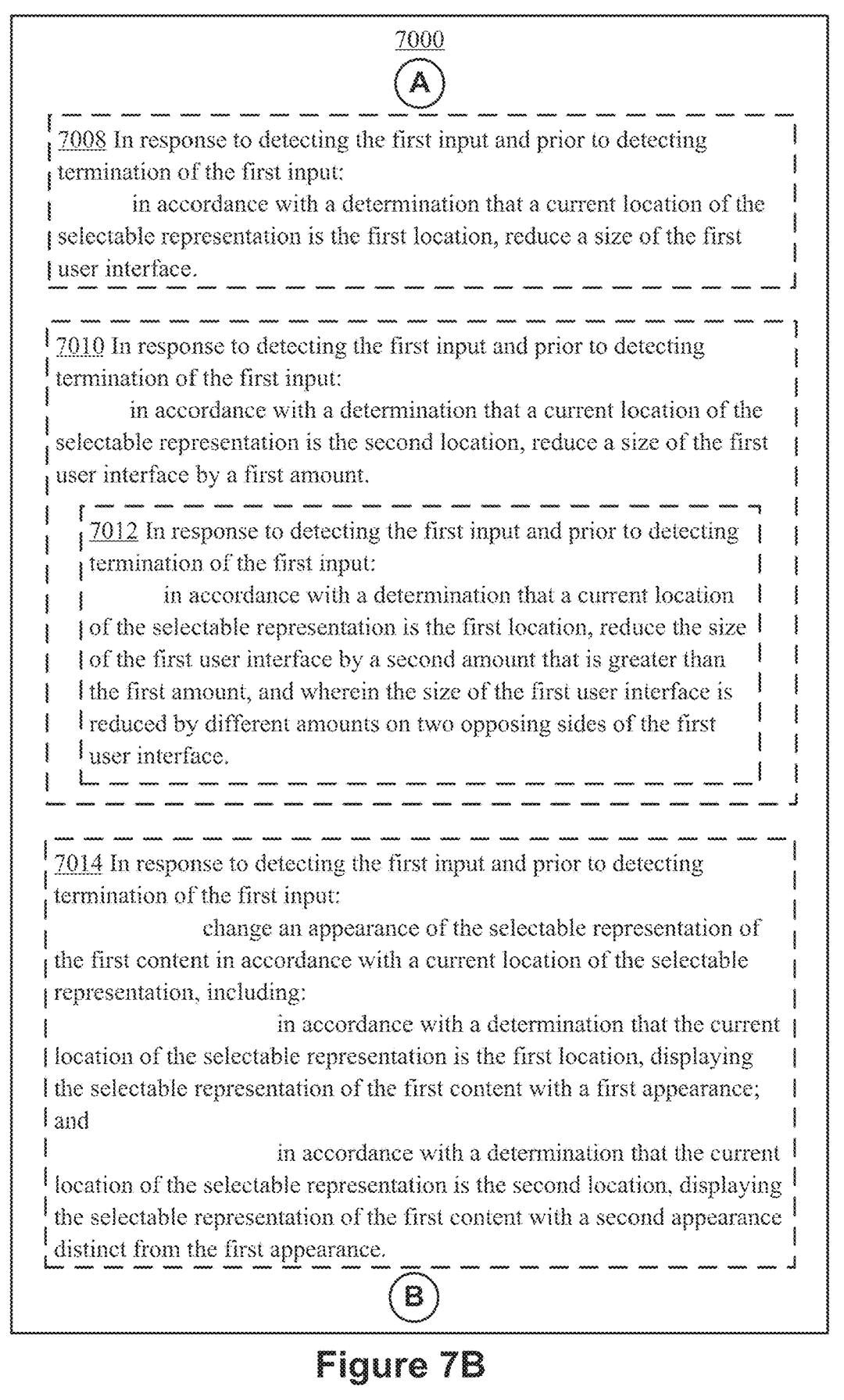

7008 In response to detecting the first input and prior to detecting termination of the first input:

in accordance with a determination that a current location of the selectable representation is the first location, reduce a size of the first user interface.

7010 In response to detecting the first input and prior to detecting termination of the first input:

in accordance with a determination that a current location of the selectable representation is the second location, reduce a size of the first user interface by a first amount.

7012 In response to detecting the first input and prior to detecting termination of the first input:

in accordance with a determination that a current location of the selectable representation is the first location, reduce the size of the first user interface by a second amount that is greater than the first amount, and wherein the size of the first user interface is reduced by different amounts on two opposing sides of the first user interface.

7014 In response to detecting the first input and prior to detecting termination of the first input:

change an appearance of the selectable representation of the first content in accordance with a current location of the selectable representation, including:

in accordance with a determination that the current location of the selectable representation is the first location, displaying the selectable representation of the first content with a first appearance; and in accordance with a determination that the current location of the selectable representation is the second location, displaying the selectable representation of the first content with a second appearance distinct from the first appearance.

Figure 7C:
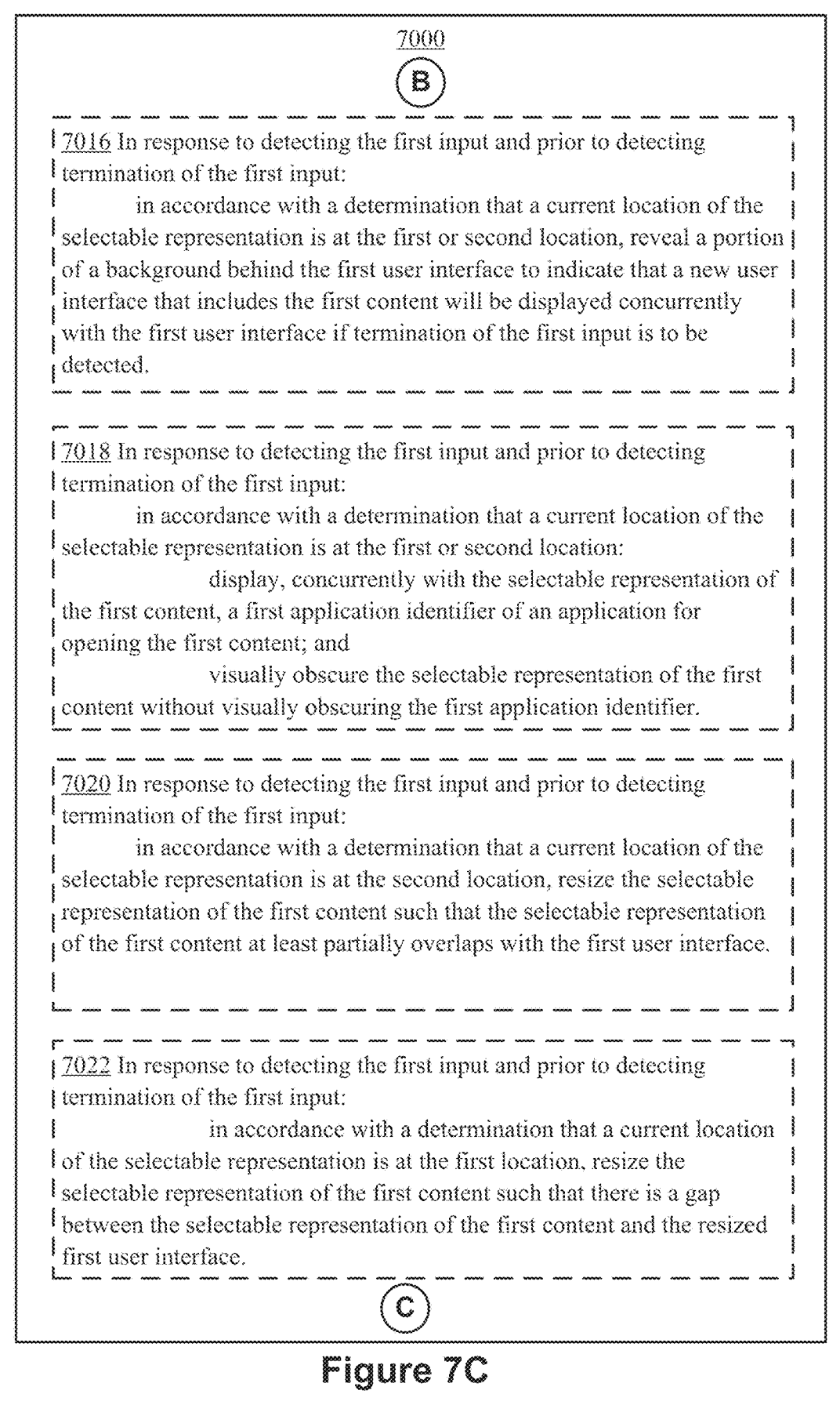

7016 In response to detecting the first input and prior to detecting termination of the first input:

in accordance with a determination that a current location of the selectable representation is at the first or second location, reveal a portion of a background behind the first user interface to indicate that a new user interface that includes the first content will be displayed concurrently with the first user interface if termination of the first input is to be detected.

7018 In response to detecting the first input and prior to detecting termination of the first input:

in accordance with a determination that a current location of the selectable representation is at the first or second location:

display, concurrently with the selectable representation of the first content, a first application identifier of an application for opening the first content; and visually obscure the selectable representation of the first content without visually obscuring the first application identifier.

7020 In response to detecting the first input and prior to detecting termination of the first input:

in accordance with a determination that a current location of the selectable representation is at the second location, resize the selectable representation of the first content such that the selectable representation of the first content at least partially overlaps with the first user interface.

7022 In response to detecting the first input and prior to detecting termination of the first input:

in accordance with a determination that a current location of the selectable representation is at the first location, resize the selectable representation of the first content such that there is a gap between the selectable representation of the first content and the resized first user interface.

Figure 7D:
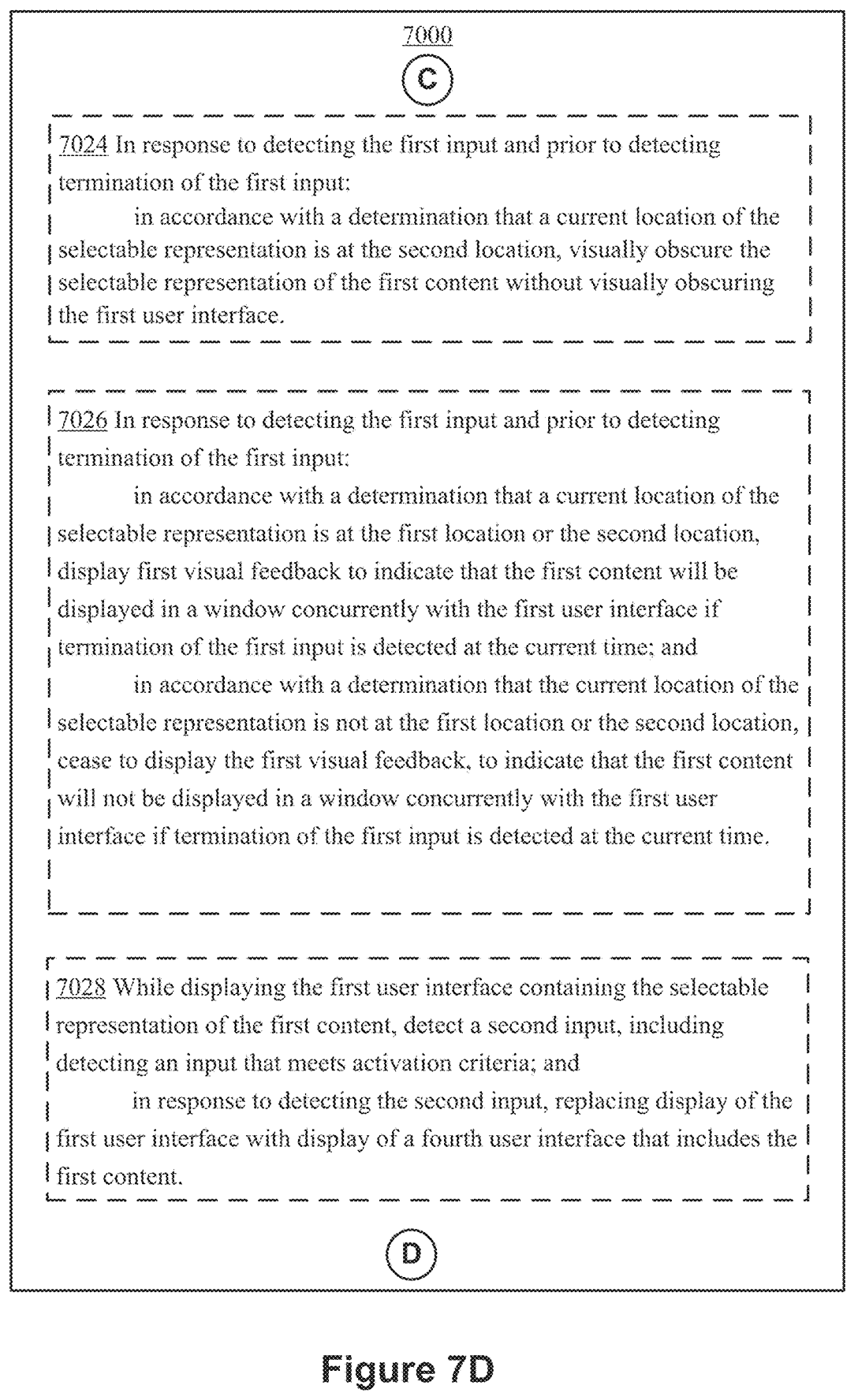

7024 In response to detecting the first input and prior to detecting termination of the first input:

in accordance with a determination that a current location of the selectable representation is at the second location, visually obscure the selectable representation of the first content without visually obscuring the first user interface.

7026 In response to detecting the first input and prior to detecting termination of the first input:

in accordance with a determination that a current location of the selectable representation is at the first location or the second location, display first visual feedback to indicate that the first content will be displayed in a window concurrently with the first user interface if termination of the first input is detected at the current time; and in accordance with a determination that the current location of the selectable representation is not at the first location or the second location, cease to display the first visual feedback, to indicate that the first content will not be displayed in a window concurrently with the first user interface if termination of the first input is detected at the current time.

7028 While displaying the first user interface containing the selectable representation of the first content, detect a second input, including detecting an input that meets activation criteria; and in response to detecting the second input, replacing display of the first user interface with display of a fourth user interface that includes the first content.

Figure 7E:
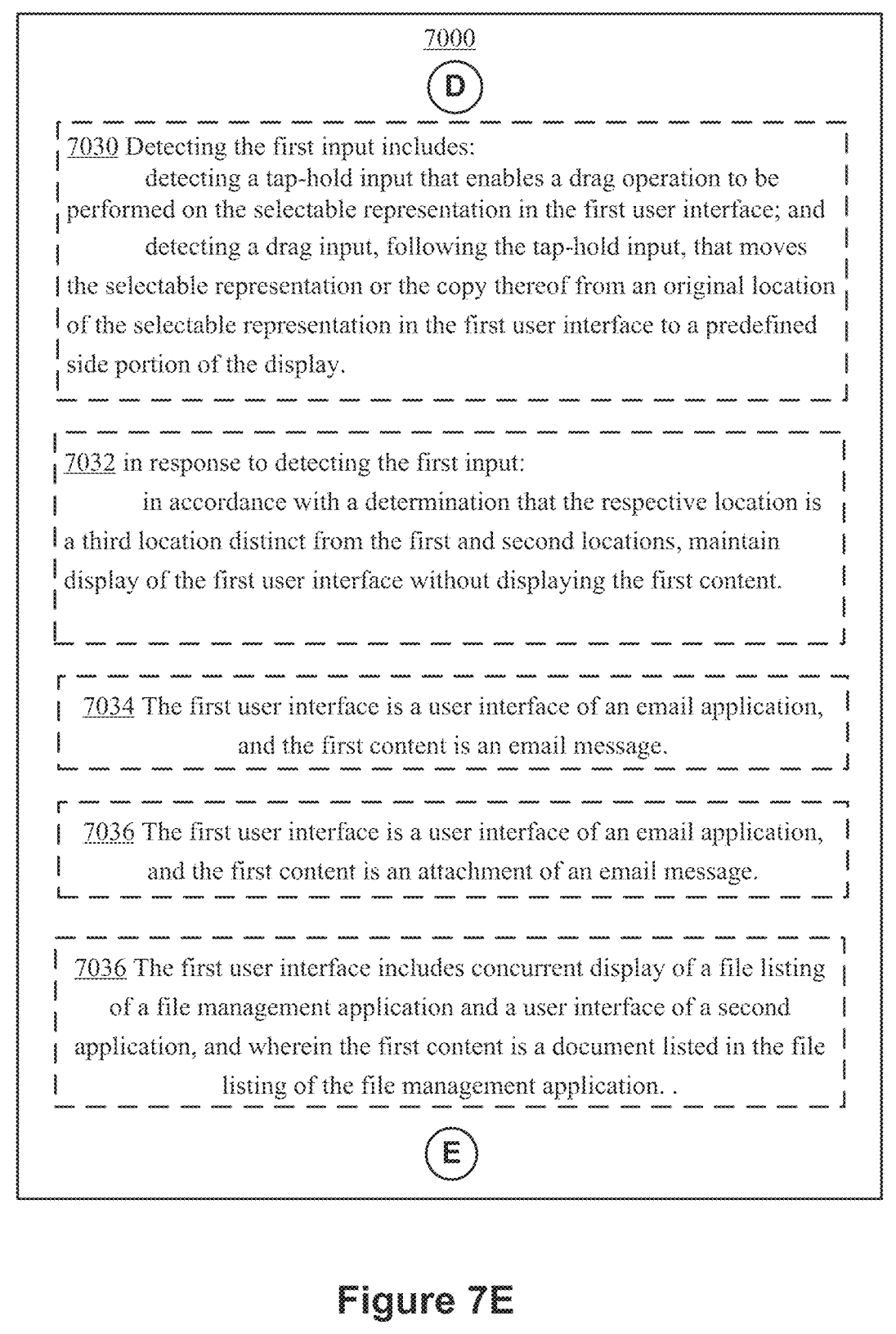

7030 Detecting the first input includes:
detecting a tap-hold input that enables a drag operation to be performed on the selectable representation in the first user interface; and
detecting a drag input, following the tap-hold input, that moves the selectable representation or the copy thereof from an original location of the selectable representation in the first user interface to a predefined side portion of the display.

7032 in response to detecting the first input:
in accordance with a determination that the respective location is a third location distinct from the first and second locations, maintain display of the first user interface without displaying the first content.

7034 The first user interface is a user interface of an email application, and the first content is an email message.

7036 The first user interface is a user interface of an email application, and the first content is an attachment of an email message.

7036 The first user interface includes concurrent display of a file listing of a file management application and a user interface of a second application, and wherein the first content is a document listed in the file listing of the file management application. .

Figure 7F:
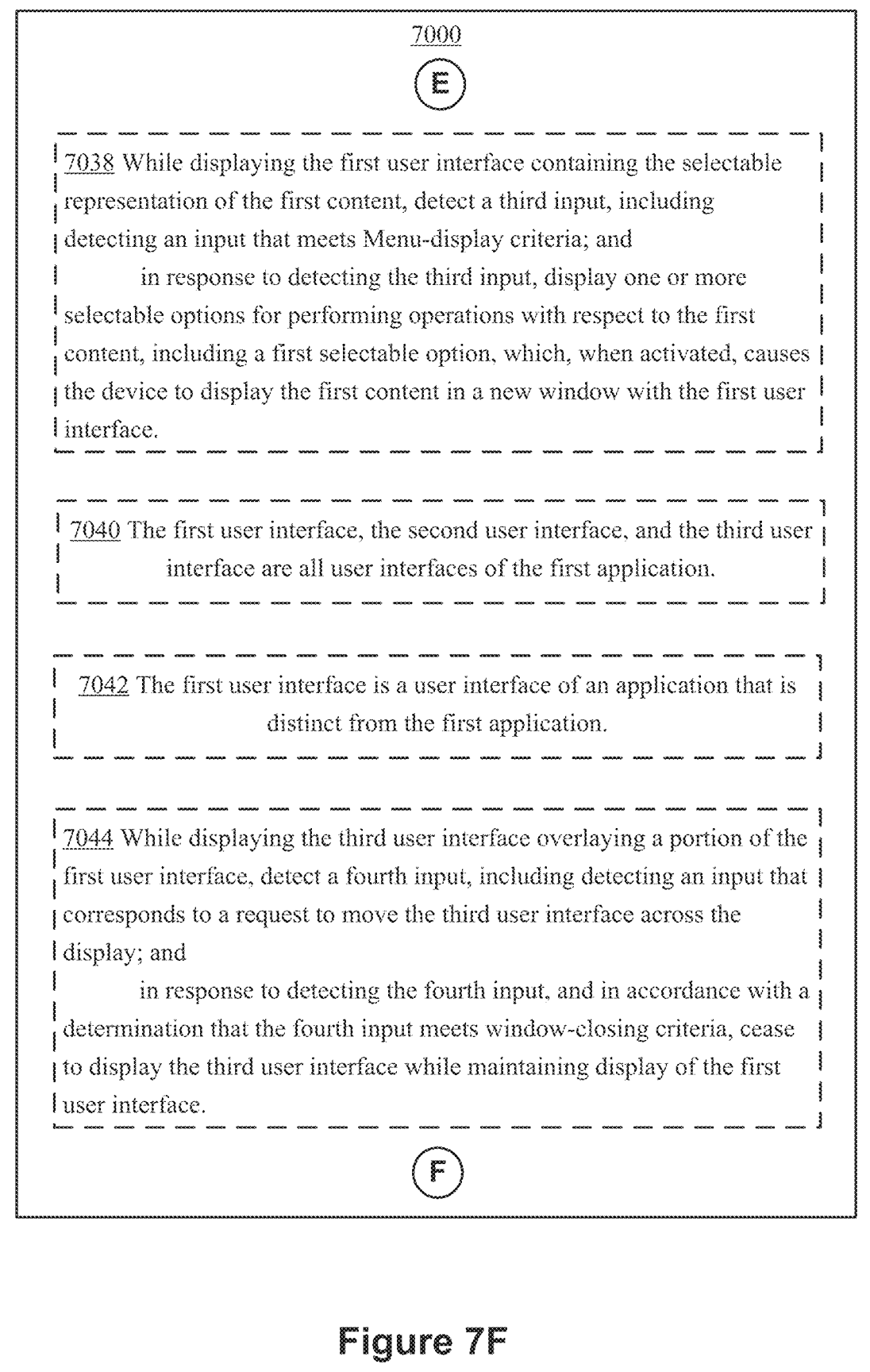

7038 While displaying the first user interface containing the selectable representation of the first content, detect a third input, including detecting an input that meets Menu-display criteria; and in response to detecting the third input, display one or more selectable options for performing operations with respect to the first content, including a first selectable option, which, when activated, causes the device to display the first content in a new window with the first user interface.

7040 The first user interface, the second user interface, and the third user interface are all user interfaces of the first application.

7042 The first user interface is a user interface of an application that is distinct from the first application.

7044 While displaying the third user interface overlaying a portion of the first user interface, detect a fourth input, including detecting an input that corresponds to a request to move the third user interface across the display; and in response to detecting the fourth input, and in accordance with a determination that the fourth input meets window-closing criteria, cease to display the third user interface while maintaining display of the first user interface.

Figure 7G:
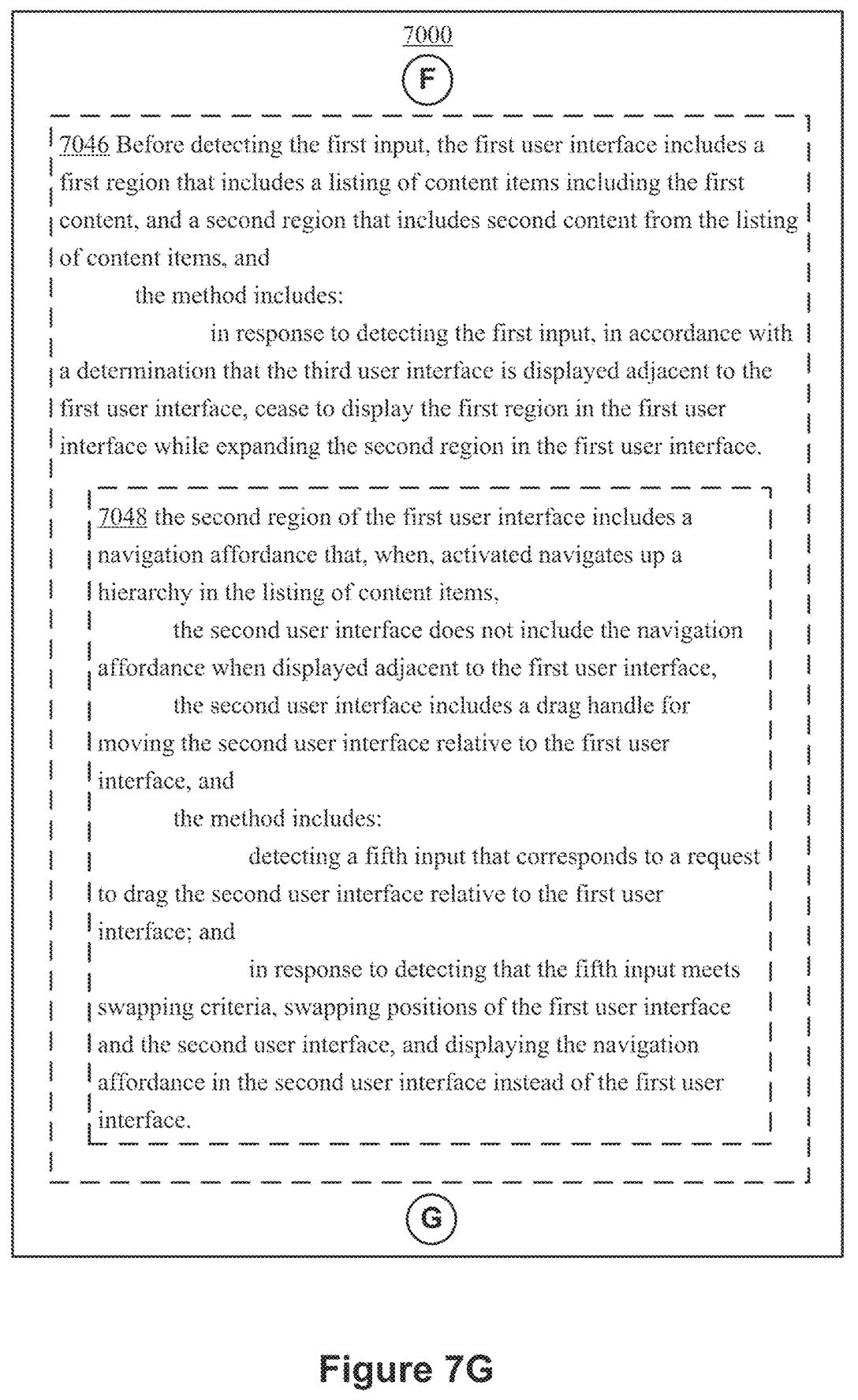

7046 Before detecting the first input, the first user interface includes a first region that includes a listing of content items including the first content, and a second region that includes second content from the listing of content items, and the method includes:

in response to detecting the first input, in accordance with a determination that the third user interface is displayed adjacent to the first user interface, cease to display the first region in the first user interface while expanding the second region in the first user interface.

7048 the second region of the first user interface includes a navigation affordance that, when, activated navigates up a hierarchy in the listing of content items, the second user interface does not include the navigation affordance when displayed adjacent to the first user interface, the second user interface includes a drag handle for moving the second user interface relative to the first user interface, and the method includes:

detecting a fifth input that corresponds to a request to drag the second user interface relative to the first user interface; and in response to detecting that the fifth input meets swapping criteria, swapping positions of the first user interface and the second user interface, and displaying the navigation affordance in the second user interface instead of the first user interface.

Figure 7H:
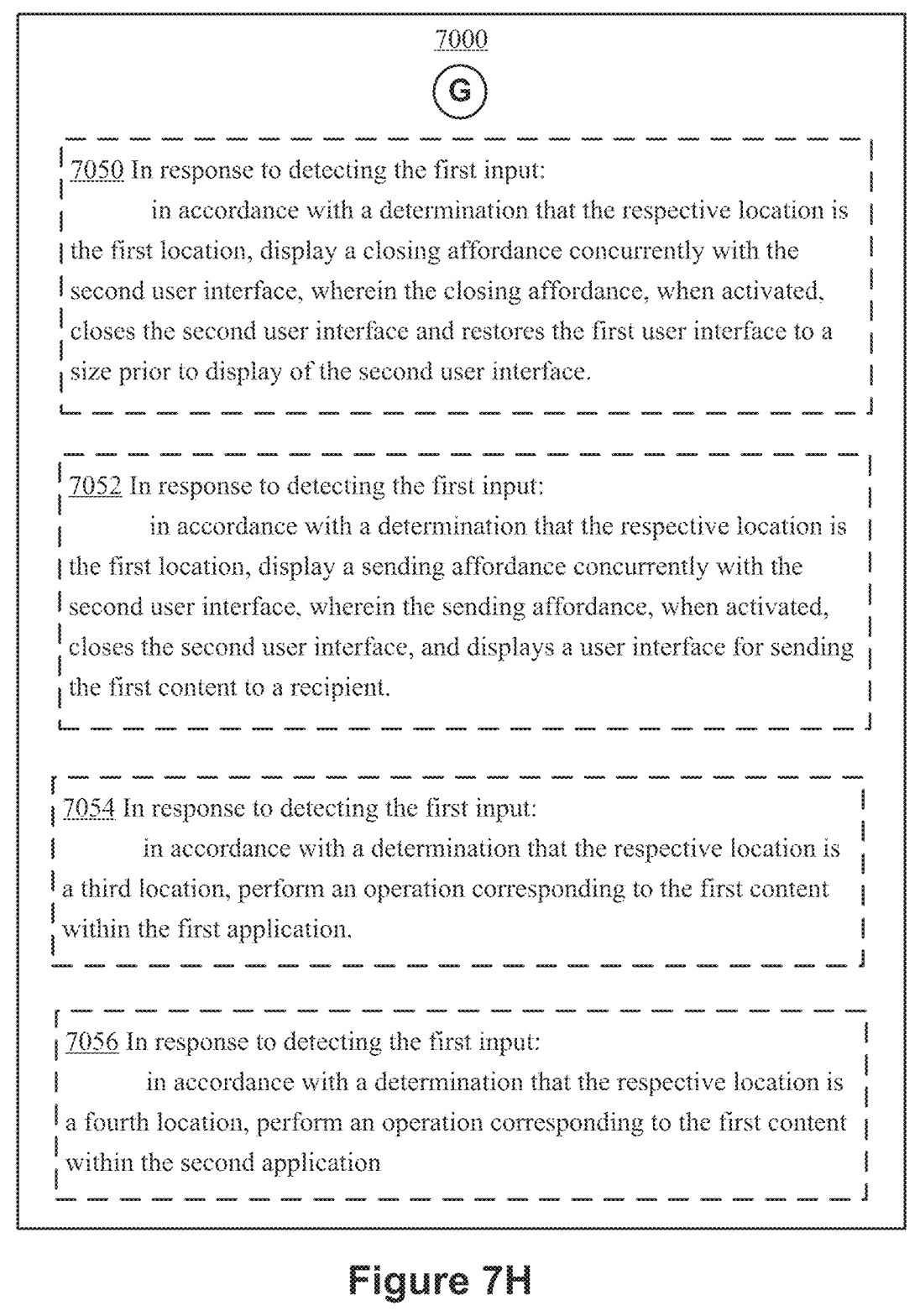

7050 In response to detecting the first input:

in accordance with a determination that the respective location is the first location, display a closing affordance concurrently with the second user interface, wherein the closing affordance, when activated, closes the second user interface and restores the first user interface to a size prior to display of the second user interface.

7052 In response to detecting the first input:

in accordance with a determination that the respective location is the first location, display a sending affordance concurrently with the second user interface, wherein the sending affordance, when activated, closes the second user interface, and displays a user interface for sending the first content to a recipient.

7054 In response to detecting the first input:

in accordance with a determination that the respective location is a third location, perform an operation corresponding to the first content within the first application.

7056 In response to detecting the first input:

in accordance with a determination that the respective location is a fourth location, perform an operation corresponding to the first content within the second application

Figure 7I:
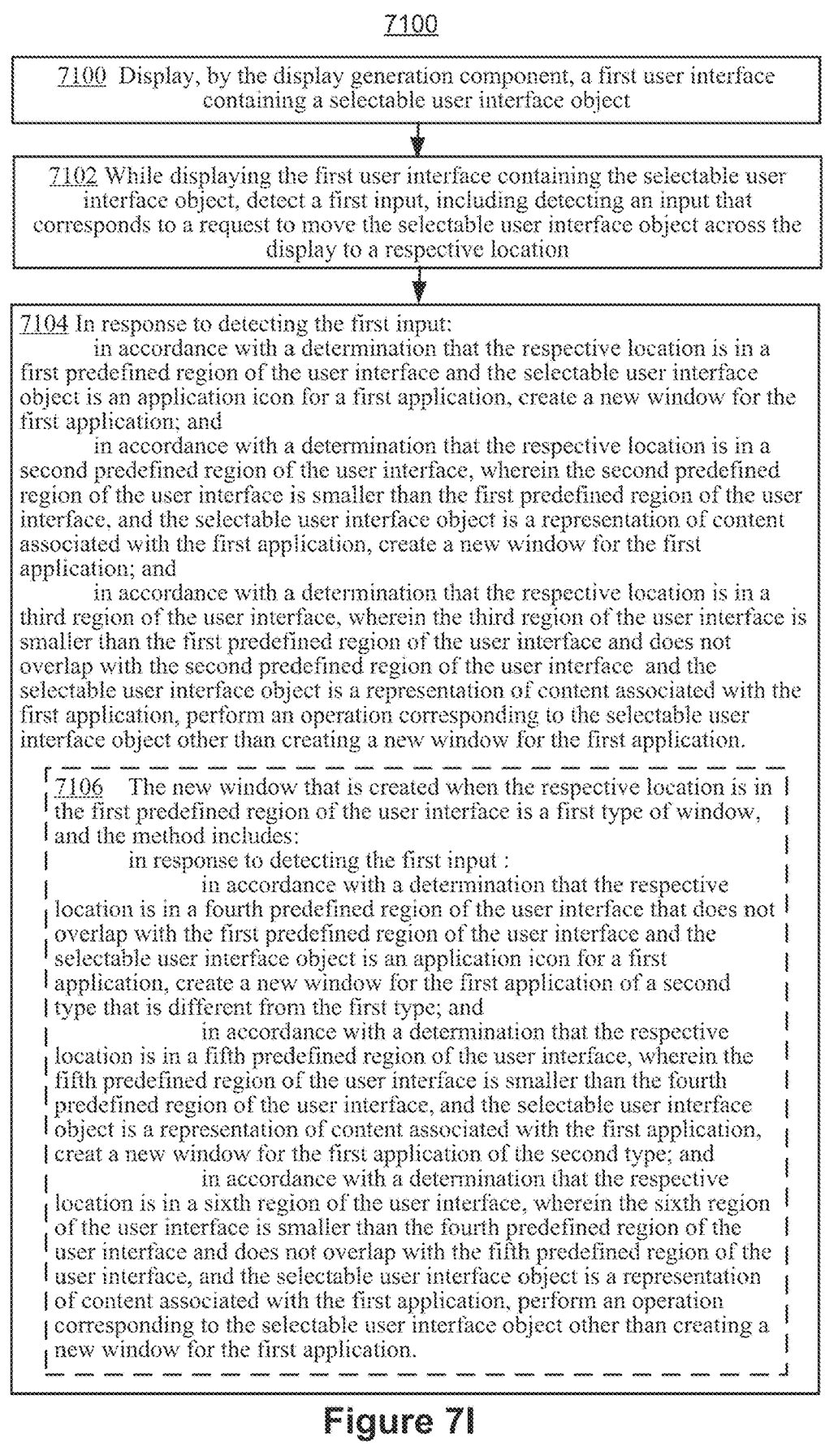

7100 Display, by the display generation component, a first user interface containing a selectable user interface object

↓

7102 While displaying the first user interface containing the selectable user interface object, detect a first input, including detecting an input that corresponds to a request to move the selectable user interface object across the display to a respective location

↓

7104 In response to detecting the first input:

in accordance with a determination that the respective location is in a first predefined region of the user interface and the selectable user interface object is an application icon for a first application, create a new window for the first application; and in accordance with a determination that the respective location is in a second predefined region of the user interface, wherein the second predefined region of the user interface is smaller than the first predefined region of the user interface, and the selectable user interface object is a representation of content associated with the first application, create a new window for the first application; and in accordance with a determination that the respective location is in a third region of the user interface, wherein the third region of the user interface is smaller than the first predefined region of the user interface and does not overlap with the second predefined region of the user interface and the selectable user interface object is a representation of content associated with the first application, perform an operation corresponding to the selectable user interface object other than creating a new window for the first application.

7106 The new window that is created when the respective location is in the first predefined region of the user interface is a first type of window, and the method includes:

in response to detecting the first input :

in accordance with a determination that the respective location is in a fourth predefined region of the user interface that does not overlap with the first predefined region of the user interface and the selectable user interface object is an application icon for a first application, create a new window for the first application of a second type that is different from the first type; and in accordance with a determination that the respective location is in a fifth predefined region of the user interface, wherein the fifth predefined region of the user interface is smaller than the fourth predefined region of the user interface, and the selectable user interface object is a representation of content associated with the first application, creat a new window for the first application of the second type; and in accordance with a determination that the respective location is in a sixth region of the user interface, wherein the sixth region of the user interface is smaller than the fourth predefined region of the user interface and does not overlap with the fifth predefined region of the user interface, and the selectable user interface object is a representation of content associated with the first application, perform an operation corresponding to the selectable user interface object other than creating a new window for the first application.

Figure 8A:
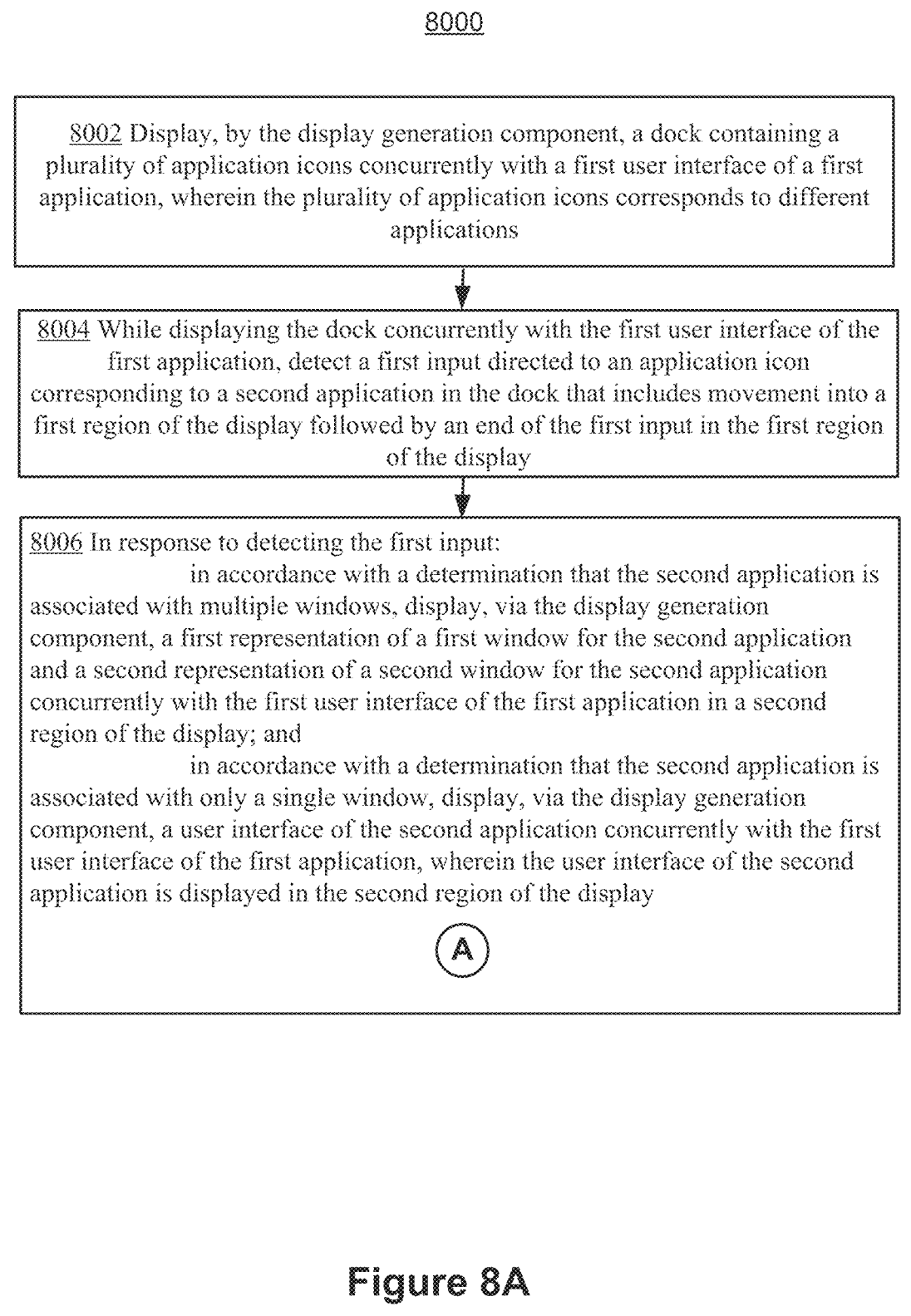

8002 Display, by the display generation component, a dock containing a plurality of application icons concurrently with a first user interface of a first application, wherein the plurality of application icons corresponds to different applications

↓

8004 While displaying the dock concurrently with the first user interface of the first application, detect a first input directed to an application icon corresponding to a second application in the dock that includes movement into a first region of the display followed by an end of the first input in the first region of the display

↓

8006 In response to detecting the first input:

in accordance with a determination that the second application is associated with multiple windows, display, via the display generation component, a first representation of a first window for the second application and a second representation of a second window for the second application concurrently with the first user interface of the first application in a second region of the display; and in accordance with a determination that the second application is associated with only a single window, display, via the display generation component, a user interface of the second application concurrently with the first user interface of the first application, wherein the user interface of the second application is displayed in the second region of the display

Figure 8B:
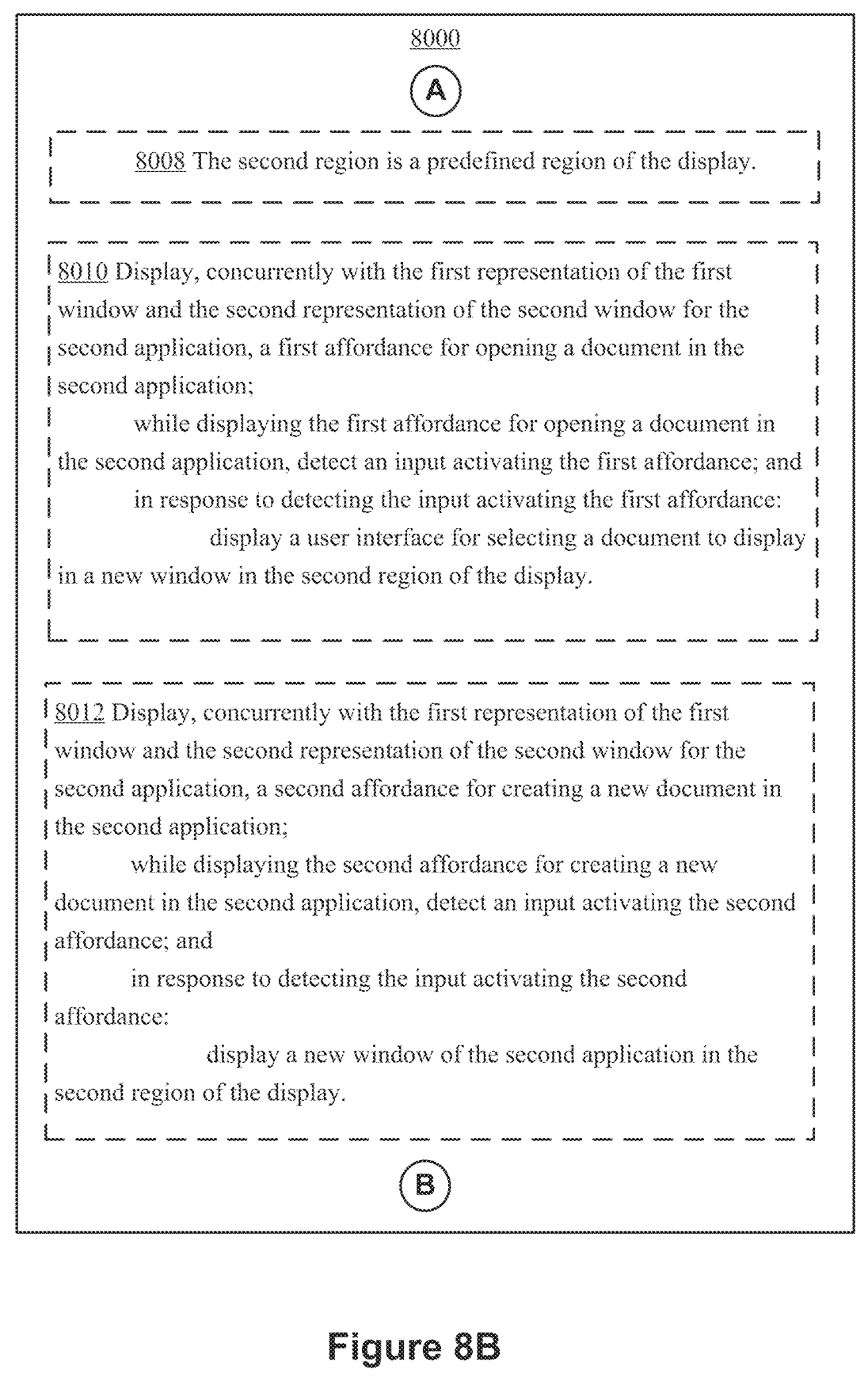

8008 The second region is a predefined region of the display.

8010 Display, concurrently with the first representation of the first window and the second representation of the second window for the second application, a first affordance for opening a document in the second application;

while displaying the first affordance for opening a document in the second application, detect an input activating the first affordance; and in response to detecting the input activating the first affordance:

display a user interface for selecting a document to display in a new window in the second region of the display.

8012 Display, concurrently with the first representation of the first window and the second representation of the second window for the second application, a second affordance for creating a new document in the second application;

while displaying the second affordance for creating a new document in the second application, detect an input activating the second affordance; and in response to detecting the input activating the second affordance:

display a new window of the second application in the second region of the display.

Figure 8C:
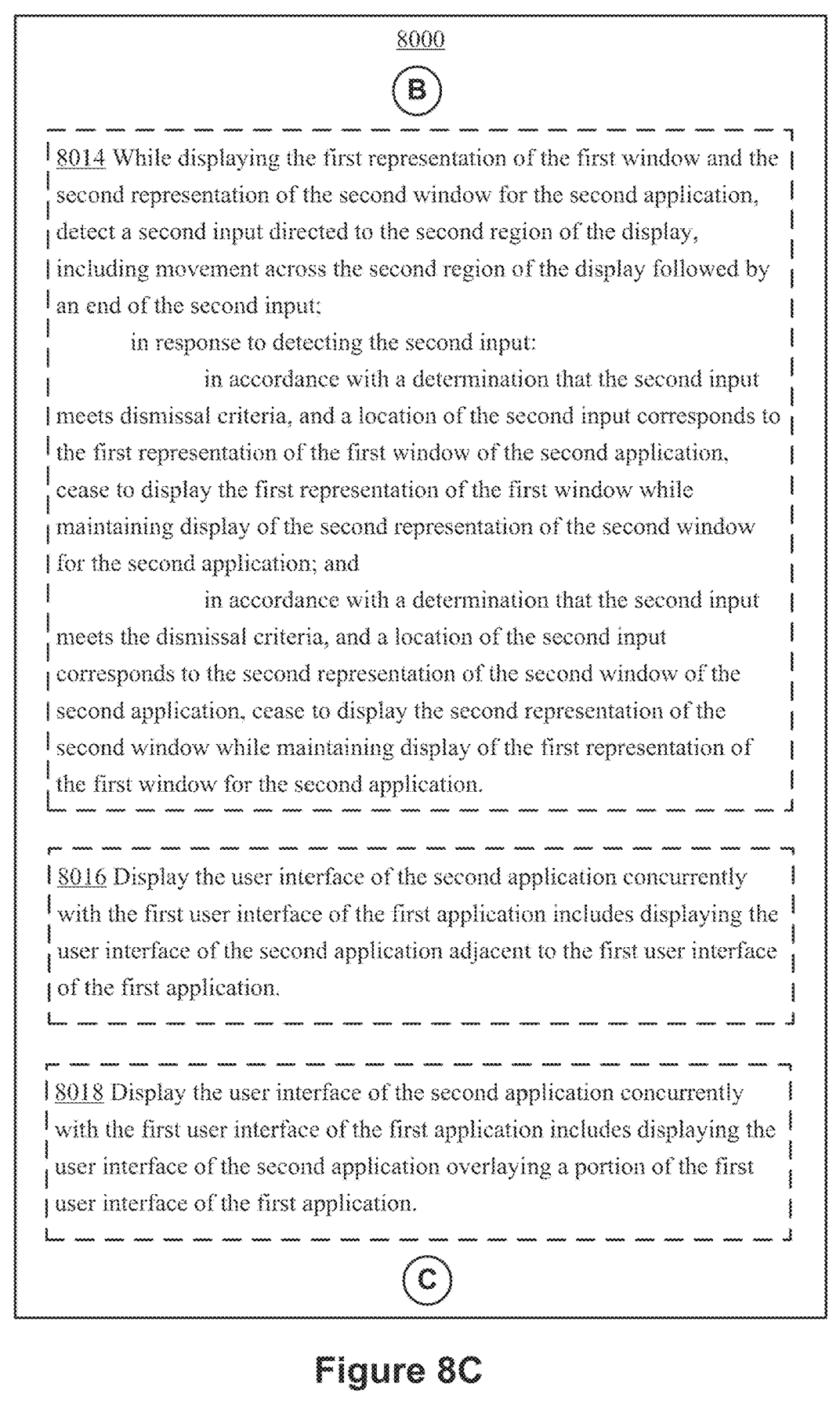

8014 While displaying the first representation of the first window and the second representation of the second window for the second application, detect a second input directed to the second region of the display, including movement across the second region of the display followed by an end of the second input;

in response to detecting the second input:

in accordance with a determination that the second input meets dismissal criteria, and a location of the second input corresponds to the first representation of the first window of the second application, cease to display the first representation of the first window while maintaining display of the second representation of the second window for the second application; and in accordance with a determination that the second input meets the dismissal criteria, and a location of the second input corresponds to the second representation of the second window of the second application, cease to display the second representation of the second window while maintaining display of the first representation of the first window for the second application.

8016 Display the user interface of the second application concurrently with the first user interface of the first application includes displaying the user interface of the second application adjacent to the first user interface of the first application.

8018 Display the user interface of the second application concurrently with the first user interface of the first application includes displaying the user interface of the second application overlaying a portion of the first user interface of the first application.

Figure 8D:
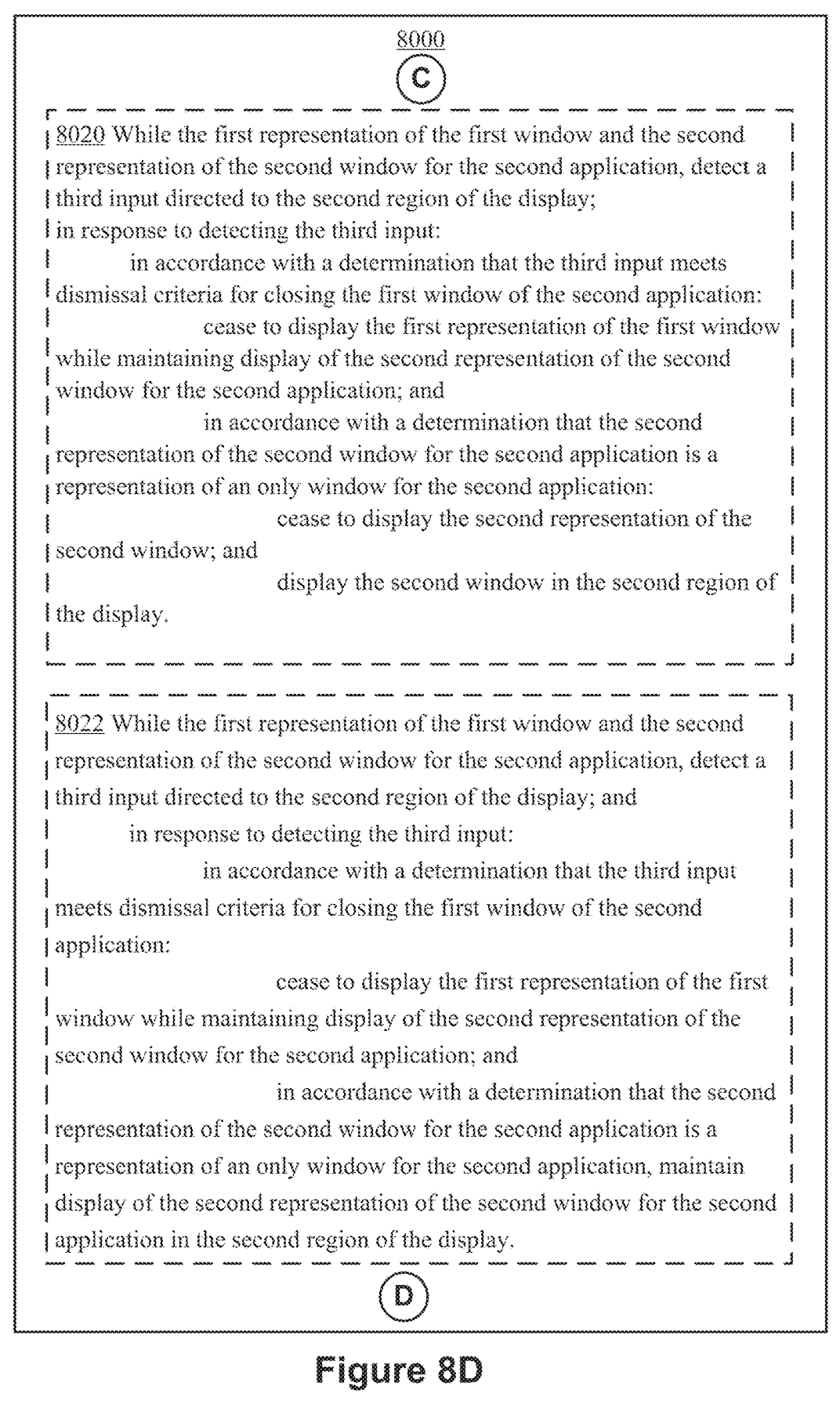

8020 While the first representation of the first window and the second representation of the second window for the second application, detect a third input directed to the second region of the display;
in response to detecting the third input:
in accordance with a determination that the third input meets dismissal criteria for closing the first window of the second application:
cease to display the first representation of the first window while maintaining display of the second representation of the second window for the second application; and
in accordance with a determination that the second representation of the second window for the second application is a representation of an only window for the second application:
cease to display the second representation of the second window; and
display the second window in the second region of the display.

8022 While the first representation of the first window and the second representation of the second window for the second application, detect a third input directed to the second region of the display; and
in response to detecting the third input:
in accordance with a determination that the third input meets dismissal criteria for closing the first window of the second application:
cease to display the first representation of the first window while maintaining display of the second representation of the second window for the second application; and
in accordance with a determination that the second representation of the second window for the second application is a representation of an only window for the second application, maintain display of the second representation of the second window for the second application in the second region of the display.

Figure 8E:
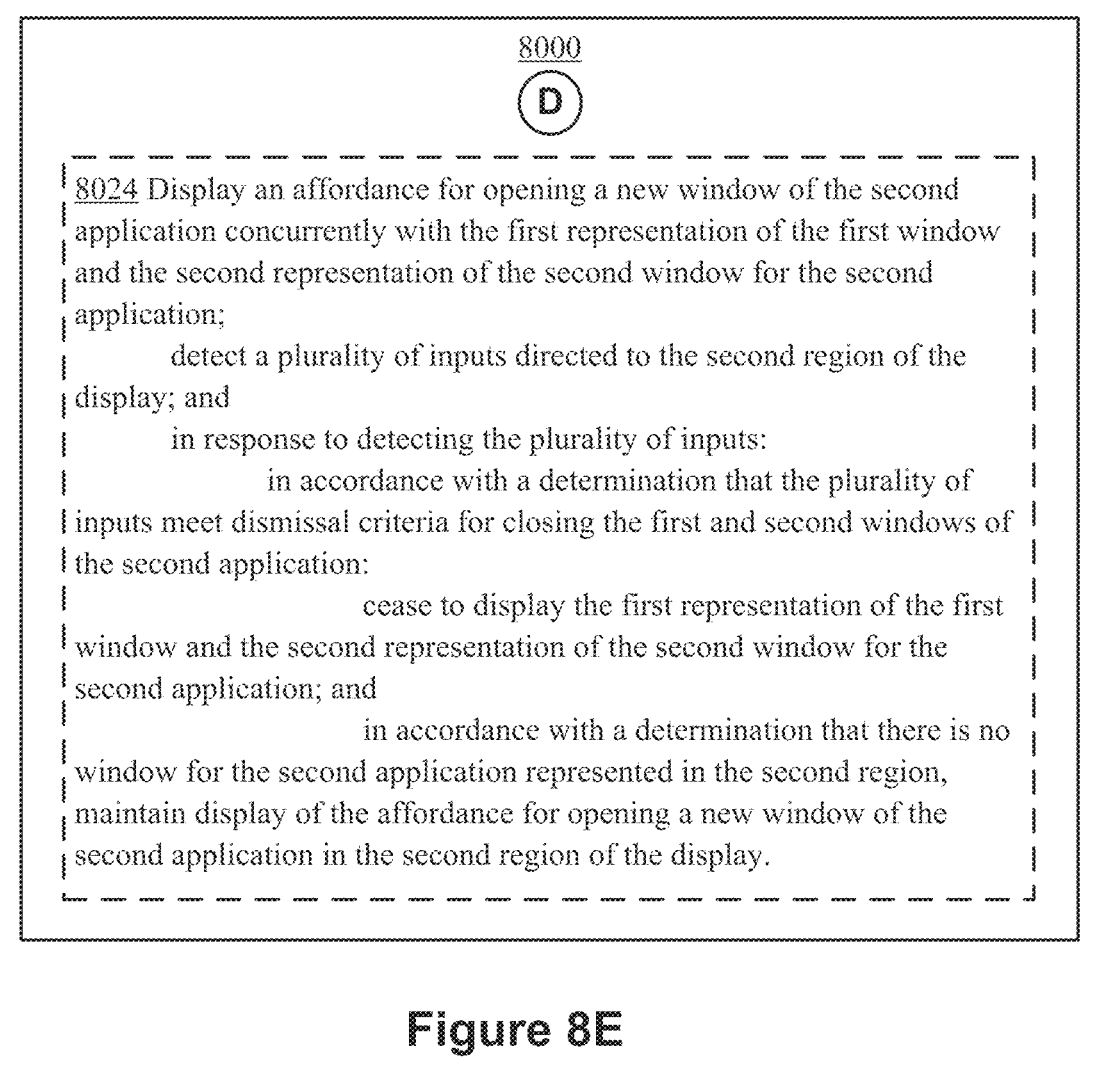

8024 Display an affordance for opening a new window of the second application concurrently with the first representation of the first window and the second representation of the second window for the second application;

detect a plurality of inputs directed to the second region of the display; and in response to detecting the plurality of inputs:

in accordance with a determination that the plurality of inputs meet dismissal criteria for closing the first and second windows of the second application:

cease to display the first representation of the first window and the second representation of the second window for the second application; and in accordance with a determination that there is no window for the second application represented in the second region, maintain display of the affordance for opening a new window of the second application in the second region of the display.

Figure 9A:
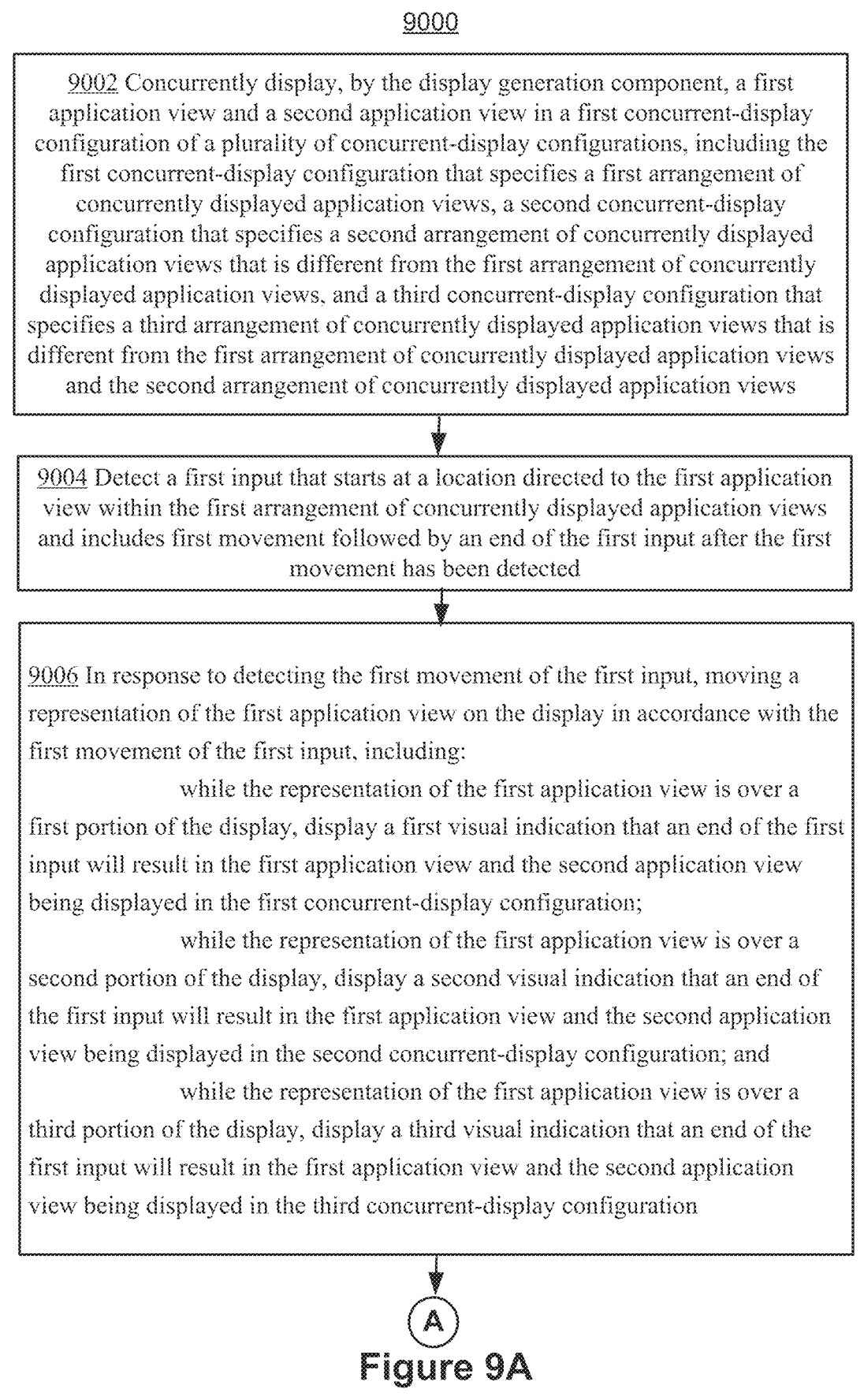

9002 Concurrently display, by the display generation component, a first application view and a second application view in a first concurrent-display configuration of a plurality of concurrent-display configurations, including the first concurrent-display configuration that specifies a first arrangement of concurrently displayed application views, a second concurrent-display configuration that specifies a second arrangement of concurrently displayed application views that is different from the first arrangement of concurrently displayed application views, and a third concurrent-display configuration that specifies a third arrangement of concurrently displayed application views that is different from the first arrangement of concurrently displayed application views and the second arrangement of concurrently displayed application views 9004 Detect a first input that starts at a location directed to the first application view within the first arrangement of concurrently displayed application views and includes first movement followed by an end of the first input after the first movement has been detected 9006 In response to detecting the first movement of the first input, moving a representation of the first application view on the display in accordance with the first movement of the first input, including:

while the representation of the first application view is over a first portion of the display, display a first visual indication that an end of the first input will result in the first application view and the second application view being displayed in the first concurrent-display configuration;

while the representation of the first application view is over a second portion of the display, display a second visual indication that an end of the first input will result in the first application view and the second application view being displayed in the second concurrent-display configuration; and while the representation of the first application view is over a third portion of the display, display a third visual indication that an end of the first input will result in the first application view and the second application view being displayed in the third concurrent-display configuration

Figure 9B:
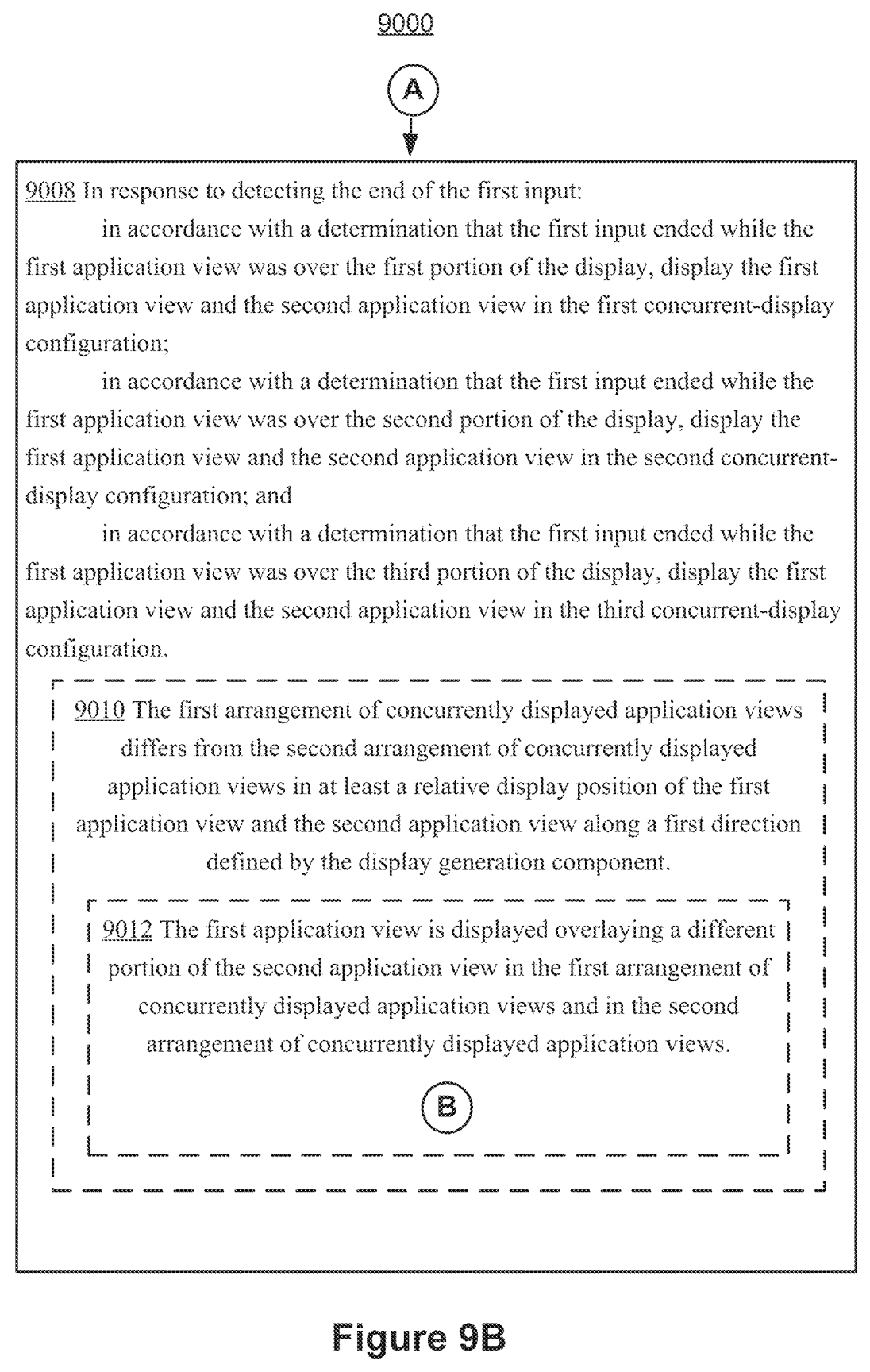

9008 In response to detecting the end of the first input:

in accordance with a determination that the first input ended while the first application view was over the first portion of the display, display the first application view and the second application view in the first concurrent-display configuration;

in accordance with a determination that the first input ended while the first application view was over the second portion of the display, display the first application view and the second application view in the second concurrent-display configuration; and in accordance with a determination that the first input ended while the first application view was over the third portion of the display, display the first application view and the second application view in the third concurrent-display configuration.

9010 The first arrangement of concurrently displayed application views differs from the second arrangement of concurrently displayed application views in at least a relative display position of the first application view and the second application view along a first direction defined by the display generation component.

9012 The first application view is displayed overlaying a different portion of the second application view in the first arrangement of concurrently displayed application views and in the second arrangement of concurrently displayed application views.

Figure 9C:
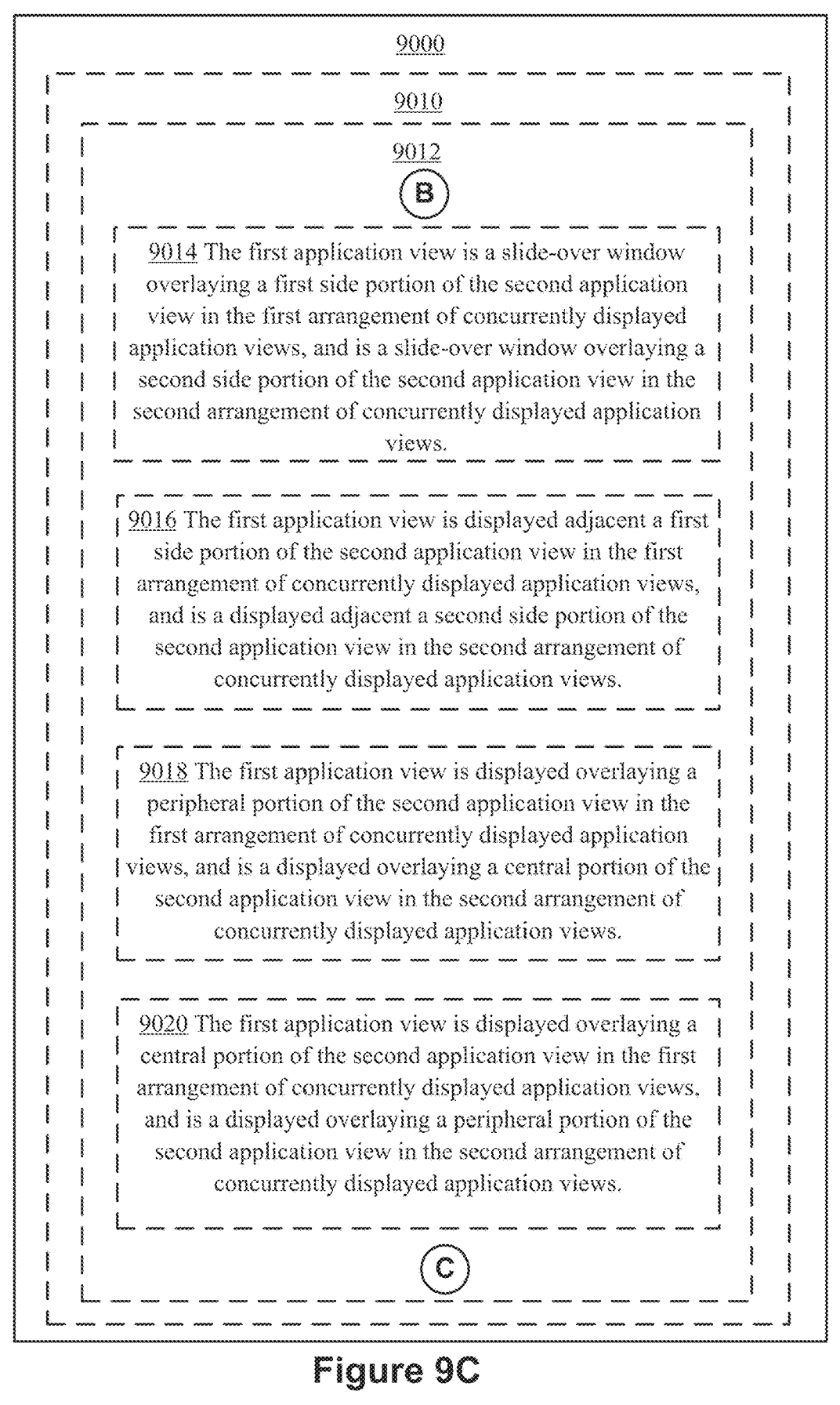

9014 The first application view is a slide-over window overlaying a first side portion of the second application view in the first arrangement of concurrently displayed application views, and is a slide-over window overlaying a second side portion of the second application view in the second arrangement of concurrently displayed application views.

9016 The first application view is displayed adjacent a first side portion of the second application view in the first arrangement of concurrently displayed application views, and is a displayed adjacent a second side portion of the second application view in the second arrangement of concurrently displayed application views.

9018 The first application view is displayed overlaying a peripheral portion of the second application view in the first arrangement of concurrently displayed application views, and is a displayed overlaying a central portion of the second application view in the second arrangement of concurrently displayed application views.

9020 The first application view is displayed overlaying a central portion of the second application view in the first arrangement of concurrently displayed application views, and is a displayed overlaying a peripheral portion of the second application view in the second arrangement of concurrently displayed application views.

Figure 9E:
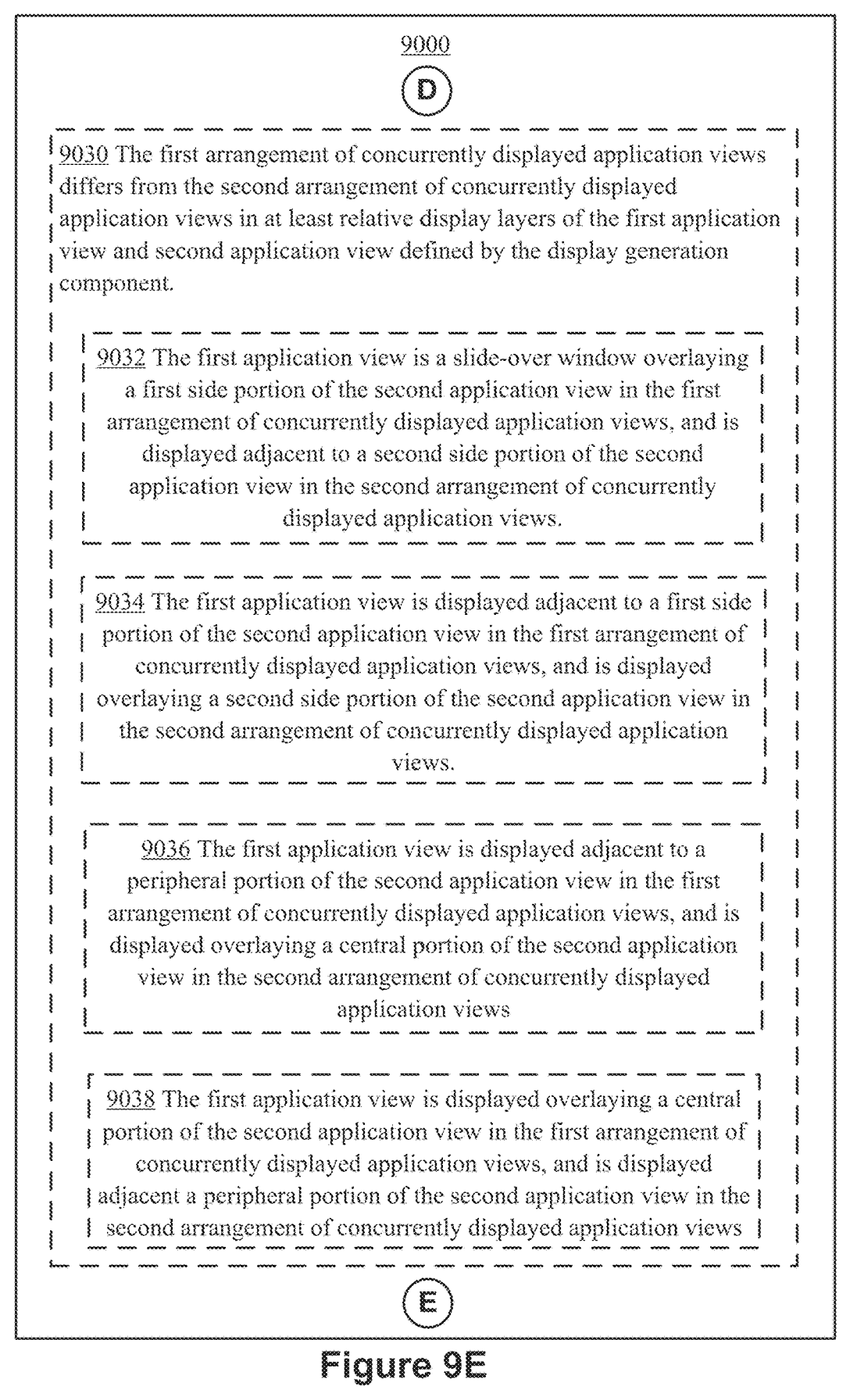

9030 The first arrangement of concurrently displayed application views differs from the second arrangement of concurrently displayed application views in at least relative display layers of the first application view and second application view defined by the display generation component.

9032 The first application view is a slide-over window overlaying a first side portion of the second application view in the first arrangement of concurrently displayed application views, and is displayed adjacent to a second side portion of the second application view in the second arrangement of concurrently displayed application views.

9034 The first application view is displayed adjacent to a first side portion of the second application view in the first arrangement of concurrently displayed application views, and is displayed overlaying a second side portion of the second application view in the second arrangement of concurrently displayed application views.

9036 The first application view is displayed adjacent to a peripheral portion of the second application view in the first arrangement of concurrently displayed application views, and is displayed overlaying a central portion of the second application view in the second arrangement of concurrently displayed application views 9038 The first application view is displayed overlaying a central portion of the second application view in the first arrangement of concurrently displayed application views, and is displayed adjacent a peripheral portion of the second application view in the second arrangement of concurrently displayed application views

Figure 9F:
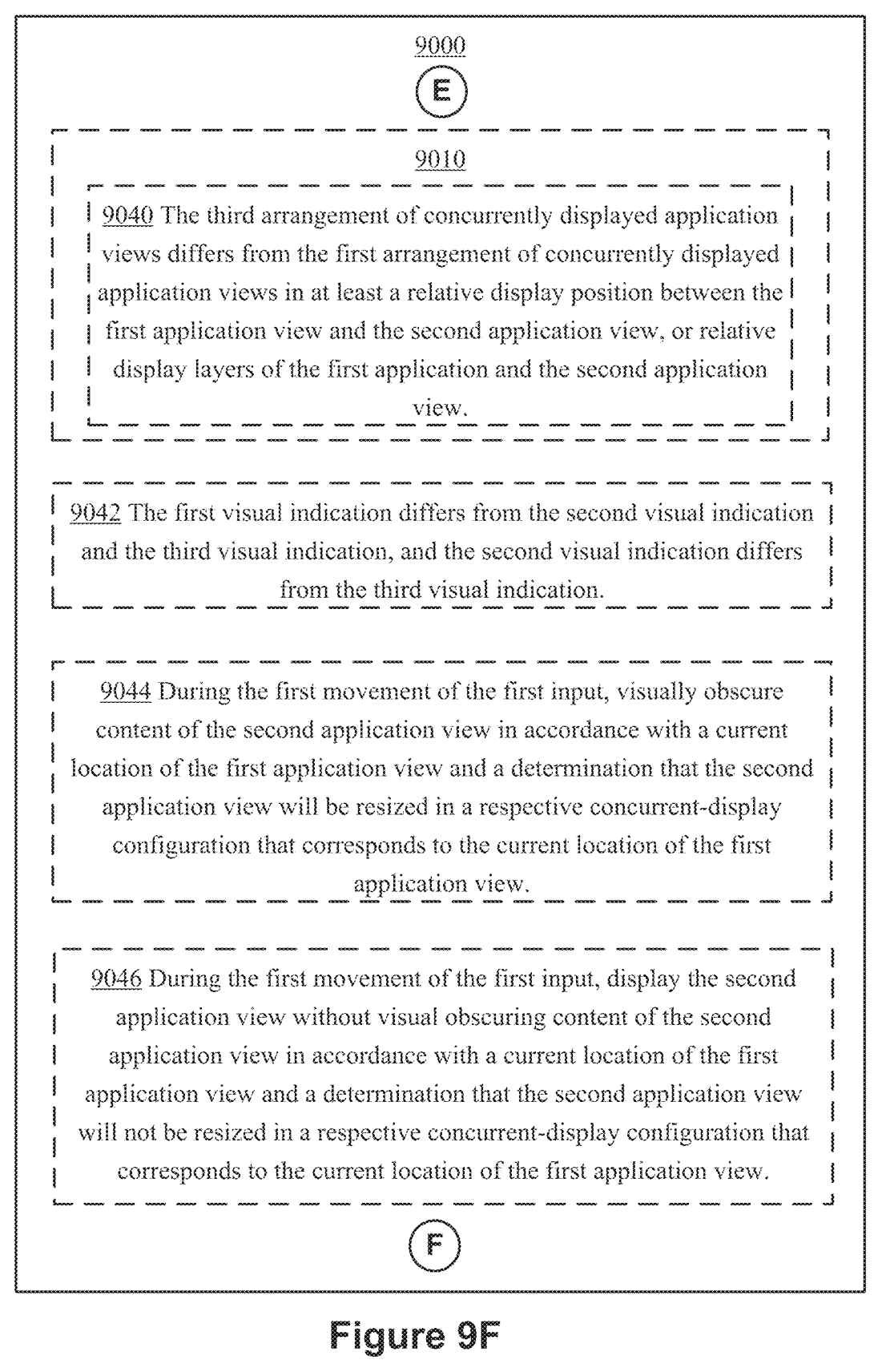

9040 The third arrangement of concurrently displayed application views differs from the first arrangement of concurrently displayed application views in at least a relative display position between the first application view and the second application view, or relative display layers of the first application and the second application view.

9042 The first visual indication differs from the second visual indication and the third visual indication, and the second visual indication differs from the third visual indication.

9044 During the first movement of the first input, visually obscure content of the second application view in accordance with a current location of the first application view and a determination that the second application view will be resized in a respective concurrent-display configuration that corresponds to the current location of the first application view.

9046 During the first movement of the first input, display the second application view without visual obscuring content of the second application view in accordance with a current location of the first application view and a determination that the second application view will not be resized in a respective concurrent-display configuration that corresponds to the current location of the first application view.

Figure 9G:
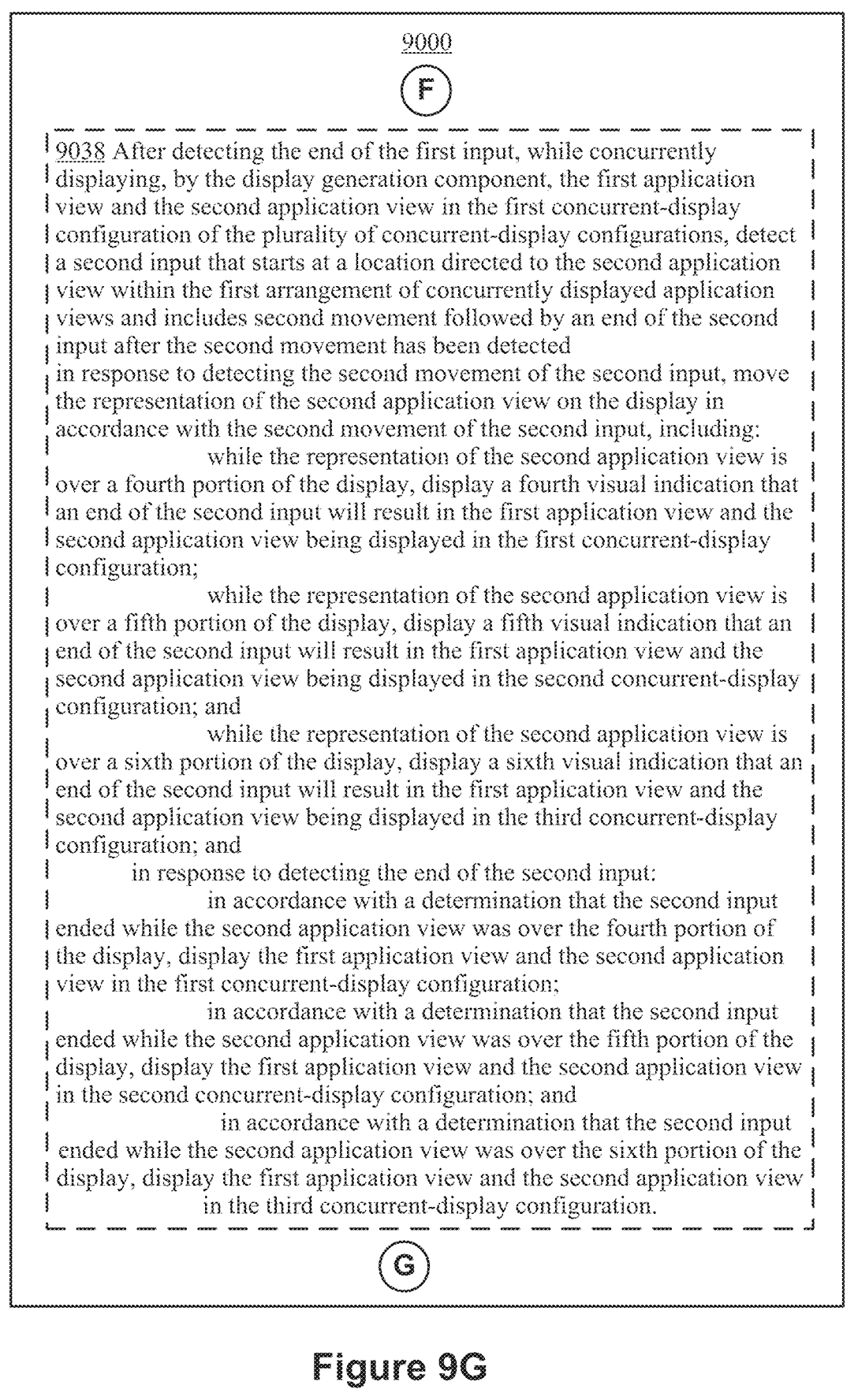

9038 After detecting the end of the first input, while concurrently displaying, by the display generation component, the first application view and the second application view in the first concurrent-display configuration of the plurality of concurrent-display configurations, detect a second input that starts at a location directed to the second application view within the first arrangement of concurrently displayed application views and includes second movement followed by an end of the second input after the second movement has been detected in response to detecting the second movement of the second input, move the representation of the second application view on the display in accordance with the second movement of the second input, including:

while the representation of the second application view is over a fourth portion of the display, display a fourth visual indication that an end of the second input will result in the first application view and the second application view being displayed in the first concurrent-display configuration;

while the representation of the second application view is over a fifth portion of the display, display a fifth visual indication that an end of the second input will result in the first application view and the second application view being displayed in the second concurrent-display configuration; and while the representation of the second application view is over a sixth portion of the display, display a sixth visual indication that an end of the second input will result in the first application view and the second application view being displayed in the third concurrent-display configuration; and in response to detecting the end of the second input:

in accordance with a determination that the second input ended while the second application view was over the fourth portion of the display, display the first application view and the second application view in the first concurrent-display configuration;

in accordance with a determination that the second input ended while the second application view was over the fifth portion of the display, display the first application view and the second application view in the second concurrent-display configuration; and in accordance with a determination that the second input ended while the second application view was over the sixth portion of the display, display the first application view and the second application view in the third concurrent-display configuration.

Figure 9H:
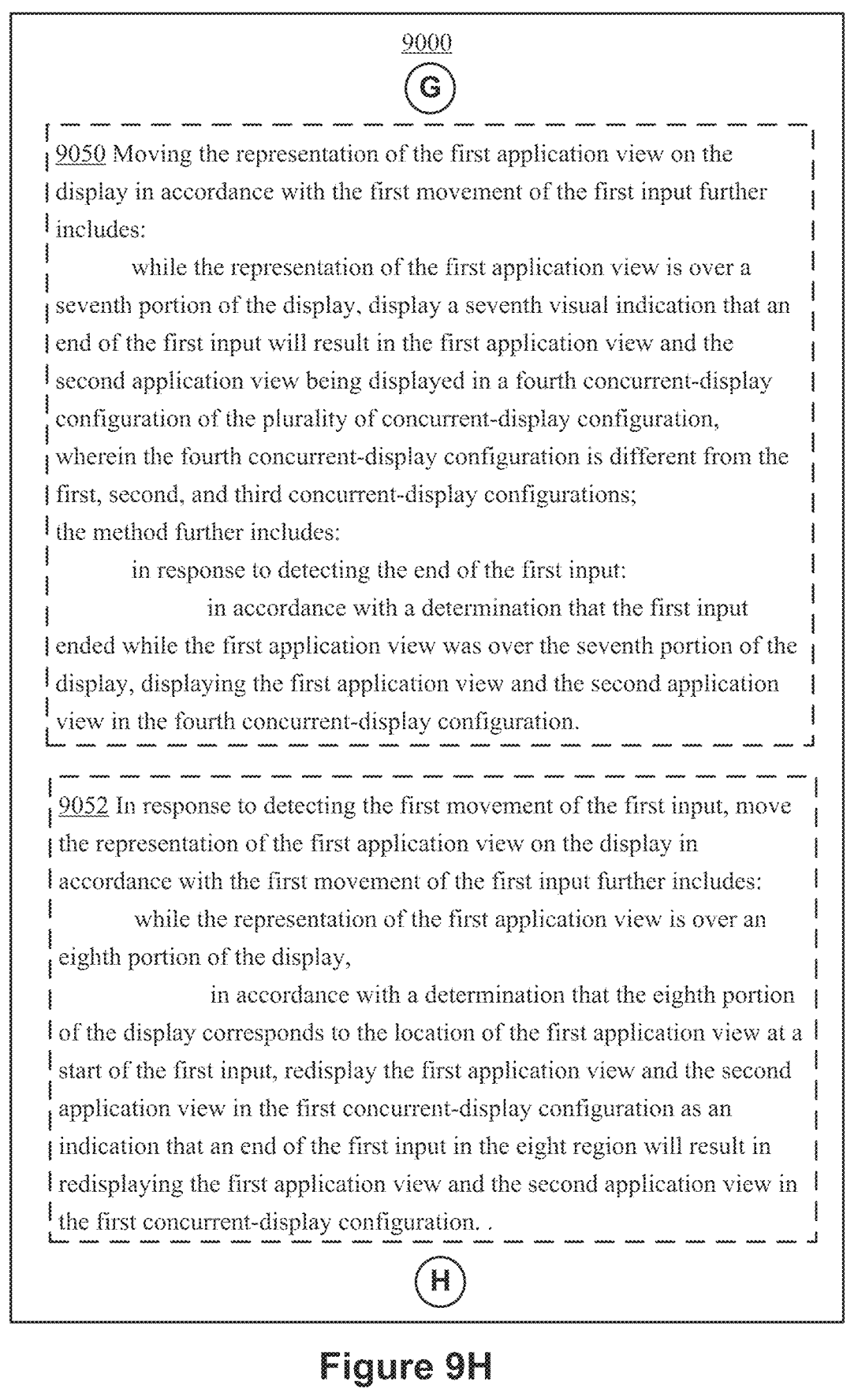

9050 Moving the representation of the first application view on the display in accordance with the first movement of the first input further includes:

while the representation of the first application view is over a seventh portion of the display, display a seventh visual indication that an end of the first input will result in the first application view and the second application view being displayed in a fourth concurrent-display configuration of the plurality of concurrent-display configuration, wherein the fourth concurrent-display configuration is different from the first, second, and third concurrent-display configurations;

the method further includes:

in response to detecting the end of the first input:

in accordance with a determination that the first input ended while the first application view was over the seventh portion of the display, displaying the first application view and the second application view in the fourth concurrent-display configuration.

9052 In response to detecting the first movement of the first input, move the representation of the first application view on the display in accordance with the first movement of the first input further includes:

while the representation of the first application view is over an eighth portion of the display, in accordance with a determination that the eighth portion of the display corresponds to the location of the first application view at a start of the first input, redisplay the first application view and the second application view in the first concurrent-display configuration as an indication that an end of the first input in the eight region will result in redisplaying the first application view and the second application view in the first concurrent-display configuration. .

Figure 9I:
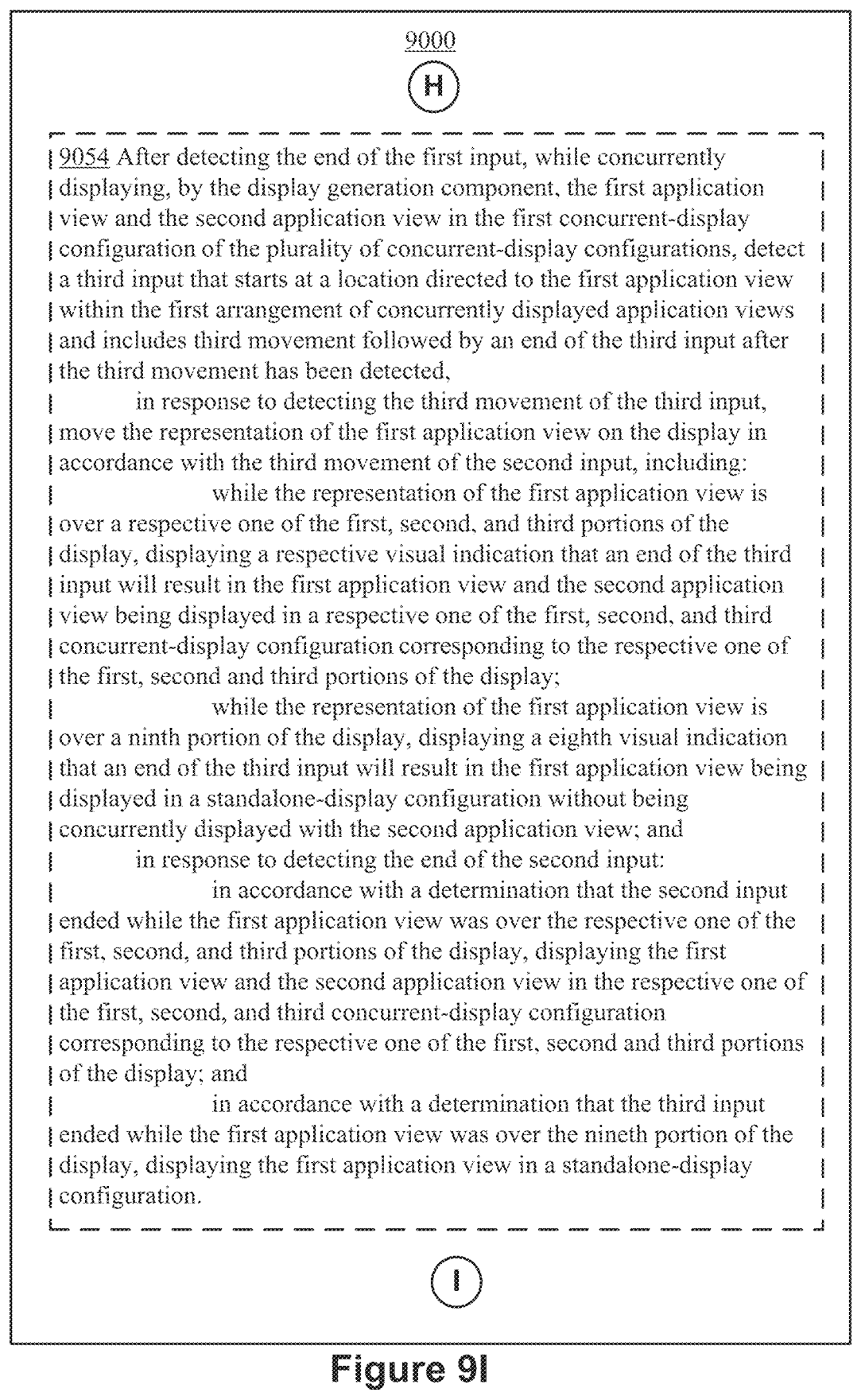

9054 After detecting the end of the first input, while concurrently displaying, by the display generation component, the first application view and the second application view in the first concurrent-display configuration of the plurality of concurrent-display configurations, detect a third input that starts at a location directed to the first application view within the first arrangement of concurrently displayed application views and includes third movement followed by an end of the third input after the third movement has been detected, in response to detecting the third movement of the third input, move the representation of the first application view on the display in accordance with the third movement of the second input, including:

while the representation of the first application view is over a respective one of the first, second, and third portions of the display, displaying a respective visual indication that an end of the third input will result in the first application view and the second application view being displayed in a respective one of the first, second, and third concurrent-display configuration corresponding to the respective one of the first, second and third portions of the display;

while the representation of the first application view is over a ninth portion of the display, displaying a eighth visual indication that an end of the third input will result in the first application view being displayed in a standalone-display configuration without being concurrently displayed with the second application view; and in response to detecting the end of the second input:

in accordance with a determination that the second input ended while the first application view was over the respective one of the first, second, and third portions of the display, displaying the first application view and the second application view in the respective one of the first, second, and third concurrent-display configuration corresponding to the respective one of the first, second and third portions of the display; and in accordance with a determination that the third input ended while the first application view was over the nineth portion of the display, displaying the first application view in a standalone-display configuration.

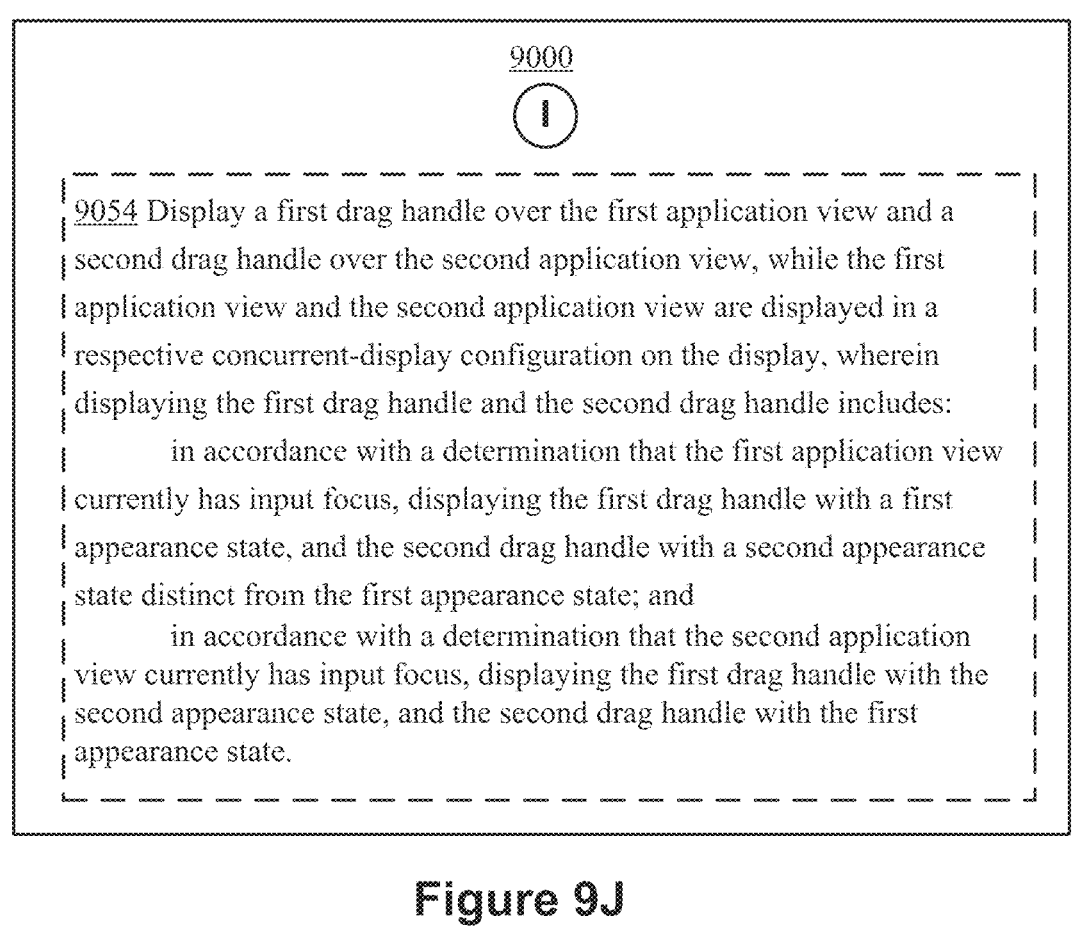

9054 Display a first drag handle over the first application view and a second drag handle over the second application view, while the first application view and the second application view are displayed in a respective concurrent-display configuration on the display, wherein displaying the first drag handle and the second drag handle includes:

in accordance with a determination that the first application view currently has input focus, displaying the first drag handle with a first appearance state, and the second drag handle with a second appearance state distinct from the first appearance state; and in accordance with a determination that the second application view currently has input focus, displaying the first drag handle with the second appearance state, and the second drag handle with the first appearance state.

Figure 9J

SYSTEMS, METHODS, AND USER INTERFACES FOR INTERACTING WITH MULTIPLE APPLICATION WINDOWS

RELATED APPLICATIONS

This application claims priority to U.S. Provisional Application Ser. No. 62/844,102, filed May 6, 2019 and U.S. Provisional Application Ser. No. 62/834,367, filed Apr. 15, 2019, which are incorporated by reference herein in their entirety.

TECHNICAL FIELD

The embodiments herein generally relate to electronic devices, more specifically, to systems and methods for multitasking on an electronic device with a display generation component and an input device (e.g., a portable multifunction device with a touch-sensitive display).

BACKGROUND

Handheld electronic devices with touch-sensitive displays are ubiquitous. While these devices were originally designed for information consumption (e.g., web-browsing) and communication (e.g., email), they are rapidly replacing desktop and laptop computers as users' primary computing devices. When using desktop or laptop computers, these users are able to routinely multitask by accessing and using different running applications (e.g., cutting-and-pasting text from a document into an email). While there has been tremendous growth in the scope of new features and applications for handheld electronic devices, the ability to multitask and swap between applications on handheld electronic devices requires entirely different input mechanisms than those of desktop or laptop computers.

Moreover, the need for multitasking is particularly acute on handheld electronic devices, as they have smaller screens than traditional desktop and laptop computers. Some conventional handheld electronic devices attempt to address this need by recreating the desktop computer interface on the handheld electronic device. These attempted solutions, however, fail to take into account: (i) the significant differences in screen size between desktop computers and handled electronic devices, and (ii) the significant differences between keyboard and mouse interaction of desktop computers and those of touch and gesture inputs of handled electronic devices with touch-sensitive displays. Other attempted solutions require complex input sequences and menu hierarchies that are even less user-friendly than those provided on desktop or laptop computers. As such, it is desirable to provide an intuitive and easy-to-use systems and methods for simultaneously accessing multiple functions or applications on handheld electronic devices.

SUMMARY

The embodiments described herein address the need for systems, methods, and graphical user interfaces that provide intuitive and seamless interactions for multitasking on a handheld electronic device. Such methods and systems optionally complement or replace conventional touch inputs or gestures.

In accordance with some embodiments, a method is performed at an electronic device including a display generation component (e.g., a display, a projector, a heads-up display, etc.) and one or more input devices including a touch-sensitive surface (e.g., a touch-sensitive surface that is coupled to a separate display, or a touch-screen display that serves both as the display and the touch-sensitive surface). The method includes: displaying, by the display generation component, a first user interface of a first application; while displaying the first user interface of the first application, receiving a first input corresponding a request for displaying a second application with the first application in a respective concurrent-display configuration; in response to receiving the first input, displaying a second user interface of the second application and the first user interface of the first application in accordance with the respective concurrent-display configuration in which at least a portion of first user interface of the first application is displayed concurrently with the second user interface of the second application; while displaying the second application and the first application in accordance with the respective concurrent-display configuration, receiving a second input, including detecting a first contact at a location on the touch-sensitive surface that corresponds to the second application and detecting movement of the first contact across the touch-sensitive surface; in response to detecting the second input: in accordance with a determination that the second input meets first criteria, replacing display of the second application with display of a third application to display the third application and the first application in accordance with the respective concurrent-display configuration; and in accordance with a determination that the second input meets second criteria that are distinct from the first criteria: maintaining display of the first application; and ceasing display of the second application without displaying the third application.

In accordance with some embodiments, a method is performed at an electronic device including a display generation component (e.g., a display, a projector, a heads-up display, etc.) and one or more input devices (e.g., a camera, a remote controller, a pointing device, a touch-sensitive surface that is coupled to a separate display, or a touch-screen display that serves both as the display and the touch-sensitive surface). The method includes: displaying, by the display generation component, a dock containing a plurality of application icons overlaid on a first user interface of a first application, wherein the plurality of application icons correspond to different applications installed on the electronic device; while displaying the dock overlaid on the first user interface of the first application, detecting a first input including detecting selection of a respective application icon in the dock; in response to detecting the first input and in accordance with a determination that the first input meets selection criteria: in accordance with a determination that the respective application icon corresponds to the first application, and that the first application is associated with multiple windows, displaying, via the display generation component, respective representations of the multiple windows of the first application; in accordance with a determination that the respective application icon corresponds to the first application, and that the first application currently is only associated with a single window, maintaining display of the first user interface of the first application; and in accordance with a determination that the respective application icon corresponds to a second application that is distinct from the first application, replacing display of the first user interface of the first application with display of a second user interface of the second application, irrespective of a number of windows that were associated with the second application at a time when the first input was detected.

In accordance with some embodiments, a method is performed at an electronic device including a display generation component (e.g., a display, a projector, a heads-up display, etc.) and one or more input devices (e.g., a keyboard, a remote controller, a camera, a touch-sensitive surface that is coupled to a separate display, or a touch-screen display that serves both as the display and the touch-sensitive surface). The method includes displaying, by the display generation component, a first user interface containing a selectable representation of first content, wherein the first content is associated with a first application; while displaying the first user interface containing the selectable representation of the first content, detecting a first input, including detecting an input that corresponds to a request to move the selectable representation of the first content across the display to a respective location; in response to detecting the first input: in accordance with a determination that the respective location is a first location, resizing the first user interface and displaying a second user interface that includes the first content adjacent to the first user interface; and in accordance with a determination that the respective location is a second location different from the first location, displaying a third user interface that includes the first content overlaid on the first user interface.

In accordance with some embodiments, a method is performed at an electronic device including a display generation component and one or more input devices. The method includes: displaying, by the display generation component, a first user interface containing a selectable user interface object; while displaying the first user interface containing the selectable user interface object, detecting a first input, including detecting an input that corresponds to a request to move the selectable user interface object across the display to a respective location; in response to detecting the first input: in accordance with a determination that the respective location is in a first predefined region of the user interface and the selectable user interface object is an application icon for a first application, creating a new window for the first application; in accordance with a determination that the respective location is in a second predefined region of the user interface, wherein the second predefined region of the user interface is smaller than the first predefined region of the user interface, and the selectable user interface object is a representation of content associated with the first application, creating a new window for the first application; and in accordance with a determination that the respective location is in a third region of the user interface, wherein the third region of the user interface is smaller than the first predefined region of the user interface and does not overlap with the second predefined region of the user interface and the selectable user interface object is a representation of content associated with the first application, performing an operation corresponding to the selectable user interface object other than creating a new window for the first application.

In accordance with some embodiments, a method is performed at an electronic device including a display generation component (e.g., a display, a projector, a heads-up display, etc.) and one or more input devices (e.g., a camera, a remote controller, a pointing device, a camera, a touch-sensitive surface that is coupled to a separate display, or a touch-screen display that serves both as the display and the touch-sensitive surface). The method includes: displaying, by the display generation component, a dock containing a plurality of application icons concurrently with a first user interface of a first application, wherein the plurality of application icons corresponds to different applications; while displaying the dock concurrently with the first user interface of the first application, detecting a first input directed to an application icon corresponding to a second application in the dock that includes movement into a first region of the display followed by an end of the first input in the first region of the display; in response to detecting the first input: in accordance with a determination that the second application is associated with multiple windows, displaying, via the display generation component, a first representation of a first window for the second application and a second representation of a second window for the second application concurrently with the first user interface of the first application in a second region of the display; and in accordance with a determination that the second application is associated with only a single window, displaying, via the display generation component, a user interface of the second application concurrently with the first user interface of the first application, wherein the user interface of the second application is displayed in the second region of the display.

In accordance with some embodiments, a method is performed at an electronic device including a display generation component (e.g., a display, a projector, a heads-up display, etc.) and one or more input devices (e.g., a camera, a remote controller, a keyboard, a touch-sensitive surface that is coupled to a separate display, or a touch-screen display that serves both as the display and the touch-sensitive surface). The method includes: concurrently displaying, by the display generation component, a first application view and a second application view in a first concurrent-display configuration of a plurality of concurrent-display configurations, including the first concurrent-display configuration that specifies a first arrangement of concurrently displayed application views, a second concurrent-display configuration that specifies a second arrangement of concurrently displayed application views that is different from the first arrangement of concurrently displayed application views, and a third concurrent-display configuration that specifies a third arrangement of concurrently displayed application views that is different from the first arrangement of concurrently displayed application views and the second arrangement of concurrently displayed application views; detecting a first input that starts at a location directed to the first application view within the first arrangement of concurrently displayed application views and includes first movement followed by an end of the first input after the first movement has been detected; in response to detecting the first movement of the first input, moving a representation of the first application view on the display in accordance with the first movement of the first input, including: while the representation of the first application view is over a first portion of the display, displaying a first visual indication that an end of the first input will result in the first application view and the second application view being displayed in the first concurrent-display configuration; while the representation of the first application view is over a second portion of the display, displaying a second visual indication that an end of the first input will result in the first application view and the second application view being displayed in the second concurrent-display configuration; and while the representation of the first application view is over a third portion of the display, displaying a third visual indication that an end of the first input will result in the first application view and the second application view being displayed in the third concurrent-display configuration; and in response to detecting the end of the first input: in accordance with a determination that the first input ended while the first application view was over the first portion of the display, displaying the first application view and the second application view in the first concurrent-display configuration; in accordance with a determination that the first input ended while the first application view was over the second portion of the display, displaying the first application view and the second application view in the second concurrent-display configuration; and in accordance with a determination that the first input ended while the first application view was over the third portion of the display, displaying the first application view and the second application view in the third concurrent-display configuration.

In accordance with some embodiments, an electronic device includes a display generation component (e.g., a display, a projector, a head-mounted display, etc.), one or more input devices (e.g., a touch-sensitive surface, optionally one or more sensors to detect intensities of contacts with the touch-sensitive surface), optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display generation component, one or more input devices (e.g., a touch-sensitive surface, optionally one or more sensors to detect intensities of contacts with the touch-sensitive surface), and optionally one or more tactile output generators, cause the device to perform or cause performance of the operations of any of the methods described herein. In accordance with some embodiments, a graphical user interface on an electronic device with a display generation component, one or more input devices (e.g., a touch-sensitive surface, optionally one or more sensors to detect intensities of contacts with the touch-sensitive surface), optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display generation component, one or more input devices (e.g., a touch-sensitive surface, optionally one or more sensors to detect intensities of contacts with the touch-sensitive surface), and optionally one or more tactile output generators; and means for performing or causing performance of the operations of any of the methods described herein. In accordance with some embodiments, an information processing apparatus, for use in an electronic device with a display generation component, one or more input devices (e.g., a touch-sensitive surface, optionally one or more sensors to detect intensities of contacts with the touch-sensitive surface), and optionally one or more tactile output generators, includes means for performing or causing performance of the operations of any of the methods described herein.

Thus, electronic devices with display generation components, one or more input devices (e.g., touch-sensitive surfaces, optionally one or more sensors to detect intensities of contacts with the touch-sensitive surface), optionally one or more tactile output generators, optionally one or more device orientation sensors, and optionally an audio system, are provided with improved methods and interfaces for interacting with multiple windows on a handheld, portable electronic device thereby increasing the effectiveness, efficiency, and user satisfaction with such devices. Such methods and interfaces may complement or replace conventional methods for multitasking and interacting with multiple windows.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments section below, in conjunction with the following drawings in which like reference numerals refer to corresponding parts throughout the drawings.

FIGS. 4A1-4A50, 4B1-4B51, 4C1-4C48, 4D1-4D19, and 4E1-4E28 are schematics of a touch-sensitive display used to illustrate user interfaces for interacting with multiple applications and/or windows, in accordance with some embodiments.

FIGS. 5A-5I are a flowchart representation of a method of interacting with multiple windows in a respective concurrent-display configuration (e.g., a slide-over display configuration), in accordance with some embodiments.

FIGS. 6A-6E are a flowchart representation of a method of interacting with an application icon while displaying an application, in accordance with some embodiments.

FIGS. 7A-7H are a flowchart representation of a method of displaying content in a respective concurrent-display configuration with a currently displayed application, in accordance with some embodiments.

FIG. 7I is a flowchart representation of a method of dragging and dropping an object to a respective region of the display to open a new window, in accordance with some embodiments.

FIGS. 8A-8E are a flowchart representation of a method of displaying an application in a respective concurrent-display configuration with a currently displayed application, in accordance with some embodiments.

FIGS. 9A-9J are a flowchart representation of a method of changing window display configurations using a fluid gesture, in accordance with some embodiments.

DESCRIPTION OF EMBODIMENTS

Figure 1A:
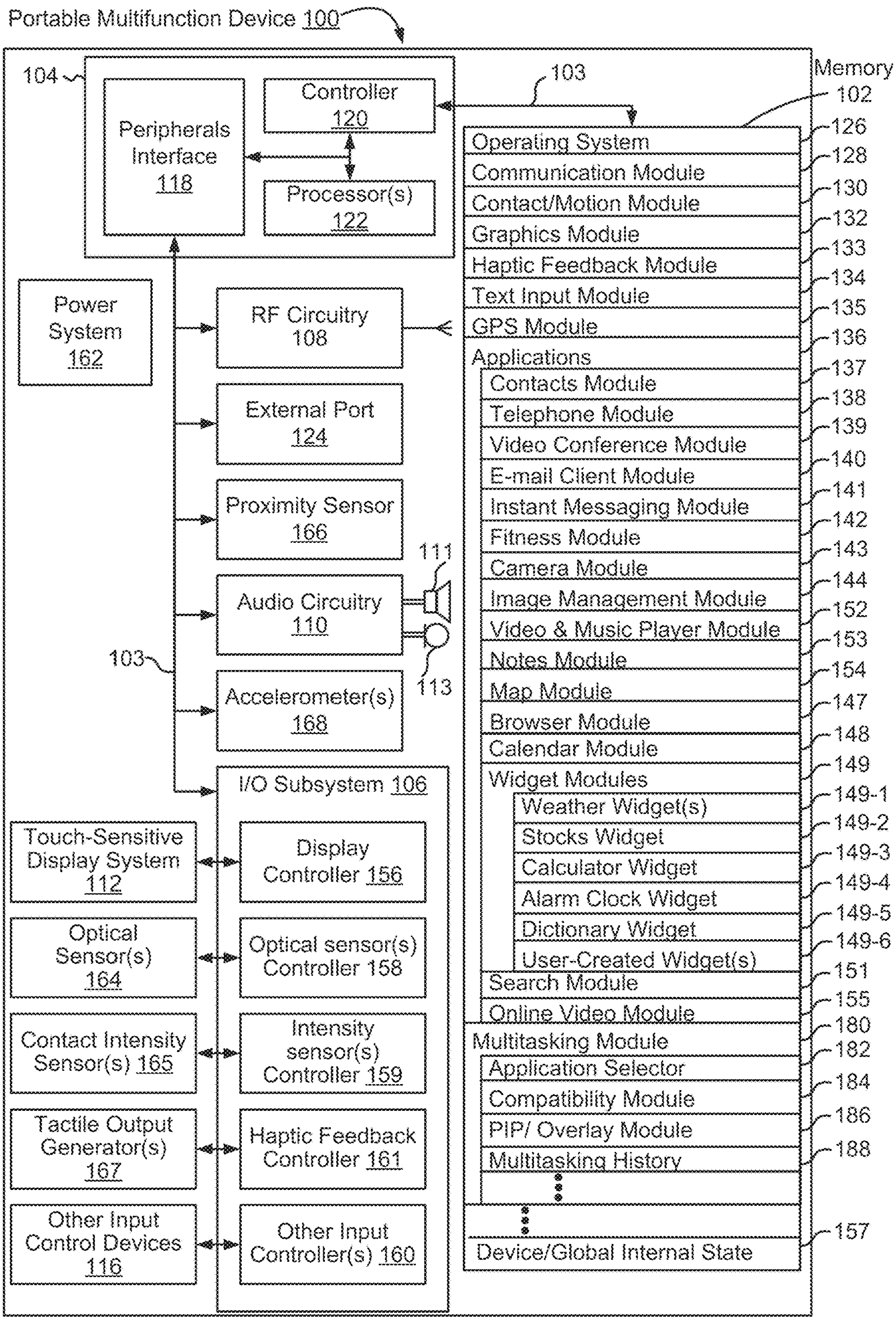
FIG. 1A is a high-level block diagram of a computing device with a touch-sensitive display, in accordance with some embodiments.

The present disclosure describe various embodiments to facilitate multitasking on a portable electronic devices, where conventional multi-window interactions and user interface navigation techniques prove to be inefficient, cumbersome, error-prone, and time-consuming. For battery-operated devices with small displays, improved user interfaces for interacting with multiple applications, windows, and/or documents are needed.

In some embodiments, a method for performing window-switching within a subset of windows (e.g., a set of slide-over applications or windows) that are configured to be displayed concurrently with another full-screen window or application is described. The subset of windows having the same display configuration (e.g., displayed in the slide-over mode) are organized in a stack or carousel and are switchable in response gestures meeting predefined criteria. In addition, an overlay-switcher user interface is provided to provide a consistent way to review and manage the subset of windows displayed in the slide-over mode, and to quickly select a window to overlay on a currently displayed full-screen window or application.

In some embodiments, an application-switching request and a window management request are integrated into the same input (e.g., a tap input on an application icon while displaying a first application). A heuristic is used to determine whether to switch to a second application or to display a window-switcher of the first application. When the activated application icon corresponds to the displayed application, the input is treated as a request to open the window-switcher of the application; and when the activated application icon corresponding to an application other than the displayed application, the input is treated as a request to switch application irrespective of the number of windows that the first application has open. In an event where the currently displayed application does not have multiple windows, the input is ignored (e.g., optionally with an error feedback). The integration of application-switching and window-switching within an application provides a more efficient interface, as the user does not need to keep track of the number of windows currently open for a currently displayed application. Instead, the device automatically provides an intuitive response based on a heuristic, thereby improving user interface efficiency, and reducing the number of inputs required to achieve a desired outcome.

In some embodiments, an object representing content is dragged from a currently displayed window to a predefine region of the display, and depending on the location of the input or the location of the dragged object when an end of the input is detected, the device opens a new window displaying the content in a respective concurrent-display configuration (e.g., in a slide-over window or a split-screen window) with the currently displayed window. In some embodiments, the drag and drop operation is also integrated with the drag and drop operation implemented within the original window containing the object representing the content, or in another concurrently displayed window. The integration of multiple operations that are performed within an application window, across two concurrently displayed windows, in a new window of a first type, or in a new window of a second type, allows the user to easily perform different operations based on the end location of the input. This helps to reduce the complexity of the user interface interactions, because fewer gestures need to be implemented, used, and remembered to achieve these functions, thereby reducing user mistakes and improving efficiency of the user interface.

In some embodiments, when an object is dragged and dropped into different regions on the display, different operations are performed depending on the end location of the input, including operations to open new windows of different types (e.g., slide-over window, or split-screen window), operations within the original window of the object, and operations across two concurrently displayed windows. For certain objects, such as application icons, applicable operations within or across the existing windows on the display are uncommon; therefore, it is beneficial to enlarge the drop zones for opening new windows by dragging and dropping an application icon, relative to the drop zones for opening new windows by dragging and dropping an object representing content. This user interface improvement helps to reduce user error, without significant compromise in function, thereby improving the efficiency of the user interface.

In some embodiments, when a request to open an application in a concurrent-display configuration is received, the application is displayed in the concurrent-display configuration if the application is not associated with multiple windows, and a window-selector user interface is displayed in the respective concurrent display configuration if the application is associated with multiple windows. Allowing the user to open an application in a concurrent display configuration, or open the window-selector for the application using the same input (e.g., dragging the application icon of the application to the side region of the display), based on whether the application is associated with multiple windows is intuitive and efficient. This helps to reduce the number and types of inputs the user need to provide in order to achieve a desired outcome and to reduce the chance of user mistakes.

In some embodiments, in response to an input that drags a window to different drop zones defined on the display, the device provides dynamic visual feedback to indicate the resulting display configuration for the window if the end of the input is to be detected at the current location. The final state of the user interface is not ascertained until the end of the input is detected, and the user is given opportunity to review and learn about the various possible outcomes before finally committing to a display configuration for the window by ending the input at a suitable location. The fluid nature of the input and feedback allows multiple outcomes to be achieved using the same gesture, and the chance of user mistakes are reduced by the simplicity of the gesture and the continuous visual feedback that is provided in accordance with the current location of the input.

The methods and user interface heuristics described herein take into account: (i) the significant differences in screen size between desktop computers and handled electronic devices, and (ii) the significant differences between keyboard and mouse interaction of desktop computers and those of touch and gesture inputs of handled electronic devices with touch-sensitive displays. No requirement of menu navigation or complex sequences of inputs are required to achieve the various multitasking functions on different levels, e.g., across applications, across all windows of a given application, across windows of a given type for an given application, between opening new windows or switching between existing windows, between opening content and opening applications, etc. These methods and user interface heuristics provide an intuitive and easy-to-use systems and methods for simultaneously accessing multiple functions or applications on handheld electronic devices.

FIGS. 1A-1D and 2 provide a description of example devices. FIGS. 3A-3C illustrate examples of dynamic intensity thresholds. FIGS. 4A1-4A50, 4B1-4B51, 4C1-4C48, 4D1-4D19, and 4E1-4E28 are schematics of a touch-sensitive display used to illustrate user interfaces for interacting with multiple applications and/or windows, in accordance with some embodiments, and these figures are used to illustrate the methods/processes shown in FIGS. 5A-5I, 6A-6E, 7A-7H, 7I, 8A-8E, and 9A-9J.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms “a”, “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “includes,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

As used herein, the term “if” is, optionally, construed to mean “when” or “upon” or “in response to determining” or “in response to detecting,” depending on the context. Similarly, the phrase “if it is determined” or “if [a stated condition or event] is detected” is, optionally, construed to mean “upon determining” or “in response to determining” or “upon detecting [the stated condition or event]” or “in response to detecting [the stated condition or event],” depending on the context.

The disclosure herein interchangeably refers to detecting a touch input on, at, over, on top of, or substantially within a particular user interface element or a particular portion of a touch-sensitive display. As used herein, a touch input that is detected “at” a particular user interface element could also be detected “on,” “over,” “on top of,” or “substantially within” that same user interface element, depending on the context. In some embodiments and as discussed in more detail below, desired sensitivity levels for detecting touch inputs are configured by a user of an electronic device (e.g., the user could decide (and configure the electronic device to operate) that a touch input should only be detected when the touch input is completely within a user interface element).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the IPHONE®, IPOD TOUCH®, and IPAD® devices from APPLE Inc. of Cupertino, Calif. Other portable electronic devices, such as laptops or tablet computers with touch-sensitive surfaces (e.g., touch-sensitive displays and/or touch pads), are, optionally, used. It should also be understood that, in some embodiments, the device is not a portable communications device, but is a desktop computer with a touch-sensitive surface (e.g., a touch-sensitive display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an email application, an instant messaging application, a fitness application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable electronic devices with touch-sensitive displays. FIG. 1A is a block diagram illustrating portable multifunction device 100 (also referred to interchangeably herein as electronic device 100 or device 100) with touch-sensitive display 112 in accordance with some embodiments. Touch-sensitive display 112 is sometimes called a “touch screen” for convenience, and is sometimes known as or called a touch-sensitive display system. Device 100 includes memory 102 (which optionally includes one or more computer-readable storage mediums), controller 120, one or more processing units (CPU’s) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or a touchpad of device 100). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 102 optionally includes one or more storage devices remotely located from processor(s) 122. Access to memory 102 by other components of device 100, such as CPU 122 and the peripherals interface 118, is, optionally, controlled by controller 120.

Peripherals interface 118 can be used to couple input and output peripherals of the device to CPU 122 and memory 102. The one or more processors 122 run or execute various software programs and/or sets of instructions stored in memory 102 to perform various functions for device 100 and to process data.

In some embodiments, peripherals interface 118, CPU 122, and controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, and/or Wireless Fidelity (Wi-Fi) (e.g., IEEE 802.11a, IEEE 802.11b, IEEE 802.11g and/or IEEE 802.11n).

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 connects input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, a sensor or a set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an example embodiment, a point of contact between touch screen 112 and the user corresponds to an area under a finger of the user.

Touch screen 112 optionally uses LCD (liquid crystal display) technology, LPD (light emitting polymer display) technology, or LED (light emitting diode) technology, or OLED (organic light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used, such as that found in the IPHONE®, IPOD TOUCH®, and IPAD® from APPLE Inc. of Cupertino, Calif.

Touch screen 112 optionally has a video resolution in excess of 400 dpi. In some embodiments, touch screen 112 has a video resolution of at least 600 dpi. In other embodiments, touch screen 112 has a video resolution of at least 1000 dpi. The user optionally makes contact with touch screen 112 using any suitable object or digit, such as a stylus or a finger. In some embodiments, the user interface is designed to work primarily with finger-based contacts and gestures. In some embodiments, the device translates the finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device, so that the touch-sensitive display is enabled for use as a viewfinder for still and/or video image acquisition. In some embodiments, another optical sensor is located on the front of the device so that the user's image is, optionally, obtained for videoconferencing while the user views the other video conference participants on the touch-sensitive display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch-sensitive display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIG. 1A. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude (i.e., orientation of the device). In some embodiments, device/global internal state 157 communicates with multitasking module 180 to keep track of applications activated in a multitasking mode (also referred to as a shared screen view, shared screen mode, or multitask mode). In this way, if device 100 is rotated from portrait to landscape display mode, multitasking module 180 is able to retrieve multitasking state information (e.g., display areas for each application in the multitasking mode) from device/global internal state 157, in order to reactivate the multitasking mode after switching from portrait to landscape.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some embodiments of IPOD devices from APPLE Inc. In other embodiments, the external port is a multi-pin (e.g., 8-pin) connector that is the same as, or similar to and/or compatible with the 8-pin connector used in LIGHTNING connectors from APPLE Inc.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-sensitive display can be set to any of a large range of predefined thresholds values without changing the trackpad or touch-sensitive display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and, in some embodiments, subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations and the like.

Figure 1B:
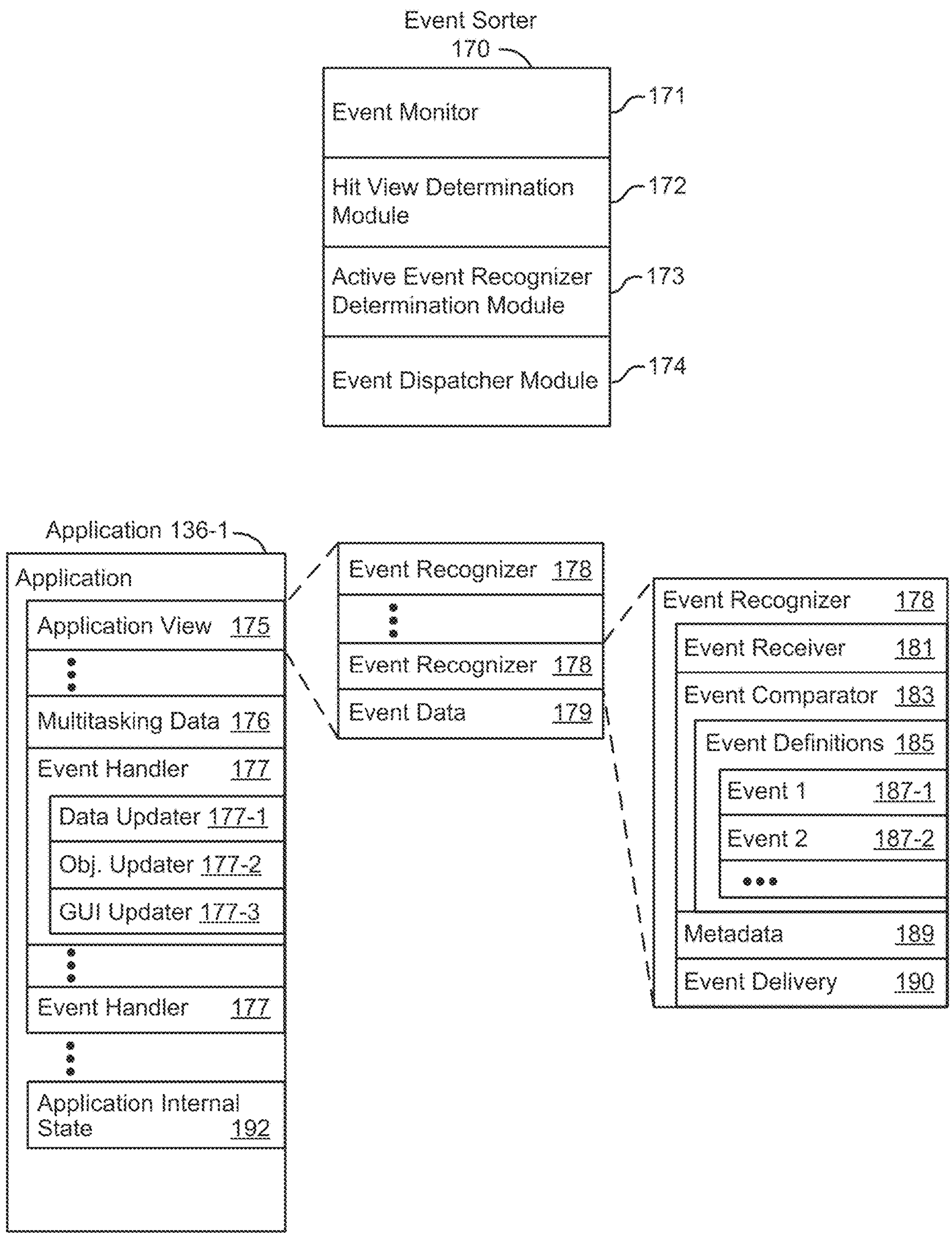
FIG. 1B is a block diagram of example components for event handling, in accordance with some embodiments.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinating data and other graphic property data, and then generates screen image data to output to display controller 156. In some embodiments, graphics module 132 retrieves graphics stored with multitasking data 176 of each application 136 (FIG. 1B). In some embodiments, multitasking data 176 stores multiple graphics of different sizes, so that an application is capable of quickly resizing while in a shared screen mode.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, email client module 140, IM module 141, browser module 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications ("apps") 136 optionally include the following modules (or sets of instructions), or a subset or superset thereof:

- contacts module 137 (sometimes called an address book or contact list);
- telephone module 138;
- video conferencing module 139;
- email client module 140;
- instant messaging (IM) module 141;
- fitness module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 149-6, and voice replication.

In conjunction with touch screen 112, display controller 156, contact module 130, graphics module 132, and text input module 134, contacts module 137 is, optionally, used to manage an address book or contact list (e.g., stored in contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or email addresses to initiate and/or facilitate communications by telephone module 138, video conference module 139, email client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 is, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, email client module 140 includes executable instructions to create, send, receive, and manage email in response to user instructions. In conjunction with image management module 144, email client module 140 makes it very easy to create and send emails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and video and music player module 146, fitness module 142 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, email client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, a widget creator module (not pictured) is, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an IPOD from APPLE Inc.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 is, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, email client module 140, and browser module 147, online video module 155 includes instructions that allow the user to access, browse, receive (e.g., by streaming and/or download), play back (e.g., on the touch screen or on an external, connected display via external port 124), send an email with a link to a particular online video, and otherwise manage online videos in one or more file formats, such as H.264. In some embodiments, instant messaging module 141, rather than email client module 140, is used to send a link to a particular online video.

As pictured in FIG. 1A, portable multifunction device 100 also includes a multitasking module 180 for managing multitasking operations on device 100 (e.g., communicating with graphics module 132 to determine appropriate display areas for concurrently displayed applications). Multitasking module 180 optionally includes the following modules (or sets of instructions), or a subset or superset thereof:

- application selector 182;
- compatibility module 184;
- picture-in-picture (PIP)/overlay module 186; and
- multitasking history 188 for storing information about a user's multitasking history (e.g., commonly-used applications in multitasking mode, recent display areas for applications while in the multitasking mode, applications that are pinned together for display in the split-view/multitasking mode, etc.).

In conjunction with touch screen 112, display controller 156, contact module 130, graphics module 132, and contact intensity sensor(s) 165, application selector 182 includes executable instructions to display affordances corresponding to applications (e.g., one or more of applications 136) and allow users of device 100 to select affordances for use in a multitasking/split-screen mode (e.g., a mode in which more than one application is displayed and active on touch screen 112 at the same time). In some embodiments, the application selector 182 is a dock (e.g., the dock 408 described below).

In conjunction with touch screen 112, display controller 156, contact module 130, graphics module 132, and application selector 182, compatibility module 184 includes executable instructions to determine whether a particular application is compatible with a multitasking mode (e.g., by checking a flag, such as a flag stored with multitasking data 176 for each application 136, as pictured in FIG. 1B).

In conjunction with touch screen 112, display controller 156, contact module 130, graphics module 132, and contact intensity sensor(s) 165, PIP/overlay module 186 includes executable instructions to determine reduced sizes for applications that will be displayed as overlaying another application and to determine an appropriate location on touch screen 112 for displaying the reduced size application (e.g., a location that avoids important content within an active application that is overlaid by the reduced size application).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating example components for event handling in accordance with some embodiments. In some embodiments, memory 102 (in FIG. 1A) includes event sorter 170 (e.g., in operating system 126) and a respective application 136-1 selected from among the applications 136 of portable multifunction device 100 (FIG. 1A) (e.g., any of the aforementioned applications stored in memory 102 with applications 136).

Event sorter 170 receives event information and determines the application 136-1 and application view 175 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 175 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user. In some embodiments, application internal state 192 is used by multitasking module 180 to help facilitate multitasking operations (e.g., multitasking module 180 retrieves resume information from application internal state 192 in order to re-display a previously dismissed side application).

In some embodiments, each application 136-1 stores multitasking data 176. In some embodiments, multitasking data 176 includes a compatibility flag (e.g., a flag accessed by compatibility module 184 to determine whether a particular application is compatible with multitasking mode), a list of compatible sizes for displaying the application 136-1 in the multitasking mode (e.g., ¼, ⅓, ½, or full-screen), and various sizes of graphics (e.g., different graphics for each size within the list of compatible sizes).

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 178). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 181.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 177 and one or more application views 175, each of which includes instructions for handling touch events that occur within a respective view of the application's user interface. Each application view 175 of the application 136-1 includes one or more event recognizers 180. Typically, a respective application view 175 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 177 includes one or more of: data updater 177-1, object updater 177-2, GUI updater 177-3, and/or event data 179 received from event sorter 170. Event handler 177 optionally utilizes or calls data updater 177-1, object updater 177-2 or GUI updater 177-3 to update the application internal state 192. Alternatively, one or more of the application views 175 includes one or more respective event handlers 177. Also, in some embodiments, one or more of data updater 177-1, object updater 177-2, and GUI updater 177-3 are included in a respective application view 175.

A respective event recognizer 178 receives event information (e.g., event data 179) from event sorter 170, and identifies an event from the event information. Event recognizer 178 includes event receiver 181 and event comparator 183. In some embodiments, event recognizer 178 also includes at least a subset of: metadata 189, and event delivery instructions 190 (which optionally include sub-event delivery instructions).

Event receiver 181 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from portrait to landscape, or vice versa), and the event information includes corresponding information about the current orientation (also called device attitude) of the device.

Event comparator 183 compares the event information to predefined event or sub-event definitions and, based on the comparison, determines an event or sub-event, or determines or updates the state of an event or sub-event. In some embodiments, event comparator 183 includes event definitions 185. Event definitions 185 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 177.

In some embodiments, event definition 186 includes a definition of an event for a respective user-interface object. In some embodiments, event comparator 183 performs a hit test to determine which user-interface object is associated with a sub-event. For example, in an application view in which three user-interface objects are displayed on touch-sensitive display 112, when a touch is detected on touch-sensitive display 112, event comparator 183 performs a hit test to determine which of the three user-interface objects is associated with the touch (sub-event). If each displayed object is associated with a respective event handler 177, the event comparator uses the result of the hit test to determine which event handler 177 should be activated. For example, event comparator 183 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 178 determines that the series of sub-events do not match any of the events in event definitions 185, the respective event recognizer 178 enters an event impossible, event failed, or event ended state, after which it disregards subsequent sub-events of the touch-based gesture. In this situation, other event recognizers, if any remain active for the hit view, continue to track and process sub-events of an ongoing touch-based gesture.

In some embodiments, a respective event recognizer 178 includes metadata 189 with configurable properties, flags, and/or lists that indicate how the event delivery system should perform sub-event delivery to actively involved event recognizers. In some embodiments, metadata 189 includes configurable properties, flags, and/or lists that indicate how event recognizers interact, or are enabled to interact, with one another. In some embodiments, metadata 189 includes configurable properties, flags, and/or lists that indicate whether sub-events are delivered to varying levels in the view or programmatic hierarchy.

In some embodiments, a respective event recognizer 178 activates event handler 177 associated with an event when one or more particular sub-events of an event are recognized. In some embodiments, a respective event recognizer 178 delivers event information associated with the event to event handler 177. Activating an event handler 177 is distinct from sending (and deferred sending) sub-events to a respective hit view. In some embodiments, event recognizer 178 throws a flag associated with the recognized event, and event handler 177 associated with the flag catches the flag and performs a predefined process.

In some embodiments, event delivery instructions 190 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 177-1 creates and updates data used in application 136-1. For example, data updater 177-1 updates the telephone number used in contacts module 137, or stores a video file used in video and music player module 145. In some embodiments, object updater 177-2 creates and updates objects used in application 136-1. For example, object updater 177-2 creates a new user-interface object or updates the position of a user-interface object. GUI updater 177-3 updates the GUI. For example, GUI updater 177-3 prepares display information and sends it to graphics module 132 for display on a touch-sensitive display. In some embodiments, GUI updater 177-3 communicates with multitasking module 180 in order to facilitate resizing of various applications displayed in a multitasking mode.

In some embodiments, event handler(s) 177 includes or has access to data updater 177-1, object updater 177-2, and GUI updater 177-3. In some embodiments, data updater 177-1, object updater 177-2, and GUI updater 177-3 are included in a single module of a respective application 136-1 or application view 175. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof is optionally utilized as inputs corresponding to sub-events which define an event to be recognized.

Figure 1C:
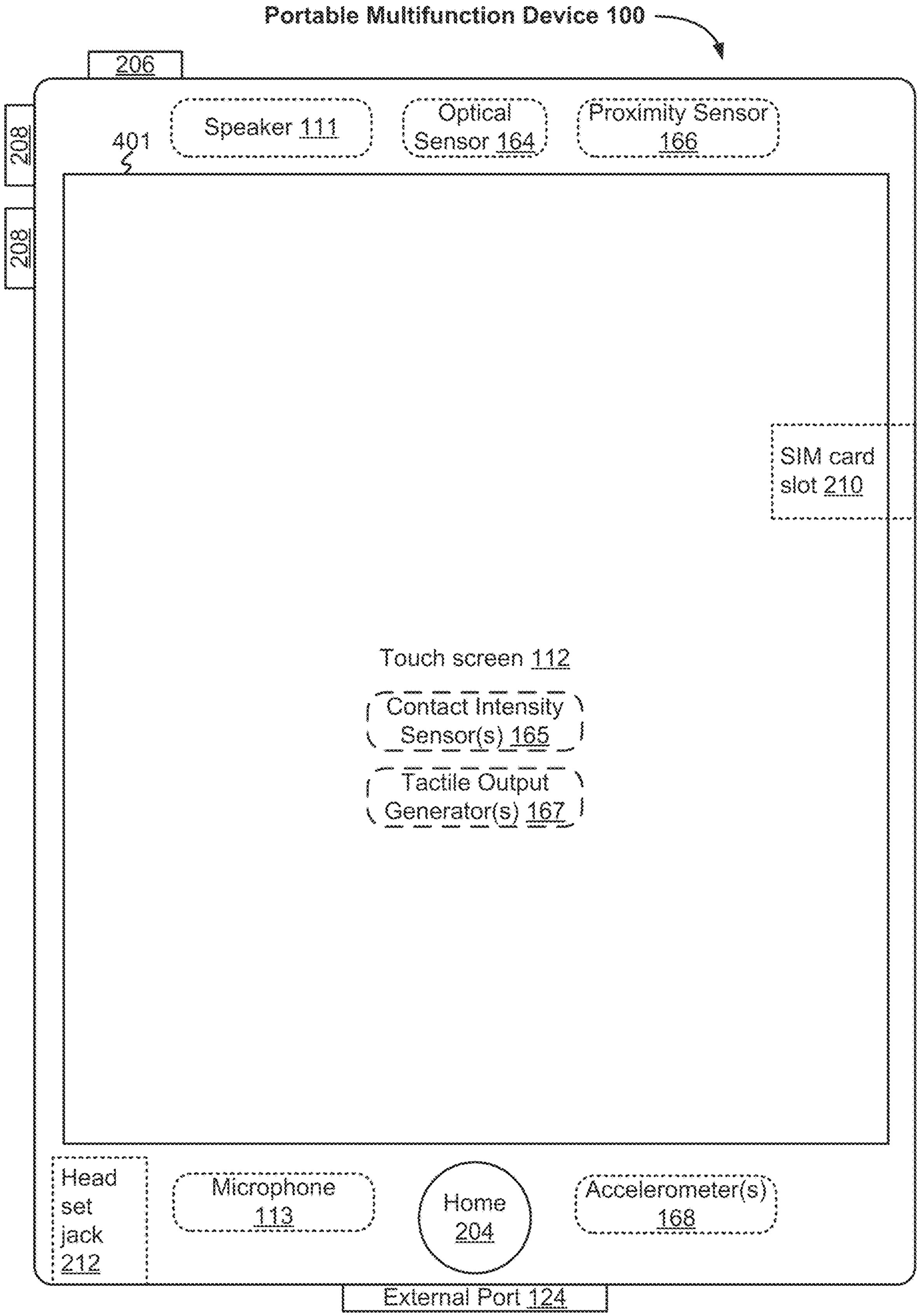
FIG. 1C is a schematic of a portable multifunction device having a touch-sensitive display, in accordance with some embodiments.

FIG. 1C is a schematic of a portable multifunction device (e.g., portable multifunction device 100) having a touch-sensitive display (e.g., touch screen 112) in accordance with some embodiments. The touch-sensitive display optionally displays one or more graphics within user interface (UI) 201*a*. In this embodiment, as well as others described below, a user can select one or more of the graphics by making a gesture on the screen, for example, with one or more fingers or one or more styluses. In some embodiments, selection of one or more graphics occurs when the user breaks contact with the one or more graphics (e.g., by lifting a finger off of the screen). In some embodiments, the gesture optionally includes one or more tap gestures (e.g., a sequence of touches on the screen followed by liftoffs), one or more swipe gestures (continuous contact during the gesture along the surface of the screen, e.g., from left to right, right to left, upward and/or downward), and/or a rolling of a finger (e.g., from right to left, left to right, upward and/or downward) that has made contact with device 100. In some implementations or circumstances, inadvertent contact with a graphic does not select the graphic. For example, a swipe gesture that sweeps over an application affordance (e.g., an icon) optionally does not launch (e.g., open) the corresponding application when the gesture for launching the application is a tap gesture.

Device 100 optionally also includes one or more physical buttons, such as a "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 1D:
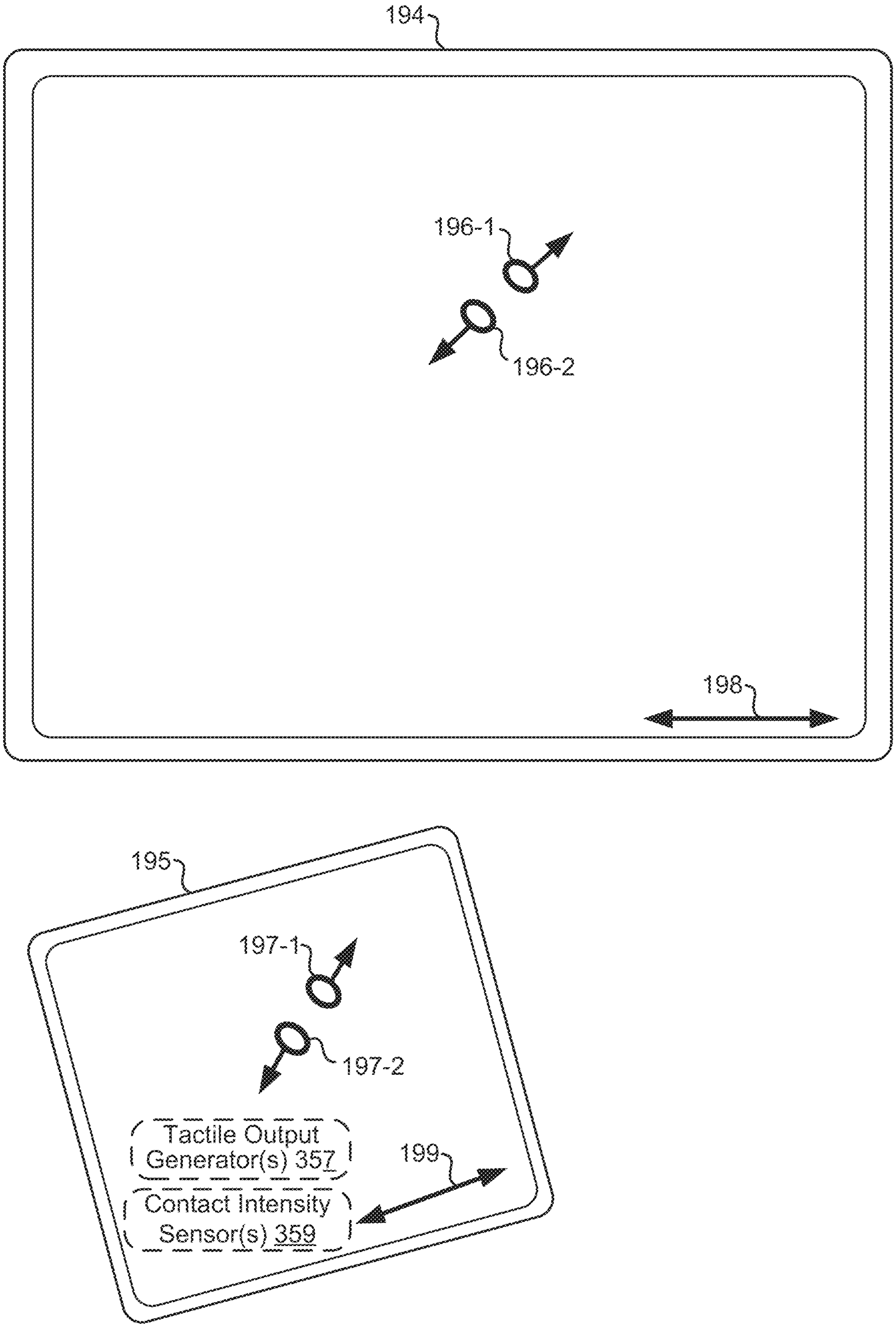
FIG. 1D is a schematic used to illustrate a computing device with a touch-sensitive surface that is separate from the display, in accordance with some embodiments.

FIG. 1D is a schematic used to illustrate a user interface on a device (e.g., device 100, FIG. 1A) with a touch-sensitive surface 195 (e.g., a tablet or touchpad) that is separate from the display 194 (e.g., touch screen 112). In some embodiments, touch-sensitive surface 195 includes one or more contact intensity sensors (e.g., one or more of contact intensity sensor(s) 359) for detecting intensity of contacts on touch-sensitive surface 195 and/or one or more tactile output generator(s) 357 for generating tactile outputs for a user of touch-sensitive surface 195.

Although some of the examples which follow will be given with reference to inputs on touch screen 112 (where the touch sensitive surface and the display are combined), in some embodiments, the device detects inputs on a touch-sensitive surface that is separate from the display, as shown in FIG. 1D. In some embodiments the touch sensitive surface (e.g., 195 in FIG. 1D) has a primary axis (e.g., 199 in FIG. 1D) that corresponds to a primary axis (e.g., 198 in FIG. 1D) on the display (e.g., 194). In accordance with these embodiments, the device detects contacts (e.g., 197-1 and 197-2 in FIG. 1D) with the touch-sensitive surface 195 at locations that correspond to respective locations on the display (e.g., in FIG. 1D, 197-1 corresponds to 196-1 and 197-2 corresponds to 196-2). In this way, user inputs (e.g., contacts 197-1 and 197-2, and movements thereof) detected by the device on the touch-sensitive surface (e.g., 195 in FIG. 1D) are used by the device to manipulate the user interface on the display (e.g., 194 in FIG. 1D) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touch-sensitive surface 195 in FIG. 1D (touch-sensitive surface 195, in some embodiments, is a touchpad)) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch-sensitive display) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of the portable computing system 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an un-weighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

In some embodiments one or more predefined intensity thresholds are used to determine whether a particular input satisfies an intensity-based criterion. For example, the one or more predefined intensity thresholds include (i) a contact detection intensity threshold $IT_0$, (ii) a light press intensity threshold $IT_L$, (iii) a deep press intensity threshold $IT_D$ (e.g., that is at least initially higher than $I_L$), and/or (iv) one or more other intensity thresholds (e.g., an intensity threshold $I_H$ that is lower than $I_L$). As used herein, $IT_L$ and $I_L$ refer to a same light press intensity threshold, $IT_D$ and $I_D$ refer to a same deep press intensity threshold, and $IT_H$ and $I_H$ refer to a same intensity threshold. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 3A illustrates a dynamic intensity threshold 380 that changes over time based in part on the intensity of touch input 376 over time. Dynamic intensity threshold 380 is a sum of two components, first component 374 that decays over time after a predefined delay time p1 from when touch input 376 is initially detected, and second component 378 that trails the intensity of touch input 376 over time. The initial high intensity threshold of first component 374 reduces accidental triggering of a "deep press" response, while still allowing an immediate "deep press" response if touch input 376 provides sufficient intensity. Second component 378 reduces unintentional triggering of a "deep press" response by gradual intensity fluctuations of in a touch input. In some embodiments, when touch input 376 satisfies dynamic intensity threshold 380 (e.g., at point 381 in FIG. 3A), the "deep press" response is triggered.

FIG. 3B illustrates another dynamic intensity threshold 386 (e.g., intensity threshold $I_D$). FIG. 3B also illustrates two other intensity thresholds: a first intensity threshold $I_H$ and a second intensity threshold $I_L$. In FIG. 3B, although touch input 384 satisfies the first intensity threshold $I_H$ and the second intensity threshold $I_L$ prior to time p2, no response is provided until delay time p2 has elapsed at time 382. Also in FIG. 3B, dynamic intensity threshold 386 decays over time, with the decay starting at time 388 after a predefined delay time p1 has elapsed from time 382 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

FIG. 3C illustrate yet another dynamic intensity threshold 392 (e.g., intensity threshold $I_D$). In FIG. 3C, a response associated with the intensity threshold $I_L$ is triggered after the delay time p2 has elapsed from when touch input 390 is initially detected. Concurrently, dynamic intensity threshold 392 decays after the predefined delay time p1 has elapsed from when touch input 390 is initially detected. So a decrease in intensity of touch input 390 after triggering the response associated with the intensity threshold $I_L$, followed by an increase in the intensity of touch input 390, without releasing touch input 390, can trigger a response associated with the intensity threshold $I_D$ (e.g., at time 394) even when the intensity of touch input 390 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

Example User Interfaces and Associated Processes

Attention is now directed towards embodiments of user interfaces ("UI") and associated processes that may be implemented on an electronic device with a display generation component and one or more input devices, such as device 100 with a touch-sensitive display or a device with a separate display and touch-sensitive surface.

Figure 2:
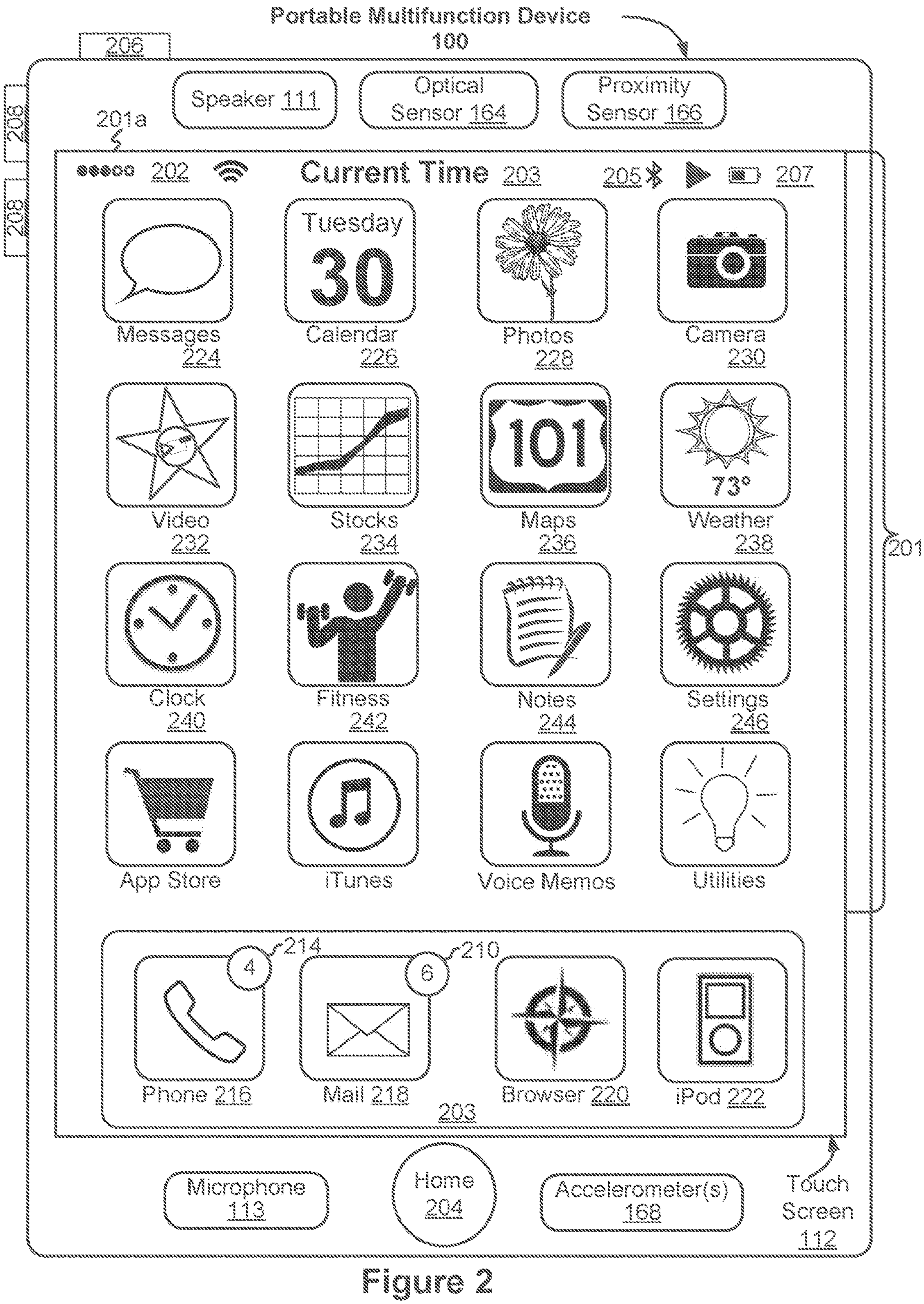
FIG. 2 is a schematic of a touch-sensitive display used to illustrate a user interface for a menu of applications, in accordance with some embodiments.
Figure 3A:
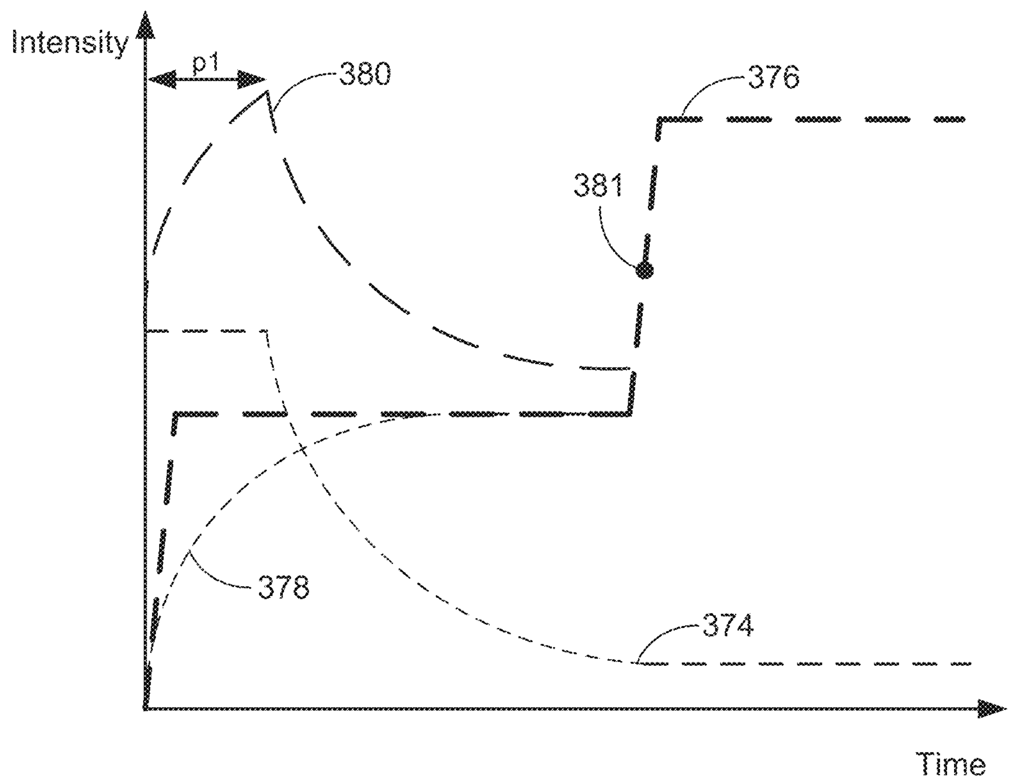
FIGS. 3A-3C illustrate examples of dynamic intensity thresholds in accordance with some embodiments.
Figure 3B:
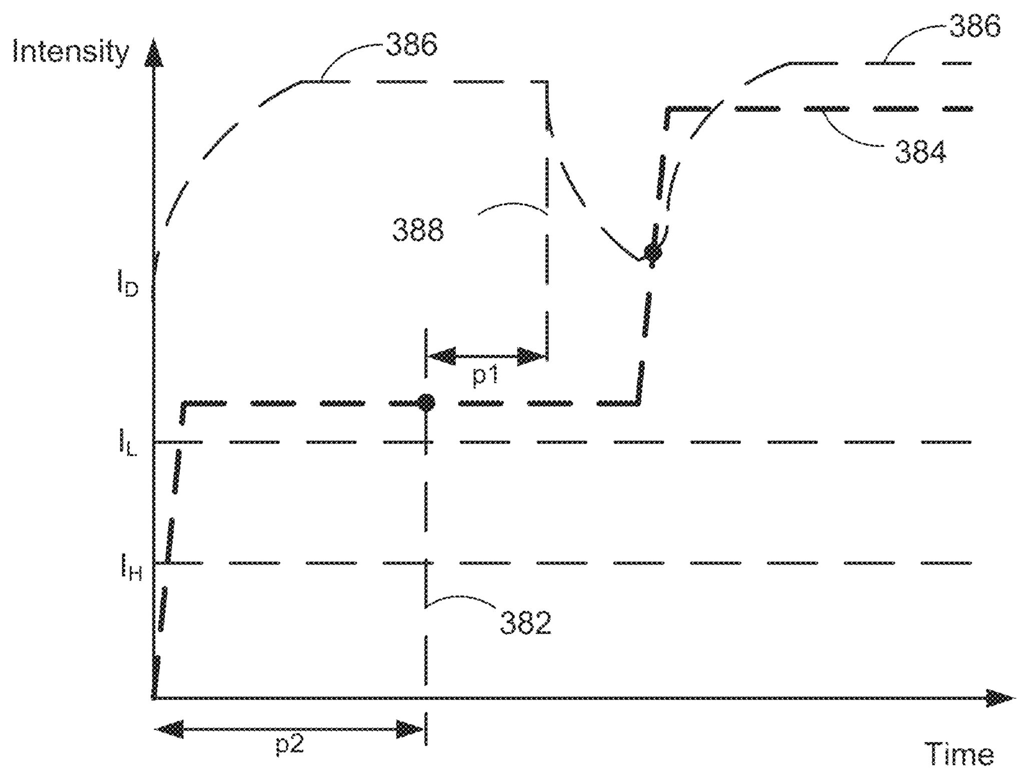
Figure 3C:
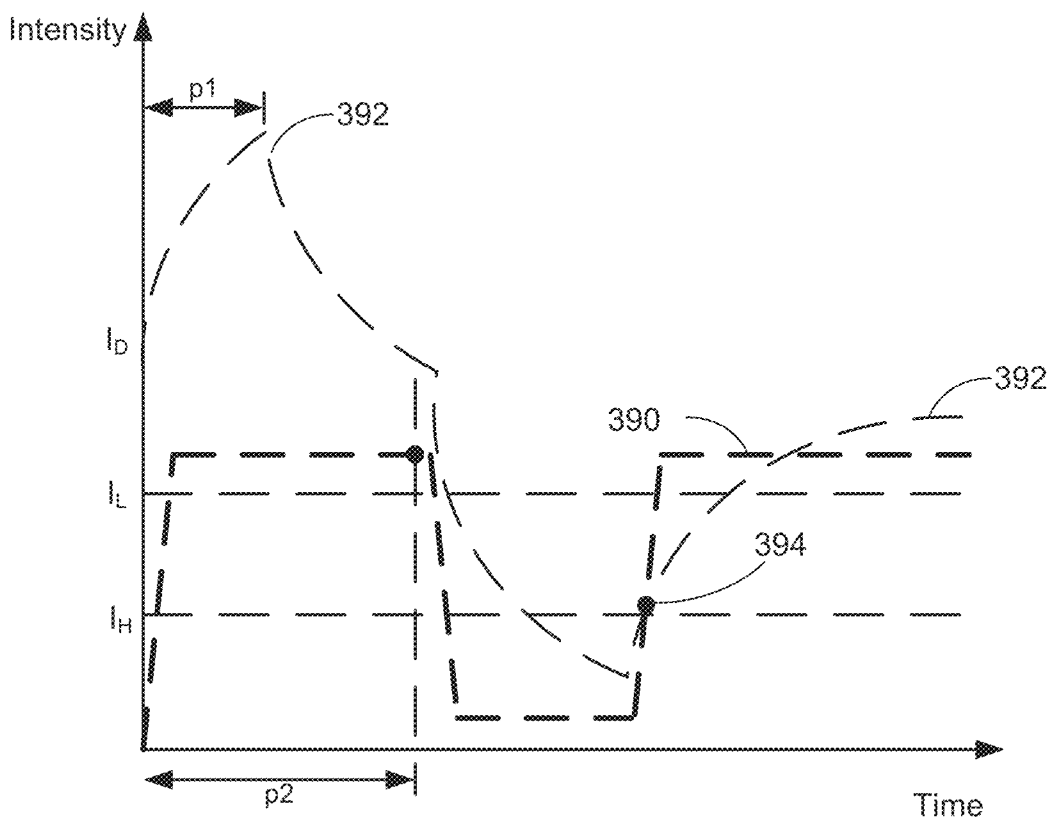
Figure 5A:
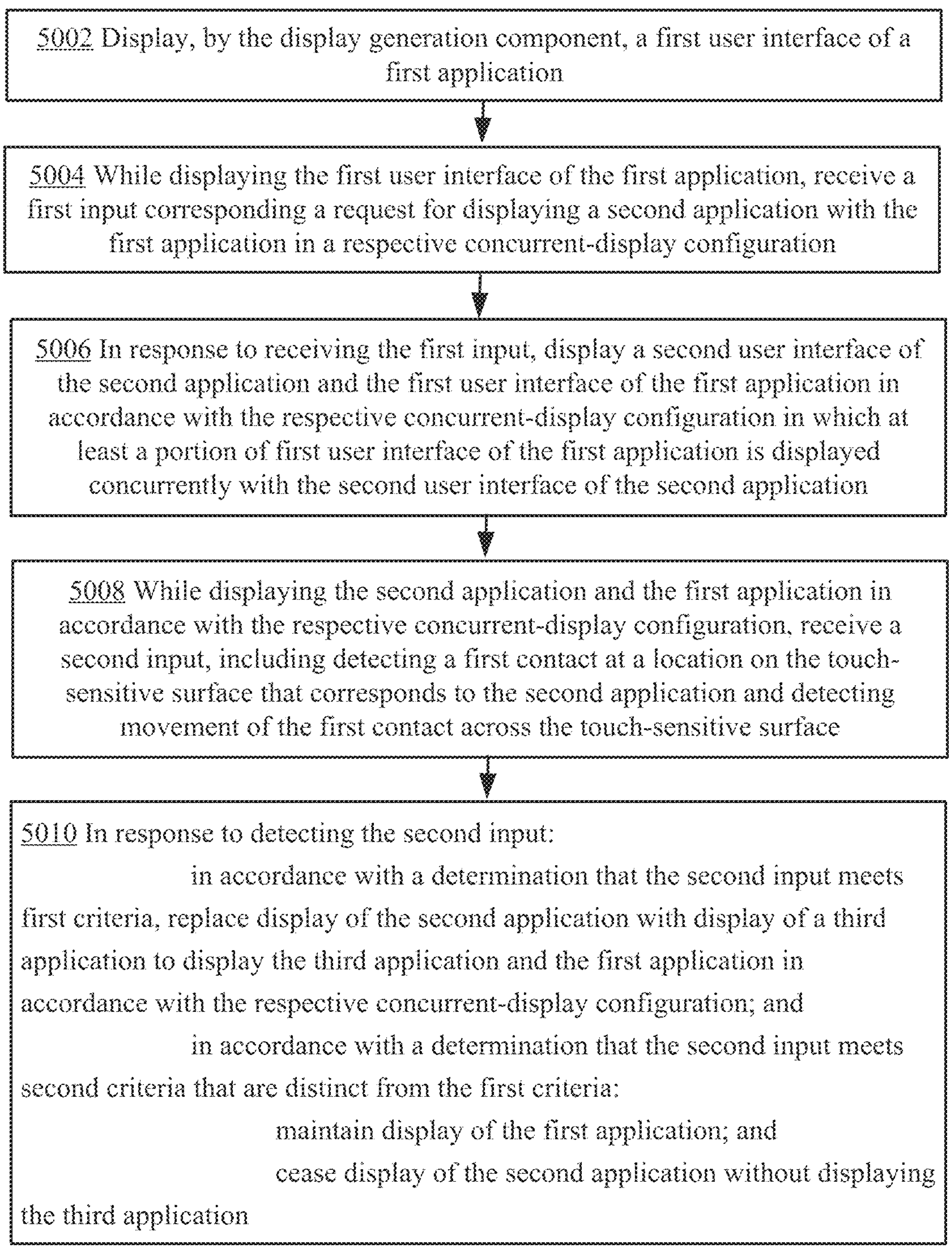
Figure 7A:
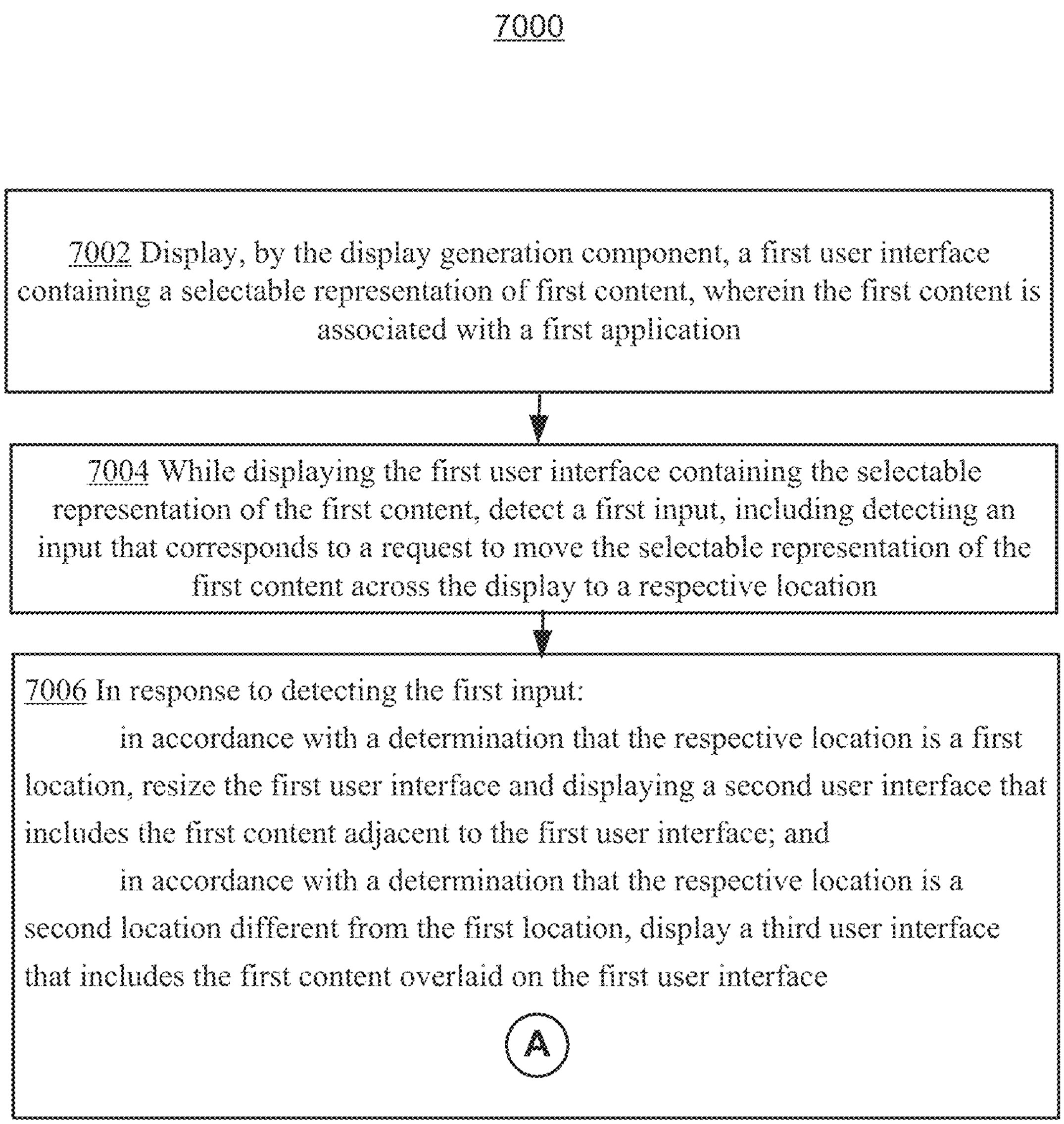

FIG. 2 is a schematic of a touch-sensitive display used to illustrate a user interface for a menu of applications, in accordance with some embodiments. Similar user interfaces are, optionally, implemented on device 100 (FIG. 1A). In some embodiments, user interface 201*a* includes the following elements, or a subset or superset thereof:

- Signal strength indicator(s) 202 for wireless communication(s), such as cellular and Wi-Fi signals;
- Time;
- Bluetooth indicator 205;
- Battery status indicator 207;
- Tray 203 with icons for frequently used applications, such as:
  - Icon 216 for telephone module 138, labeled "Phone," which optionally includes an indicator 214 of the number of missed calls or voicemail messages;
  - Icon 218 for email client module 140, labeled "Mail," which optionally includes an indicator 210 of the number of unread emails;
  - Icon 220 for browser module 147, labeled "Browser;" and
  - Icon 222 for video and music player module 152 (also referred to herein as a video or video-browsing application), also referred to as IPOD (trademark of APPLE Inc.) module 152, labeled "iPod;" and
- Icons for other applications, such as:
  - Icon 224 for IM module 141, labeled "Messages;"
  - Icon 226 for calendar module 148, labeled "Calendar;"
  - Icon 228 for image management module 144, labeled "Photos;"
  - Icon 230 for camera module 143, labeled "Camera;"
  - Icon 232 for online video module 155, labeled "Online Video"
  - Icon 234 for stocks widget 149-2, labeled "Stocks;"
  - Icon 236 for map module 154, labeled "Maps;"
  - Icon 238 for weather widget 149-1, labeled "Weather;"
  - Icon 240 for alarm clock widget 149-4, labeled "Clock;"
  - Icon 242 for fitness module 142, labeled "Fitness;"
  - Icon 244 for notes module 153, labeled "Notes;"
  - Icon 246 for a settings application or module, which provides access to settings for device 100 and its various applications; and
  - Other icons for additional applications, such as App Store, iTunes, Voice Memos, and Utilities.

It should be noted that the icon labels illustrated in FIG. 2 are merely examples. Other labels are, optionally, used for various application icons. For example, icon 242 for fitness module 142 is alternatively labeled "Fitness Support," "Workout," "Workout Support," "Exercise," "Exercise Support," or "Health." In some embodiments, a label for a respective application icon includes a name of an application corresponding to the respective application icon. In some embodiments, a label for a particular application icon is distinct from a name of an application corresponding to the particular application icon.

In some embodiments, the home screen includes two regions: a tray 203 and an icon region 201. As shown in FIG. 2, the icon region 201 is displayed above the tray 203. However, the icon region 201 and the tray 203 (also referred to as a "dock") are optionally displayed in positions other than those described herein.

The tray 203 optionally includes icons of the user's favorite applications on the computing device 100. Initially, the tray 203 may include a set of default icons. The user may customize the tray 203 to include other icons than the default icons. In some embodiments, the user customizes the tray 203 by selecting an icon from the icon region 201 and dragging and dropping the selected icon into the tray 203 to add the icon to the tray 203. To remove an icon from the tray 203, the user selects an icon displayed in the favorites region for a threshold amount of time which causes the computing device 100 to display a control to remove the icon. User selection of the control causes the computing device 100 to remove the icon from the tray 203. In some embodiments, the tray 203 is replaced by a dock 4006 (as described in more detail below) and, therefore, the details provided above in reference to tray 203 may also apply to the dock 4006 may supplement descriptions of the dock 4006 that are provided below.

In the present disclosure, references to a "split-screen mode" refer to a mode in which at least two applications are simultaneously displayed side-by-side on the display 112, and in which both applications may be interacted with (e.g., an email application and an instant messaging application are displayed in a split-screen mode in FIG. 4E1). The split-screen mode is also referred to as a "side-by-side" display configuration, or a "split-screen" display configuration. In some embodiments, the at least two applications concurrently displayed in the split-screen mode may also be "pinned" together, which refers to an association (stored in memory of the device 100) between the at least two applications that causes the two applications to be displayed together when either of the at least two applications is recalled to the display. In some embodiments, an affordance (e.g., a drag handle displayed near the top edge of the application window) may be used to un-pin applications and instead display one of the at least two applications as overlaying the other, and this overlay display mode is referred to as a slide-over display mode (e.g., the email application and the instant messaging application shown in the slide-over mode in FIG. 5E2). The slide-over mode is also referred to as the "slide-over" display configuration or "slide-over view". A slide-over window may also be referred to as an "overlay" for a background full-screen window or a pair of split-screen windows. In some embodiments, the at least two applications concurrently displayed in the slide-over mode are not "pinned" together; thus, when one of the at least two applications is displayed, the other application is optionally not displayed at the same time, and is optionally displayed concurrently with another application. In some embodiments, an affordance (e.g., a drag handle displayed near the top edge of the application window) may be used to pin the applications together and display them in the split-screen mode. Users may also be able to use a border affordance that is a displayed within a border that runs between the at least two applications while they are displayed in the split-screen mode to un-pin or dismiss one of the at least two applications (e.g., by dragging the border affordance until it reaches an edge of the display 112 that borders a first application of the at least two applications, then that first application is dismissed and the at least two applications are then un-pinned). The use of a border affordance (or a gesture at a border between two applications) to dismiss a pinned application is discussed in more detail in commonly-owned U.S. patent application Ser. No. 14/732,618 (e.g., at FIGS. 37H-37M and in the associated descriptive paragraphs), which is hereby incorporated by reference in its entirety. Although many examples provided herein refer to different applications being displayed in the split-screen mode and the slide-over mode, many of the examples are also valid if the windows of the different applications are replaced with different windows of the same application displayed in the split-screen mode or the slide-over mode, unless explicitly state otherwise.

FIGS. 4A1-4A50, 4B1-4B51, 4C1-4C48, 4D1-4D19, and 4E1-4E28 are schematics of a touch-sensitive display used to illustrate user interfaces for interacting with multiple applications and/or windows, in accordance with some embodiments.

FIGS. 4A1-4A50 illustrate user interface behaviors of application windows displayed in the slide-over mode, in accordance with some embodiments. Interactions with an overlay-switcher user interface that concurrently displays multiple slide-over windows corresponding to different applications are also described. The user interfaces in these figures are used to illustrate the processes described below, including the processes in FIGS. 5A-5I. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

As a context for the descriptions below, in some embodiments, a home screen user interface includes a plurality of application icons corresponding to different applications installed on the device. Each application icon, when activated by a user (e.g., by a tap input), causes the device to launch a corresponding application and display a user interface (e.g., a default initial user interface or a last displayed user interface) of the application on the display. A dock is a container user interface object that includes a subset of application icons selected from the home screen user interface, to provide quick access to a small number of frequently used applications. The application icons included in the dock are optionally selected by the user (e.g., via a settings user interface), or automatically selected by the device based on various criteria (e.g., usage frequency or time since last use). In some embodiments, the dock is displayed as part of the home screen user interface (e.g., overlaying a bottom portion of the home screen user interface). In some embodiments, the dock is displayed over a portion of another user interface (e.g., an application user interface) independent of the home screen user interface, in response to a user request (e.g., a gesture that meets dock-display criteria (e.g., an upward swipe gesture that starts from the bottom edge portion of the touch-screen)). An application-switcher user interface displays representations of a plurality of recently open applications (e.g., arranged in an order based on the time that the applications were last displayed). The representation of a respective recently open application (e.g., a snapshot of a last displayed user interface of the respective recently open application), when selected (e.g., by a tap input), causes the device to redisplay the last-displayed user interface of the respective recently open application on the screen. In some embodiments, the application-switcher user interface displays windows of different display configurations (e.g., full-screen windows, slide-over windows, and split-screen windows, minimized windows, and/or draft windows, etc.) that may correspond to the same or different applications.

As shown in FIG. 4A1, a first application window of a first application (e.g., a window 4002 of a maps application) is displayed on touch-screen 112 in a stand-alone display configuration (e.g., also a full-screen display configuration), without being concurrently displayed with another application window of the same application or another application. The first application window 4002 displays a portion of a first user interface (e.g., a searchable map interface) of the first application. An input that satisfies dock-display criteria (e.g., an upward edge swipe input by a contact 4004) is detected on touch-screen 112 (e.g., near the bottom edge portion of the touch-screen 112), as shown in FIGS. 4A1-4A2. In response to detecting the input that satisfies the dock-display criteria, the dock 4006 is displayed overlaying the first application window of the first application (e.g., window 4002). The dock 4006 includes a plurality of application icons, corresponding to different applications (e.g., icon 216 for a telephony application, icon 218 for an email application, icon 220 for a browser application, and icon 232 for an online video application). In some embodiments, the dock includes an application icon of the currently displayed application (e.g., the maps application) and one or more most recently displayed applications. In some embodiments, the dock is temporarily removed from the display in response to an input that meets dock-dismissal criteria (e.g., a downward swipe gesture on the dock that moves toward the bottom edge of the touch-screen).

In FIGS. 4A4-4A7, a second application window (e.g., window 4010 in FIG. 4A7) of a second application (e.g., the online video application) is displayed overlaying the first application window (e.g., window 4002) of the first application, in a slide-over display configuration, in accordance with some embodiments. The second application window of the second application displays a portion of a second user interface of the second application (e.g., a media player user interface of the online video application). As shown in FIG. 4A4, while the first window 4002 of the first application (e.g., the maps application) is displayed, an input that meets selection criteria (e.g., a stationary touch-hold input or light press input by a contact 4008) is detected on application icon 232 for the online video application and enables initiation of a drag operation on the application icon 232 with subsequent movement of the input (e.g., movement of the contact 4008 away from its touch-down location). In FIGS. 4A5 and 4A6, a representation of the second application (e.g., representation 4012) is dragged across the touch-screen in accordance with the movement of the input (e.g., movement of the contact 4008). When the contact 4008 is over a portion of the touch-screen that displays the first user interface of the first application (e.g., the maps application) and that is outside of a first predefined portion of the touch-screen (e.g., predefined area 4014 (also referred to as predefined region 4308 in FIG. 4D3, and Zone F in FIG. 4E8), within a threshold distance of a predefined side edge (e.g., right edge and/or left edge)) of the touch-screen, as shown in FIG. 4A5, the representation 4012 of the second application that is dragged by the contact 4008 has a first appearance (e.g., the same appearance as the original application icon 232), indicating that, if the input is ended (e.g., lift-off of the contact 4008 is detected) at the current location, the drag operation will be canceled and the display state shown prior to the detection of the input would be restored. When the contact 4008 is moved over a portion of the touch-screen that is within the first predefined portion of the touch-screen (e.g., predefined area 4014), the electronic device displays a visual feedback (e.g., the representation 4012 of the second application is elongated), as shown in FIG. 4A6, indicating that, if the input ends at the current location within the first predefined portion of the touch-screen, a window of the second application will be displayed with the first window of the first application in a respective concurrent-display configuration (e.g., a slide-over display configuration, with the window of the second application overlaying a portion of the first window of the first application). In some embodiments, other visual feedback, such as a reduction of the display size of the first window 4002 of the first application on the touch-screen (e.g., revealing an underlying background around the reduced first window) and/or a change in visual clarity of the first window 4002 of the first application (e.g., blurring and/or darkening of the window 4002), is provided to indicate that the second application (e.g., the online video application) will be opened in a slide-over display configuration with the currently open application (e.g., the maps application). As shown in FIG. 4A7, after the input ended while the contact 4008 is over the first predefined portion 4014 of the touch-screen, the device opens a window of the second application (e.g., the window 4010 of the online video application) overlaying a portion of the first window of the first application (e.g., the window 4002 of the maps application), and overlaying at least a portion of the first predefined portion 4014 of the touch-screen. In some embodiments, the window 4002 is displayed in the configuration shown in FIG. 4A7, when the second application has no open window or a single open window at the time that the contact 4008 was detected. In some embodiments, if the second application has multiple windows open, the representations of the multiple windows of the second application are displayed (e.g., in a window-selector user interface for the second application), and the user selects one of the multiple windows to display with the first application in the slide-over configuration (e.g., by tapping on the representation of the desired window of the second application in the window-selector user interface). More details regarding the behavior related to the multiple windows of the second application are provided with respect to FIGS. 4D1-4D19, for example.

In FIGS. 4A8-4A11, another input by a contact 4016 selects a third application (e.g., a touch-hold input or light press input on the application icon 220 for the browser application) and drags a representation of the third application (e.g., a representation 4018) across the touch-screen in accordance with movement of the input (e.g., movement of the contact 4016 following the initial stationary portion of the input by the contact 4016), in an analogous manner as that shown in FIGS. 4A4-4A7 for the second application (e.g., the online video application). As shown in FIG. 4A10, when the contact 4016 is within the predefined area 4014 near the side edge of the touch-screen, the representation 4018 of the third application is elongated and expanded laterally, to indicate that, if the input ends at the current location, a window of the third application (e.g., the browser application) will be displayed in a slide-over display configuration with the first window 4002 of the first application (e.g., the maps application). In FIG. 4A11, in response to detecting the end of the input by the contact 4016 (e.g., detecting lift-off of the contact 4016), the device displays a window 4020 of the browser application overlaying a portion of the window 4002 of the maps application. As shown in FIG. 4A11, the window 4020 of the browser application completely obscures the windows 4010, or replaces the window 4010, as the currently displayed slide-over window overlaying the window 4002 of the maps application.

In some embodiments, the interactions shown in FIGS. 4A1-4A11 results in multiple slide-over windows (e.g., window 4010 and window 4020) to be added to a listing of zero or more slide-over windows stored in the memory of the device. FIGS. 4A12-4A50 illustrate various interactions with the listing of slide-over windows starting from the state shown in FIG. 4A12, e.g., with a slide-over window of one application displayed overlaying a portion of full-screen window of another application (e.g., the same application or a different application as the application corresponding to the slide-over window).

In FIG. 4A12, a number of inputs (e.g., a number of swipe inputs) are represented (e.g., by different contacts 4021, 4022, 4023, 4024, 4025, 4026, 4027, and 4066) on the touch-screen, corresponding to input at different locations and/or with different movement directions. In some embodiments, these inputs are separate inputs detected at different times on the screen when the screen displays window 4020 and window 4002 in the slide-over mode. In some embodiments, the device detects a single input, determines the characteristics of the input based on the location and/or movement direction of the input, and in accordance with the location and/or movement direction of the input (e.g., as evaluated against different criteria for performing different operations (e.g., system-level operations (e.g., navigating between applications, switching between slide-over windows, converting between display configurations, opening a document across applications, etc.) or application-level operations (e.g., activating a user interface element within a user interface of a displayed application, scrolling a user interface within a displayed application, etc.))), performs different operations as described with respect to FIGS. 4A13-4A50.

In FIG. 4A13-4A14, following 4A12, an input by contact 4024 is detected at a location that corresponds to a drag handle region of the slide-over window 4020 (e.g., near the top edge of the window 4020), and the input includes movement of the contact 4024 in a first direction (e.g., leftward, substantially horizontal) toward an opposite side edge of the display of the side occupied by window 4020. As shown in FIG. 4A13, the slide-over window 4020 is dragged across the display, overlaying a portion of the window 4002. In FIG. 4A13, even though the window 4020 is dragged away from its original location on the right side of the display, the previously displayed slide-over window 4010 is not revealed or displayed at that location on the right side of the display, after the window 4020 is moved away by the drag input by the contact 4024. In FIG. 4A14, after the input by the contact 4024 ended near the left side edge of the display (e.g., lift-off of the contact 4024 is detected within a first threshold distance of the left side edge of the display, and within a second threshold distance from the top edge of the display, e.g., in Zone H or Zone B in FIG. 4E8), the device displays the window 4020 overlaying a portion of the window 4002 on the left side of the display (e.g., in an altered concurrent display configuration from before (e.g., switched sides, but remained in the slide-over mode)).

In FIG. 4A15, following FIG. 4A12, an input by the contact 4025 is detected at a location that corresponds to a drag handle region of the slide-over window 4020 (e.g., near the top edge of the window 4020), and the input includes movement of the contact 4025 in a second direction (e.g., rightward, slightly downward) toward the side edge of the display (e.g., the side edge on the side occupied by the window 4020) and ended in Zone E shown in FIG. 4E8. As shown in FIG. 4A15, in response to the end of the input in Zone E (FIG. 4E8), the slide-over window 4020 is converted to the side-by-side window 4028, and the full-screen window 4002 is converted to a side-by-side window 4030. The window 4028 and the window 4030 are displayed in a side-by-side display configuration (or split-screen mode). In this scenario, the window 4028 and 4030 are pinned together, and will be displayed together in the split-screen configuration when either window is recalled to the display again later. In addition, the slide-over window 4020 is removed from the listing of slide-over windows stored in memory, and will not be recalled to the display as a slide-over window.

In FIGS. 4A16-4A18, following FIG. 4A12, an input by the contact 4021 is detected at a location within a bottom edge region of the touch-screen, and the input includes movement of the contact 4021 in a third direction (e.g., upward) toward the top edge of the touch-screen. In accordance with a determination that the input meets application-switcher display criteria (e.g., the speed and/or distance of the input meets predefined speed and/or distance thresholds for navigating to the application-switcher user interface), as shown in FIGS. 4A16-4A18, an animated sequence is displayed, showing the transition from the current display state of the screen (e.g., FIG. 4A12) to displaying an application-switcher user interface 4032 (e.g., also referred to as a multitasking user interface) (e.g., FIG. 4A18). In the animated sequence, the full-screen window 4002 is reduced in size and moves upward with the movement of the contact 4021. The slide-over window 4020 is reduced in size and moves away from the representation of the window 4002, such that they are no longer overlapping in the transitional user interface 4032' shown in FIG. 4A16. In FIG. 4A17, other windows stored in the memory of the device (e.g., recently open windows with stored states in memory) are revealed in the transitional user interface 4032', including full-screen windows, split-screen windows, and slide-over windows that are currently available on the device to be recalled to the display with the stored display states. FIG. 4A18 illustrates the application-switcher user interface 4032, including representations of full-screen windows (e.g., a representation 4002' for the window 4002, a representation 4034' for a full-screen email window 4034), representations for pairs of windows displayed in the split-screen mode (e.g., a representation 4036' for a window 4030 and a window 4028 displayed in the split-screen mode, and a representation 4038' for a browser window and an email window displayed in the split-screen mode), and representations for slide-over windows (e.g., a representation 4020' for the window 4020, a representation 4010' for the window 4010, a representation 4040' for an email slide-over window, and a representation 4042' for a photos slide-over window).

In some embodiments, the windows with different display configurations are grouped and shown in different regions of the application-switcher user interface 4032, and within each group, the windows are ordered in accordance with respective timestamps for when the windows were last displayed. For example, in the region including the representations for the slide-over windows, the window 4020 is the most recently displayed slide-over window, and its corresponding representation 4020' is displayed in the left-most position in a row, with the representation 4010' for the slide-over window 4010 displayed next to it. The slide-over windows represented by the representations 4040' and 4042' were displayed at times earlier than when the window 4010 was last displayed.

In some embodiments, each representation of an application window in the application-switcher user interface 4032 is displayed with an identifier (e.g., an application name and an application icon) for the application of the window, and with an identifier (e.g., a window name that is automatically generated based on the content of the window) for the window of the application.

In some embodiments, each representation of a window in the application-switcher user interface, when activated (e.g., by a tap input), causes the device to redisplay that window on the display. If the activated representation corresponds to a full screen window (e.g., the window 4002 or the window 4034), then the window is recalled to the screen in the full-screen, stand-alone display configuration, without another application being concurrently displayed on the screen. In some embodiments, even if the full-screen window was last displayed concurrently with another slide-over window on top, when the full-screen window is recalled to the screen from the application-switcher user interface 4032, the full-screen window is displayed without the slide-over window on top. In some embodiments, when the representation of a slide-over window (e.g., the window 4010, the window 4020, the window 4040, or the window 4042) is activated in the application-switcher user interface 4032, the slide-over window is recalled to the display with another full-screen or split screen window (e.g., the window 4002, the window 4034, or a pair of windows in the split-screen configuration) underlying the slide-over window. In some embodiments, the window underlying the slide-over window is the full-screen window or the pair of split-screen windows that was on display immediately prior to the display of the application-switcher user interface 4032. In some embodiments, the window underlying the slide-over window is the last window that was concurrently displayed with the slide-over window. In some embodiments, when a representation (e.g., the representation 4036' or the representation 4038') of a pair of split-screen windows is activated in the application-switcher user interface 4032, the pair of split-screen window is recalled to the display together in the split-screen mode.

In FIGS. 4A19-4A21, following FIG. 4A12, an input by contact 4022 is detected at a location within a bottom edge region of the slide-over window 4020, and the input includes movement of the contact 4022 in a fourth direction (e.g., substantially horizontally) toward the edge on the side of the screen that the slide-over window 4020 is displayed (e.g., the right edge of the screen). In response to the input by the contact 4022, the slide-over window 4020 is dragged toward the right edge of the screen, and removed from the screen after the end of the input. During the movement of the contact 4022 and the window 4020, other windows in the stack of slide-over windows stored in the memory of the device are represented on the display. For example, as shown in FIGS. 4A19 and 4A20, representations of windows 4010, 4040, and 4042 are revealed from underneath the window 4020. The order of the windows 4020, 4010, 4040, and 4042 corresponds to the order that these windows were last displayed on the screen. In some embodiments, the windows 4020, 4010, 4040, and 4042 are displayed with different depths (e.g., having reduced size and clarity with increased distance from the surface plane of the screen) in the direction perpendicular to the surface plane of the screen. This is different from the scenario shown in FIGS. 4A13-4A14, where there is no indication that other windows were underneath window 4020 (e.g., no other windows were revealed underneath window 4020) when window 4020 is dragged to toward the other side of the screen. In FIGS. 4A19 and 4A20, when the window 4020 is dragged toward the right edge of the screen by an input directed to the bottom edge of the window 4020, the next window (e.g., the window 4010) in the stack of slide-over windows is gradually revealed, and eventually becomes the top window shown overlaying the full-screen window 4002 (as shown in FIG. 4A21).

In FIGS. 4A22-4A25, following FIG. 4A21, an input by a contact 4046 is detected at a location within a bottom edge region of the slide-over window 4010, and the input includes movement of the contact 4046 in the fourth direction (e.g., substantially horizontally) toward the edge on the side of the screen that the slide-over window 4010 is displayed (e.g., the right edge of the screen). In response to the input by the contact 4046, the slide-over window 4010 is dragged toward the right edge of the screen, and removed from the screen after the end of the input. During the movement of the contact 4046 and the window 4010, other windows in the stack of slide-over windows stored in the memory of the device are represented on the display. For example, as shown in FIG. 4A23, representations of the windows 4040, 4042, and 4020 are revealed from underneath the window 4010. In general, if the input by the contact 4046 is detected within a threshold amount of time after the input by the contact 4022, the original top window 4020 is shuffled to the bottom of the stack (e.g., as shown in FIG. 4A23), even through the window 4020 was the most recently displayed window other than the window 4010. If the input by the contact 4046 were detected after the window 4010 have been displayed as the top window for more than the threshold amount of time, then the stack is sorted based on the order that windows were last displayed, and the window 4020 would be inserted between the window 4010 and the window 4040 in the stack shown in FIG. 4A23. In some embodiments, the slide-over stack of windows is only resorted based on the time that the windows were last displayed when the entire stack of slide-over windows are removed from the display (e.g., as shown in FIGS. 4A28-4A29). In FIG. 4A24, after the input by the contact 4046 ended, the window 4040 is displayed as the slide-over window overlaying the full-screen window 4002.

In FIGS. 4A25-4A27, following FIG. 4A24, an input by the contact 4048 is detected at a location within a bottom edge region of the slide-over window 4040, and the input includes movement of the contact 4048 in a fifth direction (e.g., substantially horizontally) away from the edge on the side of the screen that the slide-over window 4040 is displayed (e.g., the right edge of the screen). In response to the input by the contact 4048, the slide-over window 4010 that was just removed from the display is dragged back onto the screen overlaying window 4040. During the movement of the contact 4048 and the window 4010, other windows in the stack of slide-over windows stored in the memory of the device are represented on the display. For example, as shown in FIG. 4A26, representations of the windows 4040, 4042, and 4020 are revealed from underneath the window 4010. In some embodiments, the windows in the stack of slide-over windows are arranged on a circular carousel with the bottom card and the top card arranged next to each other. Swiping in one direction scrolls through the windows in that direction around the circular carousel, and swiping in the opposite direction scrolls through the windows in the opposite direction. After the end of the input by the contact 4048 is detected, the window 4010 is displayed as the slide-over window overlaying the full-screen window 4002, as shown in FIG. 4A27. This is also in contrast to the scenario of dragging the top slide-over window to the other side of the screen with an input directed to the top edge region of the top slide-over window, where no other window is revealed underneath the top slide-over window, and no other window is added over the top slide-over window during the movement of the input. In this scenario, when the top slide-over window (e.g., the window 4040) is flicked or dragged away from the right edge of the screen toward the left, another window (e.g., the window 4010) is shown over the dragged window (e.g., the window 4040), and at least one window (e.g., the window 4042 and the window 4020) is shown underneath the dragged window (e.g., the window 4010).

In FIGS. 4A28-4A29, following FIG. 4A12, an input by the contact 4027 is detected at a location near a left side edge of the slide-over window 4020, and the input includes movement of the contact 4027 in a sixth direction (e.g., substantially horizontally) toward the edge on the side of the screen that the slide-over window 4020 is displayed (e.g., the right edge of the screen). In some embodiments, the device requires that the input is detected on the left side edge or within a threshold distance of the left-side edge of the window 4020, in order to trigger the operation to remove the stack of slide-over window(s) from the display. In some embodiments, as shown in FIG. 4A28, during the movement of the contact 4027 toward the right edge of the display, the window 4020 is gradually dragged off of the display, and visual indications of other windows in the stack of slide-over windows are shown trailing window 4020's movement. After the end of the input by the contact 4027 is detected, the window 4020 is removed from the display, and no other slide-over window is shown on the display concurrently with the background window 4002. The window 4002 is displayed as a full-screen window in a standalone display configuration, rather than as a full-screen background window for a slide-over window in the slide-over display configuration. This is in contrast to the scenario shown in FIG. 4A50 following FIG. 5A12, where an input by a contact 4026 detected outside of the slide-over window 4020 and including movement in the sixth direction (e.g., substantially horizontally toward the right edge of the display) causes a user interface within the window 4002 to shift to the right in accordance with the movement of the contact 4026, without causing any movement of the slide-over window 4020. This is also in contrast to the scenario where the rightward swipe input by the contact 4022 (in FIGS. 4A19-4A21 following 4A12) causes the window 4020 to slide off the display, and causes the underlying window 4010 to become the slide-over window overlaying the background window 4002 after the end of the input.

In FIGS. 4A30-4A32, following FIG. 4A29, an input by a contact 4052 is detected on a side edge of the display (e.g., on the side of the screen that previously displayed a slide-over window (e.g., the window 4020)), and the input includes movement of the contact 4052 in a seventh direction (e.g., substantially horizontally) away from the side edge onto the display. In response to detecting the input by the contact 4052, the last displayed slide-over window (e.g., the window 4020) is dragged back onto the display, overlaying the currently displayed full-screen window (e.g., the window 5004), as shown in FIG. 4A32. In some embodiments, if the window on the display has been switched to another full-screen window in the standalone display configuration (e.g., a full-screen window displayed in response to tapping an application icon in the dock, selecting from a listing of open windows of an application after the application icon is tapped, or an application-switching gesture (e.g., a horizontal swipe along the bottom edge of the currently displayed standalone window)), an input by a contact that is detected on a side edge of the display and that includes horizontal movement of the contact away from the side edge onto the screen, the last displayed slide-over window (e.g., the window 4020) is dragged back onto the display, overlaying the currently displayed full-screen window (e.g., a full-screen window other than the window 4002). In FIG. 4A31, as the window 4020 is dragged back onto the display with leftward movement of the contact 4052, representations of other windows in the stack of slide-over windows are shown underneath window 4020.

In some embodiments, in contrast to the scenario shown in FIGS. 4A30-4A32 following FIG. 4A12, an input by a contact is detected in a region that is a threshold distance away from the side edges of the display (e.g., the side edge on the side of the screen that previously displayed a slide-over window (e.g., the window 4020)), and the input includes movement of the contact 4052 in the seventh direction (e.g., substantially horizontally) away from that side edge on the display. In response to detecting the input by that contact, the last displayed slide-over window (e.g., window 4020) will not be dragged back onto the display. Instead, the input cause performance of an operation in the application (e.g., the maps application) that corresponds to the input, such as shifting the searchable map user interface displayed in the window 4002 relative to the display in accordance with the movement of the contact.

In FIGS. 4A33-4A34, following 4A12, an input by the contact 4023 is detected on the bottom edge of the slide-over window (e.g., the window 4020), and the input includes movement of contact the 4023 in an eight direction (e.g., upward) across the display. In response to detecting the input by the contact 4023 and in accordance with a determination that the movement of the contact 4023 meets preset criteria (e.g., exceeds a threshold amount of movement in the eight direction, or exceeds a threshold speed in the eighth direction), the device displays a transitional user interface 4053 that includes a representation (e.g., a representation 4020') of the slide-over window 4020 that moves in accordance with the movement of the contact 4023. In some embodiments, the background window (e.g., the window 4002) is visually obscured (e.g., blurred and darkened) underneath the representation of the slide-over window in the transitional user interface 4053. In some embodiments, representations of other slide-over windows (e.g., the representations 4010', 4040', and 4042') in the stack of slide-over windows are shown underneath the representation of the top slide-over window (e.g., the representation 4020'), as the representation of the top slide-over window is dragged around the display in accordance with the movement of the contact 4023. In some embodiments, the representations of the slide-over windows are dynamically updated (e.g., changed in size) in accordance with a current position of the representations (and the contact 4023) on the display. In FIG. 4A34, lift-off of the contact 4023 has been detected, and the device displays a slide-over-window-switcher user interface or overlay-switcher user interface 4054 for just the slide-over windows that are currently stored in the stack of slide-over windows stored in memory. In some embodiments, the representations of the slide-over windows in the stack of slide-over windows are displayed and are individually selectable in the overlay-switcher user interface 4054.

The behavior of the overlay-switcher user interface 4054 is analogous to an application-switcher user interface (e.g., application-switcher user interface 4032 in FIG. 4A18) in that, tapping on a representation of a slide-over window in the overlay-switcher user interface 4054 causes that slide-over window to be displayed. As shown in FIG. 4A34, in some embodiments, representations of slide-over windows in the stored stack of slide-over windows are spread out over a background with no overlap between one another. In some embodiments, the representations of the slide-over windows are reduced-scale images of the slide-over windows. In some embodiments, some of the representations of the slide-over windows are not displayed due to the limitation of display size and the total number of slide-over windows in the stack. For example, in FIG. 4A34, there are a total of four slide-over windows in the stack, and representation of one of those windows (e.g., the representation 4042') is only partially visible in the overlay-switcher user interface 4054, initially. If there are additional slide-over windows in the stack, the representations of those additional slide-over windows will not be visible in the overlay-switcher user interface 4054 initially. In some embodiments, instead of displaying the representations of slide-over windows in the overlay-switcher user interface in a fully spread out configuration, the representations are displayed in a stack with the lower layer representations offset by different amounts from the representation of the top slide-over window.

FIG. 4A35 displays the overlay-switcher user interface 4054, including representations of the slide-over windows currently in the stack of slide-over windows. A number of inputs (e.g., tap inputs and swipe inputs) are represented (e.g., by different contacts 4056, 4058, 4059, 4060, 4062, and 4064) on the touch-screen, corresponding to different locations, input types, and/or different movement directions. In some embodiments, these inputs are separate inputs detected at different times on the screen when the screen displays the overlay-switcher user interface 4054. In some embodiments, the device detects a single input, determines the characteristics of the input based on the locations, input type, and/or movement directions of the input, and in accordance with the locations, input type, and/or movement directions of the input (e.g., as evaluated against different criteria for performing different operations (e.g., different system-level operations, such as navigating or browse within the overlay-switcher user interface, exiting the overlay-switcher user interface to display a previously displayed window or a selected window, closing a window in the stack of slide-over windows, etc.), performs different operations as described with respect to FIGS. 4A36-4A42.

In FIGS. 4A36-4A37, following FIG. 4A35, an input by the contact 4056 is detected on one of the displayed representations (e.g., the representation 4010'), and the input includes movement of the contact 4056 in a ninth direction (e.g., horizontally (e.g., rightward)) across the display. In response to detecting the input by the contact 4056 and in accordance with a determination that the input meets preset criteria (e.g., location of the contact 4056 is on a representation of a slide-over window, and direction of movement of the contact 4056 is horizontal), the device scrolls the overlay-switcher user interface 4054 to reveal representations of slide-over windows that are not currently displayed or fully displayed in the overlay-switcher user interface. In some embodiments, the representations displayed near one side of the display (e.g., the representation 4020') gradually moves off the display and the representations on the other side of display gradually comes onto the display in accordance with the movement of the contact 4056, as shown in FIGS. 4A35 and 4A36. In FIG. 4A37, in some embodiments, representations that are moved off the display is added to the end of the stack (e.g., the stack with its end and its beginning connected to each other, analogous to a circular carousel) and redisplayed on the other side of the display with continued movement of the contact 4056 in the same direction. In some embodiments, the device does not require that contact 4056 be detected on a representation of slide-over window in the overlay-switcher user interface 4054, the scrolling of the overlay-switcher user interface 4054 is performed as long as the input includes more than a threshold amount movement in the horizontal direction. In some embodiments, the direction of scrolling is determined in accordance with the direction of the movement of the contact across the display.

In FIGS. 4A38-4A39, following FIG. 4A35, an input by the contact 4058 is detected on one of the displayed representations (e.g., the representation 4010'), and the input includes movement of the contact 4058 in a tenth direction (e.g., vertically (e.g., upward)) across the display. In response to detecting the input by the contact 4058, the representation is removed from the overlay-switcher user interface 4054 and the slide-over window represented by the removed representation is removed from the stored stack of slide-over windows in memory. In other words, the slide-over window corresponding to the removed representation is "closed." In FIG. 4A39, representations of other windows (e.g., representations 4042', 4040', and 4020') that are not closed remain displayed in the overlay-switcher user interface 4054.

In FIG. 4A40, following FIG. 4A35, a tap input by contact 4059 is detected on representation 4010' for window 4010; and in response to detecting the tap input by contact 4059, the device ceases to display the overlay-switcher user interface and displays slide-over window 4010 together with a full-screen background window in the slide-over mode. In some embodiments, the full-screen background window is the last displayed full-screen window (e.g., window 4002), irrespective whether the full-screen window was last displayed together with the selected slide-over window. In some embodiments, the full-screen background window is the full-screen window that was last displayed with the selected slide-over window (e.g., window 4002).

In FIG. 4A41, following FIG. 4A35, a tap input by the contact 4060 is detected on the representation 4040' for the window 4040; and in response to detecting the tap input by the contact 4060, the device ceases to display the overlay-switcher user interface 4054 and displays the slide-over window 4040 together with the full-screen background window in the slide-over mode. In some embodiments, the full-screen background window is the last displayed full-screen window (e.g., the window 4002), irrespective whether the full-screen window was last displayed together with the selected slide-over window. In some embodiments, the full-screen background window is the full-screen window that was last displayed with the selected slide-over window (e.g., the window 4002 or another window different from the window 4002).

In FIG. 4A42, following FIG. 4A35, a tap input by the contact 4062 is detected on the representation 4020' for the window 4020; and in response to detecting the tap input by the contact 4062, the device ceases to display the overlay-switcher user interface 4054 and displays the slide-over window 4020 together with a full-screen background window in the slide-over mode. In some embodiments, the full-screen background window is the last displayed full-screen window (e.g., the window 4002), irrespective whether the full-screen window was last displayed together with the selected slide-over window. In some embodiments, the full-screen background window is the full-screen window that was last displayed with the selected slide-over window (e.g., the window 4002).

In addition, the state shown in FIG. 4A42 is also displayed in response to a tap input by the contact 4064 that is detected on a portion of the overlay-switcher user interface 4054 that is unoccupied by any representations of slide-over windows. In some embodiments, the overlay-switcher user interface 4054 includes a closing affordance, and a tap input detected on the closing affordance also causes the device to cease to display the overlay-switcher user interface 4054 and redisplay the last displayed user interface state (e.g., the window 4020 overlaying the window 4002 in the slide-over mode).

FIGS. 4A43-4A46, following FIG. 4A42, illustrate that a swipe input by the contact 4066 is detected within a bottom edge region of the display, and the movement of the contact 4066 is substantially horizontal (e.g., includes no vertical movement, or a small amount of vertical movement as compared to the horizontal movement). In response to the edge swipe input, and in accordance with a determination that the edge swipe input meets application-switching criteria (e.g., meets the distance and speed criteria of the application-switching criteria), the window 4002 is dragged off the screen, and replaced by a window 4034 that was the last displayed full-screen window prior to the window 4002. As shown in FIGS. 4A43-4A45, while the background full-screen window is changed, the slide-over window 4020 is unaffected by the input by the contact 4066. After the end of the input by the contact 4066, the slide-over window 4020 is overlaid on the window 4034 in the slide-over mode, as shown in FIG. 4A46. In some embodiments, the process shown in FIGS. 4A43-4A46 can also start from the user interface shown in FIG. 4A12. In some embodiments, the user interface shown in FIG. 4A12 does not include the dock (e.g., after the dock is removed by a downward swipe on the dock). In some embodiments, the window 4034 is a full-screen window of another application (e.g., the email application) that is distinct from the application (e.g., the maps application) of the full-screen window initially displayed underneath the slide-over window 4020. In some embodiments, the window 4034 is a full-screen window of the same application as that of the full-screen window initially displayed underneath the slide-over window 4020.

In FIG. 4A46, another input by the contact 4068 is detected on a document (e.g., an email message in a listing of email messages in the email application) represented in the window 4034. An initial portion of the input by the contact 4068 has met the criteria for initiating a drag operation on the document (e.g., the input is a tap-hold input that is kept substantially stationary for at least a threshold amount of time after touch-down of the contact on the document, or the input is a light press input that has an intensity of the contact exceeding a threshold intensity that is greater than a nominal contact detection intensity threshold), and the document is selected (e.g., as indicated by the visual highlighting of the document).

In FIG. 4A47, a representation 4070 of the document is dragged across the display in accordance with the movement of contact 4068. In FIG. 4A48, when contact 4068 is within a predefined region (e.g., the predefined region 4014 for opening a slide-over window by dropping an application icon onto it, or a reduced-size version of the predefined region 4014) of the display, the representation of the document is transformed (e.g., into the representation 4044') into a state that displays a preview of a new slide-over window displaying the document in the document's native application.

In FIG. 4A49, after the input ended (e.g., lift-off of the contact 4068 was detected within the predefined region 4014 or a reduced-size version of the predefined region 4014), the document is opened in a slide-over window of the document's native application (e.g., a slide-over window of the email application), and the slide-over window 4044 displaying the document becomes the top slide-over window overlaying the background full-screen window 4034.

In some embodiments, if the input ended over other locations on the display, other operations may be performed. For example, in some embodiments, if the input ended in a region of the display that corresponds to opening a new window in a split view mode, the document will be opened in a new window that is displayed side-by-side with a resized version (e.g., a reduced-width version) of the email application window 4034. In some embodiments, if the input ended in a region of the display that is over the slide-over window but outside of the predefined regions for opening a new window for the document, and the slide-over window presents an acceptable drop location for the document, the document will be inserted into the drop location in the slide-over window (e.g., inserted into another document, or message, or storage location shown in the slide-over window). In some embodiments, if the input ended outside of the slide-over window, the document will be dropped into an acceptable drop location in the window 4034 (if it is available) that corresponds to the end location of the input, or returned to the original location if no acceptable drop location is available.

In FIG. 4A50, following FIG. 4A12, an input by the contact 4026 is detected outside of the slide-over window 4020, and includes movement of the contact 4026 is a respective direction. In response to the movement of the contact, the device performs an operation within the application corresponding to the background full-screen window 4002, e.g., shifting the maps in accordance the movement of the contact 4026. Because the starting position of the contact 4026 is outside of the slide-over window 4020, the application-level operation is initiated and continues, even when the contact later moves over an area in which the slide-over window 4020 is displayed.

FIGS. 4B1-4B51 illustrate user interface behaviors in response to a user's request to switch applications by selecting an application icon, in accordance with some embodiments. The request to switch application is integrated with a request to view an window-switcher user interface of the application in the same gesture. The device automatically determines whether to switch application or display the window-switcher user interface for the currently displayed application based on whether the currently displayed application currently has more than one windows. User interactions with a window-switcher user interface that concurrently displays multiple windows corresponding to a respective application are also described in accordance with some embodiments. The user interfaces in these figures are used to illustrate the processes described below, including the processes in FIGS. 6A-6E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 4B1-4B4 illustrate an interaction where a user selects an application icon to open a corresponding application, while the corresponding application is currently displayed.

As shown in FIG. 4B1, a full-screen window 4102 of an email application is displayed on the touch screen 112. In this example, the full-screen window 4102 is displayed in a full-screen standalone display configuration, and there are no other windows concurrently displayed on the screen. In some embodiments, the device have the same response as described below, irrespective of whether the full-screen window 4102 is displayed in the standalone configuration or as a background window for a slide-over window (e.g., of the same or different applications) in a slide-over mode. In FIG. 4B1, an input by a contact 4104 is detected at a location on the screen that corresponds to a first application icon (e.g., the application icon 218 for the email application) in the dock 4006 that is overlaid on the full-screen window 4102. In response to detecting the input, and in accordance with a determination that the input meets selection criteria (e.g., the input meets the criteria (e.g., location and time criteria) for detecting a tap input on the application icon), the device determines whether the selected icon corresponds the application of the currently displayed window. In this scenario, the currently displayed window (e.g., the window 4102) and the selected application icon (e.g., the application icon 218) both correspond to the email application. In response to determining that the currently displayed window (e.g., the window 4102) and the selected application icon (e.g., the application icon 218) both correspond to the email application, the device determines whether the application is associated with multiple windows (e.g., having multiple open windows saved in memory, as "open" windows that can be recalled to the screen with the saved last displayed state). In this scenario, in accordance with a determination that the email application has more than one open windows at this time, the device displays a window-switcher user interface 4018 (FIG. 4B4) that concurrently displays representations of the multiple open windows associated with the email application. This is in contrast to a scenario where the application icon of the email application is activated by an input that meets the selection criteria, if the email application is not the currently displayed application (e.g., when another application is the currently displayed application or when a system user interface (e.g., a home screen user interface) is currently displayed).

In FIGS. 4B2-4B3, an animated transition is displayed in response to determining that the input by the contact 4104 has met the selection criteria and that the currently displayed window and the selected application icon correspond to the same application, and the application is associated with multiple windows. The animated transition shows that the currently displayed full-screen window 4102 is reduced in size and becomes a representation (e.g., a reduced scale image) 4102' of the window 4102, and representations of other windows (e.g., a representation 4016' of a slide-over email window 4106, and a representation 4110' of an email window and a photos window shown in the split-screen mode, in FIG. 4B4) appears on the screen overlaying a background of the window-switcher user interface 4108. In FIG. 4B4, after the end of the input by the contact 4104 and the completion of the animated transition, the window-switcher user interface 4108 is displayed, replacing the full-screen window 4102 of the email application on the screen. In this scenario, the window-switcher user interface 4108 is displayed in a state with representations of all the saved windows associated the email application, including representations of all full-screen windows (e.g., the representation 4102' for the full-screen window 4102), representations for all slide-over windows (e.g., the representation 4106' for the slide-over window 4106), and representations for all windows displayed in the split-screen mode (e.g., the representation 4102' for an email window displayed in split-screen mode with a photos window), overlaid on a background (e.g., a blurred or darkened image of the full-screen window 4102). Each representation in the window-switcher user interface 4108, when activated by an input that meets the selection criteria (e.g., a tap input), causes the device to cease to display the window-switcher user interface and display the window that corresponds to the selected representation, accomplishing the task to return to the previously displayed window (e.g., if the representation of the originally displayed window is selected) or switch to a different window of the same application (e.g., if representation of a window other than the originally displayed window is selected).

Also shown in FIG. 4B4, a closing affordance 4114 is provided in the window-switcher user interface 4108. The closing affordance, when activated by an input that meets the selection criteria (e.g., a tap input), causes the device to cease to display the window-switcher user interface 4108 and redisplay the full-screen window 4102. A new-window affordance 4112 is also provided in the window-switcher user interface 4108. The new-window affordance 4112, when activated by an input that meets the selection criteria (e.g., a tap input), causes the device to cease to display the window-switcher user interface 4108 and displays a new window (e.g., a default window (e.g., an email inbox user interface, a draft email user interface, a new messages user interface, etc.)) of the email application.

In FIGS. 4B4, an input by the contact 4118 is detected on the representation 4102' of the originally displayed full-screen window 4102. In response to detecting the input by the contact 4118 and in accordance with a determination that the input meets the first criteria (e.g., the input is a tap input), the device ceases to display the window-switcher user interface 4108 and displays full-screen window 4102, as shown in FIG. 4B5.

FIG. 4B5 illustrates that an input by a contact 4120 is detected on the application icon 224 for the messages application, while the full-screen window 4102 of the email application is displayed. In accordance with a determination that the input by the contact 4120 meets the first criteria (e.g., the input is a tap input), the device determines whether the application icon 224 and the currently displayed window 4102 correspond to the same application. In accordance with a determination that the application icon 224 and the currently displayed window 4102 do not correspond to the same application, the device ceases to display the full-screen window 4102 and displays the full-screen window 4122 (e.g., a default window of the messages application (e.g., the last displayed full-screen window of the messages application)) that corresponds to the messages application, as shown in FIG. 4B6. In the example scenario shown in FIGS. 4B5-4B6, the user's request to switch application is fulfilled without regard to whether the messages application is associated with multiple windows at this time, or whether the email application is associated with multiple windows at this time, because the user selected the application icon of an application that is different from the currently displayed application.

FIGS. 4B7-4B8 illustrate a scenario that is in contrast to that shown in FIGS. 4B1-4B4. In the example scenario shown in FIGS. 4B7-4B8, the full-screen window 4122 of the messages application is displayed on the touch screen 112. In some embodiments, the device has the same response as described below, irrespective of whether the full-screen window 4102 is displayed in the standalone configuration or as a background window for a slide-over window (e.g., of the same or different applications) in a slide-over mode. In FIG. 4B7, an input by a contact 4124 is detected at a location on the screen that corresponds to the application icon 224 for the messages application in the dock 4006 that is overlaid on the full-screen window 4122 of the messages window 4122. In response to detecting the input, and in accordance with a determination that the input meets the selection criteria, the device determines whether the selected application icon corresponds to the application of the currently displayed window. In this scenario, the currently displayed window (e.g., the window 4122) and the selected application icon (e.g., the application icon 224) both correspond to the messages application. In response to determining that the currently displayed window (e.g., the window 4122) and the activated application (e.g., the application icon 224) both correspond to the messages application, the device determines whether the application is associated with multiple windows (e.g., having multiple open windows saved in memory, as "open" windows that can be recalled to the screen with the saved last displayed state). In this scenario, in accordance with a determination that the messages application does not have more than one open window at this time, the device provides one or more outputs (e.g., corresponding to visual feedback, audio feedback, and/or haptic feedback) to indicate that neither the application-switching operation nor the window-switcher-display operation will be initiated in response to the input by contact 4124. In FIG. 4B8, the application icon 224 shakes in response to the input by the contact 4124, optionally, in conjunction with an audio or haptic alert, to indicate that the currently displayed window and the selected application icon correspond to the same application and that the application is not associated with multiple windows, and to indicate that no application-switching or window-switcher-display operation will be performed.

FIGS. 4B9-4B13, following FIG. 4B8, illustrate a process in which an additional window is opened in the messages application, such that there are more than one window associated with the messages application at the end of the process. There are other ways to open additional windows in the messages application, and the process shown in FIG. 4B9-4B13 is merely one of multiple ways to open additional windows in an application.

As shown in FIG. 4B9, an input by a contact 4128 is detected at a location on the full-screen window 4122 that corresponds to a representation 4130 for a conversation with Greg Kane. In response to detecting the input by the contact 4128, and in accordance with a determination that an initial portion of the input meets object-move criteria (e.g., time or intensity criteria for detecting a tap-hold input or light press input for initiating a drag operation on an object (e.g., a document, a user interface object, a content item, etc.)), the device displays the representation 4130 in a highlighted state. In FIGS. 4B10-4B11, another representation 4132 (e.g., a copy of the representation 4130) of the conversation with Greg Kane is dragged across the display in accordance with movement of the contact 4128 detected after the object-move criteria were met by the initial portion of the input by the contact 4128. In FIG. 4B12, when the representation 4132 is dragged into a predefine region 4308 (e.g., also shown in FIG. 4C28, the predefined region 4308 is a reduce width version of the predefined region 4014 in FIG. 4A6, and Zone F in 4E8) near the right side edge of the display for opening content in a slide-over window of an application, the device provides visual feedback (e.g., the full-screen window 4122 is reduced in size and transformed into a reduced scale representation 4122' for the window 4122, revealing a background underneath the reduced scale representation 4122', and the representation 4132 is elongated and expanded laterally at the same time) to indicate that if the input ends at this time, a slide-over window of the messages application will be displayed overlaying the full-screen window 4122 on the right side of the screen. In some embodiments, the visual feedback also includes visually obscuring the resized full-screen window, and displaying an application icon corresponding to the full-screen window on the visually obscured window. In some embodiments, an application icon for the messages application is shown on the representation 4132. In FIG. 4B13, a slide-over window 4136 of the messages application is opened and displayed on the right side of the display, overlaying a portion of the full-screen window 4122 of the messages application. Inside the slide-over window 4136, the conversation with Greg Kane is displayed. In other words, the content object (e.g., the conversation with Greg Kane) that is dragged to the right side of the screen (e.g., into the predefined region 4308 for opening content in a slide-over window) is opened in a slide-over window of the application (e.g., a slide-over messages window) corresponding to the content object. After the end of the input by the contact 4128, there are now more than one window associated with the message application, including the full-screen window 4122 and the slide-over window 4136.

In FIGS. 4B14-4B17, following FIG. 4B13, another input by a contact 4138 is detected on the application icon 228 in the dock 4006, and the input causes a slide-over window to be opened in the photos application. There are many ways of opening new windows in an application, the process shown in FIGS. 4B14-4B17 is merely one of multiple ways of opening a new window. In this example, the new window is the first window opened in the photos application. As shown in FIG. 4B14, the input by contact 4138 is detected at a location on the display that corresponds to the application icon 228 of the photos application, while the full-screen window 4122 and the slide-over window 4136 of the messages application are displayed in the slide-over mode. In FIGS. 4B15-4B16, after an initial portion of the meets the object-move criteria for initiating a drag operation on the application icon, a representation 4140 of the photos application is dragged across the display in accordance with movement of the contact 4138 detected after the object-move criteria were met by the initial portion of the input. In FIG. 4B16, when the contact 4138 drags the representation 4140 of the photos application into the predefined region 4014 for opening a slide-over window on the right side of the display (e.g., the region 4014 for opening a slide-over application window by dropping an application icon is wider than the region 4308 in FIG. 4B12 used to open content in a new slide-over window), the representation 4140 is elongated and expanded laterally to indicate that the drop-zone for opening a slide-over window for the dragged application has been reached. In FIG. 4B17, after the input ended in the predefined region 4014 (e.g., after lift-off of the contact 4138 in the predefined area 4014), a slide-over window 4142 of the photos application is displayed as the top slide-over window overlaying the full-screen window 4122.

FIGS. 4B18-4B19 illustrate a scenario that is analogous to that shown in FIGS. 4B1-4B4, and that is in contrast to those shown in FIGS. 4B5-4B6 and FIGS. 4B7-4B8.

In the example scenario shown in FIGS. 4B18-4B19, the full-screen window 4122 of the messages application is displayed on the touch screen 112, with a slide-over window 4142 of the photos application. In some embodiments, the device have the same response as described below, irrespective of whether the full-screen window 4122 is displayed in the standalone display configuration or as a background window for a slide-over window (e.g., of the same or different applications) in a slide-over mode. In FIG. 4B18, an input by a contact 4144 is detected at a location on the screen that corresponds to the application icon 224 for the messages application in the dock 4006 that is overlaid on the full-screen window 4122. In response to detecting the input, and in accordance with a determination that the input meets the first criteria, the device determines whether the selected icon corresponds the application of the currently displayed window. In this scenario, the currently displayed window (e.g., the window 4122) and the selected application icon (e.g., the application icon 224) both correspond to the messages application. In response to determining that the currently displayed window (e.g., the window 4122) and the activated application icon (e.g., the application icon 224) both correspond to the messages application, the device determines whether the messages application is associated with multiple windows (e.g., having multiple open windows saved in memory, as "open" windows that can be recalled to the screen with the saved last displayed state). In this scenario, in accordance with a determination that the messages application does have more than one open window at this time (e.g., because the window 4136 has been opened as well, in FIG. 4B15), the device displays the window-switcher user interface 4018 that concurrently displays representations of the multiple open windows associated with the messages application. This is in contrast to the scenario where the application icon of the messages application is activated by an input that meets the selection criteria but the messages application is not the currently displayed application (e.g., as shown in FIGS. 4B5-4B6), and the application-switching operation is performed immediately in response to the input. This is also in contrast to the scenario where the application corresponding to the activated application icon is the currently displayed application but only has a single window open, and neither application-switching nor display of the window-switcher occurs (e.g., as shown in FIGS. 4B7-4B8).

As shown in FIG. 4B19, after the input by the contact 4144 ended, the window-switcher user interface 4108 is displayed, replacing the full-screen window 4122 of the messages application and the slide-over window 4142 of the photos application. In this scenario, the window-switcher user interface 4108 is displayed in a state with representations of all the saved windows associated the messages application, including representations of all full-screen windows (e.g., the representation 4122' for the full-screen window 4122), representations for all slide-over windows (e.g., the representation 4136' for the slide-over window 4136), and representations for all windows displayed in split-screen mode (e.g., none at this time), overlaid on a background (e.g., a blurred or darkened image of the full-screen window 4122). Each representation in the window-switcher user interface 4108, when activated by an input that meets the selection criteria (e.g., a tap input), causes the device to cease to display the window-switcher user interface and display the window that corresponds to the selected representation, accomplishing the task to return to the previously displayed window (or, optionally, concurrently displayed windows) or switch to a different window of the same application (e.g., the window 4136'). In the window-switcher user interface 4108, the same new-window affordance 4112 and closing affordance 4114 are displayed. The new-window affordance 4112, when activated, causes the device to open a new window of the messages application. The closing affordance 4114, when activated, causes the device to cease to display the window-switcher user interface 4108, and redisplay the full-screen window 4122 and the slide-over window 4142. In some embodiments, each application has its own copy of the window-switcher user interface, with customizations (e.g., user interface objects, functions, and appearances) configured within the application. In some embodiments, the window-switcher user interface is a system user interface that is displayed in different states that correspond to the respective applications from which the window-switcher user interface is invoked.

FIGS. 4B20-4B21 illustrate an interaction with the new-window affordance 4112 in the window-switcher user interface 4108. In FIG. 4B20, an input by a contact 4146 is detected at a location that corresponds the new-window affordance 4112. In response to the input, and in accordance with a determination that the input meets the selection criteria (e.g., the input is a tap input), the device displays a new window of the messages application. In the embodiments, the new window is a default window (e.g., a window 4148 displaying a new message template for composing a new message with a new recipient and a listing of existing conversations) of the messages application.

FIGS. 4B22-4B23 illustrate navigation to another user interface within the full-screen window 4148, without opening a new window. In FIG. 4B22, an input by contact 4152 is detected at a location that corresponds to a representation 4150 of a conversation with Mary Ford. In response to the input, and in accordance with a determination that the input meets the first criteria (e.g., the input is a tap input), the user interface in window 4148 is transformed, and the new message template in the window is replaced with the conversation with Mary Ford, as shown in FIG. 4B23. In the interest of improved clarity, the window 4148 is relabeled as window 4154, to indicate that the content of the window has changed, but no new window is opened in the messages application. Alternatively, the navigation operation within the messages application causes the window 4148 to be closed and the window 4154 to be opened in the messages application.

FIGS. 4B24-4B27 illustrate a process for opening a window in the photos application in a split-screen mode, and converting the full-screen window in the messages application into a split-screen window at the same time, in accordance with some embodiments. In this process, the window in the photos application is a newly opened window, while the window in the messages application is not a newly opened window but a resized existing window.

As shown in FIG. 4B24, while displaying the full-screen window 4154 of the messages application, an input by contact 4156 is detected at a location that corresponds to the application icon 228 of the photos application. In response to detecting the input and in accordance with a determination that an initial portion of the input meets the second criteria (e.g., criteria for initiating a drag operation on an object at the location of the input), the device highlights the application icon 228 to indicate that the criteria for initiating a drag operation have been met. In FIG. 4B25, a representation 4158 of the photos application is dragged in accordance with movement of the contact 4156 detected after the second criteria have been met by the initial portion of the input. In FIG. 4B26, the representation 4158 of the photos application is dragged to a predefined region 4162 (e.g., also referred to as Zone A in FIG. 4E8) near the left side edge of the display for opening a window in a split-screen mode. In some embodiments, the predefined region 4162 for opening a window in split-screen mode is closer to the left side edge of the display than the predefined region 4014 (e.g., for opening a window in slide-over mode) is to the right side edge of the display. In response to determining that the contact 4156 is within the predefined region 4162 for opening an application window in the split-screen mode, the device provides visual feedback to indicate that if the input ended at this time, a window of the dragged application will be opened in the split-screen mode. In some embodiments, the visual feedback includes, for example, resizing the full-screen window 4154 in the lateral direction to reveal a background on the side of the display in which the new window will be displayed. In some embodiments, when the full-screen window 4154 is resized, the content of the full-screen window is visually obscured (e.g., blurred or darkened), with an application icon for the corresponding application displayed on the visually obscured window. In some embodiments, the visual feedback includes, for example, elongating the representation 4158 of the application, and reducing the lateral width of the representation 4158, such that the representation 4158 does not overlap with the reduced-width representation 4154' of the window 4154 of the messages application. In FIG. 4B27, after the end of the input by the contact 4156 is detected, a new window 4166 is opened in the photos application, in the split-screen mode, on the left-side of the display. In addition, the full-screen window 4154 of the messages application is resized, and displayed concurrently with the new window 4166 of the photos application, in the split-screen mode. In the interest of clarity, the window 4154 is relabeled as 4164 to indicate that it has been resized and converted from a full-screen window to a split-screen window, but no new window is opened in the messages application. In some embodiments, the above window-resizing operation in the messages application is accomplished through closing the full-screen window 4154 and opening a split-screen window 4164 in the messages application. The window 4166 and the window 4164 are associated (e.g., pinned) as a pair of split-screen windows, and represented together in the application-switcher user interface (e.g., the application-switcher user interface 4032) by a single representation. In addition, in some embodiments, each window of the pair of split-screen windows is also counted as an open window for its respective application in the window-switcher user interface corresponding to the respective application. In some embodiments, the pair of split-screen windows is represented in the window-switcher user interface by a single representation. In some embodiments, the pair of split-screen windows are recalled to the display from the application-switcher user interface and/or the window-switcher user interface together, when the single representation of the pair of split-screen windows is selected (e.g., by a tap input).

FIGS. 4B28-4B31 illustrate a window-switching operation using the window-switcher user interface, in accordance with some embodiments. As shown in FIG. 4B28, the window 4166 of the photos application and the window

4164 of the messages application are displayed side-by-side in the split-screen mode. An input by a contact 4168 is detected on the application icon 224 corresponding to the messages application. In accordance with a determination that the input meets the selection criteria (e.g., the input is a tap input), in accordance with a determination that one of the currently displayed windows (e.g., the window 4166 and the window 4164) and the activated application icon correspond to the same application (e.g., the window 4164 and the application icon 224 both correspond to the messages application), and in accordance with a determination that the application of the activated application icon (e.g., the messages application) is associated with multiple windows, the device displays the window-switcher user interface 4108 in a state that corresponds to the messages application (e.g., displaying representations of the multiple windows associated the messages application at this time), as shown in FIG. 4B29. In FIG. 4B29, the representation 4122' is displayed for the full-screen window 4122, the representation 4136' is displayed for the slide-over window 4136, and the representation 4168' is displayed for the split-screen window 4164 (e.g., the same representation is also used for the split-screen window 4166 in the window-switcher user interface for the photos application). In FIG. 4B30, an input by a contact 4170 is detected on the representation 4122' in the window-switcher user interface 4108 of the messages application. In response to the input and in accordance with a determination that the input meets the selection criteria (e.g., the input is a tap input), the device ceases to display the window-switcher user interface 4108 of the messages application, and redisplays the full-screen window 4122 of the messages application on the screen in a standalone display configuration, as shown in FIG. 4B31. At this point, the window switching operation from the split-screen window 4164 shown in FIG. 4B28 to the full-screen window 4122 is accomplished through the window-switcher user interface 4108.

FIGS. 4B32-4B33 illustrate a scenario that is analogous to that shown in FIGS. 4B5-4B6, where an application-switching operation from a first application to a second application is performed in response to selection of an application icon for the second application, irrespective of how many windows is associated with the second application, in accordance with some embodiments.

FIG. 4B32 illustrates that an input by a contact 4172 is detected on the application icon 218 for the email application, while the full-screen window 4122 of the messages application is displayed. In accordance with a determination that the input by the contact 4172 meets the selection criteria (e.g., the input is a tap input), the device determines whether the application icon 218 and the currently displayed window 4122 correspond to the same application. In accordance with a determination that the application icon 218 and the currently displayed window 4122 do not correspond to the same application, the device ceases to display the full-screen window 4122 and displays full-screen window 4102 (e.g., a default window of the email application (e.g., the last displayed full-screen window of the email application)) that corresponds to the email application, as shown in FIG. 4B33. In the example scenario shown in FIGS. 4B32-4B33, the user's request to switch application is fulfilled without regard to whether the email application is associated with multiple windows at this time, or whether the messages application is associated with multiple windows at this time, because the user activated the application icon of an application that is different from the currently displayed application.

FIGS. 4B34-4B35 follow FIG. 4B33, and illustrate an example scenario that is analogous to that shown in FIGS. 4B1-4B5 in which an application-switcher user interface is displayed in response to the activation of the application icon of the currently displayed application by a tap input. In FIG. 4B34, an input by a contact 4174 is detected on the application icon 218 for the mail application, while the window 4102 of the mail application is displayed on the screen. In accordance with a determination that the input meets the selection criteria (e.g., the input is a tap input), and in accordance with a determination that the activated application icon and the currently displayed window correspond to the same application, and in accordance with a determination that the application has more than one window, the device displays the window-switcher user interface 4108 for that application (e.g., the email application), as shown in FIG. 4B35. In FIG. 4B35, all windows associated with the email application at this time are displayed in the window-switcher user interface 4108. Each representation of a window is displayed with an application icon and a unique name of the window that is automatically generated based on the content of the window, to distinguish windows with similar or identical content.

In accordance with some embodiments, FIGS. 4B32-4B35 illustrate that a double tap (e.g., two consecutive inputs that both meet the selection criteria, and that are, optionally, separated by less than a threshold amount of time) causes the device to perform an operation that switches from displaying a first application to displaying a second application and displays the window-switcher user interface for the second application. In some embodiments, the intermediate state that displays the second application is not displayed, and the device goes directly from displaying the first application to displaying the window-switcher user interface of the second application in response to the double tap input, and then goes from displaying the window-switcher user interface of the second application to displaying a window of the second application in response to an input that selects a window from the window-switcher user interface or existing the window-switcher user interface (e.g., by selecting the closing affordance or new-window affordance, tap outside of the representations of the windows, etc.).

FIGS. 4B36-4B37 illustrate an example process in which an input by a contact 4176 is detected on the application icon 228 in the dock 4006 that is overlaid on the window-switcher user interface 4108. In some embodiments, the dock 4006 is initially hidden when the window-switcher user interface 4108 is displayed and is recalled to the screen by an input that meets dock-display criteria (e.g., the input is an upward swipe gesture that starts from the bottom edge of the touch-screen). In response to detecting the input and in accordance with a determination that the input meets the selection criteria (e.g., the input is a tap input), the device ceases to display the window-switcher user interface 4108 and displays a window 4178 of an application (e.g., the photos application) corresponding to the activated application icon 228, as shown in FIG. 4B37.

FIGS. 4B38-4B42 illustrate an example process for switching from a first window (e.g., a full-screen window (e.g., a window 4178)) to a second window (e.g., a slide-over window (e.g., a window 4142)) of an application (e.g., the photos application) using the window-switcher user interface 4108 of the application, in accordance with some embodiments.

As shown in FIG. 4B38, an input by a contact 4180 is detected on the application icon 228 for the photos application while the full-screen window 4178 of the photos application is displayed. In response to the input by the contact 4180, the device displays the window-switcher user interface 4108 in a state that corresponds to the photos application, including representations of multiple windows (e.g., a representation 4168' for the full-screen window 4168, a representation 4142' for the slide-over window 4142, and a representation 4178' for the full-screen window 4178) associated with the photos application at this time. In FIG. 4B40, an input by a contact 4182 is detected on the representation 4142' for the slide-over window 4142. In response to detecting the input and in accordance with a determination that the input meets the selection criteria (e.g., the input is a tap input), the device ceases to display the window-switcher user interface 4108 and displays the slide-over window 4142, as shown in FIG. 4B41 or FIG. 4B42. In FIG. 4B41, in some embodiments, the slide-over window 4142 is concurrently displayed with the same background window (e.g., a full-screen window, or a pair of split-screen windows) that was previously last displayed with the slide-over window 4142 (e.g., the window 4122 was last displayed with the slide-over window 4142, e.g., in FIG. 4B18). In FIG. 4B42, in some embodiments, the slide-over window 4142 is concurrently displayed with the last displayed full-screen window (e.g., a full-screen window or a pair of split-screen window) immediately prior to the display of the window-switcher user interface 4108 (e.g., the window 4178 was the last displayed full-screen window immediately prior to the display of the window-switcher user interface 4108).

FIGS. 4B43-4B43 illustrate another example process to invoke the window-switcher user interface 4108 for an application, in accordance with some embodiments. Although the example shown in FIGS. 4B43-4B43 shows that the window-switcher user interface 4108 of the photos application is invoked by an input detected while the photos application is displayed, this example process works to invoke the window-switcher user interface 4108 of an application, irrespective of whether the application is the currently displayed application (e.g., another application or the system user interface may be displayed when the input is initially detected), in accordance with some embodiments.

As shown in FIG. 4B43, while displaying an application (e.g., the photos application, or another application distinct from the photos application) and the dock 6004, an input by a contact 4183 is detected on an application icon (e.g., the application icon 228 for the photos application) in the dock. In response to detecting the input and in accordance with a determination that the input meets the menu-display criteria (e.g., the input is a tap-hold input or a light press input), the application icon 228 is highlighted to indicate that the menu criteria have been met by the input. In FIG. 4B44, in response to detecting an end of the input (e.g., in response to detecting lift-off of the contact 4183), a menu 4182 of selectable options 4184 for window management of the application corresponding to the selected application icon (e.g., the photos application) is displayed. As shown in FIG. 4B44, the selectable options include a first option for displaying all windows associated with the photos application in the window-switcher user interface, a second option for opening a new window (e.g., a new default window) in the photos application, and a third option for closing all windows associated with the photos application. In FIG. 4B45, an input by a contact 4186 is detected on the first selectable option for showing all windows. In response to detecting the input and in accordance with a determination that input meets the selection criteria (e.g., the input is a tap input), the device displays the window-switcher user interface 4108 including representations of all windows associated with the photos application, as shown in FIG. 4B46.

In the window-switcher user interface 4108 shown in FIGS. 4B4, 4B19, 4B29, 4B35, and 4B40, a new-window affordance 4112 is displayed, and the new-window affordance, when activated (e.g., by a tap input), initiate a process to open a new window of the application that corresponds to the currently displayed window-switcher user interface. In some embodiments, the newly opened window is a default new window for the application. In some embodiments, a second version of the window-switcher user interface 4108 is displayed with two different new-window affordances, one for opening a new document in a new window, or the other for opening an existing document in a new window. In some embodiments, the device selects which version of the window-switcher user interface 4108 depending on whether the corresponding application of the window-switcher user interface is a document-editor application (e.g., a word processing application, a spreadsheet application, a presentation editor application, a drawing application, a pdf document generation application, a content publishing application, etc.) or not a document-creation application (e.g., a browser application, an email application, an instant messaging application, a photos application, etc.). FIGS. 4B47-4B50 illustrate the two different versions of the new-window affordances in the second version of the window-switcher user interface 4108, in accordance with some embodiments.

As shown in FIG. 4B47, a full-screen window 4188 of a notes application is displayed. The notes application qualities as a document-editor application because the user may frequently create and edit a document, and reopening a previously created and edited document to edit it further. As shown in FIG. 4B47, an input by a contact 4190 is detected on the application icon 244 of the notes application in the dock 6004, while the window 4188 of the notes application is displayed. In response to detecting the input and in accordance with a determination that the input meets the selection criteria, the device displays the window-switcher user interface 4108 corresponding to the notes application, as shown in FIG. 4B48. In FIG. 4B48, the version of the window-switcher user interface 4108 displayed for the notes application includes representations of the windows associated with the notes application (e.g., the representation 4188' for the full-screen window 4188, and the representation 4192' for a slide-over window of the notes application). In addition to the representations of the open windows of the notes application, the window-switcher user interface also includes an “open” affordance 4194 for opening an existing document in a new window of the notes application, and a “new” affordance 4196 for opening a new document in a new window of the notes application. An input by a contact 4198 and an input by a contact 4200 are indicated on the window-switcher user interface 4108 shown in FIG. 4B48.

In FIG. 4B49, in response to detecting the input by the contact 4200 on the “new” affordance 4196 and in accordance with a determination that the input meets the first criteria (e.g., the input is a tap input), the device ceases to display the window-switcher user interface and displays a new window 4202 that displays a new notes document (e.g., a new document created based on a default notes template in the notes application, that is opened in an editable state with a keyboard overlaying the document). In some embodiments, instead of opening a new document directly based on a default new document template, the device displays a document creation user interface that includes selectable options corresponding to different new document format and/or different new document templates. Once the user selects a respective one of the new document format and/or new document template, the device creates and opens a new document in a new window of the application in accordance with the selected document format and/or document template.

In FIG. 4B50, in response to detecting the input by the contact 4198 on the "open" affordance 4194 and in accordance with a determination that the input meets the first criteria (e.g., the input is a tap input), the device ceases to display the window-switcher user interface 4108 and displays a new window 4204 with a document picker user interface for the notes application. In some embodiments, the document picker user interface includes selectable options corresponding to different existing folders and documents that can be opened in the application (e.g., the notes application). For example, as shown in FIG. 4B50, a listing of existing notes are shown in the document picker user interface of the notes application. Once the user selects a respective one of the existing notes, the device opens the selected document (e.g., a selected note that was created before) in a new window of the application (e.g., the notes application). In some embodiments, the application is a document management application, and is configured to open documents corresponding to different applications. In such a scenario, the document picker of the document management application optionally displays representations of documents corresponding to different applications in its document picker user interface, and invokes a different application that corresponds to the selected document to open the selected document in response to the user's selection input.

FIG. 4B51 displays a home screen user interface 4205 that includes a plurality of application icons corresponding to different applications installed on the device. A quick action menu 4206 is displayed in response to an input that met the menu-display criteria (e.g., a tap-hold input or light press input followed by lift-off of the contact, an extra-long touch-hold input without lift-off of the contact, or a deep press input without lift-off of the contact). In the quick action menu 4206, selectable options corresponding to operations within the application (e.g., show most recent photos, show favorite folder, search for photos, etc.) are concurrently displayed with the selectable options shown in the menu 4182 (FIG. 4B44), including a first option for displaying all windows associated with the photos application in the window-switcher user interface, a second option for opening a new window (e.g., a new default window) in the photos application, and a third option for closing all windows associated with the photos application.

FIGS. 4C1-4C48 illustrate processes for dragging and dropping an object (e.g., user interface object representing a content item or an application icon) at different locations (e.g., side regions) on the display, in accordance with some embodiments. In some embodiments, dropping an object corresponding to a content item in different regions on the display optionally causes the device to perform different operations in accordance with various location-based criteria (e.g., based on a comparison of an end location of the drag input, a location of the object at the time that the drag input ended, or a projected final location of the dragged object based on past movement of the input against different predefined regions on the display). In some embodiments, the operations performed in response to dropping an object corresponding to a content item in different regions on the display include: (1) displaying the content item or a representation thereof at a different location in the same window (e.g., to perform an object move or object copy operation in the same application window), (2) displaying the content item or a representation thereof at a location in a different window that is concurrently displayed with the original window of the object (e.g., to perform and object move or object copy operation between two concurrently displayed windows (e.g., of the same application or of two different applications)), (3) opening and displaying the content item in a new window in a first concurrent-display configuration with the original window of the object (e.g., to display the content item in a new slide-over window of a native application corresponding to the content item, overlaying the original window of the object); (4) opening and displaying the content item in a new window in a second concurrent-display configuration with the original window of the object (e.g., to resize the original window of the object, and display the content item in a new split-screen window of a native application corresponding to the content item, displayed side-by-side with the resized original window of the object); (5) opening and displaying the content item in a new window in a third concurrent-display configuration with the original window of the object (e.g., to display the content item in a draft window overlaying a central portion of the original window of the object, and to optionally visually obscure the original window of the object); (6) opening and displaying the content item in a new window in a fourth concurrent-display configuration with the original window of the object (e.g., to display the content item in a minimized window that is concurrently visible with the original window of the content item), and/or (7) opening and displaying the content item in a new full-screen window (e.g., to open the content item in a new full-screen window, replacing the original window of the object on the display (and replacing other windows concurrently shown on the display)), in accordance with a location or projected location of the drag input or dragged object at the end of the drag input. In some embodiments, the predefined regions (e.g., regions 4308 and 4310 in FIGS. 4B12 and 4C28) on the display for determining whether to open a new window (e.g., a slide-over window or a split-screen window) for an application when an application icon is dragged and dropped on the display is reduced relative to the predefined regions (e.g., region 4014 in FIG. 4B16 and 4162 in FIG. 4B26) for determining whether to open a new window for a content item when an object representing the content item is dragged and dropped on the display. For example, in some embodiments, the predefined region for dropping an application icon to create a slide-over window for an application is wider than the predefined region for dropping an object representing a content item to create a slide-over window for displaying the content item. Similarly, in some embodiments, the predefined region for dropping an application icon to create a split-screen window for an application is wider than the predefined region for dropping an object representing a content item to create a split-screen window for displaying the content item. The user interfaces in these figures are used to illustrate the processes described below, including the processes in FIGS. 7A-7H and 7I. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 4C1-4C5 illustrate a process to open a content item in a slide-over window through a drag and drop operation, in accordance with some embodiments. In FIGS. 4C1-4C5, an object representing the content item is dragged from a first window shown on the display and dropped into a first predefined region (e.g., the predefined region 4308 shown in FIG. 4C3) near a side edge of the display, and as a result, the content item is opened in a new slide-over window of an application corresponding to the content item. This first predefine region for dropping a content item is reduced in size (e.g., with reduced width, and/or reduced distance from a respective side edge of the display) as compared to the predefined region (e.g., predefined region 4014 in FIGS. 4A5, 4B16, etc.) used for dropping an application icon and opening a slide-over window of an application corresponding to the application icon. This makes more area available to performing an operation with respect to the content item in the first window, and optionally, in a second window concurrently displayed with the first window.

As shown in FIG. 4C1, the full-screen window 4122 of the messages application is displayed (e.g., in a standalone configuration). An input by a contact 4302 is detected at a location that corresponds to an object 4304 representing a first content item (e.g., a conversation with Greg Kane). An initial portion of the input by the contact 4302 has met the object-move criteria for initiating a drag operation on the object 4304 representing the first content item or a copy of the object 4304 (e.g., the initial portion of the input by the contact 4302 has met the touch-hold time threshold or the intensity threshold of a light press input), and the device highlighted the object 4304 to indicate that the criteria for initiating a drag operation on the object have been met.

In FIG. 4C2, a representation 4306 of the first content item (e.g., a copy of the object 4304) is dragged across the display in accordance with movement of contact 4302 detected after the second criteria were met. In some embodiments, the representation 4306 has a first appearance that indicates that no acceptable drop location is available for the object in a portion of window 4122 that is outside of the first predefined region 4308, and that if the input ended at this time, no object move operation or object copy operation will be performed with respect to the first content item in the window 4122.

In FIG. 4C3, as the representation 4306 of the first content item is dragged to a location within the first predefined region 4308 in accordance with the movement of contact 4302 after the object-move criteria were met. In some embodiments, the representation 4306 takes on a second appearance (e.g., the representation is elongated and expanded laterally) that indicates that if the input ended at this time, the first content item will be displayed in a new slide-over window of the application that corresponds to the first content item (e.g., the messages application). In FIG. 4C4, in some embodiments, in addition to changing the appearance of the representation 4306 of the first content item, when the representation is dragged to a location within the first predefined region 4308, the device also provides additional visual feedback to indicate that the current location of the input and/or representation 4306 meets the location criterion for opening the first content item in a slide-over window. In some embodiments, the additional visual feedback includes reducing the overall size of the first window 4122 to display a representation 4122' of the first window 4122, and revealing a background 4134 underneath the representation 4122'.

In FIG. 4C5, in response to detecting the end of the input by contact 4302 (e.g., detecting lift-off of contact 4302), the first content item is displayed in a new slide-over window 4136 of the messages application, overlaying the first window 4122.

FIGS. 4C6-4C7, following FIG. 4C4, illustrate that the input by the contact 4302 is continuously evaluated against the location criteria corresponding to different predefined regions on the display for different operations performed after the end of the input (e.g., object move within the same window, object move to a different window, open content in a new slide-over window, open content in a new split-screen window, etc.), and the visual feedback is dynamically updated to indicate a corresponding possible outcome if the input were to end at the current location. In FIGS. 4C6-4C7, before the end of the input by the contact 4302 is detected, movement of the contact 4302 drags the representation 4306 of the first content object from the first predefined region 4308 to a location outside of the first predefined region 4308 in a central portion of the display, and as a result, the visual feedback is dynamically updated to indicate that the location criterion for opening the first content item in a slide-over window is no longer met, and no object-move or object copy operation will be performed if the input were to end at this time (e.g., at the time shown in FIG. 4C7).

FIGS. 4C8-4C11 illustrate a process to open a content item in a split-screen window through a drag and drop operation, in accordance with some embodiments. In FIGS. 4C8-4C11, an object representing the content item is dragged from the first window shown on the display and dropped into a second predefined region (e.g., predefined region 4310 shown in FIG. 4C10) near a side edge of the display, and as a result, the content item is opened in a new split-screen window of an application corresponding to the content item. This second predefine region 4310 for dropping a content item is reduced in size (e.g., with reduced width, and/or reduced distance from a respective side edge of the display) as compared to the predefined region (e.g., the predefined region 4162 in FIG. 4B26 etc.) used for dropping an application icon and opening a split-screen window of an application corresponding to the application icon. The second predefined region and the first predefined region on the same side of the display are optionally adjacent to each other and share a common boundary between them. For example, the second predefined region is defined by a side edge of the display and a first boundary line that is a first distance from the side edge of the display, and the first predefined region is defined by the first boundary line and a second boundary line that is a second distance (greater than the first distance) from the side edge of the display. In some embodiments, a third predefined region outside of the first predefined region (and the second predefined region) is used to determine whether to perform an operation with respect to the first content item within the first window, rather than opening a new window for the first content item.

As shown in FIG. 4C8, the full-screen window 4122 of the messages application is displayed (e.g., in a standalone configuration). An input by a contact 4312 is detected at a location that corresponds to the object 4304 representing the first content item (e.g., a conversation with Greg Kane). An initial portion of the input by the contact 4312 has met the object-move criteria for initiating a drag operation on the object 4304 representing the first content item or a copy of the object 4304 (e.g., the initial portion of the input by contact 4312 has met the touch-hold time threshold or the intensity threshold of a light press input), and the device highlighted the object 4304 to indicate that the criteria for initiating a drag operation on the object has been met. In some embodiments, the contact 4312 can be the same as the contact 4302, the input by the contact may trigger different operations (e.g., those described in FIGS. 4C1-4C7, or FIGS. 4C8-4C15) depending on the location of the input when the input ultimately ends). In some embodiments, the contact 4312 and the contact 4302 are different contacts corresponding to two different inputs detected at different times on the same window displaying the same user interface state.

In FIG. 4C9, the representation 4306 of the first content item (e.g., a copy of the object 4304) is dragged across the display in accordance with movement of the contact 4312 detected after the second criteria were met. In some embodiments, the representation 4306 has the first appearance that indicates that no acceptable drop location is available for the object in a portion of window 4122 that is outside of the first predefined region 4308 (and the second predefined region 4310), and that if the input ended at this time, no object move operation or object copy operation will be performed with respect to the first content item in window 4122.

In FIG. 4C10, as the representation 4306 of the first content item is dragged to a location within the second predefined region 4310 in accordance with the movement of contact 4312 after the second criteria were met. In some embodiments, the representation 4306 takes on a third appearance (e.g., the representation is further elongated and contracts laterally) that indicates that if the input ended at this time, the first content item will be displayed in a new split-screen window of the application that corresponds to the first content item (e.g., the messages application) with a split-screen window of the messages application that is converted from the full-screen window 4122. In FIG. 4C10, in some embodiments, in addition to changing the appearance of the representation 4306 of the first content item, when the representation is dragged to a location within the second predefined region 4310, the device also provides additional visual feedback to indicate that the current location of the input and/or representation 4306 meets the location criterion for opening the first content item in a split-screen window. In some embodiments, the additional visual feedback includes reducing the width of the first window 4122 to display a representation 4122' of the first window 4122, and revealing a background 4134 underneath the representation 4122' on the side of the display over which the representation 4306 is currently located.

In FIG. 4C11, in response to detecting the end of the input by the contact 4312 (e.g., detecting lift-off of the contact 4312), the first content item is displayed in a new split-screen window 4316 of the messages application, side by side with another split-screen window 4314 converted from the first window 4122.

In FIG. 4C12, while the pair of split-screen windows 4314 and 4316 are displayed, an input by a contact 4320 is detected on a closing affordance 4318 of the split-screen window 4316. In response to detecting the input by contact 4320, and in accordance with a determination that the input meets the selection criteria (e.g., the input is a tap input), the split-screen window 4316 is closed, and the split-screen window 4314 is converted back to a standalone full-screen window 4122, as shown in FIG. 4C13.

FIGS. 4C14-4C15, following FIG. 4C10, illustrate that the input by the contact 4312 is continuously evaluated against the location criteria corresponding to different predefined regions on the display for different operations performed after the end of the input (e.g., object move within the same window, object move to a different window, open content in a new slide-over window, open content in a new split-screen window, etc.), and the visual feedback is dynamically updated to indicate a corresponding possible outcome if the input were to end at the current location. In FIGS. 4C14-4C15, before the end of the input by contact 4312 is detected, movement of the contact 4312 drags the representation 4306 of the first content object from the second predefined region 4310 to a location outside of the first predefined region 4308 in a central portion of the display, and as a result, the visual feedback is dynamically updated to indicate that the location criterion for opening the first content item in a split-screen window is no longer met, and no object-move or object copy operation will be performed if the input were to end at this time (e.g., at the time shown in FIG. 4C15). The dynamic visual feedback shown in FIGS. 4C2, 4C3, 4C4, 4C6, 4C7, 4C9, 4C10, 4C14, and 4C15 may be displayed and repeated any number of times, in any order, based on the current location of the contact, as long as the end of the input has not been detected. In addition, the final states of the screen shown in FIGS. 4C5, 4C11, and 4C13 will be displayed, respectively, depending on whether the final end location of the input is in the first predefined region 4308, the second predefined region 4310, or the third predefined region outside of the first and second predefined regions (and any other predefined regions for opening a new window in various display modes (e.g., full-screen, draft mode, minimized mode, slide-over window on a different side of the display, split-screen on a different side of the display, etc.)).

FIGS. 4C16-4C17 illustrate an input by a contact 4322 at a location that corresponds to the object 4304 representing the first content item (e.g., a conversation from Greg Kane) in the window 4122. In response to detecting the input by the contact 4322 and in accordance with a determination that the input meets the selection criteria (e.g., the input is a tap input), the device navigates to another user interface in the messages application, without opening a new window. For clarity of description, the window showing the new user interface is labeled as window 4324, as shown in FIG. 4C17. In some embodiments, the operation corresponding to the user interface navigation within the application is implemented by closing the current window showing the current user interface and opening a new window with the new user interface. In some embodiments, the contact 4322 can be the same as the contact 4302 and/or 4312, the input by the contact may trigger different operations (e.g., those described in FIGS. 4C1-4C7, and/or FIGS. 4C8-4C15) depending on the location of the input when the input ultimately ends) and the type of the input (e.g., a drag input or a tap input). In some embodiments, the contact 4322, the contact 4312, and the contact 4302 are different contacts corresponding to different inputs detected at different times on the same window displaying the same user interface state.

FIGS. 4C18-4C23 illustrate example processes analogous to those shown in FIGS. 4C1-4C17, for a content item associated with a different application (e.g., an email application). Many aspects explained with respect to the examples shown in FIGS. 4C1-4C17 are applicable to the examples shown in FIGS. 4C18-4C23.

FIGS. 4C18-4C21 illustrate a process to open another content item in a split-screen window through a drag and drop operation, in accordance with some embodiments. In FIGS. 4C18-4C21, an object representing the content item is dragged from the first window shown on the display and dropped into the second predefined region (e.g., predefined region 4310 shown in FIG. 4C20) near a side edge (e.g., the right side edge) of the display, and as a result, the content item is opened in a new split-screen window of an application corresponding to the content item.

As shown in FIG. 4C18, the full-screen window 4102 of the email application is displayed (e.g., in a standalone configuration). An input by a contact 4328 is detected at a location that corresponds to an object 4326 representing a second content item (e.g., an email message from MobileFind). An initial portion of the input by the contact 4328 has met the object-move criteria for initiating a drag operation on the object 4326 representing the second content item or a copy of the object 4326 (e.g., the initial portion of the input by the contact 4328 has met the touch-hold time threshold or the intensity threshold of a light press input), and the device highlighted the object 4326 to indicate that the criteria for initiating a drag operation on the object has been met.

In FIG. 4C19, a representation 4330 of the second content item (e.g., a copy of the object 4326) is dragged across the display in accordance with movement of the contact 4328 detected after the second criteria were met. In some embodiments, the representation 4330 has a first appearance that indicates that no acceptable drop location is available for the object in a portion of window 4102 that is outside of the first predefined region 4308 (and the second predefined region 4310), and that if the input ended at this time, no object move operation or object copy operation will be performed with respect to the first content item in window 4102.

In FIG. 4C20, as the representation 4330 of the second content item is dragged to a location within the second predefined region 4310 in accordance with the movement of contact 4328 after the second criteria were met. In some embodiments, the representation 4330 takes on a second appearance (e.g., the representation is elongated) that indicates that if the input ended at this time, the second content item will be displayed in a new split-screen window of the application that corresponds to the second content item (e.g., the email application) with a split-screen window of the email application that is converted from the full-screen window 4102. In FIG. 4C20, in some embodiments, in addition to changing the appearance of the representation 4330 of the second content item, when the representation is dragged to a location within the second predefined region 4310, the device also provides additional visual feedback to indicate that the current location of the input and/or representation 4330 meets the location criterion for opening the second content item in a split-screen window. In some embodiments, the additional visual feedback includes reducing the width of the full-screen window 4102 to display a representation 4102' of the window 4102, and revealing a background 4134 underneath the representation 4102' on the side of the display over which the representation 4330 is currently located.

In FIG. 4C21, in response to detecting the end of the input by the contact 4330 (e.g., detecting lift-off of the contact 4330), the second content item is displayed in a new split-screen window 4334 of the email application, side by side with another split-screen window 4332 converted from the window 4102.

FIGS. 4C22 and 4C23 continue from any of FIGS. 4C18, 4C19, and 4C20, and illustrate an example scenario in which the second content item is opened in a new slide-over window 4336 of the email application, overlaying the full-screen window 4102. As shown in FIG. 4C22, as the representation 4330 of the second content item is dragged to a location within the first predefined region 4308 in accordance with the movement of the contact 4328 after the object-move criteria were met. In some embodiments, the representation 4330 takes on a third appearance (e.g., the representation is less elongated as compared to the state shown in 4C20 and is expanded laterally) that indicates that if the input ended at this time, the second content item will be displayed in a new slide-over window of the application that corresponds to the second content item (e.g., the email application). In FIG. 4C22, in some embodiments, in addition to changing the appearance of the representation 4330 of the second content item, when the representation is dragged to a location within the first predefined region 4308, the device also provides additional visual feedback to indicate that the current location of the input and/or representation 4330 meets the location criterion for opening the second content item in a slide-over window. In some embodiments, the additional visual feedback includes reducing the overall size of the window 4102 to display a representation 4102' of the window 4102, and revealing a background 4134 underneath the representation 4102'.

In FIG. 4C23, in response to detecting the end of the input by the contact 4328 (e.g., detecting lift-off of the contact 4328), the second content item is displayed in a new slide-over window 4336 of the email application, overlaying the window 4102.

FIGS. 4C23-4C24 illustrate that an input by a contact 4338 is detected on an affordance 4340 to create a new draft email in the email application. In response to detecting the input by the contact 4338 and in accordance with a determination that the input meets the selection criteria (e.g., the input is a tap input), the device opens a new draft window containing a new draft email (e.g., a new reply email to the email shown in the slide-over window 4336, (e.g., because the affordance 4340 is part of the slide-over window 4336)), as shown in FIG. 4C24. In some embodiments, the new draft window 4342 can be displayed in the configuration shown in FIG. 4C24 through other user interaction processes (e.g., opening an existing draft email in a slide-over window or split-screen window, and displaying it in draft mode by dragging the window to the center portion of the display).

In FIGS. 4C24-4C26, an input by a contact 4344 is detected on a drag handle 4344 of the draft window 4342, and the input includes movement of the contact 4344 toward a side edge (e.g., the right side edge) of the display. In response to detecting the input and in accordance with a determination that a current location of the contact 4346 is within the first predefined region 4308, the representation 4348 of the draft window 4342 is displayed with an appearance (e.g., elongated application icon that is also expanded laterally) that indicates that, if the input were to end at the current location, the draft window 4342 will be converted to a slide-over window overlaying the original background window 4102. In some embodiments, visual feedback also includes reducing the overall size of the background window 4102 to a representation 4102' and revealing a background 4134 underneath the representation 4102'. In FIG. 4C26, after the end of the input is detected while the contact 4344 and the representation 4348 were within a predefined region 4014 (or Zone F in FIG. 4E8), the draft window 4342 is converted to a slide-over window 4348 overlaying the background window 4102. The slide-over window 4348 displays the draft email reply to John. Other related examples of dragging a currently displayed window and converting the window in one display configuration to a window in another display configuration are described in more detail with respect to FIGS. 4E1-4E28, in accordance with some embodiments.

FIGS. 4C27-4C40 illustrate various examples in which, after a drag operation is initiated on a content object, the final outcome of the input (e.g., after an end of the input is detected) is determined based on the location of the contact or the location of the dragged object at a time when the input ended.

In FIG. 4C27, the display is roughly divided into several regions, including the first predefined region 4308, the second predefined region 4310, a third predefined region 4354, a fourth predefined region in areas of the window 4102 that are outside of the first, second, and third predefined regions, and outside of the search input field 4355, and a fifth predefined region corresponding to the search input field 4355 in window 4102. In this example, the areas of window 4102 outside of the search input field 4335 do not correspond to any operation that can be performed on a dragged content item in response to an end of the drag input. However, in some embodiments, if the window 4102 does include sub-regions where an operation can be performed with respect to a dragged content item (e.g., moving the dragged item within the sub-regions, copying the dragged item to a folder within the sub-regions, sending the dragged item to another user (e.g., dropping a content item over a "send" button), deleting a dragged item (e.g., dropping a content item onto a virtual trash can in the window), printing a dragged item (e.g., dropping a content item onto a printer icon shown in the window), etc.).

In FIG. 4C27, an input by a contact 4350 has been detected at a location that corresponds to an object 4352 representing a document (e.g., an image "Attachment 1"). In response to detecting an initial portion of the input (e.g., a tap-hold input or a light press input without lift-off of the contact) that meets the object-move criteria, the device displays visual feedback (e.g., highlighting the object 4352) indicating the criteria for initiating a drag operation on the document has been met by the initial portion of the input.

In FIG. 4C28, first movement of the contact 4350 is detected after the object-move criteria were met by the initial portion of the input, and a representation 4356 of the document is dragged across the display in accordance with the movement of the contact 4350. When the contact 4356 is in over a portion of the window 4102 that is outside of the first predefined region 4308, the second predefined region 4310, and the third predefined region 4354, the appearance of the representation 4356 indicates that no acceptable drop location is available at this location, and no operation will be performed with respect to the document if the input were to end at the current location. In some embodiments, if an acceptable drop location is available at the current location, the device will provide a visual feedback to indicate the operation that will be performed with respect to the document if the input were to end at the current location (e.g., changing the appearance of the representation 4356 in a manner that indicates the particular operation that will be performed when the end of the input is detected at this location).

In FIG. 4C29, second movement of the contact 4350 is detected after the second criteria were met by the initial portion of the input, and the representation 4356 of the document is dragged across the display in accordance with the movement of the contact 4350 to the search input field 4355. The appearance of the representation 4356 changes (e.g., changes from an icon to a filename) to indicate that an acceptable drop location is available at this location, and a search will be performed based on the filename of the document if the input were to end at the current location.

In FIG. 4C30, third movement of the contact 4350 is detected after the second criteria were met by the initial portion of the input, and the representation 4356 of the document is dragged across the display in accordance with the movement of the contact 4350 to the third predefined region 4354 in the slide-over window 4348. The appearance of the representation 4356 changes (e.g., reduced in size, with a preview of the document (e.g., an image 4358) displayed in the slide-over window 4348) to indicate that an acceptable drop location is available at this location, and the content of the document will be inserted into the draft email if the input were to end at the current location.

In FIG. 4C31, the end of the input is detected while the contact and the representation 4356 is within the third predefined region 4354. As a result, the document (e.g., the image 4358) is inserted at an insertion point in the draft email shown in slide-over window 4348.

In FIG. 4C32, fourth movement of the contact 4350 is detected after the object-move criteria were met by the initial portion of the input, and the representation 4356 of the document is dragged across the display in accordance with the movement of the contact 4350 to the first predefined region 4308 in the slide-over window 4348. The appearance of the representation 4356 changes (e.g., elongated and expanded laterally as compared to that shown in FIG. 4C28) to indicate that the document will be opened in a new slide-over window if the input were to end at the current location.

In FIG. 4C33, the end of the input is detected while the contact and the representation 4356 is within the first predefined region 4354. As a result, the document (e.g., the image 4358) is opened in a new slide-over window 4360 of the photos application (e.g., the native application of the image document), overlaying the full-screen window 4102 of the email application.

In some embodiments, fifth movement of the contact 4350 is detected after the second criteria were met by the initial portion of the input, and the representation 4356 of the document is dragged across the display in accordance with the movement of the contact 4350 to the second predefined region 4310 in the slide-over window 4348. The appearance of the representation 4356 changes (e.g., further elongated and contracts laterally as compared to that shown in FIG. 4C32) to indicate that the document will be opened in a new split-screen window if the input were to end at the current location. If the end of the input is detected while the contact and the representation 4356 is within the second predefined region 4310, the document (e.g., the image 4358) will be opened in a new split-screen window of the photos application (e.g., the native application of the image document), side-by-side with a split-screen window converted from the full-screen window 4102 of the email application.

In some embodiments, the location of the contact and the dragged object is continuously evaluated and the visual feedback is dynamically updated in accordance with a comparison between the location of the contact/dragged object and the different predefined regions described above (e.g., with respect to FIGS. 4C27, 4C28, 4C29, 4C30, and 4C32). The display state shown in FIGS. 4C27-4C30 and 4C32 can be repeated by any number of times and in any order based on the current location of the input, before the end of the input is detected.

FIGS. 4C34-4C40 illustrate the operations performed with respect to a content object, in response to an end of a drag operation performed on the content object, in accordance with some embodiments.

In FIG. 4C34, the slide-over window 4348 is displayed overlaying the full-screen window 4102. An input by a contact 4366 is detected at a location that corresponds to an object 4364 (e.g., a hyperlink) representing a webpage. An initial portion of the input by the contact 4366 has met the object-move criteria, and the device highlights the object 4364 to indicate that the criteria for initiating a drop operation on the object 4364 has been met.

In FIG. 4C35, in response to first movement of the contact 4366 detected after the object-move criteria have been met, a representation 4368 is dragged across the display in accordance with the movement of the contact 4366. As shown in FIG. 4C35, while the contact and the representation 4368 is over a portion of the display that does not present an acceptable drop location for the object representing the webpage (e.g., in a region outside of the first predefined region 4308, the second predefined region 4310, the third predefined region 4354, and the search input field 4355), the representation 4368 has a first appearance to indicate that if the input ended at this time, no object move or object copy operation will be performed with respect to the object in the email application.

In FIG. 4C36, second movement of the contact 4366 is detected after the object criteria were met by the initial portion of the input, and the representation 4368 of the webpage is dragged across the display in accordance with the movement of the contact 4366 to the search input field 4355. The appearance of the representation 4368 changes (e.g., changes from an icon to a web address (e.g., a URL) or title for the webpage) to indicate that an acceptable drop location is available at this location, and a search will be performed based on the URL or title of the webpage if the input were to end at the current location.

In FIG. 4C37, third movement of the contact 4336 is detected after the object-move criteria were met by the initial portion of the input, and the representation 4368 of the webpage is dragged across the display in accordance with the movement of the contact 4336 to the third predefined region 4354 in the slide-over window 4348. The appearance of the representation 4368 changes (e.g., reduced in size, with a web address (e.g., URL) or a preview of the webpage displayed in the slide-over window 4348) to indicate that an acceptable drop location is available at this location, and the web address or content of the webpage will be inserted into the draft email if the input were to end at the current location. In some embodiments, if the end of the input is detected while the contact and the representation 4336 is within the third predefined region 4354, the URL or content of the webpage is inserted at an insertion point in the draft email shown in the slide-over window 4348.

In FIG. 4C38, fourth movement of the contact 4336 is detected after the object-move criteria were met by the initial portion of the input, and the representation 4368 of the webpage is dragged across the display in accordance with the movement of the contact 4336 to the first predefined region 4308 in the slide-over window 4348. The appearance of the representation 4368 changes (e.g., elongated and expanded laterally as compared to that shown in FIG. 4C35) to indicate that the webpage will be opened in a new slide-over window of the browser application if the input were to end at the current location.

In FIG. 4C39, the end of the input is detected while the contact and the representation 4368 is within the first predefined region 4308. As a result, the document (e.g., the webpage) is opened in a new slide-over window 4372 of the browser application (e.g., the native application of the webpage), overlaying the full-screen window 4102 of the email application.

In FIG. 4C40, fifth movement of the contact 4336 is detected after the object-move criteria were met by the initial portion of the input, and the representation 4368 of the webpage is dragged across the display in accordance with the movement of the contact 4336 to the second predefined region 4310 on the display. The appearance of the representation 4368 changes (e.g., further elongated and contracts laterally as compared to that shown in FIG. 4C38) to indicate that the webpage will be opened in a new split-screen window if the input were to end at the current location. In some embodiments, the background full-screen window 4102 is resized (e.g., reduced in width) to create space to display the new-split-screen window. Background 4134 is revealed behind the representation 4102' for the resized window 4102. In some embodiments, the slide-over window 4348 that is displayed on the same side of the display as the representation 4368 is shifted to the other side of the display. In FIG. 4C41, the end of the input is detected while the contact 4336 and the representation 4368 is within the second predefined region 4310, and the webpage is opened in a new split-screen window 4376 of the browser application (e.g., the native application of the webpage), side-by-side with a split-screen window 4374 converted from the full-screen window 4102 of the email application. In some embodiments, the slide-over window 4348 is shifted to the other side of the display, as shown in FIG. 4C41. In some embodiments, the slide-over window 4348 remains on the same side (e.g., the right side) of the display as before, with the pair of split windows 4374 and 4376 as the background.

In some embodiments, the location of the contact and the dragged object is continuously evaluated and the visual feedback is dynamically updated in accordance with a comparison between the location of the contact/dragged object and the different predefined regions described above (e.g., with respect to FIGS. 4C35, 4C36, 4C37, 4C38, and 4C40). The display state shown in FIGS. 4C35, 4C36, 4C37, 4C38, and 4C40 can be repeated by any number of times and in any order based on the current location of the input, before the end of the input is detected.

In the above examples, the content object is dragged to a region of the display that included a slide-over window. In some embodiments, the same predefined regions 4308 and 4310 exists on the display and function in the same manner as described above, irrespective of whether there is a slide-over window or split-window displayed in those predefined regions.

FIGS. 4C42-4C46 illustrate that the predefined regions for opening a new slide-over window or a new split-screen window by dragging and dropping an application icon are expanded relative to the predefined regions for opening a new slide-over window or a new split-screen window by dragging and dropping an object representing a content item (e.g., a document, or other content), in accordance with some embodiments.

As shown in FIG. 4C42, an input by contact 4378 is detected on the application icon 220 for the browser application. An initial portion of the input has met the object-move criteria and the device highlighted the application icon 220 to indicate that a drag operation can be initiated on the application icon 220 by a movement of the contact 4378.

In FIG. 4C43, first movement of the contact 4378 is detected, and a representation 4380 of the application icon 220 (e.g., for the browser application) is dragged across the display in accordance with the movement of the contact 4378 detected after the object-move criteria were met by the initial portion of the input. As shown in FIG. 4C43, when the contact 4378 is anywhere within the expanded first predefined region 4308' (e.g., as compared to region 4308 in FIG. 4C35-4C31), the device provides the visual feedback (e.g., representation 4380 is elongated and expanded laterally, overall size of the background window 4102 is reduced revealing background 4134) to indicate that a new slide-over window for the browser application will opened if the end of the input is to be detected at the current location. In FIG. 4C44, the end of the input by contact is detected while the contact is within the expanded first predefined region 4308' (e.g., optionally, in a region outside of the original first predefined region 4308), and a new slide-over window 4382 of the browser application, overlaying the full-screen window 4102 of the email application. In some embodiments, if the browser application is associated with more than one window, the device optionally opens a window-selector user interface 4508 (e.g., as shown in FIG. 4D5) for the browser application, instead of a slide-over window of the browser application. More details are described with respect to FIGS. 4D1-4D19.

In FIG. 4C45, second movement of the contact 4378 is detected, and a representation 4380 of the application icon 220 (e.g., for the browser application) is dragged across the display in accordance with the movement of the contact 4378 detected after the object-move criteria were met by the initial portion of the input. As shown in FIG. 4C45, when the contact 4378 is anywhere within the expanded second predefined region 4310', the device provides the visual feedback (e.g., representation 4380 is further elongated and contracts laterally, width of the background window 4102 is reduced revealing background 4134) to indicate that a new split-screen window for the browser application will opened if the end of the input is to be detected at the current location. In FIG. 4C46, the end of the input by contact is detected while the contact is within the expanded second predefined region 4310' (e.g., optionally, in a region outside of the original second predefined region 4310 and inside the original first predefined region 4308), and a new split-screen window 4384 of the browser application, side by side with a new split-screen window 4186 converted from the full-screen window 4102 of the email application. In some embodiments, if the browser application is associated with more than one window, the device optionally opens a window-selector user interface 4508 (e.g., as shown in FIG. 4D19) for the browser application, instead of a split-screen window of the browser application. More details are described with respect to FIGS. 4D1-4D19.

As shown above, the expanded second predefined region 4310' is defined by a side edge of the display and a boundary that is shifted away from the side edge by a distance that is greater than the distance between the boundary of the first predefined region 4310 and the same side edge of the display. The expanded first predefined region 4308' is defined by the boundary of the expanded second predefined region and a new boundary that is shifted away from the side edge by a distance that is greater than the distance by which the boundary of the second predefined region 4310' has been shifted. As a result of these boundary adjustments, the width of the expanded first predefined region 4308' is greater than the width of the first predefined region 4308, and the width of the expanded second predefined region 4310' is greater than the width of the second predefined region 4310. This allows the application icons to be more easily dropped onto predefined regions on the display to open the desired types of new windows, because object move and object copy operations are rare or unimplemented for an application icon in the background window.

FIGS. 4C47-4C48 illustrate that, in additional to opening a content item in a new window (e.g., a new slide-over window, a new split-screen window) through a drag and drop operation performed on the object, a quick action menu may be used to accomplish the same result, in accordance with some embodiments. As shown in FIG. 4C47, an input by a contact 4386 is detected on an object 4326 representing an email from MobileFind. An initial portion of the input has met the menu-display criteria (e.g., the time threshold for a tap-hold input, and/or an intensity threshold for a light press input has been met), and the device highlights the object 4326 to indicate that the menu-display criteria have been met. In some embodiments, the object-move criteria for initiating a drag operation is also used to determine whether a quick action menu will be presented upon lift-off of the contact, if no movement of the contact is detected before the lift-off of the contact. In FIG. 4C48, the end of the input is detected (e.g., lift-off of the contact 4386 is detected) without movement of the contact, and in response, a quick action menu 4388 is displayed adjacent to the object 4326, where the menu includes at least a first selectable option (e.g., open in app) for opening the content item represented by the object 4326 in a full-screen window of the native application of the content item, a second selectable option (e.g., open as a slide-over window) for opening the content item in a new slide-over window, and a third selectable option (e.g., open as a split-screen window).

In some embodiments, the first selectable option, when activated by an input that meets the selection criteria (e.g., a tap input), the device optionally switches to the native application of the content item if it is not the currently displayed application and displaying the content item in a new full-screen window of the native application. If the native application of the content item is the same as the application that is currently displaying the object representing the content item, then the content item is opened in the currently displayed window that includes the object) or a new full-screen window of the currently displayed application, in accordance with various embodiments. In some embodiments, the operation performed in response to activation of the first selectable option is the same as the operation performed when an input meeting the selection criteria (e.g., a tap input) is detected on the object representing the content item.

In some embodiments, the second selectable option, when activated by an input that meets the selection criteria (e.g., a tap input), the device displays the content item in a new slide-over window of the native application of the content item (e.g., as that shown in FIG. 4C23). In some embodiments, the operation performed in response to activation of the second selectable option is the same as the operation performed when an input meeting the object-move criteria initiates a drag operation on the object and ends in the first predefined region 4308 on the display.

In some embodiments, the third selectable option, when activated by an input that meets the selection criteria (e.g., a tap input), the device displays the content item in a new split-screen window of the native application of the content item (e.g., as that shown in FIG. 4C21). In some embodiments, the operation performed in response to activation of the third selectable option is the same as the operation performed when an input meeting the object-move criteria initiates a drag operation on the object and ends in the second predefined region 4310 on the display.

FIGS. 4D1-4D19 illustrate user interface behaviors when dragging and dropping an application icon into predefined regions on the display to open the application in a respective concurrent-display configuration (e.g., slide-over mode, or split-screen mode) with the currently displayed full-screen window, in accordance with some embodiments. In particular, when the application corresponding to the dragged application icon has multiple windows associated with it, a window-selector user interface region is displayed to allow the user to select a desired window of the application to open in the concurrent display mode, in accordance with some embodiments. Other user interface interactions with the window-selector user interface are also described. The user interfaces in these figures are used to illustrate the processes described below, including the processes in FIGS. 8A-8E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 4D1-5D5 illustrate a heuristic according to which, if there are multiple windows associated with an application, when the application icon of the application is dragged over to a predefined region (e.g., predefined regions 4308', 4310') of the display for opening the application in a concurrent-display configuration, a window-selector region is displayed to allow the user to select a window from the multiple windows to be opened in the concurrent-display configuration; and if there is a single window associated with the application, the single window associated with the application, instead of the window-selector region, is displayed in the concurrent-display configuration, in accordance with some embodiments.

As shown in FIG. 4D1, an input by a contact 4502 is detected on the application icon 220 for the browser application in the dock 4006, while a full-screen window 4122 is displayed. Movement of the contact 4502 is detected after the criteria for initiating a drag operation on the application icon is met by an initial portion of the input (e.g., the input is a tap-hold input or a light press input). In response to the movement of the contact 4502, a representation 4504 of the application icon 220 is dragged across the display in accordance with the movement of the contact 4502, as shown in FIG. 4D2. In FIG. 4D3, when the contact 4502 drags the representation 4504 to a location within the predefined region for opening a slide-over window (e.g., the expanded first predefined region 4308'), the device presents visual feedback that the location criterion for opening a slide-over window is met, and that if the input ends at the current location, the application will be opened in a slide-over window.

In FIG. 4D4 following FIG. 4D3, in accordance with a first branch of the heuristic, in a scenario where the application of the dragged application icon 220 (e.g., the browser application) is currently associated with zero window (e.g., the application is not open) or only a single window (e.g., only one recently open window is saved in memory), the device opens the application in a slide-over window 4506 overlaying a portion of the background window 4122 (e.g., on the right side of the screen). In some embodiments, if the application is associated with zero window, the slide-over window 7506 displays a default starting user interface of the application. In some embodiments, if the application is associated with a single window at this time, the slide-over window 7506 displays the user interface or content last shown in the single window. In some embodiments, the single window saved in memory does not have to be a slide-over window. In some embodiments, the single window saved in memory is converted from a full-screen window or a split-screen window to the slide-over window before it is displayed in response to the input by the contact 4502.

In FIG. 4D5 following FIG. 4D3, in accordance with a second branch of the heuristic, in a scenario where the application of the dragged application icon 220 (e.g., the browser application) is currently associated with multiple windows (e.g., multiple recently open windows are saved in memory), the device opens a window-selector user interface region 4508 (e.g., in a slide-over window or overlay) overlaying a portion of the background window 4122 (e.g., on the right side of the screen). In some embodiments, all the windows associated with the application (e.g., saved in memory), irrespective of display configuration (e.g., full-screen, split-screen window, slide-over window, draft window, minimized window, etc.), are available for viewing and selection (e.g., displayed initially, or displayed in response to a scroll or browsing input) in the window-selector user interface region 4508.

In FIG. 4D5, the window-selector user interface region 4508 includes representations for windows associated with the application corresponding to the dragged application icon (e.g., the representation 4510 for a first window of the browser application, and the representation 4512 for a second window of the browser application). The representations of the windows include an identifier for the application, and a unique name corresponding to each of the windows. In some embodiments, the name of the windows are automatically generated by the device in accordance with the displayed content of the window (e.g., a title, username, subject line, etc. of the document, email, message, webpage, image, etc.). The representation for each window includes a closing affordance (e.g., affordance 4518 and affordance 4520) for closing the window individually without closing other saved windows of the application. In some embodiments, the window-selector user interface region 4508 includes a closing affordance 4514 for closing the window-selector user interface region 4508, without closing the saved windows of the application. In some embodiments, the window-selector user interface region 4508 includes an affordance for closing all of the windows associated with the application, without closing the window-selector user interface region 4508. In some embodiments, the window-selector user interface region 4508 includes an affordance 4516 for opening a new window of the application. In some embodiments, the new window is displayed in the slide-over mode immediately after it is opened. In some embodiments, a representation of the new window is displayed in the window-selector user interface region 4508 first, and the new window is only displayed in the slide-over mode in response to another user input selecting the representation of the new window. FIGS. 4D6-4D17 describe some of the features of the window-selector user interface region 4508, in accordance with some embodiments.

In FIGS. 4D6-4D8, an input by a contact 4522 is detected on the representation 4512 of window 2 of the browser application in the window-selector user interface region 4508. The input includes movement of the contact 4522 towards the right side-edge of the display. In response to detecting the movement of the contact 4522, the representation 4512 is dragged off the display, and the window corresponding to the representation 4512 is closed, as shown in FIGS. 4D7-4D8. In FIG. 4D8, only the representation 4510 for window 1 of the browser application remains in the window-selector user interface region 4508.

FIGS. 4D8-4D9 illustrate that, in some embodiments, if all windows, except for one (e.g., window 1), shown in the window-selector user interface region 4508 have been closed, the device ceases to display the window-selector user interface region 4508 and displays the single remaining window of the application in the slide-over mode (e.g., as slide-over window 4506), as shown in FIG. 4D9, without requiring further user input selecting the representation of the single remaining window. In some embodiments, the window-selector user interface region remains displayed, and a user input (e.g., a tap input) selecting the representation of the last remaining window opens the last remaining window in the slide-over mode.

FIGS. 4D10-4D11 illustrate that, an input by a contact 4524 is detected on the representation of one of the windows associated with the application (e.g., representation 4510), and in response to detecting the input and in accordance with a determination that the input meets the first criteria (e.g., the input is a tap input), the device ceases to display the window-selector user interface region 4508 and displays the selected window (e.g., window 1) in the slide-over mode (e.g., as slide-over window 4506).

FIGS. 4D12-4D13 illustrate an alternative way to close a window from that shown in FIGS. 4D6-4D8, in accordance with some embodiments. As shown in FIG. 4D12, an input by a contact 4526 is detected at a location that corresponds to the closing affordance 4520 for window 2 represented in the window-selector user interface region 4508. In response to the input and in accordance with a determination that the input meets the first criteria (e.g., the input is a tap input), the device ceases to display the representation 4512 for window 2 and closes window 2 of the browser application, as shown in FIG. 4D13.

In FIGS. 4D13-4D14, in some embodiments, if all windows, except for one (e.g., window 1), shown in the window-selector user interface region 4508 have been closed, the device ceases to display the window-selector user interface region 4508 and displays the single remaining window of the application in the slide-over mode (e.g., as slide-over window 4506), as shown in FIG. 4D14, without requiring further user input selecting the representation of the single remaining window. In some embodiments, the window-selector user interface region remains displayed, and a user input (e.g., a tap input) selecting the representation of the last remaining window opens the last remaining window in the slide-over mode.

In FIGS. 4D15-4D17, a series of inputs individually closed all the windows represented in the window-selector user interface 4508 using the closing affordances on the representations of the windows in the window-selector user interface region 4508, in accordance with some embodiments. As shown in FIG. 4D15, a tap input by contact 4528 is detected on the closing affordance 4520 for window 2. In response to the input by contact 4528, the representation 4512 for window 2 is removed from the window-selector user interface region 4508, and the corresponding window is closed (e.g., removed from memory). In FIG. 4D16, another tap input by a contact 4530 is detected on the closing affordance 4518 for window 1. In response to detecting the input by the contact 4530, the representation 4524 is removed from the window-selector user interface region 4508, and the corresponding window is closed (e.g., removed from memory), as shown in FIG. 4D17.

In some embodiments, after all windows associated with an application are closed through interactions with the window-selector user interface region (e.g., in the manners described above in FIGS. 4D6-4D8 and FIGS. 4D15-4D17), the window-selector user interface region 4508 is optionally maintained on the display, as shown in FIG. 4D17. In some embodiments, the user can open additional new windows using the affordance 4516 and have them represented in the window-selector user interface region 4508. In some embodiments, an user input is required (e.g., a tap input on the closing affordance 4514, or a horizontal swipe input that originates from outside of the window-selector user interface region 4508 continues across the window-selector user interface region 4508) to remove the window-selector user interface region 4508 from the display, after all windows in the region have been closed. In some embodiments, after all windows represented in the window-selector user interface 4508 have been closed, the device ceases to display the window-selector user interface region 4508, without requiring an input to close the window-selector user interface region 4508.

FIGS. 4D18-4D19 illustrate that a similar window-selector user interface region 4534 is displayed when the application icon of the browser application is dragged and dropped in the second predefined region 4310' for opening a window of the application in the split-screen mode, if there are multiple windows associated with the application, in accordance with some embodiments. The window-selector user interface region 4534 is optionally displayed with the background window in a side-by-side configuration, to indicate to the user that a selected window from the window-selector user interface region 4534 will be displayed in the split-screen view with the split-screen window 4532 that is converted from the full-screen background window 4122.

As shown in FIG. 4D18, following FIG. 4D2 or FIG. 4D3, the movement of the contact 4502 has dragged representation 4504 into the expanded second predefined region 4310' on the display for opening a new split-screen window for the application on the right-side of the display. In some embodiments, if the input by the contact 4502 ended while the contact and the representation 4504 are in the expanded second predefined region 4310', and the browser application is associated with zero window or a single window at this time, the device displays a new default window or the single window in the split-screen configuration with a split-window 4532 converted from the background window 4122. In some embodiments, if the input by the contact 4502 ended while the contact and the representation 4504 are in the expanded second predefined region 4310', and the browser application is associated with multiple windows at this time, the device displays the window-selector user interface region 4534 in the split-screen configuration with a split-window 4532 converted from the background window 4122.

As shown in FIG. 4D19, the window-selector user interface region 4534 is similarly configured as the window-selector user interface region 4508 described with respect to FIGS. 4D5-4D17, in accordance with some embodiments. For example, the user-selector user interface region 4534 includes the same sets of representations (e.g., representations 4510 and 4512 for the saved recently open windows of the browser application) and affordances (e.g., individual closing affordances 4518 and 4520, closing affordance 4514, new window affordance 4516, etc.). User interface interactions described with respect to window-selector user interface region 4508 are also applicable to window-selector user interface region 4534, in accordance with some embodiments.

Figure 9D:
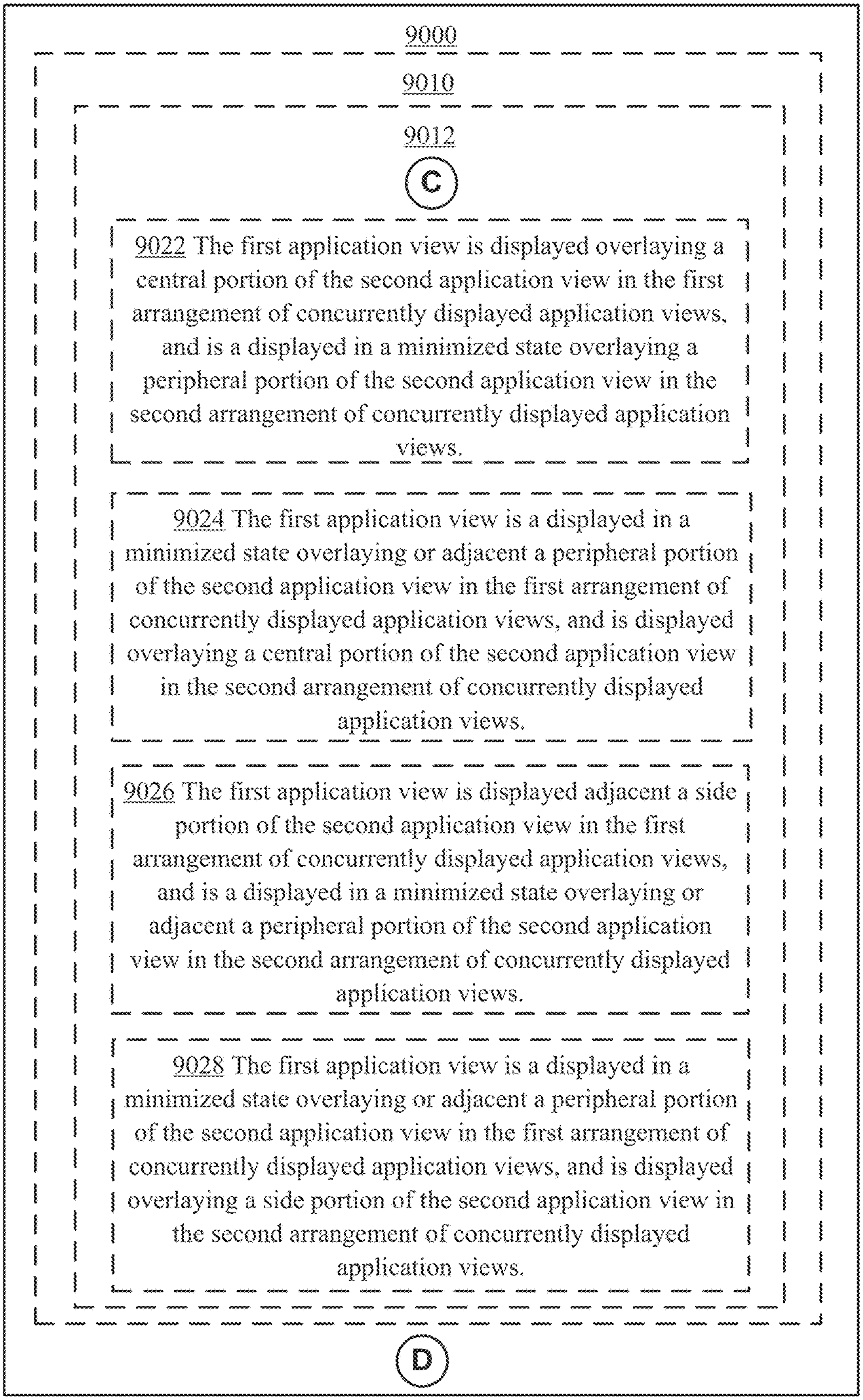

FIGS. 4E1-4E28 illustrate user interface behaviors in response to an input dragging a representation of a window across the display to different locations and releasing it into different drop zones on the display, in accordance with some embodiments. As illustrated in FIGS. 4E1-4E28, dynamic visual feedback is provided to indicate an outcome of the input based on a current location of the input and the dragged representation of the window as compared to a plurality of predefined drop zones on the display, before an end of the input is detected. In some embodiments, the drag operation performed on a window displayed in a respective concurrent-display configuration (e.g., a slide-over display configuration, a split-screen display configuration, a minimized display configuration, a draft mode display configuration, etc.), causes the window to be displayed in the same concurrent-display configuration, a different concurrent-display configuration, or a standalone display configuration, depending on the location of the representation of the window when the end of the input is detected, as evaluated against the different drop zones corresponding to the different concurrent-display configurations and the standalone display configuration (e.g., the drop zones illustrated in FIG. 4E8). FIGS. 4E9-4E17 illustrate the various intermediate states that the device displays to indicate the various final states that may result if the input were to end at the current location, in accordance with some embodiments. FIGS. 4E9-4E17 also illustrates the dynamic nature of the visual feedback and the input by which the intermediate states may be repeated in any order by any number of times depending on the movement of the input and the current location of the input relative to the different drop zones on the display, before an end of the input is detected. The user interfaces in these figures are used to illustrate the processes described below, including the processes in FIGS. 9A-9J. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 4E1-4E7 illustrate seven different starting states of a window (e.g., a window of the email application). For ease of explanation, the window in this example are given different labels based on the current display-configuration of the window. The same content is displayed in the window, and the display configuration of the window changes from one configuration to another configuration as a result of the drag and drop operation performed on the window. In some embodiments, the starting configuration of a window includes any one of a plurality of configurations, including a slide-over window on the left, a slide-over window on the right, a background window with a slide-over window overlaid on the left, a background window with a slide-over window overlaid on the right, a split-screen window on the right, a split-screen window on the left, a draft window, a background window of a draft window, a minimized window, a full-screen window concurrently displayed with a minimized window, a standalone full-screen window, etc. In some embodiments, the final configuration of a window includes any one of a plurality of configurations, including a slide-over window on the left, a slide-over window on the right, a background window with a slide-over window overlaid on the left, a background window with a slide-over window overlaid on the right, a split-screen window on the right, a split-screen window on the left, a draft window, a background window of a draft window, a minimized window, a full-screen window concurrently displayed with a minimized window, a standalone full-screen window, etc. The number of transitions between possible starting configurations and possible final configurations is too numerous to list individually herein. Representative starting states and final states of the possible window-display configurations are described for illustrative purposes, in accordance with some embodiments. In some embodiments, either window of a pair concurrently displayed windows may be the subject of the drag and drop operation, to convert the display configuration of the window to another state. In some embodiments, a window can be converted from a standalone display configuration to a concurrent display configuration, and vice versa. In some embodiments, the drag handles of the concurrently displayed windows switches between a first display state (e.g., active) and a second display state (background) in accordance with which of the concurrently displayed windows have input focus.

As shown in FIGS. 4E1-4E7, seven example starting states of a display configuration for a window of the email application are shown.

In FIG. 4E1, in an example starting state A of the display configuration for the window of the email application, the window of the email application is a split-screen window (e.g. window 4602) that is concurrently displayed with a split-screen window 4604 of the messages application. The split-screen window 4602 of the email application is displayed on the left side of the display. An input by a contact 4610 is detected on the drag handle 4606 of the split-screen window 4602, and the drag handle 4606 is displayed in the active state (e.g., solid, bold color). The drag handle 4608 of the concurrently displayed split-screen window that does not have input focus is displayed in the background state (e.g., translucent, muted color).

In FIG. 4E2, in an example starting state B of the display configuration for the window of the email application, the window of the email application is a slide-over window (e.g. window 4614) that is concurrently displayed with a full-screen background window 4612 of the messages application. The slide-over window 4614 of the email application is displayed on the left side of the display overlaying the background window 4612 of the messages application. An input by a contact 4610 is detected on the drag handle 4606 of the slide-over window 4614, and the drag handle 4606 is displayed in the active state (e.g., solid, bold color). The drag handle 4608 of the concurrently displayed full-screen background window 4612 that does not have input focus is displayed in the background state (e.g., translucent, muted color). For clarity of explanation, the same drag handle label is used when the window corresponding to the drag handle transforms from one configuration to another configuration.

In FIG. 4E3, in an example starting state C of the display configuration for the window of the email application, the window of the email application is a draft window (e.g. window 4615) that is overlaid on a full-screen background window 4612 of the messages application. The draft window 4615 of the email application is displayed in the central region of the display, and displays an editable draft of an email document. An input by a contact 4610 is detected on the drag handle 4606 of the draft window 4615, and the drag handle 4606 is displayed in the active state (e.g., solid, bold color). The drag handle 4608 of the concurrently displayed background window 4612 that does not have input focus is displayed in the background state (e.g., translucent, muted color).

In FIG. 4E4, in an example starting state D of the display configuration for the window of the email application, the window of the email application is a minimized window (e.g. window 4616) that is displayed at a peripheral portion of a full-screen window 4612 of the messages application. The minimized window 4616 of the email application does not display the content of the email application. An input by a contact 4610 is detected on the minimized window 4615 which does not have a visible drag handle. The drag handle 4608 of the concurrently displayed full-screen window 4612 that does not have input focus is displayed in the background state (e.g., translucent, muted color).

In FIG. 4E5, in an example starting state E of the display configuration for the window of the email application, the window of the email application is a split-screen window (e.g. window 4602) that is concurrently displayed with the split-screen window 4604 of the messages application. The split-screen window 4602 of the email application is displayed on the right side of the display. An input by a contact 4610 is detected on the drag handle 4606 of the split-screen window 4602, and the drag handle 4606 is displayed in the active state (e.g., solid, bold color). The drag handle 4608 of the concurrently displayed split-screen window that does not have input focus is displayed in the background state (e.g., translucent, muted color).

In FIG. 4E6, in an example starting state F of the display configuration for the window of the email application, the window of the email application is a slide-over window (e.g. window 4614) that is concurrently displayed with a full-screen background window 4612 of the messages application. The slide-over window 4614 of the email application is displayed on the right side of the display overlaying the background window 4612 of the messages application. An input by a contact 4610 is detected on the drag handle 4606 of the slide-over window 4614, and the drag handle 4606 is displayed in the active state (e.g., solid, bold color). The drag handle 4608 of the concurrently displayed full-screen background window 4612 that does not have input focus is displayed in the background state (e.g., translucent, muted color).

In FIG. 4E7, in an example starting state G of the display configuration for the window of the email application, the window of the email application is a standalone full-screen window (e.g. window 4618) that is not concurrently displayed with another window. The full-screen window 4618 of the email application occupies substantially all of the display and has input focus. An input by a contact 4610 is detected on the drag handle 4606 of the full-screen window 4618, and the drag handle 4606 is displayed in the active state (e.g., solid, bold color). In some embodiments, the drag handle of the standalone full-screen window is invisible or in an inactive state (e.g., translucent, muted color) even when it has input focus, and the drag handle switches to the activate state (e.g., solid, bold color) when an input is detected on the drag handle.

FIG. 4E8 illustrates the different drop zones that are predefined (e.g., boundaries between the zones are denoted by the dotted lines) on the display and that correspond to different final display configurations for the dragged window when the input ends, in accordance with some embodiments. In some embodiments, Zone G is defined as a central portion of the display near the top edge of the display. Zone G is for converting a window from a concurrent-display configuration to a standalone full-screen display configuration, when a window is dropping into Zone G. In some embodiments, Zone H is a horizontal band across the width of the display near the top edge of the display, excluding the central portion corresponding to Zone G. Zone H is for changing which side of the display a slide-over window or a split-screen window occupies, when the slide-over window or split-screen window is dragged from one side to the other side of the display, with its starting and ending locations within Zone H. In some embodiments, Zone A and Zone E are narrow regions each defined by a respective side edge of the display and a boundary that is a first threshold distance away from the respective side edge. Zone A and Zone E exclude the regions occupied by Zone H above. Zone A is for transforming a dragged window into a split-screen window that is displayed on the left side of the display, concurrently with another split-screen window. Zone E is for transforming a dragged window into a split-screen window that is displayed on the right side of the display, concurrently with another split-screen window. In some embodiments, Zone B and Zone F are regions that are adjacent to and wider than Zone A and Zone E, respectively. Zone B and Zone F also exclude the regions occupied by Zone H above. Zone B is for transforming a dragged window into a slide-over window that is displayed on the left side of the display, overlaying another full-screen background window. Zone F is for transforming a dragged window into a slide-over window that is displayed on the right side of the display, overlaying another full-screen background window. Zone D occupies a central portion of the display near the bottom edge of the display, that is between Zone B and Zone F. Zone D is for transforming a dragged window into a minimized state, and displayed overlaying or adjacent a peripheral region of another full-screen window. Zone C occupies the central region of the display, excluding the regions occupied by Zone H from above, Zone D from below, and Zone B and Zone F on the sides. The drop zones shown in FIG. 4E8 are for illustrate purposes only, and there may be more or fewer zones, zones with different layout and sizes than those illustrated in FIG. 4E8, in accordance with various embodiments.

FIGS. 4E9-4E17 illustrate example intermediate states that correspond the different drop zones A-H, in accordance with some embodiments. Each intermediate state provides represents the visual feedback that is provided by the device indicating the final state of the user interface that would be displayed if the input is to end at the current location. In FIGS. 4E9-4E17, the contact 4610 has dragged the representation 4620 of the window of the email application to a respective location inside a respective one of the drop zones, the appearance of the representation 4620 changes to a respective appearance state that corresponds to the current drop zone and the final state corresponding to the current drop zone. Thick arrows originating from the current location of the contact 4610 and the representation 4620 and ending inside different drop zones indicate that the movement of the contact 4610 may continue on to any of the drop zones and trigger the corresponding intermediate state of the drop zone, before the input ends.

In FIG. 4E9 illustrating intermediate state A, the input by contact 4610 has dragged the representation 4620 into Zone A. The representation 4620 takes on an appearance (e.g., state 4620-A) corresponding to Zone A and is displayed concurrently with a reduced-width window 4604' to indicate that, if the end of the input is detected at the current location (e.g., within Zone A), the dragged email window will be displayed as a split-screen window on the left-side of the display, concurrently with another split-screen window of the messages application. Black arrows originating from the location of the contact 4610 and ending in different zones, indicate that the contact 4610 may continue to move into Zone B to trigger intermediate state B, into Zone D to trigger intermediate state D, into Zone E to trigger intermediate state E, into Zone F to trigger intermediate state F, into Zone C to trigger intermediate state C, into Zone G to trigger intermediate state G, respectively. The grey arrow originating from the location of the contact 4610 and ending in Zone H indicates that the contact 4610 may continue to move into Zone H to trigger intermediate state H-1 or intermediate state H2. The transition to intermediate state H-1 is only available when an initial display configuration of the dragged window is a slide-over window, irrespective of other intermediate states that the dragged window has gone through. The transition to intermediate state H-2 is only available when an initial display configuration of the dragged window is a split-screen window, irrespective of other intermediate states that the dragged window has gone through.

In FIG. 4E10 illustrating intermediate state B, the input by contact 4610 has dragged the representation 4620 into Zone B. The representation 4620 takes on an appearance (e.g., state 4620-B) corresponding to Zone B and is displayed concurrently with a full-screen window 4612' to indicate that, if the end of the input is detected at the current location (e.g., within Zone B), the dragged email window will be displayed as a slide-over window on the left-side of the display, overlaying a full-screen window of the messages application. Black arrows originating from the location of the contact 4610 and ending in different zones, indicate that the contact 4610 may continue to move into Zone A to trigger intermediate state A, into Zone D to trigger intermediate state D, into Zone E to trigger intermediate state E, into Zone F to trigger intermediate state F, into Zone C to trigger intermediate state C, into Zone G to trigger intermediate state G, respectively. The grey arrow originating from the location of the contact 4610 and ending in Zone H indicates that the contact 4610 may continue to move into Zone H to trigger intermediate state H-1 or intermediate state H2. The transition to intermediate state H-1 is only available when an initial display configuration of the dragged window is a slide-over window, irrespective of other intermediate states that the dragged window has gone through. The transition to intermediate state H-2 is only available when an initial display configuration of the dragged window is a split-screen window, irrespective of other intermediate states that the dragged window has gone through.

In FIG. 4E11 illustrating intermediate state C, the input by contact 4610 has dragged the representation 4620 into Zone C. The representation 4620 takes on an appearance (e.g., state 4620-C) corresponding to Zone C and is displayed concurrently with a full-screen window 4612' to indicate that, if the end of the input is detected at the current location (e.g., within Zone C), the dragged email window will be displayed as a draft window in the central portion of the display, overlaying a full-screen window of the messages application. Black arrows originating from the location of the contact 4610 and ending in different zones, indicate that the contact 4610 may continue to move into Zone A to trigger intermediate state A, into Zone B to trigger intermediate state B, into Zone D to trigger intermediate state D, into Zone F to trigger intermediate state F, into Zone E to trigger intermediate state E, into Zone G to trigger intermediate state G, respectively. The grey arrow originating from the location of the contact 4610 and ending in Zone H indicates that the contact 4610 may continue to move into Zone H to trigger intermediate state H-1 or intermediate state H2. The transition to intermediate state H-1 is only available when an initial display configuration of the dragged window is a slide-over window, irrespective of other intermediate states that the dragged window has gone through. The transition to intermediate state H-2 is only available when an initial display configuration of the dragged window is a split-screen window, irrespective of other intermediate states that the dragged window has gone through.

In FIG. 4E12 illustrating intermediate state D, the input by contact 4610 has dragged the representation 4620 into Zone D. The representation 4620 takes on an appearance (e.g., state 4620-D) corresponding to Zone D and is displayed concurrently with a full-screen window 4612' to indicate that, if the end of the input is detected at the current location (e.g., within Zone D), the dragged email window will be displayed as a minimized window at the bottom of the display, on the edge of a full-screen window of the messages application. Black arrows originating from the location of the contact 4610 and ending in different zones, indicate that the contact 4610 may continue to move into Zone A to trigger intermediate state A, into Zone B to trigger intermediate state B, into Zone C to trigger intermediate state C, into Zone E to trigger intermediate state E, into Zone F to trigger intermediate state F, into Zone G to trigger intermediate state G, respectively. The grey arrow originating from the location of the contact 4610 and ending in Zone H indicates that the contact 4610 may continue to move into Zone H to trigger intermediate state H-1 or intermediate state H2. The transition to intermediate state H-1 is only available when an initial display configuration of the dragged window is a slide-over window, irrespective of other intermediate states that the dragged window has gone through. The transition to intermediate state H-2 is only available when an initial display configuration of the dragged window is a split-screen window, irrespective of other intermediate states that the dragged window has gone through.

In FIG. 4E13 illustrating intermediate state E, the input by contact 4610 has dragged the representation 4620 into Zone E. The representation 4620 takes on an appearance (e.g., state 4620-E) corresponding to Zone E and is displayed concurrently with a reduced-width window 4604' to indicate that, if the end of the input is detected at the current location (e.g., within Zone E), the dragged email window will be displayed as a split-screen window on the right side of the display, adjacent another split-screen window of the messages application. Black arrows originating from the location of the contact 4610 and ending in different zones, indicate that the contact 4610 may continue to move into Zone A to trigger intermediate state A, into Zone B to trigger intermediate state B, into Zone C to trigger intermediate state C, into Zone D to trigger intermediate state D, into Zone F to trigger intermediate state F, into Zone G to trigger intermediate state G, respectively. The grey arrow originating from the location of the contact 4610 and ending in Zone H indicates that the contact 4610 may continue to move into Zone H to trigger intermediate state H-1 or intermediate state H2. The transition to intermediate state H-1 is only available when an initial display configuration of the dragged window is a slide-over window, irrespective of other intermediate states that the dragged window has gone through. The transition to intermediate state H-2 is only available when an initial display configuration of the dragged window is a split-screen window, irrespective of other intermediate states that the dragged window has gone through.

In FIG. 4E14 illustrating intermediate state F, the input by contact 4610 has dragged the representation 4620 into Zone F. The representation 4620 takes on an appearance (e.g., state 4620-F) corresponding to Zone F and is displayed concurrently with a full-screen window 4612' to indicate that, if the end of the input is detected at the current location (e.g., within Zone F), the dragged email window will be displayed as a slide-over window on the right side of the display, overlaying a full-screen window of the messages application. Black arrows originating from the location of the contact 4610 and ending in different zones, indicate that the contact 4610 may continue to move into Zone A to trigger intermediate state A, into Zone B to trigger intermediate state B, into Zone C to trigger intermediate state C, into Zone D to trigger intermediate state D, into Zone E to trigger intermediate state E, into Zone G to trigger intermediate state G, respectively. The grey arrow originating from the location of the contact 4610 and ending in Zone H indicates that the contact 4610 may continue to move into Zone H to trigger intermediate state H-1 or intermediate state H2. The transition to intermediate state H-1 is only available when an initial display configuration of the dragged window is a slide-over window, irrespective of other intermediate states that the dragged window has gone through. The transition to intermediate state H-2 is only available when an initial display configuration of the dragged window is a split-screen window, irrespective of other intermediate states that the dragged window has gone through.

In FIG. 4E14 illustrating intermediate state F, the input by contact 4610 has dragged the representation 4620 into Zone F. The representation 4620 takes on an appearance (e.g., state 4620-F) corresponding to Zone F and is displayed concurrently with a full-screen window 4612' to indicate that, if the end of the input is detected at the current location (e.g., within Zone F), the dragged email window will be displayed as a slide-over window on the right side of the display, overlaying a full-screen window of the messages application. Black arrows originating from the location of the contact 4610 and ending in different zones, indicate that the contact 4610 may continue to move into Zone A to trigger intermediate state A, into Zone B to trigger intermediate state B, into Zone C to trigger intermediate state C, into Zone D to trigger intermediate state D, into Zone E to trigger intermediate state E, into Zone G to trigger intermediate state G, respectively. The grey arrow originating from the location of the contact 4610 and ending in Zone H indicates that the contact 4610 may continue to move into Zone H to trigger intermediate state H-1 or intermediate state H2. The transition to intermediate state H-1 is only available when an initial display configuration of the dragged window is a slide-over window, irrespective of other intermediate states that the dragged window has gone through. The transition to intermediate state H-2 is only available when an initial display configuration of the dragged window is a split-screen window, irrespective of other intermediate states that the dragged window has gone through.

In FIG. 4E15 illustrating intermediate state G, the input by contact 4610 has dragged the representation 4620 into Zone G. The representation 4620 takes on an appearance (e.g., state 4620-G) corresponding to Zone G and is displayed concurrently with a full-screen window 4612' to indicate that, if the end of the input is detected at the current location (e.g., within Zone G), the dragged email window will be displayed as a full-screen window, without any other concurrently displayed window. Black arrows originating from the location of the contact 4610 and ending in different zones, indicate that the contact 4610 may continue to move into Zone A to trigger intermediate state A, into Zone B to trigger intermediate state B, into Zone C to trigger intermediate state C, into Zone D to trigger intermediate state D, into Zone E to trigger intermediate state E, into Zone F to trigger intermediate state F, respectively. The grey arrow originating from the location of the contact 4610 and ending in Zone H indicates that the contact 4610 may continue to move into Zone H to trigger intermediate state H-1 or intermediate state H2. The transition to intermediate state H-1 is only available when an initial display configuration of the dragged window is a slide-over window, irrespective of other intermediate states that the dragged window has gone through. The transition to intermediate state H-2 is only available when an initial display configuration of the dragged window is a split-screen window, irrespective of other intermediate states that the dragged window has gone through.

In FIG. 4E16 illustrating intermediate state H-1, the input by contact 4610 has dragged the representation 4620 into Zone H. In accordance with a determination that the dragged window started as a slide-over window 4614, the slide-over window 4614 is displayed as the representation of the dragged window overlaying the original full-screen background window 4612 to indicate that, if the end of the input is detected at the current location (e.g., within Zone H), the dragged email window will remain as a slide-over window, displayed on the side of the display that corresponds to the current location of the input (e.g., left-side of the display or the right-side of the display). Black arrows originating from the location of the contact 4610 and ending in different zones, indicate that the contact 4610 may continue to move into Zone A to trigger intermediate state A, into Zone B to trigger intermediate state B, into Zone C to trigger intermediate state C, into Zone D to trigger intermediate state D, into Zone E to trigger intermediate state E, into Zone F to trigger intermediate state F, into Zone G to trigger intermediate state G, respectively.

In FIG. 4E17 illustrating intermediate state H-2, the input by contact 4610 has dragged the representation 4620 into Zone H. In accordance with a determination that the dragged window started as a split-screen window 4602, the split-screen window 4602 is displayed as the representation of the dragged window, overlaying the original split-screen window 4604 that is concurrently displayed with window 4602, to indicate that, if the end of the input is detected at the current location (e.g., within Zone H), the dragged email window will remain as a split-screen window, displayed on the side of the display that corresponds to the current location of the input (e.g., left-side of the display or the right-side of the display). Black arrows originating from the location of the contact 4610 and ending in different zones, indicate that the contact 4610 may continue to move into Zone A to trigger intermediate state A, into Zone B to trigger intermediate state B, into Zone C to trigger intermediate state C, into Zone D to trigger intermediate state D, into Zone E to trigger intermediate state E, into Zone F to trigger intermediate state F, into Zone G to trigger intermediate state G, respectively.

FIGS. 4E18-4E24 illustrate example final states of the user interface, when the end of the input is detected while the contact and representation of the dragged window is within various drop zones on the display, in accordance with some embodiments.

FIG. 4E18 illustrates an example final state A of the display configuration for the window of the email application, displayed after the end of the input is detected while the contact 4610 is within Zone A. In the final state A, the window of the email application is a split-screen window (e.g. window 4602) that is concurrently displayed with a split-screen window 4604 of the messages application. The split-screen window 4602 of the email application is displayed on the left side of the display. A new input by a contact 4622 is detected in window 4604 switching the input focus from window 4602 to window 4604. As a result, the drag handle 4606 of the split-screen window 4602 is displayed in the inactive state (e.g., translucent, muted color). The drag handle 4608 of the concurrently displayed split-screen window 4604 that now has input focus is displayed in the active state (e.g., solid, bold color).

FIG. 4E19 illustrates an example final state B of the display configuration for the window of the email application, displayed after the end of the input is detected while the contact 4610 is within Zone B. In the final state B, the window of the email application is a slide-over window (e.g. window 4614) that is overlaid on a full-screen window 4612 of the messages application. The slide-over window 4614 of the email application is displayed on the left side of the display. A new input by a contact 4622 is detected in window 4612 switching the input focus from window 4614 to window 4612. As a result, the drag handle 4606 of the slide-over window 4614 is displayed in the inactive state (e.g., translucent, muted color). The drag handle 4608 of the background full-screen window 4612 that now has input focus is displayed in the active state (e.g., solid, bold color).

FIG. 4E20 illustrates an example final state C of the display configuration for the window of the email application, displayed after the end of the input is detected while the contact 4610 is within Zone C. In the final state C, the window of the email application is a draft window (e.g. window 4615) that is overlaid on a central portion of the full-screen window 4612 of the messages application. Since the draft window 4615 has the input focus, the drag handle 4606 of the draft window 4615 is displayed in the active state (e.g., solid, bold color). The drag handle 4608 of the background full-screen window 4612 that does not have input focus is displayed in the inactive state (e.g., translucent, muted color).

FIG. 4E21 illustrates an example final state D of the display configuration for the window of the email application, displayed after the end of the input is detected while the contact 4610 is within Zone D. In the final state D, the window of the email application is a minimized window (e.g. window 4616) that does not show the content of the window. The minimized window is displayed near the bottom edge of the display over a bottom peripheral portion of the full-screen window 4612 of the messages application. Since the minimized window 4616 no longer has the input focus, the input focus is passed to the full-screen window 4612. As a result, the drag handle 4608 of the full-screen window 4612 is displayed in the active state (e.g., solid, bold color).

FIG. 4E22 illustrates an example final state E of the display configuration for the window of the email application, displayed after the end of the input is detected while the contact 4610 is within Zone E. In the final state E, the window of the email application is a split-screen window (e.g. window 4602) that is displayed side-by-side with another split-screen window 4604 of the messages application. The split-screen window 4602 of the email application is displayed on the right side of the display. A new input by a contact 4622 is detected in window 4604 switching the input focus from window 4602 to window 4604. As a result, the drag handle 4606 of the split-screen window 4602 is displayed in the inactive state (e.g., translucent, muted color). The drag handle 4608 of the concurrently displayed split-screen window 4604 that now has input focus is displayed in the active state (e.g., solid, bold color).

FIG. 4E23 illustrates an example final state F of the display configuration for the window of the email application, displayed after the end of the input is detected while the contact 4610 is within Zone F. In the final state F, the window of the email application is a slide-over window (e.g. window 4614) that is overlaid on a full-screen window 4612 of the messages application. The slide-over window 4614 of the email application is displayed on the right side of the display. A new input by a contact 4622 is detected in window 4612 switching the input focus from window 4614 to window 4612. As a result, the drag handle 4606 of the slide-over window 4614 is displayed in the inactive state (e.g., translucent, muted color). The drag handle 4608 of the background full-screen window 4612 that now has input focus is displayed in the active state (e.g., solid, bold color).

FIG. 4E24 illustrates an example final state G of the display configuration for the window of the email application, displayed after the end of the input is detected while the contact 4610 is within Zone G. In the final state G, the window of the email application is a standalone full-screen window (e.g. window 4618). Any previously concurrently displayed window is no longer displayed. In some embodiments, the drag handle of the standalone full-screen window is not visible until an input is detected at the central top edge region of the full-screen window.

FIGS. 4E25-4E28 illustrate a few special intermediate states when the starting state and the final state of the user interface are certain combinations of configurations. These modified intermediate states are optionally displayed instead of the intermediate states A-F described above, if the starting state and the current location of the input corresponds to the combinations of states labeled on the Figures.

For example, in FIG. 4E25, if the starting state of the dragged window is a slide-over window on the right side of the display (e.g., starting state F), and the current location of the contact is in Zone E corresponding to a split-screen window on the right side of the display, the special intermediate state E is displayed instead of the intermediate state E shown in FIG. 4E13. The special intermediate state E shows that the background full-screen window is visually obscured and resized (e.g., reducing the width from the right edge), with an application icon in the middle of the representation 4626 of the resized background window. The special intermediate state E also shows the original slide-over window being reduced in size and is visually obscured, with an application icon in the middle of the representation 4624 of the resized slide-over window. The visual obscuring of the windows when the windows are resized allows the device to avoid extensive computations to determine the changing appearances of the windows and avoid visual confusion, in some embodiments.

A similar-looking special intermediate state F is optionally implemented when the starting state of the dragged window is a split-screen window on the right side of the display (e.g., starting state E), and the current location of the contact is in Zone F corresponding to a slide-over window on the right side of the display, as shown in FIG. 4E27. In the case, where the starting state of the dragged window is a split-screen window, the background window is expanded to a full-screen window 4632, as opposed to reducing in size in the special intermediate state F, while the split-screen window is converted to a slide-over window 4634. The special intermediate state F shows both windows 4632 and 4634 in a visually obscured state, with an application icon in the middle of the visually obscured window.

In another example, in FIG. 4E26, if the starting state of the dragged window is a slide-over window on the left side of the display (e.g., starting state B), and the current location of the contact is in Zone A corresponding to a split-screen window on the left side of the display, the special intermediate state A is displayed instead of the intermediate state A shown in FIG. 4E9. The special intermediate state A shows that the background full-screen window is visually obscured and resized (e.g., reducing the width from the left edge), with an application icon in the middle of the representation 4630 of the resized background window. The special intermediate state A also shows the original slide-over window being reduced in size and is visually obscured, with an application icon in the middle of the representation 4628 of the resized slide-over window. The visual obscuring of the windows when the windows are resized allow the device to avoid extensive computations to determine the changing appearances of the windows and avoid visual confusion, in some embodiments.

A similar-looking special intermediate state B is optionally implemented when the starting state of the dragged window is a split-screen window on the left side of the display (e.g., starting state A), and the current location of the contact is in Zone B corresponding to a slide-over window on the left side of the display, as shown in FIG. 4E28. In the case, where the starting state of the dragged window is a split-screen, the background window is expanded to a full-screen window 4636, as opposed to reducing in size in the special intermediate state A, while the split-screen window is converted to a slide-over window 4638. The special intermediate state B shows both windows 4636 and 4638 in a visually obscured state, with an application icon in the middle of the visually obscured window.

Additional descriptions regarding FIGS. 4A1-4A50, 4B 1-4B51, 4C1-4C48, 4D1-4D19, and 4E1-4E28 are provided below in references to methods 5000, 6000, 7000, 7100, 8000, and 9000.

FIGS. 5A-5I are a flowchart representation of a method 5000 of interacting with multiple windows in a respective concurrent-display configuration (e.g., a slide-over display configuration), in accordance with some embodiments. FIGS. 4A1-4A54, 4B1-4B51, 4C1-4C48, 4D1-4D19, and 4E1-4E28 are used to illustrate the methods and/or processes of FIGS. 5A-5I. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 5000 is performed by an electronic device (e.g., portable multifunction device 100, FIG. 1A and/or one or more components of the electronic device (e.g., I/O subsystem 106, operating system 126, etc.). In some embodiments, the method 5000 is governed by instructions that are stored in a non-transitory computer-readable storage medium and that are executed by one or more processors of a device, such as the one or more processors 122 of device 100 (FIG. 1A). For ease of explanation, the following describes method 5000 as performed by the device 100. In some embodiments, with reference to FIG. 1A, the operations of method 5000 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 5000 are, optionally, combined and/or the order of some operations is, optionally, changed.

As described below, the method 5000 provides an intuitive ways to interact with multiple application windows. The method reduces the number of inputs required from a user to interact with multiple application windows and, thereby, ensures that battery life of an electronic device implementing the method 5000 is extended, since less power is required to process the fewer number of inputs (and this savings will be realized over and over again as users become increasingly familiar with the more intuitive and simple gesture). As is also explained in detail below, the operations of method 5000 help to ensure that users are able to engage in sustained interactions (e.g., they do not need to frequency undo behaviors, which interrupts their interactions with their devices) and the operations of method 5000 help to produce more efficient human-machine interfaces. Providing improved visual feedback to the user enhances the operability of the device and makes the user-device interface more efficient (e.g., allowing the user to view and interact with multiple applications on a user interface), which, additionally, reduces power usage and improves battery life of the device by enabling the user to use the device more quickly and efficiently.

In some embodiments, method 5000 is performed at an electronic device including a display generation component (e.g., a display, a projector, a heads-up display, etc.) and one or more input devices including a touch-sensitive surface (e.g., a touch-sensitive surface that is coupled to a separate display, or a touch-screen display that serves both as the display and the touch-sensitive surface). The device displays (5002), by the display generation component, a first user interface of a first application (e.g., in a standalone-display configuration, occupying substantially all areas of the display, without concurrent display of another application on the screen (e.g., as a full-screen window of the first application)) (e.g., the first user interface of the first application is not a system user interface, such as a home screen or springboard user interface from which applications can be launched by activating their respective application icons). While displaying the first user interface of the first application, the device receives (5004) a first input corresponding a request for displaying a second application with the first application in a respective concurrent-display configuration (e.g., a request for opening the second application in a slide-over window overlaying a portion of the first user interface of the first application) (e.g., the first input is an input dragging an application icon corresponding to the second application from a dock and dropping it to a predefined side region of the display, or an input dragging a content item corresponding to the second application from the first user interface to a predefined side region of the display, or an input dragging a minimized window, a split-screen window, or a draft window concurrently displayed with the window of the first application). In response to receiving the first input, the device displays (5006) a second user interface of the second application and the first user interface of the first application in accordance with the respective concurrent-display configuration (e.g., a slide-over display configuration) in which at least a portion of first user interface of the first application is displayed concurrently with (e.g., overlaying a portion of) the second user interface of the second application (e.g., actual user interfaces of the first and second applications, as opposed to static screen shots or representations of the applications, are concurrently displayed in accordance with the respective concurrent-display configuration). While displaying the second application and the first application in accordance with the respective concurrent-display configuration (e.g., the second application is displayed as a slide-over window overlaid on a portion of the first application), the device receives (5008) a second input, including detecting a first contact at a location on the touch-sensitive surface that corresponds to the second application (e.g., the first contact is detected on a portion of the displayed user interface of the second application, that is not a resizing handle of the slide-over window of the second application) and detecting movement of the first contact across the touch-sensitive surface (e.g., movement in a first direction (e.g., horizontal direction, vertical direction) relative to (e.g., parallel to, or perpendicular to) a display layout direction of the first and second applications (e.g., first and second applications are positioned along a horizontal direction, or positioned along a vertical direction on the display)). In response to detecting the second input (5010): in accordance with a determination that the second input meets first criteria (e.g., overlay-switching criteria including a first start location criterion, a first movement direction criterion, a first movement region criterion, a first movement speed criterion, and/or a first movement distance criterion), the device replaces display of the second application with display of a third application to display the third application and the first application in accordance with the respective concurrent-display configuration (e.g., ceasing to display the slide-over window of the second application on the display, and displaying a slide-over window of the third application at the location that is vacated by the slide-over window of the second application over the portion of the first application on the display) (e.g., actual user interfaces of the first and third applications, as opposed to static screen shots or representations of the applications, are concurrently displayed in accordance with the respective concurrent-display configuration); and in accordance with a determination that the second input meets second criteria (e.g., stack-removal criteria including a second start location criterion, a second movement direction criterion, a second movement region criterion, a second movement speed criterion, and/or a second movement distance criterion) that are distinct from the first criteria (e.g., the overlay-switching criteria): the device maintains display of the first application (e.g., displaying the first application in the standalone display mode again, occupying substantially all areas of the display, without concurrent display of another application on the screen) and ceases display of the second application without displaying the third application (e.g., without displaying the third application with the first application (e.g., without displaying the slide-over window of the third application and the first application in the respective concurrent-display configuration)). In this scenario, all of the slide-over windows of various open applications are removed from over window of the first application on the display in response to the single swipe gesture. This is distinct from a scenario where a window is dragged away to reveal an underlying window, because any movement that will cause the top window to move from its current location or shrink in size, will also reveal the underlying window. In some embodiments, the first user interface of the first application is displayed with another user interface of an application (e.g., the first application or an application other than the first application) in a split-screen mode, and the slide-over windows of the second application and the third applications were displayed overlaying the pair of split-screen windows. In some embodiments, the first application, the second application, and the third application are distinct applications. This is illustrated in FIGS. 4A19-4A21 and 4A28-4A29, following FIG. 4A12, for example.

In some embodiments, the respective concurrent-display configuration is a first concurrent-display configuration (e.g., a slide-over configuration), and wherein the second user interface of the second application is displayed overlaying a portion (less than all) of the first user interface of the first application in accordance with the first concurrent-display configuration (e.g., the second user interface of the second application is displayed as a slide-over window overlaying a portion of the first user interface of the first application). In some embodiments, the respective concurrent-display configuration is a first concurrent-display configuration that includes concurrent display of a main application and one or more auxiliary applications, where the user interfaces of the auxiliary application(s) is overlaid on a portion, less than all, of the user interface of the main application, and where the user interface of at least one of the auxiliary applications (e.g., the top one in a stack of auxiliary applications) and the user interface of the main application are responsive to user inputs to perform operations within those applications (e.g., user interface objects within the user interfaces function as they normally would in a full-screen standalone display mode, and direct copy and paste and/or drag and drop functions are available across the two or more concurrently displayed applications)). In some embodiments, the respective concurrent-display configuration is a first concurrent-display configuration that is distinct from a second concurrent-display configuration in which the first application and the second application are displayed side-by-side with no overlap between the windows of the two applications. The respective concurrent-display configuration is distinct from an application-switcher or window-switcher user interfaces that concurrently display representations of multiple open applications or application windows that are not responsive to user inputs to perform operations within the applications. In some embodiments, the second concurrent-display configuration includes concurrent display of two or more applications or application windows, where the user interfaces of the application(s) or windows do not overlap, and where the user interface of the concurrently displayed applications are responsive to user inputs to perform operations within those applications (e.g., user interface objects within the user interfaces function as they normally would in a single-window display mode, and direct copy and paste and/or drag and drop functions are available across the two or more concurrently displayed applications)). This is illustrated in FIGS. 4A19-4A21 and 4A28-4A29, following FIG. 4A12, for example. Displaying an application overlaying a portion of the user interface of another application on a display generation component in accordance with the concurrent-display configuration provides improved visual feedback to a user (e.g., displaying multiple applications on a display generation component in response to inputs). Providing improved visual feedback to the user enhances the operability of the device and makes the user-device interface more efficient (e.g., allowing the user to view and interact with multiple applications on a user interface), which, additionally, reduces power usage and improves battery life of the device by enabling the user to use the device more quickly and efficiently.

In some embodiments, in accordance with a determination that the first criteria (e.g., overlay-switching criteria) are met by the second input, a third user interface of the third application is displayed overlaying the portion (less than all) of the first user interface of the first application in accordance with the respective concurrent-display configuration (e.g., the third user interface of the third application is displayed as a slide-over window overlaying the portion of the first user interface of the first application that was previously occupied by the second user interface of the second application). In some embodiments, the first application and the third application remain responsive to user inputs to perform operations within the first application and to perform operations within the third applications while the first application and the third application are displayed in the respective concurrent-display configuration. In some embodiments, the third application was displayed with at least another application (e.g., the first application or another application that is distinct from the first application) in the first concurrent-display configuration prior to the second application being displayed with the first application in the first concurrent-display configuration. In other words, the third application was already in the stack of slide-over applications or application windows (e.g., as a most recently displayed slide over application or window) when the second application is added into the stack of slide-over applications or windows. This is illustrated in FIGS. 4A19-4A24, following FIG. 4A12, for example. Displaying a different application overlaying the portion of the user interface of another application on a display generation component in accordance with the concurrent-display configuration provides improved visual feedback to a user (e.g., replacing an application on a display generation component overlaying the user interface of a different application in response to inputs). Providing improved visual feedback to the user enhances the operability of the device and makes the user-device interface more efficient (e.g., allowing the user to view and interact with multiple applications on a user interface), which, additionally, reduces power usage and improves battery life of the device by enabling the user to use the device more quickly and efficiently.

In some embodiments, the second input met the first criteria (e.g., the overlay-switching criteria) and display of the third application replaced display of the second application in the respective concurrent-display configuration (e.g., the slide-over display configuration), and the method includes: while displaying the third application and the first application in accordance with the respective concurrent-display configuration after the first criteria (e.g., the overlay-switching criteria) were met by the second input, detecting a third input that includes detecting a second contact and detecting movement of the second contact across the touch-sensitive surface: in response to detecting the third input: in accordance with a determination that the third input meets the first criteria (e.g., the overlay-switching criteria), replacing display of the third application with display of a fourth application to display the fourth application and the first application in accordance with the respective concurrent-display configuration (e.g., ceasing to display the third application on the display, and displaying the fourth application at the location that is vacated by the third application over the portion of the first application on the display) (e.g., actual user interfaces of the first and fourth applications, as opposed to static screen shots or representations of the applications, are concurrently displayed in accordance with the respective concurrent-display configuration). For example, another swipe input that meets the first criteria switches the currently displayed slide-over application/window to the next slide-over application in a stack of previously displayed slide-over applications. If there are more than two slide-over applications/windows in the stack, the fourth application/window is distinct from the second and third slide-over applications/windows. If there are only two slide-over applications/windows in the stack, the fourth application/window is the same as the second application/window (e.g., the swipe input toggles between display of the second and third application/window in the slide-over view). In some embodiments, in response to detecting the third input, in accordance with a determination that the third input meets the stack-removal criteria, the device maintains display of the first application, and ceases to display the third application without displaying another application in its place over the first application. In other words, the whole stack of slide-over applications are removed from the display in response to the swipe gesture that met the second criteria. This is illustrated in FIGS. 4A19-4A25, for example. Replacing the application overlaying the portion of the user interface of another application on a display generation component in accordance with the concurrent-display configuration provides improved visual feedback to a user (e.g., replacing an application on a display generation component overlaying the user interface of a different application in response to inputs). Providing improved visual feedback to the user enhances the operability of the device and makes the user-device interface more efficient (e.g., allowing the user to view and interact with multiple applications on a user interface), which, additionally, reduces power usage and improves battery life of the device by enabling the user to use the device more quickly and efficiently.

In some embodiments, in response to detecting a respective input (e.g., the second input or the third input) that meets the first criteria (e.g., the overlay-switching criteria), the device displays an indication of one or more application views (e.g., representations of slide-over windows) that are available to be displayed in the respective concurrent-display configuration. For example, as the respective application that is currently displayed in the slide-over configuration is dragged to the side and off the display in response to the second or third input (e.g., in accordance with the movement of the first or second contact), the device also displays indications (e.g., edges of cards representing other slide-over application windows) of additional slide-over windows available in the stack underneath the slide-over window of the respective application. This is illustrated in FIGS. 4A19-4A27, for example. Displaying an indication of application views that are available to be displayed in a concurrent-display configuration in response to detecting inputs that meet input criteria provides improved visual feedback to the user (e.g., displaying hints of other available applications). Providing improved visual feedback to the user enhances the operability of the device and makes the user-device interface more efficient (e.g., allowing the user to view and interact with multiple applications on a user interface), which, additionally, reduces power usage and improves battery life of the device by enabling the user to use the device more quickly and efficiently.

In some embodiments, the first criteria (e.g., the overlay-switching criteria) and the second criteria (e.g., the stack-removal criteria) have a first movement criterion that requires the movement of the first contact across the touch-sensitive surface to correspond to a movement in a first predefined direction relative to a currently displayed user interface of the second application (e.g., horizontal movement), wherein the first criteria has a first start location criterion that requires the movement of the first contact to start at a location within threshold distance of a side-edge of second user interface of the second application and wherein the second criteria (e.g., the stack-removal criteria) has a second start location criterion that requires the movement of the first contact to start at a location within a threshold distance of a bottom edge of the second user interface of the second application. This is illustrated in FIGS. 4A12, 4A19-4A20 and 4A28-4A29, for example. Displaying different concurrent-display configurations based on start locations of the input provides additional control options without cluttering the UI with additional displayed controls (e.g., allowing the user to display different concurrent display configurations from the same user interface when an input satisfies different movement criteria). Providing additional control options without cluttering the UI with additional displayed controls enhances the operability of the device and makes the user-device interface more efficient (e.g., allowing the user to view and interact with multiple applications on a user interface), which, additionally, reduces power usage and improves battery life of the device by enabling the user to use the device more quickly and efficiently.

In some embodiments, the first criteria (e.g., the overlay-switching criteria) has a first movement criterion that requires the movement of the first contact across the touch-sensitive surface to correspond to a movement in a first predefined direction relative to a currently displayed user interface of the second application (e.g., horizontal movement within a first horizontal band near the bottom of the slide-over window), and the second criteria (e.g., the stack-removal criteria) has a second movement criterion that requires the movement of the first contact across the touch-sensitive surface to correspond to movement in a second predefined direction (e.g., vertical movement that is perpendicular to the first horizontal band, reaching at least to a position above the first horizontal band), distinct from the first predefined direction, relative to the currently displayed user interface of the second application. In some embodiments, the first criteria (e.g., the overlay-switching criteria) have a starting location requirement that requires the starting location of the movement of the first contact to be near the bottom edge (e.g., above the bottom edge) of the currently displayed user interface of the second application (e.g., the bottom edge of the slide-over window). In some embodiments, the second criteria (e.g., the stack-removal criteria) include a starting location requirement that requires the starting location of the movement of the first contact to be near the bottom edge (e.g., above or below the bottom edge) of the currently displayed user interface of the second application (e.g., the bottom edge of the slide-over window). In some embodiments, the first criteria (e.g., the overlay-switching criteria) have a movement direction criterion that requires the movement of the first contact to be substantially parallel to the layout direction of the first and second applications on the display (e.g., substantially horizontal if the first and second applications are laid out horizontally on the display). In some embodiments, the second criteria have a movement direction criterion that requires the movement of the first contact to be substantially perpendicular to the layout direction of the first and second applications on the display (e.g., substantially vertical if the first and second applications are laid out horizontally on the display). In some embodiments, the movement direction criterion of the second criteria (e.g., the stack-removal criteria) is also met when the movement of the first contact includes at least a first threshold amount of movement in a vertical direction (e.g., upward) and at least a second threshold amount of movement in a horizontal direction (e.g., rightward or leftward), with the second threshold amount of movement substantially greater than the first threshold amount movement (e.g., such that the movement is substantially horizontal with some initial vertical component). In some embodiments, first and second criteria each have a minimum distance and/or speed requirement for the movement of the first contact that must be met in order for the first and second criteria to be met, respectively. In some embodiments, the second criteria includes a movement condition that corresponds to a threshold amount of distance and/or speed for the movement of the first contact that must be met in order for the second criteria to be met.

In some embodiments, in response to detecting the second input: in accordance with a determination that the second input meets third criteria (e.g., stack-expansion criteria including a third start location criterion, a third movement direction criterion, a third movement region criterion, a third movement speed criterion, and/or a third movement distance criterion), the device concurrently displays (e.g., upon termination of the second input) respective representations of a plurality of application views (e.g., representations of application windows in the slide-over mode) that were recently displayed in the respective concurrent-display configuration with another application, including a representation of an application view corresponding to the second application and a representation of an application view corresponding to the third application (and a representation of an application view corresponding to the fourth application) (e.g., concurrently displaying one or more cards each representing a respective application window that has been displayed as a slide-over window over the user interface of another application in a row or array, optionally in a browse-able, spread-out stack (e.g., in an overlay-switcher user interface)). In some embodiments, an upward swipe gesture that starts from the bottom edge of the slide-over window and that ends with a pause prior to lift-off of the contact causes the device to spread out the stack of slide-over windows and display the browse-able arrangement of the slide-over windows over the underlying main application (e.g., of a visually obscured version thereof). In some embodiments, an upward swipe gesture that starts from the bottom edge and continues toward the side edge (e.g., the side edge that is closer to the middle of the display) of the slide-over window causes the device to display the browse-able arrangement of the slide-over windows. In some embodiments, a horizontal swipe input across the middle portion toward the middle of the display causes the device to spread out the stack to show representations of other slide-over windows that are recently shown with the first application or another application in the slide-over view. In some embodiments, multiple slide-over windows exist for a respective application and corresponding representations of the multiple windows are shown as separate cards in the spread-out view of the stack. In some embodiments, the representations of multiple windows for the same application are optionally grouped together in the spread-out view of the stack. In some embodiments, selection of a respective representation of the application windows in the browse-able arrangement causes the device to cease to display the browse-able arrangement and display the application window corresponding to the selected representation with the first application in the first concurrent-display configuration. This is illustrated in FIGS. 4A12, 4A33, and 4A34, for example. Displaying multiple representations of application views that were recently displayed in concurrent-display configurations in accordance with a determination that an input meets input criteria provides improved visual feedback to a user (e.g., displaying multiple applications view representations on a display generation component in response to inputs). Providing improved visual feedback to the user enhances the operability of the device and makes the user-device interface more efficient (e.g., allowing the user to view and interact with multiple applications on a user interface), which, additionally, reduces power usage and improves battery life of the device by enabling the user to use the device more quickly and efficiently.

In some embodiments, the representation of the application view corresponding to the second application includes an identifier of the second application and an identifier for the application window corresponding to the second application, and the representation of the application view corresponding to the third application includes an identifier of the third application and an identifier for the application window corresponding to the third application. In some embodiments, if there are multiple application views (e.g., multiple slide-over windows) corresponding to the same application (e.g., the second application or the third application), the respective representations of the multiple application views have different identifiers for the multiple application views. The different identifiers for the multiple application views for the same application helps the user to distinguish between multiple windows with the same or similar content, or when a screenshot of the windows are not available for some reason (e.g., due to lack of memory or display resolution). This is illustrated in FIG. 4A34, for example.

In some embodiments, the third criteria (e.g., the stack-expansion criteria) include a respective start location criterion that requires movement of the first contact to start from within a threshold range of a first edge (e.g., bottom edge) of the second application (e.g., the slide-over window of the second application), and include a respective movement criterion that requires the movement of the first contact to meet first movement condition in order for the third criteria to be met (e.g., the first movement condition require that a movement direction of the first contact to be in a first direction (e.g., upward or upward and sideways) toward a second edge (e.g., top edge, left side edge, or right side edge) of the second application, a movement distance of the first contact does not exceed a threshold amount of movement in the first direction, and/or a movement speed of the first contact does not exceed a threshold speed or includes a pause prior to lift-off of the contact). For example, in some embodiments, the third criteria for spreading out the stack of slide-over windows are met by an upward swipe gesture that started from the bottom edge of the currently displayed slide-over window that meets a distance or speed threshold (e.g., short distance, and low speed) before lift-off of the contact, or by an upward and sideway swipe that starts from the bottom edge of the currently displayed slide-over window and that continues to one of the side edges (e.g., right side edge) of the currently displayed slide-over window that is closer to the middle of the display. In some embodiments, the first criteria, the second criteria, and the third criteria have the same starting location criterion, and different movement criterion that corresponds to different movement direction requirements, different threshold movement distance requirements, and/or different movement speed requirements. This is illustrated in FIGS. 4A12, 4A33 and 4A34, for example. Displaying multiple representations of application views that were recently displayed in concurrent-display configurations in accordance with a determination that an input meets input criteria provides improved visual feedback to a user (e.g., displaying multiple applications view representations on a display generation component in response to inputs). Providing improved visual feedback to the user enhances the operability of the device and makes the user-device interface more efficient (e.g., allowing the user to view and interact with multiple applications on a user interface), which, additionally, reduces power usage and improves battery life of the device by enabling the user to use the device more quickly and efficiently.

In some embodiments, the respective representations of the plurality of application views does not include a representation of an application view for the first application (e.g., a full-screen window, or a split-screen window) among the respective representations of the plurality of application views that were recently displayed in the respective concurrent-display configuration with another application. For example, if the first application is only displayed as a primary application (e.g., full-screen background window) and not as an auxiliary application (e.g., slide-over window) in the respective concurrent-display configuration, then the first application is not represented in the stack of slide-over applications/windows. In some embodiments, while concurrently displaying the second application and the first application in the respective concurrent display configuration, the device detects an input that corresponds to a request to display an application-switcher user interface (e.g., an upward swipe from the bottom of the touch-screen that meets application-switcher-display criteria). In response to the input that corresponds to the request to display the application-switcher user interface, the device displays the application-switcher user interface which includes representations of all recently open applications that are saved to memory, including the first application (e.g., a full-screen window, or a split-screen window) and all applications in the stack of slide-over applications (e.g., the second application and the third application). This is illustrated in FIGS. 4A12, 4A18, and 4A34, for example. Not displaying a representation of the application view that is for the first application of the recently displayed application views in concurrent-display configurations provides improved visual feedback to a user (e.g., only showing a selected group of applications overlaying a user interface). Providing improved visual feedback to the user enhances the operability of the device and makes the user-device interface more efficient (e.g., allowing the user to view and interact with multiple applications on a user interface), which, additionally, reduces power usage and improves battery life of the device by enabling the user to use the device more quickly and efficiently.

In some embodiments, while displaying the respective representations of the plurality of application views (e.g., application windows) that were recently displayed in the respective concurrent-display configuration with another application, including the representation of the application view corresponding to the second application and the representation of the application view corresponding to the third application (e.g., while displaying the overlay-switcher user interface), the device detects a fourth input that meets fourth criteria (e.g., overlay-dismissal criteria including a starting location criterion and a movement direction criterion (e.g., criteria that are met by an upward swipe that is detected on a representation of an application view). In response to detecting the fourth input: in accordance with a determination that the fourth input is directed to the representation of the second application (e.g., a representation of a slide-over window of the second application), the device ceases to display the representation for the application view corresponding to the second application (e.g., removing the representation from the overlay-switcher user interface); and in accordance with a determination that the fourth input is directed to the representation of the third application, the device ceases to display the representation for the application view corresponding to the third application (e.g., a representation of a slide-over window of the third application) (e.g., removing the representation from the overlay-switcher user interface). For example, an upward swipe on the card representing the slide-over window for the second application closes the slide-over window for the second application, and an upward swipe on the card representing the slide-over window for the third application closes the slide-over window for the third application. After the slide-over window for a respective application is removed from the browse-able arrangement, the slide-over window is no longer available in the stack of slide-over windows, and it will not be displayed in response to horizontal edge swipe gestures detected on a currently displayed slide-over window. When an input for displaying the application-switcher user interface is detected, the closed slide-over window will also not be shown among all of the representations of all recently open applications. This is illustrated in FIGS. 4A35, 4A38, and 4A39, for example. Ceasing to display a representation of an application view in accordance with a determination that an input is directed to the representation of the application provides additional control options without cluttering the UI with additional displayed controls (e.g., swiping up at an application to dismiss the application). Providing additional control options without cluttering the UI with additional displayed controls enhances the operability of the device and makes the user-device interface more efficient (e.g., allowing the user to interact with multiple applications on a user interface), which, additionally, reduces power usage and improves battery life of the device by enabling the user to use the device more quickly and efficiently.

In some embodiments, while displaying the respective representations of the plurality of application views (e.g., the overlay-switcher user interface including the representations of the slide-over application windows) that were recently displayed in the respective concurrent-display configuration with another application, including the representation of the application view corresponding to the second application and the representation of the application view corresponding to the third application, the device detects a fifth input that meets fifth criteria (e.g., overlay-browsing criteria including a starting location criterion and a movement direction criterion (e.g., criteria that are met by a leftward and/or rightward horizontal swipe that is detected on a representation of an application view). In response to detecting the fifth input, the device changes a relative display prominence of a first application view and a second application view in accordance with the fifth input. For example, when the contact is detected on the first application view and moves horizontally to the right, the first application view is moved off the screen to the right, revealing more of the second application view underneath the first application view (e.g., relative display prominence of the first application view and the second application view are changed in response to the horizontal movement of the contact detected on the first application view). In some embodiments, in response to detecting the fifth input, the device also increases display prominence of an application view that is not initially visible or is mostly hidden in the browse-able arrangement. This is illustrated in FIGS. 4A35-4A37, for example. Changing the display prominence of application views in the browse-able arrangement in accordance with an input provides improved visual feedback to the user (e.g., swiping horizontally to view one or more applications). Providing improved visual feedback enhances the operability of the device and makes the user-device interface more efficient (e.g., allowing the user to interact with multiple applications on a user interface), which, additionally, reduces power usage and improves battery life of the device by enabling the user to use the device more quickly and efficiently.

In some embodiments, while displaying the respective representations of the plurality of application views (e.g., representations of the slide-over application windows) that were recently displayed in the respective concurrent-display configuration with another application, the device detects a sixth input that meets sixth criteria (e.g., stack-collapsing criteria including a starting location criterion and a time criterion (e.g., criteria that are met by a tap input detected outside of the expanded stack or on a "close" affordance of the expanded stack, or on a card in the expanded stack). In response to detecting the sixth input: the device ceases to display the respective representations of the plurality of application views (e.g., ceasing to display the overlay-switcher user interface); and the device displays a respective application view selected from the plurality of application views in the respective concurrent-display configuration with the first application, wherein the respective application view is selected based on a location of the sixth input. For example, in accordance with a determination that the sixth input is a tap input on a representation of a first application view, the device ceases to display the browse-able arrangement (e.g., the overlay-switcher user interface), and displays the first application view with the first application in the respective concurrent-display configuration; and in accordance with a determination that the sixth input is a tap input outside of the browse-able arrangement (e.g., the overlay-switcher user interface), the device ceases to display the browse-able arrangement (e.g., the overlay-switcher user interface) and displays the application view that is at the top of the stack of application views with the first application in the respective concurrent-display configuration. This is illustrated in FIGS. 4A35 and 4A42 (contact 4064 dismisses the overlay-switcher user interface and restores display of the overlay 4020), for example. Displaying an application view and ceasing to display other application view representations in response to detecting an input and the location of the input reduces the number of inputs needed to perform an operation (e.g., the operation to close multiple application views and to open one specific application view in response to the input). Reducing the number of inputs needed to perform an operation enhances the operability of the device and makes the user-device interface more efficient (e.g., allowing the user to interact with multiple applications with a single input on a user interface), which, additionally, reduces power usage and improves battery life of the device by enabling the user to use the device more quickly and efficiently.

In some embodiments, in response to detecting the second input: in accordance with a determination that the second input meets the third criteria (e.g., stack-expansion criteria), the device visually obscuring (e.g., blurring and/or darkening) a displayed portion of the first user interface of the first application relative to the respective representations of the plurality of application views that were recently displayed in the respective concurrent-display configuration with another application (e.g., visually obscuring the portion of the full-screen background window that is outside of the areas occupied by the representations of the slide-over windows). This is illustrated in FIGS. 4A32-4A34, for example. Deemphasizing a displayed portion of the user interface relative to the browse-able arrangement in accordance with a determination that the second input meets the criteria provides improved visual feedback to the user (e.g., allowing the user to determine that the input has met the criteria). Providing improved visual feedback enhances the operability of the device and makes the user-device interface more efficient (e.g., allowing the user to view and interact with multiple applications), which, additionally, reduces power usage and improves battery life of the device by enabling the user to use the device more quickly and efficiently.

In some embodiments, the first criteria (e.g., the application-switching criteria) are met by a horizontal swipe gesture detected near a bottom edge of a respective application displayed in the respective concurrent-display configuration with the first application. In some embodiments, repeated horizontal swipes near the bottom edge of the currently displayed slide-over window causes the device to cycle through the slide-over windows in the stack of slide-over windows overlaid on the user interface of the first application. In some embodiments, the stack of slide-over windows is arranged on a carousel and the top card in the stack is redisplayed when the bottom card of the stack has been shown and swiped off the display. This is illustrated in FIGS. 4A22-4A26, for example. Replacing the display of an application view when an input meets input criteria with a horizontal swipe gesture near a bottom edge of an application in the concurrent-display configuration provides improved visual feedback to the user (e.g., replacing an application view overlaying another application in response to a horizontal swiping motion near the bottom edge of the application view). Providing improved visual feedback enhances the operability of the device and makes the user-device interface more efficient (e.g., allowing the user to view and interact with multiple applications with a single input on a user interface), which, additionally, reduces power usage and improves battery life of the device by enabling the user to use the device more quickly and efficiently.

In some embodiments, while displaying the first application after the second criteria (e.g., stack-removal criteria) were met by a previous input (e.g., the second input or the third input) and a respective application (e.g., the second application or the third application) is removed from concurrent display with the first application in the respective concurrent-display configuration (e.g., when the whole stack of slide-over windows have been removed from the display in response to the previous input), the device detects a seventh input that includes detecting a third contact and detecting movement of the third contact across the touch-sensitive surface. In response to detecting the seventh input: in accordance with a determination that the seventh input meets seventh criteria (e.g., stack-recall criteria including a seventh start location criterion, a seventh movement direction criterion, a seventh movement region criterion, a seventh movement speed criterion, and/or a seventh movement distance criterion), the device restores display of the respective application to redisplay the respective application and the first application in accordance with the respective concurrent-display configuration (e.g., bring back the last-displayed slide-over application to overlay on the portion of the first user interface of the first application). For example, after a swipe input that meets the second criteria (e.g., the stack-removal criteria) removes the stack of slide-over apps from the display, a reverse horizontal swipe across the touch-screen that starts from the side edge or outside of the side edge of the touch-screen and continues onto the touch-screen brings back the stack of previously displayed slide-over applications, with the last-displayed slide-over application shown at the top of the stack. Restoring display of an application to redisplay the respective application in accordance with the respective concurrent display configuration in accordance with a determination that an input meets input criteria provides additional control options without cluttering the UI with additional displayed controls (e.g., the control option to bring back a previously dismissed application view), and enhances the operability of the device, which, additionally, reduces power usage and improves battery life of the device by enabling the user to use the device more quickly and efficiently.

In some embodiments, in response to detecting the seventh input: in accordance with a determination that the seventh input meets the seventh criteria (e.g., stack-recall criteria), the device displays an indication of one or more application views (e.g., representations of other slide-over windows) that are available to be displayed in the respective concurrent-display configuration. For example, as the respective application that is last displayed in the slide-over configuration is dragged back onto the display in response to the fourth input (e.g., in accordance with the movement of the third contact), the device also displays indications (e.g., edges of cards representing other slide-over application windows) of additional slide-over windows available in the stack underneath the slide-over window of the respective application. This is illustrated in FIGS. 4A30-4A32, for example. Displaying an indication of one or more application views that is available to be displayed in a concurrent-display configuration in accordance with a determination that an input meets input criteria provides improved visual feedback to the user (e.g., indicating additional possible application views). Providing improved visual feedback enhances the operability of the device and makes the user-device interface more efficient (e.g., give an example), which, additionally, reduces power usage and improves battery life of the device by enabling the user to use the device more quickly and efficiently.

In some embodiments, while displaying a respective application (e.g., the second application, the third application, or another application in the slide-over stack) and the first application in accordance with the respective concurrent-display configuration (e.g., after the first criteria (e.g., the overlay-switching criteria) were met by the second input or the third input), the device detects an eighth input that includes detecting a fourth contact, detecting movement of the fourth contact across the touch-sensitive surface, and detecting lift-off of the fourth contact after the movement of the fourth contact. In response to detecting the eighth input: in accordance with a determination that the eighth input meets eighth criteria (e.g., content-drop criteria), wherein the eighth criteria require that the fourth contact is detected at a location on the touch-sensitive surface that corresponds to first content (e.g., a user interface object representing an email message, an instant message, a contact name, a document link, etc.) represented in the first user interface of the first application, and that the movement of the fourth contact across the touch-sensitive surface corresponds to a movement from a location of the first content to a location over the respective application (e.g., within a first predefine region (e.g., the first predefined region 4308) near the side-edge of the display), the device replaces display of the respective application with display of the first content in an application corresponding to the first content, to display the application corresponding to the first content with the first application in accordance with the respective concurrent-display configuration. For example, when the first user interface of the first application includes a user interface object representing a document or other content, dragging the user interface object from the first user interface and dropping it onto the stack of slide-over windows causes the device to open a new application window to display the document or content. The new application window is a window of an application that opens the type of content or document for the first content/document. This is illustrated in FIGS. 4A46-4A49, for example. Replacing display of an application with the display of an application corresponding to content in response to detecting an input provides additional control options without cluttering the UI with additional displayed controls (e.g., an input at the location corresponding to the content causes the content to be displayed in an application view), and enhances the operability of the device, which, additionally, reduces power usage and improves battery life of the device by enabling the user to use the device more quickly and efficiently.

In some embodiments, while displaying a respective application (e.g., the second application, the third application, or another application in the slide-over stack) and the first application in accordance with the respective concurrent-display configuration (e.g., after the first criteria (e.g., the overlay-switching criteria) were met by the second input or the third input), the device detects a ninth input that includes detecting a fifth contact, detecting movement of the fifth contact across the touch-sensitive surface, and detecting lift-off of the fifth contact after the movement of the fifth contact. In response to detecting the ninth input: in accordance with a determination that the ninth input meets ninth criteria (e.g., application-drop criteria), wherein the ninth criteria require that the fifth contact is detected at a location on the touch-sensitive surface that corresponds to a first application icon in a dock displayed concurrently with the first application, and that the movement of the fifth contact across the touch-sensitive surface corresponds to a movement from a location of the first application icon to a location over the respective application (e.g., within the first predefined region 4308 or the expanded first predefined region 4308'), the device replaces display of the respective application with display of an application corresponding to the first application icon, to display the application corresponding to the first application icon with the first application in accordance with the respective concurrent-display configuration. For example, when the user drags an application icon from a dock and drop it onto the stack of slide-over windows, the device opens a new application window for the application corresponding to the dragged application icon. The application icon is optionally the application icon for the first application or the respective application that is overlaying the first application, or an entirely different application. In some embodiments, if the application that corresponds to the dragged application icon is associated with more than one window, the device displays a window-selector user interface including representations of all open windows of the application in a slide-over mode overlaying the window of the first application. This is illustrated in 4A8-4A11, for example. Replacing the display of an application with the display of another application corresponding to an application icon in accordance with a determination that an input meets input criteria provides additional control options without cluttering the UI with additional displayed controls (e.g., allowing the user to view and interact with multiple applications by dragging and dropping an application icon at predefined locations on the user interface), and enhances the operability of the device, which, additionally, reduces power usage and improves battery life of the device by enabling the user to use the device more quickly and efficiently.

In some embodiments, in response to detecting the second input: in accordance with a determination that the second input meets tenth criteria (e.g., window-movement criteria including a tenth start location criterion, a tenth movement direction criterion, a tenth movement region criterion, a tenth movement speed criterion, and/or a tenth movement distance criterion): the device moves the second application relative to the first application in accordance with the movement of the first contact; and the device maintains display of the second application with the first application in the respective concurrent-display configuration. In some embodiments, the tenth criteria require that the starting location of the movement of the first contact corresponds to a drag handle region of the slide-over window (e.g., a horizontal band near the top of the slide-over window corresponding to the second application), and that the movement of the first contact is substantially parallel (e.g., horizontal) to the other side of the display in the direction of the layout of the two applications. In some embodiments, the tenth criteria require the drop off location or projected drop off location of the slide-over window to be within a predefined top region on the other side of the display in order to move the second application to the other side of the display. In some embodiments, dragging the top drag handle downward switches the second application from the slide-over configuration to the side-by-side configuration. In some embodiments, the second input is continuously evaluated against various location-based criteria to predict a possible display configuration depending on the current location of the contact on the display, and visual feedback is displayed to indicate the predicted display configuration if the input is end at the current location. In some embodiments, the second application and the first application are displayed in the slide-over configuration, with the second application occupying different sides of the display, as long as the starting location and the end location of the second input are on two sides of a predefined horizontal band near the top of the display. This is illustrated in FIGS. 4A12-4A14, for example. Moving an application relative to another application on a user interface in accordance with a movement of a contact and maintaining the display of the application in accordance with a determination that an input corresponding to the contact meets input criteria provides additional control options without cluttering the UI with additional displayed controls (e.g., allowing the user to move an application view window by holding and moving the application window), and enhances the operability of the device, which, additionally, reduces power usage and improves battery life of the device by enabling the user to use the device more quickly and efficiently.

In some embodiments, the respective concurrent-display configuration is a first concurrent-display configuration in which the second application is displayed overlaying a portion of the first application. The method includes: in response to detecting the second input: in accordance with a determination that the second input meets eleventh criteria (e.g., split-view criteria including an eleventh start location criterion, an eleventh movement direction criterion, an eleventh movement region criterion, an eleventh movement speed criterion, and/or a fourth movement distance criterion), switching from displaying the second application and the first application in the first concurrent-display configuration (e.g., the slide-over display configuration) to displaying the second application and the first application in a second concurrent-display configuration (e.g., the split-screen display configuration), wherein the first application and the second application are displayed side-by-side in the second concurrent-display configuration (e.g., the first application and the second application are resized on the display, such that they are concurrently displayed without overlap between the first and second applications in the second concurrent-display configuration). In some embodiments, it is not just that the windows are not overlapping, but that the underlying widow is resized. In some embodiments, the eleventh criteria (e.g., the split-view criteria) require that the starting location of the movement of the first contact corresponds to a drag handle region of the slide-over window (e.g., a horizontal band near the top of the slide-over window corresponding to the second application) or corresponds to a bottom area of the slide-over window, and that the movement of the first contact is substantially perpendicular (e.g., vertically, or downward) to the direction of the layout of the two applications. In some embodiments, the eleventh criteria require the drop off location or projected drop off location of the slide-over window to be below a predefined top region on either side region of the display in order to switch from the slide-over view to side-by-side view. In some embodiments, when switching from the slide-over mode to the side-by-side mode, the underlying window in the slide-over display configuration is reduced in size (e.g., with a reduced window width) such that it occupies only a portion of the display, as opposed to the whole display. In some embodiments, the second input is continuously evaluated against various location-based criteria to predict a possible display configuration depending on the current location of the contact on the display, and visual feedback is displayed to indicate the predicted display configuration if the input is end at the current location. In some embodiments, the second application and the first application are displayed in the split-screen configuration, as long as the starting location is on the drag handle of the slide-over window and the end location of the second input is within the predefined side region of the display (e.g., Zone H at the top, and Zones A and E on two sides of the display). Switching the display of the applications from a first concurrent-display configuration to a second concurrent-display configuration in accordance with a determination that an input meets input criteria, provides additional control options without cluttering the UI with additional displayed controls (e.g., allowing the user to switch among different display configurations by dragging an application view window to a different region on the screen), and enhances the operability of the device, which, additionally, reduces power usage and improves battery life of the device by enabling the user to use the device more quickly and efficiently.

In some embodiments, while displaying the first application after receiving the second input, the device detects a twelfth input that corresponds to a request to display an application-switcher user interface that includes representations of a plurality of recently open applications (e.g., the twelfth input is an upward swipe gesture that starts from the bottom edge of the touch-screen and that includes movement that meets first movement criterion (e.g., distance, direction, and speed criteria). In response to detecting the twelfth input, the device replaces display of the first application with display of the application-switcher user interface (and ceasing display of any slide-over window that was presented over the first application when the twelfth input was received, so that the application-switcher user interface is displayed in the single-window display mode, occupying substantially all areas of the display, without concurrent display of another application on the screen), wherein the application-switcher user interface includes representations of a plurality of application views corresponding to the plurality of recently open applications, including one or more first application views that are full-screen windows and one or more slide-over windows to be displayed with another application view, including any of the first application views. This is illustrated in FIGS. 4A18, 4A43-4A49, for example. Replacing a display of an application with a display of an application switcher user interface in response to detecting an input that corresponds to a request to display the application switcher user interface that includes representations of multiple recently opened applications provides improved visual feedback to the user (e.g., allowing the user to view and select to display multiple applications). Providing improved visual feedback enhances the operability of the device and makes the user-device interface more efficient, which, additionally, reduces power usage and improves battery life of the device by enabling the user to use the device more quickly and efficiently.

In some embodiments, aspects/operations of methods 5000, 6000, 7000, 7100, 8000, and 9000 may be interchanged, substituted, and/or added between these methods. For brevity, these details are not repeated here.

FIGS. 6A-6E is a flowchart representation of a method 6000 of interacting with an application icon while displaying an application, in accordance with some embodiments. FIGS. 4A1-4A50, 4B1-4B51, 4C1-4C48, 4D1-4D19, and 4E1-4E28 are used to illustrate the methods and/or processes of FIGS. 6A-6E. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 6000 is performed by an electronic device (e.g., portable multifunction device 100, FIG. 1A and/or one or more components of the electronic device (e.g., I/O subsystem 106, operating system 126, etc.). In some embodiments, the method 6000 is governed by instructions that are stored in a non-transitory computer-readable storage medium and that are executed by one or more processors of a device, such as the one or more processors 122 of device 100 (FIG. 1A). For ease of explanation, the following describes method 6000 as performed by the device 100. In some embodiments, with reference to FIG. 1A, the operations of method 6000 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 6000 are, optionally, combined and/or the order of some operations is, optionally, changed.

As described below, the method 6000 provides an intuitive ways to interact with multiple application windows. The method reduces the number of inputs required from a user to interact with multiple application windows and, thereby, ensures that battery life of an electronic device implementing the method 6000 is extended, since less power is required to process the fewer number of inputs (and this savings will be realized over and over again as users become increasingly familiar with the more intuitive and simple gesture). As is also explained in detail below, the operations of method 6000 help to ensure that users are able to engage in sustained interactions (e.g., they do not need to frequency undo behaviors, which interrupts their interactions with their devices) and the operations of method 6000 help to produce more efficient human-machine interfaces.

In some embodiments, method 6000 is performed at an electronic device including a display generation component (e.g., a display, a projector, a heads-up display, etc.) and one or more input devices (e.g., a camera, a remote controller, a pointing device, a touch-sensitive surface that is coupled to a separate display, or a touch-screen display that serves both as the display and the touch-sensitive surface). The device displays (6002), by the display generation component, a dock (e.g., a container object for displaying a small set of application icons that is called up to the display from any of a variety of user interfaces (e.g., different apps, or system user interfaces) in response to a predefined user input) containing a plurality of application icons (e.g., a subset of all applications available on the home screen, a set of most recently used applications or frequently used applications) overlaid on a first user interface of a first application (e.g., displayed in a standalone full-screen display configuration, occupying substantially all areas of the display, without concurrent display of another application on the screen) (e.g., the first user interface of the first application is not a system user interface, such as a home screen or springboard user interface from which applications can be launched by activating their respective application icons)), wherein the plurality of application icons correspond to different applications installed on the electronic device (e.g., the same application icons are also displayed, among other application icons not shown in the dock, on a home screen or springboard user interface; and activation of an application icon from the home screen or springboard user interface (e.g., by a tap input detected on the application icon)) causes the application to be launched (e.g., opened to a default starting user interface or to a most recently displayed user interface of the application corresponding to the activated application icon in the standalone-display configuration on the display). While displaying the dock overlaid on the first user interface of the first application (e.g., while the first user interface of the first application is a full-screen window or a split-screen window concurrently displayed with another split-screen window of the first application or another application), the device detects (6004) a first input including detecting selection of a respective application icon in the dock (e.g., a contact is detected on the respective application icon or a focus selector or gaze is detected on the respective application icon). In response to detecting the first input and in accordance with a determination that the first input meets selection criteria (e.g., the first input is a tap input on the respective application icon or a confirmation input detected while a focus selector is on the respective application icon) (6006): in accordance with a determination that the respective application icon corresponds to the first application, and that the first application is associated with multiple windows (e.g., currently has multiple open windows, multiple windows that have a saved state, multiple windows that correspond to different content in the application, multiple windows that are separately opened and that are configured to individually recallable to the display in response to a required user input), the device displays, via the display generation component, respective representations of the multiple windows of the first application (e.g., the representation of each of the multiple windows of the first application, when selected, causes the device to replace display of the first user interface of the first application with display of the window corresponding to the selected representation); in accordance with a determination that the respective application icon corresponds to the first application, and that the first application currently is only associated with a single window (e.g., the currently displayed window of the first application), the device maintains display of the first user interface of the first application (e.g., without displaying the representation of the single open window of the first application); and In some embodiments, visual and/or other types of feedback is provided (e.g., application icon for the first application shakes or the device provides a tactile output or audio alert) to indicate that the first user interface that is currently displayed is the only open window of the first application at this time. In accordance with a determination that the respective application icon corresponds to a second application that is distinct from the first application, the device replaces display of the first user interface of the first application with display of a second user interface of the second application (e.g., switching from displaying the first application to displaying the second application), irrespective of a number of windows that were associated with the second application at a time when the first input was detected (e.g., the second application is displayed in a standalone-display configuration) (e.g., display of the second application replaces display of the first application irrespective of whether the second applications had any open windows (e.g., the second application optionally has zero, one, or multiple windows that were individually opened and were individually recallable to the display) at the time that the first input was received). This is illustrated in FIGS. 4B1-4B20, for example. Displaying representations of multiple windows of an application or maintaining the display of the application, in accordance with a determination of the number of windows associated with the first application, or replacing the display of the application with the display of a different application, in accordance with a determination that an input selects the different application, reduces the number of inputs needed to perform an operation (e.g., the operation to view the multiple windows associated with an application or the window associated with a different application). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, replacing display of the first user interface of the first application with display of the second user interface of the second application includes: in accordance with a determination that the second application is associated with a single window at the time when the first input was detected, replacing display of the first user interface of the first application with display of the single window associated with the second application; and in accordance with a determination that the second application is associated with multiple windows at the time when the first input was detected, replacing display of the first user interface of the first application with display of a most-recently displayed user interface of the second application among the multiple windows. In some embodiments, if the second application is associated with multiple windows at the time that the first input was detected, the device chooses the most recently displayed window from the multiple windows associated with the second application to replace the display of the first application. In some embodiments, if the second application is associated with zero window at the time when the first input was detected, the device replaces display of the first user interface of the first application with display of a default starting user interface of the second application. Replacing the display of the user interface of an application with the display of a single window associated with a different application, or replacing the display of the user interface of an application with the display of multiple windows associated with a the different application, in accordance with a determination whether that the different application is associated a single or multiple windows, reduces the number of inputs needed to perform an operation (e.g., displaying a single or multiple windows associated with the different application). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, while displaying a respective window (e.g., the most-recently displayed window) of the multiple windows associated with the second application after detecting the first input, the device detects a second input including detecting selection of an application icon corresponding to the second application in the dock (e.g., detecting a second tap input on the application icon of the second application). In response to detecting the second input: in accordance with a determination that the second input meets the selection criteria, and that the second application is associated with multiple windows at a time when the second input was detected, the device displays (e.g., in a window-switcher user interface), via the display generation component, respective representations of the multiple windows of the second application (e.g., the representation of each of the multiple windows of the second application, when selected, causes the device to replace display of the currently displayed user interface of the second application with display of the window corresponding to the selected representation). This is illustrated in FIGS. 4B31-4B35, for example. Displaying representations of multiple windows of an application in accordance with a determination that an input meets the input criteria and that the application is associated with multiple windows at the time the input was detected, provides improved visual feedback to the user (e.g., allowing the user to view and interact with multiple windows associated with an application). Providing improved visual feedback enhances the operability of the device and makes the user-device interface more efficient, which, additionally, reduces power usage and improves battery life of the device by enabling the user to use the device more quickly and efficiently.

In some embodiments, replacing display of the first user interface of the first application with display of the second user interface of the second application includes: in accordance with a determination that the second application is not associated any window at the time when the first input was detected, replacing display of the first user interface of the first application with display of a default window associated with the second application (e.g., a start user interface of the second application, a last-displayed user interface of the second application before all windows of the second application were closed). Replacing the display of the user interface of an application with the display of a default window associated with a second application in accordance with a determination that the second application is not associated with any window at the time when an input is detected provides improved visual feedback to the user (e.g., allowing the user to determine that the second application is not associated with any window, and allowing the user to view and interact with a default window). Providing improved visual feedback enhances the operability of the device and makes the user-device interface more efficient, which, additionally, reduces power usage and improves battery life of the device by enabling the user to use the device more quickly and efficiently.

In some embodiments, displaying the respective representations of the multiple windows of the first application includes: displaying respective representations of one or more first windows of the first application that are full-screen windows (e.g., occupying substantially all of the display area, without concurrent display with another application or application window); and displaying respective representations of one or more second windows of the first application that are slide-over windows or split-screen windows to be displayed in a respective concurrent-display configuration with another application (e.g., the second window is displayed as a slide-over window over the window of another application, or the second window is a side-by-side window adjacent to the window of another application). This is illustrated in FIG. 4B29, for example. Displaying the representations of one or more first windows of an application that are selectable to redisplay the corresponding first window of the application in a standalone-display configuration, and displaying the representations of one or more second windows of the application that are selectable to redisplay the corresponding second window of the application in a concurrent-display configuration with another application provides improved visual feedback to the user (e.g., allowing the user to view and interact with multiple application windows). Providing improved visual feedback enhances the operability of the device and makes the user-device interface more efficient, which, additionally, reduces power usage and improves battery life of the device by enabling the user to use the device more quickly and efficiently.

In some embodiments, the one or more second windows include a respective slide-over window of the first application that is displayed over a portion of a currently displayed application (e.g., any application that is displayed in the standalone-display configuration, or that is the main application underlying another slide-over window) in accordance with a first concurrent-display configuration (e.g., the slide-over view). Displaying the representations of one or more first windows of an application that are selectable to redisplay the corresponding first window of the application in a standalone-display configuration, and displaying the representations of one or more second windows of the application that are selectable to redisplay the corresponding second window of the application in a concurrent-display configuration with another application provides improved visual feedback to the user (e.g., allowing the user to view and interact with multiple application windows including slide-over window of an application that is redisplayable over a portion of a currently displayed application). Providing improved visual feedback enhances the operability of the device and makes the user-device interface more efficient, which, additionally, reduces power usage and improves battery life of the device by enabling the user to use the device more quickly and efficiently.

In some embodiments, while displaying the respective representations of the multiple windows of the first application, including a respective representation of the respective slide-over window of the first application, the device detects an input activating the respective representation of the respective slide-over window of the first application. In response to detecting the input activating the respective representation of the respective slide-over window of the first application, the device displays the respective slide-over window of the first application overlaying a portion of a user interface of an application that was last displayed with the respective slide-over window of the first application in the first concurrent-display configuration (e.g., replacing display of the first user interface of the first application and the display of the respective representations of the multiple windows of the first application). Displaying the respective slide-over window of a first application overlaying a portion of a user interface of an application that was last displayed with the respective slide-over window of the first application in the first concurrent-display configuration in response to detecting an input activating an representation of a slide-over window of the first application provides additional control options without cluttering the UI with additional displayed controls (e.g., allowing the use to display an overlaying window on top of a previously displayed window), and enhances the operability of the device, which, additionally, reduces power usage and improves battery life of the device by enabling the user to use the device more quickly and efficiently.

In some embodiments, the one or more second windows include a respective split-screen window of the first application that is displayed adjacent to another window (e.g., a window of first application or a different application) that is paired with the respective split-screen window of the first application in a second concurrent-display configuration (e.g., a split-screen display configuration). In some embodiments, the representation of the respective window of the first application indicates both the respective window of the first application and the other window that is paired with the respective window of the first application. Displaying the representations of one or more first windows of an application that are selectable to redisplay the corresponding first window of the application in a standalone-display configuration, and displaying the representations of one or more second windows of the application that are selectable to redisplay the corresponding second window of the application in a concurrent-display configuration with another application provides improved visual feedback to the user (e.g., allowing the user to view and interact with split views with the application and another application). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first input and in accordance with the determination that the first input meets the selection criteria: in accordance with a determination that the respective application icon corresponds to the first application, and that the first application is associated with multiple windows, the device displays, via the display generation component, a first user interface object (e.g., the "plus" button or the "open" button in the window-switcher user interface) that, when activated, causes display of a user interface (e.g., a document picker user interface) for opening a document in the first application (e.g., an "open" button, displayed concurrently with the respective representations of the multiple windows of the first application, which, when activated, causes display of a user interface for selecting and opening an existing document in a new window of the first application). This is illustrated in FIGS. 4B39 (e.g., affordance 4112), FIGS. 4B47-4B49, for example. Displaying a user interface object that, when activated, causes the display of a user interface for opening a document in an application in accordance with a determination that an application icon corresponding to the application is selected by an input meeting the selection criteria, reduces the number of inputs needed to perform an operation (e.g., the operation to open a new document from a current user interface). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the first input and in accordance with the determination that the first input meets the selection criteria: in accordance with a determination that the respective application icon corresponds to the first application, and that the first application is associated with multiple windows, the device displays, via the display generation component, a second user interface object (e.g., the "plus" button or the "new" button in the window-switcher user interface) that, when activated, causes display of a user interface corresponding to a new document in the first application (e.g., a "new" button, displayed concurrently with the respective representations of the multiple windows of the first application, which, when activated, causes creation and display of a new document in a new window of the first application). This is illustrated in FIGS. 4B49 and 4B50, for example. Displaying a user interface object that, when activated, causes the display of a user interface corresponding to a new document in an application in accordance with a determination that an application icon corresponding to the application is selected by an input meeting the selection criteria, reduces the number of inputs needed to perform an operation (e.g., the operation to open a new document from a current user interface). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the first input and in accordance with the determination that the first input meets the selection criteria: in accordance with a determination that the respective application icon corresponds to the first application, and that the first application is associated with multiple windows, the device reduces a size of a window displaying the first user interface of the first application (e.g., displaying an animated transition that transforms the full-screen window showing the first user interface of the first application into the respective representation of the full-screen window of the first application among the respective representations of the multiple windows of the first application in the window-switcher user interface). This is illustrated in FIGS. 4B1-4B4, for example. Reducing a size of a window displaying a user interface of an application in accordance with a determination that an application icon corresponding to the application is selected by an input that meets selection criteria, and that the application is associated with multiple windows, provides improved visual feedback to the user (e.g., that the application associated with multiple windows is selected). Providing improved visual feedback enhances the operability of the device and makes the user-device interface more efficient (e.g., reduces the user input errors when interacting with application windows in the user interface), which, additionally, reduces power usage and improves battery life of the device by enabling the user to use the device more quickly and efficiently.

In some embodiments, in response to detecting the first input and in accordance with a determination that the first input meets menu-display criteria that is distinct from the selection criteria (e.g., the first input is a touch-hold input (e.g., with the contact being kept substantially stationary over the respective application icon for at least a threshold amount of time) on the respective application icon, or a light press input (e.g., with an intensity of the contact exceeding a first intensity threshold that is above the nominal contact detection intensity threshold when the contact is detected over the respective application icon)), the device displays one or more selectable options for performing operations within an application corresponding to the respective application icon (e.g., in accordance with a determination that the respective application icon corresponds to the first application, displaying a quick action menu for the first application), including displaying a first selectable option for displaying all windows associated with the application corresponding to the respective application icon (e.g., the first application). While displaying the one or more selectable options for performing operations within the first application, the device detects an input activating the first selectable option (e.g., detecting a tap input on the "show all windows" option in the quick action menu). In response to detecting the input activating the first selectable option, the device displays (e.g., in the window-switcher user interface), via the display generation component, respective representations of all windows (e.g., one or more) of the first application (e.g., the representation of each of the one or more windows of the first application, when selected, causes the device to replace display of the first user interface of the first application with display of the window corresponding to the selected representation). This is illustrated in FIGS. 4B43-4B46 and 4B51, for example. Displaying representations of all windows of an application in response to detecting an input activating a selectable option while displaying one or more selectable options reduces the number of inputs needed to perform an operation (e.g., allowing the user to view and interact with multiple application windows with a single input). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the device maintains display of the dock, concurrently with the respective representations of the multiple windows of the first application. Maintaining display of a docket concurrently with representations of multiple windows of an application provides improved visual feedback to the user (e.g., allowing user to view and interact with certain applications not currently displayed). Providing improved visual feedback enhances the operability of the device and makes the user-device interface more efficient, which, additionally, reduces power usage and improves battery life of the device by enabling the user to use the device more quickly and efficiently.

In some embodiments, while displaying the respective application icon corresponding to the first application on a home screen user interface including a plurality of application icons corresponding to different applications installed on the device, the device detects a third input at a location corresponding to the respective application icon corresponding to the first application. In response to detecting the third input and in accordance with a determination that the third input meets menu-display criteria that are distinct from the selection criteria (e.g., the third input is a touch-hold input (e.g., with the contact being kept substantially stationary over the respective application icon for at least a threshold amount of time) on the respective application icon, or a light press input (e.g., with an intensity of the contact exceeding a first intensity threshold that is above the nominal contact detection intensity threshold when the contact is detected over the respective application icon)), the device displays a plurality of selectable options, including at least a first selectable option for performing an operation within the first application, and a second selectable option for displaying all windows associated with the first application. While displaying the plurality of selectable options, the device detects a fourth input activating the second selectable option (e.g., detecting a tap input on the "show all windows" option in the quick action menu). In response to detecting the fourth input activating the second selectable option, the device displays (e.g., in the window-switcher user interface), via the display generation component, respective representations of all windows (e.g., one or more) of the first application (e.g., the representation of each of the one or more windows of the first application, when selected, causes the device to replace display of the first user interface of the first application with display of the window corresponding to the selected representation). This is illustrated in FIG. 4B51, for example. Displaying a quick action menu with options to display representations of all windows of an application on the home screen reduces the number of inputs needed to perform an operation (e.g., allowing the user to view and interact with multiple application windows with a single input). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the respective representations of the multiple windows of the first application include an identifier of the first application and a respective identifier for each of the multiple windows of the first application. The different identifiers for the multiple windows for the same application help the user to distinguish between multiple windows with the same or similar content, or when a screenshot of the windows are not available for some reason (e.g., due to lack of memory or display resolution). This is illustrated in FIGS. 4B19 and 4B39, for example. Displaying application identifier and window identifiers with representations of windows in the window-switching user interface help reducing user error, and enhances the operability of the device, and makes the user-device interface more efficient, which, additionally, reduces power usage and improves battery life of the device by enabling the user to use the device more quickly and efficiently.

In some embodiments, aspects/operations of methods 5000, 6000, 7000, 7100, 8000, and 9000 may be interchanged, substituted, and/or added between these methods. For brevity, these details are not repeated here.

FIGS. 7A-7H is a flowchart representation of a method 7000 of displaying content in a respective concurrent-display configuration with a currently displayed application, in accordance with some embodiments. FIGS. 4A1-4A50, 4B1-4B51, 4C1-4C48, 4D1-4D19, and 4E1-4E28 are used to illustrate the methods and/or processes of FIGS. 7A-7H. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 7000 is performed by an electronic device (e.g., portable multifunction device 100, FIG. 1A and/or one or more components of the electronic device (e.g., I/O subsystem 106, operating system 126, etc.). In some embodiments, the method 7000 is governed by instructions that are stored in a non-transitory computer-readable storage medium and that are executed by one or more processors of a device, such as the one or more processors 122 of device 100 (FIG. 1A). For ease of explanation, the following describes method 7000 as performed by the device 100. In some embodiments, with reference to FIG. 1A, the operations of method 7000 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 7000 are, optionally, combined and/or the order of some operations is, optionally, changed.

As described below, the method 7000 provides an intuitive ways to interact with multiple application windows. The method reduces the number of inputs required from a user to interact with multiple application windows and, thereby, ensures that battery life of an electronic device implementing the method 7000 is extended, since less power is required to process the fewer number of inputs (and this savings will be realized over and over again as users become increasingly familiar with the more intuitive and simple gesture). As is also explained in detail below, the operations of method 7000 help to ensure that users are able to engage in sustained interactions (e.g., they do not need to frequency undo behaviors, which interrupts their interactions with their devices) and the operations of method 7000 help to produce more efficient human-machine interfaces.

A method 7000 is performed at an electronic device including a display generation component (e.g., a display, a projector, a heads-up display, etc.) and one or more input devices (e.g., a keyboard, a remote controller, a camera, a touch-sensitive surface that is coupled to a separate display, or a touch-screen display that serves both as the display and the touch-sensitive surface). The device displays (7002), by the display generation component, a first user interface (e.g., a user interface of an application open in a standalone-display configuration) containing a selectable representation of first content (e.g., a user interface object (e.g., an icon, a link, etc.) representing a local or online document content), wherein the first content is associated with a first application (and wherein activation of the selectable representation of the first content (e.g., activation by a tap input, or a light press input) causes the first content to be displayed in a new window of the first application that replaces display of the first user interface containing the selectable representation of the first content on the display, the window of the first application being displayed in a standalone-display configuration without other concurrently displayed windows). In some embodiments, the first user interface is a user interface of the first application. In some embodiments, the first user interface is a user interface of an application that is distinct from the first application. While displaying the first user interface containing the selectable representation of the first content, the device detects (7004) a first input, including detecting an input that corresponds to a request to move the selectable representation of the first content across the display to a respective location (e.g., including detecting touch-down of a contact at a location on a touch-sensitive surface that corresponds to the location of the selectable representation of the first content to pick up the selectable representation, and movement of the contact across the touch-sensitive surface that corresponds to movement across the display that drags the selectable representation of the first content to a respective location on the display). In response to detecting the first input (7006) (including detecting termination of the first input after detecting the input that corresponds to a request to move the selectable representation of the first content across the display to the respective location): in accordance with a determination that the respective location is a first location (e.g., within a first threshold distance (e.g., ⅒ width of the first user interface or display) from a side edge of the first user interface or display), the device resizes the first user interface and displaying a second user interface that includes the first content adjacent to the first user interface (e.g., displaying the first user interface and the new user interface containing the first content in a side-by-side display configuration); and in accordance with a determination that the respective location is a second location (e.g., within a second threshold distance (e.g., between ⅕ to ⅒ of the width of the first user interface or display) from a side edge of the first user interface or display) different from the first location, the device displays a third user interface that includes the first content overlaid on the first user interface (e.g., displaying the first user interface and the new user interface containing the first content in a slide-over display configuration, with the new user interface as the slide-over window overlaying a portion of the first user interface). This is illustrated in FIGS. 4C1-4C11, for example. Displaying a user interface that includes a content selected by an input and resizing a currently displayed user interface, in accordance with a determination that the content has been moved to different locations on the currently displayed user interface, reduces the number of inputs needed to perform an operation (e.g., the user can display the content in different user interfaces depending on where how the content is moved on the currently displayed user interface), and enhances the operability of the device, which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): in accordance with a determination that a current location of the selectable representation is the first location (e.g., a location within the first threshold distance from a side edge of the first user interface or display), the device reduces a size of the first user interface. In some embodiments, the size of the first user interface is reduced as a visual feedback to indicate that the first content will be opened in a new window displayed adjacent to the resized first user interface if the termination of the first input is detected at this time. In some embodiments, if the user moves the selectable representation away from the first location, and the visual feedback changes or ceases to indicate that the new window will not be displayed adjacent to the first user interface if termination of the first input is detected at this time. This is illustrated in FIG. 4C10, for example. Reducing the size of a first user interface in accordance with a determination that a current location of a selectable representation is at a first location, wherein the selectable representation is being selected by an input provides improved visual feedback to the user (e.g., allowing the user to determine that the current location of the selectable representation is the first location). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): in accordance with a determination that a current location of the selectable representation is the second location (e.g., a location within the second threshold distance from a side edge of the first user interface or display), the device reduces a size of the first user interface by a first amount. In some embodiments, the size of the first user interface is reduced by a first amount as a visual feedback to indicate that the first content will be opened in a new window overlaying the first user interface if the termination of the first input is detected at this time. In some embodiments, if the user moves the selectable representation away from the second location, and the visual feedback changes or ceases to indicate that the new window will not be displayed as a slide-over window overlaying the first user interface if termination of the first input is detected at this time. This is illustrated in FIG. 4C6, for example. Reducing the size of a first user interface by a first amount in accordance with a determination that a current location of a selectable representation is at a second location, wherein the selectable representation is being selected by an input provides improved visual feedback to the user (e.g., allowing the user to determine that the current location of the selectable representation is the second location). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): in accordance with a determination that a current location of the selectable representation is the first location (e.g., a location within the second threshold distance from a side edge of the first user interface or display), the device reduces the size of the first user interface by a second amount that is greater than the first amount, and wherein the size of the first user interface is reduced by different amounts on two opposing sides of the first user interface. In some embodiments, one side edge of the first user interface is moved to create a gap between the first user interface and the selectable representation of the first content to indicate that the first content will be opened in a new window displayed adjacent to the first user interface if the termination of the first input is detected at this time. This is illustrated in FIG. 4C10, for example. Reducing the size of a first user interface by different amounts on two opposing sides in accordance with a determination that a current location of a selectable representation is at a first location, wherein the selectable representation is being selected by an input provides improved visual feedback to the user (e.g., allowing the user to determine that the current location of the selectable representation is the first location). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): the device changes an appearance of the selectable representation of the first content in accordance with a current location of the selectable representation, including: in accordance with a determination that the current location of the selectable representation is the first location (e.g., a location within the first threshold distance from a side edge of the first user interface or display), displaying the selectable representation of the first content with a first appearance (e.g., with an extra elongated shape) (e.g., to indicate that the first content will be opened in a new window displayed adjacent to the resized first user interface if the termination of the first input is detected at this time); and in accordance with a determination that the current location of the selectable representation is the second location (e.g., a location within the second threshold distance from a side edge of the first user interface or display), displaying the selectable representation of the first content with a second appearance (e.g., with a slightly elongated and laterally expanded shape) distinct from the first appearance (e.g., to indicate that the first content will be opened in a new window displayed overlaid on a portion of the first user interface if the termination of the first input is detected at this time). This is illustrated in FIGS. 4C1-4C11, for example. Changing an appearance of a selectable representation of a content in accordance with a current location of the selectable representation provides improved visual feedback to the user (e.g., allowing the user to determine the current location of the selectable representation is at a first location or a second location). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): in accordance with a determination that a current location of the selectable representation is at the first or second location, the device reveals a portion of a background behind the first user interface (e.g., by shrinking the first user interface or sliding an edge of the first user interface) to indicate that a new user interface that includes the first content will be displayed concurrently with the first user interface if termination of the first input is to be detected. This is illustrated in FIGS. 4C4 and 4C10, for example. Revealing a portion of a background behind a first user interface to indicate that a new user interface that includes a first content will be displayed concurrently with the first user interface if termination of an input is to be detected provides improved visual feedback to the user (e.g., allowing the user to determine how the user interface would change if the input is to be terminated). Providing improved visual feedback enhances the operability of the device and makes the user-device interface more efficient (e.g., give an example), which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): in accordance with a determination that a current location of the selectable representation is at the first or second location: the device displays, concurrently with the selectable representation of the first content, a first application identifier of an application for opening the first content; and the device visually obscures (e.g., blurring, darkening, fading, or otherwise rendering less clearly visible) the selectable representation of the first content without visually obscuring the first application identifier. This is illustrated in FIGS. 4C4 and 4C10, for example. Displaying a selectable representation of a content concurrently with a first application identifier of an application for opening a content and visually obscuring the selectable representation of the content without visually obscuring the first application identifier in accordance with a determination that a concurrent location of the selectable representation is at a location provides improved visual feedback to the user (e.g., allowing the user to determine the location the selectable representation). Providing improved visual feedback enhances the operability of the device and makes the user-device interface more efficient (e.g., give an example), which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): in accordance with a determination that a current location of the selectable representation is at the second location (e.g., the current location of the selectable representation is within a second threshold distance from a side edge of the first user interface or display), the device resizes the selectable representation of the first content such that the selectable representation of the first content at least partially overlaps with the first user interface (e.g., the first user interface shrinks slightly, and the elongated and laterally expanded selectable representation of the first content overlays a portion of the first user interface and overlays a portion of the background that is revealed by the shrunken first user interface). This visual feedback is used to indicate that the first content will be shown in a slide-over window overlaying the first user interface if the termination of the first input is detected at this time. This is illustrated in FIGS. 4C4, for example. Resizing the selectable representation of the first content such that the selectable representation of the first content at least partially overlaps with the first user interface in accordance with a determination that a current location of the selectable representation is at the second location provides improved visual feedback to the user (e.g., allowing the user to determine how the selectable representation user interface will behave after an input is terminated). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): in accordance with a determination that a current location of the selectable representation is at the first location (e.g., the current location of the selectable representation is within the first threshold distance from a side edge of the first user interface or display), the device resizes the selectable representation of the first content such that there is a gap between the selectable representation of the first content and the resized first user interface (e.g., a side edge of first user interface is moved to create space for the second user interface including the first content). This visual feedback is used to indicate that the first content will be shown in a side-by-side window displayed adjacent to the first user interface if the termination of the first input is detected at this time. This is illustrated in FIG. 4C10, for example. Resizing the selectable representation of the first content such that there is a gap between the selectable representation of the first content and the resized first user interface in accordance with a determination that a current location of the selectable representation is at the first location provides improved visual feedback to the user (e.g., allowing the user to determine how the selectable representation user interface will behave after an input is terminated). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): in accordance with a determination that a current location of the selectable representation is at the second location (and not the first location), visually obscuring (e.g., blurring, darkening, making translucent) the selectable representation of the first content without visually obscuring the first user interface (e.g., when the background window does not have to be resized to be concurrently displayed as the background window underlying the window of the first content in the slide-over mode). In some embodiments, the device displays a respective application identifier for the first application on the visually obscured first user interface, and displays a respective application identifier for the application that is used to open the first content on the visually obscured selectable representation of the first content, in accordance with a determination that a current location of the selectable representation is at the first location and not at the second location (e.g., when the background window has to be resized to be concurrently displayed with the first content in the split-screen mode). This is illustrated in FIG. 4C4, for example. Visually obscuring at least a portion of the selectable representation of the first content without blurring the first user interface in accordance with a determination that a current location of the selectable representation is at the first location or the second location provides improved visual feedback to the user (e.g., allowing the user to determine the location of the selectable representation). Providing improved visual feedback enhances the operability of the device and makes the user-device interface more efficient, which, additionally, reduces power usage and improves battery life of the device by enabling the user to use the device more quickly and efficiently.

In some embodiments, in response to detecting the first input and prior to detecting termination of the first input (e.g., prior to detecting lift-off of the contact, or prior to detecting an input corresponding to a request to drop off the selectable representation of the first content): in accordance with a determination that a current location of the selectable representation is at the first location or the second location (e.g., in response to a first portion of the first input), the device displays first visual feedback to indicate that the first content will be displayed in a window concurrently with the first user interface if termination of the first input is detected at the current time; and in accordance with a determination that the current location of the selectable representation is not at the first location or the second location (e.g., in response to a second portion of the first input that is detected after the first portion of the first input), the device ceases to display the first visual feedback, to indicate that the first content will not be displayed in a window concurrently with the first user interface if termination of the first input is detected at the current time. In some embodiments, in response to detecting the first input (including detecting termination of the first input after detecting the input that corresponds to a request to move the selectable representation of the first content across the display to the respective location), in accordance with a determination that the respective location is a third location that is different from the first and second locations, the device forgoes displaying the second user interface and the third user interface that includes the first content. This is illustrated in FIGS. 4C6-4C7, and 4C14-4C15, for example. Displaying a first visual feedback to indicate that a first content will be displayed in a window concurrently with the first user interface if termination of the first input is detected at the current time or ceasing to display the first visual feedback in accordance with a determination of the current location of the selectable representation reduces the number of inputs needed to perform an operation (e.g., the same input causes different actions on the user interface depending on the location of its termination). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, while displaying the first user interface containing the selectable representation of the first content (e.g., displaying the first user interface in a standalone-display configuration, displaying the first user interface with another user interface (e.g., the second user interface) displayed adjacent to the first user interface), or displaying the first user interface with another user interface (e.g., the third user interface) overlaying a portion of the first user interface), the device detects a second input (e.g., after detecting the first input, or before detecting the first input), including detecting an input that meets activation criteria (e.g., the input is a tap input or press input on the selectable representation, without movement of the contact). In response to detecting the second input (including detecting termination of the second input (e.g., detecting lift-off of the contact)), the device replaces display of the first user interface with display of a fourth user interface (e.g., a newly opened user interface of an application that corresponds to the content type of the first content) that includes the first content. In some embodiments, the new user interface replaces the first user interface and is displayed in the same display configuration as the first user interface (e.g., as the single application shown on the display, or splitting the display with another user interface, or underlying another slide-over window). This is illustrated in FIGS. 4C16-4C17, for example. Replacing the display of a first user interface with the display of a different user interface that includes a first content in response to detecting an input that meets activation criteria provides improved visual feedback to the user (e.g., allowing the user to determine that the input has met activation criteria by visual indication). Providing improved visual feedback enhances the operability of the device and makes the user-device interface more efficient (e.g., give an example), which, additionally, reduces power usage and improves battery life of the device by enabling the user to use the device more quickly and efficiently.

In some embodiments, detecting the first input includes: detecting a tap-hold input (e.g., detecting touch-down of the contact and detecting less than a threshold amount of movement of the contact for at least a threshold amount of time) that enables a drag operation to be performed on the selectable representation in the first user interface; and detecting a drag input, following the tap-hold input, that moves the selectable representation or a copy thereof from an original location of the selectable representation in the first user interface to a predefined side portion of the display. This is illustrated in FIGS. 4C1-4C2, for example. Selecting a selectable representation of an application using a tap-hold input and moving the selectable representation of the application using a drag input provides additional control options without cluttering the UI with additional displayed controls, and enhances the operability of the device, which, additionally, reduces power usage and improves battery life of the device by enabling the user to use the device more quickly and efficiently.

In some embodiments, in response to detecting the first input (including detecting termination of the first input after detecting the input that corresponds to a request to move the selectable representation of the first content across the display to the respective location): in accordance with a determination that the respective location is a third location (e.g., a location within a predefined region of the first user interface or display that does not present an acceptable drop location for the first content, or a location in the first user interface or display that presents an acceptable drop location for the first content) distinct from the first and second locations, the device maintains display of the first user interface without displaying the first content (e.g., the object representing the first content remains at its original location, is moved to the third location, or is copied to the third location in the first user interface). Maintaining a display of the first user interface without displaying a first content in accordance with a determination that the respective location corresponding to an input is at a particular location provides improved visual feedback to the user (e.g., allowing the user to determine that the current location of the input is a location distinct from the previous locations). Providing improved visual feedback enhances the operability of the device and makes the user-device interface more efficient, which, additionally, reduces power usage and improves battery life of the device by enabling the user to use the device more quickly and efficiently.

In some embodiments, the first user interface is a user interface of an email application, and the first content is an email message. For example, in some embodiments, the email message is opened in a new window of the email application, when the email message is dragged from a listing of email messages in the first user interface and dropped near the side edge of the display. Displaying a user interface that includes a content selected by an input and resizing a currently displayed user interface, in accordance with a determination that the content has been moved to different locations on the currently displayed user interface, reduces the number of inputs needed to perform an operation (e.g., allowing the user to select and view an email), and enhances the operability of the device, which, additionally, reduces power usage and improves battery life of the device by enabling the user to use the device more quickly and efficiently.

In some embodiments, the first user interface is a user interface of an email application, and the first content is an attachment of an email message. For example, the attachment is opened in a new window of another application that is distinct from the email application, when the attachment is dragged from an email message shown in the first user interface and dropped near the side edge of the display. Displaying a user interface that includes a content selected by an input and resizing a currently displayed user interface, in accordance with a determination that the content has been moved to different locations on the currently displayed user interface, reduces the number of inputs needed to perform an operation (e.g., allowing the user to select and view an email), and enhances the operability of the device, which, additionally, reduces power usage and improves battery life of the device by enabling the user to use the device more quickly and efficiently.

In some embodiments, the first user interface includes concurrent display of a file listing of a file management application and a user interface of a second application, and wherein the first content is a document listed in the file listing of the file management application. Displaying a user interface that includes a content selected by an input and resizing a currently displayed user interface, in accordance with a determination that the content has been moved to different locations on the currently displayed user interface, reduces the number of inputs needed to perform an operation (e.g., allowing the user to select and view a document), and enhances the operability of the device, which, additionally, reduces power usage and improves battery life of the device by enabling the user to use the device more quickly and efficiently.

In some embodiments, while displaying the first user interface containing the selectable representation of the first content (e.g., displaying the first user interface in a standalone-display configuration, displaying the first user interface with another user interface (e.g., the second user interface) displayed adjacent to the first user interface), or displaying the first user interface with another user interface (e.g., the third user interface) overlaying a portion of the first user interface), the device detects a third input (e.g., after detecting the first input, or before detecting the first input), including detecting an input that meets second criteria (e.g., the input is a tap-hold input (e.g., meeting a time threshold) or a light press input (e.g., meeting an predefined intensity threshold above the nominal contact detection threshold) on the selectable representation, without movement of the contact). In response to detecting the third input (e.g., optionally, including detecting termination of the second input (e.g., detecting lift-off of the contact)), the device displays one or more selectable options for performing operations with respect to the first content, including a first selectable option, which, when activated, causes the device to display the first content in a new window with the first user interface (e.g., displaying the new window with the first user interface in a respective concurrent-display configuration (e.g., as a slide-over window, or in the split-screen configuration). This is illustrated in FIGS. 4C47-4C48, for example. Displaying one or more selectable options for performing operations with respect to a content in response to detecting an input meeting input criteria provides improved visual feedback to the user (e.g., a narrower example). Providing improved visual feedback enhances the operability of the device and makes the user-device interface more efficient (e.g., give an example), which, additionally, reduces power usage and improves battery life of the device by enabling the user to use the device more quickly and efficiently.

In some embodiments, the first user interface, the second user interface, and the third user interface are all user interfaces of the first application. Displaying different user interfaces of the same application including a content in response to an input selecting the content provides additional control options without cluttering the UI with additional displayed controls enhances the operability of the device (e.g., allowing the user to display and interact with different windows of a same content), which, additionally, reduces power usage and improves battery life of the device by enabling the user to use the device more quickly and efficiently.

In some embodiments, the first user interface is a user interface of an application that is distinct from the first application (e.g., the application that provides the second user interface and the third user interface). In some embodiments, the first application is an address book application. In some embodiments, the application is a web browser application. Displaying different user interfaces of the different applications including a content in response to an input selecting the content provides additional control options without cluttering the UI with additional displayed controls enhances the operability of the device (e.g., allowing the user to display and interact with different windows of different applications), which, additionally, reduces power usage and improves battery life of the device by enabling the user to use the device more quickly and efficiently.

In some embodiments, while displaying the third user interface overlaying a portion of the first user interface, the device detects a fourth input, including detecting an input that corresponds to a request to move the third user interface upward across the display (e.g., including detecting touch-down of a contact at a location on a touch-sensitive surface that corresponds to the location of the slide-over window showing the first content to pick up the slide-over window, and upward movement of the contact across the touch-sensitive surface that corresponds to movement across the display that drags the slide-over window upward). In response to detecting the fourth input, and in accordance with a determination that the fourth input meets window-closing criteria (e.g., including a criterion that require the movement of the window to meet a threshold distance and/or a threshold speed), the device ceases to display the third user interface while maintaining display of the first user interface. In some embodiments, the device closes the side-by-side window (e.g., the second user interface), in response to detecting a drag input on the resize handle between the first user interface and the second user interface that moves the resize handle to the side edge closes to the second user interface. Ceasing to display a user interface while maintaining the display of another user interface in response to detecting the an input in accordance with a determination that the input meets window-closing criteria provides improved visual feedback to the user (e.g., that an input has met certain criteria). Providing improved visual feedback enhances the operability of the device and makes the user-device interface more efficient, which, additionally, reduces power usage and improves battery life of the device by enabling the user to use the device more quickly and efficiently.

In some embodiments, before detecting the first input, the first user interface includes a first region that includes a listing of content items including the first content, and a second region that includes second content (e.g., same or distinct from the first content) from the listing of content items. The method includes: in response to detecting the first input, in accordance with a determination that the third user interface is displayed adjacent to the first user interface, ceasing to display the first region in the first user interface while expanding the second region in the first user interface. For example, in a note application, the full-screen user interface of the note application includes a first region that displays the file system hierarchy of the note application, and a second region that displays the content of a first note document or a second note document; when the first note document is dragged from the file listing in the first region and dropped onto the second region, the device ceases to display the first region including the file hierarchy, expands the second region to fill the first user interface, and displays an auxiliary window adjacent to a window containing the first user interface. In some embodiments, a "back-navigation" affordance is displayed in the second portion of the first user interface to navigate up the file hierarchy, but no in the auxiliary window. Ceasing to display a first region in a first user interface while expanding a second region in the first user interface in response to detecting an input, in accordance with a determination that another user interface is displayed adjacent to the first user interface provides improved visual feedback to the user. Providing improved visual feedback enhances the operability of the device and makes the user-device interface more efficient, which, additionally, reduces power usage and improves battery life of the device by enabling the user to use the device more quickly and efficiently.

In some embodiments, the second region of the first user interface includes a navigation affordance that, when, activated navigates up a hierarchy in the listing of content items, the second user interface does not include the navigation affordance when displayed adjacent to the first user interface, the second user interface includes a drag handle for moving the second user interface relative to the first user interface. The method includes: detecting a fifth input that corresponds to a request to drag the second user interface relative to the first user interface; and in response to detecting that the fifth input meets swapping criteria (e.g., drag handle is moved by more than a threshold amount in the horizontal direction toward the side of the first user interface), swapping positions of the first user interface and the second user interface, and displaying the navigation affordance in the second user interface instead of the first user interface. Swapping positions of a first user interface and a second user interface and displaying a navigation affordance in the second user interface in response to detecting an input that corresponds to a request to drag the second user interface relative to the first user interface provides additional control options without cluttering the UI with additional displayed controls (e.g., the control option of swapping the positions of two different user interfaces with a single input), and enhances the operability of the device, which, additionally, reduces power usage and improves battery life of the device by enabling the user to use the device more quickly and efficiently.

In some embodiments, in response to detecting the first input: in accordance with a determination that the respective location is the first location, the device displays a closing affordance concurrently with the second user interface, wherein the closing affordance, when activated, closes the second user interface and restores the first user interface to a size prior to display of the second user interface. In some embodiments, the first content is a document, and the first application is a document editing application, the close affordance, when activated, causes the device to close and save the document. Displaying a closing affordance that when activated would close a corresponding user interface and restore another user interface reduces the number of inputs needed to perform an operation (e.g., replacing a user interface with another). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the first input: in accordance with a determination that the respective location is the first location, the device displays a sending affordance concurrently with the second user interface, wherein the sending affordance, when activated, closes the second user interface (optionally, restores the first user interface to a size prior to display of the second user interface), and displays a user interface for sending the first content to a recipient. In some embodiments, the first content is a draft email message, and the first application is an email application, the send affordance, when activated, causes the device to close and send the email message to a recipient specified in the draft email message. Displaying a sending affordance that when activated would close a corresponding user interface and display another user interface for sending a content to a recipient reduces the number of inputs needed to perform an operation (e.g., replacing a user interface with another and sending a content). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the first input (including detecting termination of the first input after detecting the input that corresponds to a request to move the selectable representation of the first content across the display to the respective location): in accordance with a determination that the respective location is a third location (e.g., over the first application but not within the regions associated with displaying a new window or another location that is different from the first location and the second location), the device performs an operation corresponding to the first content within the first application (e.g., inserting the content at a different location in the first application such as at a different location in a document corresponding to the third location, or in a folder corresponding to the third location or a message compose field or region corresponding to the third location). This is illustrated in FIGS. 4C29 and 4C36, for example. Disambiguating the input for performing an operation within the first application and the input for opening a new window based on a location of the input when the end of the input is detected reduces the number of inputs needed to perform an intended operation. Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the first input (including detecting termination of the first input after detecting the input that corresponds to a request to move the selectable representation of the first content across the display to the respective location): in accordance with a determination that the respective location is a fourth location (e.g., over a second application that is different from the first application but not within the regions associated with displaying a new window), the device performs an operation corresponding to the first content within the second application (e.g., inserting the content at a different location in the second application such as at a location in a document corresponding to the fourth location, or in a folder corresponding to the fourth location or a message compose field or region corresponding to the fourth location). This is illustrated in FIGS. 4C30, 4C31, 4C37, for example. Disambiguating the input for performing an operation within the second application and the input for opening a new window based on a location of the input when the end of the input is detected reduces the number of inputs needed to perform an intended operation. Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, aspects/operations of methods 5000, 6000, 7000, 7100, 8000, and 9000 may be interchanged, substituted, and/or added between these methods. For brevity, these details are not repeated here.

FIG. 7I is a flowchart representation of a method 7100 of dragging and dropping an object to a respective region of the display to open a new window, in accordance with some embodiments. FIGS. 4A1-4A50, 4B1-4B51, 4C1-4C48, 4D1-4D19, and 4E1-4E28 are used to illustrate the methods and/or processes of FIG. 7I. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 7100 is performed by an electronic device (e.g., portable multifunction device 100, FIG. 1A and/or one or more components of the electronic device (e.g., I/O subsystem 106, operating system 126, etc.). In some embodiments, the method 7100 is governed by instructions that are stored in a non-transitory computer-readable storage medium and that are executed by one or more processors of a device, such as the one or more processors 122 of device 100 (FIG. 1A). For ease of explanation, the following describes method 7100 as performed by the device 100. In some embodiments, with reference to FIG. 1A, the operations of method 7100 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 7100 are, optionally, combined and/or the order of some operations is, optionally, changed.

As described below, the method 7100 is performed at an electronic device including a display generation component (e.g., a display, a projector, a heads-up display, etc.) and one or more input devices (e.g., a keyboard, a remote controller, a camera, a touch-sensitive surface that is coupled to a separate display, or a touch-screen display that serves both as the display and the touch-sensitive surface). The device displays (7102), by the display generation component, a first user interface (e.g., a user interface of an application open in a standalone or split-screen configuration, overlaid with a dock containing application icons) containing a selectable user interface object (e.g., a user interface object (e.g., an icon, a link, etc.) representing a local or online document content or an application icon representing an application). While displaying the first user interface containing the selectable user interface object, the device detects (7104) a first input, including detecting an input that corresponds to a request to move the selectable user interface object across the display to a respective location (e.g., including detecting touch-down of a contact at a location on a touch-sensitive surface that corresponds to the location of the selectable user interface object, detecting a touch-hold input or light press input to enable initiation of a drag operation of the selectable user interface object, and detecting movement of the contact across the touch-sensitive surface that corresponds to movement across the display that drags the selectable user interfaced object to a respective location on the display). In response to detecting the first input (including detecting termination of the first input after detecting the input that corresponds to a request to move the selectable user interface object across the display to the respective location) (7106): in accordance with a determination that the respective location is in a first predefined region of the user interface and the selectable user interface object is an application icon for a first application, the device creates a new window for the first application; in accordance with a determination that the respective location is in a second predefined region of the user interface, wherein the second predefined region of the user interface is smaller than the first predefined region of the user interface, (e.g., a first subset (e.g., a portion, less than all) of the first predefined region of the user interface) and the selectable user interface object is a representation of content associated with the first application, the device creates a new window for the first application; and in accordance with a determination that the respective location is in a third region of the user interface, wherein the third region of the user interface is smaller than the first predefined region of the user interface and does not overlap with the second predefined region of the user interface (e.g., a second subset (e.g., a portion, less than all) of the first predefined region of the user interface) and the selectable user interface object is a representation of content associated with the first application, the device performs an operation corresponding to the selectable user interface object other than creating a new window for the first application (e.g., performing an operation associated with dropping the selectable user interface object). This is illustrated in FIGS. 4C34-4C46, for example. Implementing an expanded regions for opening a new window of an application by dragging and dropping an application icon into a predefined region on the display, relative to the regions for opening a content item in a new window by dragging and dropping an object corresponding to the content item allow the user to more easily open the application windows, and preserves the regions for performing an operation within a currently displayed operation. Thus, the features reduces user mistakes when interaction with the user interface of the device, and reduces the number inputs needed to perform an intended operation. Reducing user mistakes and reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the new window that is created when the respective location is in the first predefined region of the user interface is (7108) a first type of window (e.g., an overlaid window). In response to detecting the first input (including detecting termination of the first input after detecting the input that corresponds to a request to move the selectable representation of the first content across the display to the respective location): in accordance with a determination that the respective location is in a fourth predefined region of the user interface that does not overlap with the first predefined region of the user interface and the selectable user interface object is an application icon for a first application, the device creates a new window for the first application of a second type that is different from the first type (e.g., a side by side application window); in accordance with a determination that the respective location is in a fifth predefined region of the user interface, wherein the fifth predefined region of the user interface is smaller than the fourth predefined region of the user interface, (e.g., a first subset of the fourth predefined region of the user interface) and the selectable user interface object is a representation of content associated with the first application, the device creates a new window for the first application of the second type; and in accordance with a determination that the respective location is in a sixth region of the user interface, wherein the sixth region of the user interface is smaller than the fourth predefined region of the user interface and does not overlap with the fifth predefined region of the user interface, (e.g., a second subset of the second region of the user interface) and the selectable user interface object is a representation of content associated with the first application, the device performs an operation corresponding to the selectable user interface object other than creating a new window for the first application (e.g., performing an operation associated with dropping the selectable user interface object). In some embodiments, the first application is a representative application of a plurality of different applications with this behavior, and the content is a representative content of a plurality of different content with this behavior. The features describe with respect to dragging and dropping objects corresponding to application icons and representing content in FIGS. 4C34-4C46 and Flowcharts 7A-7H are applicable here as well, and are not repeated herein in the interest of brevity. Implementing an expanded regions for opening a new window of an application by dragging and dropping an application icon into a predefined region on the display, relative to the regions for opening a content item in a new window by dragging and dropping an object corresponding to the content item allow the user to more easily open the application windows, and preserves the regions for performing an operation within a currently displayed operation. Thus, the features reduces user mistakes when interaction with the user interface of the device, and reduces the number inputs needed to perform an intended operation. Reducing user mistakes and reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, aspects/operations of methods 5000, 6000, 7000, 8000, and 9000 may be interchanged, substituted, and/or added between these methods. For brevity, these details are not repeated here.

FIGS. 8A-8E are a flowchart representation of a method 8000 of displaying an application in a respective concurrent-display configuration with a currently displayed application, in accordance with some embodiments. FIGS. 4A1-4A50, 4B1-4B51, 4C1-4C48, 4D1-4D19, and 4E1-4E28 are used to illustrate the methods and/or processes of FIGS. 8A-8E. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 8000 is performed by an electronic device (e.g., portable multifunction device 100, FIG. 1A and/or one or more components of the electronic device (e.g., I/O subsystem 106, operating system 126, etc.). In some embodiments, the method 8000 is governed by instructions that are stored in a non-transitory computer-readable storage medium and that are executed by one or more processors of a device, such as the one or more processors 122 of device 100 (FIG. 1A). For ease of explanation, the following describes method 8000 as performed by the device 100. In some embodiments, with reference to FIG. 1A, the operations of method 8000 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 8000 are, optionally, combined and/or the order of some operations is, optionally, changed.

As described below, the method 8000 provides an intuitive ways to interact with multiple application windows. The method reduces the number of inputs required from a user to interact with multiple application windows and, thereby, ensures that battery life of an electronic device implementing the method 8000 is extended, since less power is required to process the fewer number of inputs (and this savings will be realized over and over again as users become increasingly familiar with the more intuitive and simple gesture). As is also explained in detail below, the operations of method 8000 help to ensure that users are able to engage in sustained interactions (e.g., they do not need to frequency undo behaviors, which interrupts their interactions with their devices) and the operations of method 8000 help to produce more efficient human-machine interfaces.

In some embodiments, method 8000 is performed at an electronic device including a display generation component (e.g., a display, a projector, a heads-up display, etc.) and one or more input devices (e.g., a camera, a remote controller, a pointing device, a camera, a touch-sensitive surface that is coupled to a separate display, or a touch-screen display that serves both as the display and the touch-sensitive surface). The device displays (8002), by the display generation component, a dock (e.g., a container object for displaying a small set of application icons that is called up to the display from any of a variety of user interfaces (e.g., different apps, or system user interfaces) in response to a predefined user input) containing a plurality of application icons (e.g., a subset of all applications available on the home screen, a set of most recently used applications or frequently used applications) concurrently with a first user interface of a first application (e.g., in a standalone-display configuration, occupying substantially all areas of the display, without concurrent display of another application on the screen, or in a split-screen configuration with another application or another window of the first application, or with a slide-over window of the first application or another application, or as a slide-over window of the first application or another application, etc.) (e.g., the first user interface of the first application is not a system user interface, such as a home screen or springboard user interface from which applications can be launched by activating their respective application icons)), wherein the plurality of application icons corresponds to different applications (e.g., the same application icons are also displayed, among other application icons not shown in the dock, on a home screen or springboard user interface; and activation of an application icon from the home screen or springboard user interface (e.g., by a tap input detected on the application icon)) causes the application to be launched (e.g., opened to a default starting user interface or to a most recently displayed user interface of the application corresponding to the activated application icon). While displaying the dock concurrently with the first user interface of the first application, the device detects (8004) a first input directed to an application icon corresponding to a second application (e.g., the first application and the second application are distinct from each other) in the dock that includes movement into a first region of the display (e.g., a first predefined region near the side edge of the display) followed by an end of the first input in the first region of the display. In response to detecting the first input (8006): in accordance with a determination that the second application is associated with multiple windows (e.g., has multiple individually opened and individually recallable windows), the device displays (e.g., in a window-selector user interface for the second application), via the display generation component, a first representation of a first window for the second application and a second representation of a second window for the second application concurrently with the first user interface of the first application in a second region of the display (e.g., each of the concurrently displayed representations of the multiple windows of the second application, when selected, causes the device to display the selected window of the second application concurrently with the first user interface of the first application in accordance with a respective concurrent-display configuration (e.g., slide-over configuration, or side-by-side configuration)); and in accordance with a determination that the second application is associated with only a single window, the device displays, via the display generation component, a user interface of the second application concurrently with the first user interface of the first application, wherein the user interface of the second application is displayed in the second region of the display (e.g., the user interface of the second application is displayed as an auxiliary app in a first concurrent-display configuration, or as one of multiple split-screen apps in a second concurrent-display configuration). This is illustrated in FIGS. 4D1-4D5, for example. Displaying representations of windows for an application, depending on whether the application is associated with a single window multiple windows, in response to detecting an input directed to an application icon corresponding to the application and moving the application icon into a region of a display reduces the number of inputs needed to perform an operation (e.g., allowing the user to display different configuration for the windows for the application). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the second region is a predefined region of the display (e.g., a top portion, a side portion of the display, a bottom portion of the display, etc.). This is illustrated in FIG. 4D5 and FIG. 4D19, for example. Displaying representations of windows for an application, depending on whether the application is associated with a single window multiple windows, in response to detecting an input directed to an application icon corresponding to the application and moving the application icon into a predefined region of a display reduces the number of inputs needed to perform an operation (e.g., allowing the user to display different configuration for the windows for the application). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the device displays, concurrently with the first representation of the first window and the second representation of the second window for the second application, a first affordance (e.g., an "open" button) for opening a document in the second application. While displaying the first affordance for opening a document in the second application, the device detects an input activating the first affordance (e.g., detecting a tap input on the "open" button). In response to detecting the input activating the first affordance: the device displays a user interface for selecting a document to display in a new window in the second region of the display. For example, once the document is selected and opened through the user interface, the document is opened in a new window in the second region of the display. This is illustrated in FIG. 4D5, for example. Displaying a user interface for selecting a document to display in a new window in a region of the display in response to detecting an input activating an affordance for opening a document in an application provides additional control options without cluttering the UI with additional displayed controls (e.g., allowing the user to open documents using an affordance concurrently displayed with the multiple displayed windows), and enhances the operability of the device, which, additionally, reduces power usage and improves battery life of the device by enabling the user to use the device more quickly and efficiently.

In some embodiments, the device displays, concurrently with the first representation of the first window and the second representation of the second window for the second application, a second affordance (e.g., a "new document" button) for creating a new document in the second application. While displaying the second affordance for creating a new document in the second application, the device detects an input activating the second affordance (e.g., detecting a tap input on the "new document" button). In response to detecting the input activating the second affordance: the device displays a new window of the second application in the second region of the display. For example, the new window includes a new document created based on a default template of the second application. This is illustrated in FIG. 4D5, for example. Displaying a new window of an application in a region of a display in response to detecting an input activating an affordance for creating a document in an application provides additional control options without cluttering the UI with additional displayed controls (e.g., allowing the user to create a new documents using an affordance concurrently displayed with the multiple displayed windows), and enhances the operability of the device, which, additionally, reduces power usage and improves battery life of the device by enabling the user to use the device more quickly and efficiently.

In some embodiments, while displaying the first representation of the first window and the second representation of the second window for the second application, the device detects a second input directed to the second region of the display, including movement across the second region of the display followed by an end of the second input (e.g., movement across the second region in a direction that points away from center of the display). In response to detecting the second input: in accordance with a determination that the second input meets dismissal criteria (e.g., direction of the movement is away from the center of the display, and movement meets a threshold distance or threshold speed), and a location of the second input corresponds to the first representation of the first window of the second application, the device ceases to display the first representation of the first window while maintaining display of the second representation of the second window for the second application; and in accordance with a determination that the second input meets the dismissal criteria (e.g., direction of the movement is away from the center of the display, and movement meets a threshold distance or threshold speed), and a location of the second input corresponds to the second representation of the second window of the second application, the device ceases to display the second representation of the second window while maintaining display of the first representation of the first window for the second application. This is illustrated in FIGS. 4D6-4D8, for example. Ceasing to display either a first representation of an application or a second representation of an application window in accordance with a determination that an input meets dismissal criteria and based on the location of the input provides additional control options without cluttering the UI with additional displayed controls enhances the operability of the device (e.g., allowing the user to dismiss application windows with a swiping motion at different locations of the display), which, additionally, reduces power usage and improves battery life of the device by enabling the user to use the device more quickly and efficiently.

In some embodiments, displaying the user interface of the second application concurrently with the first user interface of the first application includes displaying the user interface of the second application adjacent to the first user interface of the first application. In some embodiments, multiple windows are associated with the second application and the representations of the multiple windows are displayed in the second region of the display, selection of the representation of one of the multiple windows of the second application causes the device to display the selected window with the first user interface of the first application in the side-by-side display configuration as well. In some embodiments, the device displays the user interface of the second application in the side-by-side display configuration with the first user interface of the first application in accordance with a determination that the first region is the second predefined region of the display (e.g., within 1/10 width of the display from the side edge of the display). This is illustrated in FIGS. 4D18-4D19, for example. Displaying the user interface of the applications adjacent to each other in response to an input provides improved visual feedback to the user (e.g., allowing the user to view and interact with multiple applications from an input). Providing improved visual feedback enhances the operability of the device and makes the user-device interface more efficient (e.g., give an example), which, additionally, reduces power usage and improves battery life of the device by enabling the user to use the device more quickly and efficiently.

In some embodiments, displaying the user interface of the second application concurrently with the first user interface of the first application includes displaying the user interface of the second application overlaying a portion of the first user interface of the first application. In some embodiments, multiple windows are associated with the second application and the representations of the multiple windows are displayed in the second region of the display, selection of the representation of one of the multiple windows of the second application causes the device to display the selected window with the first user interface of the first application in the slide-over display configuration as well. In some embodiments, the device displays the user interface of the second application in the slide-over display configuration with the first user interface of the first application in accordance with a determination that the first region is the first predefined region of the display (e.g., within 1/5 to 1/10 width of the display from the side edge of the display). This is illustrated in FIG. 4D4, for example. Displaying a user interface of an applications overlaying the user interface of another application in response to an input provides improved visual feedback to the user (e.g., allowing the user to view and interact with multiple applications from an input). Providing improved visual feedback enhances the operability of the device and makes the user-device interface more efficient (e.g., give an example), which, additionally, reduces power usage and improves battery life of the device by enabling the user to use the device more quickly and efficiently.

In some embodiments, while the first representation of the first window and the second representation of the second window for the second application, the device detects a third input directed to the second region of the display. In response to detecting the third input: in accordance with a determination that the third input meets dismissal criteria for closing the first window of the second application: the device ceases to display the first representation of the first window while maintaining display of the second representation of the second window for the second application; and in accordance with a determination that the second representation of the second window for the second application is a representation of an only window for the second application: the device ceases to display the second representation of the second window; and the device displays the second window in the second region of the display. This is illustrated in FIGS. 4D8-4D9, for example. Ceasing to display a representation of an application window in accordance with a determination that an input meets dismissal criteria for closing the a different representation of a concurrently-displayed application window and displaying the application window in a different region of the display performs an operation when a set of conditions has been met without requiring further user input (e.g., automatically displaying the window of the application in a region of the dismissal in response to the dismissal input of another application). Performing an operation when a set of conditions has been met without requiring further user input controls enhances the operability of the device, which, additionally, reduces power usage and improves battery life of the device by enabling the user to use the device more quickly and efficiently.

In some embodiments, while the first representation of the first window and the second representation of the second window for the second application, the device detects a third input directed to the second region of the display. In response to detecting the third input: in accordance with a determination that the third input meets dismissal criteria for closing the first window of the second application: the device ceases to display the first representation of the first window while maintaining display of the second representation of the second window for the second application; and in accordance with a determination that the second representation of the second window for the second application is a representation of an only window for the second application, the device maintains display of the second representation of the second window for the second application in the second region of the display. This is illustrated in FIGS. 4D15-4D17, for example. Maintaining display of a representation of an application window in accordance with a determination that the representation of the application window is an only window of the application, and in accordance with a determination that an input meets dismissal criteria for closing a different window of the application provides improved visual feedback to the user (e.g., allowing the user to view and interact with multiple windows in a user interface). Providing improved visual feedback enhances the operability of the device and makes the user-device interface more efficient, which, additionally, reduces power usage and improves battery life of the device by enabling the user to use the device more quickly and efficiently.

In some embodiments, the device displays an affordance for opening a new window of the second application concurrently with the first representation of the first window and the second representation of the second window for the second application. The device detects a plurality of inputs directed to the second region of the display. In response to detecting the plurality of inputs: in accordance with a determination that the plurality of inputs meet dismissal criteria for closing the first and second windows of the second application: the device ceases to display the first representation of the first window and the second representation of the second window for the second application; and in accordance with a determination that there is no window for the second application represented in the second region, the device maintains display of the affordance for opening a new window of the second application in the second region of the display. This is illustrated in FIGS. 4D15-4D17, for example. Ceasing to display multiple representations of application windows and maintaining a display of affordances for opening a new window performs an operation when a set of conditions has been met without requiring further user input (e.g., automatically closing all representations of application windows and maintaining the display of affordances). Performing an operation when a set of conditions has been met without requiring further user input controls enhances the operability of the device, which, additionally, reduces power usage and improves battery life of the device by enabling the user to use the device more quickly and efficiently.

In some embodiments, aspects/operations of methods 5000, 6000, 7000, 7100, 8000, and 9000 may be interchanged, substituted, and/or added between these methods. For brevity, these details are not repeated here.

FIGS. 9A-9J are a flowchart representation of a method of changing window display configurations using a fluid gesture, in accordance with some embodiments. FIGS. 4A1-4A50, 4B1-4B51, 4C1-4C47, 4D1-4D19, and 4E1-4E28 are used to illustrate the methods and/or processes of FIGS. 9A-9J. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 9000 is performed by an electronic device (e.g., portable multifunction device 100, FIG. 1A and/or one or more components of the electronic device (e.g., I/O subsystem 106, operating system 126, etc.). In some embodiments, the method 9000 is governed by instructions that are stored in a non-transitory computer-readable storage medium and that are executed by one or more processors of a device, such as the one or more processors 122 of device 100 (FIG. 1A). For ease of explanation, the following describes method 9000 as performed by the device 100. In some embodiments, with reference to FIG. 1A, the operations of method 9000 are performed by or use, at least in part, a multitasking module (e.g., multitasking module 180) and the components thereof, a contact/motion module (e.g., contact/motion module 130), a graphics module (e.g., graphics module 132), and a touch-sensitive display (e.g., touch-sensitive display system 112). Some operations in method 9000 are, optionally, combined and/or the order of some operations is, optionally, changed.

As described below, the method 9000 provides an intuitive ways to interact with multiple application windows. The method reduces the number of inputs required from a user to interact with multiple application windows and, thereby, ensures that battery life of an electronic device implementing the method 9000 is extended, since less power is required to process the fewer number of inputs (and this savings will be realized over and over again as users become increasingly familiar with the more intuitive and simple gesture). As is also explained in detail below, the operations of method 9000 help to ensure that users are able to engage in sustained interactions (e.g., they do not need to frequency undo behaviors, which interrupts their interactions with their devices) and the operations of method 9000 help to produce more efficient human-machine interfaces.

In some embodiments, method 9000 is performed at an electronic device including a display generation component (e.g., a display, a projector, a heads-up display, etc.) and one or more input devices (e.g., a camera, a remote controller, a keyboard, a touch-sensitive surface that is coupled to a separate display, or a touch-screen display that serves both as the display and the touch-sensitive surface). The device concurrently displays (9002), by the display generation component, a first application view (e.g., a first window of a first application) and a second application view (e.g., a second window of a second application) in a first concurrent-display configuration (e.g., slide over mode, or side-by-side mode) of a plurality of concurrent-display configurations, including the first concurrent-display configuration that specifies a first arrangement of concurrently displayed application views (e.g., side-by-side mode with first app on the left), a second concurrent-display configuration that specifies a second arrangement of concurrently displayed application views (e.g., side-by-side mode with the first app on the right) that is different from the first arrangement of concurrently displayed application views, and a third concurrent-display configuration that specifies a third arrangement of concurrently displayed application views (e.g., slide over mode with the first app on top) that is different from the first arrangement of concurrently displayed application views and the second arrangement of concurrently displayed application views. The device detects (9004) a first input that starts at a location directed to the first application view within the first arrangement of concurrently displayed application views and includes first movement followed by an end of the first input after the first movement has been detected (e.g., including detecting a first contact at a location of the touch-sensitive surface that corresponds to a predefined portion of the first application view (e.g., a drag handle of the first window of the first application), detecting movement of the first contact across the touch-sensitive surface, and detecting lift-off of the first contact). In response to detecting the first movement of the first input, the device moves (9006) a representation of the first application view on the display in accordance with the first movement of the first input, including: while the representation of the first application view is over a first portion of the display, displaying a first visual indication that an end of the first input will result in the first application view and the second application view being displayed in the first concurrent-display configuration; while the representation of the first application view is over a second portion of the display, displaying a second visual indication that an end of the first input will result in the first application view and the second application view being displayed in the second concurrent-display configuration; and while the representation of the first application view is over a third portion of the display, displaying a third visual indication that an end of the first input will result in the first application view and the second application view being displayed in the third concurrent-display configuration. In response to detecting the end of the first input (9008): in accordance with a determination that the first input ended while the first application view was over the first portion of the display, the device displays the first application view and the second application view in the first concurrent-display configuration; in accordance with a determination that the first input ended while the first application view was over the second portion of the display, the device displays the first application view and the second application view in the second concurrent-display configuration; and in accordance with a determination that the first input ended while the first application view was over the third portion of the display, the device displays the first application view and the second application view in the third concurrent-display configuration. This is illustrated in FIGS. 4E1-4E24, for example. Displaying application views in different concurrent-display configurations in accordance with the state of the applications at the end of a detected input on a display reduces the number of inputs needed to perform an operation (e.g., allowing the user to switch among different view configurations with a single input). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, the first arrangement of concurrently displayed application views differs from the second arrangement of concurrently displayed application views in at least a relative display position of the first application view and the second application view along a first direction (e.g., relative lateral display position) defined by the display generation component (e.g., the two apps occupy different sides of the display in the first and second concurrent-display configurations). In some embodiments, the first direction is a horizontal direction, the first application and the second application switch sides in the horizontal direction in response to the first input. In some embodiments, the first direction is a vertical direction, the first application and the second application switch sides in the vertical direction in response to the first input. In some embodiments, the first application view is moved from a peripheral position relative to the second application view (e.g., from a side portion over or adjacent to the second application view) to a primary position relative to the second application view (e.g., to a central portion over the second application view). This is illustrated in FIGS. 4E1-4E24 (e.g., transitions in Zone H, and between Zones A and E, and Zones B and F), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is displayed overlaying a different portion (less than all) of the second application view in the first arrangement of concurrently displayed application views and in the second arrangement of concurrently displayed application views. In some embodiments, the first concurrent-display configuration and the second concurrent-display configuration are both the slide-over configuration with the first application view displayed as a slide-over window overlaying the second application view. The position of the slide-over window relative to the second application view changes in response to the first input. This is illustrated in FIGS. 4E1-4E24 (e.g., transitions in Zone H, and between Zones B and F), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is a slide-over window overlaying a first side portion (e.g., left side) of the second application view in the first arrangement of concurrently displayed application views, and is a slide-over window overlaying a second side portion (e.g., right side) of the second application view in the second arrangement of concurrently displayed application views. This is illustrated in FIGS. 4E1-4E24 (e.g., transitions in Zone H, and between Zones B and F), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is displayed adjacent a first side portion (e.g., left side) of the second application view in the first arrangement of concurrently displayed application views, and is a displayed adjacent a second side portion (e.g., right side) of the second application view in the second arrangement of concurrently displayed application views. This is illustrated in FIGS. 4E1-4E24 (e.g., transitions in Zone H, and between Zones A and E), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is displayed overlaying a peripheral portion of (e.g., left side portion) of the second application view in the first arrangement of concurrently displayed application views, and is a displayed overlaying a central portion of the second application view in the second arrangement of concurrently displayed application views. In some embodiments, the second application view is not blurred in the first concurrent-display configuration, and is blurred in the second concurrent-display configuration. This is illustrated in FIGS. 4E1-4E24 (e.g., transitions between Zones B and C, and Zones F and C), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is displayed overlaying a central portion of the second application view in the first arrangement of concurrently displayed application views, and is a displayed overlaying a peripheral portion (e.g., a left side portion) of the second application view in the second arrangement of concurrently displayed application views. In some embodiments, the second application view is blurred in the first concurrent-display configuration, and is not blurred in the second concurrent-display configuration. This is illustrated in FIGS. 4E1-4E24 (e.g., transitions between Zones B and C, and Zones F and C), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is displayed (in a non-minimized, interactive state) overlaying a central portion of the second application view in the first arrangement of concurrently displayed application views, and is a displayed in a minimized state overlaying a peripheral portion (e.g., a bottom portion) of the second application view in the second arrangement of concurrently displayed application views. In some embodiments, the second application view is blurred in the first concurrent-display configuration, and is not blurred in the second concurrent-display configuration. This is illustrated in FIGS. 4E1-4E24 (e.g., transitions between Zones C and D), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is a displayed in a minimized state overlaying or adjacent a peripheral portion (e.g., a bottom portion) of the second application view in the first arrangement of concurrently displayed application views, and is displayed (in a non-minimized, interactive state) overlaying a central portion of the second application view in the second arrangement of concurrently displayed application views. This is illustrated in FIGS. 4E1-4E24 (e.g., transitions between Zones C and D), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is displayed (in a non-minimized, interactive state) adjacent a side portion of the second application view in the first arrangement of concurrently displayed application views, and is a displayed in a minimized state overlaying or adjacent a peripheral portion (e.g., a bottom portion) of the second application view in the second arrangement of concurrently displayed application views. This is illustrated in FIGS. 4E1-4E24 (e.g., transitions between Zones B and D, and between Zones F and D), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is a displayed in a minimized state overlaying or adjacent a peripheral portion (e.g., a bottom portion) of the second application view in the first arrangement of concurrently displayed application views, and is displayed (in a non-minimized, interactive state) overlaying a side portion of the second application view in the second arrangement of concurrently displayed application views. This is illustrated in FIGS. 4E1-4E24 (e.g., transitions between Zones B and D, and between Zones F and D), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first arrangement of concurrently displayed application views differs from the second arrangement of concurrently displayed application views in at least relative display layers of the first application view and second application view defined by the display generation component (e.g., the two apps occupy the same display layer or different layers in the first and third concurrent-display mode). Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is a slide-over window overlaying a first side portion (e.g., left side) of the second application view in the first arrangement of concurrently displayed application views, and is displayed adjacent to a second side portion (e.g., right side or left side) of the second application view in the second arrangement of concurrently displayed application views. This is illustrated in FIGS. 4E1-4E24 (e.g., transitions between Zones B and A, and between Zones F and E), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is displayed adjacent to a first side portion (e.g., left side) of the second application view in the first arrangement of concurrently displayed application views, and is displayed overlaying a second side portion (e.g., right side or left side) of the second application view in the second arrangement of concurrently displayed application views. This is illustrated in FIGS. 4E1-4E24 (e.g., transitions between Zones B and A, and between Zones F and E), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is displayed adjacent to a peripheral portion (e.g., right side or left side) of the second application view in the first arrangement of concurrently displayed application views, and is displayed overlaying a central portion of the second application view in the second arrangement of concurrently displayed application views. This is illustrated in FIGS. 4E1-4E24 (e.g., transitions between Zones C and A, and between Zones C and E), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first application view is displayed overlaying a central portion of the second application view in the first arrangement of concurrently displayed application views, and is displayed adjacent a peripheral portion (e.g., right side or left side) of the second application view in the second arrangement of concurrently displayed application views. This is illustrated in FIGS. 4E1-4E24 (e.g., transitions between Zones C and A, and between Zones C and E), for example. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the third arrangement of concurrently displayed application views differs from the first arrangement of concurrently displayed application views in at least a relative display position between the first application view and the second application view, or relative display layers of the first application and the second application view. There are many permutations of what the first, second, and third arrangements of concurrently displayed application views may correspond in different scenarios. In some embodiments, the first and second arrangement differ in relative display position of the first and second application views, and the first and third arrangement differ in relative display layers of the first and second application views. In some embodiments, the first and second arrangement differ in relative display layers of the first and second application views, and the first and third arrangement differ in relative display positions of the first and second application views. In some embodiments, the first and second arrangement differ in relative display positions of the first and second application views in a first manner, and the first and third arrangement differ in relative display positions of the first and second application views in a second, different manner. In some embodiments, the first application view starts as any one of a slide-over window on one side, a slide-over window on another side, a side-by-side window on one side, a side-by-side window on another side, a draft window, or a minimized window, and ends up as a different one of the above types of windows, depending on the location of the end of the input. Meanwhile, during the input, the device displays visual feedback corresponding to any one or more of the following transitions: slide-over window to slide-over window on a different side, slide-over window to a side-by-side window, side-by-side window to a side-by-side window on a different side, side-by-side window to a slide-over window, slide-over window to draft window, slide-over window to minimized window, side-by-side window to draft window, side-by-side window to minimized window, minimized window to slide-over window, minimized window to draft window, minimized window to side-by-side window, in accordance with the current location of the input, while maintain the possibility of making other transitions depending on subsequent location of the input prior to the final termination of the input. Allowing different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, the first visual indication differs from the second visual indication and the third visual indication, and the second visual indication differs from the third visual indication. Allowing different visual indications for different arrangement of concurrently-displayed application views provides improved visual feedback to the user (e.g., allowing the user to identify different configurations of application views). Providing improved visual feedback enhances the operability of the device and makes the user-device interface more efficient, which, additionally, reduces power usage and improves battery life of the device by enabling the user to use the device more quickly and efficiently.

In some embodiments, during the first movement of the first input, the device visually obscures content of the second application view in accordance with a current location of the first application view and a determination that the second application view will be resized in a respective concurrent-display configuration that corresponds to the current location of the first application view. Visually obscuring content of an application view in accordance with a current location of another application view and a determination that the application view will be resized provides improved visual feedback to the user (e.g., allowing the user to determine how and when the application views will be adjusted). Providing improved visual feedback enhances the operability of the device and makes the user-device interface more efficient, which, additionally, reduces power usage and improves battery life of the device by enabling the user to use the device more quickly and efficiently.

In some embodiments, during the first movement of the first input, the device displays the second application view without visual obscuring content of the second application view (e.g., displaying without blurring or unblurring, if previously blurred) in accordance with a current location of the first application view and a determination that the second application view will not be resized in a respective concurrent-display configuration that corresponds to the current location of the first application view. Display an application view without visually obscuring content of the application view in accordance with a current location of another application view and a determination that the application view will not be resized provides improved visual feedback to the user (e.g., allowing the user to determine how and when the application views will be adjusted). Providing improved visual feedback enhances the operability of the device and makes the user-device interface more efficient, which, additionally, reduces power usage and improves battery life of the device by enabling the user to use the device more quickly and efficiently.

In some embodiments, after detecting the end of the first input, while concurrently displaying, by the display generation component, the first application view (e.g., the first window of the first application) and the second application view (e.g., the second window of the second application) in the first concurrent-display configuration (e.g., slide over mode, or side-by-side mode) of the plurality of concurrent-display configurations, the device detects a second input that starts at a location directed to the second application view within the first arrangement of concurrently displayed application views and includes second movement followed by an end of the second input after the second movement has been detected (e.g., including detecting a second contact at a location of the touch-sensitive surface that corresponds to a predefined portion of the second application view, detecting movement of the second contact across the touch-sensitive surface, and detecting lift-off of the second contact). For example, in this scenario, the first input did not actually causes the first application view and the second application view to change their existing concurrent-display configuration, in accordance with an evaluation of the first input against the different location-based criteria for switching display configurations recited above. Now the user provides a second input after the end of the first input. In response to detecting the second movement of the second input, the device moves the representation of the second application view on the display in accordance with the second movement of the second input, including: while the representation of the second application view is over a fourth portion of the display (e.g., distinct from the first portion of the display), displaying a fourth visual indication that an end of the second input will result in the first application view and the second application view being displayed in the first concurrent-display configuration; while the representation of the second application view is over a fifth portion of the display (distinct from the second portion of the display), displaying a fifth visual indication that an end of the second input will result in the first application view and the second application view being displayed in the second concurrent-display configuration; and while the representation of the second application view is over a sixth portion of the display, displaying a sixth visual indication that an end of the second input will result in the first application view and the second application view being displayed in the third concurrent-display configuration. In response to detecting the end of the second input: in accordance with a determination that the second input ended while the second application view was over the fourth portion of the display, the device displays the first application view and the second application view in the first concurrent-display configuration; in accordance with a determination that the second input ended while the second application view was over the fifth portion of the display, the device displays the first application view and the second application view in the second concurrent-display configuration; and in accordance with a determination that the second input ended while the second application view was over the sixth portion of the display, the device displays the first application view and the second application view in the third concurrent-display configuration. In other words, a drag input can act on either of the two window in a concurrent-display configuration to switch the concurrent-display configuration to a different concurrent-display configuration (e.g., change the relative position or roles of the two windows in the concurrent-display configuration on the display). Displaying application views in different concurrent-display configurations in accordance with the state of the applications at the end of a detected input on a display reduces the number of inputs needed to perform an operation (e.g., allowing the user to switch among different view configurations with a single input). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, moving the representation of the first application view on the display in accordance with the first movement of the first input further includes: while the representation of the first application view is over a seventh portion of the display, displaying a seventh visual indication that an end of the first input will result in the first application view and the second application view being displayed in a fourth concurrent-display configuration of the plurality of concurrent-display configuration, wherein the fourth concurrent-display configuration is different from the first, second, and third concurrent-display configurations. The method further includes: in response to detecting the end of the first input: in accordance with a determination that the first input ended while the first application view was over the seventh portion of the display, displaying the first application view and the second application view in the fourth concurrent-display configuration. In some embodiments, There are many permutations of what the first, second, third, and fourth arrangements of concurrently displayed application views may correspond in different scenarios. In some embodiments, the fourth arrangement differs in relative display position, or relative display layers, or both, of the first and second application views, as compared to the first, second, and/or third arrangements. In some embodiments, the first application view starts as any one of a slide-over window on one side, a slide-over window on another side, a side-by-side window on one side, a side-by-side window on another side, a draft window, or a minimized window, and ends up as a different one of the above types of windows, depending on the location of the end of the input. Meanwhile, during the input, the device displays visual feedback corresponding to any one or more of the following transitions: slide-over window to slide-over window on a different side, slide-over window to a side-by-side window, side-by-side window to a side-by-side window on a different side, side-by-side window to a slide-over window, slide-over window to draft window, slide-over window to minimized window, side-by-side window to draft window, side-by-side window to minimized window, minimized window to slide-over window, minimized window to draft window, minimized window to side-by-side window, in accordance with the current location of the input, while maintain the possibility of making other transitions depending on subsequent location of the input prior to the final termination of the input. Displaying application views in different concurrent-display configurations in accordance with the state of the applications at the end of a detected input on a display reduces the number of inputs needed to perform an operation (e.g., allowing the user to switch among different view configurations with a single input). Reducing the number of inputs needed to perform an operation enhances the operability of the device, and makes the user-device interface more efficient, which, additionally, reduces power usage and improves battery life of the device by enabling the user to use the device more quickly and efficiently.

In some embodiments, in response to detecting the first movement of the first input, moving the representation of the first application view on the display in accordance with the first movement of the first input further includes: while the representation of the first application view is over an eighth portion of the display (e.g., the original location of the first application view), in accordance with a determination that the eighth portion of the display corresponds to the location of the first application view at a start of the first input, redisplaying the first application view and the second application view in the first concurrent-display configuration as an indication that an end of the first input in the eight region will result in redisplaying the first application view and the second application view in the first concurrent-display configuration. In some embodiments, in accordance with a determination that the eighth portion of the display does not correspond to the location of the first application view at the start of the first input, the device displays a respective one of the first, second, or third visual indication in accordance with whether the eight portion of the display corresponds to the first, second, or third portion of the display. Redisplaying application views of different applications in a concurrent-display configuration provides additional control options without cluttering the UI with additional displayed controls (e.g., allowing the user to reverse back to a starting state of the application view windows), and enhances the operability of the device, which, additionally, reduces power usage and improves battery life of the device by enabling the user to use the device more quickly and efficiently.

In some embodiments, after detecting the end of the first input, while concurrently displaying, by the display generation component, the first application view (e.g., the first window of the first application) and the second application view (e.g., the second window of the second application) in the first concurrent-display configuration (e.g., slide over mode, or side-by-side mode) of the plurality of concurrent-display configurations, the device detects a third input that starts at a location directed to the first application view within the first arrangement of concurrently displayed application views and includes third movement followed by an end of the third input after the third movement has been detected (e.g., including detecting a third contact at a location of the touch-sensitive surface that corresponds to the predefined portion of the first application view (e.g., the drag handle of the first application view), detecting movement of the third contact across the touch-sensitive surface, and detecting lift-off of the third contact). For example, in this scenario, the first input did not actually causes the first application view and the second application view to change their existing concurrent-display configuration, in accordance with an evaluation of the first input against the different location-based criteria for switching display configurations recited above. Now the user provides a third input after the end of the first input. In response to detecting the third movement of the third input, the device moves the representation of the first application view on the display in accordance with the third movement of the second input. Moving the representation of the first application view in accordance with the third movement of the second input includes: while the representation of the first application view is over a respective one of the first, second, and third portions (and any of the other portions of the display that has a corresponding concurrent-display configuration) of the display, displaying a respective visual indication that an end of the third input will result in the first application view and the second application view being displayed in a respective one of the first, second, and third concurrent-display configuration (and any of the other concurrent-display configurations) corresponding to the respective one of the first, second and third portions (and any of the other portions of the display that has a corresponding concurrent-display configuration) of the display; while the representation of the first application view is over a ninth portion of the display (distinct from the other portions of the display that correspond to various concurrent-display confirmations), displaying a eighth visual indication that an end of the third input will result in the first application view being displayed in a standalone-display configuration without being concurrently displayed with the second application view (e.g., the first application view will be displayed in a full-screen mode, and the second application view will cease to be displayed). In response to detecting the end of the second input: in accordance with a determination that the second input ended while the first application view was over the respective one of the first, second, and third portions (and any of the other portions of the display that has a corresponding concurrent-display configuration) of the display, the device displays the first application view and the second application view in the respective one of the first, second, and third concurrent-display configuration (and any of the other concurrent-display configurations) corresponding to the respective one of the first, second and third portions (and any of the other portions of the display that has a corresponding concurrent-display configuration) of the display; and in accordance with a determination that the third input ended while the first application view was over the ninth portion of the display, the device displays the first application view in a standalone-display configuration (without concurrently displaying the second application view or another other application view). This is illustrated in FIGS. 4E1-4E24 (e.g., transitions to and from Zone G), for example. Providing dynamic feedback to indicate a final display state of a window when the window is dragged across the display to different locations and providing transitions between a concurrent-display configuration and a full-screen standalone display configuration for the window based on an end location of a drag input provide additional control options without cluttering the UI with additional displayed controls, and enhances the operability of the device, which, additionally, reduces power usage and improves battery life of the device by enabling the user to use the device more quickly and efficiently.

In some embodiments, the device displays a first drag handle over the first application view and a second drag handle over the second application view, while the first application view and the second application view are displayed in a respective concurrent-display configuration on the display, wherein displaying the first drag handle and the second drag handle includes: in accordance with a determination that the first application view currently has input focus, displaying the first drag handle with a first appearance state (e.g., solid, bold color), and the second drag handle with a second appearance state (e.g., translucent, muted color) distinct from the first appearance state; and in accordance with a determination that the second application view currently has input focus, displaying the first drag handle with the second appearance state (e.g., translucent, muted color), and the second drag handle with the first appearance state (e.g., solid, bold color). This is illustrated in FIGS. 4E1-4E24, for example. Providing dynamic feedback regarding which window has input focus when two windows are concurrently displayed reduces user mistakes when interacting with the device, which enhances the operability of the device, which, additionally, reduces power usage and improves battery life of the device by enabling the user to use the device more quickly and efficiently.

In some embodiments, aspects/operations of methods 5000, 6000, 7000, 7100, 8000, and 9000 may be interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at an electronic device including a display generation component and one or more input devices including a touch-sensitive surface:

displaying, by the display generation component, a first user interface of a first application;

while displaying the first user interface of the first application, receiving a first input corresponding to a request for displaying a second application with the first application in a respective concurrent-display configuration;

in response to receiving the first input, displaying a second user interface of the second application and the first user interface of the first application in accordance with the respective concurrent-display configuration in which at least a portion of the first user interface of the first application is displayed concurrently with the second user interface of the second application;

while displaying the second application and the first application in accordance with the respective concurrent-display configuration, receiving a second input, including detecting a first contact at a location on the touch-sensitive surface that corresponds to the second application and detecting movement of the first contact across the touch-sensitive surface; and in response to detecting the second input that is received while displaying the second application and the first application in accordance with the respective concurrent-display configuration:

in accordance with a determination that the second input meets first criteria, while continuing to detect the second input, concurrently displaying at least a portion of the second application, at least a portion of a third application, and at least a portion of the first application, and after detecting an end of the second input, replacing display of the second application with display of the third application to display the third application and the first application in accordance with the respective concurrent-display configuration;

in accordance with a determination that the second input meets second criteria that are distinct from the first criteria:

maintaining display of the first application; and ceasing display of the second application without displaying the third application; and in accordance with a determination that the second input meets third criteria that are different from the first criteria and the second criteria, performing an operation within the second application in accordance with the second input.

2. The method of claim 1, wherein the respective concurrent-display configuration is a first concurrent-display configuration, and wherein the second user interface of the second application is displayed overlaying a portion of the first user interface of the first application in accordance with the first concurrent-display configuration.

3. The method of claim 2, wherein, in accordance with a determination that the first criteria are met by the second input, a third user interface of the third application is displayed overlaying the portion of the first user interface of the first application in accordance with the respective concurrent-display configuration.

4. The method of claim 1, wherein:

the second input met the first criteria and display of the third application replaced display of the second application in the respective concurrent-display configuration, and the method includes:

while displaying the third application and the first application in accordance with the respective concurrent-display configuration after the first criteria were met by the second input, detecting a third input that includes detecting a second contact and detecting movement of the second contact across the touch-sensitive surface:

in response to detecting the third input:

in accordance with a determination that the third input meets the first criteria, replacing display of the third application with display of a fourth application to display the fourth application and the first application in accordance with the respective concurrent-display configuration.

5. The method of claim 1, including:

in response to detecting a respective input that meets the first criteria, displaying an indication of one or more application views that are available to be displayed in the respective concurrent-display configuration.

6. The method of claim 1, wherein the first criteria and the second criteria have a first movement criterion that requires the movement of the first contact across the touch-sensitive surface to correspond to a movement in a first predefined direction relative to a currently displayed user interface of the second application, wherein the first criteria has a first start location criterion that requires the movement of the first contact to start at a location within threshold distance of a side-edge of second user interface of the second application and wherein the second criteria has a second start location criterion that requires the movement of the first contact to start at a location within a threshold distance of a bottom edge of the second user interface of the second application.

7. The method of claim 1, wherein the first criteria has a first movement criterion that requires the movement of the first contact across the touch-sensitive surface to correspond to a movement in a first predefined direction relative to a currently displayed user interface of the second application, and wherein the second criteria has a second movement criterion that requires the movement of the first contact across the touch-sensitive surface to correspond to movement in a second predefined direction, distinct from the first predefined direction, relative to the currently displayed user interface of the second application.

8. The method of claim 1, including:

in response to detecting the second input:

in accordance with a determination that the second input meets fourth criteria, concurrently displaying respective representations of a plurality of application views that were recently displayed in the respective concurrent-display configuration with another application, including a representation of an application view corresponding to the second application and a representation of an application view corresponding to the third application.

9. The method of claim 8, wherein the representation of the application view corresponding to the second application includes an identifier of the second application and an identifier for an application window corresponding to the second application, and the representation of the application view corresponding to the third application includes an identifier of the third application and an identifier for an application window corresponding to the third application.

10. The method of claim 8, wherein the fourth criteria include a respective start location criterion that requires movement of the first contact to start from within a threshold range of a first edge of the second application, and includes a respective movement criterion that requires the movement of the first contact to meet first movement condition in order for the third criteria to be met.

11. The method of claim 8, wherein the respective representations of the plurality of application views do not include a representation of an application view for the first application among the respective representations of the plurality of application views that were recently displayed in the respective concurrent-display configuration with another application.

12. The method of claim 8, including:

while displaying the respective representations of the plurality of application views that were recently displayed in the respective concurrent-display configuration with another application, including the representation of the application view corresponding to the second application and the representation of the application view corresponding to the third application, detecting a fourth input that meets fifth criteria; and in response to detecting the fourth input:

in accordance with a determination that the fourth input is directed to the representation of the second application, ceasing to display the representation for the application view corresponding to the second application; and in accordance with a determination that the fourth input is directed to the representation of the third application, ceasing to display the representation for the application view corresponding to the third application.

13. The method of claim 8, including:

while displaying the respective representations of the plurality of application views that were recently displayed in the respective concurrent-display configuration with another application, including the representation of the application view corresponding to the second application and the representation of the application view corresponding to the third application, detecting a fifth input that meets sixth criteria; and in response to detecting the fifth input, changing a relative display prominence of a first application view and a second application view in accordance with the fifth input.

14. The method of claim 8, including:

while displaying the respective representations of the plurality of application views that were recently displayed in the respective concurrent-display configuration with another application, detecting a sixth input that meets seventh criteria; and in response to detecting the sixth input:

ceasing to display the respective representations of the plurality of application views; and displaying a respective application view selected from the plurality of application views in the respective concurrent-display configuration with the first application, wherein the respective application view is selected based on a location of the sixth input.

15. The method of claim 8, including:

in response to detecting the second input:

in accordance with a determination that the second input meets the fourth criteria, visually obscuring a displayed portion of the first user interface of the first application relative to the respective representations of the plurality of application views that were recently displayed in the respective concurrent-display configuration with another application.

16. The method of claim 1, wherein the first criteria are met by a horizontal swipe gesture detected near a bottom edge of a respective application displayed in the respective concurrent-display configuration with the first application.

17. The method of claim 1, wherein:

while displaying the first application after the second criteria were met by a previous input and a respective application is removed from concurrent display with the first application in the respective concurrent-display configuration, detecting a seventh input that includes detecting a third contact and detecting movement of the third contact across the touch-sensitive surface:

in response to detecting the seventh input:

in accordance with a determination that the seventh input meets eighth criteria, restoring display of the respective application to redisplay the respective application and the first application in accordance with the respective concurrent-display configuration.

18. The method of claim 17, including:

in response to detecting the seventh input:

in accordance with a determination that the seventh input meets the eighth criteria, displaying an indication of one or more application views that are available to be displayed in the respective concurrent-display configuration.

19. The method of claim 1, wherein:

while displaying a respective application and the first application in accordance with the respective concurrent-display configuration, detecting an eighth input that includes detecting a fourth contact, detecting movement of the fourth contact across the touch-sensitive surface, and detecting lift-off of the fourth contact after the movement of the fourth contact:

in response to detecting the eighth input:

in accordance with a determination that the eighth input meets ninth criteria, wherein the ninth criteria require that the fourth contact is detected at a location on the touch-sensitive surface that corresponds to first content represented in the first user interface of the first application, and that the movement of the fourth contact across the touch-sensitive surface corresponds to a movement from a location of the first content to a location over the respective application, replacing display of the respective application with display of the first content in an application corresponding to the first content, to display the application corresponding to the first content with the first application in accordance with the respective concurrent-display configuration.

20. The method of claim 1, including:

while displaying a respective application and the first application in accordance with the respective concurrent-display configuration, detecting a ninth input that includes detecting a fifth contact, detecting movement of the fifth contact across the touch-sensitive surface, and detecting lift-off of the fifth contact after the movement of the fifth contact:

in response to detecting the ninth input:

in accordance with a determination that the ninth input meets tenth criteria, wherein the tenth criteria require that the fifth contact is detected at a location on the touch-sensitive surface that corresponds to a first application icon in a dock displayed concurrently with the first application, and that the movement of the fifth contact across the touch-sensitive surface corresponds to a movement from a location of the first application icon to a location over the respective application, replacing display of the respective application with display of an application corresponding to the first application icon, to display the application corresponding to the first application icon with the first application in accordance with the respective concurrent-display configuration.

21. The method of claim 1, including:

in response to detecting the second input:

in accordance with a determination that the second input meets eleventh criteria:

moving the second application relative to the first application in accordance with the movement of the first contact; and maintaining display of the second application with the first application in the respective concurrent-display configuration.

22. The method of claim 1, wherein the respective concurrent-display configuration is a first concurrent-display configuration in which the second application is displayed overlaying a portion of the first application, and the method includes:

in response to detecting the second input:

in accordance with a determination that the second input meets twelfth criteria, switching from displaying the second application and the first application in the first concurrent-display configuration to displaying the second application and the first application in a second concurrent-display configuration, wherein the first application and the second application are displayed side-by-side in the second concurrent-display configuration.

23. The method of claim 1, including:

while displaying the first application after receiving the second input, detecting a twelfth input that corresponds to a request to display an application-switcher user interface that includes representations of a plurality of recently open applications; and in response to detecting the twelfth input, replacing display of the first application with display of the application-switcher user interface, wherein the application-switcher user interface includes representations of a plurality of application views corresponding to the plurality of recently open applications, including one or more first application views that are full-screen windows and one or more second application views that are slide-over windows to be displayed with another application view, including any of the first application views.

24. A non-transitory computer-readable storage medium storing executable instructions that, when executed by an electronic device with one or more processors, a display generation component and one or more input devices including a touch-sensitive surface, cause the electronic device to perform operations comprising:

displaying, by the display generation component, a first user interface of a first application;

while displaying the first user interface of the first application, receiving a first input corresponding to a request for displaying a second application with the first application in a respective concurrent-display configuration;

in response to receiving the first input, displaying a second user interface of the second application and the first user interface of the first application in accordance with the respective concurrent-display configuration in which at least a portion of the first user interface of the first application is displayed concurrently with the second user interface of the second application;

while displaying the second application and the first application in accordance with the respective concurrent-display configuration, receiving a second input, including detecting a first contact at a location on the touch-sensitive surface that corresponds to the second application and detecting movement of the first contact across the touch-sensitive surface; and in response to detecting the second input that is received while displaying the second application and the first application in accordance with the respective concurrent-display configuration:

in accordance with a determination that the second input meets first criteria, while continuing to detect the second input, concurrently displaying at least a portion of the second application, at least a portion of a third application, and at least a portion of the first application, and after detecting an end of the second input, replacing display of the second application with display of the third application to display the third application and the first application in accordance with the respective concurrent-display configuration;

in accordance with a determination that the second input meets second criteria that are distinct from the first criteria:

maintaining display of the first application; and ceasing display of the second application without displaying the third application; and in accordance with a determination that the second input meets third criteria that are different from the first criteria and the second criteria, performing an operation within the second application in accordance with the second input.

25. An electronic device, comprising:

one or more processors;

a display generation component;

one or more input devices including a touch-sensitive surface; and memory storing one or more programs that are configured for execution by the one or more processors, the one or more programs including instructions for:

displaying, by the display generation component, a first user interface of a first application;

while displaying the first user interface of the first application, receiving a first input corresponding to a request for displaying a second application with the first application in a respective concurrent-display configuration;

in response to receiving the first input, displaying a second user interface of the second application and the first user interface of the first application in accordance with the respective concurrent-display configuration in which at least a portion of the first user interface of the first application is displayed concurrently with the second user interface of the second application;

while displaying the second application and the first application in accordance with the respective concurrent-display configuration, receiving a second input, including detecting a first contact at a location on the touch-sensitive surface that corresponds to the second application and detecting movement of the first contact across the touch-sensitive surface; and in response to detecting the second input that is received while displaying the second application and the first application in accordance with the respective concurrent-display configuration:

in accordance with a determination that the second input meets first criteria, while continuing to detect the second input, concurrently displaying at least a portion of the second application, at least a portion of a third application, and at least a portion of the first application, and after detecting an end of the second input, replacing display of the second application with display of the third application to display the third application and the first application in accordance with the respective concurrent-display configuration;

in accordance with a determination that the second input meets second criteria that are distinct from the first criteria:

maintaining display of the first application; and ceasing display of the second application without displaying the third application; and in accordance with a determination that the second input meets third criteria that are different from the first criteria and the second criteria, performing an operation within the second application in accordance with the second input.

26. The electronic device of claim 25, wherein the respective concurrent-display configuration is a first concurrent-display configuration, and wherein the second user interface of the second application is displayed overlaying a portion of the first user interface of the first application in accordance with the first concurrent-display configuration.

27. The electronic device of claim 26, wherein, in accordance with a determination that the first criteria are met by the second input, a third user interface of the third application is displayed overlaying the portion of the first user interface of the first application in accordance with the respective concurrent-display configuration.

28. The electronic device of claim 25, wherein:

the second input met the first criteria and display of the third application replaced display of the second application in the respective concurrent-display configuration, and the one or more programs further include instructions for:

while displaying the third application and the first application in accordance with the respective concurrent-display configuration after the first criteria were met by the second input, detecting a third input that includes detecting a second contact and detecting movement of the second contact across the touch-sensitive surface:

in response to detecting the third input:

in accordance with a determination that the third input meets the first criteria, replacing display of the third application with display of a fourth application to display the fourth application and the first application in accordance with the respective concurrent-display configuration.

29. The electronic device of claim 25, the one or more programs further including instructions for:

in response to detecting a respective input that meets the first criteria, displaying an indication of one or more application views that are available to be displayed in the respective concurrent-display configuration.

30. The electronic device of claim 25, wherein the first criteria and the second criteria have a first movement criterion that requires the movement of the first contact across the touch-sensitive surface to correspond to a movement in a first predefined direction relative to a currently displayed user interface of the second application, wherein the first criteria has a first start location criterion that requires the movement of the first contact to start at a location within threshold distance of a side-edge of second user interface of the second application and wherein the second criteria has a second start location criterion that requires the movement of the first contact to start at a location within a threshold distance of a bottom edge of the second user interface of the second application.

31. The electronic device of claim 25, wherein the first criteria has a first movement criterion that requires the movement of the first contact across the touch-sensitive surface to correspond to a movement in a first predefined direction relative to a currently displayed user interface of the second application, and wherein the second criteria has a second movement criterion that requires the movement of the first contact across the touch-sensitive surface to correspond to movement in a second predefined direction, distinct from the first predefined direction, relative to the currently displayed user interface of the second application.

32. The electronic device of claim 25, the one or more programs further including instructions for:

in response to detecting the second input:

in accordance with a determination that the second input meets fourth criteria, concurrently displaying respective representations of a plurality of application views that were recently displayed in the respective concurrent-display configuration with another application, including a representation of an application view corresponding to the second application and a representation of an application view corresponding to the third application.

33. The electronic device of claim 32, wherein the representation of the application view corresponding to the second application includes an identifier of the second application and an identifier for an application window corresponding to the second application, and the representation of the application view corresponding to the third application includes an identifier of the third application and an identifier for an application window corresponding to the third application.

34. The electronic device of claim 32, wherein the fourth criteria include a respective start location criterion that requires movement of the first contact to start from within a threshold range of a first edge of the second application, and includes a respective movement criterion that requires the movement of the first contact to meet first movement condition in order for the third criteria to be met.

35. The electronic device of claim 32, wherein the respective representations of the plurality of application views do not include a representation of an application view for the first application among the respective representations of the plurality of application views that were recently displayed in the respective concurrent-display configuration with another application.

36. The electronic device of claim 32, the one or more programs further including instructions for:

while displaying the respective representations of the plurality of application views that were recently displayed in the respective concurrent-display configuration with another application, including the representation of the application view corresponding to the second application and the representation of the application view corresponding to the third application, detecting a fourth input that meets fifth criteria; and in response to detecting the fourth input:

in accordance with a determination that the fourth input is directed to the representation of the second application, ceasing to display the representation for the application view corresponding to the second application; and in accordance with a determination that the fourth input is directed to the representation of the third application, ceasing to display the representation for the application view corresponding to the third application.

37. The electronic device of claim 32, the one or more programs further including instructions for:

while displaying the respective representations of the plurality of application views that were recently displayed in the respective concurrent-display configuration with another application, including the representation of the application view corresponding to the second application and the representation of the application view corresponding to the third application, detecting a fifth input that meets sixth criteria; and in response to detecting the fifth input, changing a relative display prominence of a first application view and a second application view in accordance with the fifth input.

38. The electronic device of claim 32, the one or more programs further including instructions for:

while displaying the respective representations of the plurality of application views that were recently displayed in the respective concurrent-display configuration with another application, detecting a sixth input that meets seventh criteria; and in response to detecting the sixth input:

ceasing to display the respective representations of the plurality of application views; and displaying a respective application view selected from the plurality of application views in the respective concurrent-display configuration with the first application, wherein the respective application view is selected based on a location of the sixth input.

39. The electronic device of claim 32, the one or more programs further including instructions for:

in response to detecting the second input:

in accordance with a determination that the second input meets the fourth criteria, visually obscuring a displayed portion of the first user interface of the first application relative to the respective representations of the plurality of application views that were recently displayed in the respective concurrent-display configuration with another application.

40. The electronic device of claim 25, wherein the first criteria are met by a horizontal swipe gesture detected near a bottom edge of a respective application displayed in the respective concurrent-display configuration with the first application.

41. The electronic device of claim 25, the one or more programs further including instructions for:

while displaying the first application after the second criteria were met by a previous input and a respective application is removed from concurrent display with the first application in the respective concurrent-display configuration, detecting a seventh input that includes detecting a third contact and detecting movement of the third contact across the touch-sensitive surface:

in response to detecting the seventh input:

in accordance with a determination that the seventh input meets eighth criteria, restoring display of the respective application to redisplay the respective application and the first application in accordance with the respective concurrent-display configuration.

42. The electronic device of claim 41, the one or more programs further including instructions for:

in response to detecting the seventh input:

in accordance with a determination that the seventh input meets the eighth criteria, displaying an indication of one or more application views that are available to be displayed in the respective concurrent-display configuration.

43. The electronic device of claim 25, the one or more programs further including instructions for:

while displaying a respective application and the first application in accordance with the respective concurrent-display configuration, detecting an eighth input that includes detecting a fourth contact, detecting movement of the fourth contact across the touch-sensitive surface, and detecting lift-off of the fourth contact after the movement of the fourth contact:

in response to detecting the eighth input:

in accordance with a determination that the eighth input meets ninth criteria, wherein the ninth criteria require that the fourth contact is detected at a location on the touch-sensitive surface that corresponds to first content represented in the first user interface of the first application, and that the movement of the fourth contact across the touch-sensitive surface corresponds to a movement from a location of the first content to a location over the respective application, replacing display of the respective application with display of the first content in an application corresponding to the first content, to display the application corresponding to the first content with the first application in accordance with the respective concurrent-display configuration.

44. The electronic device of claim 25, the one or more programs further including instructions for:

while displaying a respective application and the first application in accordance with the respective concurrent-display configuration, detecting a ninth input that includes detecting a fifth contact, detecting movement of the fifth contact across the touch-sensitive surface, and detecting lift-off of the fifth contact after the movement of the fifth contact:

in response to detecting the ninth input:

in accordance with a determination that the ninth input meets tenth criteria, wherein the tenth criteria require that the fifth contact is detected at a location on the touch-sensitive surface that corresponds to a first application icon in a dock displayed concurrently with the first application, and that the movement of the fifth contact across the touch-sensitive surface corresponds to a movement from a location of the first application icon to a location over the respective application, replacing display of the respective application with display of an application corresponding to the first application icon, to display the application corresponding to the first application icon with the first application in accordance with the respective concurrent-display configuration.

45. The electronic device of claim 25, the one or more programs further including instructions for:

in response to detecting the second input:

in accordance with a determination that the second input meets eleventh criteria:

moving the second application relative to the first application in accordance with the movement of the first contact; and maintaining display of the second application with the first application in the respective concurrent-display configuration.

46. The electronic device of claim 25, wherein the respective concurrent-display configuration is a first concurrent-display configuration in which the second application is displayed overlaying a portion of the first application, and the one or more programs further include instructions for:

in response to detecting the second input:

in accordance with a determination that the second input meets twelfth criteria, switching from displaying the second application and the first application in the first concurrent-display configuration to displaying the second application and the first application in a second concurrent-display configuration, wherein the first application and the second application are displayed side-by-side in the second concurrent-display configuration.

47. The electronic device of claim 25, the one or more programs further including instructions for:

while displaying the first application after receiving the second input, detecting a twelfth input that corresponds to a request to display an application-switcher user interface that includes representations of a plurality of recently open applications; and in response to detecting the twelfth input, replacing display of the first application with display of the application-switcher user interface, wherein the application-switcher user interface includes representations of a plurality of application views corresponding to the plurality of recently open applications, including one or more first application views that are full-screen windows and one or more second application views that are slide-over windows to be displayed with another application view, including any of the first application views.

48. The computer-readable storage medium of claim 24, wherein the respective concurrent-display configuration is a first concurrent-display configuration, and wherein the second user interface of the second application is displayed overlaying a portion of the first user interface of the first application in accordance with the first concurrent-display configuration.

49. The computer-readable storage medium of claim 48, wherein, in accordance with a determination that the first criteria are met by the second input, a third user interface of the third application is displayed overlaying the portion of the first user interface of the first application in accordance with the respective concurrent-display configuration.

50. The computer-readable storage medium of claim 24, wherein:

the second input met the first criteria and display of the third application replaced display of the second application in the respective concurrent-display configuration, and the one or more programs comprise instructions which, when executed by the electronic device, cause the electronic device to perform operations comprising:

while displaying the third application and the first application in accordance with the respective concurrent-display configuration after the first criteria were met by the second input, detecting a third input that includes detecting a second contact and detecting movement of the second contact across the touch-sensitive surface:

in response to detecting the third input:

in accordance with a determination that the third input meets the first criteria, replacing display of the third application with display of a fourth application to display the fourth application and the first application in accordance with the respective concurrent-display configuration.

51. The computer-readable storage medium of claim 24, the one or more programs comprising instructions which, when executed by the electronic device, cause the electronic device to perform operations comprising:

in response to detecting a respective input that meets the first criteria, displaying an indication of one or more application views that are available to be displayed in the respective concurrent-display configuration.

52. The computer-readable storage medium of claim 24, wherein the first criteria and the second criteria have a first movement criterion that requires the movement of the first contact across the touch-sensitive surface to correspond to a movement in a first predefined direction relative to a currently displayed user interface of the second application, wherein the first criteria has a first start location criterion that requires the movement of the first contact to start at a location within threshold distance of a side-edge of second user interface of the second application and wherein the second criteria has a second start location criterion that requires the movement of the first contact to start at a location within a threshold distance of a bottom edge of the second user interface of the second application.

53. The computer-readable storage medium of claim 24, wherein the first criteria has a first movement criterion that requires the movement of the first contact across the touch-sensitive surface to correspond to a movement in a first predefined direction relative to a currently displayed user interface of the second application, and wherein the second criteria has a second movement criterion that requires the movement of the first contact across the touch-sensitive surface to correspond to movement in a second predefined direction, distinct from the first predefined direction, relative to the currently displayed user interface of the second application.

54. The computer-readable storage medium of claim 24, the one or more programs comprising instructions which, when executed by the electronic device, cause the electronic device to perform operations comprising:

in response to detecting the second input:

in accordance with a determination that the second input meets fourth criteria, concurrently displaying respective representations of a plurality of application views that were recently displayed in the respective concurrent-display configuration with another application, including a representation of an application view corresponding to the second application and a representation of an application view corresponding to the third application.

55. The computer-readable storage medium of claim 54, wherein the representation of the application view corresponding to the second application includes an identifier of the second application and an identifier for an application window corresponding to the second application, and the representation of the application view corresponding to the third application includes an identifier of the third application and an identifier for an application window corresponding to the third application.

56. The computer-readable storage medium of claim 54, wherein the fourth criteria include a respective start location criterion that requires movement of the first contact to start from within a threshold range of a first edge of the second application, and includes a respective movement criterion that requires the movement of the first contact to meet first movement condition in order for the third criteria to be met.

57. The computer-readable storage medium of claim 54, wherein the respective representations of the plurality of application views do not include a representation of an application view for the first application among the respective representations of the plurality of application views that were recently displayed in the respective concurrent-display configuration with another application.

58. The computer-readable storage medium of claim 54, the one or more programs comprising instructions which, when executed by the electronic device, cause the electronic device to perform operations comprising:

while displaying the respective representations of the plurality of application views that were recently displayed in the respective concurrent-display configuration with another application, including the representation of the application view corresponding to the second application and the representation of the application view corresponding to the third application, detecting a fourth input that meets fifth criteria; and in response to detecting the fourth input:

in accordance with a determination that the fourth input is directed to the representation of the second application, ceasing to display the representation for the application view corresponding to the second application; and in accordance with a determination that the fourth input is directed to the representation of the third application, ceasing to display the representation for the application view corresponding to the third application.

59. The computer-readable storage medium of claim 54, the one or more programs comprising instructions which, when executed by the electronic device, cause the electronic device to perform operations comprising:

while displaying the respective representations of the plurality of application views that were recently displayed in the respective concurrent-display configuration with another application, including the representation of the application view corresponding to the second application and the representation of the application view corresponding to the third application, detecting a fifth input that meets sixth criteria; and in response to detecting the fifth input, changing a relative display prominence of a first application view and a second application view in accordance with the fifth input.

60. The computer-readable storage medium of claim 54, the one or more programs comprising instructions which, when executed by the electronic device, cause the electronic device to perform operations comprising:

while displaying the respective representations of the plurality of application views that were recently displayed in the respective concurrent-display configuration with another application, detecting a sixth input that meets seventh criteria; and in response to detecting the sixth input:

ceasing to display the respective representations of the plurality of application views; and displaying a respective application view selected from the plurality of application views in the respective concurrent-display configuration with the first application, wherein the respective application view is selected based on a location of the sixth input.

61. The computer-readable storage medium of claim 54, the one or more programs comprising instructions which, when executed by the electronic device, cause the electronic device to perform operations comprising:

in response to detecting the second input:

in accordance with a determination that the second input meets the fourth criteria, visually obscuring a displayed portion of the first user interface of the first application relative to the respective representations of the plurality of application views that were recently displayed in the respective concurrent-display configuration with another application.

62. The computer-readable storage medium of claim 24, wherein the first criteria are met by a horizontal swipe gesture detected near a bottom edge of a respective application displayed in the respective concurrent-display configuration with the first application.

63. The computer-readable storage medium of claim 24, the one or more programs comprising instructions which, when executed by the electronic device, cause the electronic device to perform operations comprising:

while displaying the first application after the second criteria were met by a previous input and a respective application is removed from concurrent display with the first application in the respective concurrent-display configuration, detecting a seventh input that includes detecting a third contact and detecting movement of the third contact across the touch-sensitive surface:

in response to detecting the seventh input:

in accordance with a determination that the seventh input meets eighth criteria, restoring display of the respective application to redisplay the respective application and the first application in accordance with the respective concurrent-display configuration.

64. The computer-readable storage medium of claim 63, the one or more programs comprising instructions which, when executed by the electronic device, cause the electronic device to perform operations comprising:

in response to detecting the seventh input:

in accordance with a determination that the seventh input meets the eighth criteria, displaying an indication of one or more application views that are available to be displayed in the respective concurrent-display configuration.

65. The computer-readable storage medium of claim 24, the one or more programs comprising instructions which, when executed by the electronic device, cause the electronic device to perform operations comprising:

while displaying a respective application and the first application in accordance with the respective concurrent-display configuration, detecting an eighth input that includes detecting a fourth contact, detecting movement of the fourth contact across the touch-sensitive surface, and detecting lift-off of the fourth contact after the movement of the fourth contact:

in response to detecting the eighth input:

in accordance with a determination that the eighth input meets ninth criteria, wherein the ninth criteria require that the fourth contact is detected at a location on the touch-sensitive surface that corresponds to first content represented in the first user interface of the first application, and that the movement of the fourth contact across the touch-sensitive surface corresponds to a movement from a location of the first content to a location over the respective application, replacing display of the respective application with display of the first content in an application corresponding to the first content, to display the application corresponding to the first content with the first application in accordance with the respective concurrent-display configuration.

66. The computer-readable storage medium of claim 24, the one or more programs comprising instructions which, when executed by the electronic device, cause the electronic device to perform operations comprising:

while displaying a respective application and the first application in accordance with the respective concurrent-display configuration, detecting a ninth input that includes detecting a fifth contact, detecting movement of the fifth contact across the touch-sensitive surface, and detecting lift-off of the fifth contact after the movement of the fifth contact:

in response to detecting the ninth input:

in accordance with a determination that the ninth input meets tenth criteria, wherein the tenth criteria require that the fifth contact is detected at a location on the touch-sensitive surface that corresponds to a first application icon in a dock displayed concurrently with the first application, and that the movement of the fifth contact across the touch-sensitive surface corresponds to a movement from a location of the first application icon to a location over the respective application, replacing display of the respective application with display of an application corresponding to the first application icon, to display the application corresponding to the first application icon with the first application in accordance with the respective concurrent-display configuration.

67. The computer-readable storage medium of claim 24, the one or more programs comprising instructions which, when executed by the electronic device, cause the electronic device to perform operations comprising:

in response to detecting the second input:

in accordance with a determination that the second input meets eleventh criteria:

moving the second application relative to the first application in accordance with the movement of the first contact; and maintaining display of the second application with the first application in the respective concurrent-display configuration.

68. The computer-readable storage medium of claim 24, wherein the respective concurrent-display configuration is a first concurrent-display configuration in which the second application is displayed overlaying a portion of the first application, and the one or more programs comprise instructions which, when executed by the electronic device, cause the electronic device to perform operations comprising:

in response to detecting the second input:

in accordance with a determination that the second input meets twelfth criteria, switching from displaying the second application and the first application in the first concurrent-display configuration to displaying the second application and the first application in a second concurrent-display configuration, wherein the first application and the second application are displayed side-by-side in the second concurrent-display configuration.

69. The computer-readable storage medium of claim 24, the one or more programs comprising instructions which, when executed by the electronic device, cause the electronic device to perform operations comprising:

while displaying the first application after receiving the second input, detecting a twelfth input that corresponds to a request to display an application-switcher user interface that includes representations of a plurality of recently open applications; and in response to detecting the twelfth input, replacing display of the first application with display of the application-switcher user interface, wherein the application-switcher user interface includes representations of a plurality of application views corresponding to the plurality of recently open applications, including one or more first application views that are full-screen windows and one or more second application views that are slide-over windows to be displayed with another application view, including any of the first application views.

* * * * *